(12) United States Patent
Frank et al.

(10) Patent No.: US 10,387,898 B2
(45) Date of Patent: Aug. 20, 2019

(54) CROWD-BASED PERSONALIZED RECOMMENDATIONS OF FOOD USING MEASUREMENTS OF AFFECTIVE RESPONSE

(71) Applicant: Affectomatics Ltd., Kiryat Tivon (IL)

(72) Inventors: Ari M Frank, Haifa (IL); Gil Thieberger, Kiryat Tivon (IL)

(73) Assignee: Affectomatics Ltd., Kiryat Tivon (IL)

( * ) Notice: Subject to any disclaimer, the term of this patent is extended or adjusted under 35 U.S.C. 154(b) by 0 days.

(21) Appl. No.: 15/701,101

(22) Filed: Sep. 11, 2017

(65) Prior Publication Data

US 2018/0025368 A1    Jan. 25, 2018

Related U.S. Application Data

(63) Continuation of application No. 15/052,785, filed on Feb. 24, 2016, now Pat. No. 9,805,381, which is a
(Continued)

(51) Int. Cl.
*G06F 7/02* (2006.01)
*G06F 16/00* (2019.01)
(Continued)

(52) U.S. Cl.
CPC ... *G06Q 30/0201* (2013.01); *G06F 16/24578* (2019.01); *G06F 16/337* (2019.01);
(Continued)

(58) Field of Classification Search
CPC .......... G06F 17/3053; G06F 17/30702; G06F 17/30867; G06F 16/24578; G06F 16/337;
(Continued)

(56) References Cited

U.S. PATENT DOCUMENTS 6,904,408 B1    6/2005  McCarthy et al.
8,010,663 B2    8/2011  Firminger et al.
(Continued)

FOREIGN PATENT DOCUMENTS

WO    WO2014074426    5/2014

OTHER PUBLICATIONS

Baig, et al. "Crowd Emotion Detection Using Dynamic Probabilistic Models", In Proceedings of 13th International Conference on Simulation of Adaptive Behavior, SAB 2014, Jul. 22-25, 2014, pp. 328-337.
(Continued)

*Primary Examiner* — Bruce M Moser
(74) *Attorney, Agent, or Firm* — Active Knowledge Ltd.

(57) ABSTRACT

Some aspects of this disclosure involve ranking types of food based on measurements of affective response of users who consumed the types of food. In one embodiment, a system that ranks types of food includes sensors that take measurements of affective response of users and a computer. The computer receives indications of times at which the users consumed the types of food and selects for each type of food, based on the indications, measurements of at least five of the users taken up to four hours after consuming the type of food. The computer ranks the types of food based on the selected measurements. Optionally, each of the types of food is a different item on a menu comprising food items.

20 Claims, 56 Drawing Sheets

Related U.S. Application Data continuation-in-part of application No. 14/833,035, filed on Aug. 21, 2015, now Pat. No. 10,198,505, said application No. 15/052,785 is a continuation-in-part of application No. 15/010,412, filed on Jan. 29, 2016.

(60) Provisional application No. 62/185,304, filed on Jun. 26, 2015, provisional application No. 62/109,456, filed on Jan. 29, 2015, provisional application No. 62/040,358, filed on Aug. 21, 2014, provisional application No. 62/040,345, filed on Aug. 21, 2014, provisional application No. 62/040,355, filed on Aug. 21, 2014.

(51) Int. Cl.
*G06Q 30/02* (2012.01)
*G06Q 50/12* (2012.01)
*G06F 16/335* (2019.01)
*G06F 16/9535* (2019.01)
*G06F 16/2457* (2019.01)

(52) U.S. Cl.
CPC ......... *G06F 16/9535* (2019.01); *G06Q 30/02* (2013.01); *G06Q 30/0282* (2013.01); *G06Q 50/12* (2013.01)

(58) Field of Classification Search
CPC . G06F 16/9535; G06F 16/9536; G16H 20/60; G06Q 30/02; G06Q 30/0201; G06Q 30/0282; G06Q 50/12
See application file for complete search history.

(56) References Cited

U.S. PATENT DOCUMENTS

| | | | |
|---|---|---|---|
| 8,126,220 B2 | 2/2012 | Greig | |
| 8,296,172 B2 | 10/2012 | Marci et al. | |
| 8,327,395 B2 | 12/2012 | Lee et al. | |
| 8,539,359 B2 | 9/2013 | Rapaport et al. | |
| 8,676,230 B2 | 3/2014 | Alexander et al. | |
| 8,690,578 B1* | 4/2014 | Nusbaum | G09B 19/00 434/127 |
| 8,700,009 B2 | 4/2014 | Quy | |
| 8,764,652 B2 | 7/2014 | Lee et al. | |
| 8,775,186 B2 | 7/2014 | Shin et al. | |
| 8,781,991 B2 | 7/2014 | Lee | |
| 8,782,681 B2 | 7/2014 | Lee et al. | |
| 8,965,498 B2 | 2/2015 | Katra et al. | |
| 9,026,476 B2 | 5/2015 | Bist | |
| 9,106,958 B2 | 8/2015 | el Kaliouby et al. | |
| 9,165,216 B2 | 10/2015 | Angell et al. | |
| 9,196,173 B2 | 11/2015 | Bak et al. | |
| 9,396,492 B2 | 7/2016 | Schiff et al. | |
| 2004/0210661 A1 | 10/2004 | Thompson | |
| 2005/0216285 A1 | 9/2005 | Barroso et al. | |
| 2008/0139910 A1* | 6/2008 | Mastrototaro | G16H 40/63 600/365 |
| 2008/0295126 A1 | 11/2008 | Lee et al. | |
| 2009/0131764 A1 | 5/2009 | Lee et al. | |
| 2009/0193344 A1 | 7/2009 | Smyers | |
| 2010/0004977 A1 | 1/2010 | Marci et al. | |
| 2010/0250554 A1 | 9/2010 | Shu | |
| 2011/0046502 A1 | 2/2011 | Pradeep et al. | |
| 2011/0106750 A1 | 5/2011 | Pradeep et al. | |
| 2011/0125063 A1* | 5/2011 | Shalon | A61B 5/0006 600/590 |
| 2012/0116182 A1* | 5/2012 | Wong | A61F 5/0026 600/301 |
| 2012/0124122 A1 | 5/2012 | el Kaliouby et al. | |
| 2012/0203725 A1 | 8/2012 | Stoica | |
| 2012/0232520 A1* | 9/2012 | Sloan | A61B 5/14532 604/504 |
| 2012/0290266 A1 | 11/2012 | Jain et al. | |
| 2012/0316456 A1 | 12/2012 | Rahman et al. | |
| 2013/0019187 A1 | 1/2013 | Hind et al. | |
| 2013/0080260 A1 | 3/2013 | French et al. | |
| 2013/0173413 A1 | 7/2013 | Page et al. | |
| 2014/0088996 A1* | 3/2014 | Damani | G06F 19/3418 705/2 |
| 2014/0200463 A1 | 7/2014 | el Kaliouby et al. | |
| 2014/0207264 A1* | 7/2014 | Quy | A61B 5/6826 700/91 |
| 2014/0250200 A1 | 9/2014 | Geurts et al. | |
| 2014/0280529 A1 | 9/2014 | Davis et al. | |
| 2014/0335469 A1 | 11/2014 | Boyden et al. | |
| 2014/0350349 A1 | 11/2014 | Geurts et al. | |
| 2014/0366049 A1 | 12/2014 | Lehtiniemi et al. | |
| 2015/0058416 A1 | 2/2015 | Felt | |
| 2015/0112983 A1 | 4/2015 | Srivastava et al. | |
| 2015/0142553 A1 | 5/2015 | Kodra et al. | |
| 2015/0168365 A1* | 6/2015 | Connor | G01N 33/02 356/51 |
| 2015/0278455 A1* | 10/2015 | Hyde | G06F 19/3475 707/738 |
| 2015/0289800 A1 | 10/2015 | Pacione et al. | |
| 2015/0313530 A1 | 11/2015 | Kodra et al. | |
| 2016/0015307 A1 | 1/2016 | Kothuri | |
| 2016/0029966 A1* | 2/2016 | Salas-Boni | A61B 5/02055 600/347 |
| 2017/0053100 A1* | 2/2017 | Neftel | G16H 40/63 |

OTHER PUBLICATIONS

Banaee, et al. "Data mining for wearable sensors in health monitoring systems: a review of recent trends and challenges." Sensors 13.12 (2013): 17472-17500.

Danner, et al. "Make a face! Implicit and explicit measurement of facial expressions elicited by orange juices using face reading technology." Food Quality and Preference 32 (2014): 167-172.

Danner, et al. "Facial expressions and autonomic nervous system responses elicited by tasting different juices." Food Research International 64 (2014): 81-90.

de Wijk, et al. "Autonomic nervous system responses on and facial expressions to the sight, smell, and taste of liked and disliked foods." Food Quality and Preference 26.2 (2012): 196-203.

Eckstein, Miguel P., et al. "Neural decoding of collective wisdom with multi-brain computing." NeuroImage 59.1 (2012): 94-108.

Oh, et al. "u-Bab Sang: a context-aware food recommendation system." The Journal of Supercomputing 54.1 (2010): 61-81.

Sadilek, Adam, et al. "nEmesis: Which Restaurants Should You Avoid Today?" First AAAI Conference on Human Computation and Crowdsourcing. 2013.

Walla, et al. "Food-evoked changes in humans." Journal of Psychophysiology (2010) 24: 25-32.

Woollaston, V. "What's Your baby's favourite food? Thrill-O-Meter reveals what tickles their tastebuds—with mango and cinnamon topping the list". The Daily Mail, Nov. 7, 2013. URL: http://www.dailymail.co.uk/sciencetech/article-2489986/Whats-YOUR-babys-favourite-foodThrill-O-Meter-reveals-tickles-tastebuds--mango-cinnamon-topping-list.htm.

* cited by examiner

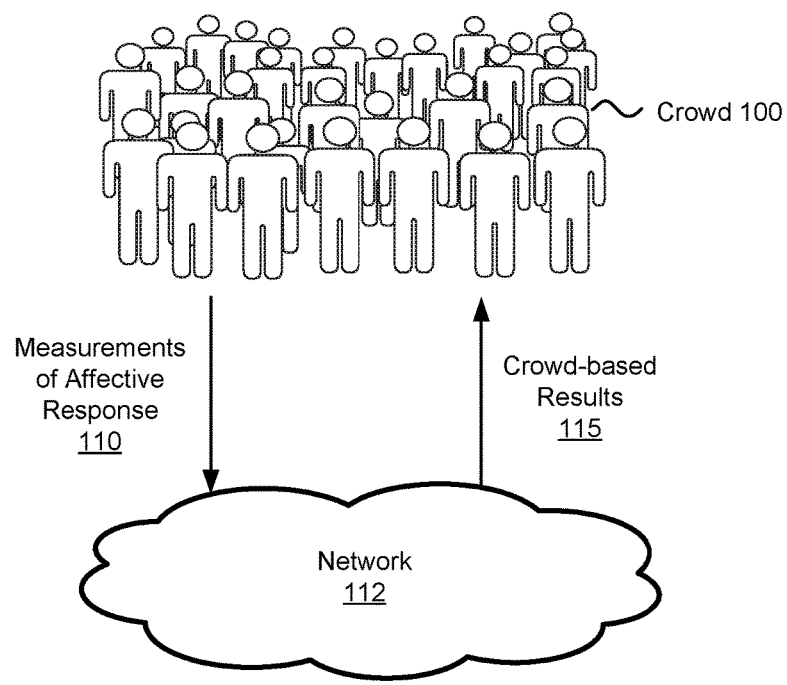
FIG. 11
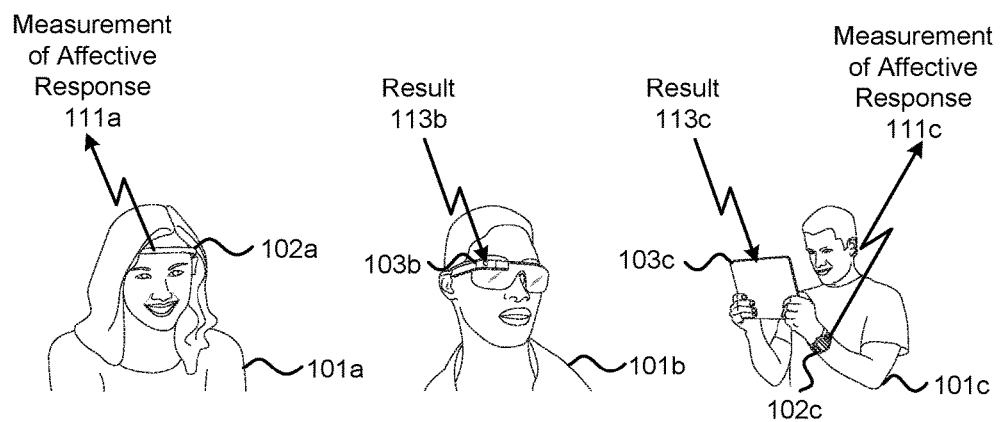
FIG. 12a  FIG. 12b  FIG. 12c

CROWD-BASED PERSONALIZED RECOMMENDATIONS OF FOOD USING MEASUREMENTS OF AFFECTIVE RESPONSE

CROSS-REFERENCE TO RELATED APPLICATIONS

This application is a continuation of U.S. application Ser. No. 15/052,785, filed on Feb. 24, 2016, which is a Continuation-In-Part of U.S. application Ser. No. 14/833,035, filed Aug. 21, 2015, which claims the benefit of U.S. Provisional Patent Application Ser. No. 62/040,345, filed Aug. 21, 2014, and U.S. Provisional Patent Application Ser. No. 62/040,355, filed Aug. 21, 2014, and U.S. Provisional Patent Application Ser. No. 62/040,358, filed Aug. 21, 2014. U.S. application Ser. No. 15/052,785 is also a Continuation-In-Part of U.S. application Ser. No. 15/010,412, filed Jan. 29, 2016, which claims the benefit of U.S. Provisional Patent Application Ser. No. 62/109,456, filed Jan. 29, 2015, and U.S. Provisional Patent Application Ser. No. 62/185,304, filed Jun. 26, 2015.

This application is related to U.S. application Ser. No. 15/052,785, filed on Feb. 24, 2016.

BACKGROUND

People may have various preferences towards different types of foods. For example, some items on a menu may be tastier and more satisfying than others. Additionally, consuming some food can influence how a person feels (both while consuming the food and even hours afterwards). For example, some types of food can cause heartburn lasting well after the food is consumed. In another example, some people who eat chocolate may immediately feel happier (with this feeling possibly lasting eve hours later). Since different types of food may have different effects on users who consume them, it may be desirable to be able to determine which types of food have a better influence on users. Having such information may assist users in selecting which types of food to consume.

SUMMARY

Some aspects of embodiments described herein involve systems, methods, and/or computer-readable media that enable computation of various types of crowd-based results regarding experiences users may have in their day-to-day life. Some examples of experiences involve consuming food (e.g., food items, meals, beverages, and/or medicine). In some embodiments, the measurements of affective response of the users are collected with one or more sensors coupled to the users. Optionally, a sensor coupled to a user may be used to obtain a value that is indicative of a physiological signal of the user (e.g., a heart rate, skin temperature, or brainwave activity) and/or indicative of a behavioral cue of the user (e.g., a facial expression, body language, or the level of stress in the user's voice). In one example, a sensor coupled to a user is implanted in the body of the user. In another example, a sensor coupled to a user is embedded in a device used by a user which is in physical contact with the user. In yet another example, a sensor coupled to a user may be remote of the user (e.g., a camera taking images of the user). The measurements of affective response may be used to determine how users feel while or after consuming certain types of food. In one example, the measurements may be indicative of the extent the users feel one or more of the following emotions: pain, anxiety, annoyance, stress, aggression, aggravation, fear, sadness, drowsiness, apathy, anger, happiness, contentment, calmness, attentiveness, affection, and excitement.

Some aspects of embodiments described herein involve systems, methods, and/or computer-readable media that enable ranking of types of food based on measurements of affective response of users who consumed the types of food. Optionally, for each type of food being ranked, the measurements used to calculate the ranking include measurements of at least five users who consumed the type of food. Optionally, when a first type of food from among the types of food is ranked higher than a second type of food from among the types of food, on average, the at least five of the users who consumed the first type of food had a more positive affective response than the at least five of the users who consumed the second type of food.

Various embodiments described herein utilize systems whose architecture includes a plurality of sensors and a plurality of user interfaces. This architecture supports various forms of crowd-based recommendation systems in which users may receive information, such as suggestions and/or alerts, which are determined based on measurements of affective response of users who consumed food. In some embodiments, being crowd-based means that the measurements of affective response are taken from a plurality of users, such as at least three, ten, one hundred, or more users. In such embodiments, it is possible that the recipients of information generated from the measurements may not be the same people from whom the measurements were taken.

BRIEF DESCRIPTION OF THE DRAWINGS

The embodiments are herein described, by way of example only, with reference to the accompanying drawings. In the drawings:

FIG. 11 illustrates an example of an architecture that includes sensors and user interfaces that may be utilized to compute and report crowd-based results;

FIG. 12a illustrates a user and a sensor;

FIG. 12b illustrates a user and a user interface;

FIG. 12c illustrates a user, a sensor, and a user interface;

DETAILED DESCRIPTION

Figure 1A:
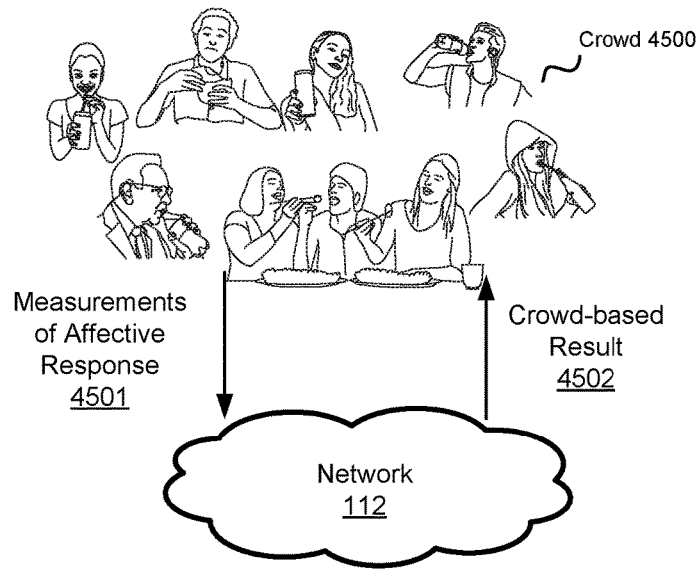
FIG. 1a illustrates a system architecture that includes sensors and user interfaces that may be utilized to compute and report a preference score for a certain type of food.

A measurement of affective response of a user is obtained by measuring a physiological signal of the user and/or a behavioral cue of the user. A measurement of affective response may include one or more raw values and/or processed values (e.g., resulting from filtration, calibration, and/or feature extraction). Measuring affective response may be done utilizing various existing, and/or yet to be invented, measurement devices such as sensors. Optionally, any device that takes a measurement of a physiological signal of a user and/or of a behavioral cue of a user may be considered a sensor. A sensor may be coupled to the body of a user in various ways. For example, a sensor may be a device that is implanted in the user's body, attached to the user's body, embedded in an item carried and/or worn by the user (e.g., a sensor may be embedded in a smartphone, smartwatch, and/or clothing), and/or remote from the user (e.g., a camera taking images of the user). Additional information regarding sensors may be found in this disclosure at least in section 1—Sensors.

Herein, "affect" and "affective response" refer to physiological and/or behavioral manifestation of an entity's emotional state. The manifestation of an entity's emotional state may be referred to herein as an "emotional response", and may be used interchangeably with the term "affective response". Affective response typically refers to values obtained from measurements and/or observations of an entity, while emotional states are typically predicted from models and/or reported by the entity feeling the emotions. For example, according to how terms are typically used herein, one might say that a person's emotional state may be determined based on measurements of the person's affective response. In addition, the terms "state" and "response", when used in phrases such as "emotional state" or "emotional response", may be used herein interchangeably. However, in the way the terms are typically used, the term "state" is used to designate a condition which a user is in, and the term "response" is used to describe an expression of the user due to the condition the user is in and/or due to a change in the condition the user is in.

It is to be noted that as used herein in this disclosure, a "measurement of affective response" may comprise one or more values describing a physiological signal and/or behavioral cue of a user which were obtained utilizing a sensor. Optionally, this data may be also referred to as a "raw" measurement of affective response. Thus, for example, a measurement of affective response may be represented by any type of value returned by a sensor, such as a heart rate, a brainwave pattern, an image of a facial expression, etc.

Additionally, as used herein, a "measurement of affective response" may refer to a product of processing of the one or more values describing a physiological signal and/or behavioral cue of a user (i.e., a product of the processing of the raw measurements data). The processing of the one or more values may involve one or more of the following operations: normalization, filtering, feature extraction, image processing, compression, encryption, and/or any other techniques described further in the disclosure and/or that are known in the art and may be applied to measurement data. Optionally, a measurement of affective response may be a value that describes an extent and/or quality of an affective response (e.g., a value indicating positive or negative affective response such as a level of happiness on a scale of 1 to 10, and/or any other value that may be derived from processing of the one or more values).

It is to be noted that since both raw data and processed data may be considered measurements of affective response, it is possible to derive a measurement of affective response (e.g., a result of processing raw measurement data) from another measurement of affective response (e.g., a raw value obtained from a sensor). Similarly, in some embodiments, a measurement of affective response may be derived from multiple measurements of affective response. For example, the measurement may be a result of processing of the multiple measurements.

In some embodiments, a measurement of affective response may be referred to as an "affective value" which, as used in this disclosure, is a value generated utilizing a module, function, estimator, and/or predictor based on an input comprising the one or more values describing a physiological signal and/or behavioral cue of a user, which are in either a raw or processed form, as described above. As such, in some embodiments, an affective value may be a value representing one or more measurements of affective response. Optionally, an affective value represents multiple measurements of affective response of a user taken over a period of time. An affective value may represent how the user felt while utilizing a product (e.g., based on multiple measurements taken over a period of an hour while using the product), or how the user felt during a vacation (e.g., the affective value is based on multiple measurements of affective response of the user taken over a week-long period during which the user was on the vacation).

In some embodiments, measurements of affective response of a user are primarily unsolicited, i.e., the user is not explicitly requested to initiate and/or participate in the process of measuring. Thus, measurements of affective response of a user may be considered passive in the sense that it is possible that the user will not be notified when the measurements are taken, and/or the user may not be aware that measurements are being taken. Additional discussion regarding measurements of affective response and affective values may be found in this disclosure at least in section 2—Measurements of Affective Response.

Embodiments described herein may involve computing a representative value from a plurality of measurements of affective response of one or more users who had an experience; such a value may be referred to herein as "a score for an experience", an "experience score", or simply a "score" for short. Optionally, when the score is derived from measurements of multiple users, it may be considered a "crowd-based score" and/or an "aggregate score". A score of a specific type, such as a score for a food may be referred herein as a "preference score".

When a score is derived from measurements of multiple users, the score may be considered a "crowd-based score" and/or an "aggregate score". When a score is computed for a certain user or a certain group of users, such that different users or different groups of users may receive scores with different values, the score may be referred to as a "personalized score", "personal score".

Herein, when it is stated that a score, ranking, and/or function parameters are computed based on measurements of affective response, it means that the score, ranking, and/or function parameters have their value set based on the measurements and possibly other measurements of affective response and/or other types of data. For example, a score computed based on a measurement of affective response may also be computed based on other data that is used to set the value of the score (e.g., a manual rating, data derived from semantic analysis of a communication, and/or a demographic statistic of a user). Additionally, computing the score may be based on a value computed from a previous measurement of the user (e.g., a baseline affective response value described further below).

Some of the experiences described in this disclosure involve something that happens to a user and/or that the user does, which may affect the physiological and/or emotional state of the user in a manner that may be detected by measuring the affective response of the user. In particular, some of the experiences described in this disclosure involve a user consuming food (which may involve consumption of one or more food or beverage items). Additional types of experiences that a user may have include: visiting a certain location (in the physical world or a virtual location), partaking in an activity (e.g., exercising or shopping), utilizing an electronic device, consuming a certain segment of digital content, and wearing an apparel item.

Each time a user has an experience (like consuming a food item), this may be considered an "event". Each event has a corresponding experience and a corresponding user (who had the corresponding experience). Additionally, an event may be referred to as being an "instantiation" of an experience and the time during which an instantiation of an event takes place may be referred to herein as the "instantiation period" of the event. That is, the instantiation period of an event is the period of time during which the user corresponding to the event had the experience corresponding to the event. Optionally, an event may have a corresponding measurement of affective response, which is a measurement of the corresponding user to having the corresponding experience (during the instantiation of the event or shortly after it). For example, a measurement of affective response of a user that corresponds to an experience that involves consuming a food item may be taken while the user eats the food item and/or shortly after that time. In some embodiments, when an experience involves eating food, measurements of affective response to the experience of eating the food may be taken even hours after the food is consumed (e.g., up to 12 hours after the consumption), to reflect effects digesting the food had on the user's physiology and/or emotional state. Further details regarding experiences and events may be found at least in sections 4—Events and 5—Identifying Events.

FIG. 1a illustrates a system architecture that includes sensors and user interfaces. The architecture illustrates systems in which measurements 4501 of affective response of users belonging to crowd 4500, who consumed food, may be utilized to generate crowd-based result 4502.

As used herein, the term "food" is used to describe anything that may be consumed orally utilizing the digestive system in the human body. Thus, as used herein, food includes items that a user may eat (e.g., an apple, a burrito, a slice of pizza, a bag of chips, a yogurt, a banana, or chewing gum), items that a user can drink (e.g., juice, soda, whiskey, etc.), and/or other types of orally consumed substances (e.g., a certain type of medicine). In addition, consuming a combination of food items, such as a certain meal, may also be considered a type of experience in which a user consumes food. Furthermore, a reference to "food" or "food item" in this disclosure, may also be considered a reference to a combination of food items. For example, a meal comprising a certain first course, a certain main course, and a certain beverage may be considered a food, e.g., for which a crowd based score may be computed.

As illustrated, the crowd 4500 includes various users (who consume food). In this illustration, the food that is consumed is of various types (including both edible items and beverages). This depiction of the crowd 4500 is not intended to limit the crowd 4500, which may include a different number of users (e.g., at least ten or more) who may consume various types of food or all consume a certain type of food.

A plurality of sensors may be used, in various embodiments described herein, to take the measurements 4501 of affective response of users belonging to the crowd 4500. Optionally, each measurement of a user is taken with a sensor coupled to the user, while the user consumes food. Additionally or alternatively, a measurements of affective response of a user who consumed food may be taken after the consumption of the food, e.g., up to twelve hours after the time of consumption. Optionally, a measurement of affective response of a user may represent an affective response of the user to consuming the food. Each sensor of the plurality of sensors may be a sensor that captures a physiological signal and/or a behavioral cue of a user. Additional details about the sensors may be found in this disclosure at least in section 1—Sensors. Additional discussion regarding the measurements 4501 is given below.

In some embodiments, the measurements 4501 of affective response may be transmitted via a network 112. Optionally, the measurements 4501 are sent to one or more servers that host modules belonging to one or more of the systems described in various embodiments in this disclosure (e.g., systems that compute scores for experiences, rank experiences, generate alerts for experiences, and/or learn parameters of functions that describe affective response).

Depending on the embodiment being considered, the crowd-based result 4502 may be one or more of various types of values that may be computed by systems described in this disclosure based on measurements of affective response of users in foods. For example, the crowd-based result 4502 may refer to a preference score for a certain type of food (e.g., preference score 4507), a recommendation regarding foods, and/or a ranking of types of food (e.g., ranking 4580). Additionally or alternatively, the crowd-based result 4502 may include, and/or be derived from, parameters of various functions learned from measurements (e.g., function parameters and/or aftereffect scores).

It is to be noted that all preference scores for food mentioned in this disclosure are types of scores for experiences. Thus, various properties of scores for experiences described in this disclosure (e.g., in sections 3—Experiences and 10—Scoring) are applicable to the various types of preference scores discussed herein. In some embodiments, a preference score for a type of food may be indicative of how much the food is tasty and/or enjoyable to consume (i.e., eat or drink).

A more comprehensive discussion of the architecture in FIG. 1a may be found in this disclosure at least in section 8—Crowd-Based Applications, e.g., in the discussion regarding FIG. 11. The discussion regarding FIG. 11 involves measurements 110 of affective response of a crowd 100 of users and generation of crowd-based results 115. The measurements 110 and results 115 involve experiences in general, which comprise food-related experiences. Thus, the teachings in this disclosure regarding the measurements 110 and/or the results 115 are applicable to measurements related to specific types of experiences (e.g., measurements 4501) and crowd-based results (e.g., the crowd-based result 4502).

Some embodiments described herein refer to a "type of food". A type of food may be used to describe one or more foods that share a certain characteristic, such as having the same ingredients, belonging to the same food group, being described as the same menu item, and/or being manufactured by the same company. When it is stated that a user consumed a certain type of food it means that the user consumed a food item of the certain type.

In some embodiments, food items may be considered to belong to a certain type based on certain classifications and/or properties. The following are some examples of classifications and/or properties that may be used in some embodiments to define types of food. In some embodiments, a type of food may be defined by a combination of two or more of the properties and/or classifications described below.

In one embodiment, a food item (or combination of food items) may be considered of a certain type if they it belongs to the same category according to a certain classification from among the following classifications: (i) preference food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

Thus, for example, in one embodiment, expensive organic pears may be considered a certain food type. In another example, vegan Mexican food may be considered a certain food type. In still another example, a certain item from a set menu (e.g., nuggets, fries, and a soda) may be considered a certain type of food.

In some embodiments, a certain type of food refers to a certain combination of ingredients and/or nutritional properties. In one example, any meal that involves consumption of 600-700 calories, involving 20-30 grams of fat, is a certain type of food. In another example, any dish in which pasta is the main ingredient (i.e., most of the weight and/or calories are attributed to the pasta), is considered a certain type of food.

Various embodiments described in this disclosure involve computation of crowd-based results based on (at least some of) the measurements 4501 of affective response. The measurements 4501 include measurements of affective response of users who consumed food. In some embodiments, at least some of the measurements 4501 are taken before the users begin to consume the food (e.g., some of the prior measurements mentioned below). In some embodiments, at least some of the measurements 4501 are taken while the users consume the food. In some embodiments, at least some of the measurements 4501 are taken after consuming the food (e.g., some of the subsequent measurements mentioned below). Measurements of affective response taken after consuming food may be taken up to four hours, or event up to twelve hours after consuming the food (to account for effects of digesting the food).

A measurement of affective response of a user who consumed food is taken with a sensor coupled to the user. Optionally, the measurement comprises at least one of the following values: a value representing a physiological signal of the user, and a value representing a behavioral cue of the user. Various types of sensors may be used, in embodiments described herein, to obtain a measurement of affective response of a user. Additional details regarding the types of sensors that may be of values that may be obtained by the sensors given at least in section 1—Sensors.

In embodiments described herein, a measurement of affective response of a user who consumes food may be based on multiple values acquired at different times while the user consumes the food or after that time. In one example, a measurement of affective response of a user is based on values acquired by a sensor coupled to the user, during at least three different non-overlapping periods while the user consumes the food. In another example, a measurement of affective response of a user is based on values acquired by a sensor coupled to the user, during at least three different non-overlapping periods that fall sometime between when the user started to consume the food and up to twelve hours after the user finished to consume the food. In another example, the user consumes the food for a duration longer than five minutes, and a measurement of the user is based on values acquired by a sensor coupled to the user during at least five different non-overlapping periods that are spread over the duration. Additionally, measurements of affective response of users may undergo various forms of normalization (e.g., with respect to a baseline) and other various forms of processing. Additional details regarding how measurements of affective response of users may be acquired, collected, and/or processed may be found in this disclosure at least in section 2—Measurements of Affective Response and 9—Collecting Measurements.

Crowd-based results in the embodiments described below typically involve a computation (e.g., of a score or a ranking) which is based on measurements of at least some minimal number of users, from among the measurements 4501, such as the measurements of at least ten users used to compute the preference score 4507. When a crowd-based result is referred to as being computed based on measurements of at least a certain number of users (e.g., measurements of at least ten users), in some embodiments, the crowd-based result may be computed based on measurements of a smaller number of users, such as measurements of at least five users. Additionally, in some embodiments, a crowd-based result that is referred to as being computed based on measurements of at least a certain number of users, from among the measurements 4501, may in fact be computed based on measurements of a significantly larger number of users. For example, the crowd-based result may be computed based measurements, from among the measurements 4501, of a larger number of users, such as measurements of at least 100 users, measurements of at least 1000 users, measurements of at least 10000 users, or more.

Figure 1B:
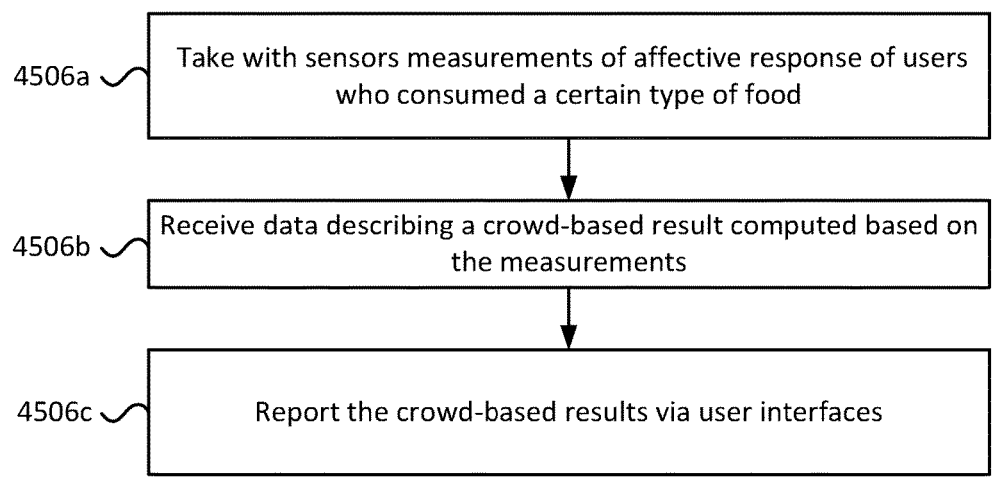
FIG. 1b illustrates steps involved in a method for reporting a preference score for a certain type of food.

FIG. 1b illustrates steps involved in one embodiment of a method for reporting the crowd-based result 4502, which in this embodiment is a preference score for a certain type of food, which is computed based on measurements of affective response of users. The steps illustrated in FIG. 1b may be used, in some embodiments, by systems modeled according to FIG. 1a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for reporting a preference score for a certain type of food, which is computed based on measurements of affective response, includes at least the following steps:

In step 4506a, taking measurements of affective response of at least ten users. Optionally, each measurement of a user is taken with a sensor coupled to the user, while the user consumes food of the certain type or up to twelve hours after the user consumed the food of the certain type.

In step 4506b, receiving data describing the preference score; the preference score is computed based on the measurements of the at least ten users and represents an affective response of the at least ten users to consuming food of the certain type. Optionally, the preference score is the preference score 4507.

And in step 4506c, reporting the preference score via user interfaces, e.g., as a recommendation (which is discussed in more detail further below).

In one embodiment, the method described above may include an optional step of receiving a profile of a certain user and profiles of at least some of the at least ten users, computing similarities between the profile of the certain user and a profile of each of the at least some of the at least ten users, weighting the measurements of the at least ten users based on the similarities, and utilizing the weights for computing the preference score.

In one embodiment, the method described above may include an optional step of receiving baseline affective response value for at least some of the at least ten users, measurements of affective response of the at least some of the at least ten users, and normalizing the measurements of the at least some of the at least ten users with respect to the baseline affective response values.

In one embodiment, the method described above includes an optional step of computing the preference score for the certain type of food. Optionally, the preference score for the certain type of food is computed utilizing the scoring module 150.

It is to be noted that in a similar fashion, the method described above may be utilized, mutatis mutandis, to report other types of crowd-based results described in this disclosure, which may be reported via user interfaces, and which are based on measurements of affective response of users who consumed food. For example, similar steps to the method described above may be utilized to report the ranking 4580.

Figure 2A:
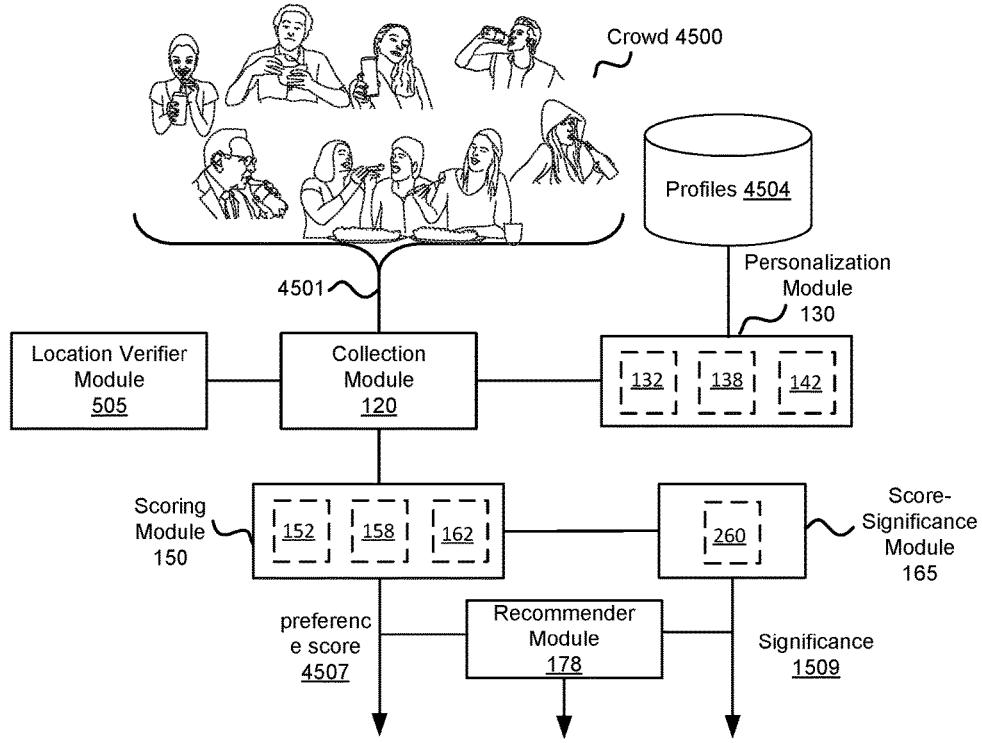
FIG. 2a illustrates a system configured to compute scores for experiences involving consuming food of a certain type based on measurements of affective response of users.

FIG. 2a illustrates a system configured to compute scores for experiences involving consuming food of a certain type, which may also be referred to herein as "preference scores". The system that computes a preference score includes at least a collection module (e.g., collection module 120) and a scoring module (e.g., the scoring module 150 or the aftereffect scoring module 302). Optionally, such a system may also include additional modules such as the personalization module 130, score-significance module 465, and/or recommender module 178. The illustrated system includes modules that may optionally be found in other embodiments described in this disclosure. This system, like other systems described in this disclosure, includes at least a memory 402 and a processor 401. The memory 402 stores computer executable modules described below, and the processor 401 executes the computer executable modules stored in the memory 402.

In one embodiment, the collection module 120 is configured to receive the measurements 4501, which in this embodiment include measurements of at least ten users. Optionally, each measurement of a user is taken with a sensor coupled to the user, while the user consumes food of the certain type. It is to be noted that a "food of the certain type" may be a food of any of the types of food mentioned in this disclosure (e.g., food items, snacks, meals form a menu, beverages, and medicine consumed orally, to name a few examples). Additionally, consuming food involves eating and/or drinking the food.

The collection module 120 is also configured, in some embodiments, to forward at least some of the measurements 4501 to the scoring module 150. Optionally, at least some of the measurements 4501 undergo processing before they are received by the scoring module 150. Optionally, at least some of the processing is performed via programs that may be considered software agents operating on behalf of the users who provided the measurements 4501. Additional information regarding the collection module 120 may be found in this disclosure at least in section 8—Crowd-Based Applications and 9—Collecting Measurements.

In addition to the measurements 4501, in some embodiments, the scoring module 150 may receive weights for the measurements 4501 of affective response and may utilize the weights to compute the preference score 4507. Optionally, the weights for the measurements 4501 are not all the same, such that the weights comprise first and second weights for first and second measurements from among the measurements 4501 and the first weight is different from the second weight. Weighting measurements may be done for various reasons, such as normalizing the contribution of various users, computing personalized preference scores, and/or normalizing measurements based on the time they were taken, as described elsewhere in this disclosure.

In one embodiment, the scoring module 150 is configured to receive the measurements of affective response of the at least ten users. The scoring module 150 is also configured to compute, based on the measurements of affective response of the at least ten users, a preference score 4507 that represents an affective response of the users to consuming the food of the certain type.

A scoring module, such as scoring module 150, may utilize one or more types of scoring approaches that may optionally involve one more other modules. In one example, the scoring module 150 utilizes modules that perform statistical tests on measurements in order to compute the preference score 4507, such as statistical test module 152 and/or statistical test module 158. In another example, the scoring module 150 utilizes arithmetic scorer 162 to compute the preference score 4507. Additional information regarding how the preference score 4507 may be computed may be found in this disclosure at least in sections 8—Crowd-Based Applications and 10—Scoring. It is to be noted that these sections, and other portions of this disclosure, describe scores for experiences (in general) such as score 164. The preference score 4507, which is a score for an experience that involves consuming food of a certain type, may be considered a specific example of the score 164. Thus, the teachings regarding the score 164 are also applicable to the preference score 4507.

A preference score, such as the preference score 4507, may include and/or represent various types of values. In one example, the preference score comprises a value representing how much users enjoyed consuming the food of the certain type. In another example, the preference score 4507 comprises a value that is at least one of the following types: a physiological signal, a behavioral cue, an emotional state, and an affective value. Optionally, the preference score comprises a value that is a function of measurements of at least ten users.

In one embodiment, a preference score, such as the preference score 4507, may be indicative of significance of a hypothesis that users who contributed measurements of affective response to the computation of the preference score had a certain affective response. Optionally, experiencing the certain affective response causes changes to values of at least one of measurements of physiological signals and measurements of behavioral cues, and wherein the changes to values correspond to an increase, of at least a certain extent, in a level of at least one of the following emotions: pain, anxiety, annoyance, stress, aggression, aggravation, fear, sadness, drowsiness, apathy, anger, happiness, contentment, calmness, attentiveness, affection, and excitement. Optionally, detecting the increase, of at least the certain extent, in the level of at least one of the emotions is done utilizing an ESE.

It is to be noted that affective response related to consuming food of a certain type may relate to various aspects of the food (e.g., flavor, scent, texture, and how it looks), as well as the environment in which it is consumed (e.g., a restaurant's ambiance, cleanliness, etc.)

In some embodiments, consuming food of a certain type may involve consuming a certain amount of the food (e.g., a certain weight or volume). Thus, for example, in some embodiments, drinking a 12 oz. soda may be a different experience than drinking a 24 oz. soda. In another example, eating a six inch sandwich is a different experience than eating a foot long sandwich. Optionally, the amount of food that is consumed may be normalized with respect to the body weight of the user who consumes the food. Thus, for example, when a person that weighs 200 lb. drinks a pint, that may not be considered, in some embodiments, the same experience as when a 100 lb. person drinks the same pint.

In one embodiment, the at least ten users whose measurements are used to compute a preference score all consumed similar amounts of food (e.g., the smallest amount consumed by one of the at least ten users as at most half of the largest amount consumed by one of the at least ten users). In another embodiment, the at least ten users whose measurements are used to compute a preference score all consumed similar amounts of food when the amounts are normalized with respect to the user's body weight. Optionally, the smallest normalized amount consumed by one of the at least ten users as at most half of the largest normalized amount consumed by one of the at least ten users.

Preference scores may be computed for a specific group of people by utilizing measurements of affective response of users belonging to the specific group. There may be various criteria that may be used to compute a group-specific score such as demographic characteristics (e.g., age, gender, income, religion, occupation, etc.) Optionally, obtaining the measurements of the group-specific preference score may be done utilizing the personalization module 130 and/or modules that may be included in it such as drill-down module 142, as discussed in further detail in this disclosure at least in section 11—Personalization.

Systems modeled according to FIG. 2a may optionally include various modules, as discussed in more detail in Section 8—Crowd-Based Applications. Following are examples of such modules.

In one embodiment, a score, such as the preference score 4507, may be a score personalized for a certain user. In one example, the personalization module 130 is configured to receive a profile of the certain user and profiles of other users, and to generate an output indicative of similarities between the profile of the certain user and the profiles of the other users. Additionally, in this example, the scoring module 150 is configured to compute the preference score 4507 for the certain user based on the measurements and the output. Computing personalized preference scores involves computing different preference scores for at least some users. Thus, for example, for at least a certain first user and a certain second user, who have different profiles, the scoring module 150 computes respective first and second preference scores that are different. Additional information regarding the personalization module may be found in this disclosure at least in section 11—Personalization and in the discussion involving FIG. 3.

In another embodiment, the preference score 4507 may be provided to the recommender module 178, which may utilize the preference score 4507 to generate recommendation 4508, which may be provided to a user (e.g., by presenting an indication regarding the certain type of food on a user interface used by the user). Optionally, the recommender module 178 is configured to recommend the certain type of food to which the preference score 4507 corresponds, based on the value of the preference score 4507, in a manner that belongs to a set comprising first and second manners, as described in section 8—Crowd-Based Applications. Optionally, when the preference score 4507 reaches a threshold, the certain type is recommended in the first manner, and when the preference score 4507 does not reach the threshold, the certain type is recommended in the second manner, which involves a weaker recommendation than a recommendation given when recommending in the first manner.

Recommending a certain type of food, such as the recommendation 4508 discussed above may involve different types of recommendations. In some embodiments, the recommendation of the certain type of food involves providing an indication of the certain type. For example, the recommendation may be along the lines of "Buy that sub sandwich" or "order beverage X with your meal". In other embodiments, the recommendation may indicate where to get a food item of the certain type, e.g., show a location on a map or present a webpage where an order can be made. In still other embodiments, a recommendation may involve placing an order for the food. Optionally, confirmation of the order is sought prior to making the order.

In still another embodiment, significance of a score, such as the preference score 4507, may be computed by the score-significance module 465. Optionally, significance of a score, such as the significance 4509 of the preference score 4507, may represent various types of values derived from statistical tests, such as p-values, q-values, and false discovery rates (FDRs). Additionally or alternatively, significance may be expressed as ranges, error-bars, and/or confidence intervals. As explained in more detail in section 8—Crowd-Based Applications with reference to significance 176 and in section 16—Determining Significance of Results, computing the significance 4509 may be done in various ways. In one example, the significance 4509 may be based on the number of users who contributed to measurements used to compute a result such as the preference score 4507. In another example, determining the significance 4509 by the score-significance module 465 may be done based on distribution parameters of scores, which are derived from previously observed preference scores. In yet another example, the significance 4509 may be computed utilizing statistical test (e.g., a t-test or a non-parametric test) that may be used to compute a p-value for the preference score 4507.

Figure 2B:
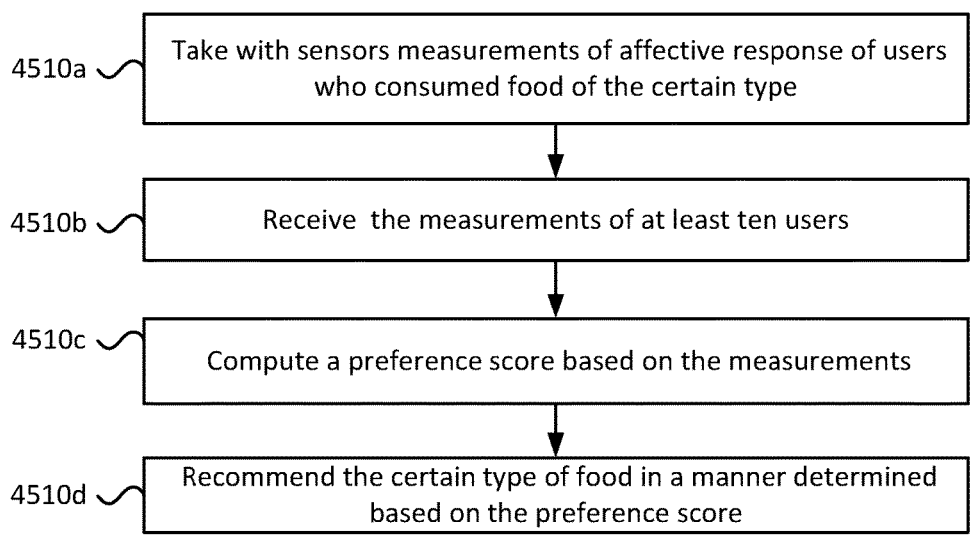
FIG. 2b illustrates steps involved in a method for computing a preference score for a certain type of food based on measurements of affective response of users.

FIG. 2b illustrates steps involved in one embodiment of a method for computing a preference score for a certain type of food based on measurements of affective response of users. The steps illustrated in FIG. 2b may be, in some embodiments, performed by systems modeled according to FIG. 2a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for computing a preference score for a certain type of food based on measurements of affective response of users includes at least the following steps:

In step 4510b, receiving, by a system comprising a processor and memory, measurements of affective response of at least ten users; each measurement of a user is taken with a sensor coupled to the user, while the user consumes food of the certain type and/or up to four or even twelve hours after consuming the food. Optionally, the measurements are the measurements 4501. Optionally, the measurements are received by the collection module 120.

And in step 4510c, computing, by the system, the preference score for the certain type of food based on the measurements received in Step 4510b. Optionally, the preference score represents the affective response of the at least ten users to consuming food of the certain type. Optionally, the preference score is computed by the scoring module 150.

In one embodiment, the method described above may optionally include step 4510a, which comprises taking the measurements of the at least ten users with sensors; each sensor is coupled to a user, and a measurement of a sensor coupled to a user comprises at least one of the following values: a measurement of a physiological signal of the user, and a measurement of a behavioral cue of the user.

In one embodiment, the method described above may optionally include step 4510d, which comprises recommending, based on the preference score, the certain type of food to a user in a manner that belongs to a set comprising first and second manners. Optionally, recommending the certain type of food in the first manner involves a stronger recommendation for the certain type of food, compared to a recommendation for the certain type of food involved when recommending in the second manner.

The crowd-based results generated in some embodiments described in this disclosure may be personalized results.

That is, the same set of measurements of affective response may be used to generate, for different users, scores, rankings, alerts, and/or function parameters that are different. The personalization module 130 is utilized in order to generate personalized crowd-based results in some embodiments described in this disclosure. Depending on the embodiment, personalization module 130 may have different components and/or different types of interactions with other system modules, such as scoring modules, ranking modules, function learning modules, etc.

In one embodiment, a system, such as illustrated in FIG. 2a, is configured to utilize profiles of users to compute personalized preference scores for foods of a certain type based on measurements of affective response of users. The system includes at least the following computer executable modules: the collection module 120, the personalization module 130, and the scoring module 150. Optionally, the system also includes recommender module 178.

The collection module 120 is configured to receive measurements of affective response 4501, which in this embodiment comprise measurements of at least ten users; each measurement of a user is taken with a sensor coupled to the user, while the user consumes food of the certain type and/or up to four or even twelve hours after consuming the food.

The personalization module 130 is configured, in one embodiment, to receive a profile of a certain user and profiles 4504 of the at least ten users, and to generate an output indicative of similarities between the profile of the certain user and the profiles of the at least ten users. The scoring module 150 is configured, in this embodiment, to compute a preference score personalized for the certain user based on the measurements and the output.

The personalized preference scores that are computed are not necessarily the same for all users. By providing the scoring module 150 with outputs indicative of different selections and/or weightings of measurements from among the measurements 4501, it is possible that the scoring module 150 may compute different scores corresponding to the different selections and/or weightings of the measurements 4501. That is, for at least a certain first user and a certain second user, who have different profiles, the scoring module 150 computes respective first and second preference scores that are different. Optionally, the first preference score is computed based on at least one measurement that is not utilized for computing the second preference score. Optionally, a measurement utilized to compute both the first and second preference scores has a first weight when utilized to compute the first preference score and the measurement has a second weight, different from the first weight, when utilized to compute the second preference score.

In one embodiment, the system described above may include the recommender module 178 and responsive to the first preference score being greater than the second preference score, a food of the certain type is recommended to the certain first user in a first manner and the food of the certain type is recommended to the certain second user in a second manner. Optionally, a recommendation provided by the recommender module 178 in the first manner is stronger than a recommendation provided in the second manner, as explained in more detail in section 8—Crowd-Based Applications.

It is to be noted that profiles of users belonging to the crowd 4500 are typically designated by the reference numeral 4504. This is not intended to mean that in all embodiments all the profiles of the users belonging to the crowd 4500 are the same, rather, that the profiles 4504 are profiles of users from the crowd 4500, and hence may include any information described in this disclosure as possibly being included in a profile. Thus, using the reference numeral 4504 for profiles signals that these profiles are for users who have a food-related experience which may involve any food (or type of food) described in this disclosure. The profiles 4504 may be assumed to be a subset of profiles 128 discussed in more detail in section 11—Personalization. Thus, all teachings in this disclosure related to the profiles 128 are also applicable to the profiles 4504 (and vice versa).

A profile of a user, such as one of the profiles 4504, may include various forms of information regarding the user. In one example, the profile includes demographic data about the user, such as age, gender, income, address, occupation, religious affiliation, political affiliation, hobbies, memberships in clubs and/or associations, and/or other attributes of the like. In another example, the profile includes information related to the user's preferences regarding food, such as an indication of the preferred dietary choices (e.g., vegetarian, vegan, low-carb, etc.), sensitivity to certain food substances, known food allergies, and preferences regarding certain brands and/or restaurants. In another example, the profile includes information related to experiences the user had (such as locations the user visited, activities the user participated in, etc.) In yet another example, a profile of a user may include medical information about the user. The medical information may include data about properties such as age, weight, diagnosed medical conditions, and/or genetic information about a user. And in yet another example, a profile of a user may include information derived from content the user consumed and/or produced (e.g., movies, games, and/or communications). A more comprehensive discussion about profiles, what they may contain, and how they may be compared may be found in section 11—Personalization.

There are various implementations that may be utilized in embodiments described herein for the personalization module 130. Following is a brief overview of different implementations for the personalization module 130. Personalization is discussed in further detail at least in section 11—Personalization in this disclosure, were various possibilities for personalizing results are discussed. The examples of personalization in that section are given by describing an exemplary system for computing personalized scores for experiences. However, the teachings regarding how the different types of components of the personalization module 130 operate and influence the generation of crowd-based results are applicable to other modules, systems, and embodiments described in this disclosure. And in particular, those teachings are relevant to generating crowd-based results for experiences involving consuming food.

In one embodiment, the personalization module 130 may utilize profile-based personalizer 132, which is implemented utilizing profile comparator 133 and weighting module 135. Optionally, the profile comparator 133 is configured to compute a value indicative of an extent of a similarity between a pair of profiles of users. Optionally, the weighting module 135 is configured to receive a profile of a certain user and the at least some of the profiles 4504, which comprise profiles of the at least ten users, and to generate, utilizing the profile comparator 133, an output that is indicative of weights for the measurements of the at least ten users. Optionally, the weight for a measurement of a user, from among the at least ten users, is proportional to a similarity computed by the profile comparator 133 between a pair of profiles that includes the profile of the user and the profile of the certain user, such that a weight generated for a measurement of a user whose profile is more similar to the profile of the certain user is higher than a weight generated for a measurement of a user whose profile is less similar to the profile of the certain user. Additional information regarding profile-based personalizer 132, and how it may be utilized to compute personalized preference scores, is given in the discussion regarding FIG. 20.

In another embodiment, the personalization module 130 may utilize clustering-based personalizer 138, which is implemented utilizing clustering module 139 and selector module 141. Optionally, the clustering module 139 is configured to receive the profiles 4504 of the at least ten users, and to cluster the at least ten users into clusters based on profile similarity, with each cluster comprising a single user or multiple users with similar profiles. Optionally, the clustering module 139 may utilize the profile comparator 133 in order to determine the similarity between profiles. Optionally, the selector module 141 is configured to receive a profile of a certain user, and based on the profile, to select a subset comprising at most half of the clusters of users. Optionally, the selection of the subset is such that, on average, the profile of the certain user is more similar to a profile of a user who is a member of a cluster in the subset, than it is to a profile of a user, from among the at least ten users, who is not a member of any of the clusters in the subset. Additionally, the selector module 141 may also be configured to select at least eight users from among the users belonging to clusters in the subset. Optionally, the selector module 141 generates an output that is indicative of a selection of the at least eight users. Additional information regarding clustering-based personalizer 138, and how it may be utilized to compute personalized preference scores, is given in the discussion regarding FIG. 21.

In still another embodiment, the personalization module 130 may utilize, the drill-down module 142, which may serve as a filtering layer that may be part of the collection module 120 or situated after it. Optionally, the drill-down module 142 receives an attribute and/or a profile of a certain user, and filters and/or weights the measurements of the at least ten users according to the attribute and/or the profile in different ways. In one example, an output produced by the drill-down module 142 includes information indicative of a selection of measurements of affective response from among the measurements 4501 and/or a selection of users from among the user belonging to the crowd 4500. Optionally, the selection includes information indicative of at least four users whose measurements may be used by the scoring module 150 to compute the preference score. Additional information regarding the drill-down module 142, and how it may be utilized to compute personalized preference scores, is given in the discussion regarding FIG. 22.

Figure 3:
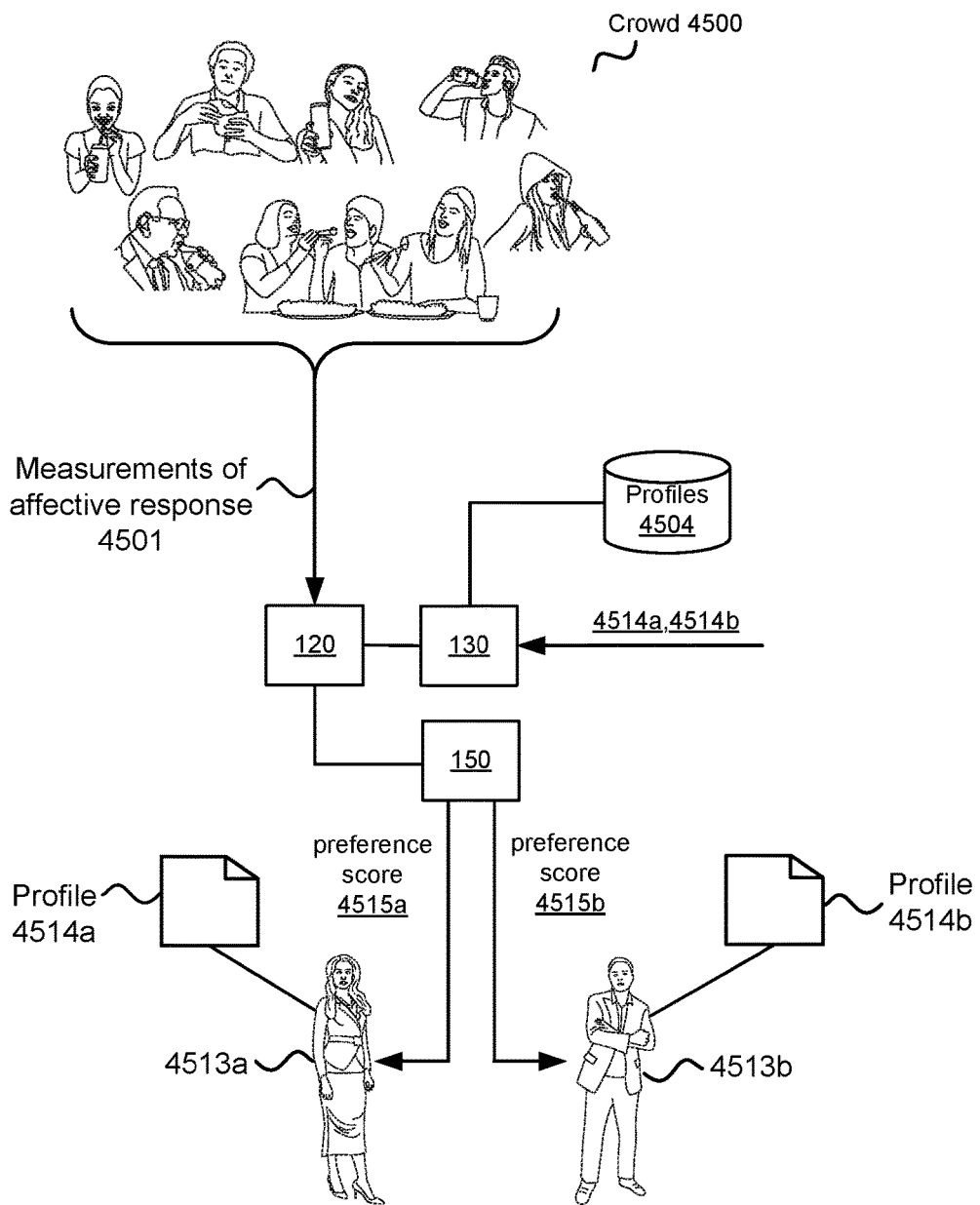
FIG. 3 illustrates a system in which users with different profiles may have different preference scores computed for a certain type of food.

FIG. 3 illustrates a system in which users with different profiles may have different preference scores computed for them. The system is modeled according to the system illustrated in FIG. 2a, and may optionally include other modules discussed with reference to FIG. 2a, such as the recommender module 178, and/or score-significance module 465, which are not depicted in FIG. 3. In this embodiment, the users (denoted crowd 4500) consume food of a certain type, which may be any one of the types of food described in this disclosure. The users in the crowd 4500 contribute the measurements 4501 of affective response, which in this embodiment, comprise measurements of at least ten users, taken while they were consuming food of the certain type and/or up to twelve hours after consuming the food.

Generation of personalized results in this embodiment means that for at least a first user 4513a and a second user 4513b, who have different profiles 4514a and 4514b, respectively, the system computes different preference scores based on the same set of measurements received by the collection module 120. In this embodiment, the preference score 4515a computed for the first user 4513a is different from the preference score 4515b computed for the second user 4513b. The system is able to compute different preference scores by having the personalization module 130 receive different profiles (4514a and 4514b), and it compares them to the profiles 4504 utilizing one of the personalization mechanisms described above (e.g., utilizing the profile-based personalizer 132, the clustering-based personalizer 138, and/or the drill-down module 142).

In one example, the profile 4514a indicates that the first user 4513a is a male 20-40 years old who weighs 200-300 lb., and the profile 4514b of the certain second user 4513b indicates that the certain second user is a woman 50-70 years old who weighs 100-170 lb. In this example, and the difference between the first preference score 4515a and second preference score 4515b is above 10%. For example, for the certain first user 4513a, consuming food of the certain type may receive a preference score of 7 (on a scale from 1 to 10); however, for the certain second user 4513b consuming food of the same certain type may receive a preference score of 8, on the same scale.

Figure 4:
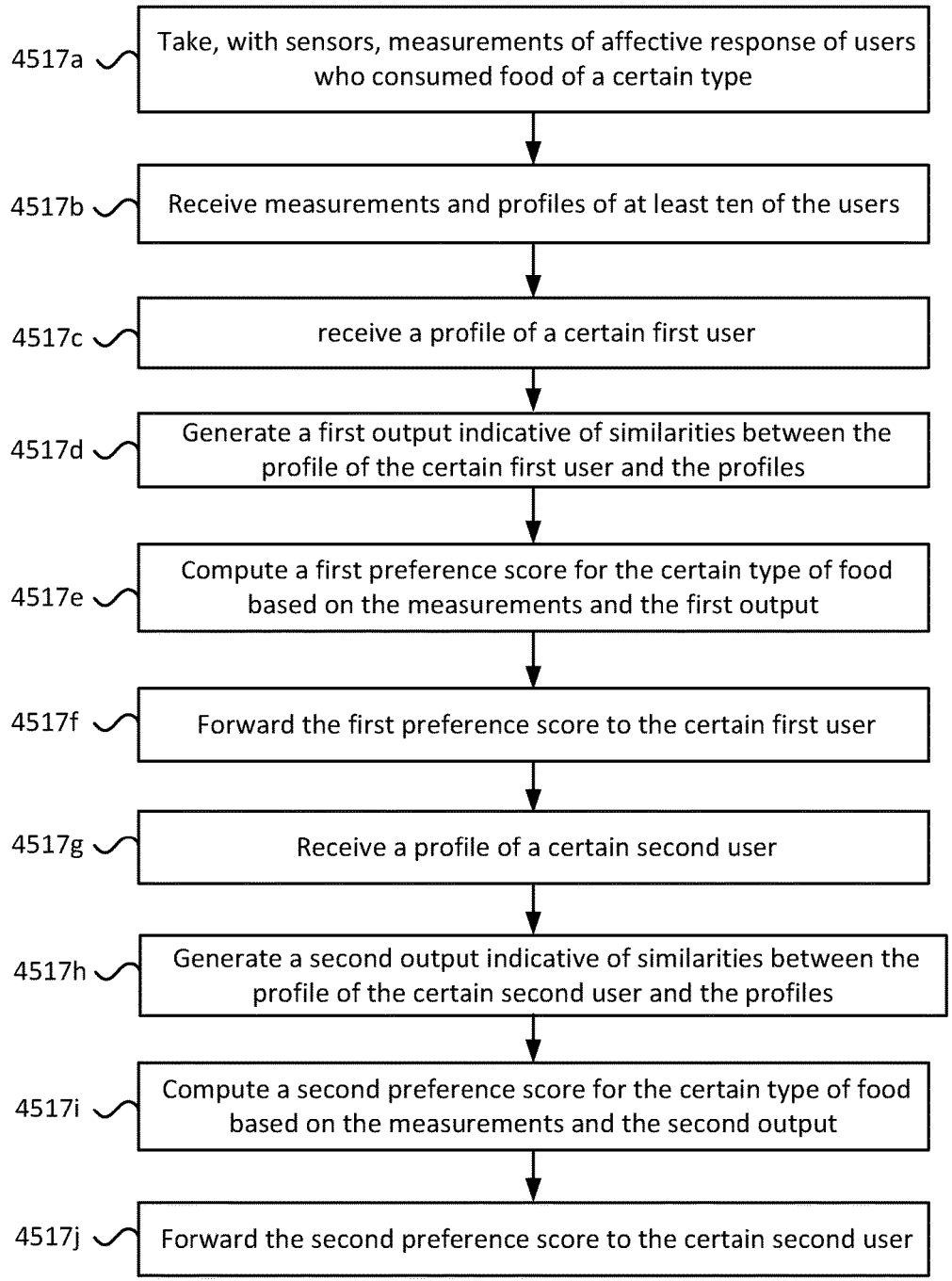
FIG. 4 illustrates steps involved in a method for utilizing profiles of users for computing personalized preference scores for a certain type of food, based on measurements of affective response of the users.

As discussed above, when personalization is introduced, having different profiles can lead to it that users receive different crowd-based results computed for them, based on the same measurements of affective response. This process is illustrated in FIG. 4, which describes how steps carried out for computing crowd-based results can lead to different users receiving the different crowd-based results. The steps illustrated in FIG. 4 may, in some embodiments, be part of the steps performed by systems modeled according to FIG. 3. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for utilizing profiles of users for computing personalized preference scores for a certain type of food, based on measurements of affective response of the users, includes the following steps:

In step 4517b, receiving, by a system comprising a processor and memory, measurements of affective response of at least ten users. Optionally, each measurement of a user is taken with a sensor coupled to the user, while the user consumes food of the certain type and/or up to four, or even twelve, hours after consuming the food. Optionally, the measurements received are the measurement 4501. Optionally, the measurements received in this step are received by the collection module 120.

In step 4517c, receiving a profile of a certain first user (e.g., the profile 4514a of the user 4513a).

In step 4517d, generating a first output indicative of similarities between the profile of the certain first user and the profiles of the at least ten users.

In step 4517e, computing, based on the measurements received in Step 4517b and the first output, a first preference score for consuming food of the certain type. Optionally, the first preference score is computed by the scoring module 150.

In step 4517g, receiving a profile of a certain second user (e.g., the profile 4514b of the user 4513b).

In step 4517h, generating a second output indicative of similarities between the profile of the certain second user and the profiles of the at least ten users. Optionally, the second output is different from the first output.

And in step 4517i, computing, based on the measurements received in Step 4517b and the second output, a second preference score for consuming food of the certain type. Optionally, the second preference score is computed by the scoring module 150. Optionally, the first preference score is different from the second preference score. For example, there is at least a 10% difference in the values of the first and second preference scores. Optionally, computing the first preference score involves utilizing at least one measurement that is not utilized for computing the second preference score.

In one embodiment, the method described above may optionally include an additional step 4517a that involves utilizing sensors for taking the measurements of the at least ten users. Optionally, each sensor is coupled to a user, and a measurement of a sensor coupled to a user comprises at least one of the following: a value representing a physiological signal of the user, and a value representing a behavioral cue of the user.

In one embodiment, the method described above may optionally include additional steps such as step 4517f that involves forwarding the first preference score to the certain first user and/or step 4517j that involves forwarding the second preference score to the certain second user. In some embodiments, forwarding a score, such as a preference score that is forwarded to a user, may involve sending the user a message that contains an indication of the score (e.g., the score itself and/or content such as a recommendation that is based on the score). Optionally, sending the message may be done by providing information that may be accessed by the user via a user interface (e.g., reading a message or receiving an indication on a screen). Optionally, sending the message may involve providing information indicative of the score to a software agent operating on behalf of the user.

In one embodiment, computing the first and second preference scores involves weighting of the measurements of the at least ten users. Optionally, the method described above involves a step of weighting a measurement utilized to compute both the first and second preference scores with a first weight when utilized to compute the first preference score and with a second weight, different from the first weight, when utilized to compute the second preference score.

Generating the first and second outputs may be done in various ways, as described above. The different personalization methods may involve different steps that are to be performed in the method described above, as described in the following examples.

In one example, generating the first output in Step 4517d comprises the following steps: computing a first set of similarities between the profile of the certain first user and the profiles of the at least ten users, and computing, based on the first set of similarities, a first set of weights for the measurements of the at least ten users. Optionally, each weight for a measurement of a user is proportional to the extent of a similarity between the profile of the certain first user and the profile of the user, such that a weight generated for a measurement of a user whose profile is more similar to the profile of the certain first user is higher than a weight generated for a measurement of a user whose profile is less similar to the profile of the certain first user. In this example, the first output may be indicative of the values of the first set of weights.

In another embodiment, generating the first output in Step 4517d comprises the following steps: (i) clustering the at least ten users into clusters based on similarities between the profiles of the at least ten users, with each cluster comprising a single user or multiple users with similar profiles; (ii) selecting, based on the profile of the certain first user, a subset of clusters comprising at least one cluster and at most half of the clusters; where, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. In this example, the first output may be indicative of the identities of the at least eight users. It is to be noted that instead of selecting at least eight users, a different minimal number of users may be selected such as at least five, at least ten, and/or at least fifty different users.

The values of the first and second preference scores can lead to different behaviors regarding how their values are treated. In one embodiment, the first preference score may be greater than the second preference score, and the method described above may optionally include steps involving recommending the certain type of food differently to different users based on the values of the first and second preference scores. For example, the method may include steps comprising recommending the certain type of food to the certain first user in a first manner and recommending the certain type of food to the certain second user in a second manner. Optionally, recommending a type of food in the first manner comprises providing stronger recommendation for the certain type of food, compared to a recommendation provided when recommending the type of food in the second manner.

In one embodiment, the first preference score reaches a certain threshold, while the second preference score does not reach the certain threshold. Responsive to the first preference score reaching the certain threshold, the certain type of food is recommended to the certain first user (e.g., by providing an indication on a user interface of the certain first user). Additionally, responsive to the second preference score not reaching the certain threshold, the certain type of food is not recommended to the certain second user (e.g., by not providing, on a user interface of the certain second user, a similar indication to the one on the user interface of the certain first user). Optionally, the recommendation for the certain first user is done utilizing the map-displaying module 240, and comprises providing an indication of the first preference score near a representation of a location at which a food of the certain type may be found (e.g., a restaurant). Further details regarding the difference in manners of recommendation may be found in the discussion regarding recommender module 178 in section 8—Crowd-Based Applications.

Some aspects of embodiments described herein involve systems, methods, and/or computer-readable media that enable ranking various types of food based on measurements of affective response of users who consumed food of the various types. Such rankings can help a user to decide which food to consume, and which foods should be avoided. A ranking of types of food is an ordering of at least some of the types of food, which is indicative of preferences of users towards foods of those types (e.g., which food is tastier and/or more enjoyable to eat). Typically, a ranking of types of food that is generated in embodiments described herein will include at least a first type of food and a second type of food, such that the first type of food is ranked ahead of the second type of food. When the first type of food is ranked ahead of the second type of food, this typically means that, based on the measurements of affective response of the users, the first type of food is preferred by the users over the second type of food.

Differences between people can naturally lead to it that they will have different tastes and different preferences when it comes to foods. Thus, a ranking of types of food may represent, in some embodiments, an average of the experience users had when consuming different types of food, which may reflect an average of the taste of various users. However, for some users, such a ranking of types of food may not be suitable, since those users, or their taste in foods, may be different from the average. In such cases, users may benefit from a ranking of types of food that is better suited for them. To this end, some aspects of this disclosure involve systems, methods and/or computer-readable media for generating personalized rankings of types of food based on measurements of affective response of users. Some of these embodiments may utilize a personalization module that weights and/or selects measurements of affective response of users based on similarities between a profile of a certain user (for whom a ranking is personalized) and the profiles of the users (of whom the measurements are taken). An output indicative of these similarities may then be utilized to compute a personalized ranking of the types of food that is suitable for the certain user. Optionally, computing the personalized ranking is done by giving a larger influence, on the ranking, to measurements of users whose profiles are more similar to the profile of the certain user.

One type of crowd-based result that is generated in some embodiments in this disclosure involves ranking of experiences. In particular, some embodiments involve ranking of experiences that involve consuming food of various types. The ranking is an ordering of at least some of the types of food, which is indicative of preferences of the users towards those types of food and/or is indicative of the degree to which the users enjoyed consuming those types of food.

Various aspects of systems, methods, and/or computer-readable media that involve ranking experiences are described in more detail at least in section 14—Ranking Experiences. That section discusses teachings regarding ranking of experiences in general, which include experiences involving consuming food of various types. Thus, the teachings of section 14—Ranking Experiences are also applicable to embodiments described below that explicitly involve foods. Following is a discussion regarding some aspects of systems, methods, and/or computer-readable media that may be utilized to rank types of food.

Figure 5:
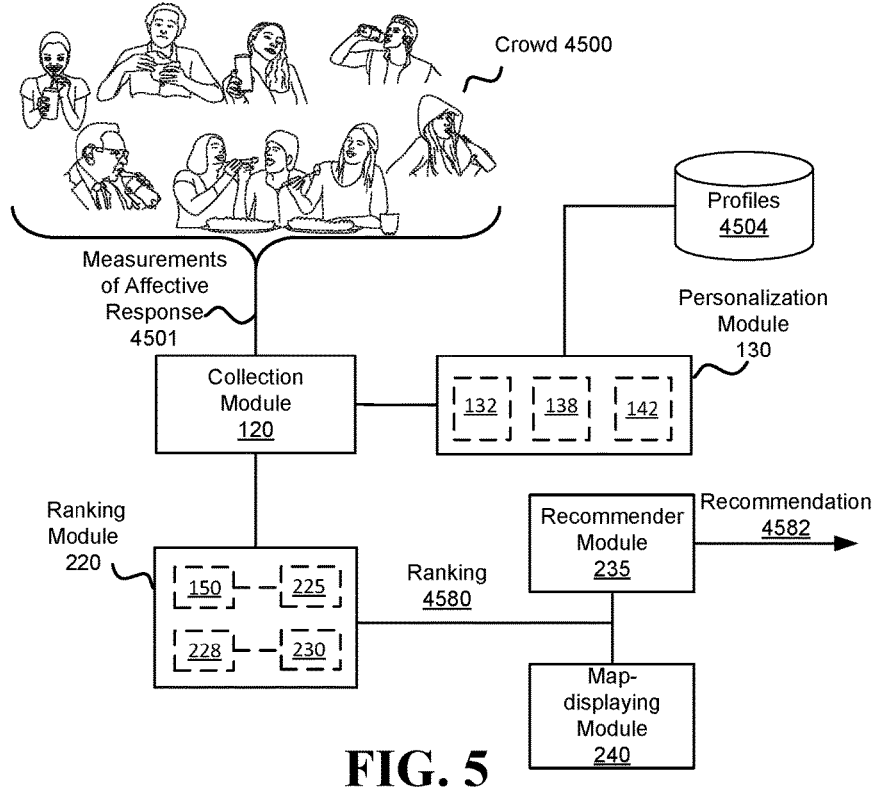
FIG. 5 illustrates a system configured to rank types of foods based on measurements of affective response of users.

FIG. 5 illustrates a system configured to rank types of food based on measurements of affective response of users. The system includes at least the collection module 120 and the ranking module 220. This system, like other systems described in this disclosure, may be realized via a computer, such as the computer 400, which includes at least a memory 402 and a processor 401. The memory 402 stores computer executable modules described below, and the processor 401 executes the computer executable modules stored in the memory 402.

The collection module 120 is configured, in one embodiment, to receive measurements 4501 of affective response of users belonging to the crowd 4500. Optionally, the measurements 4501 include, in this embodiment, measurements of at least five users who consumed food of a first type and measurements of at least five users who consumed food of a second type. Optionally, each measurement of a user is taken with a sensor coupled to the user while the user consumes food that is of a type from among the types of food (which include the first and second types and possibly other types of food). Additionally or alternatively, some of the measurements may be taken after the food is consumed, such as up to four hours, or even up to twelve hours, after the food is consumed. The collection module 120 is also configured, in this embodiment, to forward at least some of the measurements 4501 to the ranking module 220. Optionally, at least some of the measurements 4501 undergo processing before they are received by the ranking module 220. Optionally, at least some of the processing is performed via programs that may be considered software agents operating on behalf of the users who provided the measurements 4501.

As discussed above, embodiments described herein may involve various types of food, and which foods that are considered to be of the same type may vary between embodiments. In one embodiment, the first and second types of food mentioned above correspond to first and second classifications of foods (from among the various classifications of foods described in this disclosure).

In one embodiment, measurements received by the ranking module 220 include measurements of affective response of users who consumed food from among the types of food being ranked. Optionally, for each type of food being ranked, the measurements received by the ranking module 220 include measurements of affective response of at least five user who consumed food of the type. Optionally, for each type of food being ranked, the measurements received by the ranking module 220 may include measurements of a different minimal number of users, such as measurements of at least eight, at least ten, or at least one hundred users. The ranking module 220 is configured to generate the ranking 4580 of the types of food based on the received measurements. Optionally, in the ranking 4580, the first type of food is ranked higher than the second type of food.

When the first type of food is ranked higher than the second type of food, it may mean different things in different embodiments. In some embodiments, the ranking of the types of food is based on a positive trait, such as ranking based on how much people enjoy eating the food, how tasty the food is, how well they feel after consuming the food, etc. Thus, on average, the measurements of the at least five users who consumed food of the first type are expected to be more positive than the measurements of the at least five users who consumed food of the second type. However, in other embodiments, the ranking may be based on a negative trait; thus, on average, the measurements of the at least five users who consumed food of the first type are expected to be more negative than the measurements of the at least five users who consumed food of the second type.

In some embodiments, in the ranking 4580, each type of food from among the types of food has its own rank, i.e., there are no two types of food that share the same rank. In other embodiments, at least some of the types of food may be tied in the ranking 4580. In particular, there may be third and fourth types of food, from among the types of food being ranked, that are given the same rank by the ranking module 220. It is to be noted that the third type of food in the example above may be the same type of food as the first type of food or the second type of food mentioned above.

It is to be noted that while it is possible, in some embodiments, for the measurements received by modules, such as the ranking module 220, to include, for each user from among the users who contributed to the measurements, at least one measurement of affective response of the user, corresponding to a consumption of each of the types of food being ranked, this is not the case in all embodiments. In some embodiments, some users may contribute measurements corresponding to a proper subset of the types of food being ranked (e.g., those users may not have consumed some of the types of food being ranked), and thus, the measurements 4501 may be lacking measurements of some users which correspond to some types of food. In some embodiments, some users might have consumed only one type of food from among the types of food being ranked.

There are different approaches to ranking types of food, which may be utilized in embodiments described herein. In some embodiments, types of food may be ranked based on preference scores computed for the types of food. In such embodiments, the ranking module 220 may include the scoring module 150 and the score-based rank determining module 225. In other embodiments, types of food may be ranked based on preferences generated from measurements of affective response. In such embodiments, an alternative embodiment of the ranking module 220 includes preference generator module 228 and preference-based rank determining module 230. The different approaches that may be utilized for ranking types of food are discussed in more detail in section 14—Ranking Experiences, e.g., in the discussion related to FIG. 36 and FIG. 37 (which involve ranking experiences in general, which include experiences involving consuming food).

In some embodiments, the personalization module 130 may be utilized in order to personalize rankings of types of food for certain users. Optionally, this may be done utilizing the output generated by the personalization module 130 after being given a profile of a certain user and profiles of at least some of the users who provided measurements that are used to rank the types of food (e.g., profiles from among the profiles 4504). Optionally, when generating personalized rankings of types of food, there are at least a certain first user and a certain second user, who have different profiles, for which the ranking module 220 ranks types of food differently. For example, for the certain first user, the first type of food may be ranked above the second type of food, and for the certain second user, the second type of food is ranked above the first type of food. The way in which, in the different approaches to ranking, an output from the personalization module 130 may be utilized to generate personalized rankings for different users, is discussed in more detail in section 14—Ranking Experiences (which discusses ranking of experiences in general, which include experiences involving consuming food).

In some embodiments, the recommender module 235 is utilized to recommend a type of food to a user, from among the types of food ranked by the ranking module 220, in a manner that belongs to a set comprising first and second manners. Optionally, when recommending a type of food in the first manner, the recommender module 235 provides a stronger recommendation for the type of food, compared to a recommendation for the type of food that the recommender module 235 would provide when recommending in the second manner. Optionally, the recommender module 235 determines the manner in which to recommend a type of food, from among the types of food being ranked, based on the rank of the type of food in the ranking 4580. In one example, if the type of food is ranked at a certain rank it is recommended in the first manner. Optionally, if the type of food is ranked at least at the certain rank (i.e., it is ranked at the certain rank or higher), it is recommended in the first manner. Optionally, if the type of food is ranked lower than the certain rank, it is recommended in the second manner. In different embodiments, the certain rank may refer to different values. Optionally, the certain rank is one of the following: the first rank (i.e., the type of food is the top-ranked type of food), the second rank, or the third rank. Optionally, the certain rank equals at most half of the number of the types of food being ranked. Additional discussion regarding recommendations in the first and second manners may be found at least in the discussion about recommender module 178 in section 8—Crowd-Based Applications; recommender module 235 may employ first and second manners of recommendation in a similar way to how the recommender module 178 recommends in those manners.

In some embodiments, map-displaying module 240 may be utilized to present to a user the ranking 4580 of the types of food and/or a recommendation based on the ranking 4580. Optionally, the map may display an image describing the types of food and/or their ranks and annotations describing at least some of the locations where foods of the types of food may be found (e.g., restaurants).

Figure 6:
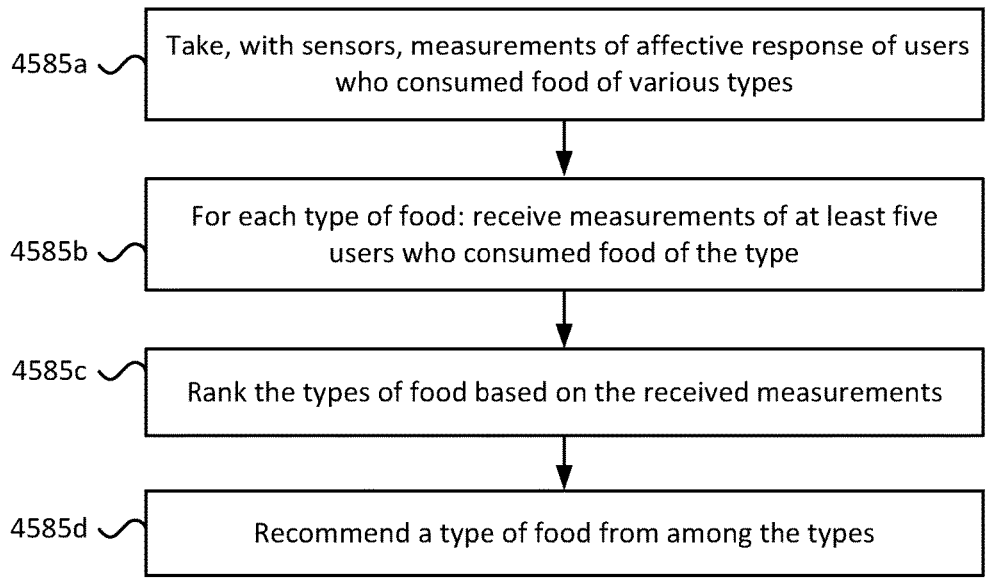
FIG. 6 illustrates steps involved in a method for ranking types of foods based on measurements of affective response of users.

FIG. 6 illustrates steps involved in one embodiment of a method for ranking types of food based on measurements of affective response of users. The steps illustrated in FIG. 6 may be used, in some embodiments, by systems modeled according to FIG. 5. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for ranking types of food based on measurements of affective response of users includes at least the following steps:

In Step 4585*b*, receiving, by a system comprising a processor and memory, the measurements of affective response of the users. Optionally, each measurement of a user is taken with a sensor coupled to the user while the user consumes food that is of a type from among the types of food and/or up to twelve hours after the user consumes the food.

Optionally, the measurements received in this step include measurements of at least five users who consumed food of the first type and measurements of at least five users who consumed food of the second type. Optionally, the measurements received in this step are the measurements 4501 and/or they are received by the collection module 120.

And in Step 4585*c*, ranking the types foods based on the measurements received in Step 1, such that the first type is ranked higher than the second type. Optionally, on average, the measurements of the at least five users who consumed food of the first type are more positive than the measurements of the at least five users who consumed food of the second type.

In one embodiment, the method optionally includes Step 4585*a* that involves utilizing a sensor coupled to a user consuming food of a type that is from among the types of food being ranked, to obtain a measurement of affective response of the user.

In one embodiment, the method optionally includes Step 4585*d* that involves recommending the first type of food to a user in a first manner, and not recommending the second type of food to the user in the first manner. Optionally, the Step 4585*d* may further involve recommending the second type of food to the user in a second manner. As mentioned above, e.g., with reference to recommender module 235, recommending a type of food in the first manner may involve providing a stronger recommendation for the type of food, compared to a recommendation for the type of food that is provided when recommending it in the second manner.

Ranking types of food utilizing measurements of affective response may be done in different embodiments, in different ways. In particular, in some embodiments, ranking may be score-based ranking (e.g., performed utilizing the scoring module 150 and the score-based rank determining module 225), while in other embodiments, ranking may be preference-based ranking (e.g., utilizing the preference generator module 228 and the preference-based rank determining module 230). Therefore, in different embodiments, Step 4585c may involve performing different operations.

In one embodiment, ranking the types of food based on the measurements in Step 4585c includes performing the following operations: for each type of food from among the types of food being ranked, computing a preference score based on the measurements of the at least five users who consumed food of the type, and ranking the types of food based on the magnitudes of the preference scores computed for them. Optionally, two types of food, in this embodiment, may be considered tied if a significance of a difference between preference scores computed for the two types is below a threshold. Optionally, determining the significance is done utilizing a statistical test involving the measurements of the users who consumed food of the two types (e.g., utilizing the score-difference evaluator module 260).

In another embodiment, ranking the types of food based on the measurements in Step 4585c includes performing the following operations: generating a plurality of preference rankings for the types of food, and ranking the types of food based on the plurality of the preference rankings utilizing a method that satisfies the Condorcet criterion. Optionally, each preference ranking is generated based on a subset of the measurements and comprises a ranking of at least two of the types of food, such that one of the at least two types is ranked ahead of another types from among the at least two types. In this embodiment, ties between types of food may be handled in various ways, as described in section 14—Ranking Experiences.

A ranking of types of food generated by a method illustrated in FIG. 6 may be personalized for a certain user. In such a case, the method may include the following steps: (i) receiving a profile of a certain user and profiles of at least some of the users who contributed measurements used for ranking the types of food; (ii) generating an output indicative of similarities between the profile of the certain user and the profiles; and (iii) ranking the types of food based on the measurements and the output. Optionally, the profiles of the users are from among the profiles 4504. Optionally, the output is generated utilizing the personalization module 130. Depending on the type of personalization approach used and/or the type of ranking approach used, the output may be utilized in various ways to perform a ranking of the types of food, as discussed elsewhere herein. Optionally, for at least a certain first user and a certain second user, who have different profiles, third and fourth types of food, from among the types of food, are ranked differently, such that for the certain first user, the third type of food is ranked above the fourth type of food, and for the certain second user, the fourth type of food is ranked above the third type of food. It is to be noted that the third and fourth types of food mentioned here may be the first and second foods mentioned above with reference to FIG. 5.

Figure 7:
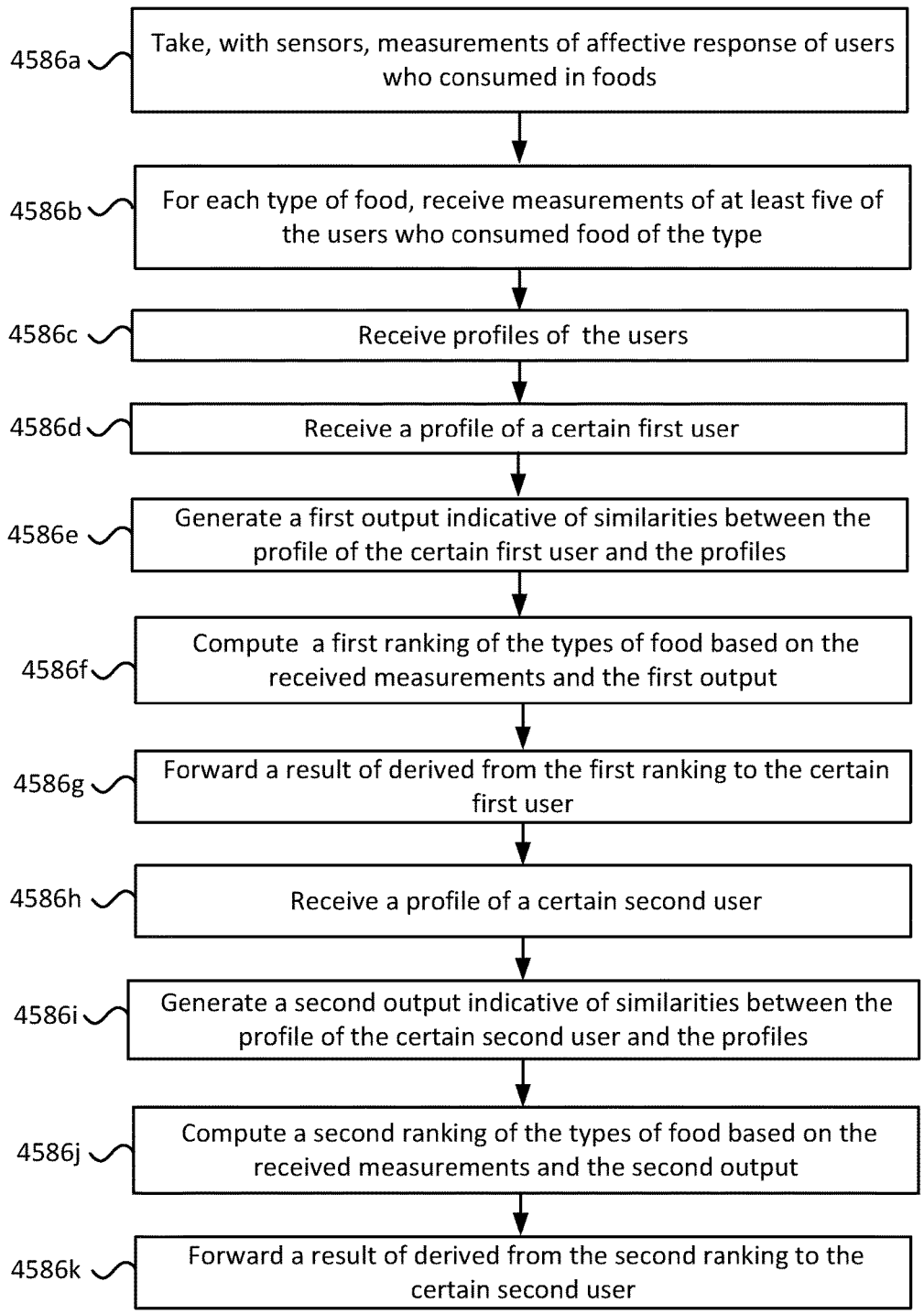
FIG. 7 illustrates steps involved in a method for utilizing profiles of users to compute personalized rankings of types of foods based on measurements of affective response of the users.

Personalization of rankings of types of food, e.g., utilizing the personalization module 130, as described above, can lead to the generation of different rankings of types of food for users who have different profiles. Obtaining different rankings for different users may involve performing the steps illustrated in FIG. 7, which illustrates steps involved in one embodiment of a method for utilizing profiles of users to compute personalized rankings of types of food based on measurements of affective response of the users. The steps illustrated in FIG. 7 may, in some embodiments, be part of the steps performed by systems modeled according to FIG. 5. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for utilizing profiles of users to compute personalized rankings of types of food based on measurements of affective response of the users includes the following steps:

In Step 4586b, receiving, by a system comprising a processor and memory, the measurements of affective response of the users. Optionally, each measurement of a user is taken with a sensor coupled to the user while the user consumes food that is of a type from among the types of food being ranked. Optionally, the measurements received in this step include measurements of at least five users who consumed food of a first type and measurements of at least five users who consumed food of a second type. Optionally, the measurements received in this step are the measurements 4501 and/or they are received by the collection module 120.

In Step 4586c, receiving profiles of at least some of the users who contributed measurements in Step 4586b.

In Step 4586d, receiving a profile of a certain first user.

In Step 4586e, generating a first output indicative of similarities between the profile of the certain first user and the profiles of the at least some of the users.

In Step 4586f, computing, based on the measurements received in Step 4586b and the first output, a first ranking of the types of food.

In Step 4586h, receiving a profile of a certain second user, which is different from the profile of the certain first user.

In Step 4586i, generating a second output indicative of similarities between the profile of the certain second user and the profiles of the at least some of the users. Here, the second output is different from the first output.

And in Step 4586j, computing, based on the measurements received in Step 4586b and the second output, a second ranking of the types of food. Optionally, the first and second rankings are different, such that in the first ranking, the first type of food is ranked above the second type of food, and in the second ranking, the second type of food is ranked above the first type of food.

In one embodiment, the method optionally includes Step 4586a that involves utilizing sensors coupled to the users to obtain the measurements of affective response received in Step 4586b.

In one embodiment, the method may optionally include steps that involve reporting a result based on the ranking of the types of food to a user. In one example, the method may include Step 4586g, which involves forwarding to the certain first user a result derived from the first ranking of the types of food. In this example, the result may be a recommendation to utilize a food of the first type (which for the certain first user is ranked higher than the second type). In another example, the method may include Step 4586k, which involves forwarding to the certain second user a result derived from the second ranking of the types of food. In this example, the result may be a recommendation for the certain second user utilize a food of the second type (which for the certain second user is ranked higher than the first type).

In one embodiment, generating the first output and/or the second output may involve computing weights based on profile similarity. For example, generating the first output in Step 4586e may involve performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 4586i may involve similar steps, mutatis mutandis, to the ones described above.

In another embodiment, the first output and/or the second output may involve clustering of profiles. For example, generating the first output in Step 4586e may involve performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. It is to be noted that instead of selecting at least eight users, a different minimal number of users may be selected such as at least five, at least ten, and/or at least fifty different users. Here, the first output is indicative of the identities of the at least eight users. Generating the second output in Step 4586i may involve similar steps, mutatis mutandis, to the ones described above.

In some embodiments, the method described above may optionally include steps involving recommending one or more of the types of food being ranked to users. Optionally, the type of recommendation given for a type of food is based on the rank of the type. For example, given that in the first ranking, the rank of the first type is higher than the rank of the second type, the method may optionally include a step of recommending the first type to the certain first user in a first manner, and not recommending the second type to the certain first user in first manner. Optionally, the method includes a step of recommending the second type to the certain first user in a second manner. Optionally, recommending a certain type of food in the first manner involves providing a stronger recommendation for a food, compared to a recommendation for the food that is provided when recommending it in the second manner. The nature of the first and second manners is discussed in more detail with respect to the recommender module 178, which may also provide recommendations in first and second manners.

Consuming food can influence how a person feels while the food is consumed. However, consuming food may have a longer-lasting influence on users and effect how they feel even after they finish consuming the food. For example, some types of food can cause heartburn lasting well after the food is consumed. In another example, some people who eat chocolate may feel happier in the hours after they ate that food. Since different foods may have different post-consumption influences on users who consume them, it may be desirable to be able to determine which types of food have a better post-consumption influence on users. Having such information may assist users in selecting which types of food to eat.

Some aspects of embodiments described herein involve systems, methods, and/or computer-readable media that may be used to rank different types of food based on how consuming food of the different types is expected to influence a user after the user consumes the food. The post-experience influence of an experience is referred to herein as an "aftereffect". When an experience involves consuming food the aftereffect of the experience represents the residual influence that the consuming the food has on a user. Such a residual influence may be referred to herein using expressions such as "an aftereffect of the food" and/or the "aftereffect of consuming the food", and the like. Examples of aftereffects of consuming food may include nausea, pain, heartburn, and/or drowsiness, for negative experiences, but may also include happiness and/or euphoria for positive experiences.

One aspect of this disclosure involves ranking types of food based on their aftereffects (i.e., a residual affective response from consuming food). In some embodiments, a collection module receives measurements of affective response of users who consumed food. An aftereffect ranking module is used to rank the types of food based on their corresponding aftereffects, which are determined based on the measurements. The measurements of affective response are typically taken with sensors coupled to the users (e.g., sensors in wearable devices and/or sensors implanted in the bodies of the users). One way in which aftereffects may be determined is by measuring users before and after consuming a food, in order to assess how consuming the food changed their affective response. Such measurements are referred to as prior and subsequent measurements. Optionally, a prior measurement may be taken before finishing to eat a food and a subsequent measurement is taken after finishing the food. Typically, a difference between a subsequent measurement and a prior measurement, of a user who consumed food is indicative of an aftereffect of consuming the food.

Figure 8:
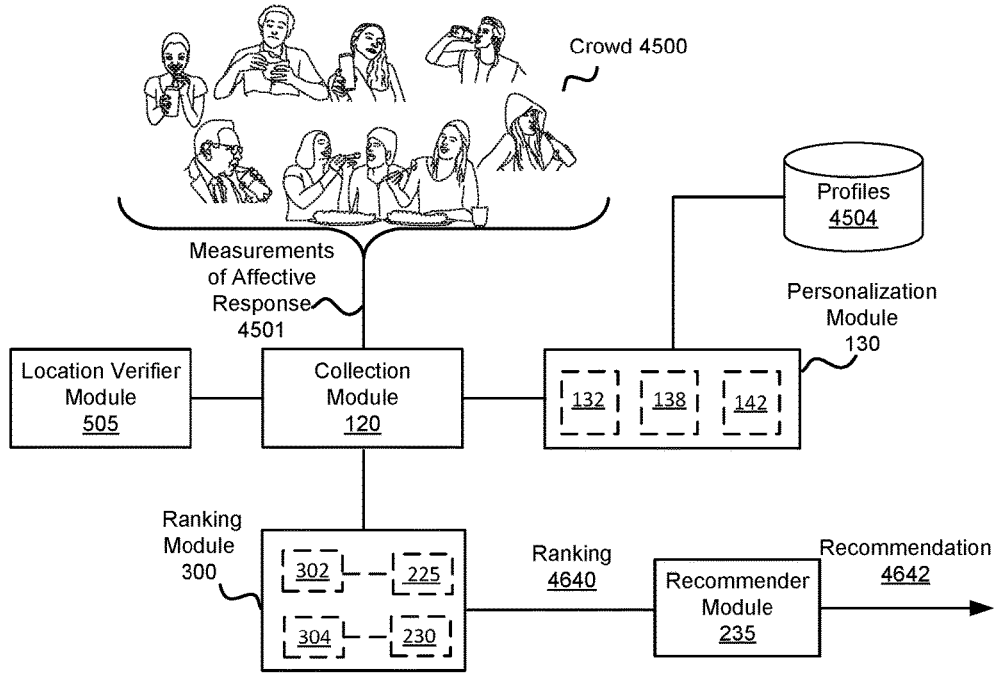
FIG. 8 illustrates a system configured to rank types of foods based on aftereffects determined from measurements of affective response of users.

FIG. 8 illustrates a system configured to rank types of food based on aftereffects determined from measurements of affective response of users. The system includes at least the collection module 120 and an aftereffect ranking module 300. The system may optionally include other modules such as the personalization module 130, and/or recommender module 235.

The collection module 120 is configured, in one embodiment, to receive the measurements 4501 of affective response of users who consumed food of the types being ranked. In this embodiment, the measurements 4501 of affective response comprise, for each certain type of food being ranked, prior and subsequent measurements of at least five users who consumed food of the certain type. Optionally, each prior measurement and/or subsequent measurement of a user comprises at least one of the following: a value representing a physiological signal of the user, and a value representing a behavioral cue of the user. Optionally, for each type of food, prior and subsequent measurements of a different minimal number of users are received, such as at least eight, at least ten, or at least fifty different users.

A prior measurement of a user who consumes food is taken before the user finishes consuming the food, and a subsequent measurement of the user is taken after the user finishes consuming the food. In one example, the subsequent measurement may be taken at the moment a user finishes consuming the food. In another example, the subsequent measurement is taken a certain period after finishing to consume the food, such as up to twelve hours, or even twenty four hours, after consuming the food. Optionally, the prior measurement is taken before the user starts consuming the food.

The aftereffect ranking module 300 is configured to generate a ranking 4640 of the types of food based on prior and subsequent measurements received from the collection module 120. Optionally, the ranking 4640 does not rank all of the types of food the same. In particular, the ranking 4640 includes at least first and second types of food for which the aftereffect of the first type is greater than the aftereffect of the second type; consequently, the first type is ranked above the second type in the ranking 4640.

In one embodiment, having the first type of food being ranked above the second type of food is indicative that, on average, a difference between the subsequent measurements and the prior measurements of the at least five users who consumed food of the first type is greater than a difference between the subsequent and the prior measurements of the at least five users who consumed food of the second type. In one example, the greater difference is indicative that the at least five users who consumed food of the first type had a greater change in the level of one or more of the following emotions: happiness, satisfaction, alertness, and/or contentment, compared to the change in the level of the one or more of the emotions in the at least five users who consumed food of the second type.

In another embodiment, having the first type of food being ranked above the second type of food is indicative that, on average, a difference between the subsequent measurements and the prior measurements of the at least five users who consumed food of the first type is smaller than a difference between the subsequent and the prior measurements of the at least five users who consumed food of the second type. In one example, the smaller difference is indicative that the at least five users who consumed food of the first type had a smaller change in the level of one or more of the following emotions: anger, pain, irritation, and/or drowsiness, compared to the change in the level of the one or more of the emotions in the at least five users who consumed food of the second type.

In yet another embodiment, having the first type of food being ranked above the second type of food is indicative that a first aftereffect score computed based on the prior and subsequent measurements of the at least five users who consumed food of the first type is greater than a second aftereffect score computed based on the prior and subsequent measurements of the at least five users who consumed food of the second type. Optionally, an aftereffect score of a certain type of food may be indicative of an increase to the level of one or more of the following emotions in users who consumed food of the certain type: happiness, satisfaction, alertness, and/or contentment. Optionally, an aftereffect score of a certain type of food may be indicative of a decrease to the level of one or more of the following emotions in users who consumed food of the certain type: anger, pain, irritation, and/or drowsiness.

In some embodiments, the measurements utilized by the aftereffect ranking module 300 to generate the ranking 4640 may involve users who consumed similar quantities of food. For example, the ranking 4640 may be based on prior and subsequent measurements of users who drank a certain volume of beverage (e.g., 12 to 24 oz). Additionally or alternatively, the measurements utilized by the aftereffect ranking module 300 to generate the ranking 4640 may involve prior and subsequent measurements of affective response taken under similar conditions. For example, the prior measurements for all users are taken right before starting to consume the food (e.g., not earlier than 10 minutes before), and the subsequent measurements are taken a certain time after finishing to consume the food (e.g., between ten minutes and four hours after finishing to consume the food).

It is to be noted that while it is possible, in some embodiments, for the measurements received by modules, such as the aftereffect ranking module 300, to include, for each user from among the users who contributed to the measurements, at least one pair of prior and subsequent measurements of affective response of the user corresponding to each type of food from among the types of food being ranked, this is not necessarily the case in all embodiments. In some embodiments, some users may contribute measurements corresponding to a proper subset of the types of food (e.g., those users may not have consumed some types of food), and thus, the measurements 4501 may be lacking some prior and subsequent measurements of some users with respect to some of the types of food.

The aftereffect ranking module 300, similar to the ranking module 220 and other ranking modules described in this disclosure, may utilize various approaches in order to generate a ranking of experiences. For example, the different approaches to ranking experiences may include score-based ranking and preference-based ranking, which are described in more detail in the description of the ranking module 220, e.g., with respect to FIG. 5 and in section 14—Ranking Experiences. That section discusses teachings regarding ranking of experiences in general, which include experiences involving consuming food. Thus, the teachings of section 14—Ranking Experiences are also applicable to embodiments that are related to FIG. 8.

In one embodiment, the recommender module 235 may utilize the ranking 4640 to make recommendation 4642 in which the first type of food is recommended in a first manner (which involves a stronger recommendation than a recommendation made by the recommender module 235 when making a recommendation in a second manner). Thus, based on the fact that the aftereffect associated with the first type of food is greater than the aftereffect associated with the second type of food, the recommender module 235 provides a stronger recommendation for the first type than it does to the second type. There are various ways in which the stronger recommendation may be realized; additional discussion regarding recommendations in the first and second manners may be found at least in the discussion about recommender module 178 in section 8—Crowd-Based Applications; recommender module 235 may employ first and second manners of recommendation in a similar way to how the recommender module 178 recommends in those manners.

In some embodiments, the personalization module 130 may be utilized in order to generate personalized rankings of types of food based on their aftereffects. Utilization of the personalization module 130 in these embodiments may be similar to how it is utilized for generating personalized rankings of types of food, which is discussed in greater detail with respect to the ranking module 220. For example, personalization module 130 may be utilized to generate an output that is indicative of a weighting and/or selection of the prior and subsequent measurements based on profile similarity.

Figure 9:
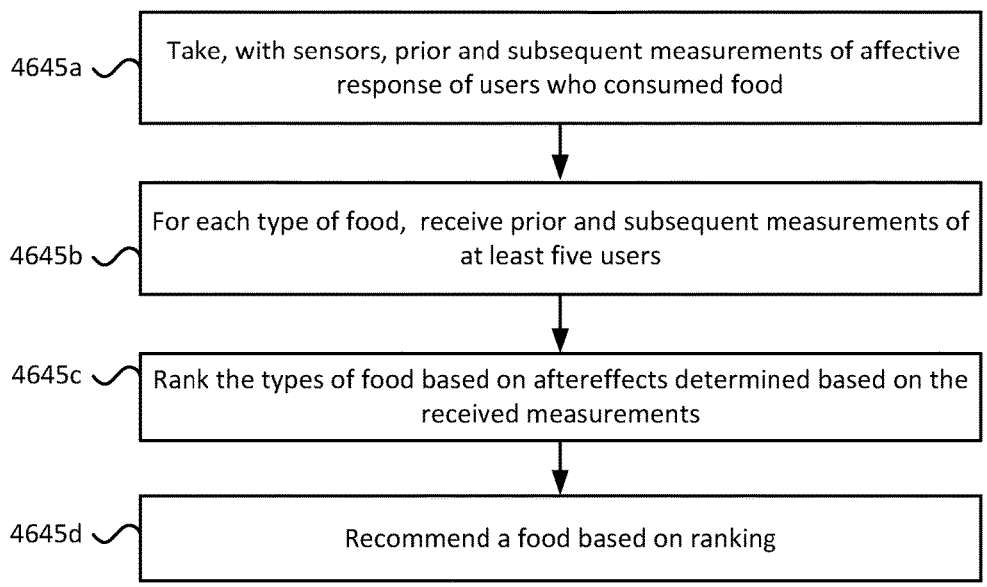
FIG. 9 illustrates steps involved in a method for ranking types of foods based on aftereffects determined from measurements of affective response.

FIG. 9 illustrates steps involved in one embodiment of a method for ranking types of food based on aftereffects determined from measurements of affective response. The steps illustrated in FIG. 9 may be used, in some embodiments, by systems modeled according to FIG. 8. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for ranking types of food, based on aftereffects determined from measurements of affective response, includes at least the following steps:

In Step 4645b, receiving, by a system comprising a processor and memory, prior and subsequent measurements of affective response of users. Optionally, for each type of food, the measurements include prior and subsequent measurements of at least five users who consumed food of that type. Optionally, for each user from among the users consuming food, a prior measurement of the user is taken before the user finishes consuming the food, and a subsequent measurement of the user is taken after the user finishes consuming the food (e.g., at least ten minutes after the user finishes consuming the food). Optionally, a subsequent measurement of affective response of a user who consumed food is taken up to 24 hours after the user consumes the food. Optionally, a difference between a subsequent measurement and a prior measurement of a user who consumed food is indicative of an aftereffect of consuming the food.

For each type of food, the measurements received in Step 4645b comprise prior and subsequent measurements of at least five users who consumed food of the type. Furthermore, the types of food comprise at least first and second types of food. Optionally, the measurements received in Step 4645b are received by the collection module 120.

And in Step 4645c, ranking the types of food based on the measurements received in Step 4645b, such that, the aftereffect of the first type of food is greater than the aftereffect of the second type of food, and the first type of food is ranked above the second type of food. Optionally, ranking the types of food is performed by the aftereffect ranking module 300.

In one embodiment, the method optionally includes Step 4645a that involves utilizing a sensor coupled to a user who consumed food in order to obtain a prior measurement of affective response of the user and/or a subsequent measurement of affective response of the user.

In one embodiment, the method optionally includes Step 4645d that involves recommending the first type of food to a user in a first manner, and not recommending the second type of food to the user in the first manner. Optionally, the Step 4645d may further involve recommending the second type of food to the user in a second manner. As mentioned above, e.g., with reference to recommender module 235, recommending a type of food in the first manner may involve providing a stronger recommendation for the type of food, compared to a recommendation for the type of food that is provided when recommending it in the second manner.

As discussed in more detail above, ranking types of food utilizing measurements of affective response may be done in different embodiments, in different ways. In particular, in some embodiments, ranking may be score-based ranking (e.g., performed utilizing the aftereffect scoring module 302 and the score-based rank determining module 225), while in other embodiments, ranking may be preference-based ranking (e.g., utilizing the preference generator module 304 and the preference-based rank determining module 230).

A ranking of types of food generated by a method illustrated in FIG. 9 may be personalized for a certain user. In such a case, the method may include the following steps: (i) receiving a profile of a certain user and profiles of at least some of the users who contributed measurements used for ranking the types of food; (ii) generating an output indicative of similarities between the profile of the certain user and the profiles; and (iii) ranking the types of food based on the measurements received in Step 4645b and the output. Optionally, the output is generated utilizing the personalization module 130. Depending on the type of personalization approach used and/or the type of ranking approach used, the output may be utilized in various ways to perform a ranking of the types of food, as discussed in further detail above. Optionally, for at least a certain first user and a certain second user, who have different profiles, third and fourth types of food, from among the types of food being ranked, are ranked differently, such that for the certain first user, the third type is ranked above the fourth type, and for the certain second user, the fourth type is ranked above the third type.

As discussed above, consuming food may have an aftereffect on users who consume it. Having knowledge about the nature of the residual and/or delayed influence associated with consuming food can help to determine what food to consume. Thus, there is a need to be able to evaluate different types of food to determine not only their immediate impact on a user's affective response (e.g., the affective response that occurs while consuming the food), but also their delayed and/or residual impact.

Some aspects of this disclosure involve learning functions that represent the aftereffect of consuming food of a certain type. The post-experience influence of an experience is referred to herein as an "aftereffect". When an experience involves consuming food the aftereffect of the experience represents the residual influence that the consuming the food has on a user. For example, the residual effect may relate to how the food is digested and/or the physiological and/or emotional phenomena that occur due to the digestion of the food. Such a residual influence may be referred to herein using expressions such as "an aftereffect of the food" and/or the "aftereffect of consuming the food", and the like. Examples of aftereffects of consuming food may include nausea, pain, and/or drowsiness, for negative experiences, but may also include happiness and/or euphoria for positive experiences.

In some embodiments, determining the aftereffect of a certain type of food is done based on measurements of affective response of users who consumed food of the certain type. The measurements of affective response are typically taken with sensors coupled to the users (e.g., sensors in wearable devices and/or sensors implanted in the bodies of the users). One way in which aftereffects may be determined is by measuring users before and after consuming a food, in order to assess how consuming the food changed their affective response. Such measurements are referred to as prior and subsequent measurements. Optionally, a prior measurement may be taken before finishing to consume food and a subsequent measurement is taken after finishing to consume. Typically, a difference between a subsequent measurement and a prior measurement, of a user who consumed food is indicative of an aftereffect of consuming the food.

In some embodiments, a function that describes an aftereffect of consuming food may be considered to behave like a function of the form $f(\Delta t)=v$, where $\Delta t$ represents a duration that has elapsed since finishing to consume the food and v represents the values of the aftereffect corresponding to the time Δt. In one example, v may be a value indicative of the extent the user is expected to have a certain emotional response, such as being happy, relaxed, and/or excited at a time that is Δt after finishing to consume the food.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the function (e.g., Δt mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (Δt,v), the value of Δt is used to determine in which bin to place the sample. After the training data is placed in bins, a representative value is computed for each bin; this value is computed from the v values of the samples in the bin, and typically represents some form of aftereffect score for the type of food.

Figure 10A:
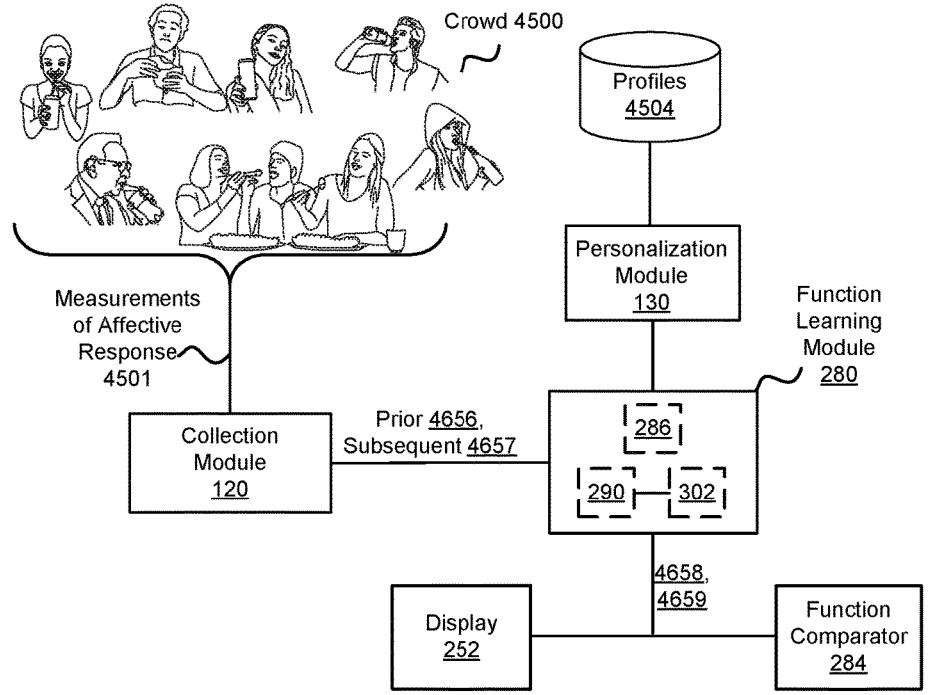
FIG. 10a illustrates a system configured to learn a function of an aftereffect of a food of a certain type.

FIG. 10a illustrates a system configured to learn a function of an aftereffect of a food of a certain type, which may be considered the residual affective response resulting from having consumed the food. The function learned by the system (also referred to as an "aftereffect function"), describes the extent of the aftereffect at different times since finishing to consume the food. The system includes at least collection module 120 and function learning module 280. The system may optionally include additional modules, such as the personalization module 130, function comparator 284, and/or the display 252. It is to be noted that a "food of the certain type" may be a food of any of the types of food mentioned in this disclosure (e.g., food items, certain meals, beverages, and medicine that is taken orally).

The collection module 120 is configured, in one embodiment, to receive measurements 4501 of affective response of users belonging to the crowd 4500. The measurements 4501 are taken utilizing sensors coupled to the users (as discussed in more detail at least in section 1—Sensors and section 2—Measurements of Affective Response). In this embodiment, the measurements 4501 include prior and subsequent measurements of at least ten users who consumed food of the certain type (denoted with reference numerals 4656 and 4657, respectively). A prior measurement of a user, from among the prior measurements 4656, is taken before the user finishes consuming the food. Optionally, the prior measurement of the user is taken before the user starts consuming the food. A subsequent measurement of the user, from among the subsequent measurements 4657, is taken after the user finishes consuming the food (e.g., after the elapsing of a duration of at least ten minutes from the time the user finishes consuming the food). Optionally, a subsequent measurement may be taken up to 24 hours after finishing to consume the food. Optionally, the subsequent measurements 4657 comprise multiple subsequent measurements of a user who consumed food of the certain type, taken at different times after the user finished to consume the food. Optionally, a difference between a subsequent measurement and a prior measurement of a user who consumed food is indicative of an aftereffect of the food (on the user).

In some embodiments, the prior measurements 4656 and/or the subsequent measurements 4657 are taken with respect to experiences involving consuming a certain amount of food. In one example, each user of whom a prior measurement and subsequent measurement are taken, consumes an amount of food that falls within a certain range (e.g., a certain range of weights).

In some embodiments, the subsequent measurements 4657 include measurements taken after different durations had elapsed since a user finished consuming food. In one example, the subsequent measurements 4657 include a subsequent measurement of a first user who consumed food of the certain type, taken after a first duration had elapsed since the first user finished the food. Additionally, in this example, the subsequent measurements 4657 include a subsequent measurement of a second user who consumed food of the certain type, taken after a second duration had elapsed since the second user finished the food. In this example, the second duration is significantly greater than the first duration. Optionally, by "significantly greater" it may mean that the second duration is at least 25% longer than the first duration. In some cases, being "significantly greater" may mean that the second duration is at least double the first duration (or even longer than that).

The function learning module 280 is configured to receive the prior measurements 4656 and the subsequent measurements 4657, and to utilize them in order to learn an aftereffect function. Optionally, the aftereffect function describes values of expected affective response after different durations since finishing to consume food of the certain type (the function may be represented by model comprising function parameters 4658 and/or aftereffect scores 4659, which are described below). Optionally, the aftereffect function learned by the function learning module 280 (and represented by the parameters 4658 or 4659) is at least indicative of values $v_1$ and $v_2$ of expected affective response after durations $\Delta t_1$ and $\Delta t_2$ since finishing to consume the food, respectively. Optionally, $\Delta t_1 \neq \Delta t_2$ and $v_1 \neq v_2$. Optionally, $\Delta t_2$ is at least 25% greater than $\Delta t_1$. In one example, $\Delta t_1$ is at least ten minutes and $\Delta t_2$ is at least twenty minutes.

Following is a description of different configurations of the function learning module 280 that may be used to learn an aftereffect function of a certain type of food experience. Additional details about the function learning module 280 may be found in this disclosure at least in section 17—Learning Function Parameters.

In one embodiment, the function learning module 280 utilizes machine learning-based trainer 286 to learn the parameters of the aftereffect function. Optionally, the machine learning-based trainer 286 utilizes the prior measurements 4656 and the subsequent measurements 4657 to train a model comprising parameters 4658 for a predictor configured to predict a value of affective response of a user who consumed food of the certain type based on an input indicative of a duration that elapsed since the user finished to consume the food. In one example, each pair comprising a prior measurement of a user and a subsequent measurement of a user taken at a duration Δt after finishing to consume the food, is converted to a sample (Δt,v), which may be used to train the predictor. Optionally, v is a value determined based on a difference between the subsequent measurement and the prior measurement and/or a difference between the subsequent measurement and baseline computed based on the prior measurement. Optionally, with respect to the values $\Delta t_1$, $\Delta t_2$, $v_1$, and $v_2$ mentioned above, when the trained predictor is provided inputs indicative of the durations $\Delta t_1$ and $\Delta t_2$, the predictor predicts the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters 4658 comprise the parameters of the model and/or other data utilized by the predictor.

In an alternative embodiment, the function learning module 280 may utilize the binning module 290, which, in this embodiment, is configured to assign subsequent measurements 4657 (along with their corresponding prior measurements) to one or more bins, from among a plurality of bins, based on durations corresponding to subsequent measurements 4657. A duration corresponding to a subsequent measurement of a user who consumed food of the certain type is the duration that elapsed between when the user finished to consume the food and when the subsequent measurement was taken. Additionally, each bin, from among the plurality of bins, corresponds to a range of durations. In one example, each bin may represent a different period of 15 minutes since finishing to consume the food (e.g., the first bin includes measurements taken 0-15 minutes after exiting, the second bin includes measurements taken 15-30 minutes after exiting, etc.)

Additionally, the function learning module 280 may utilize the aftereffect scoring module 302, which, in this embodiment, is configured to compute a plurality of aftereffect scores 4659 corresponding to the plurality of bins. An aftereffect score corresponding to a bin is computed based on prior and subsequent measurements of at least five users, from among the at least ten users. The measurements of the at least five users used to compute the aftereffect score corresponding to the bin were each taken at some time $\Delta t$ after the end of the experience involving consuming food of the certain type, and the time $\Delta t$ falls within the range of times that corresponds to the bin. Optionally, subsequent measurements used to compute the aftereffect score corresponding to the bin were assigned to the bin by the binning module 290. Optionally, with respect to the values $\Delta t_1$, $\Delta t_2$, $v_1$, and $v_2$ mentioned above, $\Delta t_1$ falls within a range of durations corresponding to a first bin, $\Delta t_2$ falls within a range of durations corresponding to a second bin, which is different from the first bin, and the values $v_1$ and $v_2$ are the aftereffect scores corresponding to the first and second bins, respectively.

The aftereffect function described above may be considered to behave like a function of the form $f(\Delta t)=v$, and describe values of affective response at different durations $\Delta t$ after leaving a food. Optionally, in addition to the input value indicative of $\Delta t$, the aftereffect function may receive additional input values. For example, in one embodiment, the aftereffect function receives an additional input value q indicative of how much food the user consumed. For example, q may represent the weight of food consumed, the volume consumed, and/or the number of units consumed. Thus, in this example, the aftereffect function may be considered to behave like a function of the form $f(\Delta t,q)=v$, and it may describe the affective response v a user is expected to feel at a time $\Delta t$ after consuming an amount q of the food.

In some embodiments, aftereffect functions of different types of food may be compared. Optionally, such a comparison may help determine which food is better in terms of its aftereffect on users (and/or on a certain user if the aftereffect functions are personalized for the certain user). Comparison of aftereffects may be done utilizing the function comparator module 284, which, in one embodiment, is configured to receive descriptions of at least first and second aftereffect functions that describe values of expected affective response at different durations after exiting foods of respective first and second types. The function comparator module 284 is also configured, in this embodiment, to compare the first and second aftereffect functions and to provide an indication of at least one of the following: (i) the type of food, from among the first and second types, for which the average aftereffect, from the time of finishing to consume the respective food until a certain duration $\Delta t$, is greatest; (ii) the type of food, from among the first and second types, for which the average aftereffect, over a certain range of durations $\Delta t$, is greatest; and (iii) the type of food, from among the first and second types, for which at a time corresponding to elapsing of a certain duration $\Delta t$ since finishing to consume the respective food, the corresponding aftereffect is greatest. Optionally, comparing aftereffect functions may involve computing integrals of the functions, as described in more detail in section 17—Learning Function Parameters.

In some embodiments, the personalization module 130 may be utilized to learn personalized aftereffect functions for different users by utilizing profiles of the different users. Given a profile of a certain user, the personalization module 130 may generate an output indicative of similarities between the profile of the certain user and the profiles from among the profiles 4504 of the at least ten users. Utilizing this output, the function learning module 280 may select and/or weight measurements, from among the prior measurements 4656 and the subsequent measurements 4657, in order to learn an aftereffect function personalized for the certain user. Optionally, the aftereffect function personalized for the certain user describes values of expected affective response that the certain user may have, at different durations after finishing to consume the food.

It is to be noted that personalized aftereffect functions are not necessarily the same for all users; for some input values, aftereffect functions that are personalized for different users may assign different target values. That is, for at least a certain first user and a certain second user, who have different profiles, the function learning module 280 learns different aftereffect functions, denoted $f_1$ and $f_2$, respectively. In one example, the function $f_1$ is indicative of values $v_1$ and $v_2$ of expected affective responses after durations $\Delta t_1$ and $\Delta t_e$ since finishing to consume the food, respectively, and the function $f_2$ is indicative of values $v_3$ and $v_4$ of expected affective responses after the durations $\Delta t_1$ and $\Delta t_2$ since finishing to consume the food, respectively. Additionally, $\Delta t_1 \neq \Delta t_2$, $v_1 \neq v_2$, $v_3 \neq v_4$, and $v_1 \neq v_3$.

Additional information regarding personalization, such as what information the profiles 4504 of users may contain, how to determine similarity between profiles, and/or how the output may be utilized, may be found at least in section 11—Personalization.

Figure 10B:
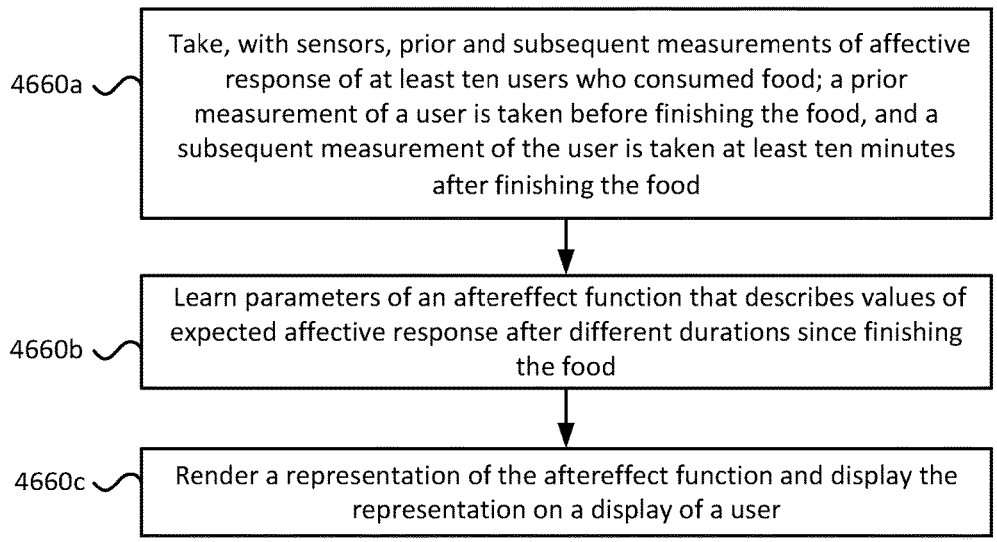
FIG. 10b illustrates steps involved in a method for learning a function of an aftereffect of consuming food of a certain type.

FIG. 10b illustrates steps involved in one embodiment of a method for learning a function of an aftereffect of consuming food of a certain type. The steps illustrated in FIG. 10b may be used, in some embodiments, by systems modeled according to FIG. 10a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for learning a function of an aftereffect of consuming food of a certain type includes at least the following steps:

In Step 4660a, receiving, by a system comprising a processor and memory, measurements of affective response of users taken utilizing sensors coupled to the users. Optionally, the measurements include prior and subsequent measurements of at least ten users who consumed food of the certain type. A prior measurement of a user who consumed food of the certain type is taken before the user finishes consuming the food (or even before the user starts consuming the food). A subsequent measurement of the user is taken after the user finishes consuming the food (e.g., after elapsing of a duration of at least ten minutes after the user finishes consuming the food). Optionally, a subsequent measurement of a user who consumed the food is taken up to 24 hours after the user finishes to consume the food. Optionally, the prior and subsequent measurements are received by the collection module 120. Optionally, the prior measurements that are received in this step are the prior measurements 4656 and the subsequent measurements received in this step are the subsequent measurements 4657.

And in Step 4660b, learning, based on prior measurements 4656 and the subsequent measurements 4657, parameters of an aftereffect function, which describes values of expected affective response after different durations since finishing to consume the food. Optionally, the aftereffect function is at least indicative of values $v_1$ and $v_2$ of expected affective response after durations $\Delta t_1$ and $\Delta t_2$ since finishing to consume the food, respectively; where $\Delta t_1 \neq \Delta t_2$ and $v_1 \neq v_2$. Optionally, the aftereffect function is learned utilizing the function learning module 280.

In one embodiment, Step 4660a optionally involves utilizing a sensor coupled to a user who consumed food of the certain type to obtain a prior measurement of affective response of the user and/or a subsequent measurement of affective response of the user. Optionally, Step 4660a may involve taking multiple subsequent measurements of the user at different times after the user finished to consume the food.

In some embodiments, the method may optionally include Step 4660c that involves displaying the aftereffect function learned in Step 4660b on a display such as the display 252. Optionally, displaying the aftereffect function involves rendering a representation of the aftereffect function and/or its parameters. For example, the function may be rendered as a graph, plot, and/or any other image that represents values given by the function and/or parameters of the function.

As discussed above, parameters of the aftereffect function may be learned from measurements of affective response utilizing various approaches. Therefore, Step 4660b may involve performing different operations in different embodiments.

In one embodiment, learning the parameters of the aftereffect function in Step 4660b comprises utilizing a machine learning-based trainer that is configured to utilize the prior measurements 4656 and the subsequent measurements 4657 to train a model for a predictor configured to predict a value of affective response of a user based on an input indicative of a duration that elapsed since the user finished to consume the food. Optionally, with respect to the values $\Delta t_1$, $\Delta t_1$, $v_1$, and $v_2$ mentioned above, the values in the model are such that responsive to being provided inputs indicative of the durations $\Delta t_1$ and $\Delta t_2$, the predictor predicts the values $v_1$ and $v_2$, respectively.

In another embodiment, learning the parameters of the aftereffect function in Step 4660b involves performing the following operations: (i) assigning subsequent measurements to a plurality of bins based on durations corresponding to subsequent measurements (a duration corresponding to a subsequent measurement of a user who consumed food is the duration that elapsed between when the user finished to consume the food and when the subsequent measurement is taken); and (ii) computing a plurality of aftereffect scores corresponding to the plurality of bins. Optionally, an aftereffect score corresponding to a bin is computed based on prior and subsequent measurements of at least five users, from among the at least ten users, selected such that durations corresponding to the subsequent measurements of the at least five users fall within the range corresponding to the bin; thus, each bin corresponds to a range of durations corresponding to subsequent measurements. Optionally, the aftereffect score is computed by the aftereffect scoring module 302. Optionally, with respect to the values $\Delta t_1$, $\Delta t_1$, $v_1$, and $v_2$ mentioned above, $\Delta t_1$ falls within a range of durations corresponding to a first bin, $\Delta t_2$ falls within a range of durations corresponding to a second bin, which is different from the first bin, and the values $v_1$ and $v_2$ are the aftereffect scores corresponding to the first and second bins, respectively.

An aftereffect function learned by a method illustrated in FIG. 10b may be personalized for a certain user. In such a case, the method may include the following steps: (i) receiving a profile of a certain user and profiles of at least some of the users who contributed measurements used for learning the personalized functions; (ii) generating an output indicative of similarities between the profile of the certain user and the profiles; and (iii) utilizing the output to learn an aftereffect function personalized for the certain user that describes values of expected affective response at different durations after finishing to consume the food. Optionally, the output is generated utilizing the personalization module 130. Depending on the type of personalization approach used and/or the type of function learning approach used, the output may be utilized in various ways to learn an aftereffect function for the experience, as discussed in further detail above. Optionally, for at least a certain first user and a certain second user, who have different profiles, different aftereffect functions are learned, denoted $f_1$ and $f_2$, respectively. In one example, $f_1$ is indicative of values $v_1$ and $v_2$ of expected affective responses after durations $\Delta t_1$ and $\Delta t_2$ since finishing to consume the food, respectively, and $f_2$ is indicative of values $v_3$ and $v_4$ of expected affective responses after the durations $\Delta t_1$ and $\Delta t_2$ since finishing to consume the food, respectively. Additionally, in this example, $\Delta t_1 \neq \Delta t_2$, $v_1 \neq v_2$, $v_3 \neq v_4$, and $v_1 \neq v_3$.

1—Sensors

As used herein, a sensor is a device that detects and/or responds to some type of input from the physical environment. Herein, "physical environment" is a term that includes the human body and its surroundings.

In some embodiments, a sensor that is used to measure affective response of a user may include, without limitation, one or more of the following: a device that measures a physiological signal of the user, an image-capturing device (e.g., a visible light camera, a near infrared (NIR) camera, a thermal camera (useful for measuring wavelengths larger than 2500 nm), a microphone used to capture sound, a movement sensor, a pressure sensor, a magnetic sensor, an electro-optical sensor, and/or a biochemical sensor. When a sensor is used to measure the user, the input from the physical environment detected by the sensor typically originates and/or involves the user. For example, a measurement of affective response of a user taken with an image capturing device comprises an image of the user. In another example, a measurement of affective response of a user obtained with a movement sensor typically detects a movement of the user. In yet another example, a measurement of affective response of a user taken with a biochemical sensor may measure the concentration of chemicals in the user (e.g., nutrients in blood) and/or by-products of chemical processes in the body of the user (e.g., composition of the user's breath).

Sensors used in embodiments described herein may have different relationships to the body of a user. In one example, a sensor used to measure affective response of a user may include an element that is attached to the user's body (e.g., the sensor may be embedded in gadget in contact with the body and/or a gadget held by the user, the sensor may comprise an electrode in contact with the body, and/or the sensor may be embedded in a film or stamp that is adhesively attached to the body of the user). In another example, the sensor may be embedded in, and/or attached to, an item worn by the user, such as a glove, a shirt, a shoe, a bracelet, a ring, a head-mounted display, and/or helmet or other form of headwear. In yet another example, the sensor may be implanted in the user's body, such a chip or other form of implant that measures the concentration of certain chemicals, and/or monitors various physiological processes in the body of the user. And in still another example, the sensor may be a device that is remote of the user's body (e.g., a camera or microphone).

As used herein, a "sensor" may refer to a whole structure housing a device used for detecting and/or responding to some type of input from the physical environment, or to one or more of the elements comprised in the whole structure. For example, when the sensor is a camera, the word sensor may refer to the entire structure of the camera, or just to its CMOS detector.

In some embodiments, a sensor may store data it collects and/processes (e.g., in electronic memory). Additionally or alternatively, the sensor may transmit data it collects and/or processes. Optionally, to transmit data, the sensor may use various forms of wired communication and/or wireless communication, such as Wi-Fi signals, Bluetooth, cellphone signals, and/or near-field communication (NFC) radio signals.

In some embodiments, a sensor may require a power supply for its operation. In one embodiment, the power supply may be an external power supply that provides power to the sensor via a direct connection involving conductive materials (e.g., metal wiring and/or connections using other conductive materials). In another embodiment, the power may be transmitted to the sensor wirelessly. Examples of wireless power transmissions that may be used in some embodiments include inductive coupling, resonant inductive coupling, capacitive coupling, and magnetodynamic coupling. In still another embodiment, a sensor may harvest power from the environment. For example, the sensor may use various forms of photoelectric receptors to convert electromagnetic waves (e.g., microwaves or light) to electric power. In another example, radio frequency (RF) energy may be picked up by a sensor's antenna and converted to electrical energy by means of an inductive coil. In yet another example, harvesting power from the environment may be done by utilizing chemicals in the environment. For example, an implanted (in vivo) sensor may utilize chemicals in the body of the user that store chemical energy such as ATP, sugars, and/or fats.

In some embodiments, a sensor may receive at least some of the energy required for its operation from a battery. Such a sensor may be referred to herein as being "battery-powered". Herein, a battery refers to an object that can store energy and provide it in the form of electrical energy. In one example, a battery includes one or more electrochemical cells that convert stored chemical energy into electrical energy. In another example, a battery includes a capacitor that can store electrical energy. In one embodiment, the battery may be rechargeable; for example, the battery may be recharged by storing energy obtained using one or more of the methods mentioned above. Optionally, the battery may be replaceable. For example, a new battery may be provided to the sensor in cases where its battery is not rechargeable, and/or does not recharge with the desired efficiency.

In some embodiments, a measurement of affective response of a user comprises, and/or is based on, a physiological signal of the user, which reflects a physiological state of the user. Following are some non-limiting examples of physiological signals that may be measured. Some of the example below include types of techniques and/or sensors that may be used to measure the signals; those skilled in the art will be familiar with various sensors, devices, and/or methods that may be used to measure these signals:

(A) Heart Rate (HR), Heart Rate Variability (HRV), and Blood-Volume Pulse (BVP), and/or other parameters relating to blood flow, which may be determined by various means such as electrocardiogram (ECG), photoplethysmogram (PPG), and/or impedance cardiography (ICG).

(B) Skin conductance (SC), which may be measured via sensors for Galvanic Skin Response (GSR), which may also be referred to as Electrodermal Activity (EDA).

(C) Skin Temperature (ST) may be measured, for example, with various types of thermometers.

(D) Brain activity and/or brainwave patterns, which may be measured with electroencephalography (EEG). Additional discussion about EEG is provided below.

(E) Brain activity determined based on functional magnetic resonance imaging (fMRI).

(F) Brain activity based on Magnetoencephalography (MEG).

(G) Muscle activity, which may be determined via electrical signals indicative of activity of muscles, e.g., measured with electromyography (EMG). In one example, surface electromyography (sEMG) may be used to measure muscle activity of frontalis and corrugator supercilii muscles, indicative of eyebrow movement, and from which an emotional state may be recognized.

(H) Eye movement, e.g., measured with electrooculography (EOG).

(I) Blood oxygen levels that may be measured using hemoencephalography (BEG).

(J) $CO_2$ levels in the respiratory gases that may be measured using capnography.

(K) Concentration of various volatile compounds emitted from the human body (referred to as the Volatome), which may be detected from the analysis of exhaled respiratory gasses and/or secretions through the skin using various detection tools that utilize nanosensors.

(L) Temperature of various regions of the body and/or face may be determined utilizing thermal Infra-Red (IR) cameras. For example, thermal measurements of the nose and/or its surrounding region may be utilized to estimate physiological signals such as respiratory rate and/or occurrence of allergic reactions.

In some embodiments, a measurement of affective response of a user comprises, and/or is based on, a behavioral cue of the user. A behavioral cue of the user is obtained by monitoring the user in order to detect things such as facial expressions of the user, gestures made by the user, tone of voice, and/or other movements of the user's body (e.g., fidgeting, twitching, or shaking). The behavioral cues may be measured utilizing various types of sensors. Some non-limiting examples include an image capturing device (e.g., a camera), a movement sensor, a microphone, an accelerometer, a magnetic sensor, and/or a pressure sensor. In one example, a behavioral cue may involve prosodic features of a user's speech such as pitch, volume, tempo, tone, and/or stress (e.g., stressing of certain syllables), which may be indicative of the emotional state of the user. In another example, a behavioral cue may be the frequency of movement of a body (e.g., due to shifting and changing posture when sitting, laying down, or standing) In this example, a sensor embedded in a device such as accelerometers in a smartphone or smartwatch may be used to take the measurement of the behavioral cue.

In some embodiments, a measurement of affective response of a user may be obtained by capturing one or more images of the user with an image-capturing device, such as a camera. Optionally, the one or more images of the user are captured with an active image-capturing device that transmits electromagnetic radiation (such as radio waves, millimeter waves, or near visible waves) and receives reflections of the transmitted radiation from the user. Optionally, the one or more captured images are in two dimensions and/or in three dimensions. Optionally, the one or more captured images comprise one or more of the following: a single image, sequences of images, a video clip. In one example, images of a user captured by the image capturing device may be utilized to determine the facial expression and/or the posture of the user. In another example, images of a user captured by the image capturing device depict an eye of the user. Optionally, analysis of the images can reveal the direction of the gaze of the user and/or the size of the pupils. Such images may be used for eye tracking applications, such as identifying what the user is paying attention to, and/or for determining the user's emotions (e.g., what intentions the user likely has). Additionally, gaze patterns, which may involve information indicative of directions of a user's gaze, the time a user spends gazing at fixed points, and/or frequency at which the user changes points of interest, may provide information that may be utilized to determine the emotional response of the user.

In some embodiments, a measurement of affective response of a user may include a physiological signal derived from a biochemical measurement of the user. For example, the biochemical measurement may be indicative of the concentration of one or more chemicals in the body of the user (e.g., electrolytes, metabolites, steroids, hormones, neurotransmitters, and/or products of enzymatic activity). In one example, a measurement of affective response may describe the glucose level in the bloodstream of the user. In another example, a measurement of affective response may describe the concentration of one or more stress-related hormones such as adrenaline and/or cortisol. In yet another example, a measurement of affective response may describe the concentration of one or more substances that may serve as inflammation markers such as C-reactive protein (CRP). In one embodiment, a sensor that provides a biochemical measurement may be an external sensor (e.g., a sensor that measures glucose from a blood sample extracted from the user). In another embodiment, a sensor that provides a biochemical measurement may be in physical contact with the user (e.g., contact lens in the eye of the user that measures glucose levels). In yet another embodiment, a sensor that provides a biochemical measurement may be a sensor that is in the body of the user (an "in vivo" sensor). Optionally, the sensor may be implanted in the body (e.g., by a chirurgical procedure), injected into the bloodstream, and/or enter the body via the respiratory and/or digestive system. Some examples of types of in vivo sensors that may be used are given in Eckert et al. (2013), "Novel molecular and nanosensors for in vivo sensing", in *Theranostics*, 3.8:583.

Sensors used to take measurements of affective response may be considered, in some embodiments, to be part of a Body Area Network (BAN) also called a Body Sensor Networks (BSN). Such networks enable monitoring of user physiological signals, actions, health status, and/or motion patterns. Further discussion about BANs may be found in Chen et al., "Body area networks: A survey" in *Mobile networks and applications* 16.2 (2011): 171-193.

EEG is a common method for recording brain signals in humans because it is safe, affordable, and easy to use; it also has a high temporal resolution (of the order of milliseconds). EEG electrodes, placed on the scalp, can be either "passive" or "active". Passive electrodes, which are metallic, are connected to an amplifier, e.g., by a cable. Active electrodes may have an inbuilt preamplifier to make them less sensitive to environmental noise and cable movements. Some types of electrodes may need gel or saline liquid to operate, in order to reduce the skin-electrode contact impedance. While other types of EEG electrodes can operate without a gel or saline and are considered "dry electrodes". There are various brain activity patterns that may be measured by EEG. Some of the popular ones often used in affective computing include: Event Related Desynchronization/Synchronization, Event Related Potentials (e.g., P300 wave and error potentials), and Steady State Evoked Potentials. Measurements of EEG electrodes are typically subjected to various feature extraction techniques which aim to represent raw or preprocessed EEG signals by an ideally small number of relevant values, which describe the task-relevant information contained in the signals. For example, these features may be the power of the EEG over selected channels, and specific frequency bands. Various feature extraction techniques are discussed in more detail in Bashashati, et al., "A survey of signal processing algorithms in brain-computer interfaces based on electrical brain signals", in *Journal of Neural Engineering*, 4(2):R32, 2007. Additional discussion about using EEG in affective computing and brain computer interfaces (BCI) can be found in Lotte, et al., "Electroencephalography (EEG)-based Brain Computer Interfaces", in *Wiley Encyclopedia of Electrical and Electronics Engineering, pp.* 44, 2015, and the references cited therein.

The aforementioned examples involving sensors and/or measurements of affective response represent an exemplary sample of possible physiological signals and/or behavioral cues that may be measured. Embodiments described in this disclosure may utilize measurements of additional types of physiological signals and/or behavioral cues, and/or types of measurements taken by sensors, which are not explicitly listed above. Additionally, in some examples given above some of the sensors and/or techniques may be presented in association with certain types of values that may be obtained utilizing those sensors and/or techniques. This is not intended to be limiting description of what those sensors and/or techniques may be used for. In particular, a sensor and/or a technique listed above, which is associated in the examples above with a certain type of value (e.g., a certain type of physiological signal and/or behavioral cue) may be used, in some embodiments, in order to obtain another type of value, not explicitly associated with the sensor and/or technique in the examples given above.

2—Measurements of Affective Response

In various embodiments, a measurement of affective response of a user comprises, and/or is based on, one or more values acquired with a sensor that measures a physiological signal and/or a behavioral cue of the user.

In some embodiments, an affective response of a user to an event is expressed as absolute values, such as a value of a measurement of an affective response (e.g., a heart rate level, or GSR value), and/or emotional state determined from the measurement (e.g., the value of the emotional state may be indicative of a level of happiness, excitement, and/or contentedness). Alternatively, the affective response of the user may be expressed as relative values, such as a difference between a measurement of an affective response (e.g., a heart rate level, or GSR value) and a baseline value, and/or a change to emotional state (e.g., a change to the level of happiness). Depending on the context, one may understand whether the affective response referred to is an absolute value (e.g., heart rate and/or level of happiness), or a relative value (e.g., change to heart rate and/or change to the level of happiness). For example, if the embodiment describes an additional value to which the measurement may be compared (e.g., a baseline value), then the affective response may be interpreted as a relative value. In another example, if an embodiment does not describe an additional value to which the measurement may be compared, then the affective response may be interpreted as an absolute value. Unless stated otherwise, embodiments described herein that involve measurements of affective response may involve values that are either absolute and/or relative.

As used herein, a "measurement of affective response" is not limited to representing a single value (e.g., scalar); a measurement may comprise multiple values. In one example, a measurement may be a vector of co-ordinates, such as a representation of an emotional state as a point on a multidimensional plane. In another example, a measurement may comprise values of multiple signals taken at a certain time (e.g., heart rate, temperature, and a respiration rate at a certain time). In yet another example, a measurement may include multiple values representing signal levels at different times. Thus, a measurement of affective response may be a time-series, pattern, or a collection of wave functions, which may be used to describe a signal that changes over time, such as brainwaves measured at one or more frequency bands. Thus, a "measurement of affective response" may comprise multiple values, each of which may also be considered a measurement of affective response. Therefore, using the singular term "measurement" does not imply that there is a single value. For example, in some embodiments, a measurement may represent a set of measurements, such as multiple values of heart rate and GSR taken every few minutes during a duration of an hour.

In some embodiments, a "measurement of affective response" may be characterized as comprising values acquired with a certain sensor or a certain group of sensors sharing a certain characteristic. Additionally or alternatively, a measurement of affective response may be characterized as not comprising, and/or not being based, on values acquired by a certain type of sensor and/or a certain group of sensors sharing a certain characteristic. For example, in one embodiment, a measurement of affective response is based on one or more values that are physiological signals (e.g., values obtained using GSR and/or EEG), and is not based on values representing behavioral cues (e.g., values derived from images of facial expressions measured with a camera). While in another embodiment, a measurement of affective response is based on one or more values representing behavioral cues and is not based on values representing physiological signals.

Following are additional examples for embodiments in which a "measurement of affective response" may be based only on certain types of values, acquired using certain types of sensors (and not others). In one embodiment, a measurement of affective response does not comprise values acquired with sensors that are implanted in the body of the user. For example, the measurement may be based on values obtained by devices that are external to the body of the user and/or attached to it (e.g., certain GSR systems, certain EEG systems, and/or a camera). In another embodiment, a measurement of affective response does not comprise a value representing a concentration of chemicals in the body such as glucose, cortisol, adrenaline, etc., and/or does not comprise a value derived from a value representing the concentration. In still another embodiment, a measurement of affective response does not comprise values acquired by a sensor that is in contact with the body of the user. For example, the measurement may be based on values acquired with a camera and/or microphone. And in yet another embodiment, a measurement of affective response does not comprise values describing brainwave activity (e.g., values acquired by EEG).

A measurement of affective response may comprise raw values describing a physiological signal and/or behavioral cue of a user. For example, the raw values are the values provided by a sensor used to measure, possibly after minimal processing, as described below. Additionally or alternatively, a measurement of affective response may comprise a product of processing of the raw values. The processing of one or more raw values may involve performing one or more of the following operations: normalization, filtering, feature extraction, image processing, compression, encryption, and/or any other techniques described further in this disclosure, and/or that are known in the art and may be applied to measurement data.

In some embodiments, processing raw values, and/or processing minimally processed values, involves providing the raw values and/or products of the raw values to a module, function, and/or predictor, to produce a value that is referred to herein as an "affective value". As typically used herein, an affective value is a value that describes an extent and/or quality of an affective response. For example, an affective value may be a real value describing how good an affective response is (e.g., on a scale from 1 to 10), or whether a user is attracted to something or repelled by it (e.g., by having a positive value indicate attraction and a negative value indicate repulsion). In some embodiments, the use of the term "affective value" is intended to indicate that certain processing might have been applied to a measurement of affective response. Optionally, the processing is performed by a software agent. Optionally, the software agent has access to a model of the user that is utilized in order to compute the affective value from the measurement. In one example, an affective value may be a prediction of an Emotional State Estimator (ESE) and/or derived from the prediction of the ESE. In some embodiments, measurements of affective response may be represented by affective values.

It is to be noted that, though affective values are typically results of processing measurements, they may be represented by any type of value that a measurement of affective response may be represented by. Thus, an affective value may, in some embodiments, be a value of a heart rate, brainwave activity, skin conductance levels, etc.

In some embodiments, a measurement of affective response may involve a value representing an emotion (also referred to as an "emotional state" or "emotional response"). Emotions and/or emotional responses may be represented in various ways. In some examples, emotions or emotional responses may be predicted based on measurements of affective response, retrieved from a database, and/or annotated by a user (e.g., self-reporting by a user having the emotional response). In one example, self-reporting may involve analyzing communications of the user to determine the user's emotional response. In another example, self-reporting may involve the user entering values (e.g., via a GUI) that describes the emotional state of the user at a certain time and/or the emotional response of the user to a certain event. In the embodiments, there are several ways to represent emotions (which may be used to represent emotional states and emotional responses as well).

In one embodiment, emotions are represented using discrete categories. For example, the categories may include three emotional states: negatively excited, positively excited, and neutral. In another example, the categories may include emotions such as happiness, surprise, anger, fear, disgust, and sadness. In still another example, the emotions may be selected from the following set that includes basic emotions, including a range of positive and negative emotions such as Amusement, Contempt, Contentment, Embarrassment, Excitement, Guilt, Pride in achievement, Relief, Satisfaction, Sensory pleasure, and Shame, as described by Ekman P (1999), "Basic Emotions", in Dalgleish and Power, *Handbook of Cognition and Emotion*, Chichester, UK: Wiley.

In another embodiment, emotions are represented using a multidimensional representation, which typically characterizes the emotion in terms of a small number of dimensions. In one example, emotional states are represented as points in a two dimensional space of Arousal and Valence. Arousal describes the physical activation, and valence the pleasantness or hedonic value. Each detectable experienced emotion is assumed to fall in a specified region in that two-dimensional space. Other dimensions that are typically used to represent emotions include potency/control (refers to the individual's sense of power or control over the eliciting event), expectation (the degree of anticipating or being taken unaware), and intensity (how far a person is away from a state of pure, cool rationality). The various dimensions used to represent emotions are often correlated. For example, the values of arousal and valence are often correlated, with very few emotional displays being recorded with high arousal and neutral valence. In one example, emotions are represented as points on a circle in a two dimensional space pleasure and arousal, such as the circumplex of emotions. In another example, emotions may be represented as points in a two dimensional space whose axes correspond to positive affect (PA) and negative affect (NA), as described by Watson et al. (1988), "Development and validation of brief measures of positive and negative affect: the PANAS scales", *Journal of Personality and Social Psychology* 54.6: 1063.

In yet another embodiment, emotions are represented using a numerical value that represents the intensity of the emotional state with respect to a specific emotion. For example, a numerical value stating how much the user is enthusiastic, interested, and/or happy. Optionally, the numeric value for the emotional state may be derived from a multidimensional space representation of emotion; for instance, by projecting the multidimensional representation of emotion to the nearest point on a line in the multidimensional space.

In still another embodiment, emotional states are modeled using componential models that are based on the appraisal theory, as described by the OCC model of Ortony, et al. (1988), "The Cognitive Structure of Emotions", Cambridge University Press). According to this theory, a person's emotions are derived by appraising the current situation (including events, agents, and objects) with respect to the person's goals and preferences.

A measurement of affective response may be referred to herein as being positive or negative. A positive measurement of affective response, as the term is typically used herein, reflects a positive emotion indicating one or more qualities such as desirability, happiness, content, and the like, on the part of the user of whom the measurement is taken. Similarly, a negative measurement of affective response, as typically used herein, reflects a negative emotion indicating one or more qualities such as repulsion, sadness, anger, and the like on the part of the user of whom the measurement is taken. Optionally, when a measurement is neither positive nor negative, it may be considered neutral.

In some embodiments, whether a measurement is to be considered positive or negative may be determined with reference to a baseline (e.g., a value determined based on previous measurements to a similar situation and/or experience the user may be having). Thus, if the measurement indicates a value that is above the baseline, e.g., happier than the baseline, it may be considered positive, and if lower it may be considered negative).

In some embodiments, when a measurement of affective response is relative, i.e., it represents a change in a level of a physiological signal and/or a behavioral cue of a user, then the direction of the change may be used to determine whether the measurement is positive or negative. Thus, a positive measurement of affective response may correspond to an increase in one or more qualities such as desirability, happiness, content, and the like, on the part of the user of whom the measurement is taken. Similarly, a negative measurement of affective response may correspond to an increase in one or more qualities such as repulsion, sadness, anger, and the like on the part of the user of whom the measurement is taken. Optionally, when a measurement neither changes in a positive direction nor in a negative direction, it may be considered neutral.

Some embodiments may involve a reference to the time at which a measurement of affective response of a user is taken. Depending on the embodiment, this time may have various interpretations. For example, in one embodiment, this time may refer to the time at which one or more values describing a physiological signal and/or behavioral cue of the user were obtained utilizing one or more sensors. Optionally, the time may correspond to one or more periods during which the one or more sensors operated in order to obtain the one or more values describing the physiological signal and/or the behavioral cue of the user. For example, a measurement of affective response may be taken during a single point in time and/or refer to a single point in time (e.g., skin temperature corresponding to a certain time). In another example, a measurement of affective response may be taken during a contiguous stretch of time (e.g., brain activity measured using EEG over a period of one minute). In still another example, a measurement of affective response may be taken during multiple points and/or multiple contiguous stretches of time (e.g., brain activity measured every waking hour for a few minutes each time). Optionally, the time at which a measurement of affective response is taken may refer to the earliest point in time during which the one or more sensors operated in order to obtain the one or more values (i.e., the time the one or more sensors started taking the measurement of affective response). Alternatively, the time may refer to the latest point in time during which the one or more sensors operated in order to obtain the one or more values (i.e., the time the one or more sensors finished taking the measurement of affective response). Another possibility is for the time to refer to a point of time in between the earliest and latest points in time in which the one or more sensors were operating, such as the average of the two points in time.

Various embodiments described herein involve measurements of affective response of users to having experiences. A measurement of affective response of a user to having an experience may also be referred to herein as a "measurement of affective response of the user to the experience". In order to reflect the affective response of a user to having an experience, the measurement is typically taken in temporal proximity to when the user had the experience (so the affective response may be determined from the measurement). Herein, temporal proximity means nearness in time. Thus, stating that a measurement of affective response of a user is taken in temporal proximity to when the user has/had an experience means that the measurement is taken while the user has/had the experience and/or shortly after the user finishes having the experience. Optionally, a measurement of affective response of a user taken in temporal proximity to having an experience may involve taking at least some of the measurement shortly before the user started having the experience (e.g., for calibration and/or determining a baseline).

What window in time constitutes being "shortly before" and/or "shortly after" having an experience may vary in embodiments described herein, and may depend on various factors such as the length of the experience, the type of sensor used to acquire the measurement, and/or the type of physiological signal and/or behavioral cue being measured. In one example, with a short experience (e.g., and experience lasting 10 seconds), "shortly before" and/or "shortly after" may mean at most 10 seconds before and/or after the experience; though in some cases it may be longer (e.g., a minute or more). However, with a long experience (e.g., an experience lasting hours or days), "shortly before" and/or "shortly after" may correspond even to a period of up to a few hours before and/or after the experience (or more). In another example, when measuring a signal that is quick to change, such as brainwaves measured with EEG, "shortly before" and/or "shortly after" may correspond to a period of a few seconds or even up to a minute. However, with a signal that changes slower, such as heart rate or skin temperature, "shortly before" and/or "shortly after" may correspond to a longer period such as even up to ten minutes or more. In still another example, what constitutes "shortly after" an experience may depend on the nature of the experience and how long the affective response to it may last. In some embodiments, when an experience involves eating food, measurements of affective response to the experience of eating the food may be taken even hours after the food is consumed (e.g., up to 12 hours after the consumption), to reflect effects digesting the food had on the user's physiology and/or emotional state.

The duration in which a sensor operates in order to measure an affective response of a user may differ depending on one or more of the following factors: (i) the type of event involving the user, (ii) the type of physiological and/or behavioral signal being measured, and (iii) the type of sensor utilized for the measurement. In some cases, the affective response may be measured by the sensor substantially continually throughout the period corresponding to the event (e.g., while the user interacts with a service provider). However, in other cases, the duration in which the affective response of the user is measured need not necessarily overlap, or be entirely contained in, a period corresponding to an event (e.g., an affective response to a meal may be measured hours after the meal).

With some physiological signals, there may be a delay between the time an event occurs and the time in which changes in the user's emotional state are reflected in measurements of affective response. For example, an affective response involving changes in skin temperature may take several seconds to be detected by a sensor. In some cases, the physiological signal might change quickly because of a stimulus, but returning to the pervious baseline value, e.g., a value corresponding to a time preceding the stimulus, may take much longer. For example, the heart rate of a person viewing a movie in which there is a startling event may increase dramatically within a second. However, it can take tens of seconds and even minutes for the person to calm down and for the heart rate to return to a baseline level. The lag in time it takes affective response to be manifested in certain physiological and/or behavioral signals can lead to it that the period in which the affective response is measured extends after an event to which the measurement refers. For example, measuring of affective response of a user to an interaction with a service provider may extend minutes, and even hours, beyond the time the interaction was completed. In some cases, the manifestation of affective response to an event may last an extended period after the instantiation of the event. For example, at least some of the measurements of affective response of a user taken to determine how the user felt about a certain travel destination may be taken days, and even weeks, after the user leaves the travel destination.

In some embodiments, determining the affective response of a user to an event may utilize measurement taking during a fraction of the time corresponding to the event. The affective response of the user may be measured by obtaining values of a physiological signal of the user that in some cases may be slow to change, such as skin temperature, and/or slow to return to baseline values, such as heart rate. In such cases, measuring the affective response does not have to involve continually measuring the user throughout the duration of the event. Since such physiological signals are slow to change, reasonably accurate conclusions regarding the affective response of the user to an event may be reached from samples of intermittent measurements taken at certain periods during the event and/or after it. In one example, measuring the affective response of a user to a vacation destination may involve taking measurements during short intervals spaced throughout the user's stay at the destination (and possibly during the hours or days after it), such as taking a GSR measurement lasting a few seconds, every few minutes or hours.

Furthermore, when a user has an experience over a certain period of time, it may be sufficient to sample values of physiological signals and/or behavioral cues during the certain period in order to obtain the value of a measurement of affective response (without the need to continuously obtain such values throughout the time the user had the experience). Thus, in some embodiments, a measurement of affective response of a user to an experience is based on values acquired by a sensor during at least a certain number of non-overlapping periods of time during the certain period of time during which the user has the experience (i.e., during the instantiation of an event in which the user has the experience). Optionally, between each pair of non-overlapping periods there is a period time during which the user is not measured with a sensor in order to obtain values upon which to base the measurement of affective response. Optionally, the sum of the lengths of the certain number of non-overlapping periods of time amounts to less than a certain proportion of the length of time during which the user had the experience. Optionally, the certain proportion is less than 50%, i.e., a measurement of affective response of a user to an experience is based on values acquired by measuring the user with a sensor during less than 50% of the time the user had the experience. Optionally, the certain proportion is some other value such as less than 25%, less than 10%, less than 5%, or less than 1% of the time the user had the experience. The number of different non-overlapping periods may be different in embodiments. In one example, a measurement of affective response of a user to an experience may be based on values obtained during three different non-overlapping periods within the period during which a user had the experience. In other examples, a measurement may be based on values obtained during a different number of non-overlapping periods such as at least five different non-overlapping periods, at least ten different non-overlapping periods, or some other number of non-overlapping periods greater than one.

In some embodiments, the number of non-overlapping periods of time during which values are obtained, as described above, may depend on how long a user has an experience. For example, the values may be obtained periodically, e.g., every minute or hour during the experience; thus, the longer the user has the experience, the more non-overlapping periods there are during which values are obtained by measuring the user with a sensor. Optionally, the non-overlapping periods may be selected at random, e.g., every minute there may be a 5% chance that the user will be measured with a sensor.

In some embodiments, a measurement of affective response of a user to an experience may be based on values collected during different non-overlapping periods which represent different parts of the experience. For example, a measurement of affective response of a user to an experience of dining at a restaurant may be based on values obtaining by measuring the user during the following non-overlapping periods of time: waiting to be seated, ordering from the menu, eating the entrées, eating the main course, eating dessert, and paying the bill.

Measurements of affective response of users may be taken, in the embodiments, at different extents and/or frequency, depending on the characteristics of the embodiments.

In some embodiments, measurements of affective response of users are routinely taken; for example, measurements are taken according to a preset protocol set by the user, an operating system of a device of the user that controls a sensor, and/or a software agent operating on behalf of a user. Optionally, the protocol may determine a certain frequency at which different measurements are to be taken (e.g., to measure GSR every minute). Optionally, the protocol may dictate that certain measurements are to be taken continuously (e.g., heart rate may be monitored throughout the period the sensor that measures it is operational). Optionally, continuous and/or periodical measurements of affective response of a user are used in order to determine baseline affective response levels for the user.

In some embodiments, measurements may be taken in order to gauge the affective response of users to certain events. Optionally, a protocol may dictate that measurements to certain experiences are to be taken automatically. For example, a protocol governing the operation of a sensor may dictate that every time a user exercises, certain measurements of physiological signals of the user are to be taken throughout the exercise (e.g., heart rate and respiratory rate), and possibly a short duration after that (e.g., during a recuperation period). Alternatively or additionally, measurements of affective response may be taken "on demand" For example, a software agent operating on behalf of a user may decide that measurements of the user should be taken in order to establish a baseline for future measurements. In another example, the software agent may determine that the user is having an experience for which the measurement of affective response may be useful (e.g., in order to learn a preference of the user and/or in order to contribute the measurement to the computation of a score for an experience). Optionally, an entity that is not a user or a software agent operating on behalf of the user may request that a measurement of the affective response of the user be taken to a certain experience (e.g., by defining a certain window in time during which the user should be measured). Optionally, the request that the user be measured is made to a software agent operating on behalf of the user. Optionally, the software agent may evaluate whether to respond to the request based on an evaluation of the risk to privacy posed by providing the measurement and/or based on the compensation offered for the measurement.

When a measurement of affective response is taken to determine the response of a user to an experience, various aspects such as the type of experience and/or duration of the experience may influence which sensors are to be utilized to take the measurement. For example, a short event may be measured by a sensor that requires a lot of power to operate, while a long event may be measured by a sensor that takes less power to operate. The type of expected response to the experience measured may also be a factor in selecting which sensor to use. For example, in one embodiment, if the measurement is taken to determine an emotion (e.g., detecting whether the user is sad, depressed, apathetic, happy, or elated etc.), then a first sensor that may give a lot of information about the user is used (e.g., an EEG headset). However, if the measurement involves determining a level of exertion (e.g., how hard the user is exercising), then another sensor may be used (e.g., a heart rate monitor).

Various embodiments described herein utilize measurements of affective response of users to learn about the affective response of the users. In some embodiments, the measurements may be considered as being obtained via a process that is more akin to an observational study than to a controlled experiment. In a controlled experiment, a user may be told to do something (e.g., go to a location), in order for a measurement of the user to be obtained under a certain condition (e.g., obtain a measurement of the user at the location). In such a case, the experience the user has is often controlled (to limit and/or account for possible variability), and the user is often aware of participating in an experiment. Thus, both the experience and the response of the user may not be natural. In contrast, an observational study assumes a more passive role, in which the user is monitored and not actively guided. Thus, both the experience and response of the user may be more natural in this setting.

As used herein, a "baseline affective response value of a user" (or "baseline value of a user" when the context is clear) refers to a value that may represent a typically slowly changing affective response of the user, such as the mood of the user. Optionally, the baseline affective response value is expressed as a value of a physiological signal of the user and/or a behavioral cue of the user, which may be determined from a measurement taken with a sensor. Optionally, the baseline affective response value may represent an affective response of the user under typical conditions. For example, typical conditions may refer to times when the user is not influenced by a certain event that is being evaluated. In another example, baseline affective response values of the user are typically exhibited by the user at least 50% of the time during which affective response of the user may be measured. In still another example, a baseline affective response value of a user represents an average of the affective response of the user, such as an average of measurements of affective response of the user taken during periods spread over hours, days, weeks, and possibly even years. Herein, a module that computes a baseline value may be referred to herein as a "baseline value predictor".

In one embodiment, normalizing a measurement of affective response utilizing a baseline involves subtracting the value of the baseline from the measurement. Thus, after normalizing with respect to the baseline, the measurement becomes a relative value, reflecting a difference from the baseline. In one example, if the measurement includes a certain value, normalization with respect to a baseline may produce a value that is indicative of how much the certain value differs from the value of the baseline (e.g., how much is it above or below the baseline). In another example, if the measurement includes a sequence of values, normalization with respect to a baseline may produce a sequence indicative of a divergence between the measurement and a sequence of values representing the baseline.

In one embodiment, a baseline affective response value may be derived from one or more measurements of affective response taken before and/or after a certain event that may be evaluated to determine its influence on the user. For example, the event may involve visiting a location, and the baseline affective response value is based on a measurement taken before the user arrives at the location. In another example, the event may involve the user interacting with a service provider, and the baseline affective response value is based on a measurement of the affective response of the user taken before the interaction takes place.

In another embodiment, a baseline affective response value may correspond to a certain event, and represent an affective response of the user corresponding to the event would typically have to the certain event. Optionally, the baseline affective response value is derived from one or more measurements of affective response of a user taken during previous instantiations of events that are similar to the certain event (e.g., involve the same experience and/or similar conditions of instantiation). For example, the event may involve visiting a location, and the baseline affective response value is based on measurements taken during previous visits to the location. In another example, the event may involve the user interacting with a service provider, and the baseline affective response value may be based on measurements of the affective response of the user taken while interacting with other service providers. Optionally, a predictor may be used to compute a baseline affective response value corresponding to an event. For example, such a baseline may be computed utilizing an Emotional State Estimator (ESE), as described in further detail in section 6—Predictors and Emotional State Estimators. Optionally, an approach that utilizes a database storing descriptions of events and corresponding values of measurements of affective response, such as approaches outlined in the patent publication U.S. Pat. No. 8,938,403 titled "Computing token-dependent affective response baseline levels utilizing a database storing affective responses", may also be utilized to compute a baseline corresponding to an event.

In yet another embodiment, a baseline affective response value may correspond to a certain period in a periodic unit of time (also referred to as a recurring unit of time). Optionally, the baseline affective response value is derived from measurements of affective response taken during the certain period during the periodic unit of time. For example, a baseline affective response value corresponding to mornings may be computed based on measurements of a user taken during the mornings. In this example, the baseline will include values of an affective response a user typically has during the mornings.

As used herein, a periodic unit of time, which may also be referred to as a recurring unit of time, is a period of time that repeats itself. For example, an hour, a day, a week, a month, a year, two years, four years, or a decade. A periodic unit of time may correspond to the time between two occurrences of a recurring event, such as the time between two world cup tournaments. Optionally, a certain periodic unit of time may correspond to a recurring event. For example, the recurring event may be the Cannes film festival, Labor Day weekend, or the NBA playoffs.

In still another embodiment, a baseline affective response value may correspond to a certain situation in which a user may be (in this case, the baseline may be referred to as being "situation-specific"). Optionally, the situation-specific baseline affective response value is derived from measurements of affective response of the user and/or of other users, taken while in the certain situation. For example, a baseline affective response value corresponding to being inebriated may be based on measurements of affective response of a user taken while the user is inebriated. In another example, a baseline affective response value corresponding to a situation of "being alone" may be based on measurements of a user taken while the user was alone in a room, while a baseline affective response value corresponding to a situation of "being with company" may be based on measurements of a user taken while the user was with other people in a room. In one embodiment, a situation-specific baseline for a user in a certain situation is computed using one or more of the various approaches described in patent publication U.S. Pat. No. 8,898,091 titled "Computing situation-dependent affective response baseline levels utilizing a database storing affective responses".

As used herein, a situation refers to a condition of a user that may change the affective response of the user. In one example, monitoring the user over a long period may reveal variations in the affective response that are situation-dependent, which may not be revealed when monitoring the user over a short period or in a narrow set of similar situations. Optionally, a situation may refer to a mindset of the user, such as knowledge of certain information, which changes the affective response of the user. For example, waiting for a child to come home late at night may be considered a different situation for a parent, than knowing the child is at home safe and sound. Other examples of different situations may involve factors such as: presence of other people in the vicinity of the user (e.g., being alone may be a different situation than being with company), the user's mood (e.g., the user being depressed may be considered a different situation than the user being elated), and the type of activity the user is doing at the time (e.g., participating in a meeting, driving a car, may all be different situations). In some examples, different situations may be characterized by a user exhibiting a noticeably different affective response to certain stimuli. Additionally or alternatively, different situations may be characterized by the user having noticeably different baseline affective response values.

In embodiments described herein, a baseline affective response value may be derived from one or more measurements of affective response in various ways. Additionally, the baseline may be represented by different types of values. For example, the baseline may be the value of a single measurement, a result of a function of a single measurement, or a result of a function of multiple measurements. In one example, a measurement of the heart-rate of a user taken before the user has an experience may be used as the baseline affective response value of the user. In another example, an emotional response predicted from an EEG measurement of the user may serve as a baseline affective response value. In yet another example, a baseline affective response value may be a function of multiple values, for example, it may be an average, mode, or median of multiple measurements of affective response.

In some embodiments, a baseline affective response value is a weighted average of a plurality of measurements of affective response. For example, a weighted average of measurements taken over a period of a year may give measurements that are more recent a higher weight than measurements that are older.

In some embodiments, measurements of affective response of a user are stored in a database. Optionally, the measurements correspond to certain periods in a recurring unit of time, and/or situations the user is in. Optionally, the stored measurements and/or values derived from at least some of the stored measurements may be retrieved from the database and utilized as baseline affective response values.

In some embodiments, a baseline affective response value may be derived from measurements of multiple users, and represent an average affective response of the multiple users. While in other embodiments, the baseline affective response value may be derived from measurements of a single user, and represent an affective response of the single user.

There are various ways, in different embodiments described herein, in which data comprising measurements of affective response, and/or data on which measurements of affective response are based, may be processed. The processing of the data may take place before, during, and/or after the data is acquired by a sensor (e.g., when the data is stored by the sensor and/or transmitted from it). Optionally, at least some of the processing of the data is performed by the sensor that measured it. Additionally or alternatively, at least some of the processing of the data is performed by a processor that receives the data in a raw (unprocessed) form, or in a partially processed form. Following are examples of various ways in which data obtained from a sensor may be processed in some of the different embodiments described herein.

In some embodiments, at least some of the data may undergo signal processing, such as analog signal processing, and/or digital signal processing.

In some embodiments, at least some of the data may be scaled and/or normalized. For example, measured values may be scaled to be in the range [−1, +1]. In another example, some measured values are normalized to z-values, which bring the mean of the values to 0, with a variance of 1. In yet another example, statistics are extracted from some values, such as statistics of the minimum, maximum, and/or various moments of the distribution, such as the mean, variance, or skewness. Optionally, the statistics are computed for data that includes time-series data, utilizing fixed or sliding windows.

In some embodiments, at least some of the data may be subjected to feature extraction and/or reduction techniques. For example, data may undergo dimensionality-reducing transformations such as Fisher projections, Principal Component Analysis (PCA), and/or techniques for the selection of subsets of features like Sequential Forward Selection (SFS) or Sequential Backward Selection (SBS). Optionally, dimensions of multi-dimensional data points, such as measurements involving multiple sensors and/or statistics, may be evaluated in order to determine which dimensions are most relevant for identifying emotion. For example, Godin et al. (2015), "Selection of the Most Relevant Physiological Features for Classifying Emotion" in *Emotion* 40:20, describes various feature selection approaches that may be used to select relevant dimensionalities with multidimensional measurements of affective response.

In some embodiments, data that includes images and/or video may undergo processing that may be done in various ways. In one example, algorithms for identifying cues like movement, smiling, laughter, concentration, body posture, and/or gaze, are used in order to detect high-level image features. Additionally, the images and/or video clips may be analyzed using algorithms and/or filters for detecting and/or localizing facial features such as the location of the eyes, the brows, and/or the shape of the mouth. Additionally, the images and/or video clips may be analyzed using algorithms for detecting facial expressions and/or micro-expressions. In another example, images are processed with algorithms for detecting and/or describing local features such as Scale-Invariant Feature Transform (SIFT), Speeded Up Robust Features (SURF), scale-space representation, and/or other types of low-level image features.

In some embodiments, processing measurements of affective response involves compressing and/or encrypting portions of the data. This may be done for a variety of reasons, for instance, in order to reduce the volume of measurement data that needs to be transmitted. Another reason to use compression and/or encryption is that it helps protect the privacy of a measured user by making it difficult for unauthorized parties to examine the data. Additionally, the compressed data may be preprocessed prior to its compression.

In some embodiments, processing measurements of affective response of users involves removal of at least some of the personal information about the users from the measurements prior to measurements being transmitted (e.g., to a collection module) or prior to them be utilized by modules to generate crowd-based results. Herein, personal information of a user may include information that teaches specific details about the user such as the identity of the user, activities the user engages in, and/or preferences, account information of the user, inclinations, and/or a worldview of the user.

The literature describes various algorithmic approaches that can be used for processing measurements of affective response. Some embodiments may utilize these known, and possibly other yet to be discovered, methods for processing measurements of affective response. Some examples include: (i) a variety of physiological measurements may be preprocessed according to the methods and references listed in van Broek, E. L., et al. (2009), "Prerequisites for Affective Signal Processing (ASP)", in *"Proceedings of the International Joint Conference on Biomedical Engineering Systems*

*and Technologies*", INSTICC Press; (ii) a variety of acoustic and physiological signals may be preprocessed and have features extracted from them according to the methods described in the references cited in Tables 2 and 4, Gunes, H., & Pantic, M. (2010), "Automatic, Dimensional and Continuous Emotion Recognition", *International Journal of Synthetic Emotions,* 1 (1), 68-99; (iii) preprocessing of audio and visual signals may be performed according to the methods described in the references cited in Tables 2-4 in Zeng, Z., et al. (2009), "A survey of affect recognition methods: audio, visual, and spontaneous expressions", *IEEE Transactions on Pattern Analysis and Machine Intelligence,* 31 (1), 39-58; and (iv) preprocessing and feature extraction of various data sources such as images, physiological measurements, voice recordings, and text based-features, may be performed according to the methods described in the references cited in Tables 1, 2, 3, 5 in Calvo, R. A., & D'Mello, S. (2010) "Affect Detection: An Interdisciplinary Review of Models, Methods, and Their Applications", *IEEE Transactions on Affective Computing* 1(1), 18-37.

As part of processing measurements of affective response, the measurements may be provided, in some embodiments, to various modules for making determinations according to values of the measurements. Optionally, the measurements are provided to one or more various functions that generate values based on the measurements. For example, the measurements may be provided to estimators of emotional states from measurement data (ESEs described below) in order to estimate an emotional state (e.g., level of happiness). The results obtained from the functions and/or predictors may also be considered measurements of affective response.

As discussed above, a value of a measurement of affective response corresponding to an event may be based on a plurality of values obtained by measuring the user with one or more sensors at different times during the event's instantiation period or shortly after it. Optionally, the measurement of affective response is a value that summarizes the plurality of values. It is to be noted that, in some embodiments, each of the plurality of values may be considered a measurement of affective response on its own merits. However, in order to distinguish between a measurement of affective response and the values it is based on, the latter may be referred to in the discussion below as "a plurality of values" and the like. Optionally, when a measurement of affective response is a value that summarizes a plurality of values, it may, but not necessarily, be referred to in this disclosure as an "affective value".

In some embodiments, having a value that summarizes the plurality of values enables easier utilization of the plurality of values by various modules in embodiments described herein. For example, computing a score for a certain experience based on measurements of affective response corresponding to a set of events involving the certain experience may be easier if the measurement corresponding to each event in the set is a single value (e.g., a value between 0 and 10) or a small set of values (e.g., a representation of an emotional response in a multidimensional space). If, on the other hand, each measurement of affective response is represented by a large set of values (e.g., measurements obtained with EEG, GSR, and heart rate taken over a period of a few hours), it might be more difficult to compute a score for the certain experience directly from such data.

There are various ways, in embodiments described herein, in which a plurality of values, obtained utilizing sensors that measure a user, can be used to produce the measurement of affective response corresponding to the event. It is to be noted that in some embodiments, the measurement of affective response simply comprises the plurality of values (e.g., the measurement may include the plurality of values in raw or minimally-processed form). However, in other embodiments, the measurement of affective response is a value that is a function of the plurality of values. There are various functions that may be used for this purpose. In one example, the function is an average of the plurality of values. In another example, the function may be a weighted average of the plurality of values, which may give different weights to values acquired at different times. In still another example, the function is implemented by a machine learning-based predictor.

In one embodiment, a measurement of affective response corresponding to an event is a value that is an average of a plurality of values obtained utilizing a sensor that measured the user corresponding to the event. Optionally, each of the plurality of values was acquired at a different time during the instantiation of the event (and/or shortly after it). In one example, the plurality of values include all the values measured by the sensor, and as such, the measurement of affective response is the average of all the values. In another example, the measurement of affective response corresponding to an event is an average of a plurality of values that were acquired at certain points of time, separated by approximately equal intervals during the instantiation of the event (and/or shortly after it). For example, the plurality of values might have been taken every second, minute, hour, or day, during the instantiation. In yet another example, the measurement of affective response corresponding to an event is an average of a plurality of values that were acquired at random points of time during the instantiation of the event (and/or shortly after it). For example, the measurement of affective response may be an average of a number of values measured with the sensor. Optionally, the number is proportional to the duration of the instantiation Optionally, the number is 2, 3, 5, 10, 25, 100, 1000, 10000, or more than 10000.

In another embodiment, a measurement of affective response corresponding to an event is a value that is a weighted average of a plurality of values obtained utilizing a sensor that measured the user corresponding to the event. Herein, a weighted average of values may be any linear combination of the values. Optionally, each of the plurality of values was acquired at a different time during the instantiation of the event (and/or shortly after it), and may be assigned a possible different weight for the computing of the weighted average.

In one example, the weights of values acquired in the middle or towards the end of the instantiation of the event may be given a higher weight than values acquired just the start of the instantiation of the event, since they might better reflect the affective response to the whole experience.

In another example, the weights assigned to values from among the plurality of values may depend on the magnitude of the values (e.g., the magnitude of their absolute value). In some embodiments, it may be the case that extreme emotional response is more memorable than less extreme emotional response (be it positive or negative). The extreme emotional response may be more memorable even if it lasts only a short while compared to the duration of an event to which a measurement of affective response corresponds. Thus, when choosing how to weight values from a plurality of values measured by one or more sensors at different times during the event's instantiation period or shortly after it, it may be beneficial to weight extreme values higher than non-extreme values. Optionally, the measurement of affective response corresponding to an event is based on the most extreme value (e.g., as determined based on its distance from a baseline) measured during the event's instantiation (or shortly after it).

In yet another example, an event to which a measurement of affective response corresponds may be comprised of multiple "mini-events" instantiated during its instantiation (the concept of mini-events is discussed in more detail in section 4—Events). Optionally, each mini-event may have a corresponding measurement of affective response. Optionally, the measurement corresponding to each mini-event may be derived from one or more values measured with a sensor. Thus, combining the measurements corresponding to the mini-events into the measurement of affective response corresponding to the event may amount to weighting and combining the multiple values mentioned above into the measurement of affective response that corresponds to the event.

In some embodiments, an event $\tau$ may include, and/or be partitioned to, multiple "mini-events" $\tau_1, \tau_2, \ldots, \tau_k$ that are derived from the event $\tau$, such that the instantiation period of each $\tau_i$, $1 \leq i \leq k$, falls within the instantiation period of $\tau$. Furthermore, it may be assumed that each mini-event has an associated measurement of affective response $m_{\tau_i}$ such that if $i \neq j$ it may be that $m_{\tau_i} \neq m_{\tau_j}$. In these embodiments, $m_\tau$, the measurement of affective response corresponding to the event $\tau$ is assumed to be a function of the measurements corresponding to the mini-events $m_{\tau_1}, m_{\tau_2}, m_{\tau_k}$. It is to be noted that the measurements $m_{\tau_i}$ may in themselves each comprise multiple values and not necessarily consist of a single value. For example, a measurement $m_{\tau_i}$ may comprise brainwave activity measured with EEG over a period of minutes or hours.

In one example, $m_\tau$ may be a weighted average of the measurements corresponding to the mini-events, that is computed according to a function $$m_\tau = \frac{1}{\sum_{i=1}^{k} w_i} \cdot \sum_{i=1}^{k} w_i \cdot m_{\tau_i},$$

where $w_i$ is a weight corresponding to mini-event $\tau_i$. In another example, combining measurements corresponding to mini-events may be done in some other way, e.g., to give more emphasis on measurements of events with a high weight, such as $$m_\tau = \frac{1}{\sum_{i=1}^{k} w_i^2} \cdot \sum_{i=1}^{k} (w_i^2 \cdot m_{\tau_i}).$$

In another example, the measurement $m_\tau$ may be selected as the measurement of the mini-event with the largest weight. In yet another example, the measurement $m_\tau$ may be computed as an average (or weighted average) of the $j \geq 2$ measurements having the largest weights.

The weights $w_i$, $1 \leq i \leq k$, corresponding to measurements of each mini-event may be computed in different ways, in different embodiments, and depend on various attributes. In one embodiment, a weight $w_i$, $1 \leq i \leq k$, corresponding to a measurement of mini-event $m_{\tau_i}$ may be proportional to the duration of the instantiation of the event $\tau_i$. Optionally, for most mini-events the weight $w_i$ increases with the duration of the instantiation of $\tau_i$. For example, the weight may be linear in the duration, or have some other form of function relationship with the duration, e.g., the weight may be proportional to a logarithm of the duration, the square root of the duration, etc. It is to be noted that one reason for considering setting weights based on the duration may be that in some cases, the longer people have a certain emotional response during an event, the more they tend to associate that emotional response with an event. In another embodiment, the weight of a mini-event based on an aspect of the type of experience the mini-event involves (e.g., indoors or outdoors, work vs. recreation, etc.) In yet another embodiment, mini-events may be weighted based on aspects such as the location where the experience takes place, and/or the situation the user is in.

In other embodiments, the weight of a mini-event is based on its associated dominance level. An event's dominance level is indicative of the extent affective response expressed by the user corresponding to the event should be associated with the event. Additional details about dominance levels are given at least in 4—Events.

In some embodiments, weights of event or mini-events may be computed utilizing various functions that take into account multiple weighting techniques described in embodiments above. Thus, for example, in one embodiment, a weight $w_i$, $1 \leq i \leq k$, corresponding to a measurement of mini-event $m_{\tau_i}$ may be proportional both to certain attributes characterizing the experience (e.g., indicative of the type of experience), and to the duration of the mini-event, as described in the examples above. This can lead to cases where a first measurement $m_{\tau_1}$ corresponding to a first mini-event $\tau_1$ may have a weight $w_1$ that is greater than a weight $w_2$ given to a second measurement $m_{\tau_2}$ corresponding to a second mini-event $\tau_2$, despite the duration of the instantiation of $\tau_1$ being shorter than the duration of the instantiation of $\tau_2$.

Combining a plurality of values obtained utilizing a sensor that measured a user in order to a measurement of affective response corresponding to an event, as described in the examples above, may be performed, in some embodiments, by an affective value scorer. Herein, an affective value scorer is a module that computes an affective value based on input comprising a measurement of affective response. Thus, the input to an affective value scorer may comprise a value obtained utilizing a sensor that measured a user and/or multiple values obtained by the sensor. Additionally, the input to the affective value scorer may include various values related to the user corresponding to the event, the experience corresponding to the event, and/or to the instantiation corresponding to the event. In one example, input to an affective value scorer may comprise a description of mini-events comprises in the event (e.g., their instantiation periods, durations, and/or corresponding attributes). In another example, input to an affective value scorer may comprise dominance levels of events (or mini-events). Thus, the examples given above describing computing a measurement of affective response corresponding to an event as an average, and/or weighted average of a plurality of values, may be considered examples of function computed by an affective value scorer.

In some embodiments, input provided to an affective value scorer may include private information of a user. For example, the information may include portions of a profile of the user. Optionally, the private information is provided by a software agent operating on behalf of the user. Alternatively, the affective values scorer itself may be a module of a software agent operating on behalf of the user.

In some embodiments, an affective value scorer may be implemented by a predictor, which may utilize an Emotional State Estimator (ESE) and/or itself be an ESE. Additional information regarding ESEs is given at least in section 6—Predictors and Emotional State Estimators.

Computing a measurement of affective response corresponding to an event utilizing a predictor may involve, in some embodiments, utilizing various statistics derived from the plurality of values obtained by the sensor and/or from a description of the event (and/or descriptions of mini-events comprised in the event). Optionally, some of the statistics may be comprised in input provided to the affective value scorer. Additionally or alternatively, some of the statistics may be computed by the affective value scorer based on input provided to the affective value scorer. Optionally, the statistics may assist the predictor by providing context that may assist in interpreting the plurality of values and combining them into the measurement of affective response corresponding to the event.

In one embodiment, the statistics may comprise various averages, such as averages of measurement values. Optionally, the averages may be with respect to various characteristics of the events. For example, a statistic may indicate the average heart rate in the morning hours, the average skin conductance when eating, and/or the average respiratory rate when sleeping. In another example, a statistic may refer to the number of times an hour the user smiled during an event.

In another embodiment, the statistics may refer to a function of the plurality of values and/or a comparison of the plurality of values to typical affective values and/or baseline affective values. For example, a statistic may refer to the number of times and/or percent of time a certain value exceeded a certain threshold. For example, one statistic may indicate the number of times the heart rate exceeds 80 beats-per-minute. Another statistic may refer to the percent of time the systolic blood pressure was above 140. In another example, statistics may refer to baseline values and/or baseline distributions corresponding to the user. For example, a statistic may indicate the percent of time the user's heart rate was more than two standard deviations above the average observed for the user over a long period.

In yet another embodiment, statistics may summarize the emotional state of a user during a certain event. For example, statistics may indicate what percent of the time, during an event, the user corresponding to the event had an emotional state corresponding to a certain core emotion (e.g., happiness, sadness, anger, etc.) In another example, statistics may indicate the average intensity the user felt each core emotion throughout the duration of the instantiation of the event. Optionally, determining an emotional state of a user and/or the intensity of emotions felt by a user may be done using an ESE that receives the plurality of values obtained by the sensor that measured the user.

Training an affective value scorer with a predictor involves obtaining a training set comprising samples and corresponding labels, and utilizing a training algorithm for one or more of the machine learning approaches described in section 6—Predictors and Emotional State Estimators. Optionally, each sample corresponds to an event and comprises feature values derived from one or more measurements of the user (i.e., the plurality of values mentioned above) and optionally other feature values corresponding to the additional information and/or statistics mentioned above. The label of a sample is the affective value corresponding to the event. The affective value used as a label for a sample may be generated in various ways.

In one embodiment, the user may provide an indication of an affective value that corresponds to an event. For example, the user may voluntarily rank the event (e.g., this meal was 9/10). In another example, the user may be prompted to provide an affective value to an event, e.g., by a software agent.

In another embodiment, the affective value corresponding to the event may be provided by an external labeler (e.g., a human and/or algorithm) that may examine measurements of the user (e.g., images of the user taken during the event) and/or actions of the user during the event to determine how the user likely felt during the event (and give a corresponding numerical ranking).

In still another embodiment, the affective value corresponding to the event may be derived from a communication of the user regarding the event. Optionally, deriving the affective value may involve using semantic analysis to determine the user's sentiment regarding the event from a conversation (voice and/or video), comment on a forum, post on social media, and/or a text message.

Affective values may have various meanings in different embodiments. In some embodiments, affective values may correspond to quantifiable measures related to an event (which may take place in the future and/or not always be quantifiable for every instance of an event). In one example, an affective value may reflect expected probability that the user corresponding to the event may have the event again (i.e., a repeat customer). In another example, an affective value may reflect the amount of money a user spends during an event (e.g., the amount of money spent during a vacation). Such values may be considered affective values since they depend on how the user felt during the event. Collecting such labels may not be possible for all events and/or may be expensive (e.g., since it may involve purchasing information from an external source). Nonetheless, it may be desirable, for various applications, to be able to express a measurement of affective response to an event in these terms, and be able to predict such an affective value from measurements taken with a sensor. This may enable, for example, to compute a score that represents the average amount of money users spend during a night out based on how they felt (without needing access to their financial records).

In some embodiments, labels corresponding to affective values may be acquired when the user is measured with an extended set of sensors. This may enable the more accurate detection of the emotional state of the user. For example, a label for a user may be generated utilizing video images and/or EEG, in addition to heart rate and GSR. Such a label is typically more accurate than using heart rate and GSR alone (without information from EEG or video). Thus, an accurate label may be provided in this case and used to train a predictor that is given an affective value based on heart rate and GSR (but not EEG or video images of the user).

An affective value scorer may be trained from data obtained from monitoring multiple users, and as such in some embodiments, may be considered a general affective value scorer. In other embodiments, an affective value scorer may be trained primarily on data involving a certain user, and as such may be considered a personalized affective value scorer for the certain user.

3—Experiences

Some embodiments described herein may involve users having "experiences". In different embodiments, "experiences" may refer to different things. In some embodiments, there is a need to identify events involving certain experiences, and/or to characterize them. For example, identifying and/or characterizing what experience a user has may be needed in order to describe an event in which a user has the experience. Having such a description is useful for various tasks. In one example, a description of an event may be used to generate a sample provided to a predictor for predicting affective response to the experience, as explained in more detail at least in section 6—Predictors and Emotional State Estimators. In another example, descriptions of events may be used to group events into sets involving the same experience (e.g., sets of events described further below in this disclosure). A grouping of events corresponding to the same experience may be useful for various tasks such as for computing a score for the experience from measurements of affective response, as explained in more detail at least in section 10—Scoring. Experiences are closely tied to events; an instance in which a user has an experience is considered an event. As such additional discussion regarding experiences is also given at least in section 4—Events.

An experience is typically characterized as being of a certain type. Below is a description comprising non-limiting examples of various categories of types of experiences to which experiences in different embodiments may correspond. This description is not intended to be a partitioning of experiences; e.g., various experiences described in embodiments may fall into multiple categories listed below. This description is not comprehensive; e.g., some experiences in embodiments may not belong to any of the categories listed below.

Location. Various embodiments described herein involve experiences in which a user is in a location. In some embodiments, a location may refer to a place in the physical world. A location in the physical world may occupy various areas in, and/or volumes of, the physical world. For example, a location may be a continent, country, region, city, park, or a business (e.g., a restaurant). In one example, a location is a travel destination (e.g., Paris). In another example, a location may be a portion of another location, such as a specific room in a hotel or a seat in a specific location in a theatre. For example, is some embodiments, being in the living room of an apartment may be considered a different experience than being in a bedroom.

Virtual Location. In some embodiments, a location may refer to a virtual environment such as a virtual world, with at least one instantiation of the virtual environment stored in a memory of a computer. Optionally, a user is considered to be in the virtual environment by virtue of having a value stored in the memory indicating the presence of a representation of the user in the virtual environment. Optionally, different locations in virtual environment correspond to different logical spaces in the virtual environment. For example, different rooms in an inn in a virtual world may be considered different locations. In another example, different continents in a virtual world may be considered different locations. In one embodiment, a user interacts with a graphical user interface in order to participate in activities within a virtual environment. In some examples, a user may be represented in the virtual environment as an avatar. Optionally, the avatar of the user may represent the presence of the user at a certain location in the virtual environment. Furthermore, by seeing where the avatar is, other users may determine what location the user is in, in the virtual environment.

A virtual environment may also be represented by a server hosting it. Servers hosting instantiations of the virtual environment may be located in different physical locations and/or may host different groups of users from various locations around the world. This leads to the phenomenon that different users may be provided a different experience when they connect to different servers (despite hosting the same game and/or virtual world). Thus, in some embodiments, users connected to different servers are considered to be in different locations (even if the servers host the same world and/or game).

Route. In some embodiments, an experience may involve traversing a certain route. Optionally, a route is a collection of two or more locations that a user may visit. Optionally, at least some of the two or more locations in the route are places in the physical world. Optionally, at least some of the two or more locations in the route are places in a virtual world. In one embodiment, a route is characterized by the order in which the locations are visited. In another embodiment, a route is characterized by a mode of transportation used to traverse it.

Content. Consuming digital content, and/or a certain segment of digital content, is considered an experience in some embodiments. Optionally, consuming the segment of digital content involves a user interface that presents the digital content (e.g., via a display and/or speakers). In some embodiments, an experience involving consuming digital content is characterized by the type of medium involved in consuming the content. For example, the experience may be referred to as "watching a movie", "surfing the Internet", and/or "listening to music". In other embodiments, an experience involving consuming digital content is characterized by the content itself. Thus, an experience may involve consumption of a specific segment of content. For example, the experience may be referred to as "watching Star Trek 3" or "listening to Wish You Were Here" by Pink Floyd.

Food. Consuming food is considered an experience in some embodiments described herein. The term "food" is used to describe anything that may be consumed orally utilizing the digestive system in the human body. Thus, as used herein, food includes items that a user may eat (e.g., an apple, a burrito, a slice of pizza), items that a user can drink (e.g., juice, soda, whiskey, etc.), and/or other types of orally consumed substances (e.g., a certain type of medicine). In addition, consuming a combination of food items, such as a certain meal, may also be considered a type of experience in which a user consumes food. Furthermore, a reference to "food" or "food item" in this disclosure, may also be considered a reference to a combination of a food items. For example, a meal comprising a certain first course, a certain main course, and a certain beverage may be considered a food, e.g., for which a crowd based score may be computed.

Activity. In some embodiments, an experience may involve an activity that a user does. In one example, an experience involves a recreational activity (e.g., traveling, going out to a restaurant, visiting the mall, or playing games on a gaming console). In another example, an experience involves a day-to-day activity (e.g., getting dressed, driving to work, talking to another person, sleeping, and/or making dinner). In yet another example, an experience involves a work related activity (e.g., writing an email, boxing groceries, or serving food). In still another example, an experience involves a mental activity such as studying and/or taking an exam. In still another example, an experience may involve a simple action like sneezing, kissing, or coughing.

Social Interaction. In some embodiments, an experience may involve some sort of social interaction a user has. Optionally, the social interaction may be between the user and another person and/or between the user and a software-based entity (e.g., a software agent or physical robot). The scope of an interaction may vary between different experiences. In one example, an experience may involve an interaction that lasts minutes and even hours (e.g., playing a game or having a discussion). In another example, an interaction may be as short as exchanging a smile, a handshake, or being rudely interrupted. It is to be noted that the emotional state of a person a user is interacting with may change the nature of the experience the user is having. For example, interacting with a happy smiling person may be a completely different experience than interacting with a sobbing person.

Service Provider—In some embodiments, a social interaction a user has is with a service provider providing a service to the user. Optionally, a service provider may be a human service provider or a virtual service provider (e.g., a robot, a chatbot, a web service, and/or a software agent). In some embodiments, a human service provider may be any person with whom a user interacts (that is not the user). Optionally, at least part of an interaction between a user and a service provider may be performed in a physical location (e.g., a user interacting with a waiter in a restaurant, where both the user and the waiter are in the same room). Optionally, the interaction involves a discussion between the user and the service provider (e.g., a telephone call or a video chat). Optionally, at least part of the interaction may be in a virtual space (e.g., a user and insurance agent discuss a policy in a virtual world). Optionally, at least part of the interaction may involve a communication, between the user and a service provider, in which the user and service provider are not in physical proximity (e.g., a discussion on the phone).

Product—Utilizing a product may be considered an experience in some embodiments. A product may be any object that a user may utilize. Examples of products include appliances, clothing items, footwear, wearable devices, gadgets, jewelry, cosmetics, cleaning products, vehicles, sporting gear and musical instruments. Optionally, with respect to the same product, different periods of utilization and/or different periods of ownership of the product may correspond to different experiences. For example, wearing a new pair of shoes for the first time may be considered an event of a different experience than an event corresponding to wearing the shoes after owning them for three months.

Environment—Spending time in an environment characterized by certain environmental conditions may also constitute an experience in some embodiments. Optionally, different environmental conditions may be characterized by a certain value or range of values of an environmental parameter. In one example, being in an environment in which the temperature is within a certain range corresponds to a certain experience (e.g., being in temperatures lower than 45° F. may be considered an experience of being in the cold and being in temperatures higher than 90° F. may be considered being in a warm environment). In another example, environments may be characterized by a certain range of humidity, a certain altitude, a certain level of pressure (e.g., expressed in atmospheres), and/or a certain level of felt gravity (e.g., a zero-G environment). In yet another example, being in an environment that is exposed to a certain level of radiation may be considered an experience (e.g., exposure to certain levels of sun light, Wi-Fi transmissions, electromagnetic fields near power lines, and/or cellular phone transmissions). In still another example, being in an environment in which there is a certain level of noise (e.g., city traffic or desert quiet), and/or noise of a certain type (e.g., chirping birds, or sounds of the sea) may be considered an experience. In yet another example, being in an environment in which there is a certain odor may be considered an experience (e.g., being in a place where there is a smell of Jasmine flowers or an unpleasant odor associated with refuse). And in yet another example, being in an environment in which there is a certain amount of pollutants and/or allergens (e.g., a certain range of particles-per-million) may be considered an experience. It is to be noted that a user having one of the above experiences may not be aware of the extent of the respective environmental parameter, and thus, may not be aware of having the corresponding experience. Optionally, being in the same environment for a different period of time and/or under different conditions, may be considered a different experience.

The examples given above illustrate some of the different types of experiences users may have in embodiments described herein. In addition to a characterization according to a type of experience, and in some embodiments instead of such a characterization, different experiences may be characterized according to other attributes. In one embodiment, experiences may be characterized according to the length of time in which a user has them. For example, "short experiences" may be experiences lasting less than five minutes, while "long experiences" may take more than an hour (possibly with a category of "intermediate experiences" for experiences lasting between five minutes and an hour). In another embodiment, experiences may be characterized according to an expense associated with having them. For example, "free experiences" may have no monetary expense associated with them, while "expensive experiences" may be experiences that cost at least a certain amount of money (e.g., at least a certain portion of a budget a user has). In yet another embodiment, experiences may be characterized according to their age-appropriateness. For example, certain experiences may be considered for the general public (including children), while others may be deemed for a mature audience only. It is to be noted that the examples given in the above embodiment may be used to characterize experiences without reference to a type of experience (e.g., R-rated experiences vs. PG-rated experiences) or in conjunction with a type of experience (e.g., an R-rated movie vs. a PG-rated movie).

Characterizations of experiences may be done in additional ways. In some embodiments, experiences may be considered according to values of their corresponding attributes (e.g., type of experience, length, cost, quality, etc.) Depending on the embodiments, different subsets of attributes may be considered, which amount to different ways in which experiences may be characterized. Thus, for example, in one embodiment, two events may be considered corresponding to the same experience (when a first set of attributes is used to characterize experiences), while in another embodiment, the same two events may be considered corresponding to different experiences (when a second set of attributes is used to characterize experiences. For example, in one embodiment, biking for 15 minutes may be considered a different experience than biking for 2 hours; they may be considered as the experiences "short bike ride" and "long bike ride", respectively. However, in another embodiment they may both be considered the same experience "riding a bike". In another example, in one embodiment, eating a burger at McDonald's may be considered a different experience than eating a burger at In-N-Out (e.g., when considering an attribute involving the quality of food), while in another embodiment, both would be considered examples of the experience "eating a burger".

Characterizing experiences based on attributes may involve certain combinations of pairs of attributes. These attributes may describe properties such as the location the experience takes place, an activity the experience involves, the duration of the experience, and/or a period of time in a recurrent unit time during which the experience happens (e.g., the hour of the day, the day of week, the season in the year, etc.) Following are examples of characterizing experiences via combinations of the attributes described above.

In one embodiment, an experience a user has may involve engaging in a certain activity at a certain location. Optionally, the certain activity belongs to a set of activities that includes the following: exercise activities, recreational activities, shopping related activities, dining related activities, resting, playing games, visiting a location in the physical world, interacting in a virtual environment, receiving a medical treatment, and receiving services. Optionally, the certain location belongs to a set that includes locations that may be characterized as being of one or more of the following types: countries of the world, cities in the world, neighborhoods in cities, parks, beaches, stadiums, hotels, restaurants, theaters, night clubs, bars, shopping malls, stores, theme parks, museums, zoos, spas, health clubs, exercise clubs, clinics, hospitals, banks, and other places of business.

In another embodiment, an experience a user has may involve visiting a certain location during a certain period of time. In one example, the certain location belongs to a set that includes locations that may be characterized as being of one or more of the following types: cities, neighborhoods, parks, beaches, restaurants, theaters, night clubs, bars, shopping malls, stores, theme parks, museums, zoos, spas, health clubs, exercise clubs, clinics, hospitals, banks and other places of business. In this example, the certain period of time during which the certain location is visited, is a recurring period of time that includes at least one of the following: a certain hour during the day, a certain day of the week, a certain day of the month, and a certain holiday. In another example, the certain location belongs to a set that includes locations that may be characterized as being of one or more of the following types: continents, countries, cities, parks, beaches, theme parks, museums, resorts, and zoos. In this example, the certain period of time during which the certain location is visited is a recurring period of time that involves at least one of the following periods: a season of the year, a month of the year, and a certain holiday.

In yet another embodiment, an experience a user has may involve visiting a certain location for a certain duration. In one example, the certain location belongs to a set that includes locations that may be characterized as being of one or more of the following types: cities, neighborhoods, parks, beaches, restaurants, theaters, night clubs, bars, shopping malls, stores, theme parks, museums, zoos, spas, health clubs, and exercise clubs. In this example, the certain duration is longer than five minutes and shorter than a week. In another example, the certain location belongs to a set that includes locations that may be characterized as being of one or more of the following types: continents, countries, cities, parks, hotels, cruise ships, and resorts. In this example, the certain duration is longer than an hour and shorter than two months.

In still another embodiment, an experience a user has may involve engaging in a certain activity during a certain period of time. Optionally, the certain activity belongs to a set of activities that includes exercise activities, recreational activities, work related activities, household related activities, shopping related activities, dining related activities, playing games, studying, resting, visiting a location in the physical world, interacting in a virtual environment, receiving a medical treatment, and receiving services. Optionally, the certain period of time is a recurring period of time that includes at least one of the following: a certain hour during the day, a certain day of the week, a certain day of the month, and a certain holiday.

And in yet another embodiment, an experience a user has may involve engaging in a certain activity for a certain duration. Optionally, the certain activity belongs to a set of activities that includes exercise activities, recreational activities, work related activities, household related activities, shopping related activities, dining related activities, playing games, studying, resting, visiting a location in the physical world, interacting in a virtual environment, receiving a medical treatment, and receiving services. Optionally, the certain duration is longer than one minute and shorter than one day.

The possibility to characterize experiences with subsets of corresponding attributes may lead to the fact that depending on the embodiment, the same collection of occurrences (e.g., actions by a user at a location) may correspond to different experiences and/or a different number of experiences. For example, when a user takes a bike ride in the park, it may correspond to multiple experiences, such as "exercising", "spending time outdoors", "being at the park", "being exposed to the sun", "taking a bike ride", and possibly other experience. Thus, the decision on which of the above are to be recognized as experiences based on the set of actions involving riding the bike in the park would depend on specifics of the embodiment involved.

In different embodiments, experiences may be characterized according to attributes involving different levels of specificity. The level of specificity, according to which it may be judged whether two events correspond to the same experience, may depend on the embodiment. For example, when considering an experience involving being in a location, in one embodiment, the location may be a specific location such as room 1214 in the Grand Budapest Hotel, or seat 10 row 4 in the Left Field Pavilion 303 at Dodger Stadium. In another embodiment, the location may refer to multiple places in the physical world. For example, the location "fast food restaurant" may refer to any fast food restaurant, while the location "hotel" may refer to any hotel. Similarly, for example, the location "In-N-Out Burger" may refer to any branch of the franchise, and not necessarily a certain address. In one example, a location may refer to designated place in a vehicle, such as a specific seat on an airplane (e.g., seat 34A), or a cabin in a ship (e.g., cabin 212). In another example, the location may refer to a specific seat in a vehicle traveling on a certain route (e.g., window seat flying through the Grand Canyon).

In some embodiments, attributes used to characterize experiences may be considered to belong to hierarchies. Thus, at the same time, something that happens to the user and/or something the user does may be associated with multiple related experiences of an increasing scope. For example, when a user rides a bike in the park, this may be associated with multiple experiences that have a hierarchical relationship between them. For example, riding the bike may correspond to an experience of "riding a bike in Battery park on a weekend", which belongs to a group of experiences that may be described as "riding a bike in Battery park", which belongs to a larger group of experiences that may be characterized as "riding a bike in a park", which in turn may belong to a larger group "riding a bike", which in turn may belong to an experience called "exercising". Which of the hierarchical representations gets used and/or what level in a hierarchy gets used, would be a detail specific to the embodiment at hand.

Additionally, in some embodiments, an experience may comprise multiple ("smaller") experiences, and depending on the embodiment, the multiple experiences may be considered jointly (e.g., as a single experience) or individually. For example, "going out to a movie" may be considered a single experience that is comprised of multiple experiences such as "driving to the theatre", "buying a ticket", "eating popcorn", "going to the bathroom", "watching the movie", and "driving home".

4—Events

When a user has an experience, this defines an "event". An event may be characterized according to certain attributes. For example, every event may have a corresponding experience and a corresponding user (who had the corresponding experience). An event may have additional corresponding attributes that describe the specific instantiation of the event in which the user had the experience. Examples of such attributes may include the event's duration (how long the user had the experience in that instantiation), the event's starting and/or ending time, and/or the event's location (where the user had the experience in that instantiation).

An event may be referred to as being an "instantiation" of an experience and the time during which an instantiation of an event takes place may be referred to herein as the "instantiation period" of the event. This relationship between an experience and an event may be considered somewhat conceptually similar to the relationship in programming between a class and an object that is an instantiation of the class. The experience may correspond to some general attributes (that are typically shared by all events that are instantiations of the experience), while each event may have attributes that correspond to its specific instantiation (e.g., a certain user who had the experience, a certain time the experience was experienced, a certain location the certain user had the experience, etc.) Therefore, when the same user has the same experience but at different times, these may be considered different events (with different instantiations periods). For example, a user eating breakfast on Sunday, Feb. 1, 2015 is a different event than the user eating breakfast on Monday, Feb. 2, 2015.

In some embodiments, an event may have a corresponding measurement of affective response, which is a measurement of the user corresponding to the event, to having the experience corresponding to the event. The measurement corresponding to an event is taken during a period corresponding to the event; for example, during the time the user corresponding to the event had the experience corresponding to the event, or shortly after that. Optionally, a measurement corresponding to an event reflects the affective response corresponding to the event, which is the affective response of the user corresponding to the event to having the experience corresponding to the event. Thus, a measurement of affective response corresponding to an event typically comprises, and/or is based on, one or more values measured during the instantiation period of the event and/or shortly after it, as explained in more detail at least in section 2—Measurements of Affective Response.

It is to be noted that when a user has multiple experiences simultaneously, e.g., mini-events discussed below, the same measurement of affective response may correspond to multiple events corresponding to the multiple experiences.

An event is often denoted in this disclosure with the letter $\tau$. An event involving a user u corresponding to the event who has an experience e corresponding to the event, may be represented by a tuple $\tau=(u,e)$. Similarly, an event $\tau$ may have a corresponding measurement of affective response m which is a measurement of the user u corresponding to the event to having the experience e corresponding to the event (as taken during the instantiation period of the event or shortly after it). In this case, the event $\tau$ may be represented by a tuple $\tau=(u,e,m)$. It is to be noted that the same user may have the same experience at multiple different times. These may be represented by multiple different events having possibly different measurement values. For example, two different events in which the same user had the same experience, but with possibly different corresponding measurements of affective response may be denoted herein as events $\tau_1=(u,e,m_1)$ and $\tau_2=(u,e,m_2)$. In some cases herein, to emphasize that a measurement m corresponds to an event $\tau$, the measurement will be denoted $m_\tau$. Similarly, the user corresponding to an event $\tau$ may be denoted $u_\tau$ and the experience corresponding to $\tau$ may be denoted $e_\tau$.

In some embodiments, a tuple $\tau$ may correspond to additional information related to the specific instantiation of the event, such as a time t of the event (e.g., the time the measurement m is taken), in which case, the tuple may be considered to behave like a function of the form $\tau=(u,e,m,t)$. Additionally or alternatively, a tuple may further correspond to a weight parameter w, which may represent the importance of the measurement and be indicative of the weight the measurement should be given when training models. In this case, the tuple may be considered to behave like a function of the form $\tau=(u,e,m,w)$. Additionally or alternatively, a tuple $\tau$ may correspond to other factors related to the user (e.g., demographic characteristics) or the instantiation of the experience (e.g., duration and/or location of the event corresponding to the measurement).

When discussing events, it may be stipulated that the measurement of affective response corresponding to an event is taken in temporal proximity to the user corresponding to the event having the experience corresponding to the event. Thus, when discussing an event represented by a tuple $\tau=(u,e,m)$, where m is a measurement of the affective response of the user u to having the experience e, it may be assumed that m is taken in temporal proximity to when the user u had the experience e.

It is to be noted that in the above notation, $\tau=(u,e,m)$ is typically assumed to involve a single user u, a single experience e, and a measurement m. However, this is not necessarily true in all embodiments. In some embodiments, u may represent multiple users, e may represent multiple experiences, and/or m may represent multiple measurements. For example, when the experience e may represent multiple experiences that the user u had, such as in a case where e is an experience that involves a set of "smaller" experiences $e_1, e_2, \ldots, e_n$, the measurement m may be assumed to correspond to each experience $e_1, e_2, \ldots, e_n$. Thus in this example, to account for multiple experiences, the event $\tau$ may be substituted by multiple events, e.g., $\tau_1=(u,e_1,m), \ldots, \tau_n=(u,e_n,m)$. Similarly, if the user u represents multiple users, the measurement m may be considered an average and/or representative measurement of those users. Additionally, as described elsewhere herein, the use of a singular "measurement" in this disclosure may refer to multiple values (e.g., from the same sensor, different sensor, and/or acquired at multiple times).

Similar to how a "larger" experience may comprise multiple "smaller" experiences, in some embodiments, an event may comprise a plurality of smaller events instantiated during the instantiation period of the "larger" event. Optionally, the smaller events may be referred to as "mini-events". For example, an event corresponding to an experience of being at a location (e.g., a mall), may include multiple mini-events, such as an event in which a user traveled to the location, an event in which the user spoke to someone at the location, an event in which the user bought a present at the location, and an event in which the user ate food at the location. In some embodiments, some of the mini-events may have overlapping instantiation periods (e.g., a user exercising and speaking to someone else simultaneously), while in others, the events comprised in a "larger" event may have non-overlapping instantiation periods. It is to be noted that the herein the term "mini-event" is used only to distinguish a larger event from smaller events it comprises; each mini-event is an event, and may have all the characteristics of an event as described in this disclosure.

In some embodiments, an event $\tau$ may include, and/or be partitioned to, multiple "mini-events" $\tau_1, \tau_2, \ldots, \tau_k$ that are derived from the event $\tau$, such that the instantiation period of each $\tau_i$, $1 \le i \le k$, falls within the instantiation period of $\tau$. Furthermore, it may be assumed that each mini-event has an associated measurement of affective response $m_{\tau_i}$ such that if $i \ne j$ it may be that $m_{\tau_i} \ne m_{\tau_j}$. In this embodiment, $m_\tau$, the measurement of affective response corresponding to the event $\tau$ is assumed to be a function of the measurements corresponding to the mini-events $m_{\tau_1}, m_{\tau_2}, m_{\tau_k}$. For example, $m_\tau$ may be a weighted average of the measurements corresponding to the mini-events, that is computed according to a function $$m_\tau = \frac{1}{\sum_{i=1}^{k} w_i} \cdot \sum_{i=1}^{k} w_i \cdot m_{\tau_i},$$

where the $w_i$ are weight corresponding to each mini-event $\tau_i$. Additional discussion regarding the computation of the measurement of affective response corresponding to an event from measurements corresponding to mini-events comprised in the event is given in section 2—Measurements of Affective Response.

In one embodiment, the instantiation periods of the k mini-events do not overlap. Alternatively, the instantiation periods of some of the k mini-events may overlap. In one embodiment, the instantiation periods of the k mini-events may cover the entire instantiation period of the event $\tau$. Alternatively, the instantiation periods of the k mini-events may cover only a portion of the instantiation of the event $\tau$. Optionally, the portion of $\tau$ that is covered by instantiations of mini-events involves at least a certain percent of the instantiation period of $\tau$, such as at least 1%, 5%, 10%, 25%, or at least 50% of the instantiation period of $\tau$. In another embodiment, the duration covered by instantiations of the k mini-events may comprise at least a certain period of time. For example, the certain period may be at least 1 second, 10 second, 1 minute, 1 hour, 1 day, 1 week, or more.

In one embodiment, $k \ge 1$ "mini-events" are derived from an event $\tau$, in such a way that each mini-event has an instantiation period having a certain duration. For example, the certain duration may be one second, five seconds, one minute, one hour, one day, one week, or some other duration between one second and one week. In another embodiment, each of the k mini-events derived from an event $\tau$ has an initiation period falling within a certain range. Examples of the certain range include 0.01 seconds to one second, 0.5 seconds to five seconds, one second to one minute, one minute to five minutes, one minute to one hour, one hour to one day, and between one day and one week.

In some embodiments, mini-events are generated from a larger event because they reflect different types of events. For example, an event involving going out may be represented by the mini-events corresponding to getting dressed, driving down-town, finding parking, going to a restaurant, taking a stroll, and driving back home. In another example, different levels in a game may be considered mini-events, and similarly, different rooms in a virtual world may also each be considered a different mini-event.

In some embodiments, a measurement of affective response corresponding to a certain event may be based on values that are measured with one or more sensors at different times during the certain event's instantiation period or shortly after it (this point is discussed further in section 2—Measurements of Affective Response). It is to be noted that in the following discussion, the values may themselves be considered measurements of affective response. However, for the purpose of being able to distinguish, in the discussion below, between a measurement of affective response corresponding to an event, and values upon which the measurement is based, the term "measurement of affective response" is not used when referring to the values measured by the one or more sensors. However, this distinction is not meant to rule out the possibility that the measurement of affective response corresponding to the certain event comprises the values.

When there are no other events overlapping with the certain event, the values measured with the one or more sensors may be assumed to represent the affective response corresponding to the certain event. However, when this is not the case, and there are one or more events with instantiation periods overlapping with the instantiation of the certain event, then in some embodiments, that assumption may not hold. For example, if for a certain period during the instantiation of the certain event, there may be another event with an instantiation that overlaps with the instantiation of the certain event, then during the certain period, the user's affective response may be associated with the certain event, the other event, and/or both events. In some cases, if the other event is considered part of the certain event, e.g., the other event is a mini-event corresponds to an experience that is part of a "larger" experience to which the certain event corresponds, then this fact may not matter much (since the affective response may be considered to be directed to both events). However, if the other event is not a mini-event that is part of the certain event, then associating the affective response measured during the certain period with both events may produce an inaccurate measurement corresponding to the certain event. For example, if the certain event corresponds to an experience of eating a meal, and during the meal the user receives an annoying phone call (this is the "other event"), then it may be preferable not to associate the affective response expressed during the phone call with the meal.

It is to be noted that in some embodiments, the fact that unrelated events may have overlapping instantiation periods may be essentially ignored when computing measurements of affective response corresponding to the events. For example, a measurement of affective response corresponding to the certain event may be an average of values acquired by a sensor throughout the instantiation of the certain event, without regard to whether there were other overlapping events at the same time. One embodiment, for example, in which such an approach may be useful is an embodiment in which the certain event has a long instantiation period (e.g., going on a vacation), while the overlapping events are relatively short (e.g., intervening phone calls with other people). In this embodiment, filtering out short periods in which the user's attention was not focused on the experience corresponding to the certain event may not lead to significant changes in the value of the measurement of affective response corresponding to the certain event (e.g., because most of the values upon which the measurement is based still correspond to the certain event and not to other events).

However, in other embodiments, it may be desirable to treat values acquired by a sensor during periods of overlapping instantiations differently than values acquired when only the certain event is considered to be instantiated. For example, some of the values acquired during periods of overlapping instantiations may receive a different weight than values acquired when there is only a single instantiation to consider or be filtered out entirely.

In some embodiments, an event may be associated with a dominance level indicative of the extent affective response expressed by the user corresponding to the event should be associated with the event. Based on such dominance levels, when an event with a higher dominance level overlaps with an event with a lower dominance level, the affective response, measured during the overlap, is associated to a higher degree with the event with the higher dominance level. Optionally, the affective response is associated entirely with the event with the higher dominance level, such that a value acquired by a sensor during the time of the overlap between the events having the lower and higher dominance levels is essentially not utilized to compute the measurement of affective response corresponding to the event with the lower dominance level. In some embodiments, this may amount to filtration of values from periods in which an event's instantiation overlaps with other events having higher dominance levels. Alternatively, a value acquired by the sensor during the time of the overlap may be given a lower weight when used to compute the measurement of affective response corresponding to the event with the lower dominance level, compared to the weight given to a value acquired by the sensor during a time in which the event with the higher dominance level does not overlap with the event with the lower dominance level.

In one embodiment, an event may have a certain dominance level associated with it based on the type of the experience corresponding to the event. For example, an event that involves having a phone conversation may have a higher dominance level than an event involving watching TV. Thus, if a user is doing both simultaneously, in this embodiment, it may be assumed that an affective response the user has at the time of the conversation is more dominantly related to the phone conversation and to a lesser extent (or not at all) to what is playing on the TV.

In another embodiment, an event may have a certain dominance level associated with it based on its length, such that a shorter event is typically given a higher dominance level than a longer event. For example, the shorter event may be assumed to interrupt the user's experience corresponding to the longer event; thus, during the instantiation of the shorter event, it may be assumed that the user pays more attention to the experience corresponding to the shorter event.

Determining dominance levels of events may involve, in some embodiments, tracking users during the events. Tracking a user may be done utilizing various sensors that may detect movements and/or other actions performed by the user. Optionally, tracking the user is done at least in part by a software agent operating on behalf of the user. Additionally, the software agent may also be the entity that assigns dominance levels to at least some events involving the user on behalf of whom it operates.

In one example, eye tracking may be used to determine what the user is focusing on when measurements are taken with a sensor. Based on the eye tracking data, objects that are the target of attention of the user can be identified, and events involving those objects may receive a higher dominance level than events that do not involve those objects. In another example, a camera and/or other sensors may identify certain actions a user does, like typing a text message on a phone, in order to determine that an event involving composition of a text message should receive a higher dominance level than some other events instantiated at the same time (e.g., an event involving listening to a certain song). In yet another example, semantic analysis of what a user is saying may be used to determine whom the user is addressing (another person, a software agent, or an operating system), in order to determine what experience the user is focusing on at the time. In still another example, software systems with which a user interacts may provide indications of when such interaction takes place. When such an interaction takes place, it may be assumed that the focus of the user is primarily on the experience involved in the interaction (e.g., an operating system of an entertainment system) and to a lesser extent with other experiences happening at the same time.

Other information that may be used to determine dominance levels of events, in some embodiments, may come from other users who were faced with similar overlapping events. Optionally, the other users were monitored at the time, and the dominance levels assigned to their corresponding events are based on monitoring, such as in the examples given above.

In some embodiments, when the user experiences different consecutive dominant events, a certain time margin may be used when using values measured by a sensor to compute measurements of affective response corresponding to the events. The certain time margin may span a few seconds, to a few minutes or even more, depending on the type of sensors used. Optionally, the certain time margin may be used in order to try and avoid associating the affective response of a user to a first experience with the affective response of the user to a second experience that came before and/or after it. For example, if a user is eating in a restaurant (a first event) and the user receives a phone call that excites the user (a second event), it may be prudent not to use values measured by a sensor during the first minute or two after the call to compute a measurement of affective response corresponding to the meal. This is because the affective response of the user shortly after the phone call may be still related to the conversation the user had, and not so much to the meal. After a certain amount of time (e.g., a couple of minutes), the effects of the conversation may have diminished, and the affective response of the user is more likely to represent how the user feels about the meal.

In one embodiment, the certain time margin described above does not have a fixed duration, rather, it represents the time needed to return to a baseline or to return to at least a certain distance from a baseline. For example, if measurements of a user up to a certain event are at a certain level, and an intervening event causes the measurements to jump significantly, then after the intervening event, the margin in which measurements are not associated with the certain event may extend until the measurements return at least a certain distance to their prior level (e.g., at least 50% of the difference).

Descriptions of events are used in various embodiments in this disclosure. Typically, a description of an event may include values related to a user corresponding to the event, an experience corresponding to the event, and/or details of the instantiation of the event (e.g., the duration, time, location, and/or conditions of the specific instantiation of the event). Optionally, a description of an event may be represented as feature vector comprising feature values. Additionally or alternatively, a description of an event may include various forms of data such as images, audio, video, transaction records, and/or other forms of data that describe aspects of the user corresponding to the event, the experience corresponding to the event, and/or the instantiation of the event.

A description of a user includes values describing aspects of the user. Optionally, the description may be represented as a vector of feature values. Additionally or alternatively, a description of a user may include data such as images, audio, and/or video that includes the user. In some embodiments, a description of a user contains values that relate to general attributes of the user, which are often essentially the same for different events corresponding to the same user, possibly when having different experiences. Examples of such attributes may include demographic information about the user (e.g., age, education, residence, etc.). Additionally or alternatively, the description may include portions of a profile of the user. The profile may describe various details of experiences the user had, such as details of places in the real world or virtual worlds the user visited, details about activities the user participated in, and/or details about content the user consumed.

A description of an experience includes values describing aspects of the experience. Optionally, the description of the experience may be represented as a vector of feature values. Typically, the description of the experience contains values that relate to general attributes of the experience, which are often essentially the same for different events corresponding to the same experience, possibly even when it is experienced at different times and/or by different users. Examples of such information may include attributes related to the type of experience, such as its typical location, cost, difficulty, etc.

The description of an event $\tau$ may include feature values obtained from a description of the user corresponding to the event $\tau$ and/or a description of the experience corresponding to the event $\tau$. Additionally, the description of the event $\tau$ may include values that may vary between different events corresponding to the same experience as $\tau$. These values include values corresponding to the instantiation of the event $\tau$ during the specific time corresponding to $\tau$, when the user u had the experience e. Examples of such values may include the location corresponding to $\tau$ (where the user u had the experience e in the specific instantiation $\tau$), the duration corresponding to $\tau$ (how long the user u had the experience e in the specific instantiation $\tau$), and/or the time frame of $\tau$ (e.g., when $\tau$ started and/or ended). Optionally, the description of the event $\tau$ may include values related to situations the user was in during the time frame of $\tau$ (e.g., the user's mood, alertness, credit status, relationship status, and other factors that may influence the user's state of mind) Optionally, the description of $\tau$ may include values related to experiences the user had, such as the size of portion the user was served, the noise and/or cleanliness level in the user's room, how long it took to deliver a product to the user, and/or other attributes that may differ depending on the embodiment being considered.

In some embodiments, the description of an event $\tau$ may include information derived from monitoring of the user corresponding to $\tau$, such as actions the user is performing, things the user is saying, and/or what objects are capturing the attention of the user (e.g., as determined from eye tracking). Optionally, this information may be used to determine a dominance level of $\tau$, which may be used to determine to what extent the affective response of the user corresponding to $\tau$ is to be associated with the experience corresponding to $\tau$.

In some embodiments, a description of an event may include information pertaining to a measurement of affective response m corresponding to the event $\tau$ (also denoted $m_\tau$). Optionally, the information pertaining to the measurement includes information about one or more sensors used to measure the user corresponding to the event, such as operating parameters of the one or more sensors (e.g., settings used and/or durations of operation) and/or details regarding the processing of the data acquired by the one or more sensors. Additionally, the information in the description of the event $\tau$ may include the measurement $m_\tau$ itself or a product of it.

It is to be noted that the description of an event may include various types of values. The choice of which values to include in the description of the event may vary between embodiments and depend on the task at hand. In one example, a description of an event may include values represented as indicator values indicating whether certain aspects of an event are relevant to the event or not. Optionally, the description of an event may include values represented as real values indicative of the magnitude of certain aspects (where irrelevant aspects may be represented by a fixed value such as 0).

It is also to be noted that when a description of an event is represented by a feature vector, in different embodiments, there may be different ways to represent the same type of data. For example, in some embodiments, events involving corresponding experiences of different types may be all described as feature vectors in the same feature space (i.e., they all have the same dimensionality and features at a certain dimension related to the same attribute in all events). In other embodiments, each type of experience may have its own feature space (i.e., its own set of attributes). In such a case, processing events represented in different feature spaces may involve converting their representation into a representation involving a common feature space.

Various embodiments described herein involve collecting measurements of affective response of users to experiences (i.e., collecting measurements corresponding to events). Though in some embodiments it may be easy to determine who the users corresponding to the events are (e.g., via knowledge of which sensors, devices, and/or software agents provide the data), it may not always be easy to determine what are the corresponding experiences the users had. Thus, in some embodiments, it is necessary to identify the experiences users have and to be able to associate measurements of affective response of the users with respective experiences to define events. However, this may not always be easily done. In one example, it may not be clear to a system that monitors a user (e.g., a software agent) when the user has an experience and/or what the experience is. In another example, the identity of a user who has an experience may not be known (e.g., by a provider of an experience), and thus, it may be necessary to identify the user too. In general, determining who the user corresponding to an event and/or the experience corresponding to an event are referred to herein as identifying the event.

Identifying an event may also involve, in some embodiments, identifying details describing aspects of the event. Thus, the term "identifying an event" may also refer to determining one or more details related to an event, and as such, in some embodiments, "identifying an event" may be interpreted as "describing an event", and may be used with that term interchangeably. In one example, the one or more details may relate to the user corresponding to the event. In another example, the one or more details may relate to the experience corresponding to the event. And in yet another example, the one or more details may relate to the instantiation of the event.

In some embodiments, events are identified by a module referred to herein as an event annotator. Optionally, an event annotator is a predictor, and/or utilizes a predictor, to identify events. Optionally, the event annotator generates a description of an event. Identifying an event may involve various computational approaches applied to data from various sources, which are elaborated on further in section 5—Identifying Events.

In some embodiments, identifying events of a user is done, at least in part, by a software agent operating on behalf of the user (for more details on software agents see section 7—Software Agents). Optionally, the software agent may monitor the user and/or provide information obtained from monitoring the user to other parties. Optionally, the software agent may have access to a model of the user (e.g., a model comprising biases of the user), and utilize the model to analyze and/or process information collected from monitoring the user (where the information may be collected by the software agent or another entity). Thus, in some embodiments, an event annotator used to identify events of a user may be a module of a software agent operating on behalf of the user and/or an event annotator may be in communication with a software agent operating on behalf of the user.

In some embodiments, in order to gather this information, a software agent may actively access various databases that include records about the user on behalf of whom the software agent operates. For example, such databases may be maintained by entities that provide experiences to users and/or aggregate information about the users, such as content providers (e.g., search engines, video streaming services, gaming services, and/or hosts of virtual worlds), communication service providers (e.g., internet service providers and/or cellular service providers), e-commerce sites, and/or social networks.

In one embodiment, a first software agent acting on behalf of a first user may contact a second software agent, acting on behalf of a second user, in order to receive information about the first user that may be collected by the second software agent (e.g., via a device of the second user). For example, the second software agent may provide images of the first user that the first software agent may analyze in order to determine what experience the first user is having.

Events can have multiple measurements associated with them that are taken during various times. For example, a measurement corresponding to an event may comprise, and/or be based on, values measured when the user corresponding to the event starts having the experience corresponding to the event, throughout the period during which the user has the experience, and possibly sometime after having the experience. In another example, the measurement may be based on values measured before the user starts having the experience (e.g., in order to measure effects of anticipation and/or in order to establish a baseline value based on the measurement taken before the start). Various aspects concerning how a measurement of affective response corresponding to an event is computed are described in more detail at least in section 2—Measurements of Affective Response.

In some embodiments, measurements of affective response corresponding to an event, which are taken at different times and/or are based on values measured by sensors over different time frames, may be used to capture different aspects of the event. For example, when considering an event involving eating a meal, the event may have various corresponding measurements capturing different aspects of the experience of having the meal. A measurement of affective response based on values acquired while the meal is being brought to the table and before a user starts eating may capture an affective response to how the food looks, how it smells, and/or the size of the portion. A measurement of affective response based on values acquired while the user is eating may be associated with how the food tastes, its texture, etc. And a measurement of affective response based on values acquired after the user is done eating may express how the meal influences the body of the user (e.g., how it is digested, whether it causes the user to be lethargic or energetic, etc.).

Events may belong to one or more sets of events. Considering events in the context of sets of events may be done for one or more various purposes, in embodiments described herein. For example, in some embodiments, events may be considered in the context of a set of events in order to compute a crowd-based result, such as a score for an experience, based on measurements corresponding to the events in the set. In other embodiments, events may be considered in the context of a set of events in order to evaluate a risk to the privacy of the users corresponding to the events in the set from disclosing a score computed based on measurements of the users. Optionally, events belonging to a set of events may be related in some way, such as the events in the set of events all taking place during a certain period of time or under similar conditions. Additionally, it is possible in some embodiments, for the same event to belong to multiple sets of events, while in other embodiments, each event may belong to at most a single set of events.

In one embodiment, a set of events may include events corresponding to the same certain experience (i.e., instances where users had the experience). Measurements of affective response corresponding to the set of events comprise measurements of affective response of the users corresponding to the events to having the certain experience, which were taken during periods corresponding to the events (e.g., during the instantiation periods of the events or shortly after them).

In another embodiment, a set of events may be defined by the fact that the measurements corresponding to the set of events are used to compute a crowd-based result, such as a score for an experience. In one example, a set of events may include events involving users who ate a meal in a certain restaurant during a certain day. From measurements of the users corresponding to the events, a score may be derived, which represents the quality of meals served at the restaurant that day. In another example, a set of events may involve users who visited a location, such as a certain hotel, during a certain month, and a score generated from measurements of the affective response corresponding to the set of events may represent the quality of the experience of staying at the hotel during the certain month.

In yet another embodiment, a set of events may include an arbitrary collection of events that are grouped together for a purpose of a certain computation and/or analysis.

There are various ways in which events corresponding to an experience may be assigned to sets of events. In one example, all the events corresponding to an experience are assigned to a single set of events. In another example, events may be assigned to multiple sets of events based on various criteria, such as based on the time the events occurred (e.g., in the example above involving a stay at a hotel, each month may have its own set of events). Optionally, when a set of events includes events happening during a specific period of time, the period is not necessarily a single contiguous period. For example, one set of events may include events of a certain experience that happen on weekends while another set of events may include events of the experience that happen on weekdays.

In embodiments described herein, v often denotes the set of all events (e.g., all events that may be evaluated by a system). In some embodiments, the events in v may be assigned to various sets of events $V_i$, $1 \le i \le k$. Optionally, each event in v belongs to at least one set of events, such that $V = U_{i=1}^{k} V_i$. Optionally, each set of events $V_i$ includes events sharing one or more similar characteristics, such as events corresponding to the same experience that was experienced during a certain period of time. In some embodiments, each set of events $V_i$ contains distinct events, such that each event belongs to at most one set of events, while in other embodiments, the sets of events do not necessarily contain distinct events, such that there may be an event belonging to sets of events $V_i$ and $V_j$, where $i \ne j$. Additionally, it is possible in some embodiments for a measurement of affective response to correspond to multiple events (e.g., events belonging to different sets of events). For example, a measurement of affective response taken while a user is jogging in a park may correspond to a first set of events corresponding to an experience of being in the park, and it may also correspond to a second set of events corresponding to an experience of jogging.

In some embodiments, a user may provide multiple measurements of affective response that correspond to events in the same set of events; that is, $V_i$, for some $1 \le i \le k$, may include two tuples $\tau_1 = (u,e,m_1)$ and $\tau_2 = (u,e,m_2)$, for which $m_1$ may or may not equal $m_2$. Multiple measurements of the same user that correspond to the same set of events may occur for various reasons. In one embodiment, multiple measurements may be taken of a user corresponding to the same event. For example, a measurement of a user is taken every minute while the event lasts one hour. In another embodiment, there may be multiple events corresponding to the same user in the same set of events. For example, the set of events may include events in which users visit an establishment during a certain week, and in that week, a certain user visited the establishment multiple times, and each time one or more measurements of the user were taken.

Having users provide different numbers of measurements that correspond to events in a certain set of events may bias a score that is based on the corresponding set of events (i.e., the measurements corresponding to events belonging to the set). In particular, the score may be skewed towards users who provided a larger number of measurements and reflect values of their measurements in a possibly disproportionate way. Such cases in which a certain user provides multiple measurements that correspond to multiple events in the same set of events may be handled in various ways. In one example, the same weight is assigned to each of the multiple measurements, which may amount to ignoring the possible effects of using multiple measurements of the same user. In another example, each measurement of the multiple measurements of a user are weighted such that the sum of the weights of the multiple measurements of each user reaches a certain fixed weight; this enables each user who provided measurements corresponding to a set of events to make an equal contribution to a score computed based on the measurements corresponding to the set of events. In yet another example, multiple measurements of the certain user may be replaced by a single representative measurement, such as a measurement that has a value that is the average of the multiple measurements (which effectively reduces the multiple measurements to a single measurement).

In some embodiments, a set of events $V_i$, $1 \le i \le k$, may include no events corresponding to certain users. This is often the case when the measurements of affective response are taken over a long period, each with respect to one or more of multiple experiences. In such cases, it is not likely that every user has every experience corresponding to each set of events $V_i$ during a period of time corresponding to the set of events, or that every user will even have each of the experiences at all. For example, if v includes events involving eating meals at restaurants, and each set of events corresponds to meals eaten at a certain restaurant on a certain day, then it is not likely that a single user ate at all the restaurants on a particular day. Therefore, it is not likely to have a user who corresponds to each and every one of the sets of events. Furthermore, there may be one or more restaurants that the user never ate at, so that user will not correspond to any sets of events that involve an experience of eating at the one or more restaurants.

In some embodiments, a set of events $V_i$, $1 \le i \le k$, may include events corresponding to a single user (i.e., all events in the set involve the same user). However, in cases where the set of events is used to compute a crowd-based result, the number of users corresponding to events in the set of events is typically at least three, and often at least a larger number such as 5, 10, 25, 100, 1000, or more than 1000.

5—Identifying Events

In some embodiments, an event annotator is used to identify an event, such as determining who the user corresponding to the event is, what experience the user had, and/or certain details regarding the instantiation of the event. Optionally, the event annotator generates a description of the event.

Identifying events may involve utilizing information of one or more of various types of information and/or from one or more of various sources of information, as described below. This information may be used to provide context that can help identify at least one of the following: the user corresponding to the event, the experience corresponding to the event, and/or other properties corresponding to the event (e.g., characteristics of the instantiation of the experience involved in the event and/or situations of the user that are relevant to the event). Optionally, at least some of the information is collected by a software agent that monitors a user on behalf of whom it operates (as described in detail elsewhere in this disclosure). Optionally, at least some of the information is collected by a software agent that operates on behalf of an entity that is not the user corresponding to the event, such as a software agent of another user that shares the experience corresponding to the event with the user, is in the vicinity of the user corresponding to the event when the user has the experience corresponding to the event, and/or is in communication with the user corresponding to the event. Optionally, at least some of the information is collected by providers of experiences. Optionally, at least some of the information is collected by third parties that monitor the user corresponding to the event and/or the environment corresponding to the event. Following are some examples of types of information and/or information sources that may be used; other sources may be utilized in some embodiments in addition to, or instead of, the examples given below.

Location information. Data about a location a user is in and/or data about the change in location of the user (such as the velocity of the user and/or acceleration of the user) may be used in some embodiments to determine what experience the user is having. Optionally, the information may be obtained from a device of the user (e.g., the location may be determined by GPS). Optionally, the information may be obtained from a vehicle the user is in (e.g., from a computer related to an autonomous vehicle the user is in). Optionally, the information may be obtained from monitoring the user; for example, via cameras such as CCTV and/or devices of the user (e.g., detecting signals emitted by a device of the user such as Wi-Fi, Bluetooth, and/or cellular signals). In some embodiments, a location of a user may refer to a place in a virtual world, in which case, information about the location may be obtained from a computer that hosts the virtual world and/or may be obtained from a user interface that presents information from the virtual world to the user.

Images and other sensor information. Images taken from a device of a user, such as a smartphone or a wearable device such as a smart watch or a head-mounted augmented or virtual reality glasses may be analyzed to determine various aspects of an event. For example, the images may be used to determine what experience the user is having (e.g., exercising, eating a certain food, watching certain content). Additionally or alternatively, images may be used to determine where a user is, and a situation of the user, such as whether the user is alone and/or with company. Additionally or alternatively, detecting who the user is with may be done utilizing transmissions of devices of the people the user is with (e.g., Wi-Fi or Bluetooth signals their devices transmit).

There are various ways in which camera based systems may be utilized to identify events. In one example, camera based systems such as OrCam (http://www.orcam.com/) may be utilized to identify various objects, products, faces, and/or recognize text. In some embodiments, images may be utilized to determine the nutritional composition of food a user consumes. In another example, photos of meals may be utilized to generate estimates of food intake and meal composition, such as the approach described in Noronha, et al., "Platemate: crowdsourcing nutritional analysis from food photographs", *Proceedings of the 24th annual ACM symposium on User interface software and technology*, ACM, 2011.

In some embodiments, other sensors may be used to identify events, in addition to, or instead of, cameras. Examples of such sensors include microphones, accelerometers, thermometers, pressure sensors, and/or barometers may be used to identify aspects of users' experiences, such as what they are doing (e.g., by analyzing movement patterns) and/or under what conditions (e.g., by analyzing ambient noise, temperature, and/or pressure).

Time. Temporal information may be used to determine what experience a user is having. The temporal information may be expressed in various ways, such as an absolute time (e.g., 8:22 PM on Jan. 10, 2015), a relative time (e.g., 25 minutes after getting up), or a time portion of a recurring unit of time (e.g., Sunday, the last week of school, or breakfast time). Optionally, knowing the time period may assist in determining what certain experiences are possible and/or change beliefs about what experience the user had (e.g., by changing prior probabilities for certain experiences based on the time the user potentially had the experiences).

Motion Patterns. The growing number of sensors (e.g., accelerometers, sensor pressures, or gyroscopes) embedded in devices that are worn, carried, and/or implanted in users, may provide information that can help identify experiences the users are having (e.g., what activity a user is doing at the time). Optionally, this data may be expressed as time series data in which characteristic patterns for certain experiences may be sought. Optionally, the patterns are indicative of certain repetitive motion (e.g., motion patterns characteristic of running, biking, typing, eating, or drinking). Various approaches for inferring an experience from motion data are known in the art. For example, US patent application US20140278219 titled "System and Method for Monitoring Movements of a User", describes how motion patterns may be used to determine an activity the user is engaged in.

Measurements of Affective Response. In some embodiments, measurements of affective response of a user may provide information about what experience the user is having. In one example, the measurements may indicate an emotional state of the user (e.g., a mood the user is in), which may help identify what experience the user had (e.g., the user may be more likely to have certain experiences when in a certain mood, and/or certain experiences are likely to cause the user to be in a certain mood). In another example, the measurements of affective response may be used to determine a change in the physiological state of the user (e.g., a change in heart rate and respiration). These changes may be correlated with certain experiences the user might have had. In another example, the measurements of affective response may provide a time series of values, which may include certain patterns that can be compared with previously recorded patterns corresponding to known experiences.

Measurements of the Environment. Information that is indicative of the environment a user is in may also provide information about an experience the user is having. Optionally, at least some of the measurements of the environment are performed using a device of the user that contains one or more sensors that are used to measure or record the environment. Optionally, at least some of the measurements of the environment are received from sensors that do not belong to devices of the user (e.g., CCTV cameras, or air quality monitors). In one example, measurements of the environment may include taking sound bites from the environment (e.g., to determine whether the user is in a club, restaurant, or in a mall). In another example, images of the environment may be analyzed using various image analysis techniques such as object recognition, movement recognition, and/or facial recognition to determine where the user is, what the user is doing, and/or who the user is with. In yet another example, various measurements of the environment such as temperature, pressure, humidity, and/or particle counts for various types of chemicals or compounds (e.g. pollutants and/or allergens) may be used to determine where the user is, what the user is doing, and/or what the user is exposed to.

Objects/Devices with the User. Information about objects and/or devices in the vicinity of a user may be used to determine what experience a user is having. Knowing what objects and/or devices are in the vicinity of a user may provide context relevant to identifying the experience. For example, if a user packs fishing gear in the car, it means that the user will likely be going fishing while if the user puts a mountain bike on the car, it is likely the user is going biking. Information about the objects and/or devices in the vicinity of a user may come from various sources. In one example, at least some of this information is provided actively by objects and/or devices that transmit information identifying their presence. For example, the objects or devices may transmit information via Wi-Fi or Bluetooth signals. Optionally, some of the objects and/or devices may be connected via the Internet (e.g., as part of the Internet of Things). In another example, at least some of this information is received by transmitting signals to the environment and detecting response signals (e.g., signals from RFID tags embedded in the objects and/or devices). In yet another example, at least some of the information is provided by a software agent that monitors the belongings of a user. In still another example, at least some of the information is provided by analyzing the environment in which a user is in (e.g., image analysis and/or sound analysis). Optionally, image analysis may be used to gain specific characteristics of an experience. For example, a system of Noronha et al., described in "Platemate: crowdsourcing nutritional analysis from food photographs" in *Proceedings of the 24th annual ACM symposium on User interface software and technology* (2011), enables a user to identify and receive nutritional information involving food the user is about to eat based on images of the food.

Communications of the User. Information derived from communications of a user (e.g., email, text messages, voice conversations, and/or video conversations) may be used, in some embodiments, to provide context and/or to identify experiences the user has, and/or other aspects of events. These communications may be analyzed, e.g., using semantic analysis in order to determine various aspects corresponding to events, such as what experience a user has, a situation of a user (e.g., the user's mood and/or state of mind) In one embodiment, certain patterns of communications that are identified may correspond to certain experiences. Optionally, the patterns may involve properties such as the device or medium used to communicate, the recipient of communications, and/or the extent of the communications (e.g., duration, frequency, and/or amount of information communicated).

User Calendar/Schedule. A user's calendar that lists activities the user had in the past and/or will have in the future may provide context and/or to identify experiences the user has. Optionally, the calendar includes information such as a period, location, and/or other contextual information for at least some of the experiences the user had or will have. Optionally, at least some of the entries in the calendar are entered by the user. Optionally, at least some of the entries in the calendar are entered automatically by a software agent, possibly without prompting by the user or even knowledge of the user. Optionally, analysis of a calendar may be used to determine prior probabilities for having certain experiences at certain times and/or places.

Account Information. Information in various accounts maintained by a user (e.g., digital wallets, bank accounts, or social media accounts) may be used to provide context, identify events, and/or certain aspects of the events. Information on those accounts may be used to determine various aspects of events such as what experiences the user has (possibly also determining when, where, and with whom), situations the user is in at the time (e.g., determining that the user is in a new relationship and/or after a breakup). For example, transactions in a digital wallet may provide information of venues visited by a user, products purchased, and/or content consumed by the user. Optionally, the accounts involve financial transactions such as a digital wallet or a bank account. Optionally, the accounts involve content provided to the user (e.g., an account with a video streaming service and/or an online game provider). In some embodiments, an account may include medical records including genetic records of a user (e.g., a genetic profile that includes genotypic and/or phenotypic information). Optionally, the genetic information may be used to determine certain situations the user is in which may correspond to certain genetic dispositions (e.g., likes or dislikes of substances, a tendency to be hyperactive, or a predisposition for certain diseases).

Robotic Servers. In some embodiments, a robotic helper may provide information about experiences a user it is interacting with has. For example, a smart refrigerator may provide information about what food a user consumed. A masseuse robot may provide information of periods when it operated to give a massage, and identify whose user settings were used. In another example, an entertainment center may provide information regarding what content it provided the user and at what time (e.g., the name and time certain songs were streamed in a user's home audio system).

Experience Providers. An experience provider may provide information about an experience a user is having, such as the type of experience and/or other related information (e.g., specific details of attributes of events and/or attributes that are relevant). For example, a game console and/or system hosting a virtual world may provide information related to actions of the user and/or other things that happen to the user in the game and/or the virtual world (e.g., the information may relate to virtual objects the user is interacting with, the identity of other characters, and the occurrence of certain events such as losing a life or leveling up). In another example, a system monitoring and/or managing the environment in a "smart house" house may provide information regarding the environment the user is in.

There are various approaches known in the art for identifying, indexing, and/or searching events of one or more users, which may be utilized in embodiments described herein (e.g., to create event annotators described below). In one example, identifying events may be done according to the teachings described in U.S. Pat. No. 9,087,058 titled "Method and apparatus for enabling a searchable history of real-world user experiences", which describes a searchable history of real-world user experiences of a user utilizing data captured by a mobile computing device. In another example, identifying events may be done according to the teachings described in U.S. Pat. No. 8,762,102 titled "Methods and systems for generation and rendering interactive events having combined activity and location information", which describes identification of events based on sensor data of mobile devices.

To determine what events users have, and in particular what are the experiences corresponding to events, some embodiments may involve one or more event annotators to perform this task. In one embodiment, an event annotator receives information of one or more of the types or sources described above. For example, this information may include information about the location, time, movement patterns, measurements of affective response of a user, measurements of the environment, objects in the vicinity of a user, communications of a user, calendar entries of a user, account information of a user, and/or information obtained from a software agent and/or robotic server. Optionally, the information is analyzed and used to generate a sample comprising a vector of feature values that may describe an event. Optionally, the feature values describe characteristics of the user corresponding to the event and/or identify the user corresponding to the event. Optionally, the feature values describe characteristics of the experience corresponding to the event (e.g., describe characteristics determined from the information received by the event annotator), but do not explicitly identify the experience corresponding to the event. Optionally, the sample describes details of the event concerning aspects of the instantiation of the experience corresponding to the event, such as the location, duration, and/or other conditions in which the user corresponding to the event was in while having the experience corresponding to the event.

The term "feature values" is typically used herein to represent data that may be provided to a machine learning-based predictor. Thus, a description of an event may be converted to feature values in order to be used to identify events, as described in this section. Typically, but necessarily, feature values may be data that can be represented as a vector of numerical values (e.g., integer or real values), with each position in the vector corresponding to a certain feature. However, in some embodiments, feature values may include other types of data, such as text, images, and/or other digitally stored information.

Given an unlabeled sample, the event annotator may assign the unlabeled sample one or more corresponding labels, each label identifying an experience the user had. Optionally, the event annotator may provide values corresponding to the confidence and/or probability that the user had the experiences identified by at least some of the one or more labels.

In one embodiment, the one or more labels assigned by the event annotator are selected from a subset of a larger set of possible labels. Thus, the event annotator only considers a subset of the experiences for a certain sample. Optionally, the subset is selected based on some of the information received by the event annotator. In one example, a location described in the sample may be used to determine a subset of likely experiences for that location. Similarly, the time of the day or the day of the week may be used to determine a certain subset of likely experiences. In another example, a situation of the user corresponding to a sample (e.g., alone vs. with company, in a good mood vs. bad mood) may also be used to select a subset of the experiences that are most relevant. In yet another example, the objects and/or devices with the user may be used to select the subset. In still another example, external information such as billing information or a user's calendar may be used to select the subset (e.g., the information may indicate that the user had a certain experience on a given day, but not the exact time).

In some embodiments, generating a vector of feature values involves analyzing some of the information received by the event annotator using various predictors (e.g., classifiers). Optionally, the results of the analysis may be used as feature values in the vector of feature values. Optionally, the use of multiple predictors to generate feature values may simplify the event annotator's task (e.g., by reducing the feature space and/or generating more meaningful features), and in addition, it may enable the use of various ensemble based methods known in the art. In one example, time series data comprising measurements of affective response of a user is classified in order to determine a corresponding activity level profile (e.g., rest, moderate activity, or intense activity), or a mental activity profile (e.g., concentrating, relaxing, or sleeping). In another example, a measurement of affective response corresponding to an event is provided to an ESE in order to determine the emotional state of the user corresponding to the event, and the emotional state is represented as a feature value.

In some embodiments, certain feature values may represent a prediction with respect to a certain experience. For example, a feature value may include a predicted value indicating how well the set of objects with the user corresponding to the sample fits a certain experience. Optionally, the prediction may be based on combinations of objects observed in events from historical data. In another example, a feature value may represent how well a certain location and/or time of day may fit a certain experience. Optionally, such values may be determined based on historical data. For example, the historical data may be used to compute various probabilities of having experiences given the set of objects, time of day, and/or location by using Bayes' rule.

In some embodiments, certain feature values may represent a difference between a measurement value corresponding to the sample and a predicted measurement value for a certain experience. Optionally, the predicted measurement value is determined based on previous measurements of the user to the certain experience and/or to experiences of the same type (e.g., exercising or viewing content). Optionally, the predicted measurement value is determined based on measurements of users to the certain experience and/or to experiences of the same type (e.g., exercising or viewing content). Optionally, the predicted measurement value is obtained from an ESE.

To train one or more models used by a predictor utilized by an event annotator, in some embodiments, a training module utilizes training data comprising a collection of labeled samples as input to a machine learning-based model training algorithm. Optionally, the collection of labeled samples comprises samples with vectors of feature values describing events and each label corresponding to a sample represents an experience corresponding to the event described by the sample. Optionally, the event annotator selects as a label the experience whose corresponding predictor gave the highest value. In some embodiments, various types of machine learning-based predictors may be utilized by an event annotator. In one example, the predictor may be a multi-class classification algorithm (e.g., a neural network, a maximum entropy model, or a naive Bayes classifier) that assigns a sample with one or more labels corresponding to experiences. In another example, the event annotator may use multiple predictors, each configured to generate a value representing the probability that a sample corresponds to a certain experience. Optionally, the machine learning approaches that may be used to train the one or more models may be parametric approaches (e.g., maximum entropy models) or nonparametric (e.g., Multivariate kernel density estimation or histograms).

In some embodiments, an event annotator is trained with data comprising samples involving multiple users. Optionally, each sample includes feature values describing characteristics of the user corresponding to the sample. By having samples of multiple users, it is possible to leverage the wisdom of the crowd and use the event annotator to annotate events for users who never had the experiences corresponding to the events.

In other embodiments, an event annotator is trained with data comprising samples that primarily involve a certain user, and such may be considered a personalized event annotator for the certain user. Optionally, by primarily it is meant that most of the training weight of samples in the training data is attributed to samples corresponding to the certain user (i.e., they correspond to events involving the certain user). Optionally, by primarily it is meant that in the training data, the samples of no other user have a higher training weight than the training weight of the samples of the certain user. Herein, training weight of samples refers to the degree at which the samples influence the values of parameters in the model being trained on the samples. If all samples in the training data have the same weight, then the training weight of a set of samples may be considered equivalent to a proportion that equals the number of samples in the set divided by the total number of samples.

To identify what experiences a user has, in some embodiments, an event annotator may utilize personalized event annotators of other users. Thus, the event annotator may identify a certain experience that the certain user had, even if the event annotator was not trained on data comprising samples corresponding to the certain user and the certain experience, and/or even if the certain user never even had the certain experience before.

In one embodiment, an event annotator combines predictions of multiple personalized event annotators. Optionally, each personalized event annotator makes a vote for an experience corresponding to a sample, and the event annotator assigns the sample to the experience with the largest number of votes. Optionally, the results of the multiple personalized event annotators are combined using an ensemble learning method such as boosting.

In one embodiment, a personalized predictor is trained to predict a certain set of experiences. Optionally, one or more candidate labels for sample correspond to experiences for which the personalized predictor is trained. In such a case, the personalized event annotator may utilize prediction of other event annotators (e.g., personalized event annotators of other users) in order to make a prediction regarding what experience the user had.

6—Predictors and Emotional State Estimators

In some embodiments, a module that receives a query that includes a sample (e.g., a vector including one or more feature values) and computes a label for that sample (e.g., a class identifier or a numerical value), is referred to as a "predictor" and/or an "estimator". Optionally, a predictor and/or estimator may utilize a model to assign labels to samples. In some embodiments, a model used by a predictor and/or estimator is trained utilizing a machine learning-based training algorithm. Optionally, when a predictor and/or estimator return a label that corresponds to one or more classes that are assigned to the sample, these modules may be referred to as "classifiers".

The terms "predictor" and "estimator" may be used interchangeably in this disclosure. Thus, a module that is referred to as a "predictor" may receive the same type of inputs as a module that is called an "estimator", it may utilize the same type of machine learning-trained model, and/or produce the same type of output. However, as commonly used in this disclosure, the input to an estimator typically includes values that come from measurements, while a predictor may receive samples with arbitrary types of input. For example, a module that identifies what type of emotional state a user was likely in based on measurements of affective response of the user, is referred to herein as an Emotional State Estimator (ESE). Additionally, a model utilized by an ESE may be referred to as an "emotional state model" and/or an "emotional response model".

A sample provided to a predictor and/or an estimator in order to receive a label for it may be referred to as a "query sample" or simply a "sample". A value returned by the predictor and/or estimator, which it computed from a sample given to it as an input, may be referred to herein as a "label", a "predicted value", and/or an "estimated value". A pair that includes a sample and a corresponding label may be referred to as a "labeled sample". A sample that is used for the purpose of training a predictor and/or estimator may be referred to as a "training sample" or simply a "sample". Similarly, a sample that is used for the purpose of testing a predictor and/or estimator may be referred to as a "testing sample" or simply a "sample". In typical embodiments, samples used by the same predictor and/or estimator for various purposes (e.g., training, testing, and/or a query) are assumed to have a similar structure (e.g., similar dimensionality) and are assumed to be generated in a similar process (e.g., they undergo the same type of preprocessing).

In some embodiments, a sample for a predictor and/or estimator includes one or more feature values. Optionally, at least some of the feature values are numerical values (e.g., integer and/or real values). Optionally, at least some of the feature values may be categorical values that may be represented as numerical values (e.g., via indices for different categories). Optionally, the one or more feature values comprised in a sample may be represented as a vector of values. Various preprocessing, processing, and/or feature extraction techniques known in the art may be used to generate the one or more feature values comprised in a sample. Additionally, in some embodiments, samples may contain noisy or missing values. There are various methods known in the art that may be used to address such cases.

In some embodiments, a label that is a value returned by a predictor and/or an estimator in response to receiving a query sample, may include one or more types of values. For example, a label may include a discrete categorical value (e.g., a category), a numerical value (e.g., a real number), a set of categories and/or numerical values, and/or a multidimensional value (e.g., a point in multidimensional space, a database record, and/or another sample).

Predictors and estimators may utilize, in various embodiments, different types of models in order to compute labels for query samples. A plethora of machine learning algorithms is available for training different types of models that can be used for this purpose. Some of the algorithmic approaches that may be used for creating a predictor and/or estimator include classification, clustering, function prediction, regression, and/or density estimation Those skilled in the art can select the appropriate type of model and/or training algorithm depending on the characteristics of the training data (e.g., its dimensionality or the number of samples), and/or the type of value used as labels (e.g., a discrete value, a real value, or a multidimensional value).

In one example, classification methods like Support Vector Machines (SVMs), Naive Bayes, nearest neighbor, decision trees, logistic regression, and/or neural networks can be used to create a model for predictors and/or estimators that predict discrete class labels. In another example, methods like SVMs for regression, neural networks, linear regression, logistic regression, and/or gradient boosted decision trees can be used to create a model for predictors and/or estimators that return real-valued labels, and/or multidimensional labels. In yet another example, a predictor and/or estimator may utilize clustering of training samples in order to partition a sample space such that new query samples can be placed in one or more clusters and assigned labels according to the clusters to which they belong. In a somewhat similar approach, a predictor and/or estimator may utilize a collection of labeled samples in order to perform nearest neighbor classification (in which a query sample is assigned a label according to one or more of the labeled samples that are nearest to it when embedded in some space).

In some embodiments, semi-supervised learning methods may be used to train a model utilized by a predictor and/or estimator, such as bootstrapping, mixture models with Expectation Maximization, and/or co-training. Semi-supervised learning methods are able to utilize as training data unlabeled samples in addition to labeled samples.

In one embodiment, a predictor and/or estimator may return as a label one or more other samples that are similar to a given query sample. For example, a nearest neighbor approach method may return one or more samples that are closest in the data space to the query sample (and thus, in a sense, are most similar to it.)

In another embodiment, a predictor and/or estimator may return a value representing a probability of a sample according to a model utilized by the predictor and/or estimator. For example, the value may represent a probability of the sample according to a probability density function, which is described and/or defined by the model, and assigns probability values to at least some of the samples in the space of all possible samples. In one example, such a predictor may be a single class support vector machine, a naïve Bayes classifier, a graphical model (e.g., Bayesian network), or a maximum entropy model.

In addition to a label predicted for a query sample, in some embodiments, a predictor and/or an estimator may provide a value describing a level of confidence in the label computed for the query sample. In some cases, the value describing the confidence level may be derived directly from the computation process itself. For example, a predictor that is a classifier that selects a label for a given query sample may provide a probability or score according to which the specific label was chosen (e.g., a naïve Bayes' posterior probability of the selected label or a probability derived from the distance of the sample from the hyperplane when using an SVM).

In one embodiment, a predictor and/or estimator returns a confidence interval as a label or in addition to the label. Optionally, a confidence interval is a range of values and an associated probability that represents the chance that the true value corresponding to the label falls within the range of values. For example, if a prediction of a label is made according to an empirically determined normal distribution with a mean m and variance $\sigma^2$, the range $[m-2\sigma, m+2\sigma]$ corresponds approximately to a 95% confidence interval surrounding the mean value m.

Samples provided to a predictor and/or estimator, and/or that are used for training the predictor and/or estimator, may be generated from data that may be received from various sources and have various characteristics (e.g., the data may comprise numerical values, text, images, audio, video, and/or other types of data). In some embodiments, at least part of the data may undergo various forms of preprocessing in order to obtain the feature values comprised in the samples. Following are some non-limiting and non-exhaustive examples of preprocessing that data may undergo as part of generating a sample. Other forms of preprocessing may also be used in different embodiments described herein.

In some embodiments, data used to generate a sample may undergo filtration (e.g., removal of values that are below a threshold) and/or normalization. In one embodiment, normalization may include converting a value from the data into a binary value (e.g., the normalized value is zero if the original value is below a threshold and is one otherwise). In another embodiment, normalization may involve transforming and/or projecting a value from the data to a different set of co-ordinates or to a certain range of values. For example, real values from the data may be projected to the interval [0,1]. In yet another example, normalization may involve converting values derived from the data according to a distribution, such as converting them to z-values according to certain parameters of a normal distribution.

In some embodiments, data used to generate a sample may be provided to feature generation functions. Optionally, a feature generation function is a function that receives an input comprising one or more values comprised in the data and generates a value that is used as a feature in the sample.

In one embodiment, a feature generation function may be any form of predictor and/or estimator that receives at least some of the values comprised in the data used to generate the sample, and produces a result from which a feature value, comprised in the sample, is derived. For example, feature generation functions may involve various image analysis algorithms (e.g., object recognition algorithms, facial recognition algorithms, action recognition algorithms, etc.), audio analysis algorithms (e.g., speech recognition), and/or other algorithms. Additional examples of data sources and computation approaches that may be used to generate features are described in section 5—Identifying Events.

In another embodiment, a feature generation function may be a function that generates one or more feature values based on the value of a datum it is provided. For example, a feature generation function may receive a datum comprised in the data that has a value that belongs to a certain range (e.g., 0-10000 mg of sodium in food), and based on that value, the function will generate a certain indicator feature that has a value of one if the value of the datum is in a certain range, and zero otherwise. In this example, the feature generation function may select one of three features that will receive the value one: a first feature if the value of the datum is in the range 0-150, which may correspond to "low sodium", a second feature if the value of the datum is in the range 150-300, which may correspond to "medium sodium", and a third feature if the value of the datum is above 300, which may correspond to "high sodium".

In some embodiments, data used to generate a sample may be extensive and be represented by many values (e.g., high-dimensionality data) Having samples that are high-dimensional can lead, in some cases, to a high computational load and/or reduced accuracy of predictors and/or estimators that handle such data. Thus, in some embodiments, as part of preprocessing, samples may undergo one or more forms of dimensionality reduction and/or feature selection. For example, dimensionality reduction may be attained utilizing techniques such as principal component analysis (PCA), linear discriminant analysis (LDA), and/or canonical correlation analysis (CCA). In another example, dimensionality reduction may be achieved using random projections and/or locality-sensitive hashing. In still another example, a certain subset of the possible features may be selected to be used by a predictor and/or estimator, such as by various filter, wrapper, and/or embedded feature selection techniques known in the art.

In some embodiments, predictors and/or estimators may be described as including and/or utilizing models. A model that is included in a predictor and/or an estimator, and/or utilized by a predictor and/or an estimator, may include parameters used by the predictor and/or estimator to compute a label. Non-limiting examples of such parameters include: support vectors (e.g., used by an SVM), points in a multidimensional space (e.g., used by a Nearest-Neighbor predictor), regression coefficients, distribution parameters (e.g., used by a graphical model), topology parameters, and/or weight parameters (e.g., used by a neural network). When a model contains parameters that are used to compute a label, such as in the examples above, the terms "model", "predictor", and/or "estimator" (and derivatives thereof) may at times be used interchangeably herein. Thus, for example, language reciting "a model that predicts" or "a model used for estimating" is acceptable. Additionally, phrases such as "training a predictor" and the like may be interpreted as training a model utilized by the predictor.

Furthermore, when a discussion relates to parameters of a predictor and/or an estimator, this may be interpreted as relating to parameters of a model used by the predictor and/or estimator.

The type and quantity of training data used to train a model utilized by a predictor and/or estimator can have a dramatic influence on the quality of the results they produce. Generally speaking, the more data available for training a model, and the more the training samples are similar to the samples on which the predictor and/or estimator will be used (also referred to as test samples), the more accurate the results for the test samples are likely to be. Therefore, when training a model that will be used with samples involving a specific user, it may be beneficial to collect training data from the user (e.g., data comprising measurements of the specific user). In such a case, a predictor may be referred to as a "personalized predictor", and similarly, an estimator may be referred to as a "personalized estimator".

Training a predictor and/or an estimator, and/or utilizing the predictor and/or the estimator, may be done utilizing various computer system architectures. In particular, some architectures may involve a single machine (e.g., a server) and/or single processor, while other architectures may be distributed, involving many processors and/or servers (e.g., possibly thousands or more processors on various machines). For example, some predictors may be trained utilizing distributed architectures such as Hadoop, by running distributed machine learning-based algorithms. In this example, it is possible that each processor will only have access to a portion of the training data. Another example of a distributed architecture that may be utilized in some embodiments is a privacy-preserving architecture in which users process their own data. In this example, a distributed machine learning training algorithm may allow a certain portion of the training procedure to be performed by users, each processing their own data and providing statistics computed from the data rather than the actual data itself. The distributed training procedure may then aggregate the statistics in order to generate a model for the predictor.

In some embodiments, when a predictor and/or an estimator (e.g., an ESE), is trained on data collected from multiple users, its predictions of emotional states and/or response may be considered predictions corresponding to a representative user. It is to be noted that the representative user may in fact not correspond to an actual single user, but rather correspond to an "average" of a plurality of users.

It is to be noted that in this disclosure, referring to a module (e.g., a predictor, an estimator, an event annotator, etc.) and/or a model as being "trained on" data means that the data is utilized for training of the module and/or model. Thus, expressions of the form "trained on" may be used interchangeably with expressions such as "trained with", "trained utilizing", and the like.

In other embodiments, when a model used by a predictor and/or estimator (e.g., an ESE), is trained primarily on data involving a certain user, the predictor and/or estimator may be referred to as being a "personalized" or "personal" for the certain user. Herein, being trained primarily on data involving a certain user means that at least 50% of the training weight is given to samples involving the certain user and/or that the training weight given to samples involving the certain user is at least double the training weight given to the samples involving any other user. Optionally, training data for training a personalized ESE for a certain user is collected by a software agent operating on behalf of the certain user. Use by the software agent may, in some embodiments, increase the privacy of the certain user, since there is no need to provide raw measurements that may be more revealing about the user than predicted emotional responses. Additionally or alternatively, this may also increase the accuracy of predictions for the certain user, since a personalized predictor is trained on data reflecting specific nature of the certain user's affective responses.

In some embodiments, a label returned by an ESE may represent an affective value. In particular, in some embodiments, a label returned by an ESE may represent an affective response, such as a value of a physiological signal (e.g., skin conductance level, a heart rate) and/or a behavioral cue (e.g., fidgeting, frowning, or blushing). In other embodiments, a label returned by an ESE may be a value representing a type of emotional response and/or derived from an emotional response. For example, the label may indicate a level of interest and/or whether the response can be classified as positive or negative (e.g., "like" or "dislike"). In another example, a label may be a value between 0 and 10 indicating a level of how much an experience was successful from a user's perspective (as expressed by the user's affective response).

A predictor and/or an estimator that receives a query sample that includes features derived from a measurement of affective response of a user, and returns a value indicative of an emotional state corresponding to the measurement, may be referred to as a predictor and/or estimator of emotional state based on measurements, an Emotional State Estimator, and/or an ESE. Optionally, an ESE may receive additional values as input, besides the measurement of affective response, such as values corresponding to an event to which the measurement corresponds. Optionally, a result returned by the ESE may be indicative of an emotional state of the user that may be associated with a certain emotion felt by the user at the time such as happiness, anger, and/or calmness, and/or indicative of level of emotional response, such as the extent of happiness felt by the user. Additionally or alternatively, a result returned by an ESE may be an affective value, for example, a value indicating how well the user feels on a scale of 1 to 10.

In some embodiments, when a predictor and/or an estimator (e.g., an ESE), is trained on data collected from multiple users, its predictions of emotional states and/or response may be considered predictions corresponding to a representative user. It is to be noted that the representative user may in fact not correspond to an actual single user, but rather correspond to an "average" of a plurality of users.

In some embodiments, a label returned by an ESE may represent an affective value. In particular, in some embodiments, a label returned by an ESE may represent an affective response, such as a value of a physiological signal (e.g., skin conductance level, a heart rate) and/or a behavioral cue (e.g., fidgeting, frowning, or blushing). In other embodiments, a label returned by an ESE may be a value representing a type of emotional response and/or derived from an emotional response. For example, the label may indicate a level of interest and/or whether the response can be classified as positive or negative (e.g., "like" or "dislike"). In another example, a label may be a value between 0 and 10 indicating a level of how much an experience was successful from a user's perspective (as expressed by the user's affective response).

There are various methods that may be used by an ESE to estimate emotional states from a measurement of affective response. Examples of general purpose machine learning algorithms that may be utilized are given above in the general discussion about predictors and/or estimators. In addition, there are various methods specifically designed for estimating emotional states based on measurements of affective response. Some non-limiting examples of methods described in the literature, which may be used in some embodiments include: (i) physiological-based estimators as described in Table 2 in van den Broek, E. L., et al. (2010) "Prerequisites for Affective Signal Processing (ASP)—Part II." in: *Third International Conference on Bio Inspired Systems and Signal Processing, Biosignals* 2010; (ii) Audio- and image-based estimators as described in Tables 2-4 in Zeng, Z., et al. (2009) "A Survey of Affect Recognition Methods: Audio, Visual, and Spontaneous Expressions." in *IEEE Transaction on Pattern Analysis and Machine Intelligence*, Vol. 31(1), 39-58; (iii) emotional state estimations based on EEG signals may be done utilizing methods surveyed in Kim et al. (2013) "A review on the computational methods for emotional state estimation from the human EEG" in Computational and mathematical methods in medicine, Vol. 2013, Article ID 573734; (iv) emotional state estimations from EEG and other peripheral signals (e.g., GSR) may be done utilizing the teachings of Chanel, Guillaume, et al. "Emotion assessment from physiological signals for adaptation of game difficulty" in *IEEE Transactions on Systems, Man and Cybernetics, Part A: Systems and Humans*, 41.6 (2011): 1052-1063; and/or (v) emotional state estimations from body language (e.g., posture and/or body movements), may be done using methods described by Dael, et al. (2012), "Emotion expression in body action and posture", in *Emotion,* 12(5), 1085.

In some embodiments, an ESE may make estimations based on a measurement of affective response that comprises data from multiple types of sensors (often referred to in the literature as multiple modalities). This may optionally involve fusion of data from the multiple modalities. Different types of data fusion techniques may be employed, for example, feature-level fusion, decision-level fusion, or model-level fusion, as discussed in Nicolaou et al. (2011), "Continuous Prediction of Spontaneous Affect from Multiple Cues and Modalities in Valence-Arousal Space", *IEEE Transactions on Affective Computing*. Another example of the use of fusion-based estimators of emotional state may be found in Schels et al. (2013), "Multi-modal classifier-fusion for the recognition of emotions", Chapter 4 in *Coverbal Synchrony in Human Machine Interaction*. The benefits of multimodal fusion typically include more resistance to noise (e.g., noisy sensor measurements) and missing data, which can lead to better affect detection when compared to affect detection from a single modality. For example, in meta-analysis described in D'mello and Kory (2015) "A Review and Meta-Analysis of Multimodal Affect Detection Systems" in *ACM Computing Surveys* (CSUR) 47.3: 43, multimodal affect systems were found to be more accurate than their best unimodal counterparts in 85% of the systems surveyed.

In one embodiment, in addition to a measurement of affective response of a user, an ESE may receive as input a baseline affective response value corresponding to the user. Optionally, the baseline affective response value may be derived from another measurement of affective response of the user (e.g., an earlier measurement) and/or it may be a predicted value (e.g., based on measurements of other users and/or a model for baseline affective response values). Accounting for the baseline affective response value (e.g., by normalizing the measurement of affective response according to the baseline), may enable the ESE, in some embodiments, to more accurately estimate an emotional state of a user based on the measurement of affective response.

In some embodiments, an ESE may receive as part of the input (in addition to a measurement of affective response), additional information comprising feature values related to the user, experience and/or event to which the measurement corresponds. Optionally, additional information is derived from a description of an event to which the measurement corresponds.

In one embodiment, the additional information is used to provide context for the measurement with respect to the user, experience, and/or event to which the measurement corresponds. For example, the context may relate to specific characteristics of the user, experience, and/or event to which the measurement corresponds, which when considered by the ESE, may make its estimated emotional state more accurate with respect to the user, experience, and/or event to which the measurement corresponds. Knowing context related to a measurement may be helpful since depending on the sensors used, in some embodiments, it may be the case that in different conditions the same signal values may correspond to different emotions (e.g., extreme excitement or high stress). Knowing the context (e.g., playing a difficult level in a game or hearing a noise when alone in a dark parking lot) can assist in deciding which emotion the user is having.

Context may be given by identifying a situation the user was in when the measurement was taken. Examples of situations may include a mood of the user, a health state of the user, the type of activity the user is partaking in (e.g., relaxing, exercising, working, and/or shopping), the location the user is at (e.g., at home, in public, or at work), and/or the alertness level of the user. The additional situation information may be used by the ESE to improve the estimation of the emotional state of the user from the measurement. In one example, the ESE may normalize values according to the situation (e.g., according to situation-specific baselines). In another example, the ESE may select certain models to use based on the additional information (e.g., selecting a situation-specific model according with which the measurement of affective response is processed). For example, separate models may be used by an ESE for different situations a user is in, such as being at home vs. outside, or for when the user is alone vs. in a group. In still another example, separate models may be used for different types of experiences. For example, a first model may be used for determining emotional states from measurements of affective response to experiences that are considered primarily physical activities (e.g., cycling or jogging), while a second model may be used for experiences that may be considered primarily mental activities (e.g., learning).

In one embodiment, additional information received by an ESE may include information derived from semantic analysis of communications of a user. The choice of words a user uses to communicate (in addition to the way the user says the words), may be indicative of the emotion being expressed. For example, semantic analysis may help determine whether a user is very excited or very angry. It is to be noted that semantic analysis is interpreted as determining the meaning of a communication based on its content (e.g., a textual representation of a communication), and not from features related to how a user makes the communication (e.g., characteristics of the user's voice which may be indicative of an emotional state).

In another embodiment, additional information received by an ESE may include information derived from tracking actions of the user, and/or from eye tracking data of the user that indicates what the user is doing and/or to what the user is paying attention.

In still another embodiment, additional information received by an ESE may include information derived from measurements of the environment the user is in. For example, the additional information may include values that are indicative of one or more of the following environmental parameters: the temperature, humidity, precipitation levels, noise level, air pollution level, allergen levels, time of day, and ambient illumination level.

In some embodiments, an ESE may be utilized to evaluate, from measurements of affective response of one or more users, whether the one or more users are in an emotional state that may be manifested via a certain affective response. Optionally, the certain affective response is manifested via changes to values of at least one of the following: measurements of physiological signals of the one or more users, and measurements of behavioral cues of the one or more users. Optionally, the changes to the values are manifestations of an increase or decrease, to at least a certain extent, in a level of at least one of the following emotions: pain, anxiety, annoyance, stress, aggression, aggravation, fear, sadness, drowsiness, apathy, anger, happiness, contentment, calmness, attentiveness, affection, and excitement. Optionally, an ESE is utilized to detect an increase, to at least a certain extent, in the level of at least one of the aforementioned emotions.

In one embodiment, determining whether a user experiences a certain affective response is done utilizing a model trained on data comprising measurements of affective response of the user taken while the user experienced the certain affective response (e.g., measurements taken while the user was happy or sad). Optionally, determining whether a user experiences a certain affective response is done utilizing a model trained on data comprising measurements of affective response of other users taken while the other users experienced the certain affective response.

In some embodiments, certain values of measurements of affective response, and/or changes to certain values of measurements of affective response, may be universally interpreted as corresponding to being in a certain emotional state. For example, an increase in heart rate and perspiration (e.g., measured with GSR) may correspond to an emotional state of fear. Thus, in some embodiments, any ESE may be considered "generalized" in the sense that it may be used successfully for estimating emotional states of users who did not contribute measurements of affective response to the training data. In other embodiments, the context information described above, which an ESE may receive, may assist in making the ESE generalizable and useful for interpreting measurements of users who did not contribute measurements to the training data and/or for interpreting measurements of experiences that are not represented in the training data.

In one embodiment, a personalized ESE for a certain user may be utilized to interpret measurements of affective response of the certain user. Optionally, the personalized ESE is utilized by a software agent operating on behalf of the certain user to better interpret the meaning of measurements of affective response of the user. For example, a personalized ESE may better reflect the personal tendencies, idiosyncrasies, unique behavioral patterns, mannerisms, and/or quirks related to how a user expresses certain emotions. By being in position in which it monitors a user over long periods of time, in different situations, and while having different experiences, a software agent may be able to observe affective responses of "its" user (the user on behalf of whom it operates) when the user expresses various emotions. Thus, the software agent can learn a model describing how the user expresses emotion, and use that model for personalized ESE that might, in some cases, "understand" its user better than a "general" ESE trained on data obtained from multiple users.

Training a personalized ESE for a user may require acquiring appropriate training samples. These samples typically comprise measurements of affective response of the user (from which feature values may be extracted) and labels corresponding to the samples, representing an emotional response the user had when the measurements were taken. Inferring what emotional state the user was in, at a certain time measurements were taken, may be done in various ways.

In one embodiment, labels representing emotional states may be self-reported by a user stating how the user feels at the time (e.g., on a scale of 1 to 10). For example, a user may declare how he or she is feeling, select an image representing the emotion, and/or provide another form of rating for his or her feelings. Optionally, the user describes his or her emotional state after being prompted to do so by the software agent.

In another embodiment, labels representing emotional states may be determined by an annotator that observes the user's behavior and/or measurements of affective response of the user. Optionally, the annotator may be a human (e.g., a trained professional and/or a person who is part of a crowd-sourced workforce such as Amazon's Mechanical Turk). Optionally, the annotator may be a software agent that utilizes one or more predictors and/or estimators, such as ESEs.

In still another embodiment, labels representing emotional states may be derived from communications of the user. For example, semantic analysis may be used to determine the meaning of what the user says, writes, and/or communicates in other ways (e.g., via emojis and/or gestures).

In yet another embodiment, labels representing emotional states may be derived from actions of the user. For example, US patent application publication US 2014/0108309, describes various approaches for determining emotional response from actions such as voting on a social network site or interacting with a media controller.

One approach, which may be used in some embodiments, for addressing the task of obtaining labeled samples for training a personalized predictor and/or estimator is to use a form of bootstrapping. In one example, a software agent (or another module) that is tasked with training a personalized ESE for a certain user may start off by utilizing a general ESE to determine emotional states of the user. These labeled samples may be added to a pool of training samples used to train the personalized ESE. As the body of labeled samples increases in size, the estimator trained on them will begin to represent the particular characteristics of how the user expresses emotions. Eventually, after a sufficiently large body of training samples is generated, it is likely that the personalized ESE will perform better than a general ESE on the task of identifying the emotional state of the user based on measurements of the affective response of the user.

7—Software Agents

As used herein, "software agent" may refer to one or more computer programs that operate on behalf of an entity. For example, an entity may be a person, a group of people, an institution, a computer, and/or computer program (e.g., an artificial intelligence). Software agents may be sometimes referred to by terms including the words "virtual" and/or "digital", such as "virtual agents", "virtual helpers", "digital assistants", and the like. In this disclosure, software agents are typically referred to by the reference numeral 108, which may be used to represent the various forms of software agents described below.

In some embodiments, a software agent acting on behalf of an entity is implemented, at least in part, via a computer program that is executed with the approval of the entity. The approval to execute the computer program may be explicit, e.g., a user may initiate the execution of the program (e.g., by issuing a voice command, pushing an icon that initiates the program's execution, and/or issuing a command via a terminal and/or another form of a user interface with an operating system). Additionally or alternatively, the approval may be implicit, e.g., the program that is executed may be a service that is run by default for users who have a certain account and/or device (e.g., a service run by an operating system of the device). Optionally, explicit and/or implicit approval for the execution of the program may be given by the entity by accepting certain terms of service and/or another form of contract whose terms are accepted by the entity.

In some embodiments, a software agent operating on behalf of an entity is implemented, at least in part, via a computer program that is executed in order to advance a goal of the entity, protect an interest of the entity, and/or benefit the entity. In one example, a software agent may seek to identify opportunities to improve the well-being of the entity, such as identifying and/or suggesting activities that may be enjoyable to a user, recommending food that may be a healthy choice for the user, and/or suggesting a mode of transportation and/or route that may be safe and/or time saving for the user. In another example, a software agent may protect the privacy of the entity it operates on behalf of, for example, by preventing the sharing of certain data that may be considered private data with third parties. In another example, a software agent may assess the risk to the privacy of a user that may be associated with contributing private information of the user, such as measurements of affective response, to an outside source. Optionally, the software agent may manage the disclosure of such data, as described in more detail elsewhere in this disclosure.

In some embodiments, a software agent operating on behalf of a user, such as the software agent 108, may utilize a crowd-based result generated based on measurements of affective response of multiple users, such as the measurements 110. The crowd-based result may comprise one or more of the various types of results described in this disclosure, such as a score for an experience, a ranking of experiences, and/or parameters of a function learned based on measurements of affective response. Optionally, the crowd-based result is generated by one of the modules described herein, which utilize measurements of multiple users to compute the result, such as the scoring module 150, the ranking module 220, and/or other modules. Optionally, the software agent utilizes the crowd-based result in order to suggest an experience to the user (e.g., a vacation destination, a restaurant, or a movie to watch), enroll the user in an experience (e.g., an activity), and/or decline (on behalf of the user) participation in a certain experience. It is to be noted that, in some embodiments, the crowd-based result may be based on a measurement of affective response contributed by the user (in addition to other users), while in other embodiments, the crowd-based result may be generated based on measurements that do not include a measurement of affective response of the user.

A software agent may operate with at least some degree of autonomy, in some of the embodiments described herein, and may be capable of making decisions and/or taking actions in order to achieve a goal of the entity of behalf of whom it operates, protect an interest of the entity, and/or benefit the entity. Optionally, a computer program executed to implement the software agent may exhibit a certain degree of autonomous behavior; for example, it may perform certain operations without receiving explicit approval of the entity on behalf of whom it operates each time it performs the certain operations. Optionally, these actions fall within the scope of a protocol and/or terms of service that are approved by the entity.

A software agent may function as a virtual assistant and/or "virtual wingman" that assists a user by making decisions on behalf of a user, making suggestions to the user, and/or issuing warnings to the user. Optionally, the software agent may make the decisions, suggestions, and/or warnings based on a model of the users' biases. Optionally, the software agent may make decisions, suggestions, and/or warnings based on crowd-based scores for experiences. In one example, the software agent may suggest to a user certain experiences to have (e.g., to go biking in the park), places to visit (e.g., when on a vacation in an unfamiliar city), and/or content to select. In another example, the software agent may warn a user about situations that may be detrimental to the user or to the achievement of certain goals of the user. For example, the agent may warn about experiences that are bad according to crowd-based scores, suggest the user take a certain route to avoid traffic, and/or warn a user about excessive behavior (e.g., warn when excessive consumption of alcohol is detected when the user needs to get up early the next day). In still another example, the software agent may make decisions for the user on behalf of whom it operates and take actions accordingly, possibly without prior approval of the user. For example, the software agent may make a reservation for a user (e.g., to a restaurant), book a ticket (e.g., that involves traveling a certain route that is the fastest at the time), and/or serve as a virtual secretary, which filters certain calls to the user (e.g., sending voicemail) and allows others to get through to the user.

In some embodiments, a software agent may assist a user in "reading" certain situations. For example, a software agent may indicate to a user affective response of other people in the user's vicinity and/or people the user is communicating with. This type of feature may be especially helpful for users who may have difficulties detecting social cues, such as users who have a condition on the autistic spectrum. In another example, the software agent may suggest an alternative phrasing to one selected by a user and/or warn the user about a phrasing the user intends to use in a communication in order to better advance a goal of the user, such as social acceptance of the user, and/or avoiding the offending others. In still another example, a software agent may suggest to a user to change a demeanor of the user, such as a tone of voice, facial expression, use of body language, and/or maintaining of a certain distance from other people the user is conversing with. Optionally, the suggestion is made by detecting the affective response of a person the user is communicating with.

In some embodiments, depending on settings and/or a protocol that governs the operation of the software agent, the software agent may be active (i.e., autonomous) or passive when it comes to interacting with a user on behalf of whom it operates. For example, the software agent may be passive and typically require activation in order to interact with a user, e.g., by making a suggestion and/or issuing a warning. Examples of different activations of a software agent include making a certain gesture, pushing a button, and/or saying a certain catchphrase like "OK Google", "Hey Cortana", or "Hey Sin". Optionally, even when being passive, the software agent may still monitor the user and/or perform other operations on behalf of the user. Optionally, a software agent may be active and interact with a user without necessarily being prompted to do so by the user. Optionally, the software agent may be active for some purposes and interact with a user based on an autonomous decision (e.g., the software agent issues a warning about a situation that compromises the user's safety when it is detected). However, the software agent may be passive in other situations that involve interaction with the user (e.g., the software agent suggests experiences for the user only when prompted to do so by the user).

Communication between a software agent and a user on behalf of whom the software agent operates may take various forms in different embodiments described herein. Following is a non-limiting and non-exhaustive list of examples; in some embodiments other forms of communication may be used in addition to, or instead of these examples. In one example, communication between a software agent and a user on behalf of whom it operates involves sending textual messages such as emails, SMSs, social media messages, and/or other forms of text content. In another example, communication between a software agent and a user on behalf of whom it operates involves displaying a message on display of the user, such as a monitor, a handheld device, a wearable device with a screen, an augmented reality and/or virtual reality display, and/or another form of device that may convey visual data to the user's brain (e.g., neural implants). Optionally, the message may include 2D and/or 3D images. Optionally, the message may include 2D and/or 3D videos. Optionally, the messages may include sound that is provided via a speaker that emits sound waves and/or vibrational signals (e.g., involving bone conduction). In another example, communication between a software agent and a user on behalf of whom it operates may involve haptic signals, such as applying pressure, heat, electrical current, and/or vibrations by a device or garment worn by the user, and/or a device implanted in the user. In yet another example, communication between a software agent and a user on behalf of whom it operates may involve exciting areas in the brain of the user in order to generate electrical signals in the user (e.g., involving synaptic signaling), which are interpreted by the user as information.

There are also various ways in which a user may communicate with a software agent in embodiments described herein. Following is a non-limiting and non-exhaustive list of examples; in some embodiments other forms of communication may be used in addition to, or instead of these examples. In one example, a user may communicate with a software agent via a user interface that involves providing a textual message such as by typing a message (e.g., on a keyboard or touchscreen) and/or writing a message (e.g., that is interpreted using a camera, touch screen, or a smart pen that tracks movements of the pen). Additionally or alternatively, the user interface may involve pointing and/or selecting objects presented on a screen (e.g., via touching the screen or using a pointing device such as a computer mouse). In another example, a user may communicate with a software agent by tracing (e.g., by tracing a finger on a touchscreen or in the air). In yet another example, a user may communicate with a software agent by making sounds, e.g., by speaking, whistling, clapping and/or making other sounds that may be detected using a microphone. In still another example, a user may communicate by making gestures, such as pointing or moving hands, making facial expressions, sign language, and/or making other movements that may be detected using a camera, a motion sensor, an accelerometer, and/or other sensors that may detect movement. Optionally, the gestures may involve movements the user's tongue in the user's mouth, the clicking of teeth, and/or various forms of subvocalization that may be detected by sensors such as movement sensors, microphones, and/or pressure sensors. And in another example, a user may communicate with a software agent by thinking certain thoughts that may be detected by a device that reads electrical signals in the brain. Optionally, the certain thoughts correspond to electrical signals in the brain that have characteristic patterns (e.g., certain amplitudes and/or excitation in certain areas of the brain). Optionally, the electrical signals are read via EEG, and interpreted using signal processing algorithms in order to determine the meaning of the user's thought (e.g., a desire of the user for a certain object, a certain action, and/or to move in a certain direction).

In some embodiments, communication between a software agent and a user may be done in such a way that the content exchanged between the software agent and the user (and/or vice versa) may not be known to an entity that is not the user or the software agent, even if the entity is in the vicinity of the user at the time of communication. For example, the software agent may send a message displayed on augmented reality glasses and/or play message via headphones. In another example, a user may communicate with a software agent via subvocalization and/or selecting of options by pointing at a virtual menu seen using augmented reality glasses. Optionally, the communication may take place in such a way that an entity that is in the vicinity of the user is not likely to identify that such a communication is taking place.

In some embodiments, a software agent, and/or one or more of the programs it may comprise, may simultaneously operate on behalf of multiple entities. In one example, a single process running on a CPU or even a single execution thread, may execute commands that represent actions done on behalf of multiple entities. In another example, a certain running program, such as a server that responds to queries, may be considered comprised in multiple software agents operating on behalf of multiple entities.

In some embodiments, a single service, which in itself may involve multiple programs running on multiple servers, may be considered a software agent that operates on behalf of a user or multiple users. Optionally, a software agent may be considered a service that is offered as part of an operating system. Following are some examples of services that may be considered software agents or may be considered to include a software agent. In one example, a service simply called "Google", "Google Now", or some other variant such as "Google Agent" may be services that implement software agents on behalf of users who have accounts with Google™. Similarly, Siri® or "Proactive Assistant" may be considered software agents offered by Apple™. In another example, "Cortana" may be considered a software agent offered by Microsoft™. And in another example, "Watson" may be considered a software agent offered by IBM™.

Implementation of a software agent may involve executing one or more programs on a processor that belongs to a device of a user, such as a processor of a smartphone of the user or a processor of a wearable and/or implanted device of the user. Additionally or alternatively, the implementation of a software agent may involve execution of at least one or more programs on a processor that is remote of a user, such as a processor belonging to a cloud-based server.

As befitting this day and age, users may interact with various devices and/or services that involve computers. A non-limiting list of examples may include various computers (e.g., wearables, handled devices, and/or servers on the cloud), entertainment systems (e.g., gaming systems and/or media players), appliances (e.g., connected via Internet of Things), vehicles (e.g., autonomous vehicles), and/or robots (e.g., service robots). Interacting with each of the services and/or devices may involve programs that communicate with the user and may operate on behalf of the user. As such, in some embodiments, a program involved in such an interaction is considered a software agent operating on behalf of a user. Optionally, the program may interact with the user via different interfaces and/or different devices. For example, the same software agent may communicate with a user via a robot giving the user a service, via a vehicle the user is traveling in, via a user interface of an entertainment system, and/or via a cloud based service that utilizes a wearable display and sensors as an interface.

In some embodiments, different programs that operate on behalf of a user and share data and/or have access to the same models of the user may be considered instantiations of the same software agent. Optionally, different instantiations of a software agent may involve different methods of communication with the user. Optionally, different instantiations of a software agent may have different capabilities and/or be able to obtain data from different sources.

Various embodiments described herein require monitoring of users. This may be done for various purposes, such as computing crowd-based results and/or modeling users. Optionally, monitoring users may involve identifying events in which the users are involved (e.g., as described in section 5—Identifying Events). In some embodiments, such monitoring may involve a central entity that receives measurements of affective response of one or more users (and in some cases many users) to one or more experiences (possibly many experiences, such as dozens, hundreds, thousands or more). Collecting this information on a large scale may be challenging since it is typically done automatically, possibly without active intervention by users. This may require extensive monitoring of users, not only in order to acquire measurements of affective response, but also to identify other aspects of an event. In some embodiments, in order to identify an event, there is a need to identify the users who contribute the measurements and also the experiences to which the measurements correspond. In some embodiments, identifying an experience may be relatively easy since it may be based on digital transactions, for example, identifying that a user flew on an airplane may be done based on booking data, financial transactions, and/or electromagnetic transmission of a device of a user. However, in other embodiments it may be more difficult (e.g., if the experience involves chewing a piece of gum). Additionally, information about the situation a user is in, which may be needed in some embodiments, such as when considering biases and/or situation-dependent baselines, may also be difficult to come by (e.g., detecting various aspects such as a mood of the user, whether the user is with other people, or whether the user is late to an activity).

Coming by the diverse information described above may be difficult for a central entity since it may require extensive monitoring of users, which may be difficult for a central entity to perform and/or undesirable from a user's standpoint (e.g., due to security and privacy concerns). Therefore, in some embodiments, information about events that may be used to compute scores and/or model users is provided, at least in part, by software agents operating on behalf of the users. Optionally, the software agents may operate according to a protocol set by the users and/or approved by the users. Such a protocol may govern various aspects that involve user privacy, such as aspect concerning what data is collected about a user and the user's environment, under what conditions and limitations the data is collected, how the data is stored, and/or how the data is shared with other parties and for what purposes.

By operating on behalf of users, and possibly receiving abundant information from the users, e.g., from devices of the users and/or activity of the users, software agents may be able to determine various aspects concerning events such as identifying experiences the users are having, situations the users are in, and/or other attributes. This information may come from a wide range of different sources, as mentioned in section 5—Identifying Events.

In some embodiments, at least some of the data collected from monitoring users is collected as part of life logging of the users, which involves recording various aspects of the users' day to day life. Optionally, a software agent may participate in performing life logging of a user on behalf it operates and/or the software agent may have access to data collected through life logging of the user.

In some cases, providing a central entity with some, or all, of the aforementioned information may not be feasible (e.g., it may involve excessive transmission) and/or may not be desirable from data security and/or privacy perspectives. For example, if the central entity is hacked, this may jeopardize the privacy of many users. In addition, monitoring users to the extent described in some of the embodiments described above may make some users uncomfortable. Thus, a software agent that operates on behalf of a user and monitors the user may be a feasible solution that can make some users feel more at ease, especially if the user can control some, or all, aspects of the software agent's actions regarding data collection, retention, and/or sharing.

Thus, in some embodiments, a software agent may provide an entity that computes scores for experiences from measurements of affective response with information related to events. Optionally, information related to an event, which is provided by the software agent, identifies at least one of the following values: the user corresponding to the event, the experience corresponding to the event, a situation the user was in when the user had the experience, and a baseline value of the user when the user had the experience. Additionally or alternatively, the software agent may provide a measurement of affective response corresponding to the event (i.e., a measurement of the user corresponding to the event to having an experience corresponding to the event, taken during the instantiation of the event or shortly after that). In some embodiments, information provided by a software agent operating on behalf of a user, which pertains to the user, may be considered part of a profile of the user.

In some embodiments, a software agent may operate based on a certain protocol that involves aspects such as the type of monitoring that may be performed by the software, the type of data that is collected, how the data is retained, and/or how it is utilized. Optionally, the protocol is determined, at least in part, by a user on behalf of whom the software agent operates. Optionally, the protocol is determined, at least in part, by an entity that is not a user on behalf of whom the software agent operates (e.g., the entity is a recipient of the measurements that computes a crowd-based result such as a score for an experience). Optionally, the protocol is approved by a user on behalf of whom the software agent operates (e.g., the user accepted certain terms of use associated with the software agent).

The protocol according to which a software agent operates may dictate various restrictions related to the monitoring of users. For example, the restrictions may dictate the identity of users that may be monitored by a software agent. In one example, an agent may be restricted to provide information only about users that gave permission for this action. Optionally, these users are considered users on behalf of whom the software agent operates. In another example, the protocol may dictate that no identifying information about users, who are not users on behalf of whom the software agent operates, may be collected. In another example, the protocol may dictate certain conditions for collecting information about users. For example, the protocol may dictate that certain users may be monitored only in public areas. In another example, the protocol may dictate that certain users may be monitored at certain times. In still another example, the protocol may dictate that certain users may be monitored when having certain experiences. In one embodiment, a protocol may dictate what type of information may be collected with respect to certain users, locations, and/or experiences. For example, the protocol may dictate that when a user is in private surroundings (e.g., a bedroom or bathroom), the software agent may not collect data using cameras and/or microphones.

The protocol may dictate what type of information may be provided by the software agent to another entity, such as an entity that uses the information to compute crowd-based results such as scores for experiences. For example, the software agent may be instructed to provide information related to only certain experiences. Optionally, the extent of the information the software agent monitors and/or collects might be greater than the extent of the information the software agent provides. For example, in order to perform better modeling of the user on behalf of whom it operates, a software agent may collect certain data (e.g., private data), that does not get passed on to other parties. Additionally, a protocol may dictate the extent of information that may be provided by limiting the frequency and/or number of measurements that are provided, limiting the number of experiences to which the measurements correspond, and/or restricting the recipients of certain types of data.

In some embodiments, the protocol may dictate what use may be made with the data a software agent provides. For example, what scores may be computed (e.g., what type of values), and what use may be made with the scores (e.g., are they disclosed to the public or are they restricted to certain entities such as market research firms). In other embodiments, the protocol may dictate certain policies related to data retention. In one example, the protocol may relate to the location the data is stored (e.g., in what countries servers storing the data may reside and/or what companies may store it). In another example, the protocol may dictate time limits for certain types of data after which the data is to be deleted. In yet another example, the protocol may dictate what type of security measures must be implemented when storing certain types of data (e.g., usage of certain encryption algorithms).

In some embodiments, the protocol may dictate certain restrictions related to a required reward and/or compensation that a user is to receive for the information provided by the software agent. Optionally, the reward and/or compensation may be in a monetary form (e.g., money and/or credits that may be used to acquire services and/or products). Optionally, the reward may be in the form of services provided to the user. Optionally, the reward may be in the form of information (e.g., a user providing a measurement to an experience may receive information such as the score computed for the experience based on the measurement and measurements of other users).

The risk to privacy associated with contributing measurements directly to an entity that may model the user and/or for the computation of scores may also be a factor addressed by the protocol. For example, the protocol may require a certain number of users to provide measurements for the computation of a certain score and/or that the measurements have a certain minimal variance. In another embodiment, the protocol may dictate that the risk, as computed by a certain function, may be below a certain threshold in order for the software agent to provide a measurement for computation of a score. Optionally, the extent of information (e.g., number of measurements and/or number of experiences for which measurements are provided) may depend on the results of a risk function. Analysis of risk, including different types of risks that may be evaluated, is discussed in further detail elsewhere in this embodiment.

The discussion above described examples of aspects involved in a software agents operation that may be addressed by a protocol. Those skilled in the art will recognize that there may be various other aspects involving collection of data by software agents, retention of the data, and/or usage of data, that were not described above, but may be nonetheless implemented in various embodiments.

In one embodiment, the software agent provides information as a response to a request. For example, the software agent may receive a request for a measurement of the user on behalf whom it operates. In another example, the request is a general request sent to multiple agents, which specifies certain conditions. For example, the request may specify a certain type of experience, time, certain user demographics, and/or a certain situation which the user is in. Optionally, the software responds to the request with the desired information if doing so does not violate a restriction dictated by a policy according to which the software agent operates. For example, the software agent may respond with the information if the risk associated with doing so does not exceed a certain threshold and/or the compensation provided for doing so is sufficient.

In one embodiment, the software agent may provide information automatically. Optionally, the nature of the automatic providing of information is dictated by the policy according to which the software agent operates. In one example, the software agent may periodically provide measurements along with context information (e.g., what experience the user was having at the time and/or information related to the situation of the user at the time). In another example, the software agent provides information automatically when the user has certain types of experiences (e.g., when driving, eating, or exercising).

A software agent may be utilized for training a personalized ESE of a user on behalf of whom the software agent operates. For example, the software agent may monitor the user and at times query the user to determine how the user feels (e.g., represented by an affective value on a scale of 1 to 10). After a while, the software agent may have a model of the user that is more accurate at interpreting "its" user than a general ESE. Additionally, by utilizing a personalized ESE, the software agent may be better capable of integrating multiple values (e.g., acquired by multiple sensors and/or over a long period of time) in order to represent how the user feels at the time using a single value (e.g., an affective value on a scale of 1 to 10). For example, a personalized ESE may learn model parameters that represent weights to assign to values from different sensors and/or weights to assign to different periods in an event (e.g., the beginning, middle or end of the experience), in order to be able to produce a value that more accurately represents how the user feels (e.g., on the scale of 1 to 10). In another example, a personalized ESE may learn what weight to assign to measurements corresponding to mini-events in order to generate an affective value that best represents how the user felt to a larger event that comprises the mini-events.

Modeling users (e.g., learning various user biases) may involve, in some embodiments, accumulation of large quantities of data about users that may be considered private. Thus, some users may be reluctant to provide such information to a central entity in order to limit the ability of the central entity to model the users. Additionally, providing the information to a central entity may put private information of the users at risk due to security breaches like hacking. In such cases, users may be more comfortable, and possibly be more willing to provide data, if the modeling is done and/or controlled by them. Thus, in some embodiments, the task of modeling the users, such as learning biases of the users, may be performed, at least in part, by software agents operating on behalf of the users. Optionally, the software agent may utilize some of the approaches described above in this disclosure, to model user biases.

In some embodiments, modeling biases involves utilizing values of biases towards the quality of an experience, which may be used to correct for effects that involve the quality of the experience at a certain time. Optionally, such values are computed from measurements of affective response of multiple users (e.g., they may be crowd-based scores). Thus, in some embodiments, a software agent operating on behalf of a user may not be able to learn the user's biases towards experience quality with sufficient accuracy on its own, since it may not have access to measurements of affective response of other users. Optionally, in these embodiments, the software agent may receive values describing quality of experience from an external source, such as entity that computes scores for experiences. Optionally, the values received from the external source may enable an agent to compute a normalized measurement value from a measurement of affective response of a user to an experience. Optionally, the normalized value may better reflect the biases of the user (which are not related to the quality of the experience). Therefore, learning biases from normalized measurements may produce more accurate estimates of the user's biases. In these embodiments, knowing the score given to an experience may help to interpret the user's measurements of affective response.

The scenario described above may lead to cooperative behavior between software agents, each operating on behalf of a user, and an entity that computes scores for experiences based on measurements of affective response of the multiple users on behalf of whom the agents operate. In order to compute more accurate scores, it may be preferable, in some embodiments, to remove certain biases from the measurements of affective response used to compute the score. This task may be performed by a software agents, which can utilize a model of a user on behalf of whom it operates, in order to generate an unbiased measurement of affective response for an experience. However, in order to better model the user, the software agent may benefit from receiving values of the quality of experiences to which the measurements correspond. Thus, in some embodiments, there is a "give and take" reciprocal relationship between software agents and an entity that computes scores, in which the software agents provide measurements of affective response from which certain (private) user biases were removed. The entity that computes the score utilizes those unbiased measurements to produce a score that is not affected by some of the users' biases (and as such, better represents the quality of the experience). This score, which is computed based on measurements of multiple users is provided back to the agents in the form of an indicator of the quality of the experience the user had, which in turn may be used by the software agents to better model the users. Optionally, this process may be repeated multiple times in order to refine the user models (e.g., to obtain more accurate values of user biases held by the agents), and in the same time compute more accurate scores. Thus, the joint modeling of users and experiences may be performed in a distributed way in which the private data of individual users is not stored together and/or exposed to a central entity.

8—Crowd-Based Applications

Various embodiments described herein utilize systems whose architecture includes a plurality of sensors and a plurality of user interfaces. This architecture supports various forms of crowd-based recommendation systems in which users may receive information, such as suggestions and/or alerts, which are determined based on measurements of affective response collected by the sensors. In some embodiments, being crowd-based means that the measurements of affective response are taken from a plurality of users, such as at least three, ten, one hundred, or more users. In such embodiments, it is possible that the recipients of information generated from the measurements may not be the same users from whom the measurements were taken.

FIG. 11a illustrates one embodiment of an architecture that includes sensors and user interfaces, as described above. The crowd 100 of users comprises at least some individual users with sensors coupled to them. For example, FIG. 12a and FIG. 12c illustrate cases in which a sensor is coupled to a user. The sensors take the measurements 110 of affective response, which are transmitted via a network 112. Optionally, the measurements 110 are sent to one or more servers that host modules belonging to one or more of the systems described in various embodiments in this disclosure (e.g., systems that compute scores for experiences, rank experiences, generate alerts for experiences, and/or learn parameters of functions that describe affective response).

A plurality of sensors may be used, in various embodiments described herein, to take the measurements of affective response of the plurality of users. Each of the plurality of sensors (e.g., the sensor 102a) may be a sensor that captures a physiological signal and/or a behavioral cue. Optionally, a measurement of affective response of a user is typically taken by a specific sensor related to the user (e.g., a sensor attached to the body of the user and/or embedded in a device of the user). Optionally, some sensors may take measurements of more than one user (e.g., the sensors may be cameras taking images of multiple users). Optionally, the measurements taken of each user are of the same type (e.g., the measurements of all users include heart rate and skin conductivity measurements). Optionally, different types of measurements may be taken from different users. For example, for some users the measurements may include brainwave activity captured with EEG and heart rate, while for other users the measurements may include only heart rate values.

The network 112 represents one or more networks used to carry the measurements 110 and/or crowd-based results 115 computed based on measurements. It is to be noted that the measurements 110 and/or crowd-based results 115 need not be transmitted via the same network components. Additionally, different portions of the measurements 110 (e.g., measurements of different individual users) may be transmitted using different network components or different network routes. In a similar fashion, the crowd-based results 115 may be transmitted to different users utilizing different network components and/or different network routes.

Herein, a network, such as the network 112, may refer to various types of communication networks, including, but not limited to, a local area network (LAN), a wide area network (WAN), Ethernet, intranet, the Internet, a fiber communication network, a wired communication network, a wireless communication network, and/or a combination thereof.

In some embodiments, the measurements 110 of affective response are transmitted via the network 112 to one or more servers. Each of the one or more servers includes at least one processor and memory. Optionally, the one or more servers are cloud-based servers. Optionally, some of the measurements 110 are stored and transmitted in batches (e.g., stored on a device of a user being measured). Additionally or alternatively, some of the measurements are broadcast within seconds of being taken (e.g., via Wi-Fi transmissions). Optionally, some measurements of a user may be processed prior to being transmitted (e.g., by a device and/or software agent of the user). Optionally, some measurements of a user may be sent as raw data, essentially in the same form as received from a sensor used to measure the user. Optionally, some of the sensors used to measure a user may include a transmitter that may transmit measurements of affective response, while others may forward the measurements to another device capable of transmitting them (e.g., a smartphone belonging to a user).

Depending on the embodiment being considered, the crowd-based results 115 may include various types of values that may be computed by systems described in this disclosure based on measurements of affective response. For example, the crowd based results 115 may refer to scores for experiences (e.g., score 164), notifications about affective response to experiences (e.g., notification 188 or notification 210), recommendations regarding experiences (e.g., recommendation 179 or recommendation 215), and/or various rankings of experiences (e.g., ranking 232, ranking 254). Additionally or alternatively, the crowd-based results 115 may include, and/or be derived from, parameters of various functions learned from measurements (e.g., function parameters 288, aftereffect scores 294, function parameters 317, or function parameters 326, to name a few).

In some embodiments, the various crowd-based results described above and elsewhere in this disclosure, may be presented to users (e.g., through graphics and/or text on display, or presented by a software agent via a user interface). Additionally or alternatively, the crowd-based results may serve as an input to software systems (e.g., software agents) that make decisions for a user (e.g., what experiences to book for the user and/or suggest to the user). Thus, crowd-based results computed in embodiments described in this disclosure may be utilized (indirectly) by a user via a software agent operating on behalf of a user, even if the user does not directly receive the results or is even aware of their existence.

In some embodiments, the crowd-based results 115 that are computed based on the measurements 110 include a single value or a single set of values that is provided to each user that receives the results 115. In such a case, the crowd-based results 115 may be considered general crowd-based results, since each user who receives a result computed based on the measurements 110 receives essentially the same thing. In other embodiments, the crowd-based results 115 that are computed based on the measurements 110 include various values and/or various sets of values that are provided to users that receive the crowd-based results 115. In this case, the results 115 may be considered personalized crowd-based results, since a user who receives a result computed based on the measurements 110 may receive a result that is different from the result received by another user. Optionally, personalized results are obtained utilizing an output produced by personalization module 130.

An individual user 101, belonging to the crowd 100, may contribute a measurement of affective response to the measurements 110 and/or may receive a result from among the various types of the crowd-based results 115 described in this disclosure. This may lead to various possibilities involving what users contribute and/or receive in an architecture of a system such as the one illustrated in FIG. 11.

In some embodiments, at least some of the users from the crowd 100 contribute measurements of affective response (as part of the measurements 110), but do not receive results computed based on the measurements they contributed. An example of such a scenario is illustrated in FIG. 12a, where a user 101a is coupled to a sensor 102a (which in this illustration measures brainwave activity via EEG) and contributes a measurement 111a of affective response, but does not receive a result computed based on the measurement 111a.

In a somewhat reverse situation to the one described above, in some embodiments, at least some of the users from the crowd 100 receive a result from among the crowd-based results 115, but do not contribute any of the measurements of affective response used to compute the result they receive. An example of such a scenario is illustrated in FIG. 12b, where a user 101b is coupled to a user interface 103b (which in this illustration are augmented reality glasses) that presents a result 113b, which may be, for example, a score for an experience. However, in this illustration, the user 101b does not provide a measurement of affective response that is used for the generation of the result 113b.

And in some embodiments, at least some of the users from the crowd 100 contribute measurements of affective response (as part of the measurements 110), and receive a result, from among the crowd-based results 115, computed based on the measurements they contributed. An example of such a scenario is illustrated in FIG. 12c, where a user 101c is coupled to a sensor 102c (which in this illustration is a smartwatch that measures heart rate and skin conductance) and contributes a measurement 111c of affective response. Additionally, the user 101c has a user interface 103c (which in this illustration is a tablet computer) that presents a result 113c, which may be for example a ranking of multiple experiences generated utilizing the measurement 111c that the user 101c provided.

A "user interface", as the term is used in this disclosure, may include various components that may be characterized as being hardware, software, and/or firmware. In some examples, hardware components may include various forms of displays (e.g., screens, monitors, virtual reality displays, augmented reality displays, hologram displays), speakers, scent generating devices, and/or haptic feedback devices (e.g., devices that generate heat and/or pressure sensed by the user). In other examples, software components may include various programs that render images, video, maps, graphs, diagrams, augmented annotations (to appear on images of a real environment), and/or video depicting a virtual environment. In still other examples, firmware may include various software written to persistent memory devices, such as drivers for generating images on displays and/or for generating sound using speakers. In some embodiments, a user interface may be a single device located at one location, e.g., a smart phone and/or a wearable device. In other embodiments, a user interface may include various components that are distributed over various locations. For example, a user interface may include both certain display hardware (which may be part of a device of the user) and certain software elements used to render images, which may be stored and run on a remote server.

It is to be noted that, though FIG. 12a to FIG. 12c illustrate cases in which users have a single sensor device coupled to them and/or a single user interface, the concepts described above in the discussion about FIG. 12a to FIG. 12c may be naturally extended to cases where users have multiple sensors coupled to them (of the various types described in this disclosure or others) and/or multiple user interfaces (of the various types described in this disclosure or others).

Additionally, it is to be noted that users may contribute measurements at one time and receive results at another (which were not computed from the measurements they contributed). Thus, for example, the user 101a in FIG. 12a might have contributed a measurement to compute a score for an experience on one day, and received a score for that experience (or another experience) on her smartwatch (not depicted) on another day. Similarly, the user 101b in FIG. 12b may have sensors embedded in his clothing (not depicted) and might be contributing measurements of affective response to compute a score for an experience the user 101b is having, while the result 113b that the user 101b received, is not based on any of the measurements the user 101b is currently contributing.

In this disclosure, a crowd of users is often designated by the reference numeral 100. The reference numeral 100 is used to designate a general crowd of users. Typically, a crowd of users in this disclosure includes at least three users, but may include more users. For example, in different embodiments, the number of users in the crowd 100 falls into one of the following ranges: 3 to 9, 10 to 24, 25-99, 100-999, 1000-9999, 10000-99999, 100000-1000000, and more than one million users. Additionally, the reference numeral 100 is used to designate users having a general experience, which may involve one or more instances of the various types of experiences described in this disclosure. For example, the crowd 100 may include users that are at a certain location, users engaging in a certain activity, and/or users utilizing a certain product.

When a crowd is designated with another reference numeral (other than 100), this typically signals that the crowd has a certain characteristic. A different reference numeral for a crowd (e.g., the crowd 500) may be used when describing embodiments that involve specific experiences (which in the case of the crowd 500 is an experience involving being in a location). For example, in an embodiment that describes a system that ranks experiences, the crowd may be referred to by the reference numeral 100. However, in an embodiment that describes ranking of locations, the crowd may be designated by the reference numeral 500, since in this embodiment, the users in the crowd have a certain characteristic (they are at locations), rather than being a more general crowd of users who are having one or more experiences, which may be any of the experiences described in this disclosure.

In a similar fashion, measurements of affective response are often designated by the reference numeral 110. The reference numeral 110 is used to designate measurements of affective response of users belonging to the crowd 100. Thus, the reference numeral 110 is typically used to designate measurements of affective response in embodiments that involve users having one or more experiences, which may possibly be any of the experiences described in this disclosure.

When measurements of affective response are designated with a reference numeral that is different from 110, this typically signals that the measurements have a certain characteristic, such as being measurements of users having a specific experience. For example, in an embodiment that describes a system that scores experiences, the measurements of affective response used to compute scores may be referred to by the reference numeral 110. However, in an embodiment that describes scoring locations, the measurements may be designated by another reference numeral (e.g., measurements 501), since in this embodiment, the measurements are of users that have a certain characteristic (they are at a location), rather than being measurements of a general crowd of users who are having one or more experiences that may be any of the experiences described in this disclosure. Despite the use of a different reference numeral, because in this disclosure they represent a general form of measurements of affective response (to possibly any experience described in this disclosure), properties of the measurements 110 as described in this disclosure, may be typically assumed to be true for measurements of affective response designated by other reference numerals, such as the measurements 501, unless indicated otherwise.

Unless indicated otherwise when describing a certain embodiment, the one or more experiences may be of various types of experiences described in this disclosure. In one example, an experience from among the one or more experiences may involve one or more of the following: spending time at a certain location, having a social interaction with a certain entity in the physical world, having a social interaction with a certain entity in a virtual world, consuming a certain segment of digital content, consuming a certain type of food, performing a certain exercise, traveling a certain route, spending time in an environment characterized by a certain environmental condition, shopping, and going on a social outing with people. In another example, an experience from among the one more experiences may be characterized via various attributes and/or combinations of attributes such as an experience involving engaging in a certain activity at a certain location, an experience involving visiting a certain location for a certain duration, and so on. Additional information regarding the types of experiences users may have may be found at least in section 3—Experiences.

In various embodiments described herein, measurements of affective response, such as the measurements 110 and/or measurements referred to by other reference numerals, may include measurements of multiple users, such as at least ten users, but in some embodiments may include measurements of other numbers of users (e.g., less than ten). Optionally, the number of users who contribute measurements to the measurements 110 may fall into one of the following ranges: 3-9, 10-24, 25-99, 100-999, 1000-9999, 10000-99999, 100000-1000000, or more than one million users.

In different embodiments, measurements of affective response, such as the measurements 110 and/or measurements referred to by other reference numerals, may be taken during different periods of time. In one embodiment, measurements may be taken over a long period, such as at least a day, at least a week, at least a month, and/or a period of at least a year. When it is said that measurements were taken over a certain period such as at least a day, it means that the measurements include at least a first measurement and a second measurement such that the first measurement was taken at least a day before the second measurement. In another embodiment, measurements may be taken within a certain period of time, and/or a certain portion of the measurements may be taken within a certain period of time. For example, the measurements may all be taken during a certain period of six hours. In another example, at least 25% of the measurements are taken within a period of an hour.

In embodiments described herein, measurements of affective response, such as the measurements 110 and/or measurements referred to by other reference numerals, are taken utilizing sensors coupled to the users. A measurement of affective response of a user, taken utilizing a sensor coupled to the user, includes at least one of the following: a value representing a physiological signal of the user, and a value representing a behavioral cue of the user. Optionally, a measurement of affective response corresponding to an event in which a user has an experience is based on values acquired by measuring the user with the sensor during at least three different non-overlapping periods while the user has the experience corresponding to the event. Additional information regarding how measurements of affective response may be obtained from values captured by sensors may be found in this disclosure at least in section 2—Measurements of Affective Response.

Results obtained based on measurements of affective response may also be designated with different reference numerals in different embodiments. When the embodiment involves a non-specific experience, which may be any of the experiences described in this disclosure, the results may be designated with certain reference numerals (e.g., the score 164, the notification 188, or the recommendation 179). When other reference numerals are used to designate the same type of results, this typically signals that the results have a certain characteristic, such as being a score for a location, rather than a score for a non-specific experience. When a result has a certain characteristic, such as corresponding to a certain type of experience, it may be referred to according to the type of experience. Thus for example, the score for the location may be referred to as a "location score" and may optionally be designated with a different reference numeral than the one used for a score for a non-specific experience.

Figure 13A:
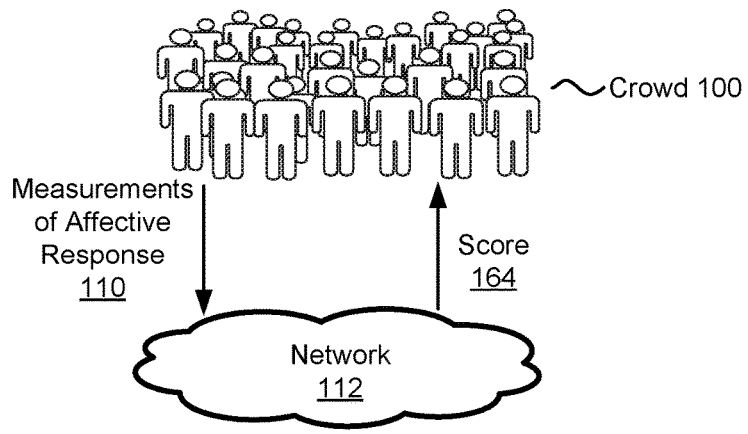
FIG. 13a illustrates a system configured to compute a score for a certain experience.

FIG. 11 illustrates an architecture that may be utilized for various embodiments involving acquisition of measurements of affective response and reporting of results computed based on the measurements. One example of a utilization of such an architecture is given in FIG. 13a, which illustrates a system configured to compute score 164 for a certain experience. The system computes the score 164 based on measurements 110 of affective response utilizing at least sensors and user interfaces. The sensors are utilized to take the measurements 110, which include measurements of at least ten users from the crowd 100, each of which is coupled to a sensor such as the sensors 102a and/or 102c. Optionally, at least some of the sensors are configured to take measurements of physiological signals of the at least ten users. Additionally or alternatively, at least some of the sensors are configured to take measurements of behavioral cues of the at least ten users.

Each measurement of the user is taken by a sensor coupled to the user, while the user has the certain experience or shortly after. Optionally, "shortly after" refers to a time that is at most ten minutes after the user finishes having the certain experience. Optionally, the measurements may be transmitted via network 112 to one or more servers that are configured to compute a score for the certain experience based on the measurements 110. Optionally, the servers are configured to compute scores for experiences based on measurements of affective response, such as the system illustrated in FIG. 14a.

The user interfaces are configured to receive data, via the network 112, describing the score computed based on the measurements 110. Optionally, the score 164 represents the affective response of the at least ten users to having the certain experience. The user interfaces are configured to report the score to at least some of the users belonging to the crowd 100. Optionally, at least some users who are reported the score 164 via user interfaces are users who contributed measurements to the measurements 110 which were used to compute the score 164. Optionally, at least some users who are reported the score 164 via user interfaces are users who did not contribute to the measurements 110.

It is to be noted that stating that a score is computed based on measurements, such as the statement above mentioning "the score computed based on the measurements 110", is not meant to imply that all of the measurements 110 are used in the computation of the score. When a score is computed based on measurements it means that at least some of the measurements, but not necessarily all of the measurements, are used to compute the score. Some of the measurements may be irrelevant for the computation of the score for a variety of reasons, and therefore are not used to compute the score. For example, some of the measurements may involve experiences that are different from the experience for which the score is computed, may involve users not selected to contribute measurements (e.g., filtered out due to their profiles being dissimilar to a profile of a certain user), and/or some of the measurements might have been taken at a time that is not relevant for the score (e.g., older measurements might not be used when computing a score corresponding to a later time). Thus, the above statement "the score computed based on the measurements 110" should be interpreted as the score computed based on some, but not necessarily all, of the measurements 110.

As discussed in further detail in section 1—Sensors, various types of sensors may be utilized in order to take measurements of affective response, such as the measurements 110 and/or measurements of affective response designated by other numeral references. Following are various examples of sensors that may be coupled to users, which are used to take measurements of the users. In one example, a sensor used to take a measurement of affective response of a user is implanted in the body of a user. In another example, a sensor used to take a measurement of affective response of a user is embedded in a device used by the user. In yet another example, a sensor used to take a measurement of a user may be embedded in an object worn by the user, which may be at least one of the following: a clothing item, footwear, a piece of jewelry, and a wearable artifact. In still another example, a sensor used to take a measurement of a user may be a sensor that is not in physical contact with the user, such as an image capturing device used to take a measurement that includes one or more images of the user.

In some embodiments, some of the users who contribute to the measurements 110 may have a device that includes both a sensor that may be used to take a measurement of affective response and a user interface that may be used to present a result computed based on the measurements 110, such as the score 164. Optionally, each such device is configured to receive a measurement of affective response taken with the sensor embedded in the device, and to transmit the measurement. The device may also be configured to receive data describing a crowd-based result, such as a score for an experience, and to forward the data for presentation via the user interface.

Reporting a result computed based on measurements of affective response, such as the score 164, via a user interface may be done in various ways in different embodiments. In one embodiment, the score is reported by presenting, on a display of a device of a user (e.g., a smartphone's screen, augmented reality glasses) an indication of the score 164 and/or the certain experience. For example, the indication may be a numerical value, a textual value, an image, and/or video. Optionally, the indication is presented as an alert issued if the score reaches a certain threshold. Optionally, the indication is given as a recommendation generated by a recommender module such as the recommender module 178. In another embodiment, the score 164 may be reported via a voice signal and/or a haptic signal (e.g., via vibrations of a device carried by the user). In some embodiments, reporting the score 164 to a user is done by a software agent operating on behalf of the user, which communicates with the user via a user interface.

In some embodiments, along with presenting information, e.g. about a score such as the score 164, the user interfaces may present information related to the significance of the information, such as a significance level (e.g., p-value, q-value, or false discovery rate), information related to the number of users and/or measurements (the sample size) which were used for determining the information, and/or confidence intervals indicating the variability of the data.

Figure 13B:
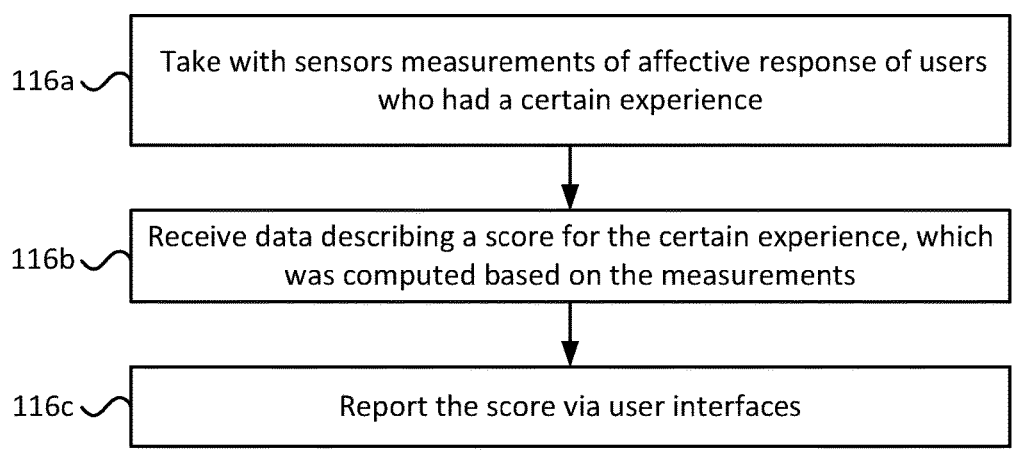
FIG. 13b illustrates steps involved in a method for reporting a score for a certain experience.

FIG. 13b illustrates steps involved in one embodiment of a method for reporting a score for a certain experience, which is computed based on measurements of affective response. The steps illustrated in FIG. 13b may be, in some embodiments, part of the steps performed by systems modeled according to FIG. 13a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, a method for reporting the score for a certain experience based on measurements of affective response includes at least the following steps:

In step 116a, taking measurements of affective response of users with sensors. Optionally, the measurements include measurements of affective response of at least ten users taken at most ten minutes after the users had the certain experience. Optionally, the measurements are taken while the users have the certain experience.

In step 116b, receiving data describing the score. In this embodiment, the score is computed based on the measurements of the at least ten users and represents the affective response of the at least ten users to having the certain experience.

And in step 116c, reporting the score via user interfaces, e.g., as a recommendation, as described above.

In one embodiment, the method described above may include an optional step of receiving a profile of a certain user and profiles of at least some of the at least ten users, computing similarities between the profile of the certain user and a profile of each of the at least some of the at least ten users, weighting the measurements of the at least ten users based on the similarities, and utilizing the weights for computing the score.

In one embodiment, the method described above may include an optional step of receiving baseline affective response value for at least some of the at least ten users, measurements of affective response of the at least some of the at least ten users, and normalizing the measurements of the at least some of the at least ten users with respect to the baseline affective response values.

Figure 14A:
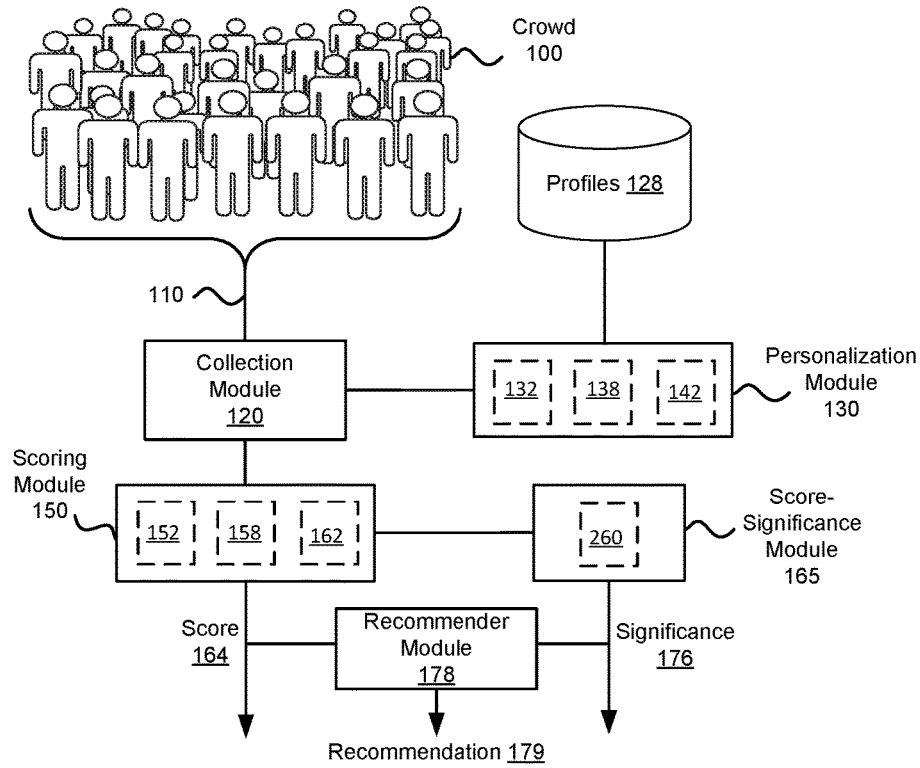
FIG. 14a illustrates a system configured to compute scores for experiences.

FIG. 14a illustrates a system configured to compute scores for experiences. The system illustrated in FIG. 14a is an exemplary embodiment of a system that may be utilized to compute crowd-based results 115 from the measurements 110, as illustrated in FIG. 11. While the system illustrated in FIG. 14a describes a system that computes scores for experiences, the teachings in the following discussion, in particular the roles and characteristics of various modules, may be relevant to other embodiments described herein involving generation of other types of crowd-based results (e.g., ranking, alerts, and/or learning parameters of functions).

In one embodiment, a system that computes a score for an experience, such as the one illustrated in FIG. 14a, includes at least a collection module (e.g., collection module 120) and a scoring module (e.g., scoring module 150). Optionally, such a system may also include additional modules such as the personalization module 130, score-significance module 465, and/or recommender module 178. The illustrated system includes modules that may optionally be found in other embodiments described in this disclosure. This system, like other systems described in this disclosure, includes at least a memory 402 and a processor 401. The memory 402 stores computer executable modules described below, and the processor 401 executes the computer executable modules stored in the memory 402.

The collection module 120 is configured to receive the measurements 110. Optionally, at least some of the measurements 110 may be processed in various ways prior to being received by the collection module 120. For example, at least some of the measurements 110 may be compressed and/or encrypted.

The collection module 120 is also configured to forward at least some of the measurements 110 to the scoring module 150. Optionally, at least some of the measurements 110 undergo processing before they are received by the scoring module 150. Optionally, at least some of the processing is performed via programs that may be considered software agents operating on behalf of the users who provided the measurements 110.

The scoring module 150 is configured to receive at least some of the measurements 110 of affective response from the crowd 100 of users, and to compute a score 164 based on the measurements 110. At least some of the measurements 110 may correspond to a certain experience, i.e., they are measurements of at least some of the users from the crowd 100 taken in temporal proximity to when those users had the certain experience and represent the affective response of those users to the certain experience. Herein "temporal proximity" means nearness in time. For example, at least some of the measurements 110 are taken while users are having the certain experience and/or shortly after that. Additional discussion of what constitutes "temporal proximity" may be found at least in section 2 —Measurements of Affective Response.

A scoring module, such as scoring module 150, may utilize one or more types of scoring approaches that may optionally involve one more other modules. In one example, the scoring module 150 utilizes modules that perform statistical tests on measurements in order to compute the score 164, such as statistical test module 152 and/or statistical test module 158. In another example, the scoring module 150 utilizes arithmetic scorer 162 to compute the score 164.

Figure 19:
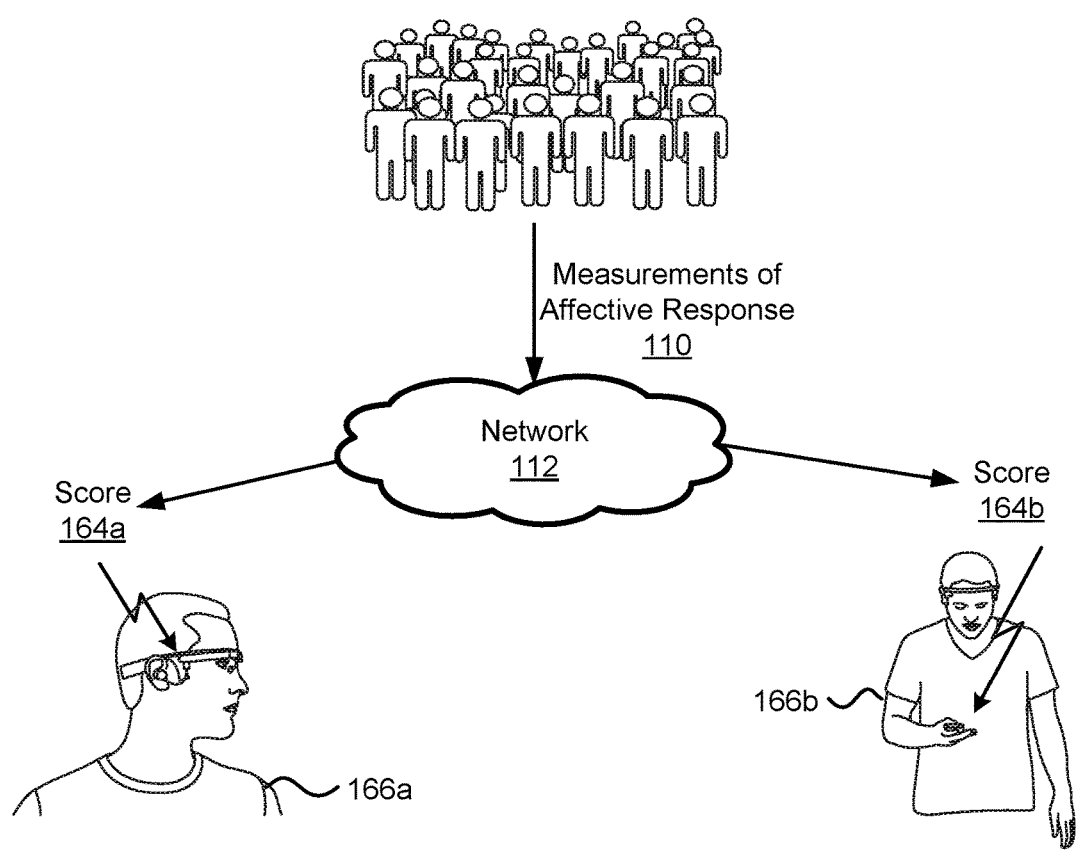
FIG. 19 illustrates one embodiment in which measurements of affective response are provided via a network to a system that computes personalized scores for experiences.

In one embodiment, a score computed by a scoring module, such as scoring module 150, may be considered a personalized score for a certain user and/or for a certain group of users. Optionally, the personalized score is generated by providing the personalization module 130 with a profile of the certain user (or a profile corresponding to the certain group of users). The personalization module 130 compares a provided profile to profiles from among the profiles 128, which include profiles of at least some of the users belonging to the crowd 100, in order to determine similarities between the provided profile and the profiles of at least some of the users belonging to the crowd 100. Based on the similarities, the personalization module 130 produces an output indicative of a selection and/or weighting of at least some of the measurements 110. By providing the scoring module 150 with outputs indicative of different selections and/or weightings of measurements from among the measurements 110, it is possible that the scoring module 150 may compute different scores corresponding to the different selections and/or weightings of the measurements 110, which are described in the outputs, as illustrated in FIG. 19. Additional discussion regarding personalization is given below in section 11—Personalization.

In one embodiment, the score 164 may be provided to the recommender module 178, which may utilize the score 164 to generate recommendation 179, which may be provided to a user (e.g., by presenting an indication regarding the experience on a user interface used by the user). Optionally, the recommender module 178 is configured to recommend the experience for which the score 164 is computed, based on the value of the score 164, in a manner that belongs to a set comprising first and second manners, as described below. When the score 164 reaches a threshold, the experience is recommended in the first manner, and when the score 164 does not reach the threshold, the experience is recommended in the second manner, which involves a weaker recommendation than a recommendation given when recommending in the first manner.

References to a "threshold" herein typically relate to a value to which other values may be compared. For example, in this disclosure scores are often compared to threshold in order to determine certain system behavior (e.g., whether to issue a notification or not based on whether a threshold is reached). When a threshold's value has a certain meaning it may be given a specific name based on the meaning. For example, a threshold indicating a certain level of satisfaction of users may be referred to as a "satisfaction-threshold" or a threshold indicating a certain level of well-being of users may be referred to as "wellness-threshold", etc.

Usually, a threshold is considered to be reached by a value if the value equals the threshold or exceeds it. Similarly, a value does not reach the threshold (i.e., the threshold is not reached) if the value is below the threshold. However, some thresholds may behave the other way around, i.e., a value above the threshold is considered not to reach the threshold, and when the value equals the threshold, or is below the threshold, it is considered to have reached the threshold. The context in which the threshold is presented is typically sufficient to determine how a threshold is reached (i.e., from below or above). In some cases when the context is not clear, what constitutes reaching the threshold may be explicitly stated. Typically, but not necessarily, if reaching a threshold involves having a value lower than the threshold, reaching the threshold will be described as "falling below the threshold".

Herein, any reference to a "threshold" or to a certain type of threshold (e.g., satisfaction-threshold, wellness-threshold, and the like), may be considered a reference to a "predetermined threshold". A predetermined threshold is a fixed value and/or a value determined at any time before performing a calculation that compares a score with the predetermined threshold. Furthermore, a threshold may also be considered a predetermined threshold when the threshold involves a value that needs to be reached (in order for the threshold to be reached), and logic used to compute the value is known before starting the computations used to determine whether the value is reached (i.e., before starting the computations to determine whether the predetermined threshold is reached). Examples of what may be considered the logic mentioned above include circuitry, computer code, and/or steps of an algorithm.

In one embodiment, the manner in which the recommendation 179 is given may also be determined based on a significance computed for the score 164, such as significance 176 computed by score-significance module 465. Optionally, the significance 176 refers to a statistical significance of the score 164, which is computed based on various characteristics of the score 164 and/or the measurements used to compute the score 164. Optionally, when the significance 176 is below a predetermined significance level (e.g., a p-value that is above a certain value) the recommendation is made in the second manner.

A recommender module, such as the recommender module 178 or other recommender modules described in this disclosure (e.g., recommender modules designated by reference numerals 214, 235, 267, 343, or others), is a module that is configured to recommend an experience based on the value of a crowd-based result computed for the experience. For example, recommender module 178 is configured to recommend an experience based on a score computed for the experience based on measurements of affective response of users who had the experience.

Depending on the value of the crowd-based result computed for an experience, a recommender module may recommend the experience in various manners. In particular, the recommender module may recommend an experience in a manner that belongs to a set including first and second manners. Typically, in this disclosure, when a recommender module recommends an experience in the first manner, the recommender provides a stronger recommendation for the experience, compared to a recommendation for the experience that the recommender module provides when recommending in the second manner. Typically, if the crowd-based result indicates a sufficiently strong (or positive) affective response to an experience, the experience is recommended the first manner. Optionally, if the result indicates a weaker affective response to an experience, which is not sufficiently strong (or positive), the experience is recommended in the second manner.

In some embodiments, a recommender module, such as the recommender module 178, is configured to recommend an experience via a display of a user interface. In such embodiments, recommending an experience in the first manner may involve one or more of the following: (i) utilizing a larger icon to represent the experience on a display of the user interface, compared to the size of the icon utilized to represent the experience on the display when recommending in the second manner; (ii) presenting images representing the experience for a longer duration on the display, compared to the duration during which images representing the experience are presented when recommending in the second manner; (iii) utilizing a certain visual effect when presenting the experience on the display, which is not utilized when presenting the experience on the display when recommending the experience in the second manner; and (iv) presenting certain information related to the experience on the display, which is not presented when recommending the experience in the second manner.

In some embodiments, a recommender module, such as the recommender module 178, is configured to recommend an experience to a user by sending the user a notification about the experience. In such embodiments, recommending an experience in the first manner may involve one or more of the following: (i) sending the notification to a user about the experience at a higher frequency than the frequency the notification about the experience is sent to the user when recommending the experience in the second manner; (ii) sending the notification to a larger number of users compared to the number of users the notification is sent to when recommending the experience in the second manner; and (iii) on average, sending the notification about the experience sooner than it is sent when recommending the experience in the second manner.

In some embodiments, significance of a score, such as the score 164, may be computed by the score-significance module 465. Optionally, significance of a score, such as the significance 176 of the score 164, may represent various types of values derived from statistical tests, such as p-values, q-values, and false discovery rates (FDRs). Additionally or alternatively, significance may be expressed as ranges, error-bars, and/or confidence intervals.

In one embodiment, significance of a crowd-based result, such as significance of the score 164, significance of a ranking of experiences, significance of parameters of a function, etc., is determined based on characteristics of the measurements used to compute the result. For example, the more measurements and/or users who contributed measurements to computation of a result, the more significant the result may be considered. Thus, in one example, if the number of measurements and/or number of users who contributed measurements used to compute the score 164 exceeds a threshold, the significance 176 indicates that the score 164 is significant, otherwise, the significance 176 indicates that is score 164 is not significant.

In another embodiment, significance of a score for an experience, such as the score 164, is determined based on parameters of a distribution of scores for the experience. For example, the score-significance module 465 may compute a distribution of scores based on historical scores for the experience, each computed based on previously collected sets of measurements of affective response. In this embodiment, the significance 176 may represent a p-value assigned to the score 164 based on the distribution.

In another embodiment, significance of a score for an experience, such as the score 164, is determined by comparing the score 164 to another score for the experience. Optionally, the significance assigned to the score 164 is based on the significance of the difference between the score 164 and the other score as determined utilizing one or more of the statistical approaches described below. Optionally, the other score to which the score is compared is an average of other scores (e.g., computed for various other experiences) and/or an average of historical scores (e.g., computed for the experience). Optionally, determining the significance of such a comparison is done utilizing the score-difference evaluator module 260.

In yet another embodiment, significance of a score for an experience, such as the score 164, may be determined by a resampling approach, which may be used to learn a distribution of scores for the experience. This distribution may be utilized to determine the significance of the score (e.g., by assigning a p-value to the score). Additional information regarding resampling and/or other approaches for determining significance may be found in this disclosure at least in section 16—Determining Significance of Results.

Figure 14B:
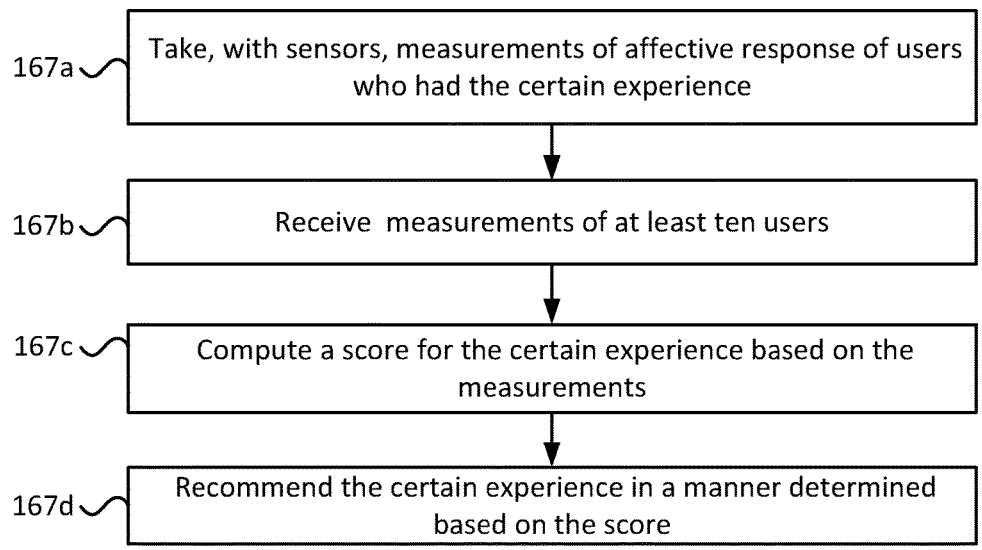
FIG. 14b illustrates steps involved in a method for computing a score for a certain experience.

FIG. 14b illustrates steps involved in one embodiment of a method for computing a score for a certain experience, which is computed based on measurements of affective response. The steps illustrated in FIG. 14b may be performed, in some embodiments, by systems modeled according to FIG. 14a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for computing the score for the certain experience based on measurements of affective response, includes the following steps:

In step 167b, receiving, by a system comprising a processor and memory, measurements of affective response of at least ten users; each measurement of a user is taken at most ten minutes after the user finishes having the certain experience. Optionally, each measurement of a user is taken while the user has the certain experience. Optionally, at least 25% of the measurements are collected by the system within a period of one hour.

And in step 167c, computing, by the system, the score based on the measurements of affective response of at least ten users. Optionally, the score represents the affective response of the at least ten users to having the certain experience.

In one embodiment, the method described above may optionally include step 167a, which comprises taking the measurements of the at least ten users with sensors; each sensor is coupled to a user, and a measurement of a sensor coupled to a user comprises at least one of the following: a measurement of a physiological signal of the user and a measurement of a behavioral cue of the user.

In one embodiment, the method described above may optionally include step 167d, which comprises recommending, based on the score, the certain experience to a user in a manner that belongs to a set comprising first and second manners. Optionally, when recommending the certain experience in the first manner, a stronger recommendation is provided for the certain experience, compared to a recommendation for the certain experience that is provided when recommending in the second manner.

9—Collecting Measurements

Various embodiments described herein include a collection module, such as the collection module 120, which is configured to receive measurements of affective response of users. In embodiments described herein, measurements received by the collection module, which may be the measurements 110 and/or measurements of affective response designated by another reference numeral (e.g., the measurements 4501), may be forwarded to other modules to produce a crowd-based result (e.g., scoring module 150, ranking module 220, function learning module 280, and the like). The measurements received by the collection module need not be the same measurements provided to the modules. For example, the measurements provided to the modules may undergo various forms of processing prior to being received by the modules. Additionally, the measurements provided to the modules may not necessarily include all the measurements received by the collection module 120. For example, the collection module may receive certain measurements that are not required for computation of a certain crowd-based result (e.g., the measurements may involve an experience that is not being scored or ranked at the time). Thus, often in embodiments described herein, measurements received by the collection module 120 will be said to include a certain set of measurements of interest (e.g., measurements of at least ten users who had a certain experience); this does not mean that these are the only measurements received by the collection module 120 in those embodiments.

In addition to the measurements 110 and/or as part of the measurements 110, the collection module 120 may receive information regarding the measurements, such as information about the events corresponding to the measurements. For example, information about an event to which a measurement of affective response corresponds may pertain to the experience corresponding to the event, the user corresponding to the event, and/or details about the instantiation of the event. Additional details about information about events is provided in this disclosure at least in section 4—Events. In some embodiments, the collection module 120 may utilize the information about events in order to determine how to process the measurements 110, which portions of the measurements 110 to forward to other system modules, and/or to which of the other system modules to forward at least some of the measurements 110. Additionally or alternatively, information about events may be forwarded by the collection module 120 to other system modules in addition to, or instead of, measurements of affective response. In some embodiments, the collection module 120 may comprise and/or utilize an event annotator, which may provide various information regarding the events to which measurements received by the collection module 120 correspond.

The collection module 120 may receive and/or provide to other modules measurements collected over various time frames. For example, in some embodiments, measurements of affective response provided by the collection module to other modules (e.g., scoring module 150, ranking module 220, etc.), are taken over a certain period that extends for at least an hour, a day, a month, or at least a year. For example, when the measurements extend for a period of at least a day, they include at least a first measurement and a second measurement, such that the first measurement is taken at least 24 hours before the second measurement is taken. In other embodiments, at least a certain portion of the measurements of affective response utilized by one of the other modules to compute crowd-based results are taken within a certain period of time. For example, the certain portion may include times at which at least 25%, at least 50%, or at least 90% of the measurements were taken. Furthermore, in this example, the certain period of time may include various windows of time, spanning periods such as at most one minute, at most 10 minutes, at most 30 minutes, at most an hour, at most 4 hours, at most a day, or at most a week.

In some embodiments, the collection module 120 may be considered a module that organizes and/or pre-processes measurements to be used for computing crowd-based results. Optionally, the collection module 120 has an interface that allows other modules to request certain types of measurements, such as measurements involving users who had a certain experience, measurements of users who have certain characteristics (e.g., certain profile attributes), measurements taken during certain times, and/or measurements taken utilizing certain types of sensors and/or operation parameters. Optionally, the collection module 120 may be implemented as a module and/or component of other modules described in this disclosure, such as scoring modules and/or ranking modules. For example, in some embodiments, when measurements of affective response are forwarded directly to a module that computes a score or some other crowd-based result, the interface of that module that receives the measurements may be considered to be the collection module 120 or to be part of the collection module 120.

In embodiments described herein, the collection module 120 may be implemented in various ways. In some embodiments, the collection module 120 may be an independent module, while in other modules it may be a module that is part of another module (e.g., it may be a component of scoring module 150). In one example, the collection module 120 includes hardware, such as a processor and memory, and includes interfaces that maintain communication routes with users (e.g., via their devices, in order to receive measurements) and/or with other modules (e.g., in order to receive requests and/or provide measurements). In another example, the collection module 120 may be implemented as, and/or be included as part of, a software module that can run on a general purpose server and/or in a distributed fashion (e.g., the collection module 120 may include modules that run on devices of users).

There are various ways in which the collection module may receive the measurements of affective response. Following are some examples of approaches that may be implemented in embodiments described herein.

In one embodiment, the collection module receives at least some of the measurements directly from the users of whom the measurements are taken. In one example, the measurements are streamed from devices of the users as they are acquired (e.g., a user's smartphone may transmit measurements acquired by one or more sensors measuring the user). In another example, a software agent operating on behalf of the user may routinely transmit descriptions of events, where each event includes a measurement and a description of a user and/or an experience the user had.

In another embodiment, the collection module is configured to retrieve at least some of the measurements from one or more databases that store measurements of affective response of users. Optionally, the one or more databases are part of the collection module. In one example, the one or more databases may involve distributed storage (e.g., cloud-based storage). In another example, the one or more databases may involve decentralized storage (e.g., utilizing blockchain-based systems). Optionally, the collection module submits to the one or more databases queries involving selection criteria which may include: a type of an experience, a location the experience took place, a timeframe during which the experience took place, an identity of one or more users who had the experience, and/or one or more characteristics corresponding to the users or to the experience. Optionally, the measurements comprise results returned from querying the one or more databases with the queries.

In yet another embodiment, the collection module is configured to receive at least some of the measurements from software agents operating on behalf of the users of whom the measurements are taken. In one example, the software agents receive requests for measurements corresponding to events having certain characteristics. Based on the characteristics, a software agent may determine whether the software agent has, and/or may obtain, data corresponding to events that are relevant to the query. In one example, a characteristic of a relevant event may relate to the user corresponding to the event (e.g., the user has certain demographic characteristics or is in a certain situation of interest). In another example, a characteristic of a relevant event may relate to the experience corresponding to the event (e.g., the characteristic may indicate a certain type of experience). In yet another example, a characteristic of a relevant event may relate to the measurement corresponding to the event (e.g., the measurement is taken utilizing a certain type of sensor and/or is taken at least for a certain duration). And in still another example, a characteristic of a relevant event may relate to a duration corresponding to the event, e.g., a certain time window during which the measurement was taken, such as during the preceding day or week.

After receiving a request, a software agent operating on behalf of a user may determine whether to provide information to the collection module and/or to what extent to provide information to the collection module.

When responding to a request for measurements, a software agent may provide data acquired at different times. In one example, the software agent may provide data that was previously recorded, e.g., data corresponding to events that transpired in the past (e.g., during the day preceding the request, the month preceding the request, and even a year or more preceding the request). In another example, the software agent may provide data that is being acquired at the time, e.g., measurements of the user are streamed while the user is having an experience that is relevant to the request. In yet another example, a request for measurements may be stored and fulfilled in the future when the software agent determines that an event relevant to the request has occurred.

A software agent may provide data in various forms. In one embodiment, the software agent may provide raw measurement values. Additionally or alternatively, the software agent may provide processed measurement values, processed in one or more ways as explained above. In some embodiments, in addition to measurements, the software agent may provide information related to events corresponding to the measurements, such as characteristics of the user corresponding to an event, characteristics of the experience corresponding to the event, and/or specifics of the instantiation of the event.

In one embodiment, providing measurements by a software agent involves transmitting, by a device of the user, measurements and/or other related data to the collection module. For example, the transmitted data may be stored on a device of a user (e.g., a smartphone or a wearable computer device). In another embodiment, providing measurements by a software agent involves transmitting an address, an authorization code, and/or an encryption key that may be utilized by the collection module to retrieve data stored in a remote location, and/or with the collection module. In yet another embodiment, providing measurements by the software agent may involve transmitting instructions to other modules or entities that instruct them to provide the collection module with the measurements.

One of the roles the collection module 120 may perform in some embodiments is to organize and/or process measurements of affective response. Section 2—Measurements of Affective Response describes various forms of processing that may be performed, which include, in particular, computing affective values (e.g., with an emotional state estimator) and/or normalizing the measurements with respect to baseline affective response values.

Figure 15A:
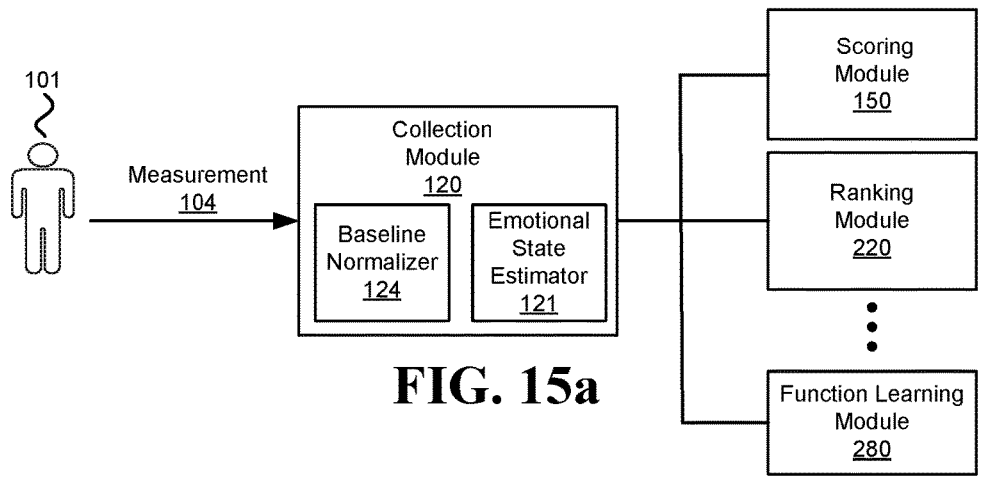
FIG. 15a illustrates one embodiment in which a collection module does at least some, if not most, of the processing of measurements of affective response of a user.
Figure 15B:
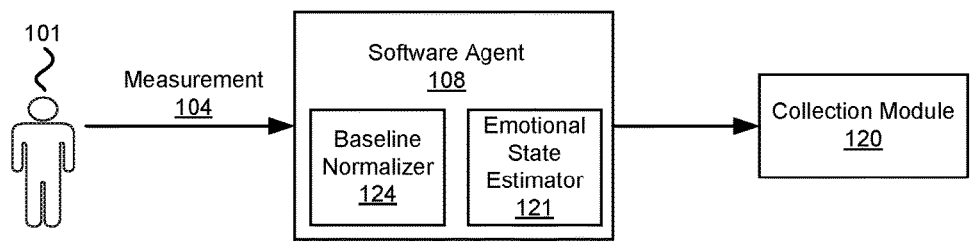
FIG. 15b illustrates one embodiment in which a software agent does at least some, if not most, of the processing of measurements of affective response of a user.

Depending on the embodiment, the processing of measurements of affective response of users may be done in a centralized manner, by the collection module 120, or in a distributed manner, e.g., by software agents operating on behalf of the users. Thus, in some embodiments, various processing methods described in this disclosure are performed in part or in full by the collection module 120, while in others the processing is done in part or in full by the software agents. FIG. 15a and FIG. 15b illustrate different scenarios that may occur in embodiments described herein, in which the bulk of the processing of measurements of affective response is done either by the collection module 120 or by a software agent 108.

FIG. 15a illustrates one embodiment in which the collection module 120 does at least some, if not most, of the processing of measurements of affective response that may be provided to various modules in order to compute crowd-based results. The user 101 provides measurement 104 of affective response to the collection module 120. Optionally, the measurement 104 may be a raw measurement (i.e., it includes values essentially as they were received from a sensor) and/or a partially processed measurement (e.g., subjected to certain filtration and/or noise removal procedures). In this embodiment, the collection module 120 may include various modules that may be used to process measurements such as Emotional State Estimator (ESE) 121 and/or baseline normalizer 124. Optionally, in addition to, or instead of, the ESE 121 and/or the baseline normalizer 124, the collection module 120 may include other modules that perform other types of processing of measurements. For example, the collection module 120 may include modules that compute other forms of affective values described in Section 2—Measurements of Affective Response and/or modules that perform various forms of preprocessing of raw data. In this embodiment, the measurement provided to other modules by the collection module 120 may be considered a processed value and/or an affective value. For example, it may be an affective value representing emotional state 105 and/or normalized measurement 106.

FIG. 15b illustrates one embodiment in which the software agent 108 does at least some, if not most, of the processing of measurements of affective response of the user 101. The user 101 provides measurement 104 of affective response to the software agent 108 which operates on behalf of the user. Optionally, the measurement 104 may be a raw measurement (i.e., it includes values essentially as they were received from a sensor) and/or a partially processed measurement (e.g., subjected to certain filtration and/or noise removal procedures). In this embodiment, the software agent 108 may include various modules that may be used to process measurements such as the ESE 121 and/or baseline normalizer 124. Optionally, in addition to, or instead of, the ESE 121 and/or the baseline normalizer 124, the software agent 108 may include other modules that perform other types of processing of measurements. For example, the software agent 108 may include modules that compute other forms of affective values described in Section 2—Measurements of Affective Response and/or modules that perform various forms of preprocessing of raw data. In this embodiment, the measurement provided to the collection module 120 may be considered a processed value and/or an affective value. For example, it may be an affective value representing emotional state 105 and/or normalized measurement 106.

Figure 16:
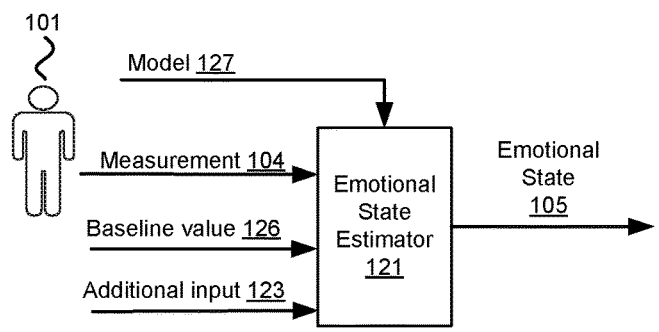
FIG. 16 illustrates one embodiment of the Emotional State Estimator (ESE)

FIG. 16 illustrates one embodiment of the Emotional State Estimator (ESE) 121. In FIG. 16, the user 101 provides a measurement 104 of affective response to the ESE 121. Optionally, the ESE 121 may receive other inputs such as a baseline affective response value 126 and/or additional inputs 123 which may include contextual data about the measurement e.g., a situation the user was in at the time and/or contextual information about the experience to which the measurement 104 corresponds. Optionally, the ESE 121 may utilize model 127 in order to estimate the emotional state 105 of the user 101 based on the measurement 104.

Optionally, the model 127 is a general model, e.g., which is trained on data collected from multiple users. Alternatively, the model 127 may be a personal model of the user 101, e.g., trained on data collected from the user 101. Additional information regarding how emotional states may be estimated and/or represented as affective values may be found in this disclosure at least in Section 2—Measurements of Affective Response.

Figure 17:
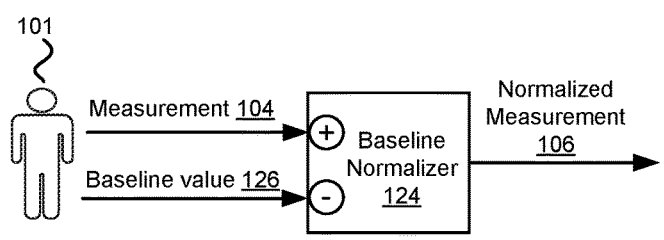
FIG. 17 illustrates one embodiment of a baseline normalizer.

FIG. 17 illustrates one embodiment of the baseline normalizer 124. In this embodiment, the user 101 provides a measurement 104 of affective response and the baseline affective response value 126, and the baseline normalizer 124 computes the normalized measurement 106.

In one embodiment, normalizing a measurement of affective response utilizing a baseline affective response value involves subtracting the baseline affective response value from the measurement. Thus, after normalizing with respect to the baseline, the measurement becomes a relative value, reflecting a difference from the baseline. In another embodiment, normalizing a measurement with respect to a baseline involves computing a value based on the baseline and the measurement such as an average of both (e.g., geometric or arithmetic average).

In some embodiments, a baseline affective response value of a user refers to a value that may represent an affective response of the user under typical conditions. Optionally, a baseline affective response value of a user, that is relevant to a certain time, is obtained utilizing one or more measurements of affective response of the user taken prior to a certain time. For example, a baseline corresponding to a certain time may be based on measurements taken during a window spanning a few minutes, hours, or days prior to the certain time. Additionally or alternatively, a baseline affective response value of a user may be predicted utilizing a model trained on measurements of affective response of the user and/or other users. In some embodiments, a baseline affective response value may correspond to a certain situation, and represent a typical affective response of a user when in the certain situation. Additional discussion regarding baselines, how they are computed, and how they may be utilized may be found in section 2—Measurements of Affective Response, and elsewhere in this disclosure.

In some embodiments, processing of measurements of affective response, performed by the software agent 108 and/or the collection module 120, may involve weighting and/or selection of the measurements. For example, at least some of the measurements 110 may be weighted such that the measurements of each user have the same weight (e.g., so as not to give a user with many measurements more influence on the computed score). In another example, measurements are weighted according to the time they were taken, for instance, by giving higher weights to more recent measurements (thus enabling a result computed based on the measurements 110 to be more biased towards the current state rather than an historical one). Optionally, measurements with a weight that is below a threshold and/or have a weight of zero, are not forwarded to other modules in order to be utilized for computing crowd-based results.

10—Scoring

Various embodiments described herein may include a module that computes a score for an experience based on measurements of affective response of users who had the experience (e.g., the measurements may correspond to events in which users have the experience). Examples of scoring modules include scoring module 150, dynamic scoring module 180, and aftereffect scoring module 302.

In some embodiments, a score for an experience computed by a scoring module is computed solely based on measurements of affective response corresponding to events in which users have the experience. In other embodiments, a score computed for the experience by a scoring module may be computed based on the measurements and other values, such as baseline affective response values or prior measurements. In one example, a score computed by scoring module 150 is computed based on prior measurements, taken before users have an experience, and contemporaneous measurements, taken while the users have the experience. This score may reflect how the users feel about the experience. In another example, a score computed by the aftereffect scoring module 302 is computed based on prior and subsequent measurements. The prior measurements are taken before users finish having an experience, and the subsequent measurements are taken a certain time after the users finish having the experience. Optionally, this score may be an aftereffect score, reflecting a residual influence an experience had on users, which lasts after the users finish the experience. For example, an aftereffect may correspond to how relaxed and/or reenergized people may feel after having a vacation at a certain destination.

When measurements of affective response correspond to a certain experience, e.g., they are taken while and/or shortly after users have the certain experience, a score computed based on the measurements may be indicative of an extent of the affective response users had to the certain experience. For example, measurements of affective response of users taken while the users were at a certain location may be used to compute a score that is indicative of the affective response of the users to being in the certain location. Optionally, the score may be indicative of the quality of the experience and/or of the emotional response users had to the experience (e.g., the score may express a level of enjoyment from having the experience).

In one embodiment, a score for an experience that is computed by a scoring module, such as the score 164, may include a value representing a quality of the experience as determined based on the measurements 110. Optionally, the score includes a value that is at least one of the following: a physiological signal, a behavioral cue, an emotional state, and an affective value. Optionally, the score includes a value that is a function of measurements of at least five users. Optionally, the score is indicative of the significance of a hypothesis that the at least five users had a certain affective response. In one example, the certain affective response is manifested through changes to values of at least one of the following: measurements of physiological signals, and measurements of behavioral cues.

In one embodiment, a score for an experience that is computed based on measurements of affective response is a statistic of the measurements. For example, the score may be the average, mean, and/or mode of the measurements. In other examples, the score may take the form of other statistics, such as the value of a certain percentile when the measurements are ordered according to their values.

In another embodiment, a score for an experience that is computed from measurements of affective response is computed utilizing a function that receives an input comprising the measurements of affective response, and returns a value that depends, at least to some extent, on the value of the measurements. Optionally, the function according to which the score is computed may be non-trivial in the sense that it does not return the same value for all inputs. Thus, it may be assumed that a score computed based on measurements of affective response utilizes at least one function for which there exist two different sets of inputs comprising measurements of affective response, such that the function produces different outputs for each set of inputs. Depending on the characteristics of the embodiments, various functions may be utilized to compute scores from measurements of affective response; the functions may range from simple statistical functions, as mentioned above, to various arbitrary arithmetic functions (e.g., geometric or harmonic means), and possibly complex functions that involve statistical tests such as likelihood ratio test, computations of p-values, and/or other forms of statistical significance.

In yet another embodiment, a function used to compute a score for an experience based on measurements of affective response involves utilizing a machine learning-based predictor that receives as input measurements of affective response and returns a result that may be interpreted as a score. The objective (target value) computed by the predictor may take various forms, possibly extending beyond values that may be interpreted as directly stemming from emotional responses, such as a degree the experience may be considered "successful" or "profitable".

In one embodiment, a score for an experience that is computed based on measurements of affective response is obtained by providing the measurements as input to a computer program that may utilize the measurements and possibly other information in order to generate an output that may be utilized, possibly after further processing, in order to generate the score. Optionally, the other information may include information related to the users from whom the measurements were taken and/or related to the events to which the measurements correspond. Optionally, the computer program may be run as an external service, which is not part of the system that utilizes the score. Thus, the system may utilize the score without possessing the actual logic and/or all the input values used to generate the score. For example, the score may be generated by an external "expert" service that has proprietary information about the users and/or the events, which enables it to generate a value that is more informative about the affective response to an experience to which the measurements correspond.

Some experiences may be considered complex experiences that include multiple "smaller" experiences. When computing a score for such a complex experience, there may be different approaches that may be taken.

In one embodiment, the score for the complex experience is computed based on measurements of affective response corresponding to events that involve having the complex experience. For example, a measurement of affective response corresponding to an event involving a user having the complex experience may be derived from multiple measurements of the user taken during at least some of the smaller experiences comprised in the complex experience. Thus, the measurement represents the affective response of the user to the complex experience.

In another embodiment, the score for the complex experience is computed by aggregating scores computed for the smaller experiences. For example, for each experience comprised in the complex experience, a separate score is computed based on measurements of users who had the complex experience, which were taken during and/or shortly after the smaller experience (i.e., they correspond to events involving the smaller experience).

The score for the complex experience may be a function of the scores for the smaller experiences such as a weighted average of those scores. Optionally, various weighting schemes may be used to weight the scores of the smaller experiences. In one embodiment, the scores of the smaller experiences may be weighted proportionally to their average duration and/or the average dominance levels associated with events involving each smaller experience. In another embodiment, scores of smaller experiences may have preset weights. For example, the score for a complex experience involving going on a vacation may be computed by weighting scores of smaller experiences comprised in the complex experience as follows: a weight of 20% for the score given to the flights to and from the destination, a weight of 30% is given to the stay at the hotel, a weight of 20% to the score given to being at the beach, and a weight of 30% given to the score given to going out (restaurants, clubs, etc.) It is to be noted that in this example, each smaller experience may in itself be a complex experience that is based on multiple experiences that are even smaller.

In some embodiments, the score for the complex experience is computed utilizing a predictor. Optionally, a model utilized by the predictor is trained on samples comprising descriptions of the smaller experiences comprised in the complex experience and/or scores of the smaller experiences and labels that include a score for a complex experience that comprises the smaller experiences. In one example, the score for the complex experience may be determined by an expert (e.g., a human annotator or a software agent). In another example, the score for the complex experience may be determined based on statistics describing the complex experience (e.g., average duration users spend on a vacation and/or the average amount of money they spend when going out to a certain town).

Scores computed based on measurements of affective response may represent different types of values. The type of value a score represents may depend on various factors such as the type of measurements of affective response used to compute the score, the type of experience corresponding to the score, the application for which the score is used, and/or the user interface on which the score is to be presented.

In one embodiment, a score for an experience that is computed from measurements of affective response may be expressed in the same units as the measurements. Furthermore, a score for an experience may be expressed as any type of affective value that is described herein. In one example, the measurements may represent a level of happiness, and the score too may represent a level of happiness, such as the average of the measurements. In another example, if the measurements represent sizes or extents of smiles of users, the score too may represent a size of a smile, such as the median size of smile determined from the measurements. In still another example, if the measurements represent a physiological value, such as heart rates (or changes to heart rates), the score too may be expressed in the same terms (e.g., it may be the average change in the users' heart rates).

In another embodiment, a score for an experience may be expressed in units that are different from the units in which the measurements of affective response used to compute it are expressed. Optionally, the different units may represent values that do not directly convey an affective response (e.g., a value indicating qualities such as utility, profit, and/or a probability). Optionally, the score may represent a numerical value corresponding to a quality of an experience (e.g., a value on a scale of 1 to 10, or a rating of 1 to 5 stars). Optionally, the score may represent a numerical value representing a significance of a hypothesis about the experience (e.g., a p-value of a hypothesis that the measurements of users who had the experience indicate that they enjoyed the experience). Optionally, the score may represent a numerical value representing a probability of the experience belonging to a certain category (e.g., a value indicating whether the experience belongs to the class "popular experiences"). Optionally, the score may represent a similarity level between the experience and another experience (e.g., the similarity of the experience to a certain "blockbuster" experience). Optionally, the score may represent certain performance indicator such as projected sales (e.g., for product, movie, restaurant, etc.) or projected virality (e.g., representing the likelihood that a user will share the fact of having the experience with friends).

In still another embodiment, a score for an experience may represent a probability related to an experience. In one example, a score derived from measurements of affective response comprising EEG measurements of a group of users eating at a restaurant may be expressed as a probability that the users in the group will return to the restaurant within a week. In another example, a score for an experience may be generated from measurements of users taken while they have the experience, and represents a probability that the users will finish having the experience (and not stop in the middle).

In yet another embodiment, a score for an experience may represent a typical and/or average extent of an emotional response of the users who contributed measurements used to compute the score. Optionally, the emotional response corresponds to an increase or decrease in the level of at least one of the following: pain, anxiety, annoyance, stress, aggression, aggravation, fear, sadness, drowsiness, apathy, anger, happiness, contentment, calmness, attentiveness, affection, and excitement.

A score for an experience may also be expressed in various ways in the different embodiments. Optionally, expressing a score involves presenting it to a user via a user interface (e.g., a display). The way a score is expressed may depend on various factors such as the type of value the score represents, the type of experience corresponding to the score, the application for which the score is used, and/or the user interface on which the score is to be presented.

In one embodiment, a score for an experience is expressed by presenting its value in essentially the same form it is received. For example, the score may include a numerical value, and the score is expressed by providing a number representing the numerical value. In another example, a score includes a categorical value (e.g., a type of emotion), and the score is expressed by conveying the emotion to the user (e.g., by presenting the name of the emotion to the user).

In another embodiment, a score for an experience may be expressed as text, and it may indicate a property related to the experience such as a quality, quantity, and/or rating of the experience. In one example, a score may be expressed through one or more words, one or more sentences, and even one or more paragraphs expressing a rating and/or attitude. In another example, the text representing the score may be extracted from external sources (e.g., a database of review phrases and/or highlights from an online review from an Internet site). In yet another example, the text is generated using semantic analysis of reactions of one or more users who contributed measurements used to compute the score. Optionally, the text is generated by a software program utilizing artificial intelligence (e.g., generated by a software agent). Optionally, the text is conveyed via speech (e.g., software generated speech) and/or via computer generated 2D or 3D video (e.g., a software generated avatar), which may display a reaction indicating the typical affective response to the experience corresponding to the score.

In still another embodiment, a score for an experience may be expressed using an image, sound effect, music, animation effect, and/or video. For example, a score may be conveyed by various icons (e.g., "thumbs up" vs. "thumbs down"), animations (e.g., "rocket lifting off" vs. a "crash and burn"), and/or sound effects (e.g., cheering vs. booing). In one example, a score may be represented via one or more emojis, which express how the users felt about the experience.

In yet another embodiment, a score for an experience may be expressed as a distribution and/or histogram that involves a plurality of affective responses (e.g., emotional states) that are associated with how the experience makes users who have it feel. Optionally, the distribution and/or histogram describe how strongly each of the affective responses is associated with having the experience. In one example, a score for an experience may be expressed using word-cloud that includes words that represent emotional states, and the size of each word is proportional to how well each emotional state represents the affective response to the experience of users who contributed measurements to the computation of the score. Additionally or alternatively, other forms of data representation may be used to indicate the weight and/or degree certain emotions are to be associated with a certain score, such as graphs, tables, heat maps, and/or other forms of graphical representation of data.

In some embodiments, a score for an experience may be presented by overlaying the score (e.g., an image representing the score) on a map or image in which multiple experiences may be presented. For example, the map may describe multiple locations in the physical world and/or a virtual environment, and the scores are presented as an overlaid layer of icons (e.g., star ratings) representing the score of each location and/or for different experiences that a user may have at each of the locations.

In some embodiments, a measurement of affective response of a user that is used to compute a crowd-based result corresponding to the experience (e.g., a score for an experience or a ranking of experiences) may be considered "contributed" by the user to the computation of the crowd-based result. Similarly, in some embodiments, a user whose measurement of affective response is used to compute a crowd-based result may be considered as a user who contributed the measurement to the result. Optionally, the contribution of a measurement may be considered an action that is actively performed by the user (e.g., by prompting a measurement to be sent) and/or passively performed by the user (e.g., by a device of the user automatically sending data that may also be collected automatically). Optionally, the contribution of a measurement by a user may be considered an action that is done with the user's permission and/or knowledge (e.g., the measurement is taken according to a policy approved by the user), but possibly without the user being aware that it is done. For example, a measurement of affective response may be taken in a manner approved by the user, e.g., the measurement may be taken according to certain terms of use of a device and/or service that were approved by the user, and/or the measurement is taken based on a configuration or instruction of the user. Furthermore, even though a user may not be consciously aware that the measurement was taken, used for the computation of a crowd-based result like a score, and/or that the result was disclosed, in some embodiments, that measurement of affective response is considered contributed by the user.

Disclosing a crowd-based result such as a score for an experience may involve, in some embodiments, providing information about the result to a third party, such as a value of a score, and/or a statistic computed from the result (e.g., an indication of whether a score reaches a certain threshold). Optionally, a score for an experience that is disclosed to a third party or likely to be disclosed to a third party may be referred to as a "disclosed score", a "disclosed crowd-based score", and the like. Optionally, disclosing a crowd-based result may be referred herein as "forwarding" the result. For example, disclosing a score for an experience may be referred to herein as "forwarding" the score. Optionally, a "third party" may refer to any entity that does not have the actual values of measurements of affective response used to compute a crowd-based result from the measurements. Thus, for example, a user who only has knowledge of his or her measurements may be considered a third party if the user receives a score that was computed based on measurements of other users too. In some embodiments, disclosing a crowd-based result entails storing the result in a database that may be accessed by a third party; thus, disclosing a crowd-based result such as a score for an experience may not necessary involve providing a value of the crowd-based result to a third party, rather just putting the value in a condition such that it may be potentially accessed by the third party.

In addition to providing a value corresponding to a crowd-based result such as a score for an experience, or instead of providing the value, in some embodiments, disclosing the result may involve providing information related to the crowd-based result and/or the computation of the crowd-based result. In one example, this information may include one or more of the measurements of affective response used to compute the crowd-based result, and/or statistics related to the measurements (e.g., the number of users whose measurements were used, or the mean and/or variance of the measurements). In another example, the information may include data identifying one or more of the users who contributed measurements of affective response used to compute the crowd-based result and/or statistics about those users (e.g., the number of users, and/or a demographic breakdown of the users).

In some embodiments, disclosing a crowd-based result, such as a score for an experience, may involve presenting the result using a device that conveys information; for example, a smartphone, a wearable device, augmented reality device (e.g., glasses with augmented images), a virtual reality device. Optionally, a crowd-based result may be disclosed via a device that emits sound (e.g., headphones). Optionally, a crowd-based result may be disclosed using haptic feedback. For example, a haptic feedback glove may provide a distinct vibration indicative of a score for an experience when a user's hand is pointed or placed in a position representing the experience (e.g., the hand may be pointing to an object presented in a virtual reality).

In one embodiment, additional data disclosed in addition to, or instead of, a crowd-based result, such as a score for an experience, may include a value indicating the significance of the result. Optionally, the significance may be determined utilizing various statistical tests. Optionally, the significance may be expressed utilizing various values derived from statistical tests, such as p-values, q-values, false discovery rates (FDRs), error bars, and/or confidence intervals.

In another embodiment, additional data disclosed in addition to, or instead of, a score may include a value indicating the risk to privacy associated with disclosing the score. For example, the additional information may indicate the expected amount of information that may be learned about one or more users due to disclosure of the score.

In order to compute a score, scoring modules may utilize various types of scoring approaches. One example of a scoring approach involves generating a score from a statistical test, such as the scoring approach used by the statistical test module 152 and/or statistical test module 158. Another example of a scoring approach involves generating a score utilizing an arithmetic function, such as a function that may be employed by the arithmetic scorer 162.

Figure 18A:
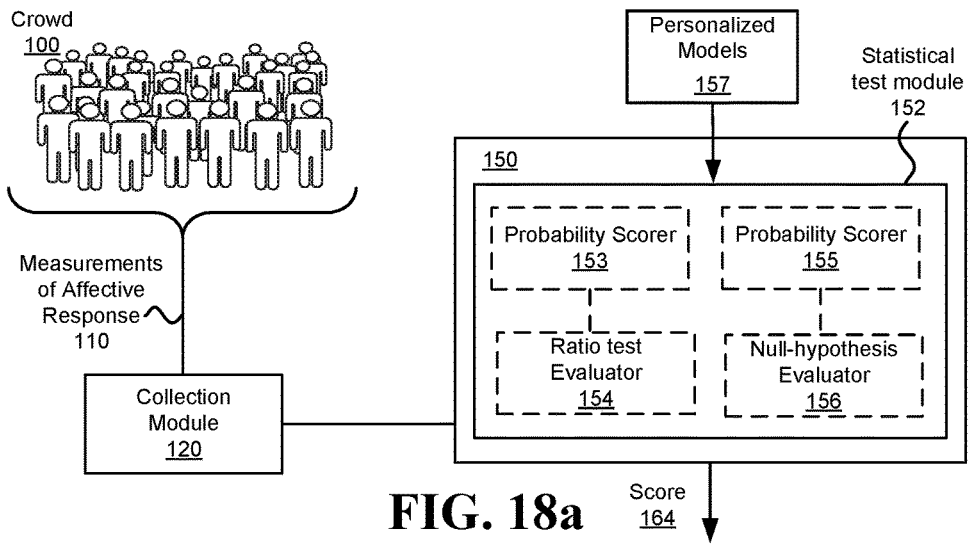
FIG. 18a illustrates one embodiment of a scoring module that utilizes a statistical test module and personalized models to compute a score for an experience.
Figure 18B:
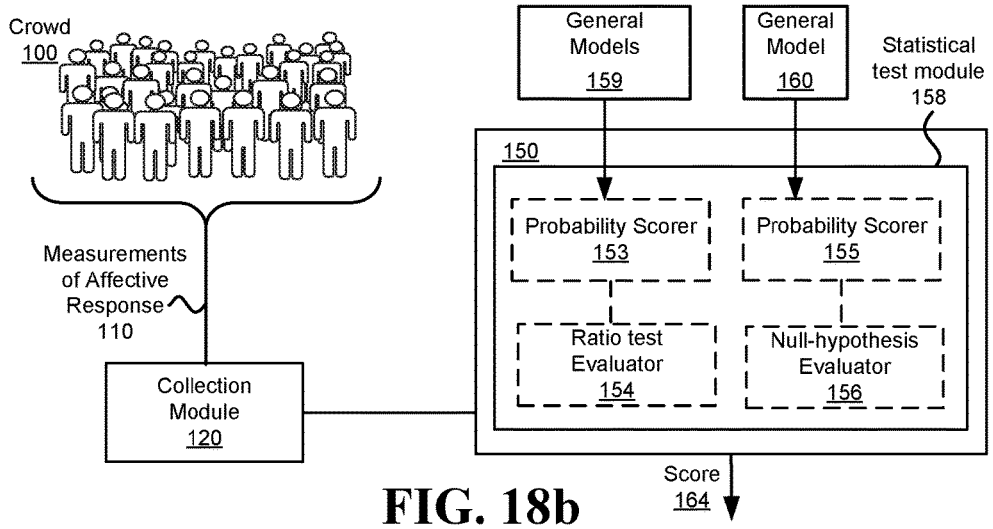
FIG. 18b illustrates one embodiment of a scoring module that utilizes a statistical test module and general models to compute a score for an experience.

FIG. 18a and FIG. 18b each illustrates one embodiment in which a scoring module (scoring module 150 in the illustrated embodiments) utilizes a statistical test module to compute a score for an experience (score 164 in the illustrated embodiments). In FIG. 18a, the statistical test module is statistical test module 152, while in FIG. 18b, the statistical test module is statistical test module 158. The statistical test modules 152 and 158 include similar internal components, but differ based on models they utilize to compute statistical tests. The statistical test module 152 utilizes personalized models 157 while the statistical test module 158 utilizes general models 159 (which include a first model and a second model).

In one embodiment, a personalized model of a user is trained on data comprising measurements of affective response of the user. It thus may be more suitable to interpret measurements of the user. For example, it may describe specifics of the characteristic values of the user's affective response that may be measured when the user is in certain emotional states. Optionally, a personalized model of a user is received from a software agent operating on behalf of the user. Optionally, the software agent may collect data used to train the personalized model of the user by monitoring the user. Optionally, a personalized model of a user is trained on measurements taken while the user had various experiences, which may be different than the experience for which a score is computed by the scoring module in FIG. 18a. Optionally, the various types of experiences include experience types that are different from the experience type of the experience whose score is being computed by the scoring module. In contrast to a personalized model, a general model, such as a model from among the general models 159, is trained on data collected from multiple users and may not even be trained on measurements of any specific user whose measurement is used to compute a score.

In some embodiments, the statistical test modules 152 and 158 each may perform at least one of two different statistical tests in order to compute a score based on a set of measurements of users: a hypothesis test, and a test involving rejection of a null hypothesis.

In some embodiments, performing a hypothesis test utilizing statistical test module 152, is done utilizing a probability scorer 153 and a ratio test evaluator 154. The probability scorer 153 is configured to compute for each measurement of a user, from among the users who provided measurements to compute the score, first and second corresponding values, which are indicative of respective first and second probabilities of observing the measurement based on respective first and second personalized models of the user. Optionally, the first and second personalized models of the users are from among the personalized models 157. Optionally, the first and second personalized models are trained on data comprising measurements of affective response of the user taken when the user had positive and non-positive affective responses, respectively. For example, the first model might have been trained on measurements of the user taken while the user was happy, satisfied, and/or comfortable, while the second model might have been trained on measurements of affective response taken while the user was in a neutral emotional state or a negative emotional state (e.g., angry, agitated, or uncomfortable). Optionally, the higher the probability of observing a measurement based on a model, the more it is likely that the user was in the emotional state corresponding to the model.

The ratio test evaluator 154 is configured to determine the significance level for a hypothesis based on a ratio between a first set of values comprising the first value corresponding to each of the measurements, and a second set of values comprising the second value corresponding to each of the measurements. Optionally, the hypothesis supports an assumption that, on average, the users who contributed measurements to the computation of the score had a positive affective response to the experience. Optionally, the non-positive affective response is a manifestation of a neutral emotional state or a negative emotional state. Thus, if the measurements used to compute the score are better explained by the first model of each user (corresponding to the positive emotional response), then the ratio computed by the ratio test evaluator 154 will be positive and/or large. The greater the value of the ratio, the more the score will indicate that the hypothesis is true and that the measurements of the users represent a positive affective response to the experience. However, if the measurements were not positive, it is likely that the ratio will be negative and/or small, representing that the hypothesis should be rejected in favor of a competing hypothesis that states that the users had a non-positive affective response to the experience. Optionally, a score computed based on the ratio is proportional to the logarithm of the ratio. Thus, the stronger the notion to accept the hypothesis based on the hypothesis test, the greater the computed score.

In some embodiments, performing a hypothesis test utilizing statistical test module 158, is done in a similar fashion to the description given above for performing the same test with the statistical test module 152, but rather than using the personalized models 157, the general models 159 are used instead. When using the statistical test module 158, the probability scorer 153 is configured to compute for each measurement of a user, from among the users who provided measurements to compute the score, first and second corresponding values, which are indicative of respective first and second probabilities of observing the measurement based on respective first and second models belonging to the general models 159. Optionally, the first and second models are trained on data comprising measurements of affective response of users taken while the users had positive and non-positive affective responses, respectively.

The ratio test evaluator 154 is configured to determine the significance level for a hypothesis based on a ratio between a first set of values comprising the first value corresponding to each of the measurements, and a second set of values comprising the second value corresponding to each of the measurements. Optionally, the hypothesis supports an assumption that, on average, the users who contributed measurements to the computation of the score had a positive affective response to the experience. Optionally, the non-positive affective response is a manifestation of a neutral emotional state or a negative emotional state. Thus, if the measurements used to compute the score are better explained by the first model from the general models 159 (which corresponds to the positive emotional response), then the ratio computed by the ratio test evaluator 154 will be positive.

In one embodiment, the hypothesis is a supposition and/or proposed explanation used for evaluating the measurements of affective response. By stating that the hypothesis supports an assumption, it is meant that according to the hypothesis, the evidence (e.g., the measurements of affective response and/or baseline affective response values) exhibit values that correspond to the supposition and/or proposed explanation.

In one embodiment, the ratio test evaluator 154 utilizes a log-likelihood test to determine, based on the first and second sets of values, whether the hypothesis should be accepted and/or the significance level of accepting the hypothesis. If the distribution of the log-likelihood ratio corresponding to a particular null and alternative hypothesis can be explicitly determined, then it can directly be used to form decision regions (to accept/reject the null hypothesis). Alternatively or additionally, one may utilize Wilk's theorem which states that as the sample size approaches infinity, the test statistic $- \log(\Lambda)$, with $\Lambda$ being the log-likelihood value, will be $\chi^2$-distributed. Optionally, the score is computed by a scoring module that utilizes a hypothesis test is proportional to the test statistic $- \log(\Lambda)$.

In some embodiments, performing a statistical test that involves rejecting a null hypothesis utilizing statistical test module 152, is done utilizing a probability scorer 155 and a null-hypothesis evaluator 156. The probability scorer 155 is configured to compute, for each measurement of a user, from among the users who provided measurements to compute the score, a probability of observing the measurement based on a personalized model of the user. Optionally, the personalized model of the user is trained on training data comprising measurements of affective response of the user taken while the user had a certain affective response. Optionally, the certain affective response is manifested by changes to values of at least one of the following: measurements of physiological signals, and measurements of behavioral cues. Optionally, the changes to the values are manifestations of an increase or decrease, to at least a certain extent, in a level of at least one of the following emotions: happiness, contentment, calmness, attentiveness, affection, tenderness, excitement, pain, anxiety, annoyance, stress, aggression, fear, sadness, drowsiness, apathy, and anger.

The null-hypothesis evaluator 156 is configured to determine the significance level for a hypothesis based on probabilities computed by the probability scorer 155 for the measurements of the users who contributed measurements for the computation of the score. Optionally, the hypothesis is a null hypothesis that supports an assumption that the users who contributed measurements of affective response to the computation of the score had the certain affective response when their measurements were taken, and the significance level corresponds to a statistical significance of rejecting the null hypothesis. Optionally, the certain affective response is a neutral affective response. Optionally, the score is computed based on the significance which is expressed as a probability, such as a p-value. For example, the score may be proportional to the logarithm of the p-value.

In one example, the certain affective response corresponds to a manifestation of a negative emotional state. Thus, the stronger the rejection of the null hypothesis, the less likely it is that the users who contributed the measurements were in fact in a negative emotional state, and thus, the more positive the score may be (e.g., if expressed as a log of a p-value of the null hypothesis).

In some embodiments, performing a statistical test that involves rejecting a null hypothesis utilizing statistical test module 158, is done in a similar fashion to the description given above for performing the same test with the statistical test module 152, but rather than using the personalized models 157, the general model 160 is used instead.

The probability scorer 155 is configured to compute, for each measurement of a user, from among the users who provided measurements to compute the score, a probability of observing the measurement based on the general model 160. Optionally, the general model 160 is trained on training data comprising measurements of affective response of users taken while the users had the certain affective response.

The null-hypothesis evaluator 156 is configured to determine the significance level for a hypothesis based on probabilities computed by the probability scorer 155 for the measurements of the users who contributed measurements for the computation of the score. Optionally, the hypothesis is a null hypothesis that supports an assumption that the users of whom the measurements were taken had the certain affective response when their measurements were taken, and the significance level corresponds to a statistical significance of rejecting the null hypothesis.

In some embodiments, a statistical test module such as the statistical test modules 152 and/or 158 are configured to determine whether the significance level for a hypothesis reaches a certain level. Optionally, the significance level reaching the certain level indicates at least one of the following: a p-value computed for the hypothesis equals, or is below, a certain p-value, and a false discovery rate computed for the hypothesis equals, or is below, a certain rate. Optionally, the certain p-value is a value greater than 0 and below 0.33, and the certain rate is a value greater than 0 and below 0.33.

In some cases, the fact that significance for a hypothesis is computed based on measurements of a plurality of users increases the statistical significance of the results of a test of the hypothesis. For example, if the hypothesis is tested based on fewer users, a significance of the hypothesis is likely to be smaller than when it is tested based on measurements of a larger number of users. Thus, it may be possible, for example, for a first significance level for a hypothesis computed based on measurements of at least ten users to reach a certain level. However, on average, a second significance level for the hypothesis, computed based on the measurements of affective response of a randomly selected group of less than five users out of the at least ten users, will not reach the certain level. Optionally, the fact the second significance level does not reach the certain level indicates at least one of the following: a p-value computed for the hypothesis is above the certain p-value, and a false discovery rate computed for the hypothesis is above the certain rate.

Figure 18C:
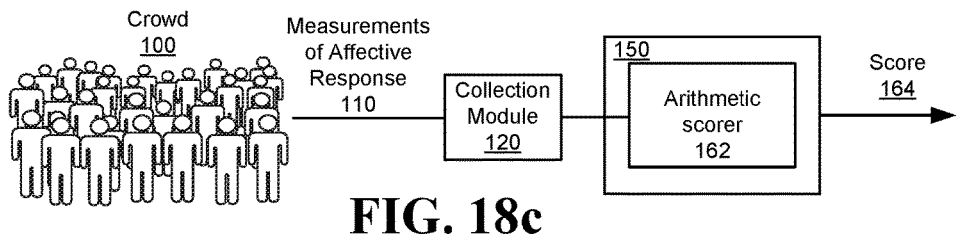
FIG. 18c illustrates one embodiment in which a scoring module utilizes an arithmetic scorer in order to compute a score for an experience.

FIG. 18c illustrates one embodiment in which a scoring module utilizes the arithmetic scorer 162 in order to compute a score for an experience. The arithmetic scorer 162 receives measurements of affective response from the collection module 120 and computes the score 164 by applying one or more arithmetic functions to the measurements. Optionally, the arithmetic function is a predetermined arithmetic function. For example, the logic of the function is known prior to when the function is applied to the measurements. Optionally, a score computed by the arithmetic function is expressed as a measurement value which is greater than the minimum of the measurements used to compute the score and lower than the maximum of the measurements used to compute the score. In one embodiment, applying the predetermined arithmetic function to the measurements comprises computing at least one of the following: a weighted average of the measurements, a geometric mean of the measurements, and a harmonic mean of the measurements. In another embodiment, the predetermined arithmetic function involves applying mathematical operations dictated by a machine learning model (e.g., a regression model). In some embodiments, the predetermined arithmetic function applied by the arithmetic scorer 162 is executed by a set of instructions that implements operations performed by a machine learning-based predictor that receives the measurements used to compute a score as input.

In some embodiments, a scoring module may compute a score for an experience based on measurements that have associated weights. In one example, the weights may be determined based on the age of the measurements (e.g., when the scoring module is the dynamic scoring module 180). In another example, the weights may be assigned by the personalization module 130, and/or may be determined based on an output generated by the personalization module 130, in order for the scoring module to compute a personalized score. The scoring modules described above can easily be adapted by one skilled in the art in order to accommodate weights. For example, the statistical test modules may utilize weighted versions of the hypothesis test (i.e., a weighted version of the likelihood ratio test and/or the test for rejection of a null hypothesis). Additionally, many arithmetic functions that are used to compute scores can be easily adapted to a case where measurements have associated weights. For example, instead of a score being computed as a regular arithmetic average, it may be computed as a weighted average.

Herein a weighted average of a plurality of measurements may be any function that can be described as a dot product between a vector of real-valued coefficients and a vector of the measurements. Optionally, the function may give at least some of the measurements a different weight (i.e., at least some of the measurements may have different valued corresponding coefficients).

11—Personalization

The crowd-based results generated in some embodiments described in this disclosure may be personalized results. In particular, when scores are computed for experiences, e.g., by various systems such as illustrated in FIG. 14a, the same set of measurements may, in some embodiments, be used to compute different scores for different users. For example, in one embodiment, a score computed by a scoring module 150 may be considered a personalized score for a certain user and/or for a certain group of users. Optionally, the personalized score is generated by providing the personalization module 130 with a profile of the certain user (or a profile corresponding to the certain group of users). The personalization module 130 compares a provided profile to profiles from among the profiles 128, which include profiles of at least some of the users belonging to the crowd 100, in order to determine similarities between the provided profile and the profiles of at least some of the users belonging to the crowd 100. Based on the similarities, the personalization module 130 produces an output indicative of a selection and/or weighting of at least some of the measurements 110. By providing the scoring module 150 with outputs indicative of different selections and/or weightings of measurements from among the measurements 110, it is possible that the scoring module 150 may compute different scores corresponding to the different selections and/or weightings of the measurements 110, which are described in the outputs.

The above scenario is illustrated in FIG. 19, where the measurements 110 of affective response are provided via network 112 to a system that computes personalized scores for experiences. The network 112 also forwards to two different users 266a and 266b respective scores 164a and 164b which have different values. Optionally, the two users 266a and 266b receive an indication of their respective scores essentially at the same time, such as at most within a few minutes of each other.

Figure 20:
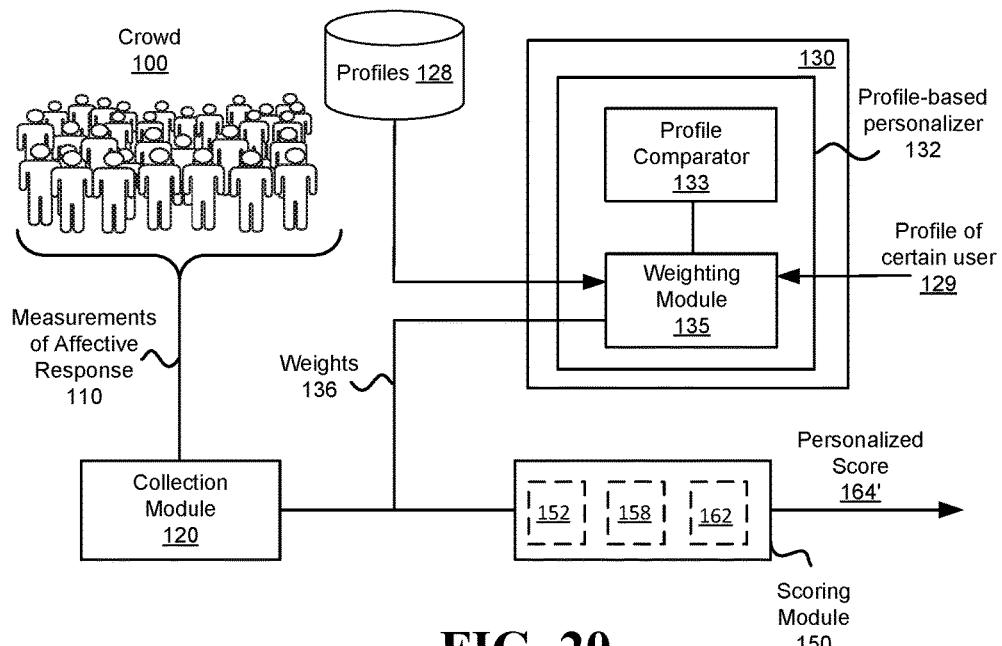
FIG. 20 illustrates a system configured to utilize comparison of profiles of users to compute personalized scores for an experience based on measurements of affective response of the users.
Figure 21:
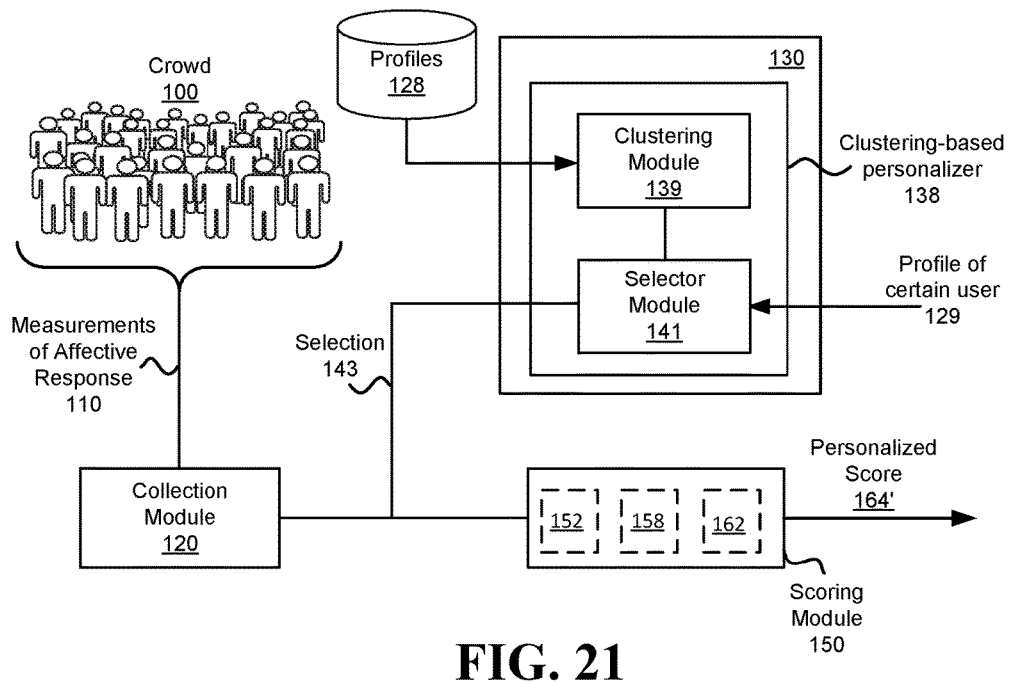
FIG. 21 illustrates a system configured to utilize clustering of profiles of users to compute personalized scores for an experience based on measurements of affective response of the users.
Figure 22:
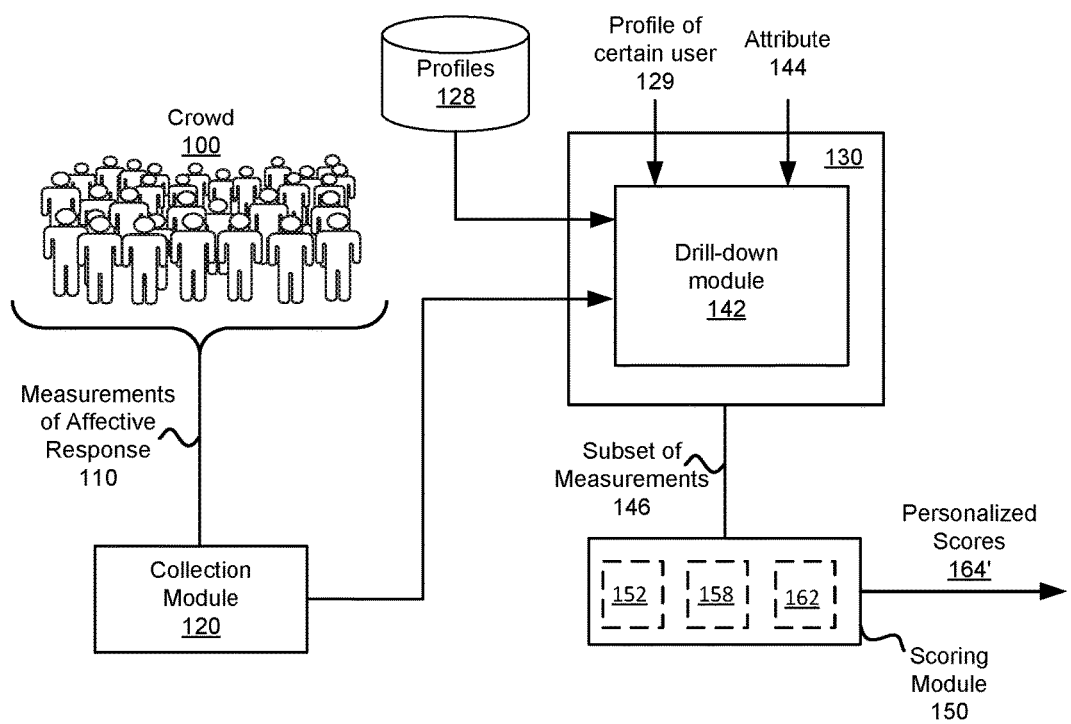
FIG. 22 illustrates a system configured to utilize comparison of profiles of users and/or selection of profiles based on attribute values, in order to compute personalized scores for an experience.

It is to be noted that in this disclosure, the personalization module 130 is typically utilized in order to generate personalized crowd-based results in some embodiments described in this disclosure. Depending on the embodiment, personalization module 130 may have different components and/or different types of interactions with other system modules. FIG. 20 to FIG. 22 illustrate various configurations according to which personalization module 130 may be used in a system illustrated by FIG. 14*a*. Though FIG. 20 to FIG. 22 illustrate the principles of personalization as used with respect to computing personalized scores (e.g., by a system modeled according to FIG. 14*a*), the principles of personalization using personalization module 130, as discussed below, are applicable to other modules, systems, and embodiments described in this disclosure (e.g., involving ranking, alerts, learning function parameters, etc.)

Additionally, profiles of users belonging to the crowd 100 are typically designated by the reference numeral 128. This is not intended to mean that in all embodiments all the profiles of the users belonging to the crowd 100 are the same, rather, that the profiles 128 are profiles of users from the crowd 100, and hence may include any information described in this disclosure as possibly being included in a profile. Thus, using the reference numeral 128 for profiles signals that these profiles are for users who have an experience which may be of any type of experience described in this disclosure. Any teachings related to the profiles 128 may be applicable to other profiles described in this disclosure such as the profiles 504. The use of a different reference numeral is meant to signal that the profiles 504 involve users who had a certain type of experience (in this case an experience that involves being at a location).

Furthermore, in embodiments described herein there may be various ways in which the personalization module 130 may obtain a profile of a certain user and/or profiles of other users (e.g., the profiles 128 and/or the profiles 504). In one embodiment, the personalization module 130 requests and/or receives profiles sent to it by other entities (e.g., by users, software agents operating on behalf of users, or entities storing information belonging to profiles of users). In another embodiment, the personalization module 130 may itself store and/or maintain information from profiles of users.

FIG. 20 illustrates a system configured to utilize comparison of profiles of users to compute personalized scores for an experience based on measurements of affective response of the users who have the experience. The system includes at least the collection module 120, the personalization module 130, and the scoring module 150. In this embodiment, the personalization module 130 utilizes profile-based personalizer 132 which comprises profile comparator 133 and weighting module 135.

The collection module 120 is configured to receive measurements 110 of affective response, which in this embodiment include measurements of at least ten users. Each measurement of a user, from among the measurements of the at least ten users, corresponds to an event in which the user has the experience. It is to be noted that the discussion below regarding the measurements of at least ten users is applicable to other numbers of users, such as at least five users.

The profile comparator 133 is configured to compute a value indicative of an extent of a similarity between a pair of profiles of users. Optionally, a profile of a user includes information that describes one or more of the following: an indication of an experience the user had, a demographic characteristic of the user, a genetic characteristic of the user, a static attribute describing the body of the user, a medical condition of the user, an indication of a content item consumed by the user, and a feature value derived from semantic analysis of a communication of the user. The profile comparator 133 does not return the same result when comparing various pairs of profiles. For example, there are at least first and second pairs of profiles, such that for the first pair of profiles, the profile comparator 133 computes a first value indicative of a first similarity between the first pair of profiles, and for the second pair of profiles, the profile comparator 133 computes a second value indicative of a second similarity between the second pair of profiles.

The weighting module 135 is configured to receive a profile 129 of a certain user and the profiles 128, which comprise profiles of the at least ten users and to generate an output that is indicative of weights 136 for the measurements of the at least ten users. Optionally, the weight for a measurement of a user, from among the at least ten users, is proportional to a similarity computed by the profile comparator 133 between a pair of profiles that includes the profile of the user and the profile 129, such that a weight generated for a measurement of a user whose profile is more similar to the profile 129 is higher than a weight generated for a measurement of a user whose profile is less similar to the profile 129. The weighting module 135 does not generate the same output for all profiles of certain users that are provided to it. That is, there are at least a certain first user and a certain second user, who have different profiles, for which the weighting module 135 produces respective first and second outputs that are different. Optionally, the first output is indicative of a first weighting for a measurement from among the measurements of the at least ten users, and the second output is indicative of a second weighting, which is different from the first weighting, for the measurement from among the measurements of the at least ten users.

Herein, a weight of a measurement determines how much the measurement's value influences a value computed based on the measurement. For example, when computing a score based on multiple measurements that include first and second measurements, if the first measurement has a higher weight than the second measurement, it will not have a lesser influence on the value of the score than the influence of the second measurement on the value of the score. Optionally, the influence of the first measurement on the value of the score will be greater than the influence of the second measurement on the value of the score.

Stating that a weight generated for a measurement of a first user whose profile is more similar to a certain profile is higher than a weight generated for a measurement of a second user whose profile is less similar to the profile of the certain user may imply different things in different embodiments. In one example, the weight generated for the measurement of the first user is at least 25% higher than the weight generated for the measurement of the second user. In another example, the weight generated for the measurement of the first user is at least double the weight generated for the measurement of the second user. And in yet another example, the weight generated for the measurement of the first user is not zero while the weight generated for the measurement of the second user is zero or essentially zero. Herein a weight of essentially zero means that there is at least another weight generated for another sample that is much higher than the weight that is essentially zero, where much higher may be at least 50 times higher, 100 times higher, or more.

It is to be noted that in this disclosure, a profile of a certain user, such as profile 129, may not necessarily correspond to a real person and/or be derived from data of a single real person. In some embodiments, a profile of a certain user may be a profile of a representative user, which has information in it corresponding to attribute values that may characterize one or more people for whom a crowd-based result is computed.

The scoring module 150 is configured to compute a score 164', for the experience, for the certain user based on the measurements and weights 136, which were computed based on the profile 129 of the certain user. In this case, the score 164' may be considered a personalized score for the certain user.

When computing scores, the scoring module 150 takes into account the weightings generated by the weighting module 135 based on the profile 129. That is, it does not compute the same scores for all weightings (and/or outputs that are indicative of the weightings). In particular, at least for the certain first user and the certain second user, who have different profiles and different outputs generated by the weighting module 135, the scoring module computes different scores. Optionally, when computing a score for the certain first user, a certain measurement has a first weight, and when computing a score for the certain second user, the certain measurement has a second weight that is different from the first weight.

In one embodiment, the scoring module 150 may utilize the weights 136 directly by weighting the measurements used to compute a score. For example, if the score 164' represents an average of the measurements, it may be computed using a weighted average instead of a regular arithmetic average. In another embodiment, the scoring module 150 may end up utilizing the weights 136 indirectly. For example, the weights may be provided to the collection module 120, which may determine based on the weights, which of the measurements 110 should be provided to the scoring module 150. In one example, the collection module 120 may provide only measurements for which associated weights determined by weighting module 135 reach a certain minimal weight.

Herein, a profile of a user may involve various forms of information storage and/or retrieval. The use of the term "profile" is not intended to mean that all the information in a profile is stored at a single location. A profile may be a collection of data records stored at various locations and/or held by various entities. Additionally, stating that a profile of a user has certain information does not imply that the information is specifically stored in a certain memory or media; rather, it may imply that the information may be obtained, e.g., by querying certain systems and/or performing computations on demand. In one example, at least some of the information in a profile of a user is stored and/or disseminated by a software agent operating on behalf of the user. In different embodiments, a profile of a user, such as a profile from among the profiles 128 or 504, may include various forms of information as elaborated on below.

In one embodiment, a profile of a user may include indications of experiences the user had. This information may include a log of experiences the user had and/or statistics derived from such a log. Information related to experiences the user had may include, for an event in which the user had an experience, attributes such as the type of experience, the duration of the experience, the location in which the user had the experience, the cost of the experience, and/or other parameters related to such an event. The profile may also include values summarizing such information, such as indications of how many times and/or how often a user has certain experiences.

In one example, indications of experiences the user had may include information regarding traveling experiences the user had. Examples of such information may include: countries and/or cities the user visited, hotels the user stayed at, modes of transportation the user used, duration of trips, and the type of trip (e.g., business trip, convention, vacation, etc.)

In one example, indications of experiences the user had may include information regarding purchases the user made. Examples of such information may include: bank and/or credit card transactions, e-commerce transactions, and/or digital wallet transactions.

In another embodiment, a profile of a user may include demographic data about the user. This information may include attributes such as age, gender, income, address, occupation, religious affiliation, political affiliation, hobbies, memberships in clubs and/or associations, and/or other attributes of the like.

In yet another embodiment, a profile of a user may include medical information about the user. The medical information may include data about properties such as age, weight, and/or diagnosed medical conditions. Additionally or alternatively, the profile may include information relating to genotypes of the user (e.g., single nucleotide polymorphisms) and/or phenotypic markers. Optionally, medical information about the user involves static attributes, or attributes whose values change very slowly (which may also be considered static). For example, genotypic data may be considered static, while weight and diagnosed medical conditions change slowly and may also be considered static. Such information pertains to a general state of the user, and does not describe the state of the user at specific time and/or when the user performs a certain activity.

The static information mentioned above may be contrasted with dynamic medical data, such as data obtained from measurements of affective response. For example, heart rate measured at a certain time, brainwave activity measured with EEG, and/or images of a user used to capture a facial expression, may be considered dynamic data. In some embodiments, a profile of a user does not include dynamic medical information. In particular, in some embodiments, a profile of a user does not include measurements of affective response and/or information derived from measurements of affective response. For example, in some embodiments, a profile of a user does not include data gathered by one or more of the sensors described in Section 1—Sensors, and/or information derived from such data.

In one embodiment, a profile of a user may include information regarding culinary and/or dieting habits of the user. For example, the profile may include dietary restrictions and/or allergies the user may have. In another example, the profile may include preference information (e.g., favorite cuisine, dishes, etc.) In yet another example, the profile may include data derived from monitoring food and beverages the user consumed. Such information may come from various sources, such as billing transactions and/or a camera-based system that utilizes image processing to identify food and drinks the user consumes from images taken by a camera mounted on the user and/or in the vicinity of the user.

Content a user generates and/or consumes may also be represented in a profile of a user. In one embodiment, a profile of a user may include data describing content items a user consumed (e.g., movies, music, websites, games, and/or virtual reality experiences). In another embodiment, a profile of a user may include data describing content the user generated such as images taken by the user with a camera, posts on a social network, conversations (e.g., text, voice, and/or video). Optionally, a profile may include both indications of content generated and/or consumed (e.g., files containing the content and/or pointer to the content such as URLs). Additionally or alternatively, the profile may include feature values derived from the content such as indications of various characteristics of the content (e.g., types of content, emotions expressed in the content, and the like). Optionally, the profile may include feature values derived from semantic analysis of a communication of the user. Examples of semantic analysis include: (i) Latent Semantic Analysis (LSA) or latent semantic indexing of text in order to associate a segment of content with concepts and/or categories corresponding to its meaning; and (ii) utilization of lexicons that associate words and/or phrases with core emotions, which may assist in determining which emotions are expressed in a communication.

Information included in a profile of a user may come from various sources. In one e embodiment, at least some of the information in the profile may be self-reported. For example, the user may actively enter data into the profile and/or edit data in the profile. In another embodiment, at least some of the data in the profile may be provided by a software agent operating on behalf of the user (e.g., data obtained as a result of monitoring experiences the user has and/or affective response of the users to those experiences). In another embodiment, at least some of the data in the profile may be provided by a third party, such as a party that provides experiences to the user and/or monitors the user.

There are various ways in which profile comparator 133 may compute similarities between profiles. Optionally, the profile comparator 133 may utilize a procedure that evaluates pairs of profiles independently to determine the similarity between them. Alternatively, the profile comparator 133 may utilize a procedure that evaluates similarity between multiple profiles simultaneously (e.g., produce a matrix of similarities between all pairs of profiles).

It is to be noted that when computing similarity between profiles, the profile comparator 133 may rely on a subset of the information in the profiles in order to determine similarity between the profiles. In particular, in some embodiments, a similarity determined by the profile comparator 133 may rely on the values of a small number of attributes or even on values of a single attribute. For example, in one embodiment, the profile comparator 133 may determine similarity between profiles users based solely on the age of the users as indicated in the profiles.

In one embodiment, profiles of users are represented as vectors of values that include at least some of the information in the profiles. In this embodiment, the profile comparator 133 may determine similarity between profiles by using a measure such as a dot product between the vector representations of the profiles, the Hamming distance between the vector representations of the profiles, and/or using a distance metric such as Euclidean distance between the vector representations of the profiles.

In another embodiment, profiles of users may be clustered by the profile comparator 133 into clusters using one or more clustering algorithms that are known in the art (e.g., k-means, hierarchical clustering, or distribution-based Expectation-Maximization). Optionally, profiles that fall within the same cluster are considered similar to each other, while profiles that fall in different clusters are not considered similar to each other. Optionally, the number of clusters is fixed ahead of time or is proportionate to the number of profiles. Alternatively, the number of clusters may vary and depend on criteria determined from the clustering (e.g., ratio between inter-cluster and intra-cluster distances). Optionally, a profile of a first user that falls into the same cluster to which the profile of a certain user belongs is given a higher weight than a profile of a second user, which falls into a different cluster than the one to which the profile of the certain user belongs. Optionally, the higher weight given to the profile of the first user means that a measurement of the first user is given a higher weight than a measurement of the second user, when computing a personalized score for the certain user.

In yet another embodiment, the profile comparator 133 may determine similarity between profiles by utilizing a predictor trained on data that includes samples and their corresponding labels. Each sample includes feature values derived from a certain pair of profiles of users, and the sample's corresponding label is indicative of the similarity between the certain pair of profiles. Optionally, a label indicating similarity between profiles may be determined by manual evaluation. Optionally, a label indicating similarity between profiles may be determined based on the presence of the profiles in the same cluster (as determined by a clustering algorithm) and/or based on results of a distance function applied to the profiles. Optionally, pairs of profiles that are not similar may be randomly selected. In one example, given a pair of profiles, the predictor returns a value indicative of whether they are considered similar or not.

FIG. 21 illustrates a system configured to utilize clustering of profiles of users to compute personalized scores for an experience based on measurements of affective response of the users. The system includes at least the collection module 120, the personalization module 130, and the scoring module 150. In this embodiment, the personalization module 130 utilizes clustering-based personalizer 138 which comprises clustering module 139 and selector module 141.

The collection module 120 is configured to receive measurements 110 of affective response, which in this embodiment include measurements of at least ten users. Each measurement of a user, from among the measurements of the at least ten users, corresponds to an event in which the user has an experience.

The clustering module 139 is configured to receive the profiles 128 of the at least ten users, and to cluster the at least ten users into clusters based on profile similarity, with each cluster comprising a single user or multiple users with similar profiles. Optionally, the clustering module 139 may utilize the profile comparator 133 in order to determine similarity between profiles. There are various clustering algorithms known in the art which may be utilized by the clustering module 139 to cluster users. Some examples include hierarchical clustering, partition-based clustering (e.g., k-means), and clustering utilizing an Expectation-Maximization algorithm. In one embodiment, each user may belong to a single cluster, while in another embodiment, each user may belong to multiple clusters (soft clustering). In the latter example, each user may have an affinity value to at least some clusters, where an affinity value of a user to a cluster is indicative of how strongly the user belongs to the cluster. Optionally, after performing a sot clustering of users, each user is assigned to a cluster to which the user has a strongest affinity.

The selector module 141 is configured to receive a profile 129 of a certain user, and based on the profile, to select a subset comprising at most half of the clusters of users. Optionally, the selection of the subset is such that, on average, the profile 129 is more similar to a profile of a user who is a member of a cluster in the subset, than it is to a profile of a user, from among the at least ten users, who is not a member of any of the clusters in the subset.

In one example, the selector module 141 selects the cluster to which the certain user has the strongest affinity (e.g., the profile 129 of the certain user is most similar to a profile of a representative of the cluster, compared to profiles of representatives of other clusters). In another example, the selector module 141 selects certain clusters for which the similarity between the profile of the certain user and profiles of representatives of the certain clusters is above a certain threshold. And in still another example, the selector module 141 selects a certain number of clusters to which the certain user has the strongest affinity (e.g., based on similarity of the profile 129 to profiles of representatives of the clusters).

Additionally, the selector module 141 is also configured to select at least eight users from among the users belonging to clusters in the subset. Optionally, the selector module 141 generates an output that is indicative of a selection 143 of the at least eight users. For example, the selection 143 may indicate identities of the at least eight users, or it may identify cluster representatives of clusters to which the at least eight users belong. It is to be noted that instead of selecting at least eight users, a different minimal number of users may be selected such as at least five, at least ten, and/or at least fifty different users.

Herein, a cluster representative represents other members of the cluster. The cluster representative may be one of the members of the cluster chosen to represent the other members or an average of the members of the cluster (e.g., a cluster centroid). In the latter case, a measurement of the representative of the cluster may be obtained based on a function of the measurements of the members it represents (e.g., an average of their measurements).

It is to be noted that the selector module 141 does not generate the same output for all profiles of certain users that are provided to it. That is, there are at least a certain first user and a certain second user, who have different profiles, for which the selector module 141 produces respective first and second outputs that are different. Optionally, the first output is indicative of a first selection of at least eight users from among the at least ten users, and the second output is indicative of a second selection of at least eight users from among the at least ten users, which is different from the first selection. For example, the first selection may include a user that is not included in the second selection.

The selection 143 may be provided to the collection module 120 and/or to the scoring module 150. For example, the collection module 120 may utilize the selection 143 to filter, select, and/or weight measurements of certain users, which it forwards to the scoring module 150. As explained below, the scoring module 150 may also utilize the selection 143 to perform similar actions of selecting, filtering and/or weighting measurements from among the measurements of the at least ten users which are available for it to compute the score 164'.

The scoring module 150 is configured to compute a score 164', for the experience, for the certain user based on the measurements of the at least eight users. In this case, the score 164' may be considered a personalized score for the certain user. When computing the scores, the scoring module 150 takes into account the selections generated by the selector module 141 based on the profile 129. In particular, at least for the certain first user and the certain second user, who have different profiles and different outputs generated by the selector module 141, the scoring module 150 computes different scores.

It is to be noted that the scoring module 150 may compute the score 164' based on the selection 143 in various ways. In one example, the scoring module 150 may utilize measurements of the at least eight users in a similar way to the way it computes a score based on measurements of at least ten users. However, in this case it would leave out measurements of users not in the selection 143, and only use the measurements of the at least eight users. In another example, the scoring module 150 may compute the score 164' by associating a higher weight to measurements of users that are among the at least eight users, compared to the weight it associates with measurements of users from among the at least ten users who are not among the at least eight users. In yet another example, the scoring module 150 may compute the score 164' based on measurements of one or more cluster representatives of the clusters to which the at least eight users belong.

FIG. 22 illustrates a system configured to utilize comparison of profiles of users and/or selection of profiles based on attribute values, in order to compute personalized scores for an experience based on measurements of affective response of the users. The system includes at least the collection module 120, the personalization module 130, and the scoring module 150. In this embodiment, the personalization module 130 includes drill-down module 142.

In one embodiment, the drill-down module 142 serves as a filtering layer that may be part of the collection module 120 or situated after it. The drill-down module 142 receives an attribute 144 and/or a profile 129 of a certain user, and filters and/or weights the measurements of the at least ten users according to the attribute 144 and/or the profile 129 in different ways. The drill-down module 142 provides the scoring module 150 with a subset 146 of the measurements of the at least ten users, which the scoring module 150 may utilize to compute the score 164'. Thus, a drill-down may be considered a refining of a result (e.g., a score) based on a selection or weighting of the measurements according to a certain criterion.

In one example, the drill-down is performed by selecting for the subset 146 measurements of users that include the attribute 144 or have a value corresponding to a range associated with the attribute 144. For example, the attribute 144 may correspond to a certain gender and/or age group of users. In other examples, the attribute 144 may correspond to any attribute that may be included in the profiles 128. For example, the drill-down module 142 may select for the subset 146 measurements of users who have certain hobbies, have visited certain locations, and/or live in a certain region.

In another example, the drill-down module 142 selects measurements of the subset 146 based on the profile 129. The drill-down module 142 may take a value of a certain attribute from the profile 129 and filter users and/or measurements based on the value of the certain attribute. Optionally, the drill-down module 142 receives an indication of which attribute to use to perform a drill-down via the attribute 144, and a certain value and/or range of values based on a value of that attribute in the profile 129. For example, the attribute 144 may indicate to perform a drill-down based on a favorite computer game, and the profile 129 includes an indication of the favorite computer game of the certain user, which is then used to filter the measurements of the at least ten users to include measurements of users who also play the certain computer game and/or for whom the certain computer game is also a favorite.

The scoring module 150 is configured, in one embodiment, to compute the score 164' based on the measurements in the subset 146. Optionally, the subset 146 includes measurements of at least five users from among the at least ten users.

In some embodiments, systems that generate personalized crowd-based results, such as the systems illustrated in FIG. 20 to FIG. 22 may produce different results for different users based on different personalized results for the users. For example, in some embodiments, a recommender module, such as the recommender module 178, may recommend an experience differently to different users because the different users received a different score for the same experience (even though the scores for the different users were computed based on the same set of measurements of at least ten users). In particular, a first user may have a first score computed for an experience while a second user may have a second score computed for the experience. The first score is such that it reaches a threshold, while the second score is lower, and does not reach the threshold. Consequently, the recommender module 178 may recommend the experience to the first user in a first manner, and to the second user in a second manner, which involves a recommendation that is not as strong as a recommendation that is made when recommending in the first manner. This may be the case, despite the first and second scores being computed around the same time and/or based on the same measurements.

Figure 23:
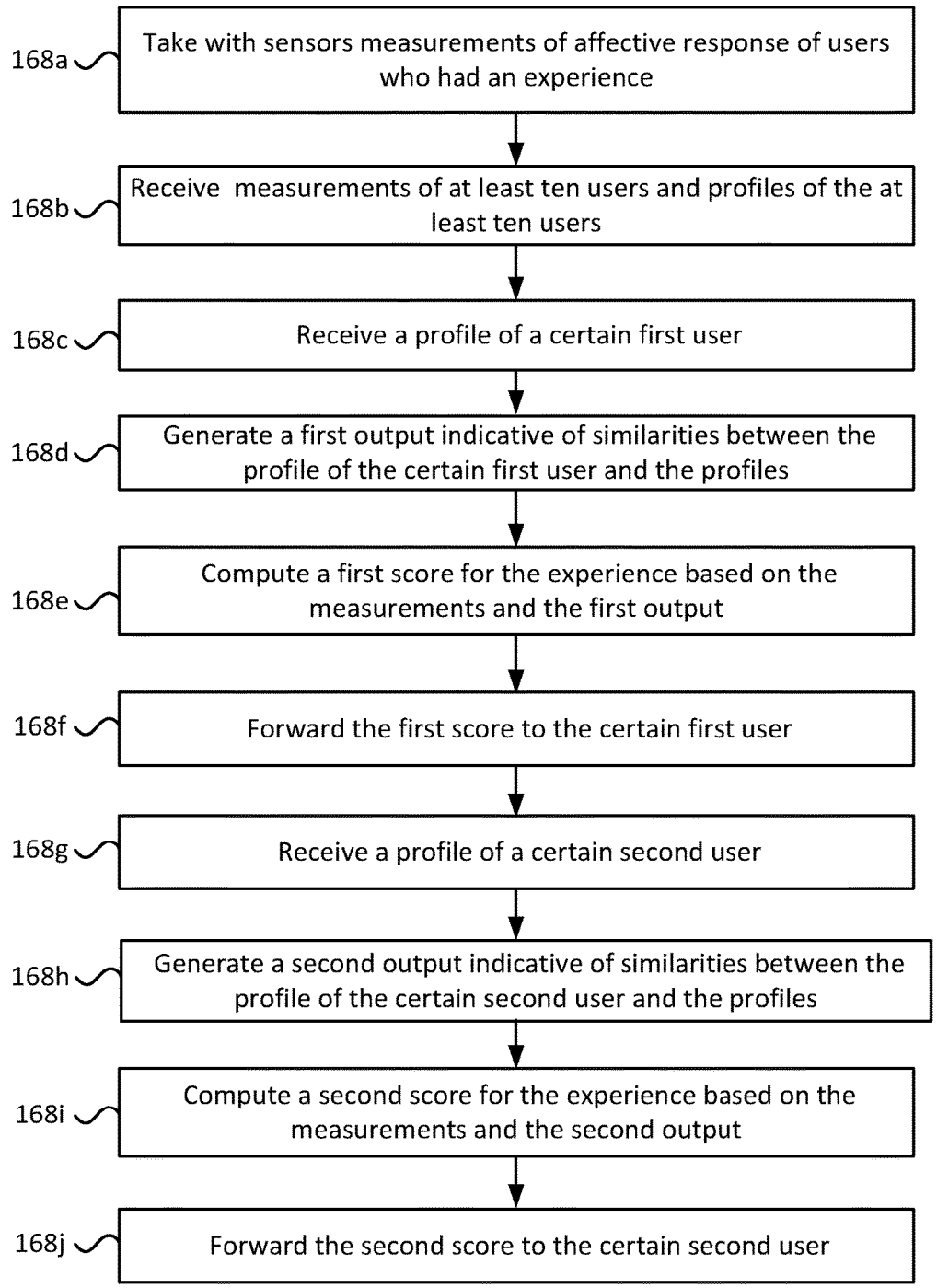
FIG. 23 illustrates steps involved in a method for utilizing profiles of users for computing personalized scores for an experience.

As discussed above, when personalization is introduced, having different profiles can lead to it that users receive different crowd-based results computed for them, based on the same measurements of affective response. This process is illustrated in FIG. 23, which describes how steps carried out for computing scores for an experience can lead to different users receiving different results. The steps illustrated in FIG. 23 may, in some embodiments, be part of the steps performed by systems modeled according to FIG. 20 to FIG. 22. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, a method for utilizing profiles of users for computing personalized scores for an experience, based on measurements of affective response of the users, includes the following steps:

In step 168b, receiving, by a system comprising a processor and memory, measurements of affective response of at least ten users to the experience (i.e., measurements of affective response of at least ten users who had the experience).

In step 168c, receiving a profile of a certain first user.

In step 168d, generating a first output indicative of similarities between the profile of the certain first user and the profiles of the at least eight users. Optionally, the first output is generated by the personalization module 130.

In step 168e, computing, based on the measurements and the first output, a first score for the experience. Optionally, the first score is computed by the scoring module 150.

In step 168g, receiving a profile of a certain second user.

In step 168h, generating a second output indicative of similarities between the profile of the certain second user and the profiles of the at least ten users. In this embodiment, the second output is different from the first output. Optionally, the second output is generated by the personalization module 130.

An in step 168i, computing, based on the measurements and the second output, a second score for the experience. Optionally, the first score being different from the second score. Optionally, computing the first score for the experience involves utilizing at least one measurement that is not utilized for computing the second score for the experience. Optionally, the second score is computed by the scoring module 150.

In one embodiment, the method described above may optionally include an additional step 168a that involves utilizing sensors for taking the measurements of the at least ten users. Optionally, each sensor is coupled to a user, and a measurement of a sensor coupled to a user comprises at least one of the following values: a value representing a physiological signal of the user, and a value representing a behavioral cue of the user.

In one embodiment, the method described above may optionally include additional steps, such as step 168f that involves forwarding the first score to the certain first user and/or step 168j that involves forwarding the second score to the certain second user.

In one embodiment, computing the first and second scores involves weighting of the measurements of the at least ten users. Optionally, the method described above involves a step of weighting a measurement utilized to compute both the first and second scores for the experience with a first weight when utilized to compute the first score and with a second weight, different from the first weight, when utilized to compute the second score.

Generating the first and second outputs may be done in various ways, as described above. The different personalization methods may involve different steps that are to be performed in the method described above, as described in the following examples.

In one example, generating the first output comprises the following steps: computing a first set of similarities between the profile of the certain first user and the profiles of the at least ten users, and computing, based on the first set of similarities, a first set of weights for the measurements of the at least ten users. Optionally, each weight for a measurement of a user is proportional to the extent of a similarity between the profile of the certain first user and the profile of the user, such that a weight generated for a measurement of a user whose profile is more similar to the profile of the certain first user is higher than a weight generated for a measurement of a user whose profile is less similar to the profile of the certain first user. In this example, the first output may be indicative of the values of the first set of weights.

In another embodiment, generating the first output comprises the following steps: (i) clustering the at least ten users into clusters based on similarities between the profiles of the at least ten users, with each cluster comprising a single user or multiple users with similar profiles; (ii) selecting, based on the profile of the certain first user, a subset of clusters comprising at least one cluster and at most half of the clusters; where, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. In this example, the first output may be indicative of the identities of the at least eight users.

The values of the first and second scores can lead to different behavior regarding how the first and second scores are treated. In one embodiment, the first score may be greater than the second score, and the method described above may optionally include steps involving recommending the experience differently to different users based on the values of the first and second scores. For example, the method may include steps comprising recommending the experience to the certain first user in a first manner and recommending the experience to the certain second user in a second manner. Optionally, recommending an experience in the first manner comprises providing stronger recommendation for the experience, compared to a recommendation provided when recommending the experience in the second manner.

12—Alerts

In some embodiments, scores computed for an experience may be dynamic, i.e., they may change over time. In one example, scores may be computed utilizing a "sliding window" approach, and use measurements of affective response that were taken during a certain period of time. In another example, measurements of affective response may be weighted according to the time that has elapsed since they were taken. Such a weighting typically, but not necessarily, involves giving older measurements a smaller weight than more recent measurements when used to compute a score. In some embodiments, it may be of interest to determine when a score reaches a threshold and/or passes (e.g., by exceeding the threshold or falling below the threshold), since that may signify a certain meaning and/or require taking a certain action, such as issuing a notification about the score. Issuing a notification about a value of a score reaching and/or exceeding a threshold may be referred to herein as "alerting" and/or "dynamically alerting".

Figure 24A:
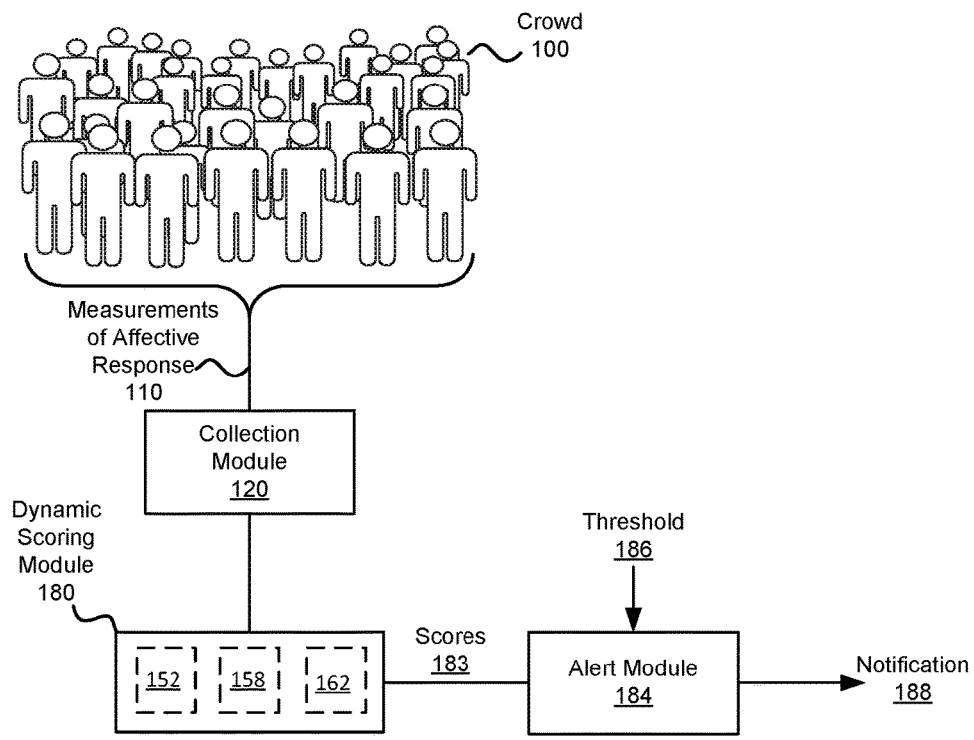
FIG. 24a illustrates a system configured to alert about affective response to an experience.

FIG. 24a illustrates a system configured to alert about affective response to an experience. The system includes at least the collection module 120, the dynamic scoring module 180, and an alert module 184. It is to be noted that the experience to which the embodiment illustrated in FIG. 24a relates, as well as other embodiments involving an experience in this disclosure, may be any experience mentioned in this disclosure.

The collection module 120 is configured to receive measurements 110 of affective response of users to the experience. Optionally, a measurement of affective response of a user to the experience is based on at least one of the following values: (i) a value acquired by measuring the user, with a sensor coupled to the user, while the user has the experience, and (ii) a value acquired by measuring the user with the sensor up to one minute after the user had the experience. Optionally, each of the measurements comprises at least one of the following: a value representing a physiological signal of the user and a value representing a behavioral cue of the user.

In one embodiment, the dynamic scoring module 180 is configured to compute scores 183 for the experience based on the measurements 110. The dynamic scoring module may utilize similar modules to the ones utilized by scoring module 150. For example, the dynamic scoring module may utilize the statistical test module 152, the statistical test module 158, and/or the arithmetic scorer 162. The scores 183 may comprise various types of values, similarly to scores for experiences computed by other modules in this disclosure, such as scoring module 150.

When a scoring module is referred to as being "dynamic", it is done to emphasize a temporal relationship between a score computed by the dynamic scoring module 180 and when the measurements used to compute the score were taken. For example, each score computed by the dynamic scoring module 180 corresponds to a time t. The score is computed based on measurements that were taken at a time that is no later than t. The measurements also include a certain number of measurements that were taken not long before t. For example, the certain number of measurements were taken at a time that is after a first period before t (i.e., the certain number of measurements are taken at a time that is not earlier than the time that is t minus the first period). Depending on the embodiment, the first period may be one day, twelve hours, four hours, two hours, one hour, thirty minutes, or some other period that is shorter than a day. Having measurements taken not long before t may make the score computed by the dynamic scoring module 180 reflect affective response of users to the experience as it was experienced not long before t. Thus, for example, if the quality of the experience changes over time, this dynamic nature of the scores may be reflected in the scores computed by the dynamic scoring module 180.

In one embodiment, a score computed by the dynamic scoring module 180, such as one of the scores 183, is computed based on measurements of at least five users taken at a time that is after a first period before the time t to which the score corresponds, but not after that time t. Optionally, the score corresponding to t is also computed based on measurements taken earlier than the first period before t. Optionally, the score corresponding to t may involve measurements of at least a larger number of users, such as at least ten users.

In some embodiments, each measurement of a user is used to compute a single score corresponding to a single time t. Alternatively, some measurements of users may be used to compute scores corresponding to various times. For example, the same measurement (taken at the certain time) is used to compute both a score corresponding to a time t and is also used to compute a score corresponding to a time t+/0 minutes. Optionally, the measurement may have the same weight when computing both scores, alternatively, it may have a lower weight when used to compute the later score, since by that time the measurement is considered "older".

The alert module 184 is a module that evaluates scores (e.g., the scores 183) in order to determine whether to issue an alert in the form of a notification (e.g., notification 188). In one example, if a score for the experience, from among the scores 183, which corresponds to a certain time, reaches a threshold 186, the alert module 184 may forward the notification 188. The notification 188 is indicative of the score for the experience reaching the threshold, and is forwarded by the alert module no later than a second period after the certain time. Optionally, both the first and the second periods are shorter than twelve hours. In one example, the first period is shorter than four hours and the second period is shorter than two hours. In another example, both the first and the second periods are shorter than one hour.

The alert module 184 is configured to operate in such a way that it has dynamic behavior, that is, it is not configured to always have a constant behavior, such as constantly issue alerts or constantly refrain from issuing alerts. In particular, for a certain period of time that includes times to which individual scores from the scores 183 correspond, there are at least a certain first time $t_1$ and a certain second time $t_2$, such that a score corresponding to $t_1$ does not reach the threshold 186 and a score corresponding to $t_2$ reaches the threshold 186. Additionally, $t_2 > t_1$, and the score corresponding to $t_2$ is computed based on at least one measurement taken after $t_1$.

In some embodiments, when $t_1$ and $t_2$ denote different times to which scores correspond, and $t_2$ is after $t_1$, the difference between $t_2$ and $t_1$ may be fixed. In one example, this may happen when scores for experiences may be computed periodically, after elapsing of a certain period. For example, a new score is computed every minute, every ten minutes, every hour, or every day. In other embodiments, the difference between $t_2$ and $t_1$ is not fixed. For example, a new score may be computed after a certain condition is met (e.g., a sufficiently different composition of users who contribute measurements to computing a score is obtained). In one example, a sufficiently different composition means that the size of the overlap between the set of users who contributed measurements to computing the score $S_1$ corresponding to $t_1$ and the set of users who contributed measurements to computing the score $S_2$ corresponding to $t_2$ is less than 90% of the size of either of the sets. In other examples, the overlap may be smaller, such as less than 50%, less than 15%, or less than 5% of the size of either of the sets.

Reaching a threshold, such as the threshold 186, may signal different occurrences in different embodiments, depending on what the value of the threshold 186. In one embodiment, when a score computed based on measurements of affective response of certain users reaches the threshold that may indicate that, on average, the certain users had a positive affective response when their measurements were taken. In another embodiment, when a score computed based on measurements of affective response of certain users reaches the threshold, it may indicate that, on average, the certain users had a negative affective response when their measurements were taken. Thus, in some embodiments, the alert module 184 may be utilized to issue notifications when a score computed for the experience indicates that people who recently had the experience (and may still be having it) enjoyed it. Optionally, receiving such a notification may be interpreted as a recommendation to join the experience. Additionally or alternatively, the alert module 184 may be utilized to issue notifications when a score computed for the experience indicates that people who recently had the experience did not enjoy it (when it was previously enjoyed), which may serve as warning that something is wrong with the experience. Such notifications may be useful for various applications such as selecting what clubs, parties, and/or stores to go to, based on measurements of affective response of people that are there (or have recently been there).

Figure 24B:
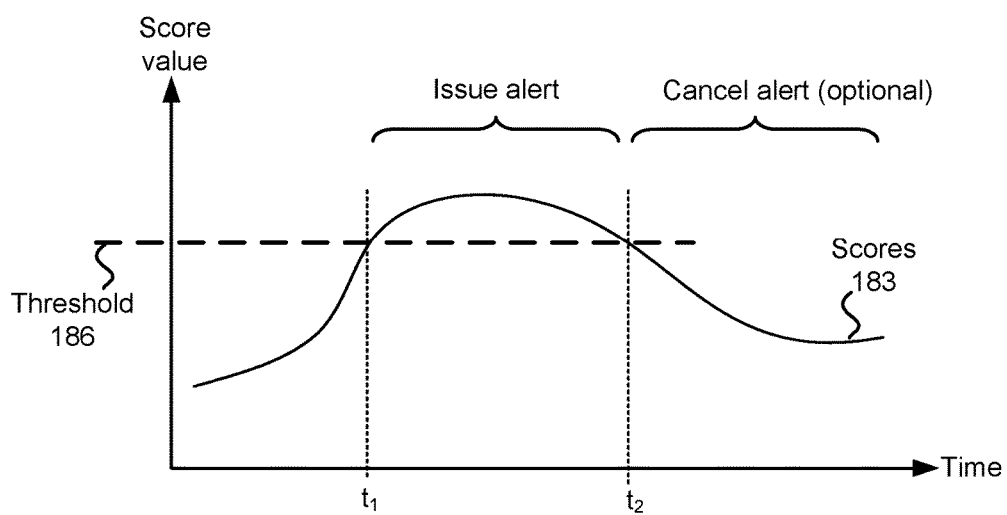
FIG. 24b illustrates how alerts may be issued.

The threshold 186, and other thresholds in this disclosure, are illustrated as possessing a fixed value over time (e.g., see the threshold 186 in FIG. 24b). Indeed in some embodiments, a threshold, such as the threshold 186, may be a fixed value, e.g., a preset value or a value received upon system initialization. However, in other embodiments, the threshold may have varying values. For example, in one embodiment, the threshold may be received multiple times, each time, updating its value to a possibly different value that is to be reached by a score. In another embodiment, the threshold may be computed according to a function that may assign it different values at different times and/or when there are different conditions. In one example, a function setting the value of a threshold may compute different values for different times of the day and/or for different days of the week. In another example, a threshold representing a level of customer dissatisfaction at a business may be set according to the determined occupancy of customers at the business. In this example, the threshold may be set to be lower if the business is crowded, since no matter what the staff does, it is likely that people will be less satisfied because of the crowd.

In one embodiment, when a score corresponding to the time t reaches the threshold, an alert is generate by forwarding the notification within a second period of time from the time t, as described above. In another embodiment, the notification is forwarded after a certain number of scores are below the threshold and/or after a series of consecutive scores are below the threshold for at least a certain period of time. Thus, the alert is not likely to be issued, in this embodiment, as a result of a fluke and/or a statistical aberration, rather, the alert is issued when the scores demonstrate a consistent trend of being above or below the threshold.

Forwarding a notification may be done in various ways. Optionally, forwarding a notification is done by providing a user a recommendation, such as by utilizing the recommender module 178. In one example, the notification is sent to a device of a user that includes a user interface that presents information to the user (e.g., a screen and/or a speaker). In such a case, the notification may include a text message, and icon, a sound effect, speech, and/or video. In another example, the notification may be information sent to a software agent operating on behalf of a user, which may make a decision on behalf of the user, based on the notification, possibly without providing the user with an indication that the notification was received. For example, the software agent may instruct an autonomous vehicle to transport the user to a certain location for which a notification indicated that there is a good ambiance at the location. In this example, the user may have requested to go to someplace fun in town, and the software agent selects a place based on current estimates of how much fun people are having at different venues.

When it is stated that the alert module 184 forwards a notification this may mean, in some embodiments, that the alert module 184 may send the notification to one or more users (e.g., to devices of the one or more users and/or software agents of the one or more users). Additionally or alternatively, forwarding a notification by the alert module 184 may involve the alert module 184 providing the notification to another module that may be responsible of bringing the notification to the attention of users.

It is to be noted that forwarding a notification to a user may not guarantee that the user becomes aware of the notification. For example, a software agent operating on behalf of the user may decide not to make the user aware of the notification.

There may be various factors that the alert module 184 (or other modules) may rely on when determining to whom notification are to be sent. In one example, the experience to which the notification relates may involve limited resources (e.g., the experience may take place at a certain location that has a certain capacity). In such a case, the number of recipients of the notification may be limited in order not to exhaust the limited resources (e.g., in order to avoid brining too many people to the location of the experience).

In another example, the experience to which a notification related may be associated with a location in the physical world. In such a case, if a user is too far away from the location, then there may be no point in forwarding the notification to the user, since the nonfiction may be time-sensitive; by the time the user reaches the location, the notification may not be relevant (since the affective response associated with the notification does not persist by that time). Thus, in one embodiment, the notification may be forwarded to a first recipient whose distance from the location is below a distance-threshold, and the notification is not forwarded to a second recipient whose distance from the location is above the distance-threshold.

In one embodiment, the alert module 184 may issue notifications that may cancel alerts. For example, the alert module 184 may be configured to determine whether, after a score corresponding to a certain time reaches the threshold 186, a second score corresponding to a later time occurring after the certain time falls below the threshold 186. Responsive to the second score falling below the threshold 186, the alert module 184 may forward, no later than the second period after the later time, a notification indicative of the score falling below the threshold 186.

FIG. 24b illustrates how alerts may be issued using the dynamic scoring module 180 and the alert module 184. The figure illustrates how the values of the scores 183 change over time. At time $t_1$ the scores reach the threshold 186. Following that time (up to the second period after $t_1$), an alert may be issued by forwarding a notification. At time $t_2$ the scores 183 start to fall below the threshold 186, in which case the alert may optionally be canceled by issuing another notification.

In one embodiment, the threshold 186 is preset (e.g., a constant embedded in computer code used to implement the alert module 184). In another embodiment, the alert module 184 is configured to receive the threshold 186 from an external source. In one example, the external source may be a certain user, e.g., through adjustment of settings of a mobile app that receives notifications from the alert module 184. In another example, the external source may be a software agent operating on behalf of the certain user. Thus, it may be possible for the alert module to tailor its behavior based on user settings. An embodiment involving a system that may receive similar user input is also presented in FIG. 28a.

In order to maintain a dynamic nature of scores computed by the dynamic scoring module 180, the dynamic scoring module may assign weights to measurements it uses to compute a score corresponding to a time t, based on how long before the time t the measurements were taken. Typically, this involves giving a higher weight to more recent measurements (i.e., taken closer to the time t). Such a weighting may be done in different ways.

Figure 25A:
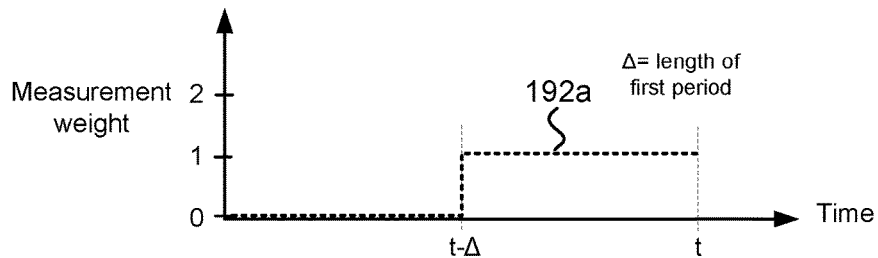
FIG. 25a illustrates a sliding window approach to weighting of measurements of affective response.

In one embodiment, measurements taken earlier than the first period before the time t are not utilized by the dynamic scoring module 180 to compute the score corresponding to t. This emulates a sliding window approach, which filters out measurements that are too old. Weighting of measurements according to this approach is illustrated in FIG. 25a, in which the "window" corresponding to the time t is the period between t and t−Δ. The graph 192a shows that measurements taken within the window have a certain weight, while measurements taken prior to t−Δ, which are not in the window, have a weight of zero.

Figure 25B:
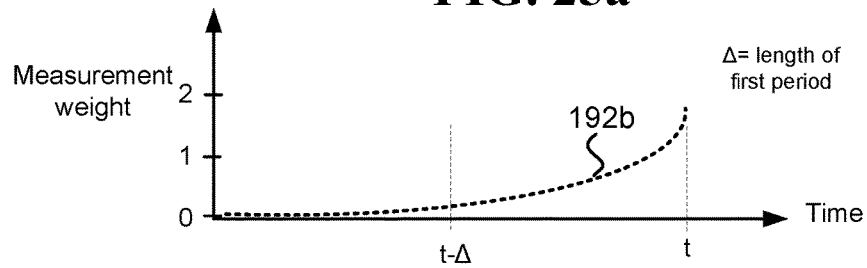
FIG. 25b illustrates time-dependent decaying weights for measurements of affective response.

In another embodiment, the dynamic scoring module 180 is configured to assign weights to measurements used to compute the score corresponding to the time t, using a function that decreases with the length of the period since t. Examples of such function may be exponential decay function or other function such as assigning measurements a weight that is proportional to $1/(t-t')$, where t' is the time the measurement was taken. Applying such a decreasing weight means that an average of weights assigned to measurements taken earlier than the first period before t is lower than an average of weights assigned to measurements taken later than the first period before t. Weighting of measurements according to this approach is illustrated in FIG. 25b. The graph 192b illustrates how the weight for measurements decreases as the gap between when the measurements were taken and the time t increases.

In one embodiment, a score corresponding to a certain time is computed by the dynamic scoring module 180 based on measurements of at least five users. Optionally, the at least five users have the experience at a certain location, and a notification sent by the alert module 184 is indicative of the certain location. For example, the notification specifies the certain location and/or presents an image depicting the certain location and/or provides instructions on how to reach the certain location. Optionally, map-displaying module 240 is utilized to present the notification by presenting on a display: a map comprising a description of an environment that comprises a certain location, and an annotation overlaid on the map, which indicates at least one of the following: the score corresponding to the certain time, the certain time, the experience, and the certain location.

Figure 26:
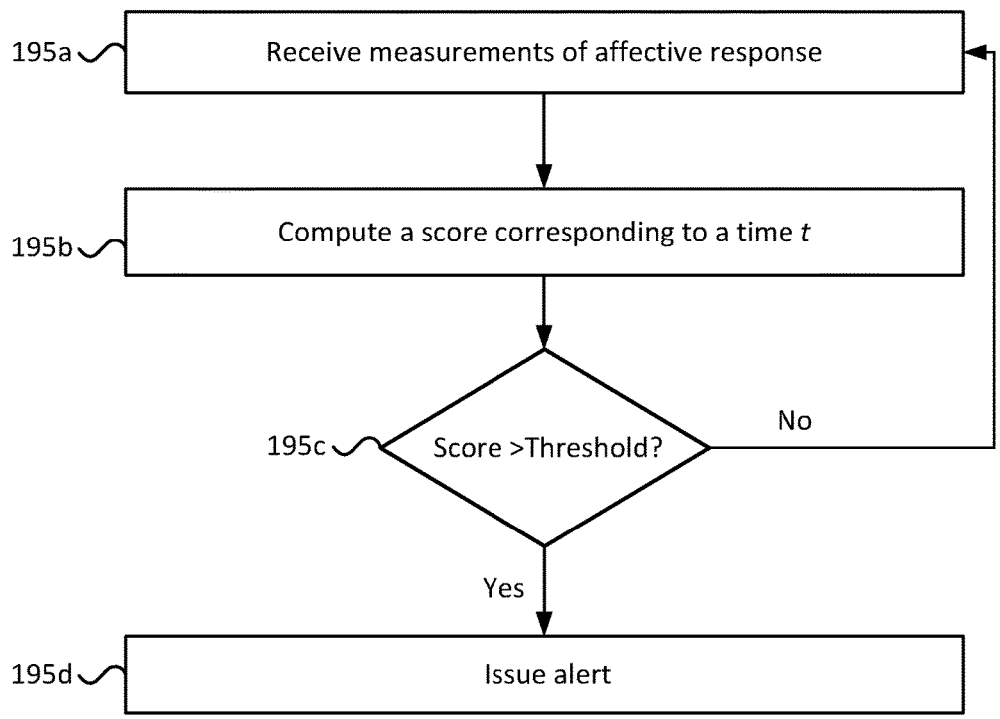
FIG. 26 illustrates steps involved in a method for alerting about affective response to an experience.

FIG. 26 illustrates steps involved in one embodiment of a method for alerting about affective response to an experience. The steps illustrated in FIG. 26 may be used, in some embodiments, by systems modeled according to FIG. 24a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for alerting about affective response to the experience includes at least the following steps:

In step 195a, receiving, by a system comprising a processor and memory, measurements of affective response of users to the experience. For example, the users may belong to the crowd 100, and the measurements may be the measurements 110. Optionally, each of the measurements comprises at least one of the following: a value representing a physiological signal of the user and a value representing a behavioral cue of the user.

In step 195b, computing a score for the experience. The score corresponds to a time t, and is computed based on measurements of at least five of the users taken at a time that is after a first period before t, but not after t (i.e., the measurements of the at least five users were taken at a time that falls between t minus the first period and t). Optionally, measurements taken earlier than the first period before the time t are not utilized for computing the score corresponding to t. Optionally, the score is computed by the scoring module 150.

In step 195c, determining whether the score reaches a threshold. Following the "No" branch, in different embodiments, different behaviors may occur. In one embodiment, the method may returns to step 195a to receive more measurements, and proceeds to compute an additional score for the experience, corresponding to a time t'>t. In another embodiment, the method may return to step 195b and compute a new score for a time t'>t. Optionally, the score corresponding to t' is computed using a different selection and/or weighting of measurements, compared to a weighting and/or selection used to compute the score corresponding to the time t. And in still another embodiment, the method may terminate its execution.

And in step 195d, responsive to the score reaching the threshold, forwarding, no later than a second period after t, a notification indicative of the score reaching the threshold. That is, the notification is forwarded at a time that falls between t and t plus the second period.

In one embodiment, both the first and second periods are shorter than twelve hours. Additionally, for at least a first time $t_1$ and a second time $t_2$, a score corresponding to $t_1$ does not reach the threshold and a score corresponding to $t_2$ reaches the threshold. In this case, $t_2 > t_1$, and the score corresponding to $t_2$ is computed based on at least one measurement taken after $t_1$.

Given that the alert module 184 does not necessarily forward notifications corresponding to each score computed, one embodiment of the method described above includes performing at least the following steps:

In step 1, receiving measurements of affective response of users to the experience.

In step 2, computing a first score for the experience, corresponding to $t_1$, based on measurements of at least five of the users taken at a time that is after a first period before $t_1$, but not after $t_1$. Optionally, the first period is shorter than twelve hours. Optionally, the first score is computed by the scoring module 150.

In step 3, determining that the first score does not reach the threshold.

In step 4, computing a second score for the experience, corresponding to $t_2$, based on measurements of at least five of the users taken at a time that is after the first period before $t_2$, but not after $t_2$. Optionally, the second score is computed based on at least one measurement taken after $t_1$. Optionally, the second score is computed by the scoring module 150.

In step 5, determining that the second score reaches the threshold.

And in step 6, responsive to the second score reaching the threshold, forwarding, no later than the second period after $t_2$, a notification indicative of the second score for the experience reaching the threshold.

In one embodiment, the method illustrated in FIG. 26 involves a step of assigning weights to measurements used to compute the score corresponding to the time t, such that an average of weights assigned to measurements taken earlier than the first period before t is lower than an average of weights assigned to measurements taken later than the first period before t. Additionally, the weights may be utilized for computing the score corresponding to t. Additional information regarding possible approaches to weighting of measurements based on the time they were taken is given at least in the discussion regarding FIG. 25a and FIG. 25b.

Systems like the one illustrated in FIG. 24a may be utilized to generate personalized alerts for certain users, such that the notifications regarding a score for an experience corresponding to a time t may be sent to one user but not to another. Such personalization may be achieved in different ways.

In one embodiment, the dynamic scoring module 180 generates personalized scores for certain users, thus different users may have different scores computed for them that correspond to the time t. Thus, the score computed for one user may reach the threshold 186 while the score for another user might not reach the threshold 186. Consequently, the system may behave differently, with the different users, as far as the forwarding of notifications is concerned. This approach for personalization of alerts is illustrated in FIG. 27a.

Figure 28A:
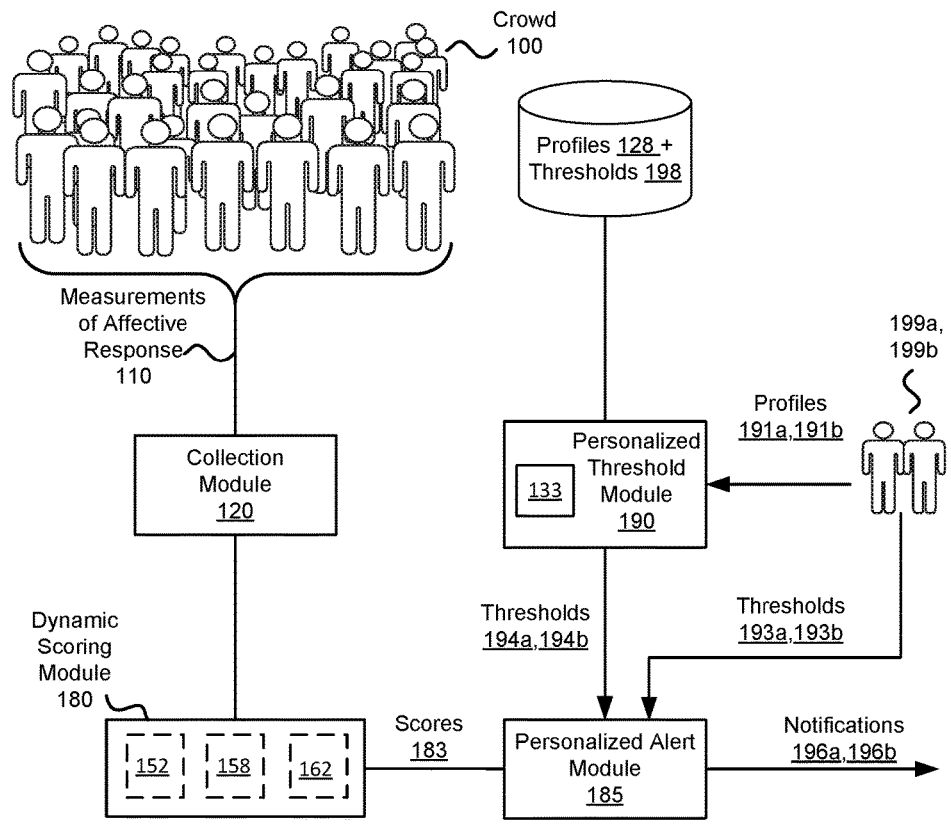
FIG. 28a illustrates a system configured to generate personalized alerts about an experience.

In another embodiment, the alert module 184 may receive different thresholds for different users. Thus a score corresponding to the time t may reach one user's threshold, but not another user's threshold. Consequently, the system may behave differently, with the different users, as far as the forwarding of notifications is concerned. This approach for personalization of alerts is illustrated in FIG. 28a.

Figure 27A:
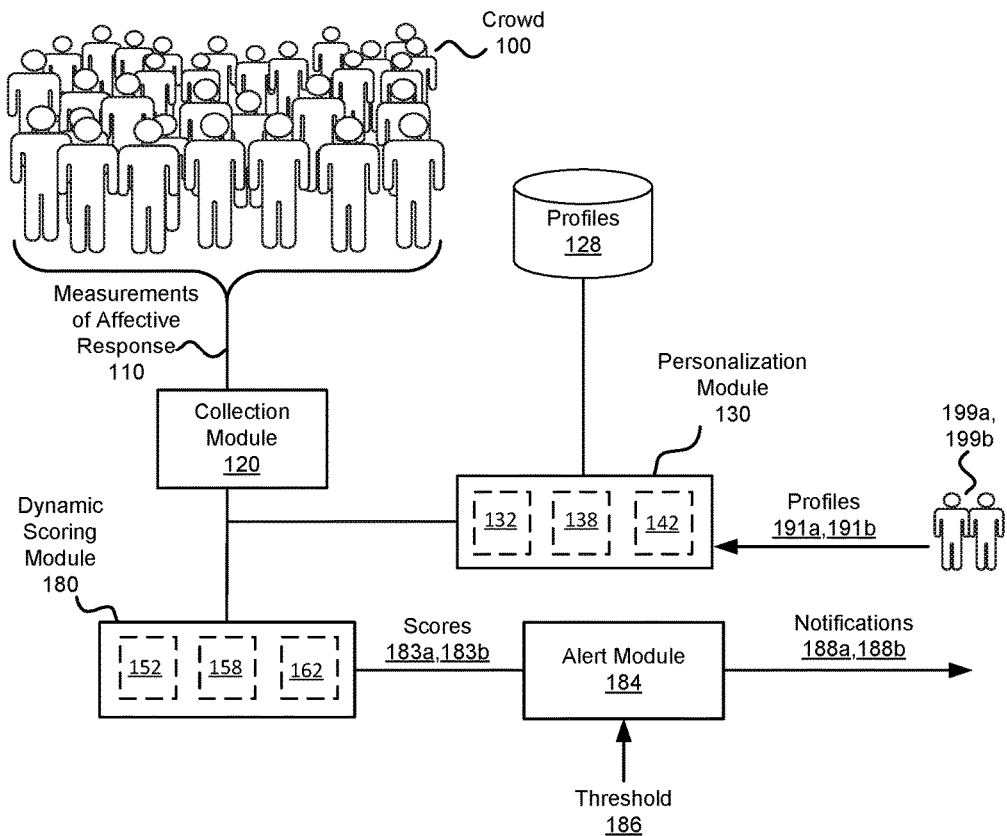
FIG. 27a illustrates a system configured to utilize profiles of users to generate personalized alerts about an experience.

FIG. 27a illustrates a system configured to utilize profiles of users to generate personalized alerts about an experience. The system includes at least the collection module 120, the personalization module 130, the dynamic scoring module 180, and the alert module 184.

In one embodiment, the collection module 120 is configured to receive the measurements 110. The measurements 110 in this embodiment include measurements of users who had the experience. The personalization module 130 is configured, in one embodiment, to receive a profile of a certain user and at least some of the profiles 128, and to generate an output indicative of similarities between the profile of the certain user and the at least some of the profiles. The dynamic scoring module 180, in this embodiment, is configured to compute scores for the experience for a certain user based on at least some of the measurements 110 and the output. In one example, the output for the user may identify a subset of users who have similar profiles to the certain user, and the dynamic scoring module 180 may compute the scores for the certain user based on measurements of those users. In another example, the output generated for the certain user by the personalization module 130 may include weights for measurements that may be used to compute scores, and the dynamic scoring module 180 may utilize those weights when computing the scores for the certain user.

It is to be noted that in some cases, certain measurements from among the measurements 110 may be weighted twice: once based on a weight provided by the personalization module 130 (e.g., based on profile similarity), and a second time based on the time the measurements were taken (e.g., a decaying weight as described above). Implementing such double weighting may be done in various ways; one simple approach that may be used to accommodate two weights for a measurement is to multiply the two weights.

Figure 27B:
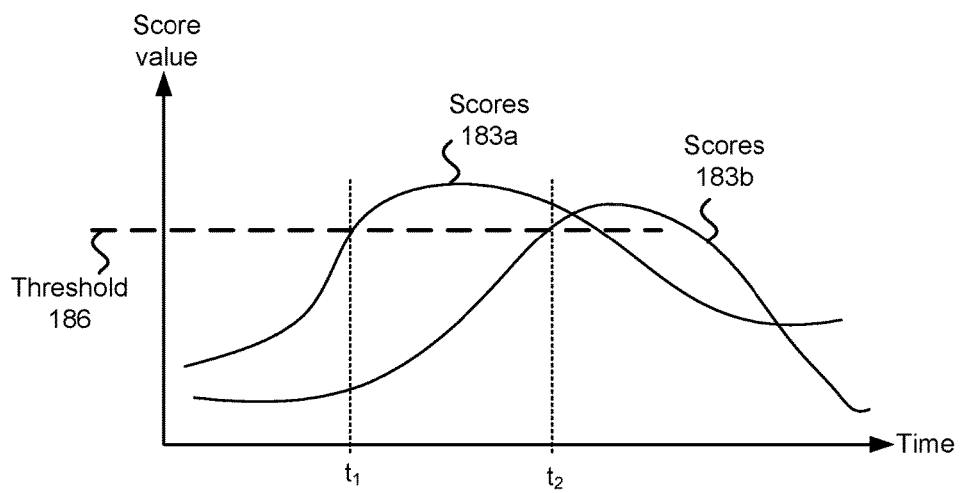
FIG. 27b illustrates different alerts may be generated for different users.

FIG. 27a also illustrates a scenario in which personalized alerts may be generated differently for different users. In one embodiment, a certain first user 199a and a certain second user 199b have different profiles 191a and 191b, respectively. The personalization module 130 generates different outputs for the certain first user and the certain second user, which cause the dynamic scoring module 180 to compute different sets of scores, denoted scores 183a and scores 183b, respectively. The difference between the scores 183a and 183b is illustrated in FIG. 27b, which illustrates how a score for the certain first user 199a reaches the threshold 186 at a time $t_1$, but a score corresponding to $t_1$ that is computed for the certain second user 199b, is below the threshold 186. At a time $t_2 > t_1$ a score computed for the certain second user 199b reaches the threshold 186. Optionally, the score computed for the certain second user 199b, which corresponds to the time $t_2$ is computed based on at least one measurement taken after $t_1$. Thus, the alert module 184 may generate different respective notifications 188a and 188b for the certain first and second users 199a and 199b. For example, the alert module may send the notification 188a before the time $t_2$, while it does not send the notification 188b until after that time.

FIG. 28a illustrates a system configured to generate personalized alerts about an experience. The system includes at least the collection module 120, the dynamic scoring module 180, and a personalized alert module 185.

The personalized alert module 185 is similar to the alert module 184. However, personalized alert module 185 is able to receive different thresholds for different respective users. This enables the personalized alert module 185 to trigger different alerts at different times for the different users based on the same scores 183 computed by the dynamic scoring module 180. Thus, the personalized alert module 185 is configured to receive a threshold corresponding to a certain user, and to determine whether a score corresponding to a certain time reaches the threshold. Similarly to alert module 184, responsive to the score reaching the threshold, the personalized alert module 185 forwards to the certain user, no later than a second period after the certain time, a notification indicative of the score reaching the threshold. Optionally, both the first and the second periods are shorter than twelve hours. In one example, the first period is shorter than four hours and the second period is shorter than two hours. In another example, both the first and the second periods are shorter than one hour.

The threshold corresponding to the certain user may be provided in different ways to the personalized alert module 185. In one embodiment, the threshold corresponding to the certain user is provided by at least one of: the certain user (e.g., by changing settings in an app that controls alerts), and a software agent operating on behalf of the certain user. In another embodiment, the threshold corresponding to the certain user may be received from personalized threshold setting module 190 which is configured to receive a profile of the certain user and to determine the threshold corresponding to the certain user based on information in the profile. Optionally, this may be done by comparing the profile of the certain user to profiles from among the profiles 128 and corresponding thresholds 198. For example, the profile comparator 133 may be utilized to identify profiles from among the profiles 128 that are similar to the profile of the certain user, and based on the thresholds corresponding to the similar profiles, the personalized threshold corresponding to the certain user may be computed (e.g., by averaging the thresholds corresponding to the profiles that are found to be similar).

FIG. 28a also illustrates a scenario in which personalized alerts may be generated differently for different users such as the certain first user 199a and the certain second user 199b. In one example, the certain first user 199a and the certain second user 199b may provide respective thresholds 193a and 193b to the personalized alert module 185. In another example, based on different respective profiles 191a and 191b of the certain first user 199a and the certain second user 199b, the personalized threshold setting module 190 may generate thresholds 194a and 194b for the certain first user 199a and the certain second user 199b, respectively. These thresholds may also be provided to the personalized alert module 185. When the threshold corresponding to the certain first user 199a is lower than the threshold corresponding to the certain second user 199b, this can lead to different generation of alerts for the users based on the same scores 183.

Figure 28B:
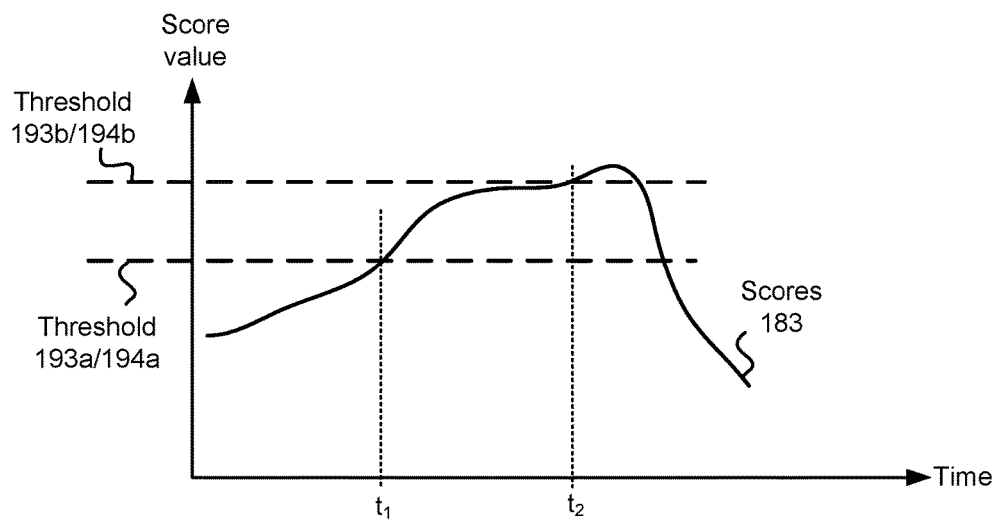
FIG. 28b illustrates different thresholds may be utilized for personalized alerts.

The different issuing of alerts based on different thresholds for different users is illustrated in FIG. 28b, which describes how a score from among the scores 183 reaches a first threshold corresponding to the certain first user 199a at a time $t_1$ but, at that same time, the score is below a second threshold corresponding to the certain second user 199b. However another score from among the scores 183 which corresponds to a time $t_2 > t_1$ reaches the second threshold. Thus, the personalized alert module 185 may forward to the certain first user 199a notification 196a after $t_1$ and forward to the certain second user 199b notification 196b after $t_2$. Optionally, the personalized alert module 185 does not forward a notification to the certain second user indicative that a score corresponding to a time t' reaches the second threshold, where $t_1 < t' < t_2$.

13—Projecting Scores

Some of the embodiments mentioned above relate to alerts that are generated when a score for an experience reaches a threshold. Thus, the notification issued by the alert module is typically forwarded after the score reaches the threshold. However, in many cases, it would be beneficial to receive an alert earlier, which indicates an expectation that a score for the experience is intended to reach the threshold in a future time. In order to be able to generate such an alert, which corresponds to a future time, some embodiments involve projections of scores corresponding to future times, based on scores that correspond to earlier times. In some embodiments, projecting a score for an experience, which corresponds to a future time, is based on a trend learned from scores for the experience, which correspond to earlier times, and which are computed based on measurements that have already been taken.

Following are various embodiments that involve systems, methods, and/or computer program products that may be utilized to generate alerts and/or make recommendations based on trends learned from scores computed based on measurements of affective response. Optionally, the dynamic scoring module 180 is utilized to compute scores that are utilized to make projections regarding values of scores for an experience. Such scores corresponding to future times may be referred to herein as "projected scores", "future scores", and the like.

Figure 29A:
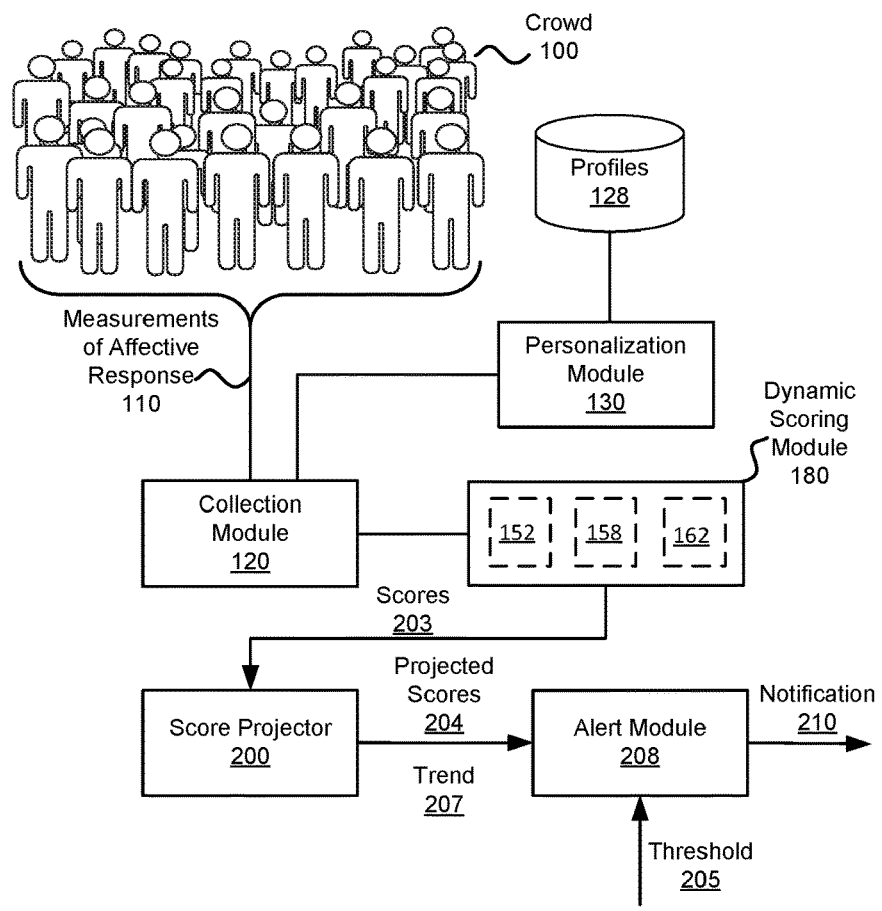
FIG. 29a illustrates a system configured to alert about projected affective response to an experience.

FIG. 29a illustrates a system configured to alert about projected affective response to an experience. The system includes at least the collection module 120, the dynamic scoring module 180, score projector module 200, and alert module 208. The system may optionally include additional modules such as the personalization module 130.

The collection module 120 is configured to receive measurements 110 of affective response of users (denoted crowd 100). In this embodiment, the measurements 110 comprise measurements of affective response of at least some of the users from the crowd 100 to having the experience. Optionally, the measurements of the affective response of the at least some of the users reflect how the users felt while having the experience and/or how those users felt shortly after having the experience. The collection module 120 is also configured, in one embodiment, to provide measurements of at least some of the users from the crowd 100 to other modules, such as the dynamic scoring module 180.

It is to be noted that the experience to which the measurements relate may be any of the various experiences described in this disclosure, such as being in a certain location, engaging in a certain activity, consuming a certain segment of digital content, eating certain food, etc. In some embodiments, the experience belongs to a set of experiences that may include and/or exclude various experiences, as discussed in section 3—Experiences.

In one embodiment, a measurement of affective response of the user to an experience is based on at least one of the following values: (i) a value acquired by measuring the user, with a sensor coupled to the user, while the user had the experience, and (ii) a value acquired by measuring the user with the sensor up to one hour after the user had the experience. Optionally, the measurement of affective response comprises at least one of the following: a value representing a physiological signal of the user and a value representing a behavioral cue of the user. Examples of sensors that may be used are given at least in section 1—Sensors.

The dynamic scoring module is configured, in one embodiment, to compute scores 203 for the experience based on the measurements received from the collection module 120. Optionally, each score corresponds to a time t and is computed based on measurements of at least ten of the users taken at a time that is after a certain period before t, but not after t. That is, each of the measurements is taken at a time that is not earlier than the time that is t minus the certain period, and not after the time t. Depending on the embodiment, the certain period may have different lengths. Optionally, the certain period is shorter than at least one of the following durations: one minute, ten minutes, one hour, four hours, twelve hours, one day, one week, one month, and one year.

The scores 203 include at least scores $S_1$ and $S_2$, which correspond to times $t_1$ and $t_2$, respectively. The time $t_2$ is after $t_1$, and $S_2 > S_1$. Additionally, $S_2$ is below threshold 205. Optionally, $S_2$ is computed based on at least one measurement that was taken after $t_1$. Optionally, $S_2$ is not computed based measurements that were taken before $t_1$.

There may be different relationships between a first set of users, which includes the users who contributed measurements used to compute the score $S_1$, and a second set of users, which includes the users who contributed measurements used to compute the score $S_2$. Optionally, the first set of users may be the same as the second set of users. Alternatively, the first set of users may be different from the second set of users. In one example, the first set of users may be completely different from the second set of users (i.e., the two sets of users are disjoint). In another example, the first set of users may have some, but not all, of its users in common with the second set of users.

The score projector module 200 is configured, in one embodiment, to compute projected scores 204 corresponding to future times, based on the scores 203. In one example, the score projector module 200 computes a projected score $S_3$ corresponding to a time $t_3 > t_2$, based on $S_1$ and $S_2$ (and possibly other scores from among the scores 203 corresponding to a time that is earlier than the certain time before the certain future time). In another example, the score projector module 200 computes a trend 207 describing expected values of scores for the experience. Optionally, the trend 207 may be utilized to project scores for the experience for future time, which occur after the time $t_2$. In one example, the score projector module 200 computes the trend 207 based on $S_1$ and $S_2$ (and possibly other scores). Optionally, the score projector module 200 utilizes the trend 207 to compute the score $S_3$.

The score $S_3$ represents an expected score for the time $t_3$, which is an estimation of what the score corresponding to the time $t_3$ will be. As such, the score $S_3$ may be considered indicative of expected values of measurements of affective response of users that will be having the experience around the time $t_3$, such as at a time that is after the certain period before $t_3$, but is not after $t_3$.

Herein a trend may refer to any form of function whose domain includes multiple points of time. Typically, such a function may be used to assign values to one or more points of time belonging to the function's domain. An example of such a function is a function that assigns expected values of scores, such as the scores discussed above, to various points in time. In one example, a trend used by the score projector module 200 is indicative of at least some values of scores corresponding to a time t that is after $t_2$. For example, the trend may describe one or more extrapolated values, for times greater than $t_2$, which are based on values comprising $S_1$ and $S_2$, and the times to which they correspond, $t_1$ and $t_2$, respectively.

Figure 29B:
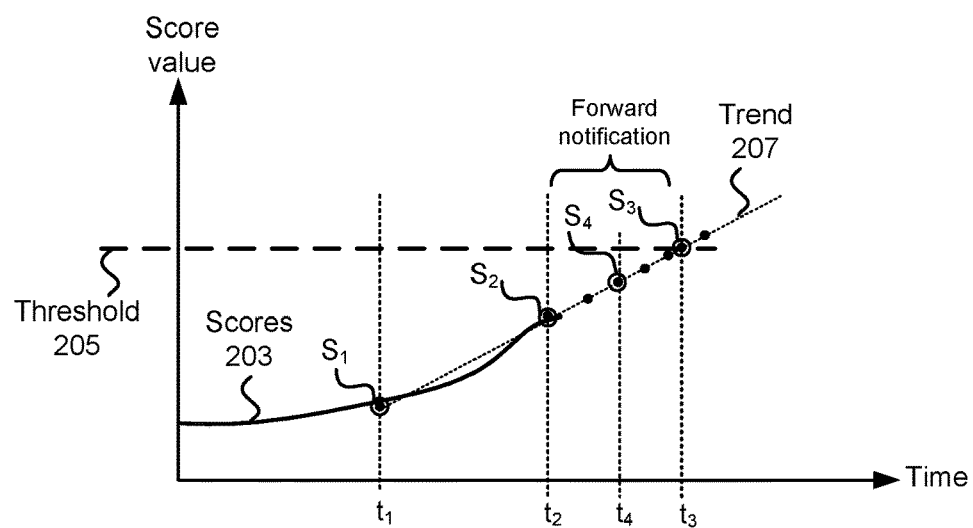
FIG. 29b illustrates an example of how a trend of projected scores for an experience can be utilized to generate an alert.

There are various analytical methods known in the art with which a trend may be learned from time series data and utilized for projections. In one example, the score projector module 200 is configured to determine a trend based on $S_1$, $S_2$, $t_1$, and $t_2$, and to utilize the trend to project the score $S_3$ corresponding to the time $t_3$. In one example, the trend is described by a slope of a line learned from $S_1$, $S_2$, $t_1$, and $t_2$ (and possibly other points involving scores and corresponding times). Optionally, the score $S_3$ is determined by extrapolation and finding the value of the trend line at the time $t_3$ and using it as the projected score $S_3$. Optionally, the time $t_3$ is selected such that the trend intersects with a line representing the threshold 205. This process is illustrated in FIG. 29b, where a trend 207 is learned from $S_1$, $S_2$, $t_1$, and $t_2$ and $t_3$ is the time in which the projected score based on the trend 207 reaches the threshold 205. In other examples, various linear regression methods may be utilized to learn a trend and project scores through extrapolation.

Other projection methods, which may be utilized in some embodiments, by the score projector module 200, rely on historical data. For example, distributions of future scores may be learned based on trends of previous scores. Thus, historical data may be used to learn a distribution function for the value of $S_3$ at the time $t_3$ given that at times $t_1$ and $t_2$ which are before $t_3$, the respective scores were $S_1$ and $S_2$. Given such a distribution, the projected score $S_3$ may be a statistic of the distribution such as its mean, mode, or some other statistic.

Learning from historical data may also be done utilizing a predictor, which is trained on previous data involving scores computed by the dynamic scoring module 180. In order to train the predictor, training samples involving statistics of scores up to a time t may be used to generate a sample. The label for the sample may be a score that is computed at a time t+Δ (which is also available since the predictor is trained on historical data). There are various machine learning algorithms known in the art that may be used to implement such a predictor (e.g., neural networks, Bayesian networks, support vectors for regressions, and more). After training such a predictor, it may be utilized in order to project a score $S_3$ that corresponds to time $t_3$ based on scores $S_1$ and $S_2$ (and possibly other data).

It is to be noted that projecting scores, as discussed above, can be done utilizing many of the statistical methods known in the art for projecting time-series data; examples of which include the many methods developed for predicting future prices of stocks and/or commodities. Thus, by relying on the extensive body of work available in this area, one skilled in the art may implement the score projector module 200 in many diverse ways.

In one embodiment, the score projector module 200 is also configured to assign weights to scores when computing a projected score corresponding to a certain future time based on the scores. Optionally, the weights are assigned such that scores corresponding to recent times are weighted higher than scores corresponding to earlier times. Optionally, when computing $S_3$, the score projector module 200 assigns a higher weight to $S_2$ than the weight it assigns to $S_1$. In one example, the score projector module 200 may utilize such weights to perform a projection using weighted least squares regression.

The alert module 208 is configured to determine whether a projected score reaches a threshold (e.g., the threshold 205), and responsive to the projected score reaching the threshold, to forward, a notification indicative of the projected score reaching the threshold.

In one embodiment, the alert module 208 evaluates the scores 204, and the notification is indicative of times when the projected score is to reach and/or exceed the threshold 205. In one example, responsive to $S_3$ reaching the threshold 205, the alert module 208 forwards, at a time prior to the time $t_3$, notification 210 which is indicative of $S_3$ reaching the threshold 205. Additionally, in this example, the alert module 208 may refrain from forwarding a notification indicative of a score $S_4$ reaching the threshold 205, where $S_4$ is computed based on $S_1$ and $S_2$, and corresponds to a time $t_4$, where $t_2<t_4<t_3$. In this example, the score $S_4$ may be below the threshold 205, and thus, at the time $t_2$, based on scores computed at that time, it is not expected that a score corresponding to the time $t_4$ will reach the threshold 205. It may be the case, that until $t_2$, the scores had not been increasing in a sufficient pace for the scores to reach the threshold 205 by the time $t_4$. However, given more time (e.g., until $t_3>t_4$), it is expected that the scores reach the threshold 205.

Depending on the value of the threshold 205 and/or the type of values it represents, reaching the threshold 205 may mean different things. In one example, $S_3$ reaching the threshold 205 is indicative that, on average, at the time $t_3$, users will have a positive affective response to the experience. In another example, $S_3$ reaching the threshold 205 may be indicative of the opposite, i.e., that on average, at the time $t_3$, users will have a negative affective response to the experience.

The threshold 205 may be a fixed value and/or a value that may change over time. In one example, the threshold 205 is received from a user and/or software agent operating on behalf of the user. Thus, in some embodiments, different users may have different thresholds, and consequently receive notifications forwarded by the alert module 208 at different times and/or under different circumstances. In particular, in one example, a first user may receive the notification 210, since $S_3$ reaches that user's threshold, but a second user may not receive the notification 210 before $t_3$ because $S_3$ does not reach that user's threshold.

In some embodiments, the alert module 208 may determine whether a projected score, from among the projected scores 204, reaches the threshold by examining whether (and when) a trend that describes scores for the experience intersects with the threshold. Optionally, if a point of intersection is identified, then the threshold may be considered reached at that time and in times following the point of intersection (until another intersection occurs at a later time). In some embodiments, the score $S_3$ is the score corresponding to the point of intersection, and the time $t_3$ is the time at which the trend 207 intersects with the threshold 205.

In one embodiment, the alert module 208 is also configured to determine whether a trend of scores changes, and consequently, whether certain alerts that have been issued (e.g., through forwarding a notification) should be altered or canceled based on fresher projections. For example, the alert module 208 may determine that a score $S_5$ corresponding to a time $t_5>t_3$ falls below the threshold 205, and responsive to $S_5$ falling below the threshold 205, forward, prior to the time $t_5$, a notification indicative of $S_5$ falling below the threshold 205. Optionally, the time $t_5$ is a second point of intersection, after which the projected scores 204 fall below the threshold 205.

In one embodiment, the system illustrated in FIG. 29a may include personalization module 130, which may generate an output used to personalize the scores generated by the dynamic scoring module 180. This may enable the alerts generated by the alert module 208 to be personalized alerts for a certain user. For example, a score for a certain first user projected for a certain time may reach the threshold, while a score projected for a second user for the certain time may not reach the threshold. Thus, the first user will be issued an alert corresponding to the certain time, while the second user will not be issued such an alert.

In one embodiment, the experience corresponds to a certain location (e.g., the users whose measurements are used to compute at least some of the scores 203 have the experience at the certain location). Optionally, a notification sent by the alert module 208 is indicative of the certain location. For example, the notification specifies the certain location and/or presents an image depicting the certain location and/or provides instructions on how to reach the certain location. Optionally, map-displaying module 240 is utilized to present the notification by presenting on a display: a map comprising a description of an environment that comprises a certain location, and an annotation overlaid on the map, which indicates at least one of: the score corresponding to the certain future time, the certain future time, the experience, and the certain location.

Figure 30:
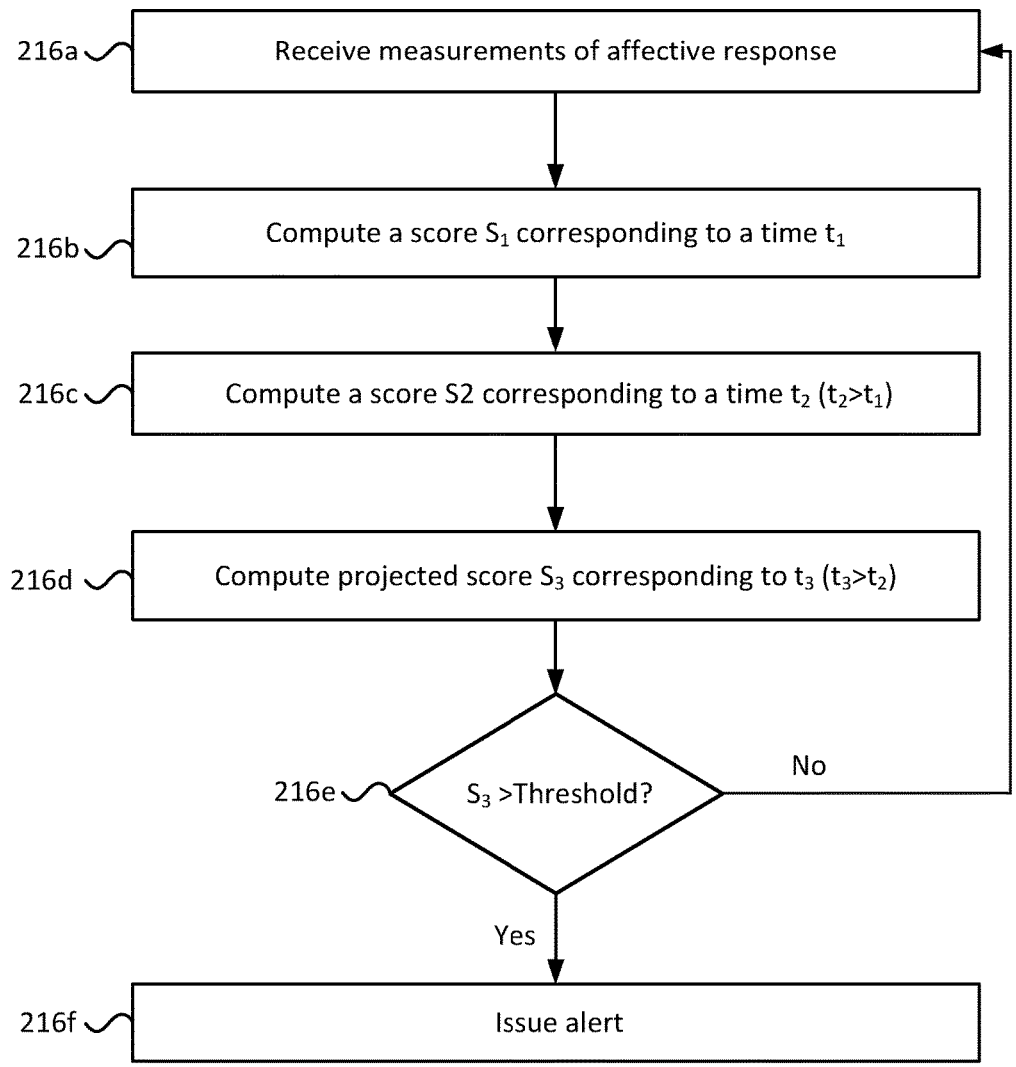
FIG. 30 illustrates steps involved in a method for alerting about projected affective response to an experience.

FIG. 30 illustrates steps involved in one embodiment of a method for alerting about projected affective response to an experience. The steps illustrated in FIG. 30 may be used, in some embodiments, by systems modeled according to FIG. 29a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for alerting about projected affective response to the experience comprises the following steps:

In step 216a, receiving, by a system comprising a processor and memory, measurements of affective response of users to the experience. For example, the users may belong to the crowd 100, and the measurements may be the measurements 110. Optionally, each of the measurements comprises at least one of the following: a value representing a physiological signal of the user and a value representing a behavioral cue of the user.

In step 216b, computing a first score, denoted $S_1$, for the experience. The first score corresponds to a first time $t_1$, and is computed based on measurements of at least ten of the users, taken at a time that is after a certain period before $t_1$, but not after $t_1$ (i.e., the measurements of the at least ten users were taken at a time that falls between $t_1$ minus the first certain and $t_1$). Optionally, measurements taken earlier than the certain period before the time $t_1$ are not utilized for computing $S_1$. Optionally, the certain period is shorter than at least one of the following durations: one minute, ten minutes, one hour, four hours, twelve hours, one day, one week, one month, and one year.

In step 216c, computing a second score, denoted $S_2$, for the experience. The second score corresponds to a second time $t_2$, and is computed based on measurements of at least ten of the users, taken at a time that is after the certain period before $t_2$, but not after $t_2$ (i.e., the measurements of the at least ten users were taken at a time that falls between $t_2$ minus the certain period and $t_2$). Optionally, measurements taken earlier than the certain period before the time $t_2$ are not utilized for computing $S_2$. Optionally, measurements taken before $t_1$ are not utilized for computing $S_2$.

In step 216d, computing a projected score $S_3$ for the experience, which corresponds to a future time $t_3$ that is after $t_2$. Optionally, the score $S_3$ is a based on $S_1$ and $S_2$. For example, $S_3$ may be computed based on a trend that describes one or more extrapolated values, for times greater than $t_2$, which are based on values comprising $S_1$ and $S_2$, and the times to which they correspond, $t_1$ and $t_2$, respectively.

Optionally, computing $S_3$ involves assigning weights to $S_1$ and $S_2$ such that a higher weight is assigned to $S_2$ compared to the weight assigned to $S_1$, and utilizing the weights to for computing $S_3$ (e.g., by giving $S_2$ more influence on the value of $S_3$ compared to the influence of $S_1$).

In step 216e, determining whether $S_3$ reaches a threshold. Optionally, determining whether $S_3$ reaches the threshold is done by finding a time t' in which a trend computed based on scores comprising $S_1$ and $S_2$ intersects with the threshold, and comparing $t_3$ with that time t'. Optionally, if $t_3$>t', $S_3$ is assumed to reach the threshold.

Responsive to the score $S_3$ not reaching the threshold, the "No" branch is followed, and in different embodiments, different behaviors may be observed. In one embodiment, the method may return to step 216a to receive more measurements, and proceeds to compute an additional score for the experience, which corresponds to a time t'>t. In another embodiment, the method may return to steps 216b and/or 216c to compute a new score corresponding to a time t'>t. Optionally, the score corresponding to t' is computed using a different selection and/or weighting of measurements, compared to a weighting and/or selection used to compute the score corresponding to the time t. And in still another embodiment, the method may terminate its execution.

And in step 216f, responsive to the score $S_3$ reaching the threshold, following the "Yes" branch, and forwarding, no later than $t_3$, a notification indicative of $S_3$ reaching the threshold. That is, the notification is forwarded at a time that falls between $t_2$ and $t_3$. Optionally, no notification indicative of a score $S_4$ reaching the threshold is forwarded prior to $t_3$; where the score $S_4$ corresponds to a time $t_4$, such that $t_2$<$t_4$<$t_3$. Optionally, the notification that is forwarded is the notification 210 mentioned above.

In one embodiment, the method illustrated in FIG. 30 involves a step of assigning weights to measurements used to compute the score corresponding to the time t, such that an average of weights assigned to measurements taken earlier than the first period before t is lower than an average of weights assigned to measurements taken later than the first period before t. Additionally, the weights may be utilized for computing the score corresponding to t.

In one embodiment, at least some of the users have the experience at a certain location and the notification is indicative of the certain location. Additionally, the method illustrated in FIG. 30 may include a step of presenting on a display: a map comprising a description of an environment that comprises the certain location, and an annotation overlaid on the map indicating at least one of: $S_3$, $t_3$, the experience, and the certain location.

In one embodiment, the method illustrated in FIG. 30 involves a step of determining whether a score $S_5$ corresponding to a time $t_5$>$t_3$ falls below the threshold, and responsive to $S_5$ falling below the threshold, forwarding, prior to the time $t_5$, a notification indicative of $S_5$ falling below the threshold.

Obtaining projected scores that are used for alerts and/or recommendations often involves extrapolating values (e.g., based on a trend). Therefore, the values of the projected scores may depend on to how far ahead a time the projected scores correspond. Consequently, depending on to how far ahead the projected scores correspond, different alerts and/or recommendations may be generated. In one example, there may be a first experience and a second experience for which scores are computed based on measurements of affective response (e.g., the measurements 110), utilizing the dynamic scoring module 180. A recommendation is to be made, to have a future experience, which involves one of the two experiences.

Typically, the experience with the higher score would be recommended. However, when the recommendation is based on a projected score, and is made for a certain future time, the recommendation may change depending on how far ahead the certain future time is. This is because such recommendations can take into accounts trends of scores; thus, a score that is currently high may be expected to become lower in the near future, and vice versa. Therefore, when an experience is to be recommended to a user to have in the future time, the recommendation should be based on scores projected for the future time, and should not necessarily be based on the scores observed at the time at which the recommendation is made time.

Following is an example of such a scenario, in which recommendations may change depending on how far ahead projected scores correspond. In this example, there are two night clubs to which a user may go out in the evening. The first club is full early on in the evening, but as the evening progresses, the attendance at that club dwindles and the atmosphere there becomes less exciting. The second club starts off with a low key atmosphere, but as the evening progresses things seem to pick up there, and the atmosphere becomes more exciting. Consider scores computed for the clubs based on measurements of affective response of people who are at the clubs. For example, the scores may be values on a scale from 1 to 10, and may indicate how much fun people are having at each club. Because initially there was a good atmosphere at the first club, the score at 10 PM at that club might have been 9, but as the evening progressed the scores dropped, such that by 11:30 PM the score was 7. And because the second club started off slow, the score for that club at 10 PM might have been 4, but the scores improved as the evening progressed, such that by 11:30 PM the score was 6.5. Now, if at 11:30 PM, a recommendation is to be made regarding which club to visit at 12:30 AM, so which club should be recommended? Based on trends of the scores, it is likely that despite the first club having a higher score at the time the recommendation is made (11:30 PM), the second club is likely to have a higher score when the experience is to be had (12:30 AM). Thus, it is likely, that in this example, the second club would be recommended. This type of situation is illustrated in FIG. 31b, and is discussed in more detail below.

Figure 31A:
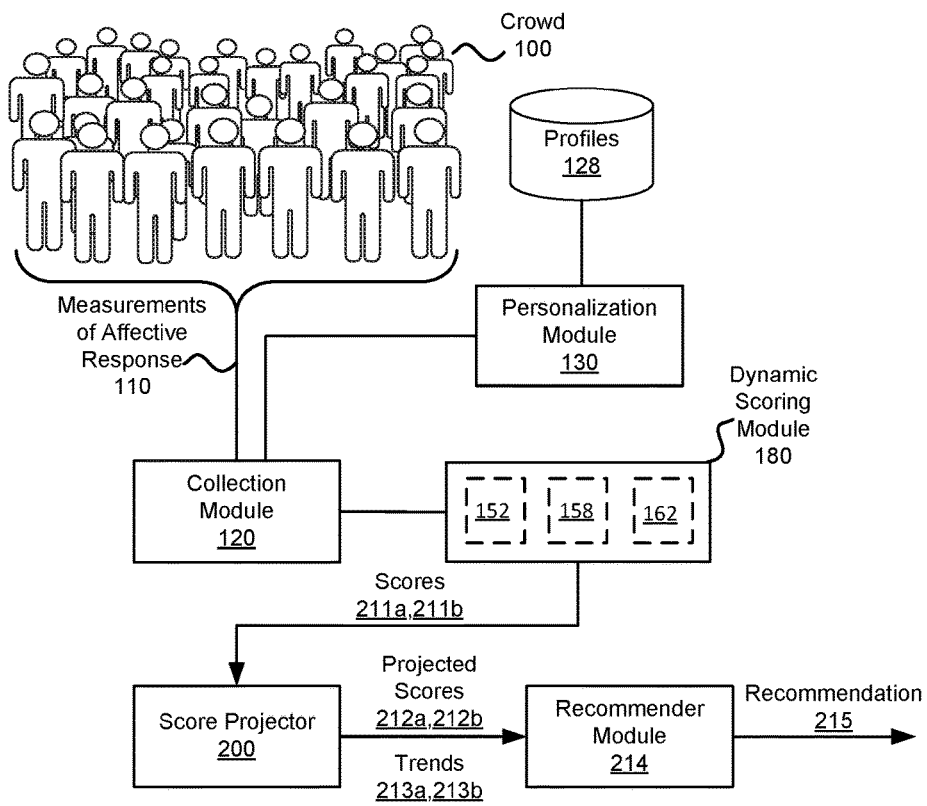
FIG. 31a illustrates a system configured recommend an experience to have at a future time.
Figure 31B:
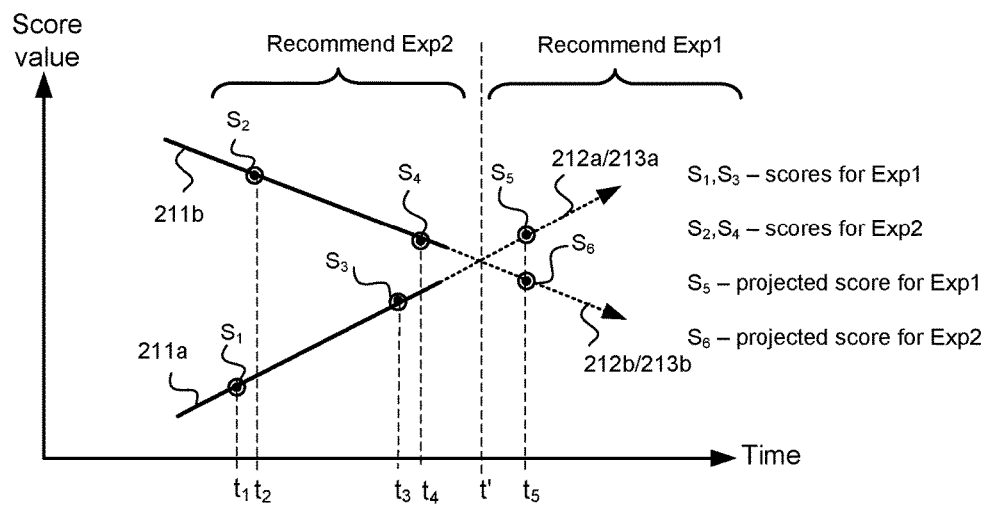
FIG. 31b illustrates scores for experiences and the trends that may be learned from them.

FIG. 31a illustrates a system configured recommend an experience to have at a future time. Embodiments modeled according to FIG. 31a, as the embodiments described below, exhibit a similar logic, when it comes to making recommendations based on projected scores and/or trends, to the logic described above with the example of the night clubs. The system includes at least the collection module 120, the dynamic scoring module 180, the score projector module 200, and recommender module 214.

In one embodiment, the collection module 120 is configured to receive measurements 110 of affective response, which in this embodiment include measurements corresponding to events involving first and second experiences (i.e., the user corresponding to the event had the first experience and/or the second experience). The dynamic scoring module 180 computes scores 211a for the first experience and scores 211b for the second experience. When computing a score for a certain experience from among the first and second experiences, the dynamic scoring module 180 utilizes a subset of the measurements 110 comprising measurements of users who had the certain experience, and the measurements in the subset are taken at a time that is after a certain period before a time t, but is not after the time t. Such a score may be referred to as "corresponding to the time t and to the certain experience". Optionally, the certain period is shorter than at least one of the following durations: one minute, ten minutes, one hour, four hours, twelve hours, one day, one week, one month, and one year.

In one embodiment, the dynamic scoring module 180 computes at least the following scores:

a score $S_1$ corresponding to a time $t_1$ and to the first experience;

a score $S_2$ corresponding to a time $t_2$ and to the second experience;

a score $S_3$ corresponding to a time $t_3$ and to the first experience; and a score $S_4$ corresponding to a time $t_4$ and to the second experience.

Where $t_3>t_1$, $t_4>t_1$, $t_3<t_2$, $t_4>t_2$, $S_3>S_1$, $S_2>S_4$, and $S_4>S_3$. Note that these scores and corresponding times need not necessarily be the same scores and corresponding times described in FIG. 29*b*. Additionally, though illustrated as different times, in some examples, $t_1=t_2$ and/or $t_3=t_4$.

The scores $S_1$ to $S_4$ from the present embodiment (possibly with other data) may be utilized by the score projector module 200 to project scores for future times and/or learn trends of scores indicative the affective response to the first and second experiences. FIG. 31*b* illustrates the scores mentioned above and the trends that may be learned from them.

In one embodiment, the score projector module 200 is configured to compute projected scores 212*a* and 212*b* based on the scores 211*a* and 211*b*, respectively. The projected scores 212*a* include one or more scores corresponding to the first experience and to a time t that is greater than $t_3$ (the time corresponding to $S_3$). Similarly, the projected scores 212*b* include one or more scores corresponding to the second experience and to a time t that is greater than $t_4$ (the time corresponding to $S_4$). In one embodiment illustrated in FIG. 31*b*, the projected scores 212*a* include a score $S_5$ corresponding to the first experience a time $t_5$ that is after both $t_3$ and $t_4$. Additionally, in that figure, the projected scores 212*b* include a score $S_6$ which corresponds to the second experience and also to the time $t_5$. Alternatively, the score $S_6$ may correspond to a time $t_6$ which is after $t_4$ but before $t_5$.

In another embodiment, the score projector module 200 is configured to compute trends 213*a* and 213*b*, based on the scores 211*a* and 211*b*, respectively. Optionally, the trend 213*a* describes expected values of projected scores corresponding to the first experience and to times after $t_3$. Optionally, the trend 213*b* describes expected values of projected scores corresponding to the second experience and to times after $t_4$.

The recommender module 214 is configured to receive information from the score projector module 200 and also to receive a future time at which to have an experience. The recommender module 214 utilizes the information to recommend an experience, from among the first and second experiences, to have at the future time. Optionally, the information received from the score projector module 200 may include values indicative of one or more of the following: the projected scores 212*a*, the projected scores 212*b*, parameters describing the 213*a*, and parameters describing the trend 213*b*. Optionally, information describing a projected score includes both the value of the score and the time to which the score corresponds.

The information received from the score projector module 200, by the recommender module 214, may be used by the recommender module 214 in various ways in order to determine which experience to recommend. In one embodiment, the recommender module 214 receives information regarding projected scores, such as information that includes the scores $S_5$ and $S_6$ illustrated in FIG. 31*b* (e.g., the projected scores 212*a* and 212*b*) and optionally the times to which the projected scores correspond. In one example, the recommender module 214 may determine that for times that are after $t_5$ it will recommend the first experience. In one example, decision may be made based on the facts that (i) the projected score $S_5$, which corresponds to the first experience is greater than the projected score $S_6$, which corresponds to the second experience, and (ii) prior to the times corresponding to $S_5$ and $S_6$, the case was the opposite (i.e., scores for the second experience were higher than scores for the first experience). Thus, the fact that $S_5>S_6$ may serve as evidence that in future times after $t_5$, the scores for the first experience are expected to remain higher than the scores for the second experience (at least for a certain time). Such a speculation may be based on the fact that the previous scores for those experiences indicate that, during the period of time being examined (which includes $t_1, \ldots, t_4$), the scores for the first experience increase with the progression of time, while the scores for the second experience decrease with the progression of time (see for example the trends 213*a* and 213*b* in FIG. 31*b*). Thus, in this example, the time $t_5$ may be the first time for which there is evidence that the scores for the first experience are expected to increase above of the scores for the second experience, so for times that are after $t_5$, the recommender module 214 may recommend the first experience For times that are not after $t_5$, there may be various options. For example, the recommender module 214 may recommend the second experience, or recommend both experiences the same. It is to be noted that in some embodiments, the time $t_5$ may serve as the threshold-time t' mentioned below.

In another embodiment, the recommender module 214 receives information regarding trends of projected scores for the first and second experiences, (e.g., the trends 213*a* and 213*b*). Optionally, the information includes parameters that define the trends 213*a* and/or 213*b* (e.g., function parameters) and/or values computed based on the trends (e.g., projected scores for different times in the future). In one example, the recommender module 214 may utilize the information in order to determine a certain point in time (in the future) which may serve as a threshold-time t', after which the recommendations change Before the threshold-time t', the recommender module 214 recommends one experience, from among the first and second experiences, for which the projected scores are higher. After the threshold-time t', the recommender module 214 recommends the other experience, for which the projected scores have become higher.

This situation is illustrated in FIG. 31*b*. Before the time t', the projected scores 212*b* for the second experience are higher; thus, when tasked with recommending an experience for a time t<t' the recommender module 214 would recommend to have the second experience. However, after the time t', the projected scores 212*a* for the first experience are higher; thus, when tasked with recommending an experience for a time t>t' the recommender module 214 would recommend to have the first experience. Optionally, when tasked with recommending an experience to have at the time t', the recommender module 214 may make an arbitrary choice (e.g., always recommend one experience or the other), make a random choice (i.e., randomly select one of the experiences), or recommend both experiences the same.

There are various ways in which the threshold-time t' may be determined. In one example, t' may be a point corresponding to an intersection of the trends 213a and/or 213b that is found using various numerical and/or analytical methods known in the art. In one example, the trends 213a and 213b are represented by parameters of polynomials, and t' is found by computing intersections for the polynomials, and selecting a certain intersection as the time t'.

When the recommender module 214 makes a recommendation, in some embodiments, it may take into account the expected duration of the experience. In one example, the recommendation may be made such that for most of the time a user is to have the recommended experience, the recommended experience is the experience, from among the first and second experiences, for which the projected scores are higher. For example, the average projected score for the recommended experience, during an expected duration is higher than the average projected score for the other experience, during the same duration.

In some embodiments, the future time t for which an experience is recommended represents the time at which the recommended experience is to start. In other embodiments, the time t may represent a time at which to the recommended experience is to end. And in yet other embodiments, the future time t may represent some time in the middle of the recommended experience. Thus, recommendation boundaries (e.g., regions defined relative to the time t') may be adjusted in different embodiments, to account for the length the recommended experience is expected to be and/or to account for the exact meaning of what the future time t represents in a certain embodiment.

In some embodiments, the recommender module 214 is configured to recommend an experience to a user to have at a certain time in the future in a manner that belongs to a set comprising first and second manners. Optionally, when recommending the experience in the first manner, the recommender module 214 provides a stronger recommendation for the experience, compared to a recommendation for the experience that the recommender module 214 provides when recommending in the second manner. With reference to the discussion above (e.g., as illustrated in FIG. 31b), in one example involving a future time t, such that t>$t_5$ and/or t>t', the recommender module 214 recommends the first experience in the first manner and does not recommend the second experience in the first manner. Optionally, for that time t, the recommender module 214 recommends the second experience in the second manner. It is to be noted that what may be involved in making a recommendation in the first or second manners is discussed in further detail above (e.g., with regards to the recommender module 178).

In one embodiment, the first and second experiences correspond to first and second locations. Optionally, map-displaying module 240 is utilized to present on a display: a map comprising a description of an environment that comprises the first and second locations, and an annotation overlaid on the map indicating at least one of: $S_5$, $S_6$, and an indication of a time that $S_5$>$S_6$ and/or of the threshold-time t'. Optionally, the description of the environment comprises one or more of the following: a two-dimensional image representing the environment, a three-dimensional image representing the environment, an augmented reality representation of the environment, and a virtual reality representation of the environment. Optionally, the annotation comprises at least one of: images representing the first and second locations, and text identifying the first and second locations.

Figure 32:
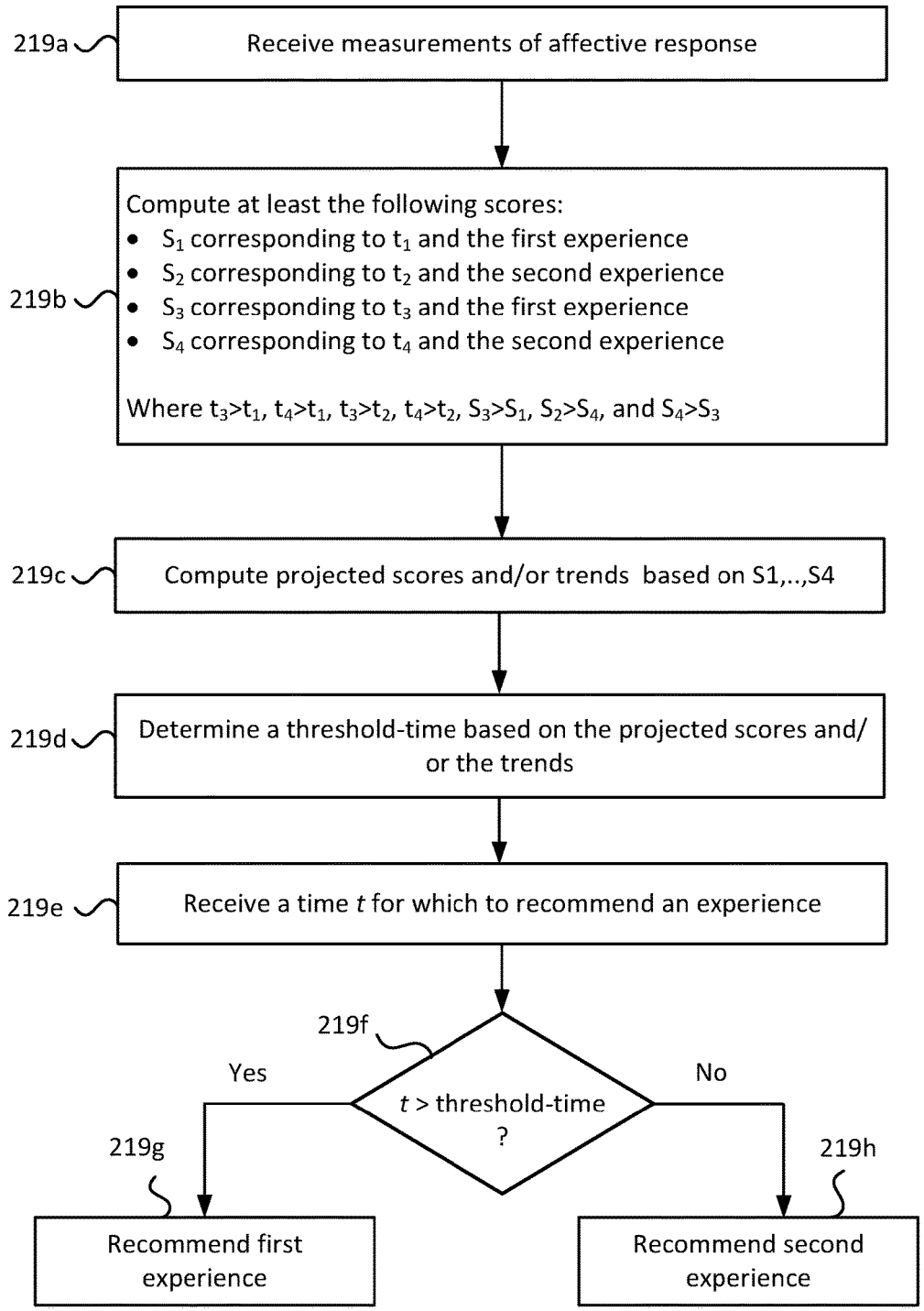
FIG. 32 illustrates steps involved in a method for recommending an experience to have at a future time.

FIG. 32 illustrates steps involved in one embodiment of a method for recommending an experience to have at a future time. The steps illustrated in FIG. 32 may be used, in some embodiments, by systems modeled according to FIG. 31a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for recommending an experience to have at a future time includes at least the following steps:

In Step 219a, receiving, by a system comprising a processor and memory, measurements of affective response of users (e.g., the measurements 110). Optionally, each measurement of a user corresponds to an event in which the user has a first experience or a second experience. The first and second experiences may be any of the various types of experiences mentioned in this disclosure, such as any of the experiences mentioned in section 3—Experiences.

In step 219b, computing scores based on the measurements. Optionally, each score corresponds to a time t and to an experience from among the first and second experiences. Additionally, each score is computed based on a subset of the measurements 110 comprising measurements of users who had the experience, and the measurements in the subset are taken at a time that is after a certain period before the time t, but is not after t. For example, if the length of the certain period is denoted Δ, each of the measurements in the subset was taken at a time that is between t−Δ and t. Optionally, the certain period of time is between one minute and one day. Optionally, the certain period of time is shorter than at least one of the following periods of time: one minute, one hour, one day, one week, or one month. Optionally, each score is computed based on measurements of at least five different users. Optionally, a different minimal number of measurements of different users may be used to compute each score, such as computing each score based on measurements of at least ten different users.

In one embodiment, when computing a score corresponding to a time t, measurements taken earlier than the certain period before the time t (i.e., taken before t−Δ), are not utilized to compute the score corresponding to the time t. In another embodiment, measurements are weighted according to how long before the time t they were taken. Thus, the method may optionally include the following steps: assigning weights to measurements used to compute a score corresponding to the time t, such that an average of weights assigned to measurements taken earlier than the certain period before the time t is lower than an average of weights assigned to measurements taken after the certain period before the time t; and utilizing the weights to compute the score corresponding to the time t. For example, the score corresponding to the time t may be a weighted average of the measurements, and the more recent the measurements (i.e., they are taken at a time close to t), the more they influence the value of the score.

The scores computed in Step 219b may include scores corresponding to various times. In one example, the scores that are computed include at least the following scores: a score $S_1$ corresponding to a time $t_1$ and to the first experience, a score $S_2$ corresponding to a time $t_2$ and to the second experience, a score $S_3$ corresponding to a time $t_3$ and to the first experience, and a score $S_4$ corresponding to a time $t_4$ and to the second experience. Optionally, $t_3>t_1$, $t_4>t_1$, $t_3>t_2$, $t_4>t_2$, $S_3>S_1$, $S_2>S_4$, and $S_4>S_3$. Optionally, $t_1=t_2$ and/or $t_3=t_4$.

In step 219c, computing, based on the scores $S_1$, $S_2$, $S_3$, and $S_4$ at least one of the following sets of values: (i) projected scores for the first and second experiences, and (ii) trends of projected scores for the first and second experiences.

In step 219d, identifying a threshold-time t' based on the set of values, where t' is selected such that $t'>t_4$ and $t'>t_3$. Additionally, t' is selected such that projected scores corresponding to a time that is before t' and to the first experience are lower than projected scores corresponding to the same time and to the second experience.

In Step 219e, receiving a time t for which an experience from among the first and second experiences is to be recommended. Optionally, $t>t_3$ and $t>t_4$.

In Step 219f, determining whether the time t is after the threshold-time t'.

In Step 219g, responsive to t being after t', following the "Yes" branch and recommending to have the first experience at the time t.

And in Step 219h, responsive to t not being after t', following the "No" branch and recommending to have the second experience at the time t.

In one embodiment, Step 219c may involve computing a set of values comprising: (i) a projected score $S_5$, corresponding to the first experience and to a time $t_5>t_3$, based on $S_1$ and $S_3$, and (ii) a projected score $S_6$, corresponding to the second experience and to a time $t_6>t_4$, based on $S_2$ and $S_4$. Optionally, in this embodiment $S_5>S_6$, and $t'\geq t_5$.

In another embodiment, Step 219c may involve computing a set of values comprising parameters describing trends of projected scores for the first and second experiences (e.g., the trends 213a and 213b). Optionally, the threshold-time t' is a time corresponding to an intersection of the trends of the projected scores for the first and second experiences.

In one embodiment, Step 219g and/or Step 219h may optionally involve recommending the respective experience to a user to have at the future time in a manner that belongs to a set comprising first and second manners. Optionally, recommending an experience in the first manner involves providing a stronger recommendation for the experience, compared to a recommendation for the experience that is provided when recommending in the second manner.

In one example, responsive to the future time being after t' recommending the first experience in Step 219g is done in the first manner, while the second experience is not recommended in the first manner. Optionally, in this example, the second experience is recommended in the second manner. In another example, responsive to the future time not being after the threshold-time t', recommending the second experience in Step 219h is done in the first manner, while the first experience is not recommended in the first manner. Optionally, in this example, the first experience is recommended in the second manner.

14—Ranking Experiences

In various embodiments, experiences (also referred to as a "plurality of experiences") may be ranked based on measurements of affective response of users. The results of this action are referred to as a ranking of the experiences. A ranking is an ordering of at least some of the experiences, which is indicative of preferences of the users towards those experiences and/or is indicative of the extent of emotional response of the users to those experiences. For example, the higher the rank of an experience, the more the users liked the experience. Thus, in some embodiments, it may be assumed that a first experience that is ranked higher than a second experience is preferred by users. In another example, when a first experience has a higher rank than a second experience, that implies that the emotional response of users to the first experience is more positive than the emotional response of users to the second experience.

A module that ranks experiences may be referred to as a "ranking module" and/or a "ranker". The ranking module be referred to as "generating" or "computing" a ranking (when referring to creation of a ranking, these terms may be used interchangeably). Thus, stating that a module is configured to rank experiences (and/or to rank experiences of a certain type) is equivalent to stating that the module is configured to generate a ranking of the experiences (and/or to generate a ranking of the experiences of the certain type). When the experiences being ranked are of a certain type, the ranker and/or ranking module may be referred to based on the type of experience being ranked (e.g., a location ranker, content ranking module, etc.).

There are various ways, which may be used in embodiments described herein, to rank experiences based on measurements of affective response. In some embodiments, the ranking is performed utilizing a scoring module that computes scores for the experiences being ranked, and ranks the experiences based on their corresponding scores. In other embodiments, the measurements may be used to generate a plurality of preference rankings, each generated based on a subset of the measurements (e.g., a subset that consists of measurements of a single user); with each preference ranking involving a ranking of at least some of the experiences. The plurality of preference rankings may than be used to generate a single ranking of all the experiences.

It is to be noted that in embodiments described herein, a ranking may include ties. A tie in a ranking may occur when multiple experiences share the same rank. Ties may happen for various reasons, such as experiences having similar or equal scores computed for them, when the difference between the measurements corresponding to different experiences is not significant, and/or when preference rankings do not clearly indicate that one experience, from among the different experiences, is to be ranked higher than another.

In some embodiments, measurements of affective response utilized to rank experiences may have associated weights, such that some measurements may have higher weights than other measurements. There may be various reasons for measurements to be assigned weights. For example, measurements may be assigned weights proportional to the age of the measurements, such that measurements that are relatively new receive a higher weight than measurements that are older. In another example, measurements of users may be assigned weights based on the similarity of the users to a certain user (e.g., as determined by a profile comparator). In another example, measurements may be weighted in order to have measurements corresponding to a certain user, or group of users, reach a certain weight. For example, this form of normalization may enable curbing the influence of certain users and/or groups of users who provide many measurements that are used for the ranking of the experiences. In yet another example, measurements of affective response may be weighted according to their age (e.g., the period that had elapsed between the time the measurements were taken and the time they were used to compute a ranking).

Figure 33:
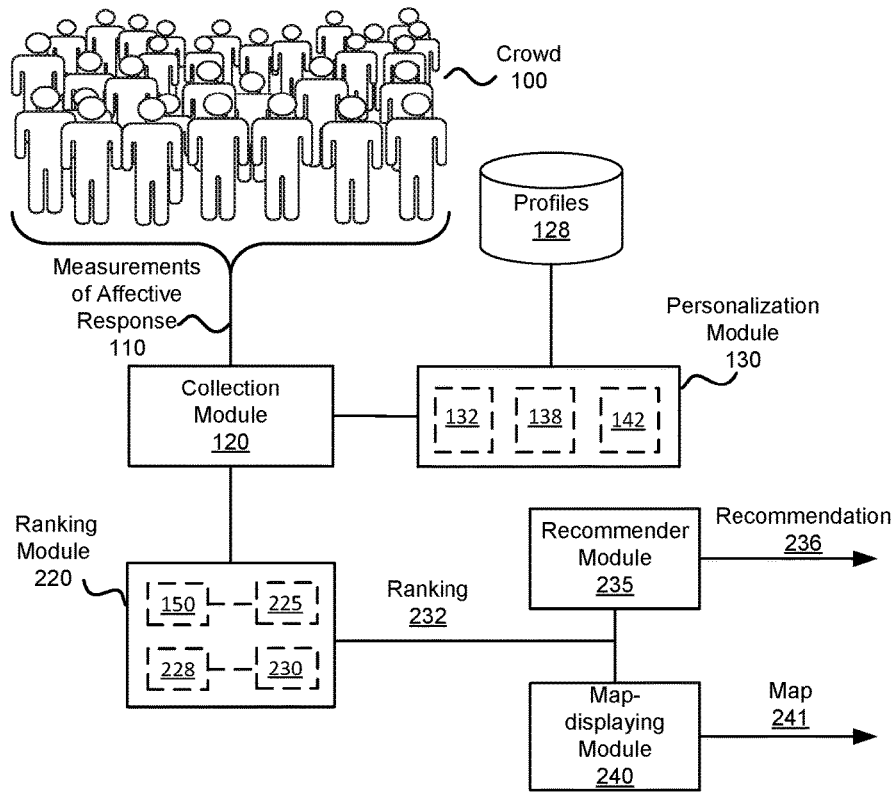
FIG. 33 illustrates a system configured to rank experiences based on measurements of affective response of users.

FIG. 33 illustrates a system configured to rank experiences based on measurements of affective response of users. The system includes at least the collection module 120 and a ranking module, such as the ranking module 220, the dynamic ranking module 250, or the aftereffect ranking module 300. It is to be noted that while the system described below includes the ranking module 220, the principles described below are applicable, mutatis mutandis, to embodiments in which other ranking modules are used. For example, the different approaches to ranking described below are applicable to other embodiments that involve ranking of experiences, such as embodiments that include the dynamic ranking module 250 or the aftereffect ranking module 300. Furthermore, the discussion below describes principles involve in ranking that is done based on measurements of affective response to experiences; these principles may be applied to ranking modules that are used to evaluate when to have an experience, by ranking times to have the experience, as done by the ranking module 333 and the aftereffect ranking module 334.

The embodiment illustrated in FIG. 33, like other systems described in this disclosure, may be realized via a computer, such as the computer 400, which includes at least a memory 402 and a processor 401. The memory 402 stores computer executable modules described below, and the processor 401 executes the computer executable modules stored in the memory 402. It is to be noted that the experiences to which the embodiment illustrated in FIG. 33 relates, as well as other embodiments involving experiences in this disclosure, may be any experiences mentioned in this disclosure (e.g., the experiences may be of any of the types of experiences mentioned in section 3—Experiences). In particular, the experiences may involve being in any of the locations and/or involve engaging in an activity in any of the locations mentioned in this disclosure.

The collection module 120 is configured to receive the measurements of affective response, which in some embodiments, are measurements 110 of affective response of users belonging to the crowd 100 to experiences. Optionally, a measurement of affective response of a user to an experience, from among the experiences, is based on at least one of the following values: (i) a value acquired by measuring the user, with a sensor coupled to the user, while the user has the experience, and (ii) a value acquired by measuring the user, with a sensor coupled to the user, at most one hour after the user had the experience. A measurement of affective response of a user to an experience may also be referred to herein as a "measurement of a user who had an experience". The collection module 120 is also configured to forward at least some of the measurements 110 to the ranking module 220. Optionally, at least some of the measurements 110 undergo processing before they are received by the ranking module 220. Optionally, at least some of the processing is performed via programs that may be considered software agents operating on behalf of the users who provided the measurements 110.

In one embodiment, measurements received by the ranking module 220 include measurements of affective response of users to the experiences. Optionally, for each experience from among the experiences, the measurements received by the ranking module 220 include measurements of affective response of at least five users to the experience. That is, the measurements include for each experience measurements of affective response of at least five users who had the experience, and the measurements of the at least five users were taken while the users had the experience or shortly after that time (e.g., within one minute, one hour, and/or one day of finishing the experience, depending on the embodiment). Optionally, for each experience, the measurements received by the ranking module 220 may include measurements of a different minimal number of users, such as measurements of at least eight, at least ten, or at least one hundred users. The ranking module 220 is configured to rank the experiences based on the received measurements, such that, a first experience is ranked higher than a second experience.

Herein, when a first experience is ranked higher than a second experience, it typically means that the first experience is to be preferred over the second experience. In one example, this may mean that a score computed for the first experience is higher than a score computed for the second experience. In another example, this may mean that more users prefer the first experience to the second experience, and/or that measurements of users who had the first experience are more positive than measurements of users who had the second experience Ranking a first experience higher than a second experience may also be referred to as ranking the first experience "ahead" of the second experience and/or ranking the first experience "above" the second experience. Typically in this disclosure, ranking is considered to be according to a positive trait (e.g., ranking experiences based on how positively users react to those experiences). However, in some cases ranking may be based on a negative trait; in such a case, a first experience ranked ahead of a second experience may mean that the first experience is less desirable than the second experience. Unless explicitly stated otherwise, and/or explicitly understood otherwise from the context of an embodiment, in this disclosure, experiences (of various types) are assumed to be ranked such that when a first experience is ranked above a second experience, this implies that the first experience is more desirable than the second experience, that the first experience should be recommended over the second experience, and/or that the first experience should receive a stronger endorsement than the second experience.

It is to be noted that while it is possible, in some embodiments, for the measurements received by modules, such as the ranking module 220, to include, for each user from among the users who contributed to the measurements, at least one measurement of affective response of the user to each experience from among the experiences, this is not the case in all embodiments. In some embodiments, some users may contribute measurements corresponding to a proper subset of the experiences (e.g., those users may not have had some of the experiences), and thus, the measurements 110 may be lacking measurements of some users to some of the experiences. In some embodiments, some users may have had only of the experiences being ranked.

In some embodiments, measurements utilized by a ranking module, such as the ranking module 220, to generate a ranking of experiences may all be taken during a certain period of time. Depending on the embodiment, the certain period of time may span different lengths of time. For example, the certain period may be less than one day long, between one day and one week long, between one week and one month long, between one month and one year long, or more than a year long. When a ranking of the experiences is generated based on measurements that were all taken during a certain period, it may be considered to correspond to the certain period. Thus, for example, a ranking of hotels may be a "ranking of hotels for the first week of July", a ranking of restaurants may be a "ranking of the best restaurants for 2016", and a ranking virtual malls may be a "ranking of the best virtual malls for Black Friday".

A ranking of experiences, such as the ranking 232 generated by the ranking module or a ranking generated by some other ranking module, may be an explicit ranking of the experiences or an implicit ranking of the experiences. In one example, an explicit ranking directly conveys experiences and their corresponding ranks (e.g., by presenting a rank next to a representation of an experience). In another example, an explicit ranking may include a list of experiences that is ordered in a certain order. When it is reasonable to expect that a user who views the list is to understand that experiences that appear higher up on the list are ranked higher than experiences that appear lower on the list, the ranking may be considered explicit. Optionally, in this example, the reasonable expectation of the understanding of how the list translates to a ranking may be based on past experience or common knowledge of users (e.g., that is how rankings are presented in other scenarios), or possibly due to an explicit indication to the user that order is important in the list.

The ranking module 220, and/or another ranking module described herein, may perform actions that generate a ranking that is implicit. In one embodiment, aggregating information indicative of values of measurements of affective response of users to experiences and providing it to the users may be considered generating a ranking of the experiences. For example, aggregating scores computed for experiences and presenting each score with an indication to which experience it belongs may be considered presenting a ranking of the experiences, since from reviewing that information, one may easily ascertain a certain ordering of the experiences that is based on their scores.

In another embodiment, the ranking module 220, and/or another ranking module described herein, may generate a ranking by filtering out certain experiences from a set of experiences based on measurements of affective response to the experiences. For example, if a certain set contains experiences left after filtering a larger set of experiences based on scores computed for the experiences in the larger set, such that experiences in the larger set were left out of the certain set—that may be considered a ranking of the experiences. Note that even if there is no indication of an ordering of the experiences in the certain set, this is still considered a ranking since the act of filtering by the ranking module establishes an ordering between experiences in the certain set which are ranked above experiences in the larger set that are not in the certain set. In one example, filtering experiences from the larger set may be based on scores computed for the experiences, such that experiences with lower scores are not included in the certain set.

In other embodiments, implicit ranking may be done by presenting experiences to users in different ways, such that the way in which an experience is presented to a user implies to the user its rank and/or whether it is ranked above or below another experience. In one embodiment, when different experiences are displayed in different manners, e.g., using different degrees of detail or size, then the manner in which an experience is presented may be indicative of its rank; the presentation in different manners of experiences may be considered an implicit ranking of the experiences. For example, experiences may involve activities such as dining in restaurants and/or staying at hotels. A presentation of the experiences may involve displaying images and/or icons of the restaurants and/or the hotels on a map (e.g., a map of a city). Presenting some of the restaurants and/or hotels in a more prominent manner (e.g., using larger images) than others constitutes presenting a ranking of the experiences since one can deduce an ordering (or partial ordering) of the experiences. Similarly, presenting more details about certain restaurants and/or hotels (e.g., reviews, business hours, etc.) may also imply an ordering of the experiences.

As explained in section 3—Experiences, in some embodiments, experiences may be characterized as being of certain types and/or belong to certain levels of a hierarchy of experiences. A set of experiences that is evaluated in embodiments described herein, such as embodiments that involve ranking of the experiences, either using the ranking module 220 or some other ranking module, may be considered to be homogenous in some embodiments, while in other embodiments, the set may be considered heterogeneous. Most of the experiences in a homogenous set of experiences are typically of the same type and/or belong to the same hierarchical level in a hierarchy of experiences. In one example, different experiences that each involve visiting a different city (e.g., Paris, Rome, and London) may be considered a homogenous set of experiences. In another example, a homogenous set of experiences may include experiences that each involve playing a different online computer game. A heterogeneous set of experiences typically includes experiences that are not of the same type and/or experiences that belong hierarchical level in a hierarchy of experiences. For example, a set of experiences that is ranked may include one experience that involves eating in a restaurant, and another experience that involves playing a computer game. It is to be noted that in different embodiments, different hierarchies and taxonomies may be utilized to characterize experiences; thus, it is possible that, in some embodiments, the last example may be considered a homogenous set of experiences (e.g., a set which includes experiences that are all of a type that may be characterized as "things to do").

There are different approaches to ranking experiences, which may be utilized in some embodiments described herein. These approaches may be used by any of the ranking modules described herein, such as ranking module 220, dynamic ranking module 250, aftereffect ranking module 300, the ranking module 333, or the aftereffect ranking module 334 (which ranks times at which to have an experience). The discussion below explains the approaches to ranking using the ranking module 220 as an exemplary ranking module, however, the teachings below are applicable to other ranking modules as well, such as the ranking modules listed above.

In some embodiments, experiences may be ranked based on scores computed for the experiences. In such embodiments, the ranking module 220 may include the scoring module 150 and a score-based rank determining module 225. Ranking experiences using these modules is described in more detail in the discussion related to FIG. 36. In other embodiments, experiences may be ranked based on preferences generated from measurements. In such embodiments, an alternative embodiment of the ranking module 220 includes preference generator module 228 and preference-based rank determining module 230 Ranking experiences using these modules is described in further detail in the discussion related to FIG. 37.

Figure 35A:
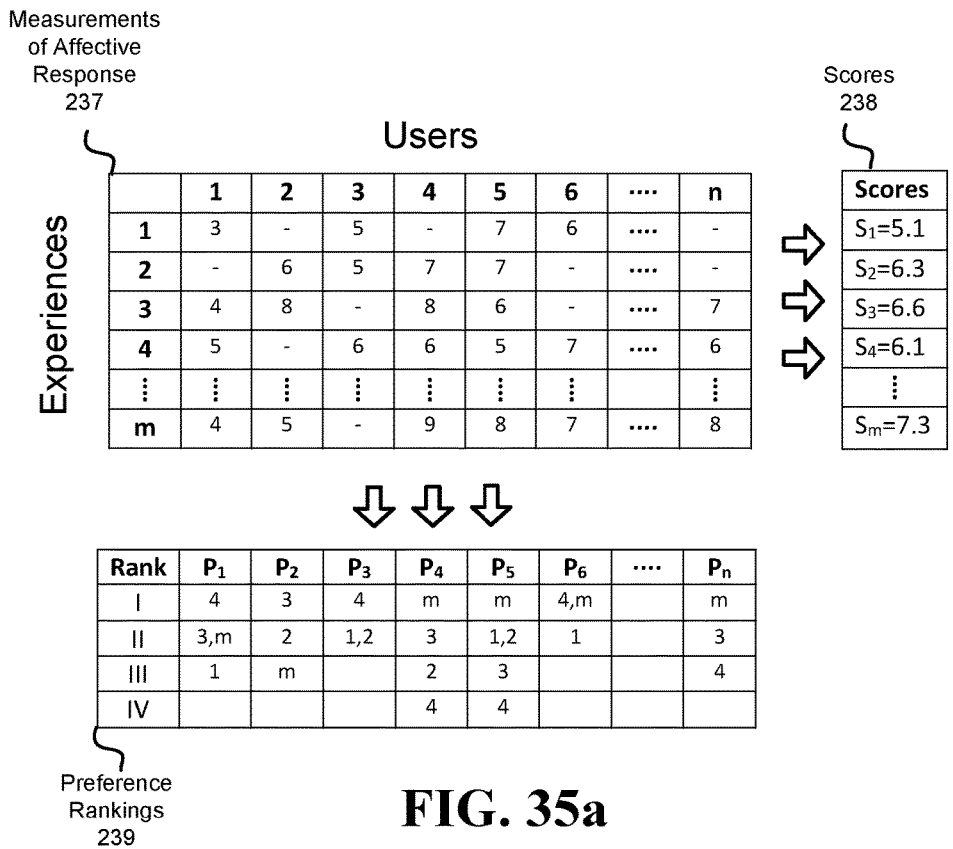
FIG. 35a illustrates different ranking approaches.

The difference between the approaches is illustrated in FIG. 35a. The table in the illustrated figure represents values 237 of measurements of affective response of n users to m experiences. For the purpose of the illustration, the affective response of a user to an experience is represented with a number from 1 to 10, with 10 representing the most positive value of affective response. Note that some of the cells in the table are empty, indicating that each user might have provided measurements to some of the m experiences. In this figure, score-based ranking is represented as ranking based on the rows. In score-based ranking, scores 238 are computed from each of the rows, and then the experiences may be ranked based on the magnitude of their corresponding scores. In contrast, preference-based ranking, may be viewed as ranking based on analysis of the columns. That is, preference rankings 239 represent a personal ranking for each of the n users towards some, but not necessarily all, of the m experiences. These n rankings may then be consolidated, e.g., utilizing a method that satisfies the Condorcet criterion, which is explained below.

Figure 35B:
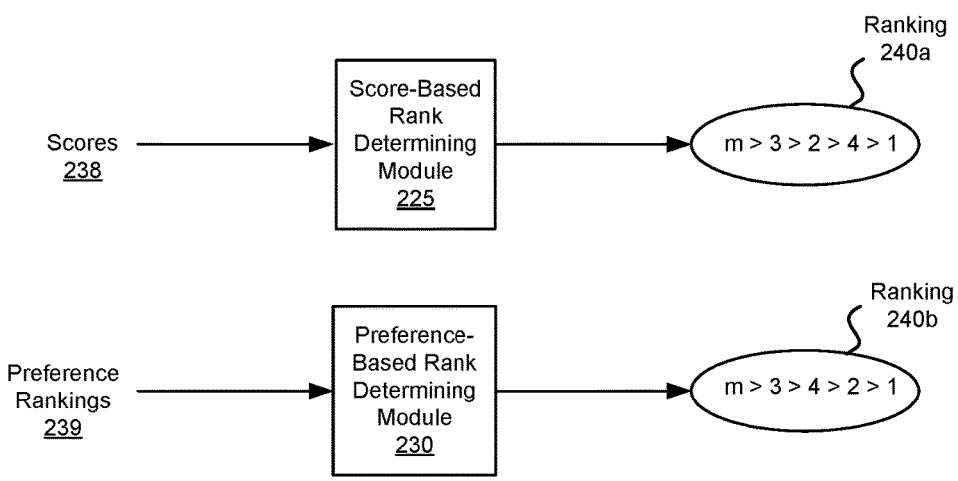
FIG. 35b illustrates how different approaches may yield different rankings based on the same set of measurements of affective response.

It is to be noted that the different approaches may yield different rankings, based on the same set of measurements of affective response, as illustrated in FIG. 35*b*, which shows the generation of two different rankings 240*a* and 240*b*, based on the values 237 of measurements of affective response. Both of the rankings 240*a* and 240*b* rank the $m^{th}$ experience first, the $3^{rd}$ experience second, and the $1^{st}$ experience last. However, the position of other experiences in the two rankings 240*a* and 240*b* may be different. For example, in the ranking 240*a* the $2^{nd}$ experience is ranked ahead of the $4^{th}$ experience, while in the ranking 240*b*, the order of those two experiences is reversed.

In some embodiments, the personalization module 130 may be utilized in order to personalize rankings of experiences for certain users. Optionally, this may be done utilizing the output generated by the personalization module 130 after being given a profile of a certain user and profiles of at least some of the users who provided measurements that are used to rank the experiences. Optionally, when generating personalized rankings for experiences, there are at least a certain first user and a certain second user, who have different profiles, for which the ranking module 220 ranks the first and second experiences from among the experiences differently, such that for the certain first user, the first experience is ranked above the second experience, and for the certain second user, the second experience is ranked above the first experience. The way in which, in the different approaches to ranking, an output from the personalization module 130 may be utilized to generate personalized rankings for different users, is discussed in more detail further below.

Figure 38A:
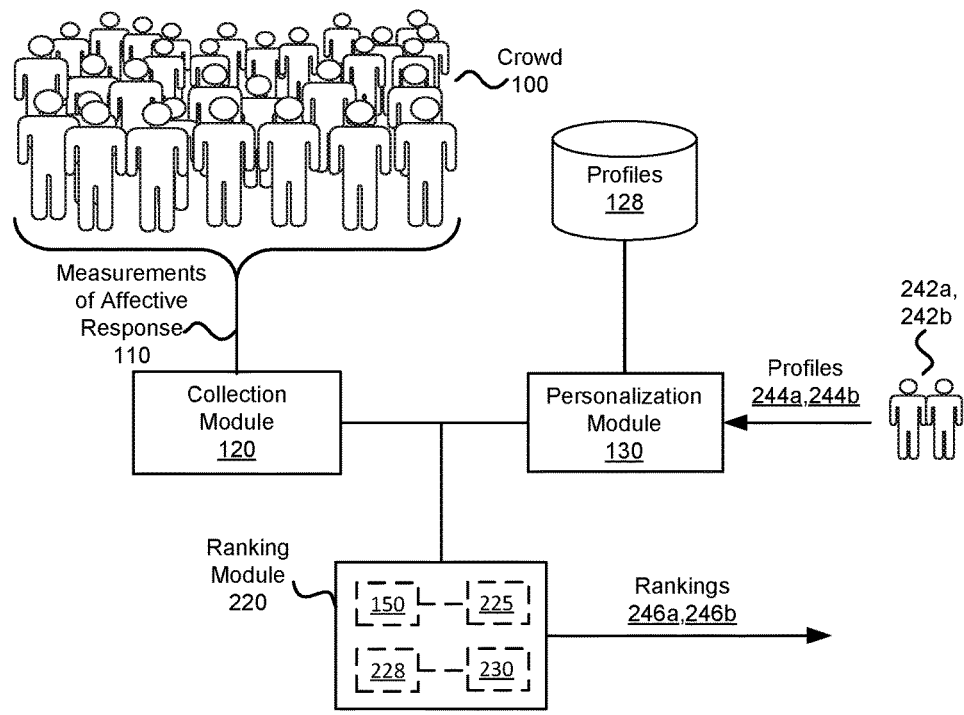
FIG. 38a illustrates one embodiment in which a personalization module may be utilized to generate personalized rankings of experiences.
Figure 38B:
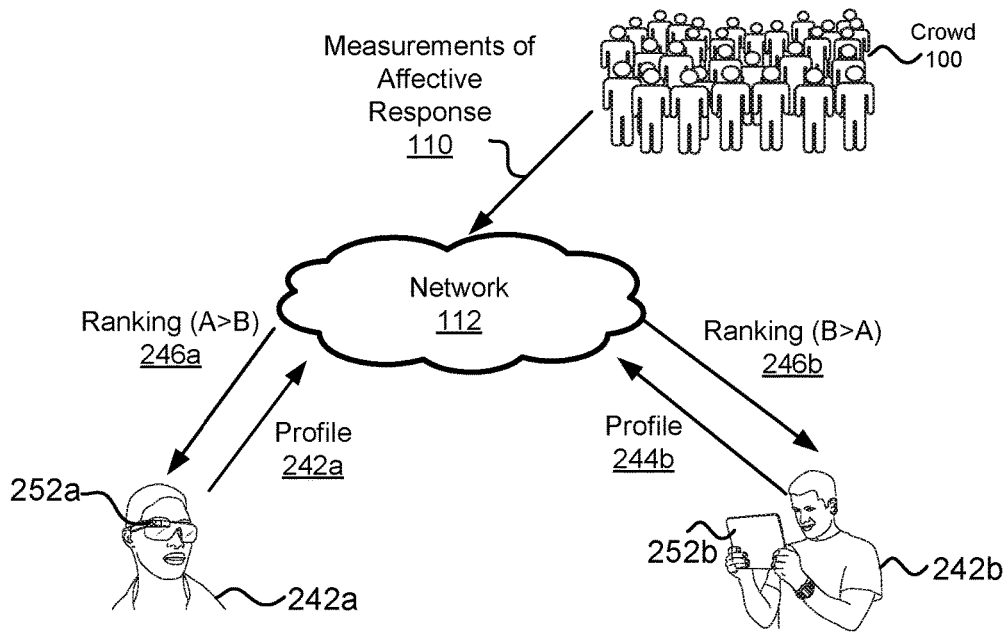
FIG. 38b illustrates an example of personalization of rankings of experiences in which different rankings are generated for users who have different profiles.

FIG. 38*a* and FIG. 38*b* illustrate one embodiment in which the personalization module 130 may be utilized to generate personalized rankings. A certain first user 242*a* and a certain second user 242*b* each provide their profiles to the personalization module 130 (these are profiles 244*a* and 244*b*, respectively). Based on different outputs generated by the personalization module 130 for the profiles 244*a* and 244*b*, the ranking module 220 generates rankings 246*a* and 246*b* for the certain first user 242*a* and the certain second user 242*b*, respectively. In the ranking 246*a*, a first experience (A) is ranked above a second experience (B), while in the ranking 246*b*, it is the other way around. Consequently, the certain first user 242*a* may receive a different result on his user interface 252*a* than the result the certain second user 242*b* receives on his user interface 252*b*. For example, the certain first user 242*a* may receive a recommendation to have experience A, while the certain second user 242*b* may receive a recommendation to have experience B.

In some embodiments, the recommender module 235 is utilized to recommend an experience to a user, from among the experiences ranked by the ranking module 220, in a manner that belongs to a set comprising first and second manners. Optionally, when recommending an experience in the first manner, the recommender module 235 provides a stronger recommendation for the experience, compared to a recommendation for the experience that the recommender module 235 would provide when recommending in the second manner. Optionally, the recommender module 235 determines the manner in which to recommend an experience, from among the experiences, based on the rank of the experience. In one example, if the experience is ranked at a certain rank it is recommended in the first manner. Optionally, if the experience is ranked at least at the certain rank (i.e., it is ranked at the certain rank or higher), it is recommended in the first manner). Optionally, if the experience is ranked lower than the certain rank, it is recommended in the second manner. In different embodiments, the certain rank may refer to different values. Optionally, the certain rank is one of the following: the first rank (i.e., the experience is the top-ranked experience), the second rank, or the third rank. Optionally, the certain rank equals at most half of the number of experiences being ranked. Additional discussion regarding recommendations in the first and second manners may be found at least in the discussion about recommender module 178 in section 8—Crowd-Based Applications; recommender module 235 may employ first and second manners of recommendation in a similar way to how the recommender module 178 recommends in those manners.

In some embodiments, when experiences that are ranked correspond to locations, the map-displaying module 240 may be utilized to present a ranking and/or recommendation based on a ranking to a user. In one example, an experience corresponding to a location involves participating in a certain activity at the location. In another example, an experience corresponding to a location simply involves spending time at the location. Optionally, map 241 may display an image describing the locations and annotations describing at least some of the experiences and their respective ranks.

Following is a discussion of two different approaches that may be used to rank experiences based on measurements of affective response. The first approach relies on computing scores for the experiences based on the measurements, and ranking the experiences based on the scores. The second approach relies on determining preference rankings directly from the measurements, and determining a ranking of the experiences using a preference-based algorithmic approach, such as a method that satisfies the Condorcet criterion (as described further below). It is to be noted that these are not the only approaches for ranking experiences that may be utilized in embodiments described herein; rather, these two approaches are non-limiting examples presented in order to illustrate how ranking may be performed in some embodiments. In other embodiments, other approaches to ranking experiences based on measurements of affective response may be employed, such as hybrid approaches that utilize concepts from both the scoring-based and preference-based approaches to ranking described below.

In some embodiments, ranking experiences may be done utilizing a scoring module, such as the scoring module 150, the dynamic scoring module 180, and/or aftereffect scoring module 302. For each of the experiences being ranked, the scoring module computes a score for the experience based on measurements of users to the experience (i.e., measurements corresponding to events involving the experience). Optionally, each score for an experience is computed based on measurements of at least a certain number of users, such as at least 3, at least 5, at least 10, at least 100, or at least 1000 users. Optionally, at least some of the measurements have corresponding weights that are utilized by the scoring module to compute the scores for the experiences.

Figure 36:
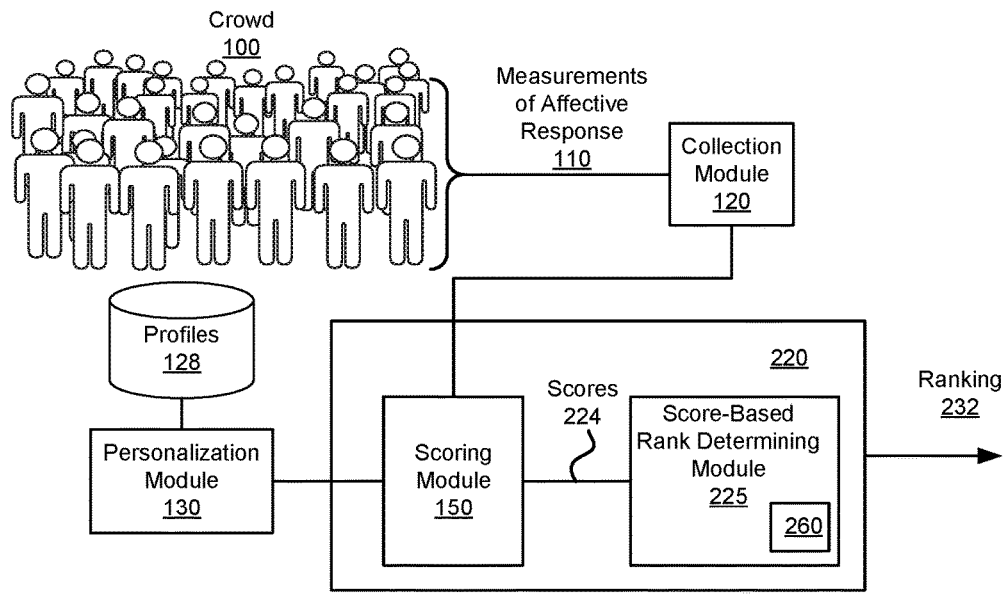
FIG. 36 illustrates a system configured to rank experiences using scores computed for the experiences based on measurements of affective response.

FIG. 36 illustrates a system configured to rank experiences using scores computed for the experiences based on measurements of affective response. The figure illustrates one alternative embodiment for the ranking module 220, in which the ranking module 220 includes the scoring module 150 and the score-based rank determining module 225. It is to be noted that this embodiment involves scoring module 150; in other embodiments, other scoring modules such as the dynamic scoring module 180 or the aftereffect scoring module 302 may be used to compute the scores according to which the experiences are ranked.

The scoring module 150 is configured, in one embodiment, to compute scores 224 for the experiences. For each experience from among the experiences, the scoring module 150 computes a score based on the measurements of the at least five users who had the experience (i.e., the measurements were taken while the at least five users had the experience and/or shortly after that time).

The score-based rank determining module 225 is configured to rank the experiences based on the scores 224 computed for the experiences, such that a first experience is ranked higher than a second experience when the score computed for the first experience is higher than the score computed for the second experience. In some cases experiences may receive the same rank, e.g., if they have the same score computed for them, or the significance of the difference between the scores is below a threshold.

In one embodiment, the score-based rank determining module 225 utilizes score-difference evaluator module 260 which is configured to determine significance of a difference between scores of third and fourth experiences. Optionally, the score-difference evaluator module 260 utilizes a statistical test involving the measurements of the users who had the third and fourth experiences in order to determine the significance. Optionally, the score-based rank determining module 225 is also configured to give the same rank to the third and fourth experiences when the significance of the difference is below the threshold.

Ranking experiences utilizing scores computed by a scoring module, such as the scoring module 150 mentioned above, may result, in some embodiments, in ties in the rankings of at least some of the experiences, such that at least a first experience and a second experience share the same rank. In one example, the first and second experiences may be tied if the scores computed for the first and second experiences are the same. In another example, the first and second experiences may be tied if the difference between the scores computed for the first and second experiences is below a threshold. For example, there is less than a 1%, a 5%, or a 10% difference between the two scores. In yet another embodiment, the first and second experiences may be tied if the significance of the difference between the scores is below a threshold, e.g., as determined by score-difference module 260 that is configured to determine significance of a difference between scores for different experiences. Optionally, when the significance of the difference of two scores corresponding to two experiences is below a certain threshold (e.g., a p-value greater than 0.05), the two experiences are given the same rank.

There are various ways in which the personalization module 130 may be utilized to generate, for a certain user, a personalized ranking of experiences. Following are a couple of example embodiments describing how such personalization of rankings of experiences may be performed in embodiments in which the ranking module 220 includes a scoring module (e.g., scoring module 150) and the score-based rank determining module 225.

In one embodiment, the personalization module 130 includes the profile comparator 133 and the weighting module 135. In this embodiment, the personalization module 130 receives a profile of a certain user and profiles of users who contributed measurements to computation of scores for the experiences being ranked. The personalization module 130 compares the profile of the certain user to the profiles of the users, and produces an output indicative of a weighting for the measurements. Optionally, the scoring module 150 utilizes the output in order to compute scores for the experience. Optionally, the scoring module 150 computes each score for an experience from among the experiences being ranked, based on measurements of at least eight users who had the experience and their corresponding weights that were determined by the weighting module 135. Given that in this embodiment, the scores received by the score-based rank determining module 225 are personalized for the certain user, the resulting ranking of the experiences may also be considered personalized for the certain user.

In another embodiment, the personalization module 130 includes the clustering module 139 and the selector module 141. The clustering module 139 receives profiles of users who contributed measurements to computation of scores for the experiences and clusters those users into clusters based on profile similarity, with each cluster comprising a single user or multiple users with similar profiles. The selector module 141 receives a profile of the certain user, and based on the profile, selects a subset comprising at most half of the clusters. Additionally, the selector module 141 is also configured to select at least eight users from among the users belonging to clusters in the subset. In this embodiment, the scoring module 150 is configured to compute scores for the experiences based on measurements of at least five users, from among the at least eight users, who had the experience. Since these scores may be considered personalized for the certain user (e.g., they are computed based on measurements of user that are more similar to the certain user), the resulting ranking of the experiences may also be considered personalized for the certain user.

In some embodiments, ranking experiences is done utilizing preference rankings. A preference ranking involves two or more experiences for which an ordering is established between at least first and second experiences, from among the two or more experiences, such that the first experience is ranked above the second experience. Other experiences from among the two or more experiences may be tied with the first experience or with the second experience, tied among themselves, and/or be ranked above or below the first and second experiences.

Figure 37:
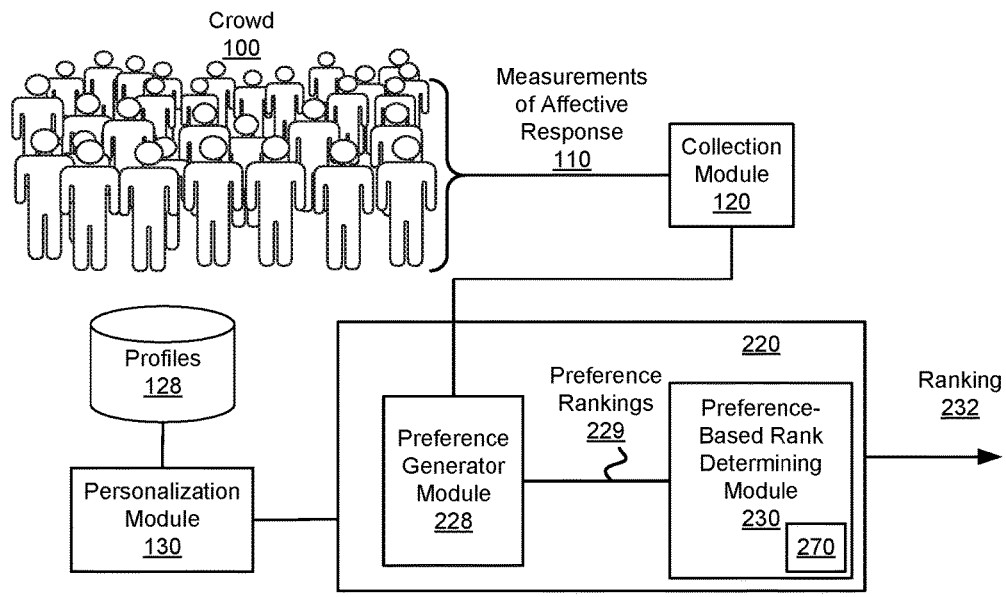
FIG. 37 illustrates a system configured to rank experiences using preference rankings determined based on measurements of affective response.

FIG. 37 illustrates a system configured to rank experiences using preference rankings determined based on measurements of affective response. The figure illustrates on alternative embodiment for the ranking module 220, in which the ranking module 220 includes preference generator module 228 and preference-based rank determining module 230.

The preference generator module 228 is configured to generate a plurality of preference rankings 229 for the experiences. Optionally, each preference ranking is determined based on a subset of the measurements 110, and comprises a ranking of at least two of the experiences, such that one of the at least two experiences is ranked ahead of another experience from among the at least two experiences. In one example, a subset of measurements may include measurements corresponding to events, with each event involving an experience from among the experiences. Optionally, the measurements in the subset are given in the form of affective values and/or may be converted to affective values, such as ratings on a numerical scale, from which an ordering (or partial ordering) of the two or more experiences may be established.

Depending on the embodiment, a subset of measurements, from which a preference ranking is generated may have different compositions (sources). In one embodiment, a majority of the measurements comprised in each subset of the measurements that is used to generate a preference ranking are measurements of a single user. Optionally, each subset of the measurements that is used to generate a preference ranking consists measurements of a single user. In another embodiment, the subset of measurements includes measurements of similar users (e.g., as determined by the profile comparator 133 that compares profiles of users). In still another embodiment, the measurements in a subset used to generate a preference ranking may include measurements corresponding to similar situations, locations, and/or periods. For example, most the measurements in the subset were taken when a user was in a certain situation (e.g., the user was alone and not in the company of others). In another example, the measurements in the subset were all taken during a certain period (e.g., the same thy or week). In still another example, the measurements in the set were taken when the user was at a certain location (e.g., at work).

It is to be noted that having the measurements in a subset be measurements of the same user, similar users, and/or involve the same or similar situations, can assist in removing noise factors that may render the preference ranking less accurate. These noise factors that relate to the users who provided the measurements and/or the conditions under which the measurements were taken, may not directly relate to the quality of the experiences being ranked. Thus, removal of such factors (by having the measurements be homogenous to some extent), may help remove some noise from the rankings, resulting in ranking that may be more accurate.

In some embodiments, measurements of affective response used by the preference generator module 228 to generate preference rankings may have corresponding weights. Optionally, the weights are utilized in order to generate the preference ranking from a subset of measurements by establishing an order (or partial order) between experiences such that a first experience is ranked in a preference ranking ahead of a second experience and the weighted average of the measurements in the subset corresponding to the first experience is higher than the weighted average of the measurements in the subset corresponding to the second experience.

Given two or more preference rankings, each involving some, but not necessarily all the experiences being ranked, the preference rankings may be consolidated in order to generate a ranking of the experiences. In some embodiments, the two or more preference rankings are consolidated to a ranking of experiences by a preference-based rank determining module, such as the preference-based rank determining module 230. There are various approaches known in the art that may be used by the preference-based rank determining module to generate the ranking of the experiences from the two or more preference rankings. Some of these approaches may be considered Condorcet methods and/or methods that satisfy the Condorcet criterion.

Various Condorcet methods that are known in the art, which may be utilized in some embodiments, are described in Hwang et al., "Group decision making under multiple criteria: methods and applications", Vol. 281, Springer Science & Business Media, 2012. Generally speaking, when a Condorcet method is used to rank experiences based on preference rankings, it is expected to satisfy at least the Condorcet criterion. A method that satisfies the Condorcet criterion ranks a certain experience higher than each experience belonging to a set of other experiences, if, for each other experience belonging to the set of other experiences, the number of preference rankings that rank the certain experience higher than the other experience is larger than the number of preference rankings that rank the other experience higher than the certain experience.

Following are some examples of methods that satisfy the Condorcet criterion, which may be used to generate the ranking. These examples are not exhaustive, and are to be construed as non-limiting; other approaches not mentioned and/or described below may be utilized in embodiments described herein.

In one embodiment, a "ranked pairs" approach may be utilized to generate a ranking of experiences from one or more preference rankings. Optionally, utilizing a ranked pairs approach involves deriving from each preference ranking one or more pairs, with each pair indicating a first experience that is ranked above a second experience. Following that, ranked pairs algorithms generally operate along the lines of the following steps: (1) tallying, from the pairs, the vote count obtained by comparing each pair of experiences, and determining the winner of each pair of experiences (provided there is not a tie between the vote counts of the pair of experiences); (2) sorting (i.e., ranking) each pair of experiences, by the largest strength of victory first to smallest strength of victory last; (3) and "locking in" each pair, starting with the one with the largest number of winning votes, and adding one in turn to a directed graph as long as they do not create a cycle (which would create an ambiguity). The completed graph shows the winner, as the experience which does not have any other experiences pointing to it. Steps 1 through 3 may be repeated multiple times (after removing each round's winner) in order to generate the ranking of the experiences.

In another embodiment, a Kemeny—Young method may be utilized to generate a ranking of experiences from one or more preference rankings. The Kemeny—Young method uses preferential rankings that are indicative of an order of preferences of at least some of the experiences being ranked. Optionally, a preference ranking may include ties, such that multiple experiences may share the same rank. A Kemeny—Young method typically uses two stages of calculations. The first stage involves creating a matrix or table that counts pairwise preferences between pairs of experiences. The second stage involves testing possible rankings of the experiences, calculating a score for each such ranking, and comparing the scores. Each ranking score equals the sum of the counts of the pairwise preferences that apply to that ranking. The ranking that has the largest score is identified as the overall ranking, which may be returned by the preference-based rank determining module. Optionally, if more than one ranking has the same largest score, all these possible rankings are tied, and typically the overall ranking involves one or more ties.

In yet another embodiment, generating a ranking of experiences from preference rankings may be done utilizing the Minimax algorithm, which is also called Simpson, Simpson-Kramer, and Simple Condorcet. In this method, an experience is chosen to be ranked ahead of other experiences when its worst pairwise defeat is better than that of all the other experiences.

Other approaches known in the art that may be utilized in some embodiments include the Schulze method, Copeland's method, Nanson's method, and Dodgson's method.

In some embodiments rankings of experiences, which generated by the preference-based rank determining module 230, may include ties, while other embodiments may involve a method that generates a ranking that does not include ties. In the case of ties between experiences, they may either be left in the ranking (e.g., some experiences may share a rank) or resolved to generate an unambiguous ranking (e.g., no experiences share a rank). For example, many methods known in the art involve a two-stage system in which in the event of an ambiguity, use a separate voting system to find the winner (i.e., the experience to rank ahead from among tied experiences). Optionally, this second stage is restricted to a certain subset of experiences found by scrutinizing the results of pairwise comparisons. The certain subset may be chosen based on certain criteria, corresponding to one or more of definitions of such sets that are known in the art such as the Smith set, The Schwartz set, or the Landau set. In some embodiments, ties between experiences in a ranking that is generated from preference rankings may be resolved by computing scores for the tied experiences, and ranking the tied experiences based on their corresponding scores.

In one embodiment, the preference-based rank determining module 230 assigns two or more experiences with the same rank if they are tied according to the method that satisfies the Condorcet criterion. In another embodiment, the preference-based rank determining module 230 may resolve ties if two or more experiences are tied according to the method that satisfies the Condorcet criterion.

In one embodiment, the preference-based rank determining module 230 is configured to give the same rank to the first and second experiences when the significance of the difference between first and second subsets of measurements corresponding to the first and second experiences, respectively, is below a threshold. Optionally, the difference is determined utilizing difference calculator 274 and the significance is determined utilizing difference-significance evaluator module 270.

There are various ways in which the personalization module 130 may be utilized to generate, for a certain user, a personalized ranking of experiences. Following are a couple of example embodiments describing how such personalization of rankings of experiences may be performed in embodiments in which the ranking module 220 includes the preference generator module 228 and the preference-based rank determining module 230.

In one embodiment, the personalization module 130 includes the profile comparator 133 and the weighting module 135. In this embodiment, the personalization module 130 receives a profile of a certain user and profiles of users who contributed measurements to computation of scores for the experiences being ranked. The personalization module 130 compares the profile of the certain user to the profiles of the users, and produces an output indicative of a weighting for the measurements. Optionally, in this embodiment, the preference generator module 228 generates each preference ranking based on a subset of the measurements and the weights for the measurements belonging to the subset. This may be done, by treating each measurement as a weighted vote instead of all measurements having the same weight (as may be done in some preference-based ranking methods). Given that in this embodiment, the preference rankings received by the preference-based rank determining module 230 are personalized for the certain user, the resulting ranking of the experiences may also be considered personalized for the certain user.

In another embodiment, the personalization module 130 includes the clustering module 139 and the selector module 141. The clustering module 139 receives profiles of users who contributed measurements to computation of scores for the experiences and clusters those users into clusters based on profile similarity, with each cluster comprising a single user or multiple users with similar profiles. The selector module 141 receives a profile of the certain user, and based on the profile, selects a subset comprising at most half of the clusters. Additionally, the selector module is also configured to select at least eight users from among the users belonging to clusters in the subset. Optionally, in this embodiment, the preference generator module 228 generates each preference ranking based on a subset of the measurements that comprises the at least eight users, who had the experience. Given that in this embodiment, the preference rankings received by the preference-based rank determining module 230 are personalized for the certain user (e.g., they include preference rankings generated from users more similar to the certain user), the resulting ranking of the experiences may also be considered personalized for the certain user.

Figure 34:
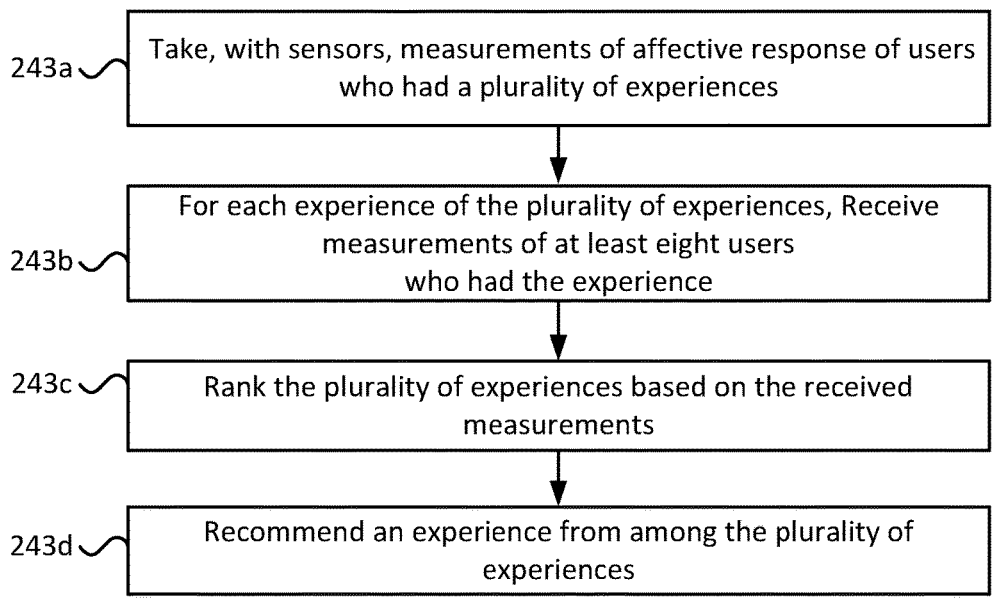
FIG. 34 illustrates steps involved in a method for ranking experiences based on measurements of affective response of users.

FIG. 34 illustrates steps involved in one embodiment of a method for ranking experiences based on measurements of affective response of users. The steps illustrated in FIG. 34 may be used, in some embodiments, by systems modeled according to FIG. 33. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for ranking experiences based on measurements of affective response of users includes at least the following steps:

In Step 243b, receiving, by a system comprising a processor and memory, the measurements of affective response of the users to the experiences. Optionally, for each experience from among the experiences, the measurements include measurements of affective response of at least five users who had the experience.

And in Step 243c, ranking the experiences based on the measurements, such that, a first experience from among the experiences is ranked higher than a second experience from among the experiences.

In one embodiment, the method optionally includes Step 243a that involves utilizing a sensor coupled to a user who had an experience, from among the experiences being ranked, to obtain a measurement of affective response of the user who had the experience. Optionally, the measurement of affective response of the user is based on at least one of the following values: (i) a value acquired by measuring the user with the sensor while the user has the experience, and (ii) a value acquired by measuring the user with the sensor up to one minute after the user had the experience.

In one embodiment, the method optionally includes Step 243d that involves recommending the first experience to a user in a first manner, and not recommending the second experience to the user in the first manner. Optionally, the Step 243d may further involve recommending the second experience to the user in a second manner. As mentioned above, e.g., with reference to recommender module 235, recommending an experience in the first manner may involve providing a stronger recommendation for the experience, compared to a recommendation for the experience that is provided when recommending it in the second manner.

As discussed in more detail above, ranking experiences utilizing measurements of affective response may be done in different embodiments, in different ways. In particular, in some embodiments, ranking may be score-based ranking (e.g., performed utilizing the scoring module 150 and the score-based rank determining module 225), while in other embodiments, ranking may be preference-based ranking (e.g., utilizing the preference generator module 228 and the preference-based rank determining module 230). Therefore, in different embodiments, Step 243c may involve performing different operations.

In one embodiment, ranking the experiences based on the measurements in Step 243c includes performing the following operations: for each experience from among the experiences, computing a score based on the measurements of the at least five users who had the experience, and ranking the experiences based on the magnitudes of the scores. Optionally, two experiences in this embodiment may be considered tied if a significance of a difference between scores computed for the two experiences is below a threshold. Optionally, determining the significance is done utilizing a statistical test involving the measurements of the users who had the two experiences (e.g., utilizing the score-difference evaluator module 260).

In another embodiment, ranking the experiences based on the measurements in Step 243c includes performing the following operations: generating a plurality of preference rankings for the experiences, and ranking the experiences based on the plurality of the preference rankings utilizing a method that satisfies the Condorcet criterion. Optionally, each preference ranking is generated based on a subset of the measurements, and comprises a ranking of at least two of the experiences, such that one of the at least two experiences is ranked ahead of another experience from among the at least two experiences.

In this embodiment, ties between experiences may arise in various ways. In one example, two or more experiences may be given the same rank when they are tied according to the method that satisfies the Condorcet criterion. Optionally, ties involving two or more experiences that are tied according to the method that satisfies the Condorcet criterion may be resolved using one or more of the approaches mentioned above. In another example, ties between two or more experiences may be determined based on a significance between measurements of affective response of the users who had the two or more experiences. For example, determining that a first experience and a second experience should have the same rank may be done by performing the following steps: (i) computing a weighted difference, which is a function of differences between a first subset comprising the measurements of the at least five users who had the first experience and a second subset comprising the measurements of the at least five users who had the second experience (e.g., utilizing the difference calculator 274); (ii) determining a significance of the weighted difference using a statistical test involving the first and second subsets (e.g., utilizing the difference-significance evaluator module 270); and (iii) assigning the same rank to the first and second experiences when the significance of the difference is below a threshold.

A ranking of experiences generated by a method illustrated in FIG. 34 may be personalized for a certain user. In such a case, the method may include the following steps: (i) receiving a profile of a certain user and profiles of at least some of the users (who contributed measurements used for ranking the experiences); (ii) generating an output indicative of similarities between the profile of the certain user and the profiles; and (iii) ranking the experiences based on the measurements and the output. Optionally, the output is generated utilizing the personalization module 130. Depending on the type of personalization approach used and/or the type of ranking approach used, the output may be utilized in various ways to perform a ranking of the experiences, as discussed in further detail above. Optionally, for at least a certain first user and a certain second user, who have different profiles, third and fourth experiences, from among the experiences, are ranked differently, such that for the certain first user, the third experience is ranked above the fourth experience, and for the certain second user, the fourth experience is ranked above the third experience.

Figure 39:
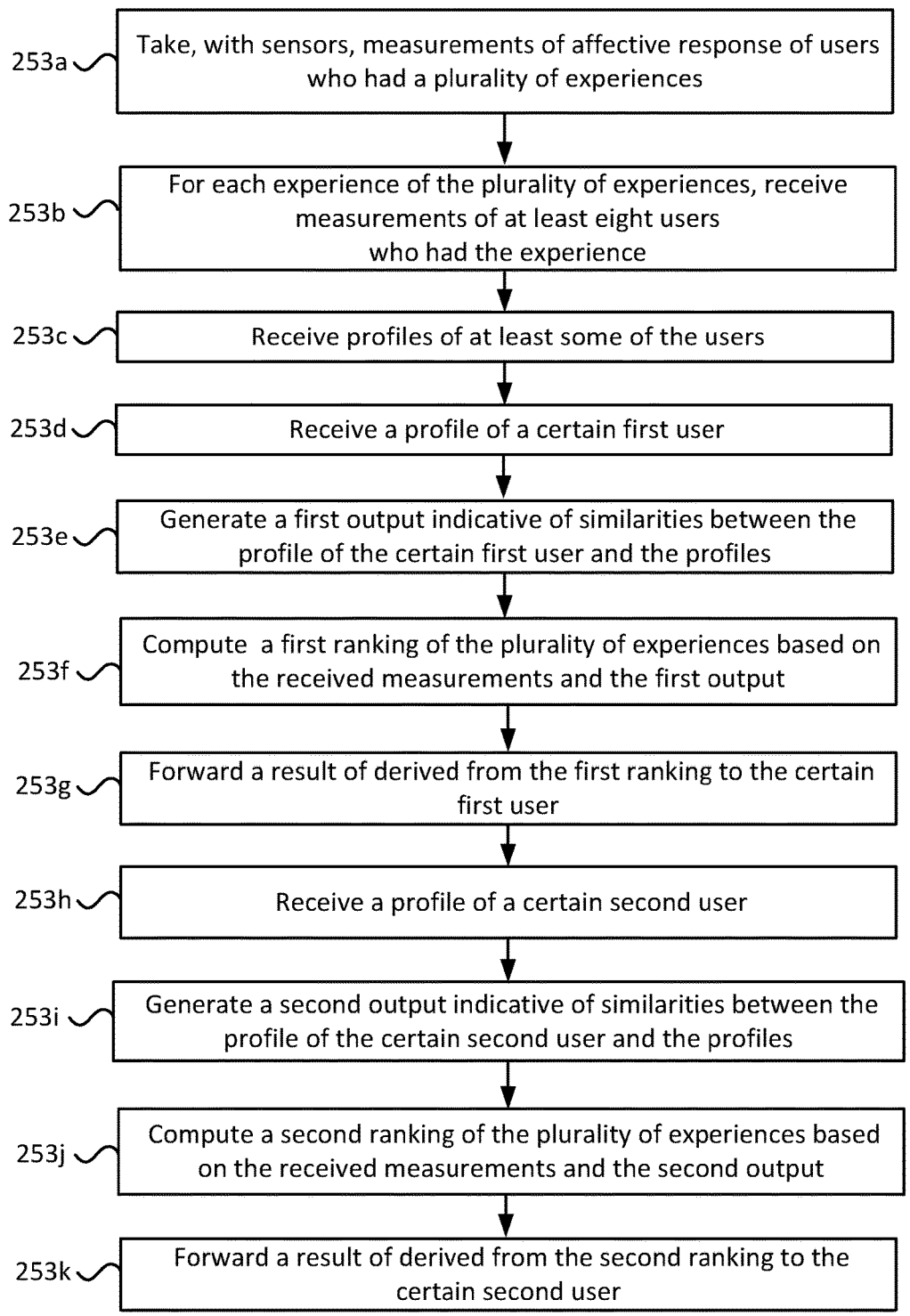
FIG. 39 illustrates steps involved in a method for utilizing profiles of users to compute personalized rankings of experiences based on measurements of affective response of the users.

Personalization of rankings of experiences as described above, can lead to the generation of different rankings for users who have different profiles, as illustrated in FIG. 38b. Obtaining different rankings for different users may involve performing the steps illustrated in FIG. 39, which illustrates steps involved in one embodiment of a method for utilizing profiles of users to compute personalized rankings of experiences based on measurements of affective response of the users. The steps illustrated in FIG. 39 may, in some embodiments, be part of the steps performed by systems modeled according to FIG. 33 and/or FIG. 38a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, a method for utilizing profiles of users to compute personalized rankings of experiences based on measurements of affective response of the users includes the following steps:

In Step 253b, receiving, by a system comprising a processor and memory, measurements of affective response of the users to experiences. That is, each measurement of affective response to an experience, from among the experiences, is a measurement of affective response of a user who had the experience, taken while the user had the experience, or shortly after that time. Optionally, for each experience from among the experiences, the measurements comprise measurements of affective response of at least eight users who had the experience. Optionally, for each experience from among the experiences, the measurements comprise measurements of affective response of at least some other minimal number of users who had the experience, such as measurements of at least five, at least ten, and/or at least fifty different users.

In Step 253c, receiving profiles of at least some of the users who contributed measurements in Step 253b.

In Step 253d, receiving a profile of a certain first user.

In Step 253e, generating a first output indicative of similarities between the profile of the certain first user and the profiles of the at least some of the users. Optionally, the first output is generated by the personalization module 130.

In Step 253f, computing, based on the measurements and the first output, a first ranking of the experiences.

In Step 253h, receiving a profile of a certain second user, which is different from the profile of the certain first user.

In Step 253i, generating a second output indicative of similarities between the profile of the certain second user and the profiles of the at least some of the users. Here the second output is different from the first output. Optionally, the second output is generated by the personalization module 130.

And in Step 253j, computing, based on the measurements and the second output, a second ranking of the experiences. Optionally, the first and second rankings are different, such that in the first ranking, a first experience is ranked above a second experience, and in the second ranking, the second experience is ranked above the first experience.

In one embodiment, the method optionally includes Step 253a that involves utilizing a sensor coupled to a user who had an experience, from among the experiences being ranked, to obtain a measurement of affective response of the user who had the experience. Optionally, the measurement of affective response of the user is based on at least one of the following values: (i) a value acquired by measuring the user with the sensor while the user has the experience, and (ii) a value acquired by measuring the user with the sensor up to one minute after the user had the experience.

In one embodiment, the method may optionally include steps that involve reporting a result based on the ranking of the experiences to a user. In one example, the method may include Step 253g, which involves forwarding to the certain first user a result derived from the first ranking of the experiences. In this example, the result may be a recommendation for the first experience (which for the certain first user is ranked higher than the second experience). In another example, the method may include Step 253k, which involves forwarding to the certain second user a result derived from the second ranking of the experiences. In this example, the result may be a recommendation for the certain second user to have the second experience (which for the certain second user is ranked higher than the first experience).

In one embodiment, generating the first output and/or the second output may involve computing weights based on profile similarity. For example, generating the first output in Step 253e may involve performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 253i may involve similar steps, mutatis mutandis, to the ones described above.

In another embodiment, the first output and/or the second output may involve clustering of profiles. For example, generating the first output in Step 253e may involve performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 253i may involve similar steps, mutatis mutandis, to the ones described above.

In some embodiments, the method may optionally include steps involving recommending one or more of the experiences being ranked to users. Optionally, the type of recommendation given for an experience is based on the rank of the experience. For example, given that in the first ranking, the rank of the first experience is higher than the rank of the second experience, the method may optionally include a step of recommending the first experience to the certain first user in a first manner, and not recommending the second experience to the certain first user in first manner. Optionally, the method includes a step of recommending the second experience to the certain first user in a second manner. Optionally, recommending an experience in the first manner involves providing a stronger recommendation for the experience, compared to a recommendation for the experience that is provided when recommending it in the second manner. The nature of the first and second manners is discussed in more detail with respect to the recommender module 178, which may also provide recommendations in first and second manners.

In some embodiments, rankings computed for experiences may be dynamic, i.e., they may change over time. In one example, rankings may be computed utilizing a "sliding window" approach, and use measurements of affective response that were taken during a certain period of time. In another example, measurements of affective response may be weighted according to the time that has elapsed since they were taken. Such a weighting typically, but not necessarily, involves giving older measurements a smaller weight than more recent measurements when used to compute a score. When rankings of experiences are assumed to change over time, the process of ranking those experiences may be referred to as "dynamically ranking" and/or simply "ranking".

Figure 40A:
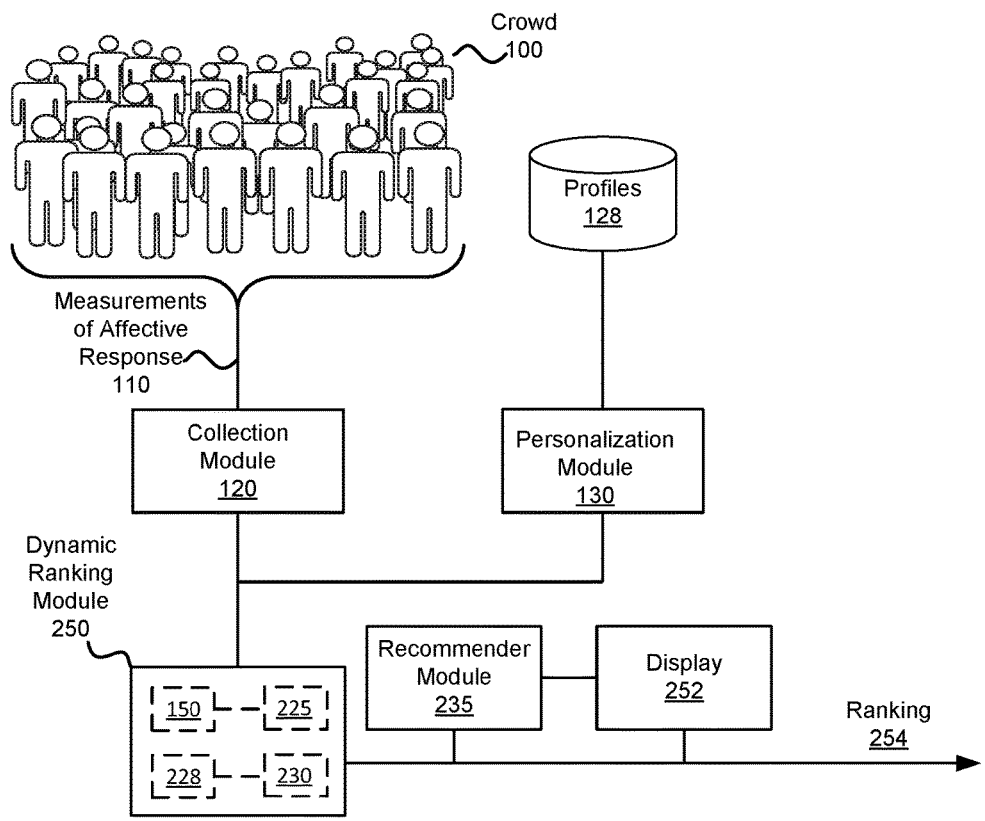
FIG. 40a illustrates a system configured to dynamically rank experiences based on measurements of affective response of users.

FIG. 40a illustrates a system configured to dynamically rank experiences based on measurements of affective response of users. The system includes at least the collection module 120 and the dynamic ranking module 250.

In the illustrated embodiment, the collection module 120 is configured to receive measurements 110 comprising measurements of affective response of the users to experiences. For each experience from among the experiences, the measurements 110 include measurements of at least ten users who had the experience. Optionally, for each experience from among the experiences, the measurements 110 may include measurements of some other minimal number of users, such as at least five different users, or a larger number such as at least fifty different users.

The dynamic ranking module 250 is a ranking module similar to the ranking module 220. It too is configured to generate rankings of the experiences. However, each ranking generated by the dynamic ranking module 250 is assumed to correspond to a time t and is generated based on a subset of the measurements 110 of affective response of the users that comprises measurements taken at a time that is after a certain period before t, but is not after t. That is, if the certain period is denoted $\Delta$, measurements used to generate a ranking corresponding to a time t are taken sometime between the times $t-\Delta$ and t. Optionally, the certain period of time is between one minute and one day. Optionally, the certain period of time is at least one of the following periods of time: one minute, one hour, one day, one week, or one month. Optionally, the measurements used to compute the ranking corresponding to the time t include measurements of at least five different users. Optionally, the measurements used to compute the ranking corresponding to the time t include measurements of a different minimal number of users, such as at least ten different users, or at least fifty different users. Optionally, computing the ranking corresponding to the time t may be done utilizing additional measurements taken earlier than $t-\Delta$. Optionally, when computing a ranking corresponding to the time t, for each experience being ranked, the measurements used to compute the ranking corresponding to the time t include measurements of at least five different users that were taken between t−Δ and t.

Figure 40B:
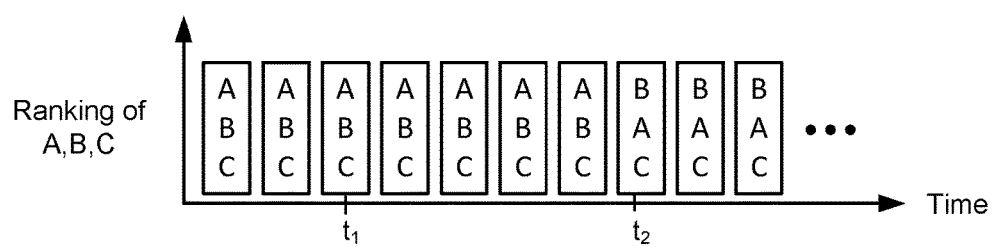
FIG. 40b illustrates an example of dynamic ranking of three experiences.

The dynamic nature of the rankings is manifested in differences in rankings corresponding to different times. For example, the dynamic ranking module 250 generates at least a first ranking corresponding to a first time $t_1$, in which a first experience from among the experiences is ranked above a second experience from among the experiences, and a second ranking corresponding to a second time $t_2$, in which the second experience is ranked above the first experience. In this example, $t_2 > t_1$ and the second ranking is computed based on at least one measurement taken after $t_1$. FIG. 40b illustrates such a scenario where three experiences are ranked, denoted A, B, and C; until the time $t_1$, A is ranked ahead of B and C, but after the time $t_2$, A and B switch ranks, and B is ranked ahead of A.

In order to maintain a dynamic nature of rankings computed by the dynamic ranking module 250, the dynamic ranking module 250 may assign weights to measurements it uses to compute a ranking corresponding to a time t based on how long before the time t the measurements were taken. Typically, this involves giving a higher weight to more recent measurements (i.e., taken closer to the time t). Such a weighting may be done in different ways.

In one embodiment, measurements taken earlier than the first period before the time t are not utilized by the dynamic ranking module 250 to compute the ranking corresponding to t. Doing so emulates a sliding window approach, which filters out measurements that are too old. Weighting of measurements according to this approach is illustrated in FIG. 25a, in which the "window" corresponding to the time t is the period between t and t−Δ. The graph 192a shows that measurements taken within the window have a certain weight, while measurements taken prior to t−Δ, which are not in the window, have a weight of zero.

In another embodiment, the dynamic ranking module 250 is configured to assign weights to measurements used to compute the ranking corresponding to the time t, using a function that decreases with the length of the period since t. Examples of such function may be exponential decay function or other function such as assigning measurements a weight that is proportional to $1/(t-t')$, where t' is the time the measurement was taken. Applying such a decreasing weight means that an average of weights assigned to measurements taken earlier than the first period before t is lower than an average of weights assigned to measurements taken later than the first period before t. Weighting of measurements according to this approach is illustrated in FIG. 25b. The graph 192b illustrates how the weight for measurements decreases as the gap between when the measurements were taken and the time t increases.

In some embodiments, when $t_1$ and $t_2$ denote different times to which rankings correspond, and $t_2$ is after $t_1$, the difference between $t_2$ and $t_1$ may be fixed. In one example, this may happen when rankings of the experiences are generated periodically, after elapsing of a certain period. For example, a new ranking is generated every minute, every ten minutes, every hour, every day, or after every fixed period of a different duration. In other embodiments, the difference between $t_2$ and $t_1$ is not fixed. For example, a new ranking may be generated after a certain condition is met (e.g., after a sufficiently different composition of users who contribute measurements is obtained). In one example, a sufficiently different composition means that the size of the overlap between the set of users who contributed measurements for computing the ranking corresponding $t_1$ and the set of users who contributed measurements for computing the ranking corresponding $t_2$ is less than 90% of the size of either of the sets. In other examples, the overlap may be smaller, such as less than 50%, less than 15%, or less than 5% of the size of either of the sets.

Similar to the ranking module 220, dynamic ranking module 250 may be implemented in different embodiments using different modules in order to utilize either a score-based approach to ranking or a preference-based approach.

In one embodiment, the dynamic ranking module 250 includes a dynamic scoring module 180 configured to compute scores for the plurality of the experiences. Alternatively, it may include scoring module 150. The difference between the two implementations may stem from which module performs a weighting and/or selection of the measurements. If the dynamic ranking module 250 does it, the dynamic ranking module 250 may include scoring module 150, otherwise, the dynamic ranking module 250 may rely on the dynamic scoring module 180 to weight and/or select the measurements based on the time they were taken. Each score computed by either of the scoring modules corresponds to a time t, and is computed based on measurements of at least five users taken at a time that is at most the certain period before t and is not after t. Additionally, the dynamic ranking module 250 includes in this embodiment, the score-based rank determining module 225, which can utilize scores computed by the dynamic scoring module 180 and/or scoring module 150 to rank the experiences. The ranking 254 of the experiences corresponding to the time t, which is generated by the dynamic ranking module 250, is based on a ranking generated by the score-based rank determining module 225.

In another embodiment, the dynamic ranking module 250 may include the preference generator module 228 and the preference-based rank determining module 230. Each preference ranking generated by the preference generator module 228 is based on a subset of the measurements of the users that comprises measurements taken at a time that is at most a certain period before a time t, and comprises a ranking of at least two experiences, such that one of the at least two experiences is ranked ahead of another experience from among the at least two experiences. The preference-based rank determining module 230 ranks the plurality of the experiences based on the plurality of the preference rankings utilizing a method that satisfies the Condorcet criterion. The ranking 254 of the experiences corresponding to the certain time, which is generated by the dynamic ranking module 250, is based on the ranking generated by the preference-based rank determining module 230. The ranking of the experiences by the preference-based rank determining module 230 is such that a certain experience, which in a pair-wise comparison with other experiences is preferred over each of the other experiences, is not ranked below any of the other experiences. Optionally, the certain experience is ranked above at least one of the other experiences. Optionally, the certain experience is ranked above each of the other experiences.

In one embodiment, recommender module 235 is configured to recommend an experience to a user, based on the ranking 254, in a manner that belongs to a set comprising first and second manners. When recommending an experience in the first manner, the recommender module 235 provides a stronger recommendation for the experience, compared to a recommendation for the experience that the recommender module 235 provides when recommending in the second manner.

In some embodiments, a recommendation made by the recommender module 235 and/or the ranking 254 may be presented to a user via display 252 which may be any type of graphical user interface, such as a tablet screen and/or an augmented reality head-mounted display. In one embodiment, the first and second experiences correspond to first and second locations, respectively. For example, the first experience takes place at the first location and the second experience takes place at the second location. Optionally, the display 252 may include the map-displaying module 240, which in one embodiment, is configured to present on a display: a map comprising a description of an environment that comprises the first and second locations, and an annotation overlaid on the map indicating at least one of the following: a first score computed for the first experience, a second score computed for the second experience, a rank of the first experience, a rank of the second experience, an indication of a relative ranking of the first and second experiences, the certain time, the first location, and the second location.

Figure 41:
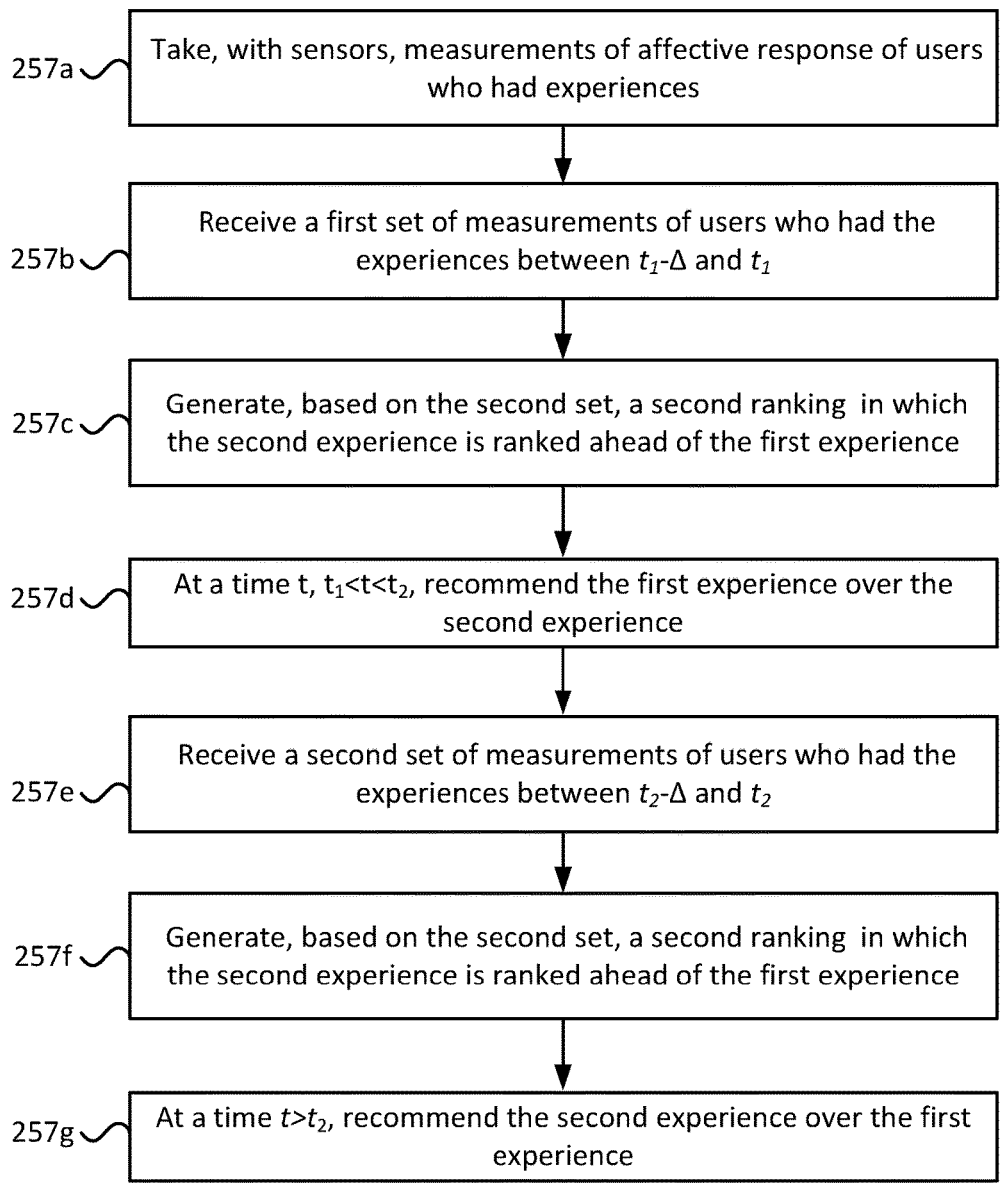
FIG. 41 illustrates steps involved in a method for dynamically ranking experiences based on affective response of users.

FIG. 41 illustrates steps involved in one embodiment of a method for dynamically ranking experiences based on affective response of users. The steps illustrated in FIG. 41 may, in some embodiments, be part of the steps performed by systems modeled according to FIG. 40a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for dynamically ranking experiences based on affective response of users includes at least the following steps:

In Step 257b, receiving, by a system comprising a processor and memory, a first set of measurements of affective response of users to experiences. The experiences include at least a first experience and a second experience. Each measurement belonging to the first set was taken at a time that is not earlier than a certain period before a time $t_1$, and is not after $t_1$. Thus, if the certain period is denoted by $\Delta$, the first set of measurements includes measurements taken sometime between $t_1-\Delta$ and $t_1$. Optionally, the certain period of time is between one minute and one day. Optionally, the certain period of time is at least one of the following periods of time: one minute, one hour, one day, one week, or one month. Optionally, the first set of measurements includes measurements of at least a certain minimal number of different users, where the certain minimal number of different users may be five, ten, fifty, or some other number greater than two.

In Step 257c, generating, based on the first set of measurements, a first ranking of the experiences. In this first ranking, the first experience is ranked ahead of the second experience. Optionally, the first ranking is considered to correspond to the time $t_1$.

In Step 257e, receiving, by the system, a second set of measurements of affective response of users to the experiences. Each measurement belonging to the second set was taken at a time that is not earlier than the certain period before a time $t_2$, and is not after $t_2$. Thus, the second set of measurements includes measurements taken sometime between $t_2-\Delta$ and $t_2$. Additionally, the time $t_2$ is after $t_1$ and the second set of measurements includes at least one measurement of affective response of a user taken after $t_1$. Optionally, the second set of measurements includes measurements of at least a certain minimal number of different users, where the certain minimal number of different users may be five, ten, fifty, or some other number greater than two.

And in Step 257f, generating, based on the second set, a second ranking of the experiences. In this second ranking, the second experience is ranked ahead of the first experience.

In one embodiment, the method optionally includes Step 257a that involves utilizing a sensor coupled to a user who had an experience, from among the experiences being ranked, to obtain a measurement of affective response of the user who had the experience. Optionally, the measurement of affective response of the user is based on at least one of the following values: (i) a value acquired by measuring the user with the sensor while the user has the experience, and (ii) a value acquired by measuring the user with the sensor up to one minute after the user had the experience.

There may be different relationships between a first set of users, which includes the users who contributed measurements to the first set of measurements received in Step 257b, and a second set of users, which includes the users who contributed measurements to the second set of measurements received in Step 257e. Optionally, the first set of users may be the same as the second set of users. Alternatively, the first set of users may be different from the second set of users. In one example, the first set of users may be completely different from the second set of users (i.e., the two sets of users are disjoint). In another example, the first set of users may have some, but not all, of its users in common with the second set of users.

In one embodiment, the method optionally includes Step 257d and/or 257g that involve recommending experiences to a user at different times. Optionally, recommending the experience may be done in a manner belonging to a set that includes first and second manners. As mentioned above with, e.g., with reference to recommender module 235, recommending an experience in the first manner may involve providing a stronger recommendation for the experience, compared to a recommendation for the experience that is provided when recommending it in the second manner.

In Step 257d, at a time t which is between $t_1$ and $t_2$, a recommendation to the user is made based on the first ranking, such that the first experience is recommended in the first manner and the second experience is not recommended in the first manner. Optionally, the Step 257d may also involve recommending the second experience in the second manner.

In step 257g, at a time t that is after $t_2$, a recommendation to the user is made based on the second ranking, such that the second experience is recommended in the first manner and the first experience is not recommended in the first manner. Optionally, the Step 257g may also involve recommending the first experience in the second manner.

As discussed in more detail above, ranking experiences utilizing measurements of affective response may be done in different embodiments, in different ways. In particular, in some embodiments, ranking may be score-based ranking (e.g., performed utilizing the scoring module 150 or the dynamic scoring module 180, and the score-based rank determining module 225), while in other embodiments, ranking may be preference-based ranking (e.g., utilizing the preference generator module 228 and the preference-based rank determining module 230). Therefore, in different embodiments, Steps 257c and/or Step 257f may involve performing different operations, as explained below. The following description involves generating the first ranking (Step 257c), the process for generating the second ranking (Step 257f) is similar (it involves using the second set of measurements instead of the first).

In one embodiment, generating the first ranking of the experiences based on the first set of measurements of affective response in Step 257c includes performing the following operations: (i) for each experience from among the experiences, computing a score based on the first set of measurements, where the first set of measurements include measurements of the at least five users who had the experience, and (ii) ranking the experiences based on the magnitudes of the scores. Optionally, two experiences in this example may be considered tied if a significance of a difference between scores computed for the two experiences is below a threshold. Optionally, determining the significance is done utilizing a statistical test involving the measurements of the users who had the two experiences (e.g., utilizing the score-difference evaluator module 260).

In another embodiment, generating the first ranking of the experiences based on the first set of measurements of affective response in Step 257c includes performing the following operations: generating a plurality of preference rankings for the experiences, and ranking the experiences based on the plurality of the preference rankings utilizing a method that satisfies the Condorcet criterion. Optionally, each preference ranking is generated based on a subset of the second set of measurements, and comprises a ranking of at least two of the experiences, such that one of the at least two experiences is ranked ahead of another experience from among the at least two experiences. As mentioned in further detail in the discussion regarding FIG. 34, ties between experiences may occur and be handled in various ways.

In one embodiment, when computing a ranking of the experiences corresponding to a time t, measurements taken earlier than the certain period before the time t (i.e., taken before t−Δ), are not utilized to compute the ranking corresponding to the time t. In another embodiment, measurements are weighted according to how long before the time t they were taken. Thus, the method may optionally include the following steps: (i) assigning weights to measurements used to generate a ranking corresponding to the time t, such that an average of weights assigned to measurements taken earlier than the certain period before the time t is lower than an average of weights assigned to measurements taken after the certain period before the time t; and (ii) utilizing the weights to generate the ranking corresponding to the time t. For example, the ranking corresponding to the time t may be based on a weighted average of the measurements, and the more recent the measurements (i.e., they are taken at a time close to t), the more they influence the ranking corresponding to t. Additional information regarding possible approaches to weighting of measurements based on the time they were taken is given at least in the discussion regarding FIG. 25a and FIG. 25b.

Figure 42A:
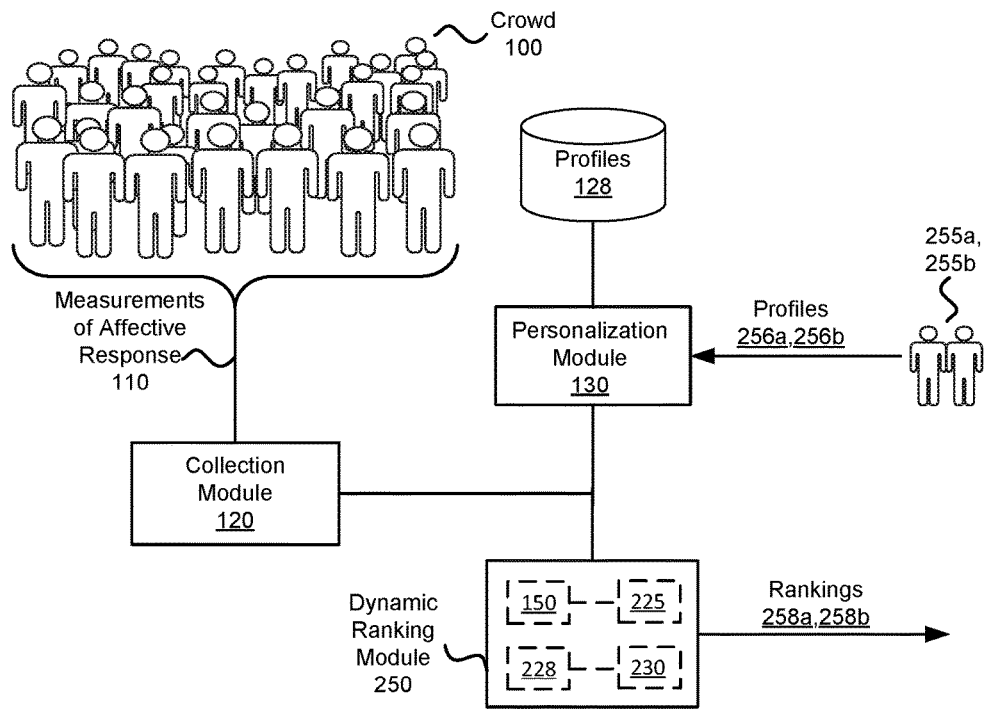
FIG. 42a illustrates a system that generates personalized dynamic rankings of experiences.
Figure 42B:
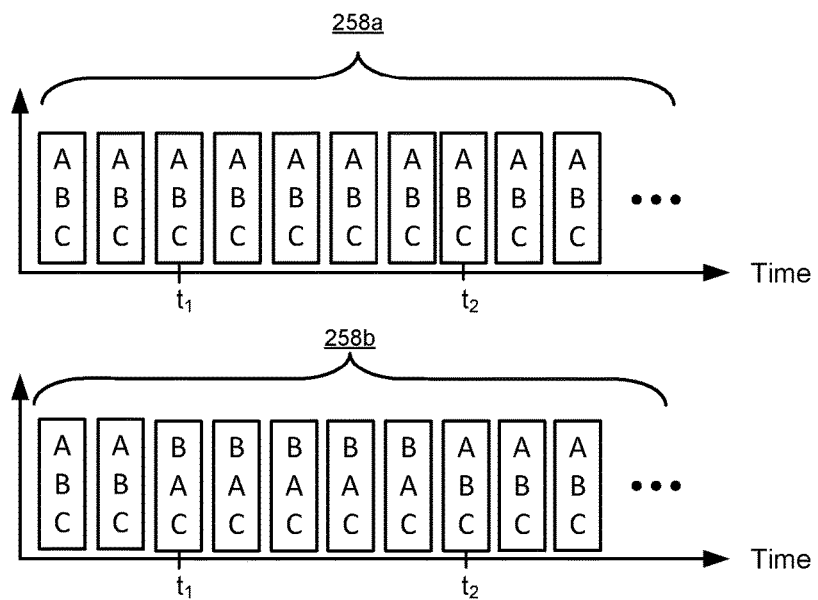
FIG. 42b an example of different dynamic rankings of three experiences, which are personalized for different users.

In some embodiments, personalization module 130 may be utilized to generate personalized dynamic rankings of experiences, as illustrated in FIG. 42a. In these embodiments, the personalization module 130 may generate an output that is based on comparing a profile of a certain user to profiles, from among the profiles 128, of users who contributed measurements to computation of rankings. Utilizing such outputs can lead to it that different users may receive different rankings computed by the dynamic ranking module 250. This is illustrated in the FIG. 42a by rankings a certain first user 255a and a certain second user 255b receive. The certain first user 255a and the certain second user 255b have respective different profiles 256a and 256b. The personalization module 130 generates for them different outputs, which depending on how the dynamic ranking module 250 is implemented, may be utilized by the scoring module 150, the dynamic scoring module 180, and/or the preference generating module 228 in order to compute different scores and/or to generate different preference rankings, respectively. The dynamic ranking module 250 produces rankings 258a for the certain first user, and rankings 258b for the second user, which are different from each other, as illustrated in FIG. 42b. In FIG. 42b, the rankings 258a include a first ranking corresponding to the time $t_1$, in which experience A is ranked above experience B, however in the rankings 258b the ranking corresponding to the time $t_1$ ranks experience B above the experience A.

Figure 43:
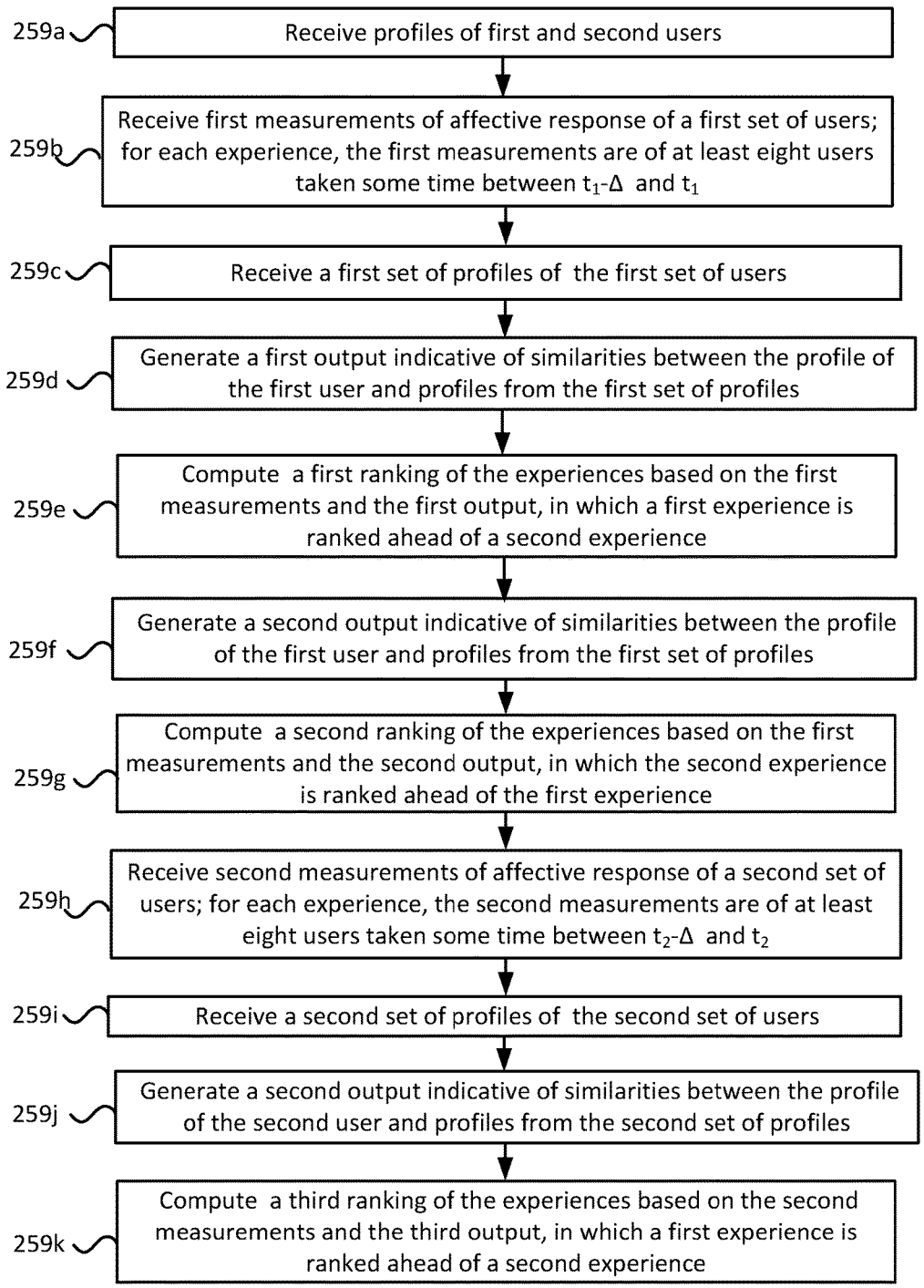
FIG. 43 illustrates steps involved in a method for dynamically generating personal rankings of experiences based on affective response of users.

FIG. 43 illustrates steps involved in one embodiment of a method for dynamically generating personal rankings of experiences based on affective response of users. The steps illustrated in FIG. 43 may, in some embodiments, be part of the steps performed by systems modeled according to FIG. 40a and/or FIG. 42a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for dynamically generating personal rankings of experiences based on affective response of users includes at least the following steps:

In Step 259a, receiving, by a system comprising a processor and memory, a profile of a certain first user and a profile of a certain second user; where the profile of the certain first user is different from the profile of the certain second user.

In Step 259b, receiving first measurements of affective response of a first set of users to experiences comprising first and second experiences. For each experience of the experiences, the first measurements comprise measurements of affective response of at least eight users who had the experience, which were taken between a time $t_1-\Delta$ and $t_1$. Here Δ denotes a certain period of time. Optionally, the certain period of time is between one minute and one day. Optionally, the certain period of time is at least one of the following periods of time: one minute, one hour, one day, one week, or one month. Optionally, for each experience from among the experiences, the first measurements comprise measurements of affective response of at least some other minimal number of users who had the experience, such as measurements of at least five, at least ten, and/or at least fifty different users.

In Step 259c, receiving a first set of profiles comprising profiles of at least some of the users belonging to the first set of users. In one example, the first set of profiles may include at least some of the profiles 128.

In Step 259d, generating a first output indicative of similarities between the profile of the certain first user and profiles belonging to the first set of profiles.

In Step 259e, computing, based on the first measurements and the first output, a first ranking of the experiences. In the first ranking, the first experience is ranked above the second experience. Optionally, the first ranking corresponds to the time $t_1$.

In Step 259f, generating a second output indicative of similarities between the profile of the certain second user and profiles belonging to the first set of profiles. Here, the second output is different from the first output.

In Step 259g, computing, based on the first measurements and the second output, a second ranking of the experiences. In the second ranking the second experience is ranked above the first experience.

In Step 259h, receiving second measurements of affective response of a second set of users to the experiences. For each experience of the experiences, the second measurements comprise measurements of affective response of at least eight users who had the experience, which were taken between a time $t_2-\Delta$ and $t_2$, where the time $t_2$ is after $t_1$. Optionally, for each experience from among the experiences, the second measurements comprise measurements of affective response of at least some other minimal number of users who had the experience, such as measurements of at least five, at least ten, and/or at least fifty different users. Additionally, the second measurements include at least one measurement of affective response taken after $t_1$. Optionally, the second set of users is the same as the first set of users (i.e., both sets contain the same users). Alternatively, the first set of users may be different from the second set of users. In one example, the first set of users has at least some users in common with the second set of users. In another example, the first set of users and the second set of users may not have any users in common.

In Step 259i, receiving a second set of profiles comprising profiles of at least some of the users belonging to the second set of users. Optionally, the second set of profiles is the same as the first set of profiles (e.g., when the first set of users and the second set of users are the same).

In Step 259j, generating a third output indicative of similarities between the profile of the certain second user and profiles belonging to the second set of profiles. Optionally, the third output and the second output are the same (e.g., when the first set of users and the second set of users are the same). Alternatively, the third output and the second output may be different.

And In Step 259k, computing, based on the second measurements and the third output, a third ranking of the experiences. In the third ranking the first experience is ranked above the second experience.

In one embodiment, the method described above includes additional steps involving: (i) generating a fourth output indicative of similarities between the profile of the certain first user and profiles belonging to the second set of profiles, and (ii) computing, based on the second measurements and the fourth output, a fourth ranking of the experiences. In the fourth ranking, the first experience is ranked above the second experience. Optionally, the fourth ranking is computed based on at least one measurement taken after $t_1$.

In one embodiment, the method optionally includes a step that involves utilizing a sensor coupled to a user who had an experience, from among the experiences being ranked, to obtain a measurement of affective response of the user who had the experience. Optionally, the measurement of affective response of the user is based on at least one of the following values: (i) a value acquired by measuring the user with the sensor while the user has the experience, and (ii) a value acquired by measuring the user with the sensor up to one minute after the user had the experience.

In one embodiment, generating the first output and/or the second output may involve computing weights based on profile similarity. For example, generating the first output in Step 259d may involve performing the following steps: (i) computing a first set of similarities between the profile of the certain first user and the profiles of the at least eight users; and (ii) computing, based on the first set of similarities, a first set of weights for the measurements of the at least eight users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 259j may involve similar steps, mutatis mutandis, to the ones described above.

In another embodiment, the first output and/or the second output may involve clustering of profiles. For example, generating the first output in Step 259d may involve performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 259j may involve similar steps, mutatis mutandis, to the ones described above.

Section 3—Experiences describes how different experiences may be characterized by a combination of attributes. Examples of such combinations of attributes include the following characterizations that may be used to characterize an experience: (i) an experience that takes place at a certain location and involves having a certain activity at the certain location, (ii) an experience that takes place at a certain location during a certain period of time, (iii) an experience that takes place at a certain location and lasts for a certain duration, (iv) an experience that involves partaking in a certain activity during a certain period of time, and (v) and experience that involves partaking in a certain activity for a certain duration.

Thus, in some embodiments, when ranking experiences, the experiences being ranking may involve different combinations. For example, a ranking of experiences may indicate which is better: to spend a week in London or a weekend in New York (each experience is characterized by a combination of a certain location and a certain duration). In another example, a ranking of experiences may indicate to which of the following users have a more positive affective response: to an experience involving having a picnic at the park or an experience involving shopping at the mall (each experience in this case is characterized by a location and an activity that takes place at the location).

Figure 48A:
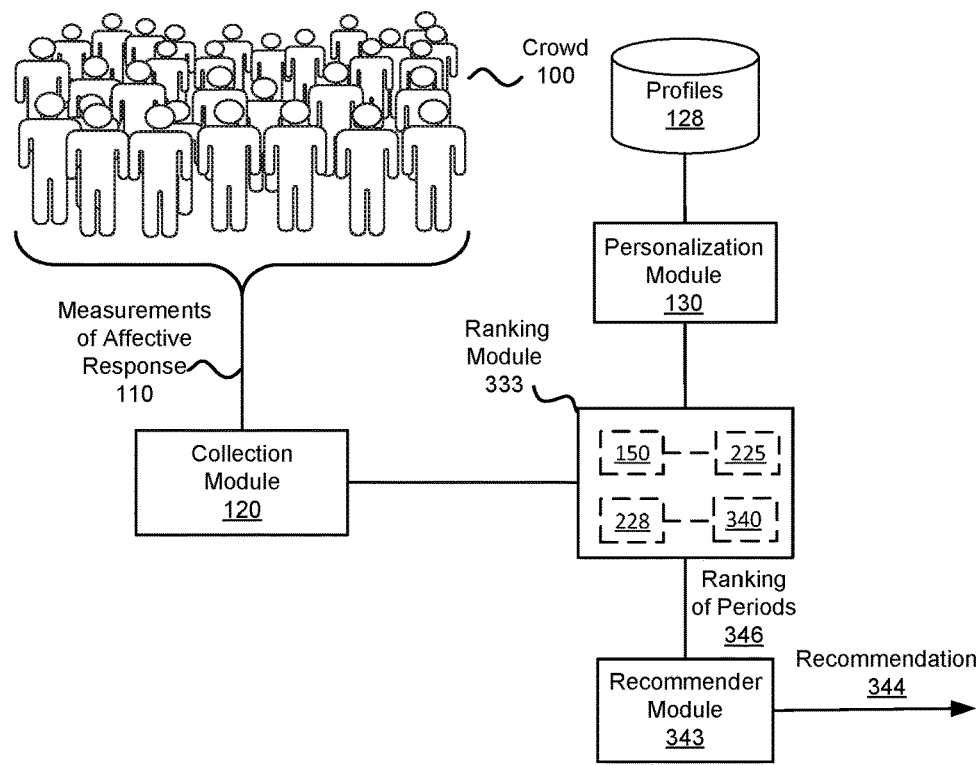
FIG. 48a illustrates a system configured to rank different times at which to have an experience.
Figure 49:
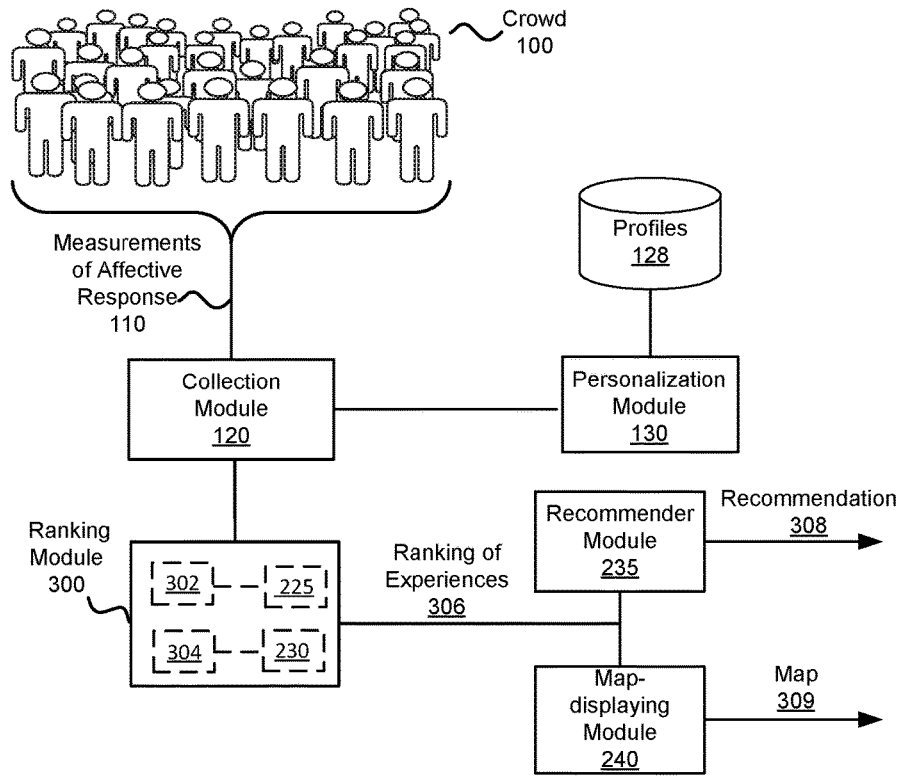
FIG. 49 illustrates a system configured to rank experiences based on aftereffects determined from measurements of affective response of users.
Figure 53:
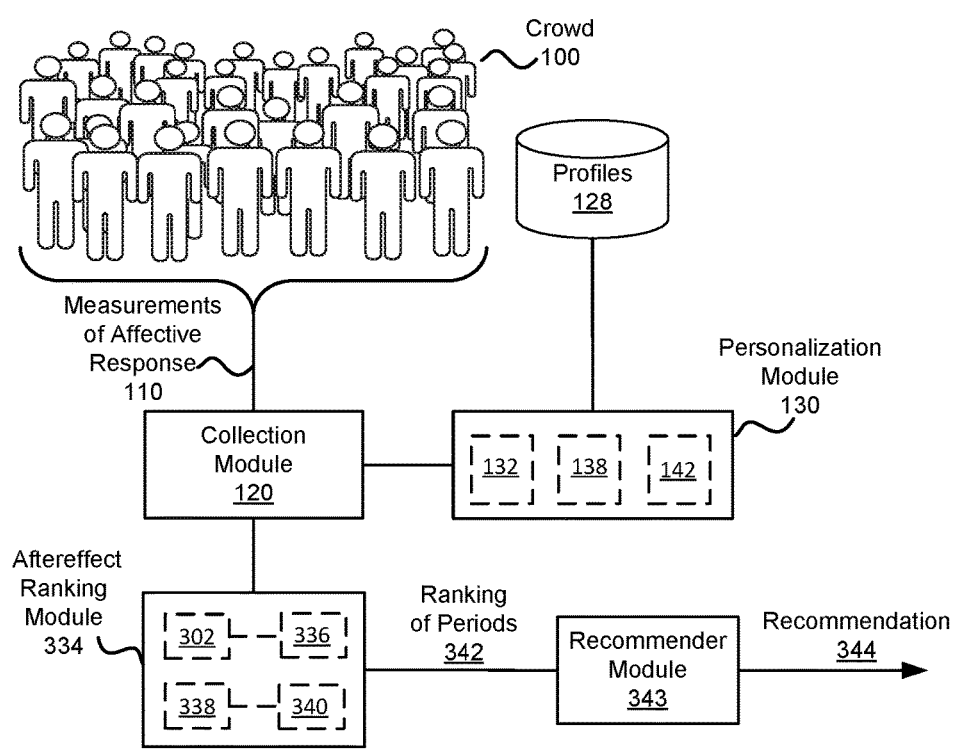
FIG. 53 illustrates a system configured to rank times during which to have an experience based on aftereffects.

Following are examples of embodiments in which experiences are characterized as a combination of different attributes. The experiences described in the following embodiments may represent an "experience" in any of the embodiments in this disclosure that involve generating a crowd-based result for an experience. For example, ranking experiences in any of the embodiments of systems modeled according to FIG. 33, FIG. 38a, FIG. 40a, and/or FIG. 42a may involve ranking of experiences that are characterized by combinations of attributes described in the embodiments below. In a similar fashion, embodiments involving ranking based on aftereffects (e.g., as illustrated in FIG. 49) and/or embodiment involving ranking of periods to have experiences (e.g., as illustrated in FIG. 48a and FIG. 53), may also involve experiences that are characterized by combinations of attributes described in the embodiments below.

Location+Activity. In one embodiment, experiences being ranked include at least a first experience and a second experience; the first experience involves engaging in a first activity at a first location, and the second experience involves engaging in a second activity at a second location. Optionally, the first activity is different from the second activity and the first location is different from the second location. Optionally the first activity and the second activity may each be characterized as involving one or more of the following activities: an exercise activity, a recreational activity, a shopping related activity, a dining related activity, an activity involving viewing a show, resting, playing a game, visiting a location in the physical world, interacting in a virtual environment, and receiving a service.

In this embodiment, the first location and the second location may be characterized as being different according to different criteria. In one example, the first location and second location have different addresses. In another example, the first location and the second location occupy different regions on a map. In yet another example, a user cannot simultaneously be both at the first location and at the second location. Optionally, the first location and the second location are locations that may be characterized as being of one or more of the following types of locations: countries of the world, cities in the world, neighborhoods in cities, private houses, parks, beaches, stadiums, hotels, restaurants, theaters, night clubs, bars, shopping malls, stores, amusement parks, museums, zoos, spas, health clubs, exercise clubs, clinics, and hospitals.

The experiences in this embodiment may sometimes include a third experience that involves engaging in the second activity at the first location. In one example, the first experience involves running in a park, the second experience involves having a picnic at a beach, and the third experience involve having a picnic at the park. Optionally, in a ranking of the experiences, the first experience is ranked higher than the third experience. Consequently, when recommending experiences based on a ranking of the experiences, in the first or second manners (as described above with reference to the recommender module 235), the first experience may be recommend in the first manner, while the third experience is not recommended in the first manner. Optionally, the third experience is recommend in the second manner (which does not involve a strong a recommendation as the first manner). Optionally, the third experience is recommend in the second manner (which does not involve a strong a recommendation as the first manner).

Location+Period. In another embodiment, experiences being ranked include at least a first experience and a second experience; the first experience involves visiting a first location during a first period and the second experience involves visiting a second location during a second period. Optionally, the first location is different from the second location and/or the first period is different from the second period.

In one example, the first location and the second location are each a location that may be of one or more of the following types of locations: cities, neighborhoods, parks, beaches, restaurants, theaters, night clubs, bars, shopping malls, stores, amusement parks, museums, zoos, spas, health clubs, exercise clubs, clinics, and hospitals. In this example, the first and second periods are each a different recurring period of time that corresponds to at least one of the following recurring periods of time: a certain hour during the day, a certain day during the week, a certain day of the month, and a holiday. Thus, for example, the first experience may involve visiting the city zoo during the morning, and the second experience may involve going to an amusement park in the afternoon.

In another example, the first location and the second location are each a location that may of one or more of the following types of locations: continents, countries, cities, parks, beaches, amusement parks, museums, and zoos. In this example, the first and second periods are each a different recurring period of time that corresponds to at least one of the following recurring periods of time: a season of the year, a month of the year, and a certain holiday. Thus, for example, the first experience may involve visiting the Paris in April, and the second experience may involve visiting Rome in April (or during some other month).

The experiences in this embodiment may sometimes include a third experience that involves visiting the first location during the second period. Optionally, in a ranking of the experiences, the first experience is ranked higher than the third experience. Consequently, when recommending experiences based on a ranking of the experiences, in the first or second manners (as described above with reference to the recommender module 235), the first experience may be recommend in the first manner, while the third experience is not recommended in the first manner. Optionally, the third experience is recommend in the second manner (which does not involve a strong a recommendation as the first manner). In one example, the first experience involves visiting a zoo in the morning, the second experience involves visiting a museum in the afternoon, and the third experience involves visiting the zoo during the afternoon.

Location+Duration. In yet another embodiment, experiences being ranked include at least a first experience and a second experience; the first experience involves visiting a first location for a first duration and the second experience involves visiting a second location for a second duration. Optionally, the first location is different from the second location and/or the first duration is different from the second duration. Optionally, the first and second durations correspond to first and second ranges of lengths of time. Optionally, the first and second ranges do not overlap or the overlap between the first and second ranges comprises less than 50% of either of the first and second ranges. Optionally, the first duration is at least 50% longer than the second duration.

In one example, the first location and the second location are each a location that may be of one or more of the following types of locations: cities, neighborhoods, parks, beaches, restaurants, theaters, night clubs, bars, shopping malls, stores, amusement parks, museums, zoos, spas, health clubs, and exercise clubs. In this example, the maximum of the first and second durations may be longer than 5 minutes and shorter than a week.

In another example, the first location and the second location are each a location that may be of one or more of the following types of locations: continents, countries, cities, parks, hotels, cruise ships, and resorts. In this example, the maximum of the first and second durations is between an hour and two months.

The experiences in this embodiment may sometimes include a third experience that involves visiting the first location for the second duration. Optionally, in a ranking of the experiences, the first experience is ranked higher than the third experience. Consequently, when recommending experiences based on a ranking of the experiences, in the first or second manners (as described above with reference to the recommender module 235), the first experience may be recommend in the first manner, while the third experience is not recommended in the first manner. Optionally, the third experience is recommend in the second manner (which does not involve a strong a recommendation as the first manner). In one example, the first experience involves spending one to two hours at a night club, the second experience involves spending two to four hours at a shopping mall, and the third experience involves spending two to four hours at the night club.

15—Additional Ranking Applications

Since in typical real-world scenarios the quality of an experience a user has may involve various uncontrollable factors (e.g., environmental factors and/or influence of other users), the quality of an experience a user may have may change when having the experience at different times. However, in some cases, it may be possible to anticipate these changes in the quality of an experience, since the quality of the experience be affected by a factor that has a periodic, temporal nature. For example, a certain restaurant may be busy on certain days (e.g., during the weekend) and relatively empty during other times (e.g., weekdays). Thus, it may be desired to be able to determine when it is (typically) good time to have a certain experience.

Some aspects of embodiments described herein involve systems, methods, and/or computer-readable media that may be utilized to rank times at which to have an experience during a periodic unit of time. A periodic unit of time is a unit of time that repeats itself regularly. An example of periodic unit of time is a day (a period of 24 hours that repeats itself), a week (a periodic of 7 days that repeats itself, and a year (a period of twelve months that repeats itself). A ranking of the times to have an experience indicates at least one portion of the periodic unit of time that is preferred over another portion of the periodic unit of time during which to have the experience. For example, the ranking may indicate what day of the week is preferable for dining at a restaurant, or what season of the year is preferable for starting CrossFit training.

As discussed in Section 3—Experiences, different experiences may be characterized by a combination of attributes. In particular, the time a user has an experience can be an attribute that characterizes the experience. Thus, in some embodiments, doing the same thing at different times (e.g., being at a location at different times), may be considered different experiences. In particular, in some embodiments, different times at which to have an experience may be evaluated, scored, and/or ranked. This can enable generation of suggestions to users of when to have a certain experience. For example, going on a vacation during a holiday weekend may be less relaxing than going during the week. In another example, a certain area of town may be more pleasant to visit in the evening compared to visiting it in the morning.

In some embodiments, measurements of affective response may be utilized to learn when to have experiences. This may involve ranking different times at which to have an experience. FIG. 48a illustrates a system that may be utilized for this task. The system is configured to rank times during which to have an experience based on measurements of affective response. Optionally, each of the times being ranked corresponds to a certain portion of a periodic unit of time, as explained below. The system includes at least the collection module 120 and a ranking module 333, and may optionally include additional modules such as the personalization module 130 and/or the recommender module 343.

The experience users have at the different times being ranked may be of any of the different types of experiences mentioned in this disclosure such as visiting a location, traveling a route, partaking in an activity, having a social interaction, receiving a service, utilizing a product, consuming a certain segment of digital content, eating certain food, and being in a certain environment, to name a few (additional information about experiences is given in section 3—Experiences).

The collection module 120 receives measurements 110 of affective response. In this embodiment, the measurements 110 include measurements of affective response of at least ten users, where each user has the experience at some time during a periodic unit of time, and a measurement of the user is taken by a sensor coupled to the user while the user has the experience. Optionally, each measurement of affective response of a user who has the experience is based on values acquired by measuring the user with the sensor during at least three different non-overlapping periods while the user has the experience. Additional information regarding sensors that may be used to collect measurements of affective response and/or ways in which the measurements may be taken is given at least in section 1—Sensors and section 2—Measurements of Affective Response.

Herein, a periodic unit of time is a unit of time that repeats itself regularly. In one example, the periodic unit of time is a day, and each of the at least ten users has the experience during a certain hour of the day. In another example, the periodic unit of time is a week, and each of the at least ten users has the experience during a certain day of the week. In still another example, the periodic unit of time is a year, and each of the at least ten users has the experience during a time that is at least one of the following: a certain month of the year, and a certain annual holiday.

The ranking module 333 is configured, in one embodiment, to generate ranking 346 of times during which to have the experience based on measurements from among the measurements 110, which are received from the collection module 120. Optionally, the ranking 346 is such that it indicates that having the experience during a first portion of the periodic unit of time is ranked above having the experience during a second portion of the periodic unit of time. Furthermore, in this embodiment, the measurements received by the ranking module 333 include measurements of at least five users who had the experience during the first portion, and measurements of at least five users who had the experience during the second portion. Optionally, the at least five users who had the experience during the first portion did not have the experience during the second portion, and the at least five users who had the experience during the second portion did not have the experience during the first portion.

In some embodiments, when having the experience during the first portion of the periodic unit of time is ranked above having the experience during the second portion of the periodic unit of time, it typically means that, on average, the measurements of the at least five users who have the experience during the first portion are more positive than measurements of the at least five users who have the experience during the second portion. Additionally or alternatively, when having the experience during the first portion of the periodic unit of time is ranked above having the experience during the second portion of the periodic unit of time, that may indicate that a first score computed based on measurements of the at least five users who had the experience during the first portion is greater than a second score computed based on the measurements of the at least five users who had the experience during the second portion.

In one example, the periodic unit of time is a week, and the first portion corresponds to one of the days of the week (e.g., Tuesday), while the second portion corresponds to another of the days of the week (e.g., Sunday). In this example, the experience may involve visiting an amusement park, so when having the experience during the first portion is ranked above having the experience during the second portion, this means that based on measurements of affective response of users who visited the amusement park, it is better to visit the amusement park on Tuesday, compared to visiting it on Sunday. In another example, the periodic unit of time is a day, the first portion corresponds to the morning hours (e.g., 6 AM to 11 AM) and the second portion corresponds to the afternoon hours (e.g., 4 PM to 7 PM). In this example, the experience may involve taking a stroll on a certain boardwalk, so when having the experience during the first portion is ranked above having the experience during the second portion, this means that based on measurements of affective response of users a morning stroll on the boardwalk is more enjoyable than an afternoon stroll.

In some embodiments, portions of the periodic unit of time that include the times being ranked are of essentially equal length. For example, each portion corresponds to a day of the week (so the ranking of times may amount to ranking days of the week to have a certain experience). In some embodiments, the portions of the periodic unit of time that include the times being ranked may not necessarily have an equal length. For example, one portion may include times that fall within weekdays, while another portion may include times that fall on the weekend. Optionally, in embodiments in which the first and second portions of the periodic unit of time are not of the equal length, the first portion is not longer than the second portion. Optionally, in such a case, the overlap between the first portion and the second portion is less than 50% (i.e., most of the first portion and most of the second portion do not correspond to the same times). Furthermore, in some embodiments, there may be no overlap between the first and second portions of the periodic unit of time.

In embodiments described herein, not all the measurements utilized by the ranking module 333 to generate the ranking 346 are necessarily collected during the same instance of the periodic unit of time. In some embodiments, the measurements utilized by the ranking module 333 to generate the ranking 346 include at least a first measurement and a second measurement such that the first measurement was taken during one instance of the periodic unit of time, and the second measurement was taken during a different instance of the periodic unit of time. For example, if the periodic unit of time is a week, then the first measurement might have been taken during one week (e.g., the first week of August 2016) and the second measurement might have been taken during the following week (e.g., the second week of August 2016). Optionally, the difference between the time the first and second measurements were taken is at least the periodic unit of time.

It is to be noted that the ranking module 333 is configured to rank different times at which to have an experience; with each time being ranked corresponding to a different portion of a periodic unit of time. Since some experiences may be characterized as occurring at a certain period of time (as explained in more detail above), the ranking module 333 may be considered a module that ranks different experiences of a certain type (e.g., involving engaging in the same activity and/or being in the same location, but at different times). Thus, the teachings in this disclosure regarding the ranking module 220 may be relevant, in some embodiments, to the ranking module 333. The use of the different reference numeral (333) is intended to indicate that rankings in these embodiments involve different times at which to have an experience.

The ranking module 333, like the ranking module 220 and other ranking modules described in this disclosure, may utilize various approaches to ranking, such as score-based ranking and/or preference-based ranking, as described below.

In one embodiment, the ranking module 333 is configured to rank the times at which to have the experience using a score-based ranking approach. In this embodiment, the ranking module 333 comprises the scoring module 150, which computes scores for the experience, with each score corresponding to a certain portion of the periodic unit of time. The score corresponding to a certain portion of the periodic unit of time is computed based on the measurements of the at least five users who had the experience during the certain portion of the periodic unit of time. Additionally, in this embodiment, the ranking module 333 comprises score-based rank determining module 336, which is configured to rank portions of the periodic unit of time in which to have the experience based on their respective scores, such that a period with a higher score is ranked ahead of a period with a lower score. In some embodiments, the score-based rank determining module 336 is implemented similarly to the score-based rank determining module 225, which generates a ranking of experiences from scores for any of the various types of experiences described herein (which includes experiences that are characterized by their correspondence to a certain portion of a periodic unit of time).

In another embodiment, the ranking module 333 is configured to rank the times at which to have the experience using a preference-based ranking approach. In this embodiment, the ranking module 333 comprises the preference generator module 228 which is configured to generate a plurality of preference rankings, with each preference ranking being indicative of ranks of at least two portions of the periodic unit of time during which to have the experience. For each preference ranking, at least one portion, of the at least two portions, is ranked above another portion of the at least two portions. Additionally, each preference ranking is determined based on a subset of the measurements 110 comprising a measurement of a first user who has the experience during the one portion of the periodic unit of time, and a measurement of a second user who has the experience during the other portion of the periodic unit of time. Optionally, the first user and the second user are the same user; thus, the preference ranking is based on measurements of the same user taken while the user had the experience at two different times. Optionally, the first user and the second user have similar profiles, as determined based on a comparison performed by the profile comparator 133. Additionally, in this embodiment, the ranking module 333 includes preference-based rank determining module 340 which is configured to rank times to have the experience based on the plurality of the preference rankings utilizing a method that satisfies the Condorcet criterion. The ranking of portions of the periodic unit of time generated by the preference-based rank determining module 340 is such that a certain portion, which in a pair-wise comparison with other portions of the periodic unit of time is preferred over each of the other portions, is not ranked below any of the other portions. Optionally, the certain portion is ranked above each of the other portions. In some embodiments, the preference-based rank determining module 340 is implemented similarly to the preference-based rank determining module 230, which generates a ranking of experiences from preference rankings for any of the various types of experiences described herein (which includes experiences that are characterized by their correspondence to a certain portion of a periodic unit of time).

In one embodiment, the system illustrated in FIG. 48a includes the personalization module 130 which is configured to receive a profile of a certain user and profiles of users belonging to a set comprising at least five users who have the experience during the first portion and at least five users who have the experience during the second portion. Optionally, the profiles of the users belonging to the set are profiles from among the profiles 128. The personalization module 130 is also configured to generate an output indicative of similarities between the profile of the certain user and the profiles of the users from the set of users. In this embodiments, the ranking module 333 is also configured to rank the portions of the periodic unit of time during which to have the experience based on the output.

When generating personalized rankings of times to visit the location (which belong to different portions of the periodic unit of time), not all users have the same ranking generated for them. For at least a certain first user and a certain second user, who have different profiles, the ranking module 333 ranks times to have the experience differently, such that for the certain first user, having the experience during the first portion of the periodic unit of time is ranked above having the experience during the second portion of the periodic unit of time, and for the certain second user, having the experience during the second portion of the periodic unit of time is ranked above having the experience during the first portion of the periodic unit of time. As described elsewhere herein, the output may be indicative of a weighting and/or of a selection of measurements of users that may be utilized to generate a personalized ranking of the times at which to have the experience.

Figure 48B:
FIG. 48b illustrates a user interface that displays a ranking of times to have an experience (when to visit Paris)

In one embodiment, the ranking 346 is provided to recommender module 343 that forwards a recommendation to a user to have the experience in the first portion of the periodic unit of time. FIG. 48b illustrates a user interface which displays the ranking 346 and a recommendation 344 based on the ranking 346. In this illustration, the periodic unit of time is a year, and portions of the periodic unit of time correspond to months in the year. The experience at hand is a visit to Paris, and the recommendation that is illustrated is to visit Paris in April. Thus, based on measurements of tourists who visited Paris during different times of year, the best time to visit Paris is April.

Following is a description of steps that may be performed in a method for ranking times during which to have an experience based on measurements of affective response. The steps described below may, in one embodiment, be part of the steps performed by an embodiment of the system described above (illustrated in FIG. 48a), which is configured to rank times during which to have an experience based on measurements of affective response. In some embodiments, instructions for implementing the method may be stored on a computer-readable medium, which may optionally be a non-transitory computer-readable medium. In response to execution by a system including a processor and memory, the instructions cause the system to perform operations that are part of the method. In one embodiment, the method for ranking times during which to have an experience based on measurements of affective response includes at least the following steps:

In Step 1, receiving, by a system comprising a processor and memory, measurements of affective response of at least ten users. Optionally, each user of the at least ten users, has the experience at some time during a periodic unit of time, and a measurement of the user is taken with sensor coupled to the user while the user has the experience. Optionally, each measurement of affective response of a user is based on values acquired by measuring the user with the user during at least three different non-overlapping periods while the user has the experience.

And in Step 2, ranking times to have the experience based on the measurements, such that, having the experience during a first portion of the periodic unit of time is ranked above having the experience during a second portion of the periodic unit of time. Furthermore, the measurements upon which the times for having the experience are ranked include the following the measurements: measurements of at least five users who had the experience during the first portion, and measurements of at least five users who had the experience during the second portion. Optionally, the at least five users who had the experience during the first portion did not also have the experience during the second portion, and the at least five users who had the experience during the second portion did not also have the experience during the first portion.

In one embodiment, ranking the times to have the experience in Step 2 involves the following: (i) computing scores for the experience corresponding to portions of the periodic unit of time (each score corresponding to a certain portion of the periodic unit of time is computed based on the measurements of the at least five users who had the experience during the certain portion of the periodic unit of time); and (ii) ranking the times to have the experience based on their respective scores.

In one embodiment, ranking the times to have the experience in Step 2 involves the following: (i) generating a plurality of preference rankings (each preference ranking is indicative of ranks of at least two portions of the periodic unit of time during which to have the experience, such that one portion, of the at least two portions, is ranked above another portion of the at least two portions, and the preference ranking is determined based on a subset of the measurements comprising a measurement of a first user who has the experience during the one portion and a measurement of a second user who has the experience during the other portion; and (ii) ranking the times to have the experience based on the plurality of the preference rankings utilizing a method that satisfies the Condorcet criterion. Optionally, for at least some of the preference rankings mentioned above, if not for all of the preference rankings, the first and second users are the same user.

In one embodiment, the method described above may include the following steps involved in generating personalized rankings of times during which to have the experience: (i) receiving a profile of a certain user and profiles of at least some of the users who had the experience; (ii) generating an output indicative of similarities between the profile of the certain user and the profiles of the users; and (iii) ranking the times to have the experience based on the output and the measurements. In this embodiment, not all users necessarily have the same ranking of times generated for them. That is, for at least a certain first user and a certain second user, who have different profiles, times for having the experience are ranked differently, such that for the certain first user, having the experience during the first portion of the periodic unit of time is ranked above having the experience during the second portion of the periodic unit of time, and for the certain second user, having the experience during the second portion of the periodic unit of time is ranked above having the experience during the first portion of the periodic unit of time.

Affective response to an experience may happen while a user has the experience and possibly after it. In some embodiments, the impact of an experience, on the affective response a user that had the experience, may last a certain period of time after the experience; this period of time, in which a user may still feel a residual impact of an experience, may last, depending on the type of experience, hours, days, and even longer. In some embodiments, such a post-experience impact on affective response may be referred to as an "aftereffect" of the experience. For example, an aftereffect of a user to going on a vacation may be how the user feels one week after coming back from the vacation (e.g., was the vacation relaxing and did it enable the user to "recharge batteries"). In another example, an aftereffect of interacting with a service provider reflects how a user feels after the interaction is over (e.g., is the user satisfied or is the user upset even though the service provider is not in sight?). In still another example, an aftereffect of an experience that involves receiving a treatment (e.g., a massage or acupuncture) may represent how a user feels after receiving the treatment (possibly even days after receiving the treatment).

One way in which aftereffects may be determined is by measuring users before and after they finish having an experience, in order to assess how the experience changed their affective response. Such measurements are referred to as prior and subsequent measurements. Optionally, a prior measurement may be taken before having an experience (e.g., before leaving to go on a vacation) and a subsequent measurement is taken after having the experience (e.g., after returning from the vacation). Typically, a difference between a subsequent measurement and a prior measurement, of a user who had an experience, is indicative of an aftereffect of the experience on the user. In the example with the vacation, the aftereffect may indicate how relaxing the vacation was for the user. In some cases, the prior measurement may be taken while the user has the experience.

Aftereffects may be viewed as a certain type of score for experiences. For example, rather than convey how users feel about an experience based on measurements of affective response taken while having an experience, as do many of the scores described in this disclosure, aftereffects convey the residual effect of the experience. However, since aftereffects may be viewed as a type of score for an experience, they may be used in various ways similar to how scores for experiences are used in this disclosure. Thus, aftereffect scores are computed, in some embodiments, from measurements of affective response (e.g., by aftereffect scoring module 302). In another example, parameters of aftereffect functions may are learned from measurements of affective response. In yet another example, experiences may be ranked based on aftereffects associated with having them. Following is a more detailed description of embodiments in which aftereffects of experiences are computed and/or utilized.

In addition to an immediate impact on the affective response of a user that has an experience, having the experience may also have a delayed and/or residual impact on a user that has the experience. For example, going on a vacation can influence how a user feels after returning from it. After having a nice, relaxing vacation a user may feel invigorated and relaxed even days after returning from the vacation. However, if the vacation was not enjoyable, the user may be tense, tired, and/or edgy in the days after returning. In another example, eating a certain type of meal and/or participating in a certain activity (e.g., a certain type of exercise), might impact how a user feels later on. Having knowledge on the residual, delayed influence of an experience can help to determine whether a user should have the experience. Thus, there is a need to be able to evaluate experiences and determine not only their immediate impact on a user's affective response (e.g., the affective response to the experience while a user has the experience), but also the delayed and/or residual impact of the experience (e.g., affective response due to having the experience that the user has after finishing the experience).

Similarly to how scores for experiences may be utilized to rank experiences, aftereffect scores for experiences may also be utilized for ranking the experiences. FIG. 49 illustrates a system configured to rank experiences based on aftereffects determined from measurements of affective response of users. The system includes at least the collection module 120 and an aftereffect ranking module 300. The system may optionally include other modules such as the personalization module 130, recommender module 235, and/or map-displaying module 240.

Embodiments described herein in may involve various types of experiences that may be ranked according to their aftereffects. Some examples of the type of experiences that may be ranked such as a vacation, exercising, receiving a treatment, consuming a certain segment of digital content, eating certain food, and/or being in a certain environment are described in more detail above (in the discussion regarding FIG. 55a). Additional details regarding the various types of experiences that may be ranked according to aftereffects may be found at least in section 3—Experiences in this disclosure.

The collection module 120 is configured to receive the measurements 110 of affective response of users to experiences. In this embodiment, the measurements 110 of affective response comprise, for each experience from among the experiences, prior and subsequent measurements of at least five users who had the experience. Optionally, each prior measurement and/or subsequent measurement of a user comprises at least one of the following: a value representing a physiological signal of the user, and a value representing a behavioral cue of the user.

A prior measurement of a user who had an experience is taken before the user finishes having the experience, and a subsequent measurement of the user who had the experience is taken at least ten minutes after the user finishes having the experience. Optionally, the prior measurement is taken before the user starts having the experience. Optionally, the subsequent measurement is taken less than one day after the user finished having the experience, and before the user starts having an additional experience of the same type.

The prior and subsequent measurements of affective response of users may be taken with sensors coupled to the users. Optionally, each prior measurement of affective response of a user who had an experience is based on values acquired by measuring the user, with a sensor coupled to the user, during at least three different non-overlapping periods before the user finished having the experience. Optionally, each subsequent measurement of affective response of a user who had an experience is based on values acquired by measuring the user with a sensor coupled to the user during at least three different non-overlapping periods, the earliest of which starts at least ten minutes after the user finished having the experience.

The aftereffect ranking module 300 is configured to generate a ranking 306 of the experiences based on measurements received from the collection module 120. Optionally, the ranking 306 does not rank all of the experiences the same. In particular, the ranking 306 includes at least first and second experiences from among the experiences, for which the aftereffect of the first experience is greater than the aftereffect of the second experience; consequently, the first experience is ranked above the second experience in the ranking 306.

In one embodiment, having the first experience being ranked above the second experience is indicative that, on average, a difference between the subsequent measurements and the prior measurements of the at least five users who had the first experience is greater than a difference between the subsequent and the prior measurements of the at least five users who had the second experience. In one example, the greater difference is indicative that the at least five users who had the first experience had a greater change in the level of one or more of the following emotions: happiness, satisfaction, alertness, and/or contentment, compared to the change in the level of the one or more of the emotions in the at least five users who had the second experience.

In another embodiment, having the first experience being ranked above the second experience is indicative that a first aftereffect score computed based on the prior and subsequent measurements of the at least five users who had the first experience is greater than a second aftereffect score computed based on the prior and subsequent measurements of the at least five users who had the second experience. Optionally, an aftereffect score of an experience may be indicative of an increase to the level of one or more of the following emotions in users who had the experience: happiness, satisfaction, alertness, and/or contentment.

In some embodiments, measurements utilized by the aftereffect ranking module 300 to generate a ranking of experiences, such as the ranking 306, may all be taken during a certain period of time. Depending on the embodiment, the certain period of time may span different lengths of time. For example, the certain period may be less than one day long, between one day and one week long, between one week and one month long, between one month and one year long, or more than a year long. Additionally or alternatively, the measurements utilized by the aftereffect ranking module 300 to generate the ranking of the experiences may involve users who had experiences for similar durations. For example, a ranking of vacation destinations based on aftereffects may be based on prior and subsequent measurements of users who stayed at a vacation destination for a certain period (e.g., one week) or for a period that is in a certain range of time (e.g., three to seven days). Additionally or alternatively, the measurements utilized by the aftereffect ranking module 300 to generate the ranking of the experiences may involve prior and subsequent measurements of affective response taken under similar conditions. For example, the prior measurements for all users are taken right before starting to have an experience (e.g., not earlier than 10 minutes before), and the subsequent measurements are taken a certain time after having the experience (e.g., between 45 and 90 minutes after finishing the experience).

It is to be noted that while it is possible, in some embodiments, for the measurements received by modules, such as the aftereffect ranking module 300, to include, for each user from among the users who contributed to the measurements, at least one pair of prior and subsequent measurements of affective response of the user to each experience from among the experiences, this is not necessarily the case in all embodiments. In some embodiments, some users may contribute measurements corresponding to a proper subset of the experiences (e.g., those users may not have had some of the experiences), and thus, the measurements 110 may be lacking measurements of some users to some of the experiences. In some embodiments, some users may have had only one of the experiences being ranked.

The aftereffect ranking module 300, similar to the ranking module 220 and other ranking modules described in this disclosure, may utilize various approaches in order to generate a ranking of experiences. For example, the different approaches to ranking experiences may include score-based ranking and preference-based ranking, which are described in more detail in the description of the ranking module 220. Thus, different implementations of the aftereffect ranking module 300 may comprise different modules to implement the different ranking approaches, as discussed below.

In one embodiment, the aftereffect ranking module 300 is configured to rank experiences using a score-based approach. In this embodiment, the aftereffect ranking module 300 comprises aftereffect scoring module 302, which is configured to compute aftereffect scores for the experiences. An aftereffect score for an experience is computed based on prior and subsequent measurements of the at least five users who had the experience.

It is to be noted that the aftereffect scoring module 302 is a scoring module such as other scoring module in this disclosure (e.g., the scoring module 150). The use of the reference numeral 302 is intended to indicate that scores computed by the aftereffect scoring module 302 represent aftereffects (which may optionally be considered a certain type of emotional response to an experience). However, in some embodiments, the aftereffect scoring module 302 may comprise the same modules as the scoring module 150, and use similar approaches to scoring experiences. In one example, the aftereffect scoring module 302 utilizes modules that perform statistical tests on measurements in order to compute aftereffect scores, such as statistical test module 152 and/or statistical test module 158. In another example, the aftereffect scoring module 302 may utilize arithmetic scorer 162 to compute the aftereffect scores.

In some embodiments, in order to compute an aftereffect score, the aftereffect scoring module 302 may utilize prior measurements of affective response in order to normalize subsequent measurements of affective response. Optionally, a subsequent measurement of affective response of a user (taken after having an experience) may be normalized by treating a corresponding prior measurement of affective response of the user as a baseline value (the prior measurement being taken before finishing the experience). Optionally, a score computed by such normalization of subsequent measurements represents a change in the emotional response due to having the experience to which the prior and subsequent measurements correspond. Optionally, normalization of a subsequent measurement with respect to a prior measurement may be performed by the baseline normalizer 124 or a different module that operates in a similar fashion.

In one embodiment, an aftereffect score for an experience is indicative of an extent of feeling at least one of the following emotions after having the experience: pain, anxiety, annoyance, stress, aggression, aggravation, fear, sadness, drowsiness, apathy, anger, happiness, contentment, calmness, attentiveness, affection, and excitement. Optionally, the aftereffect score is indicative of a magnitude of a change in the level of the at least one of the emotions due to having the experience.

When the aftereffect ranking module 300 includes the aftereffect scoring module 302, it may also include the score-based rank determining module 225, which in this embodiment, is configured to rank the experiences based on their respective aftereffect scores. Optionally, the ranking by the score-based rank determining module 225 is such that an experience with a higher aftereffect score is not ranked lower than an experience with a lower aftereffect score, and the first experience has a higher corresponding aftereffect score than the second experience.

In one embodiment, the aftereffect ranking module 300 is configured to rank experiences using a preference-based approach. In this embodiment, the aftereffect ranking module 300 comprises a preference generator module 304 that is configured to generate a plurality of preference rankings. Each preference ranking is indicative of ranks of at least two of the experiences, such that one experience, of the at least two experiences, is ranked above another experience of the at least two experiences. Additionally, each preference ranking is determined based on a subset comprising at least a pair of prior and subsequent measurements of a user who had the one experience and at least a pair of prior and subsequent measurements of a user who had the other experience. Optionally, a majority of the measurements comprised in each subset of the measurements that is used to generate a preference ranking are prior and subsequent measurements of a single user. Optionally, all of the measurements comprised in each subset of the measurements that is used to generate a preference ranking are prior and subsequent measurements of a single user. Optionally, a majority of the measurements comprised in each subset of the measurements that is used to generate a preference ranking are prior and subsequent measurements of similar users as determined based on an output of the profile comparator 133.

It is to be noted that the preference generator 304 operates in a similar fashion to other preference generator modules in this disclosure (e.g., the preference generator module 228). The use of the reference numeral 304 is intended to indicate that a preference ranking of experiences is generated based on prior and subsequent measurements. However, in some embodiments, the preference generator 304 generates preference rankings similar to the way they are generated by the preference generator module 228. In particular, in some embodiments, a pair of measurements (e.g., a prior and subsequent measurement of the same user taken before and after having an experience, respectively), may be used generate a normalized value, as explained above with reference to aftereffect scoring module 302. Thus, in some embodiments, the preference generator 304 may operate similarly to the preference generator module 228, with the addition of a step involving generating normalized values (representing the aftereffect of an experience) based on prior and subsequent measurements.

In one embodiment, if in a preference ranking, one experience is ranked ahead of another experience, this means that based on a first pair comprising prior and subsequent measurements taken with respect to the one experience, and a second pair comprising prior and subsequent measurements taken with respect to the other experience, the difference between the subsequent and prior measurement of the first pair is greater than the difference between the subsequent and prior measurement of the second pair. Thus, for example, if the first and second pairs consist measurements of the same user, the preference ranking reflects the fact that the one experience had a more positive effect on the emotional state of the user than the other experience had.

When the aftereffect ranking module 300 includes the preference generator module 304, it may also include the preference-based rank determining module 230, which, in one embodiment, is configured to rank the experiences based on the plurality of the preference rankings utilizing a method that satisfies the Condorcet criterion. The ranking of experiences by the preference-based rank determining module 230 is such that a certain experience, which in a pair-wise comparison with other experiences is preferred over each of the other experiences, is not ranked below any of the other experiences. Optionally, the certain experience is ranked above at least one of the other experiences. Optionally, the certain experience is ranked above each of the other experiences.

In one embodiment, the recommender module 235 may utilize the ranking 306 to make recommendation 308 in which the first experience is recommended in a first manner (which involves a stronger recommendation than a recommendation made by the recommender module 235 when making a recommendation in the second manner). Additional discussion regarding recommendations in the first and second manners may be found at least in the discussion about recommender module 178 in section 8—Crowd-Based Applications; recommender module 235 may employ first and second manners of recommendation in a similar way to how the recommender module 178 recommends in those manners.

In one embodiment, the first and second experiences correspond to first and second locations. For example, the first and second experiences involve visiting the first and second locations, respectively. In this embodiment, the map-displaying module 240 is configured to present a result obtained from the ranking 306 on a map that includes annotations of the first and second locations, and an indication that the first location has a higher aftereffect score than the second location.

In some embodiments, the personalization module 130 may be utilized in order to generate personalized rankings of experiences based on their aftereffects. Utilization of the personalization module 130 in these embodiments may be similar to how it is utilized for generating personalized rankings of experience, which is discussed in greater detail with respect to the ranking module 220. For example, personalization module 130 may be utilized to generate an output that is indicative of a weighting and/or selection of the prior and subsequent measurements based on profile similarity.

Figure 51A:
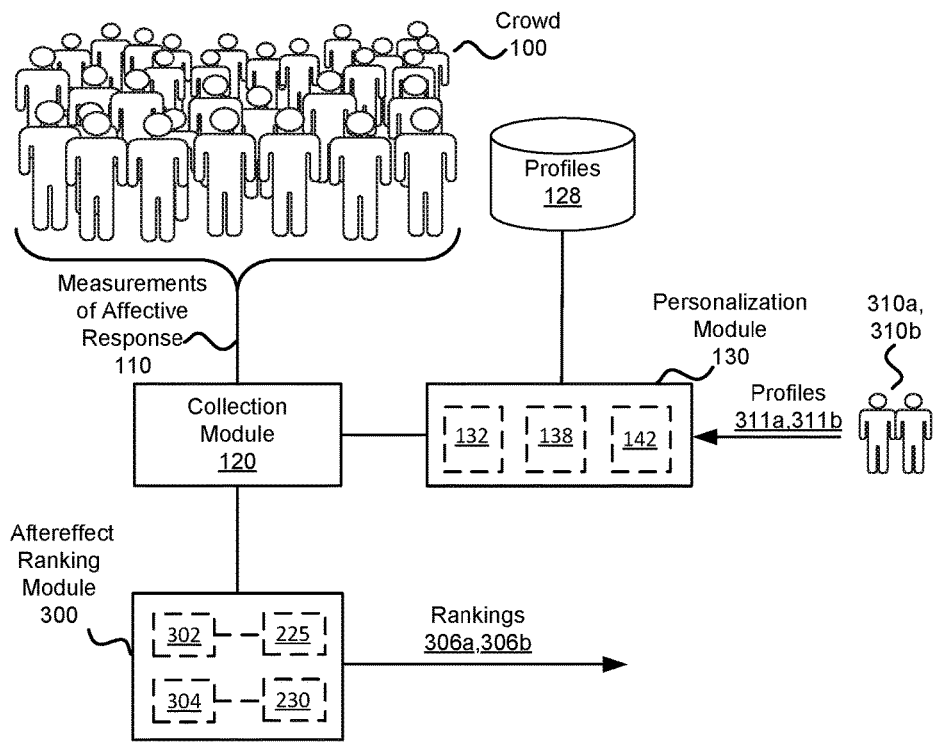
FIG. 51a illustrates a system that generates personalized rankings of experiences based on aftereffects.
Figure 51B:
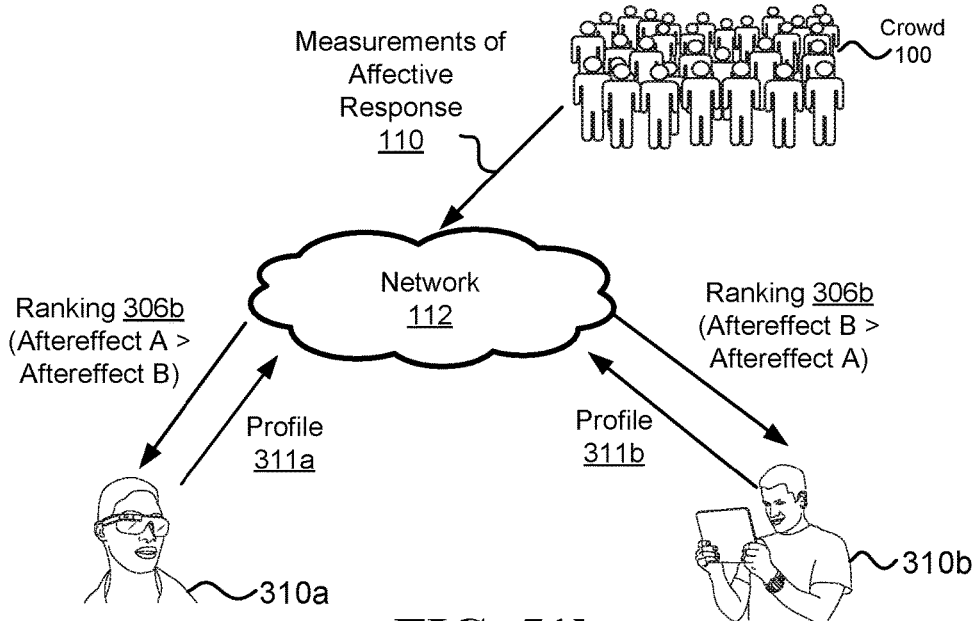
FIG. 51b illustrate an example of dynamic rankings of experiences, which are based on aftereffects and personalized for different users.

FIG. 51*a* and FIG. 51*b* illustrate how the output generated by the personalization module, when it receives profiles of certain users, can enable the system illustrated in FIG. 49 to produce different rankings for different users. A certain first user 310*a* and a certain second user 310*b* have corresponding profiles 311*a* and 311*b*, which are different from each other. The personalization module 130 produces different outputs based on the profiles 311*a* and 311*b*. Consequently, the aftereffect ranking module 300 generates different rankings 306*a* and 306*b* for the certain first user 310*a* and the certain second user 310*b*, respectively. Optionally, in the ranking 306*a*, the first experience (A) has a higher aftereffect than the second experience (B), and in the ranking 306*b*, it is the other way around.

Figure 50:
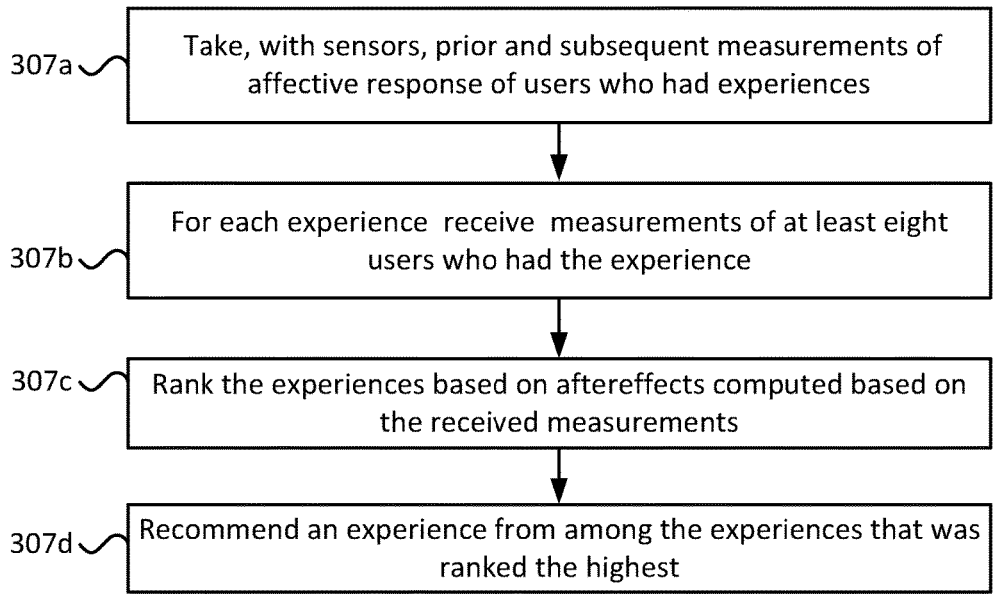
FIG. 50 illustrates steps involved in a method for ranking experiences based on aftereffects determined from measurements of affective response of users.

FIG. 50 illustrates steps involved in one embodiment of a method for ranking experiences based on aftereffects determined from measurements of affective response of users. The steps illustrated in FIG. 50 may be used, in some embodiments, by systems modeled according to FIG. 49. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for ranking experiences based on aftereffects determined from measurements of affective response of users includes at least the following steps:

In Step 307b, receiving, by a system comprising a processor and memory, the measurements of affective response of the users to the experiences. Optionally, for each experience from among the experiences, the measurements include prior and subsequent measurements of at least five users who had the experience. Optionally, each prior measurement and/or subsequent measurement of a user comprises at least one of the following: a value representing a physiological signal of the user, and a value representing a behavioral cue of the user. Optionally, the measurements received in Step 307b are received by the collection module 120.

And in Step 307c, ranking the experiences based on the measurements. Optionally, ranking the experiences is performed by the aftereffect ranking module 300. Optionally, the experiences being ranked includes at least first and second experiences; the aftereffect of the first experience is greater than the aftereffect of the second experience, and consequently, the first experience is ranked above the second experience in the ranking.

In one embodiment, the method optionally includes Step 307a that involves utilizing a sensor coupled to a user who had an experience, from among the experiences being ranked, to obtain a prior measurement of affective response of the user who had the experience and/or a subsequent measurement of affective response of the user who had the experience.

In one embodiment, the method optionally includes Step 307d that involves recommending the first experience to a user in a first manner, and not recommending the second experience to the user in the first manner. Optionally, the Step 307d may further involve recommending the second experience to the user in a second manner. As mentioned above, e.g., with reference to recommender module 235, recommending an experience in the first manner may involve providing a stronger recommendation for the experience, compared to a recommendation for the experience that is provided when recommending it in the second manner.

As discussed in more detail above, ranking experiences utilizing measurements of affective response may be done in different embodiments, in different ways. In particular, in some embodiments, ranking may be score-based ranking (e.g., performed utilizing the aftereffect scoring module 302 and the score-based rank determining module 225), while in other embodiments, ranking may be preference-based ranking (e.g., utilizing the preference generator module 304 and the preference-based rank determining module 230). Therefore, in different embodiments, Step 307c may involve performing different operations.

In one embodiment, ranking the experiences based on the measurements in Step 307c includes performing the following operations: for each experience from among the experiences being ranked, computing an aftereffect score based on prior and subsequent measurements of the at least five users who had the experience, and ranking the experiences based on the magnitudes of the aftereffect scores. Optionally, two experiences in this embodiment may be considered tied if a significance of a difference between aftereffect scores computed for the two experiences is below a threshold. Optionally, determining the significance is done utilizing a statistical test involving the measurements of the users who had the two experiences (e.g., utilizing the score-difference evaluator module 260).

In another embodiment, ranking the experiences based on the measurements in Step 307c includes performing the following operations: generating a plurality of preference rankings for the experiences based on prior and subsequent measurements (as explained above), and ranking the experiences based on the plurality of the preference rankings utilizing a method that satisfies the Condorcet criterion. Optionally, each preference ranking is generated based on a subset comprising prior and subsequent measurements, and comprises a ranking of at least two of the experiences, such that one of the at least two experiences is ranked ahead of another experience from among the at least two experiences.

A ranking of experiences generated by a method illustrated in FIG. 50 may be personalized for a certain user. In such a case, the method may include the following steps: (i) receiving a profile of a certain user and profiles of at least some of the users (who contributed measurements used for ranking the experiences); (ii) generating an output indicative of similarities between the profile of the certain user and the profiles; and (iii) ranking the experiences based on the measurements received in Step 307b and the output. Optionally, the output is generated utilizing the personalization module 130. Depending on the type of personalization approach used and/or the type of ranking approach used, the output may be utilized in various ways to perform a ranking of the experiences, as discussed in further detail above. Optionally, for at least a certain first user and a certain second user, who have different profiles, third and fourth experiences, from among the experiences, are ranked differently, such that for the certain first user, the third experience is ranked above the fourth experience, and for the certain second user, the fourth experience is ranked above the third experience.

Figure 52:
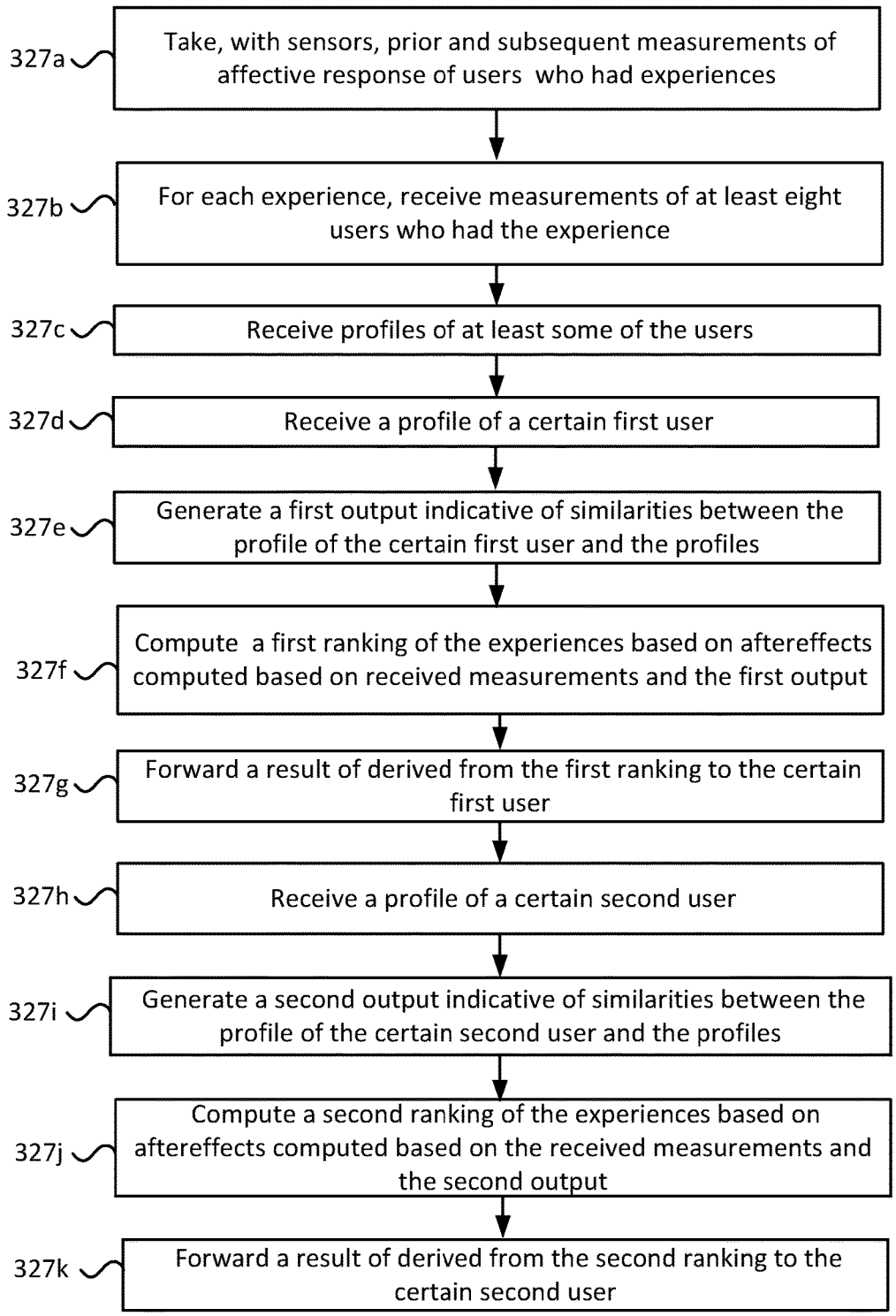
FIG. 52 illustrates steps involved in a method for utilizing profiles of users for computing personalized rankings of experiences based on aftereffects determined from measurements of affective response of the users.

Personalization of rankings of experiences based on aftereffects, as described above, can lead to the generation of different rankings for users who have different profiles, as illustrated in FIG. 51b. Obtaining different rankings for different users may involve performing the steps illustrated in FIG. 52, which describes how steps carried out when computing crowd-based rankings can lead to different users receiving the different rankings. The steps illustrated in FIG. 52 may, in some embodiments, be part of the steps performed by systems modeled according to FIG. 49 and/or FIG. 51a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for utilizing profiles of users for computing personalized rankings of experiences, based on aftereffects determined from measurements of affective response of the users, includes the following steps:

In Step 327b, receiving, by a system comprising a processor and memory, measurements of affective response of the users to experiences. The measurements received in this step include, for each experience from among the experiences, prior and subsequent measurements of at least five users who had the experience. Optionally, a prior measurement of a user is taken before the user finishes having the experience, and a subsequent measurement of the user is taken at least ten minutes after the user finished having the experience. Optionally, for each experience from among the experiences, the measurements received in this step comprise prior and subsequent measurements of affective response of at least some other minimal number of users who had the experience, such as measurements of at least five, at least ten, and/or at least fifty different users.

In Step 327c, receiving profiles of at least some of the users who contributed measurements in Step 327b. Optionally, profiles received in this step are from among the profiles 128.

In Step 327d, receiving a profile of a certain first user.

In Step 327e, generating a first output indicative of similarities between the profile of the certain first user and the profiles of the at least some of the users. Optionally, the first output is generated by the personalization module 130.

In Step 327f, computing, based on the measurements and the first output, a first ranking of the experiences. Optionally, the first ranking reflects aftereffects of the experiences. In one example, in the first ranking, a first experience is ranked ahead of a second experience. Optionally, the ranking of the first experience ahead of the second experience indicates that for the certain first user, an aftereffect of the first experience is greater than an aftereffect of the second experience. Optionally, computing the first ranking in this step is done by the aftereffect ranking module 300.

In Step 327h, receiving a profile of a certain second user, which is different from the profile of the certain first user.

In Step 327i, generating a second output indicative of similarities between the profile of the certain second user and the profiles of the at least some of the users. Here, the second output is different from the first output. Optionally, the second output is generated by the personalization module 130.

And in Step 327j, computing, based on the measurements and the second output, a second ranking of the experiences. Optionally, the second ranking reflects aftereffects of the experiences. In one example, the first and second rankings are different, such that in the second ranking, the second experience is ranked above the first experience. Optionally, the ranking of the second experience ahead of the first experience indicates that for the certain second user, an aftereffect of the second experience is greater than an aftereffect of the first experience. Optionally, computing the second ranking in this step is done by the aftereffect ranking module 300.

In one embodiment, the method optionally includes Step 327a that involves utilizing a sensor coupled to a user who had an experience, from among the experiences being ranked, to obtain a prior measurement of affective response of the user who had the experience and/or a subsequent measurement of affective response of the user who had the experience. Optionally, obtaining a prior measurement of affective response of a user who had an experience is done by measuring the user with the sensor during at least three different non-overlapping periods before the user finishes having the experience (and in some embodiments before the user starts having the experience). Optionally, obtaining the subsequent measurement of affective response of a user who had an experience is done by measuring the user with the sensor during at least three different non-overlapping periods at least ten minutes after the user had the experience.

In one embodiment, the method may optionally include steps that involve reporting a result based on the ranking of the experiences to a user. In one example, the method may include Step 327g, which involves forwarding to the certain first user a result derived from the first ranking of the experiences. In this example, the result may be a recommendation to have the first experience (which for the certain first user is ranked higher than the second experience). In another example, the method may include Step 327k, which involves forwarding to the certain second user a result derived from the second ranking of the experiences. In this example, the result may be a recommendation for the certain second user to have the second experience (which for the certain second user is ranked higher than the first experience).

In one embodiment, generating the first output and/or the second output may involve computing weights based on profile similarity. For example, generating the first output in Step 327e may involve performing the following steps: (i) computing a first set of similarities between the profile of the certain first user and the profiles of the at least eight users; and (ii) computing, based on the first set of similarities, a first set of weights for the measurements of the at least eight users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 327i may involve similar steps, mutatis mutandis, to the ones described above.

In another embodiment, the first output and/or the second output may involve clustering of profiles. For example, generating the first output in Step 327e may involve performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least eight users, who is not a member of any of the clusters in the subset; and (iii) selecting at least eight users from among the users belonging to clusters in the subset. Here, the first output is indicative of the identities of the at least eight users. Generating the second output in Step 327i may involve similar steps, mutatis mutandis, to the ones described above.

In some embodiments, the method may optionally include steps involving recommending one or more of the experiences being ranked to users. Optionally, the type of recommendation given for an experience is based on the rank of the experience. For example, given that in the first ranking, the rank of the first experience is higher than the rank of the second experience, the method may optionally include a step of recommending the first experience to the certain first user in a first manner, and not recommending the second experience to the certain first user in first manner. Optionally, the method includes a step of recommending the second experience to the certain first user in a second manner. Optionally, recommending an experience in the first manner involves providing a stronger recommendation for the experience, compared to a recommendation for the experience that is provided when recommending it in the second manner. The nature of the first and second manners is discussed in more detail with respect to the recommender module 178, which may also provide recommendations in first and second manners.

As discussed herein, an experience may have residual effects on a user (referred to as aftereffect). For example, going on a vacation may be a reinvigorating experience, with effects such as increased happiness and reduced anxiety that last even after the vacation is over. In another example, participating in an activity such as exercise or meditation may have a calming and/or relaxing effect for the rest of the day. However, in some cases, the aftereffect of an experience may vary depending on when a user has an experience. For example, vacations at a certain destination may be more invigorating when the destination is visited during certain times of the year and/or performing certain exercises may be more beneficial to a user's post-exercise mood if performed at certain times during the day. Thus, it may be desired to be able to determine when it is (typically) good time to have a certain experience in order to increase the aftereffect of the experience.

Some aspects of embodiments described herein involve systems, methods, and/or computer-readable media that may be utilized to rank different times, at which to have an experience during a periodic unit of time, based on aftereffects corresponding to the different times. A periodic unit of time is a unit of time that repeats itself regularly. An example of periodic unit of time is a day (a period of 24 hours that repeats itself), a week (a periodic of 7 days that repeats itself, and a year (a period of twelve months that repeats itself). A ranking of the times to have an experience indicates at least one portion of the periodic unit of time that is preferred over another portion of the periodic unit of time during which to have the experience, since the aftereffect when having the experience during the first portion is greater than when having the experience during the second portion. For example, the ranking may indicate what month is preferable for having a vacation, since upon returning from the vacation, a user is more relaxed compared to going to the same destination at other times.

As discussed in Section 3—Experiences, different experiences may be characterized by a combination of attributes. In particular, the time a user has an experience can be an attribute that characterizes the experience. Thus, in some embodiments, doing the same thing at different times (e.g., being at a location at different times), may be considered different experiences. In particular, in some embodiments, different times at which to have an experience may be evaluated, scored, and/or ranked according to aftereffects associated with having the experience at the different times. In some embodiments, measurements of affective response may be utilized to learn when to have experiences in order to increase an aftereffect associated with having the experiences. This may involve ranking different times at which to have an experience. FIG. 53 illustrates a system that may be utilized for this task. The system is configured to rank times during which to have an experience based on aftereffect computed from measurements of affective response. Optionally, each of the times being ranked corresponds to a certain portion of a periodic unit of time, as explained below. The system includes at least the collection module 120 and a ranking module 334, and may optionally include additional modules such as the personalization module 130 and/or the recommender module 343.

The experience involved in the illustrated embodiment (i.e., the experience which the users have at different times), may be of any of the different types of experiences mentioned in this disclosure such as visiting a location, traveling a route, partaking in an activity, having a social interaction, receiving a service, utilizing a product, and being in a certain environment, consuming a certain segment of digital content, eating certain food, to name a few (additional information about experiences is given in section 3—Experiences).

The collection module 120 receives measurements 110 of affective response. In this embodiment, the measurements 110 include prior and subsequent measurements of affective response of at least ten users, where each user has the experience at some time during a periodic unit of time. A prior measurement is taken before the user finishes having the experience, and a subsequent measurement taken at least ten minutes after the user finishes having the experience. Optionally, the prior measurement is taken before the user starts having the experience. Optionally, a difference between a subsequent measurement and a prior measurement of a user who had the experience is indicative of an aftereffect of the experience on the user. In this embodiment, measurements 110 comprise prior and subsequent measurements of at least five users who have the experience during a first portion of the periodic unit of time and prior and subsequent measurements of at least five users who have the experience during a second portion of the periodic unit of time that is different from the first period. Optionally, the at least five users who have the experience during the first portion do not also have the experience during the second portion, and the at least five users who have the experience during the second portion do not also have the experience during the first portion.

Herein, a periodic unit of time is a unit of time that repeats itself regularly. In one example, the periodic unit of time is a day, and each of the at least ten users has the experience during a certain hour of the day (e.g., the first portion may correspond to the morning hours and the second portion may correspond to the afternoon hours). In another example, the periodic unit of time is a week, and each of the at least ten users has the experience during a certain day of the week. In still another example, the periodic unit of time is a year, and each of the at least ten users has the experience during a time that is at least one of the following: a certain month of the year, and a certain annual holiday.

A prior measurement of a user who had an experience is taken before the user finishes having the experience, and a subsequent measurement of the user who had the experience is taken at least ten minutes after the user finishes having the experience. Optionally, the prior measurement is taken before the user starts having the experience. Optionally, the subsequent measurement is taken less than one day after the user finished having the experience, and before the user starts having an additional experience of the same type.

The prior and subsequent measurements of affective response of user may be taken with sensors coupled to the users. Optionally, each prior measurement of affective response of a user who had an experience is based on values acquired by measuring the user with a sensor coupled to the user during at least three different non-overlapping periods before the user finished having the experience. Optionally, each subsequent measurement of affective response of a user who had an experience is based on values acquired by measuring the user with a sensor coupled to the user during at least three different non-overlapping periods, the earliest of which starts at least ten minutes after the user finished having the experience.

The aftereffect ranking module 334 is configured, in one embodiment, to generate ranking 342 of portions of the periodic unit of time during which to have the experience based on aftereffects indicated by measurements from among the measurements 110 which are received from the collection module 120. Optionally, the ranking 342 is such that it indicates that having the experience during the first portion of the periodic unit of time is ranked above having the experience during the second portion of the periodic unit of time.

Having one portion of the periodic unit of time ranked above another portion of the periodic unit of time may indicate various things. In one example, having the experience during the first portion of the periodic unit of time being ranked above having the experience during the second portion of the periodic unit of time is indicative that, on average, a difference between the subsequent measurements and the prior measurements of the at least five users who have the experience during the first portion is greater than a difference between the subsequent and the prior measurements of the at least five users who have the experience during the second portion. In another example, having the experience during the first portion of the periodic unit of time being ranked above having the experience during the second portion of the periodic unit of time is indicative that, a first aftereffect score computed based on the prior and subsequent measurements of the at least five users who have the experience during the first portion is greater than a second aftereffect score computed based on the prior and subsequent measurements of the at least five users who have the experience during the second portion. In yet another example, when having the experience during the first portion is ranked above having the experience during the second portion, this indicates that the aftereffect associated with having the experience during the first portion is more positive and/or lasts longer than the aftereffect associated with having the experience during the second portion.

In one example, the periodic unit of time is a week, and the first portion corresponds to one of the days of the week (e.g., Tuesday), while the second portion corresponds to another of the days of the week (e.g., Sunday). In this example, the experience may involve talking a walk in a park, so when having the experience during the first portion is ranked above having the experience during the second portion, this means that based on measurements of affective response of users who took walks in the park, users who took a walk in the park on Tuesday were more relaxed in the hours after the walk compared to users who took the walk on Sunday. Perhaps the difference in the aftereffects associated with the different times may be ascribed to the park being very busy on Sundays, while it is quite empty on weekdays.

In another example, the periodic unit of time is a year, the first portion corresponds to springtime and the second portion corresponds to summertime. In this example, the experience may involve having a vacation at a certain resort. So when having the experience during the first portion is ranked above having the experience during the second portion, this means that based on measurements of affective response of users who took the vacation, upon returning from the vacation, users who were at the certain resort during the spring were more invigorated, calm, and/or happy than users who were at the certain resort during the summer. Possibly, the difference in the aftereffects in this example may be attributed to the summer months being extremely hot and the certain resort is very crowded at that time; consequently, going on a vacation to the certain resort at that time may not be such a pleasant experience which helps one return reinvigorated from the vacation.

In some embodiments, the portions of the periodic unit of time that include the times being ranked are of essentially equal length. For example, each portion corresponds to a day of the week (so the ranking of times may amount to ranking days of the week to have a certain experience). In some embodiments, the portions of the periodic unit of time that include the times being ranked may not necessarily have an equal length. For example, one portion may include times that fall within weekdays, while another portion may include times that fall on the weekend. Optionally, in embodiments in which the first and second portions of the periodic unit of time are not of the equal length, the first portion is not longer than the second portion. Optionally, in such a case, the overlap between the first portion and the second portion is less than 50% (i.e., most of the first portion and most of the second portion do not correspond to the same times). Furthermore, in some embodiments, there may be no overlap between the first and second portions of the periodic unit of time.

In embodiments described herein, not all the measurements utilized by the aftereffect ranking module 334 to generate the ranking 342 are necessarily collected during the same instance of the periodic unit of time. In some embodiments, the measurements utilized by the aftereffect ranking module 334 to generate the ranking 342 include at least a first measurement and a second measurement such that the first measurement was taken during one instance of the periodic unit of time and the second measurement was taken during a different instance of the periodic unit of time. For example, if the periodic unit of time is a week, then the first measurement might have been taken during one week (e.g., the first week of August 2016) and the second measurement might have been taken during the following week (e.g., the second week of August 2016). Optionally, the difference between the time the first and second measurements were taken is at least the periodic unit of time.

It is to be noted that the aftereffect ranking module 334 is configured to rank different times at which to have an experience based on aftereffects associated with having the experiences at the different times; each time being ranked corresponds to a different portions of a periodic unit of time. Since some experiences may be characterized as occurring at a certain period of time (as explained in more detail above), the aftereffect ranking module 334 may be considered a module that ranks different experiences of a certain type based on aftereffects (e.g., experiences involving engaging in the same activity and/or being in the same location, but at different times). Thus, the teachings in this disclosure regarding the aftereffect ranking module 300 (and also the ranking module 220) may be relevant, in some embodiments, to the aftereffect ranking module 334. The use of the different reference numeral (334) is intended to indicate that rankings in these embodiments involve different times at which to have an experience.

The aftereffect ranking module 334, like the ranking module 220 or the aftereffect ranking module 300 and other ranking modules described in this disclosure, may utilize various approaches in order to generate a ranking of times to have the experience. Optionally, each time to have the experience is represented by a portion of the periodic unit of time. For example, the different approaches to ranking may include score-based ranking and preference-based ranking, which are described in more detail in the description of the ranking module 220. Thus, different implementations of the aftereffect ranking module 334 may comprise different modules to implement the different ranking approaches, as discussed below.

In one embodiment, the aftereffect ranking module 334 is configured to rank the time times to have the experience using a score-based approach and comprises the aftereffect scoring module 302, which in this embodiment, is configured to compute aftereffect scores for the experience, with each score corresponding to a portion of the periodic unit of time. Optionally, each aftereffect score corresponding to a certain portion of the periodic unit of time is computed based on prior and subsequent measurements of the at least five users who have the experience during the certain portion of the periodic unit of time.

When the aftereffect ranking module 334 includes the aftereffect scoring module 302, the aftereffect ranking module 334 includes score-based rank determining module 336, which, in one embodiment, is configured to rank portions of the periodic unit of time during which to have the experience based on their respective aftereffect scores. Optionally, the ranking by the score-based rank determining module 336 is such that a portion of the periodic unit of time with a higher aftereffect score is not ranked lower than a portion of the periodic unit of time with a lower aftereffect score. Furthermore, in the discussion above, the first portion of the periodic unit of time has a higher aftereffect score associated with it, compared to the aftereffect score associated with the second portion of the periodic unit of time. It is to be noted that score-based rank determining module 336 operates in a similar fashion to score-based rank determining module 225, and the use of the reference numeral 336 is done to indicate that the scores according to which ranks are determined correspond to aftereffects associates with having the experience during different portions of the periodic unit of time.

In another embodiment, the aftereffect ranking module 334 is configured to rank the times to have the experience using a preference-based approach. In this embodiment, the aftereffect ranking module 334 comprises a preference generator module 338 that is configured to generate a plurality of preference rankings Each preference ranking is indicative of ranks of at least two portions of the periodic unit of time during which to have the experience, such that one portion, of the at least two portions, is ranked above another portion of the at least two portions. The preference ranking is determined based on a subset comprising at least a pair of prior and subsequent measurements of a user who has the experience during the one portion and at least a pair of prior and subsequent measurements of a user who has the experience during the other portion. Optionally, all of the measurements comprised in each subset of the measurements that is used to generate a preference ranking are prior and subsequent measurements of a single user. Optionally, a majority of the measurements comprised in each subset of the measurements that is used to generate a preference ranking are prior and subsequent measurements of similar users as determined based on the profile comparator 133.

When the aftereffect ranking module 334 includes the preference generator module 338, it may also include the preference-based rank determining module 340, which, in one embodiment, is configured to rank the times to have the experience based on the plurality of the preference rankings utilizing a method that satisfies the Condorcet criterion. The ranking of the portions of the periodic unit of time by the preference-based rank determining module 340 is such that a certain portion of the periodic unit of time, which in a pair-wise comparison with other portions of the periodic unit of time is preferred over each of the other portions, is not ranked below any of the other portions. Optionally, the certain portion of the periodic unit of time is ranked above each of the other portions.

In some embodiments, the personalization module 130 may be utilized in order to generate personalized rankings of times to have the experience based on aftereffects of the experience when having it at different times. Optionally, the aftereffect ranking module 334 is configured to rank the times to have the experience based on an output generated by the personalization module 130. For at least some of the users, personalized rankings generated based on their profiles are different. In particular, for at least a certain first user and a certain second user, who have different profiles, the aftereffect ranking module 334 ranks times to have the experience differently, such that for the certain first user, having the experience during the first portion of the periodic unit of time is ranked above having the experience during the second portion of the periodic unit of time. For the certain second user it is the other way around; having the experience during the second portion of the periodic unit of time is ranked above having the experience during the first portion of the periodic unit of time.

In one embodiment, the recommender module 343 utilizes the ranking 342 to make recommendation 344 in which having the experience in the first portion of the periodic unit of time is recommended in a first manner (which involves a stronger recommendation than a recommendation made by the recommender module 343 when making a recommendation in the second manner). Optionally, having the experience during the second portion of the periodic unit of time is recommended in the second manner. Additional discussion regarding recommendations in the first and second manners may be found at least in the discussion about recommender module 178; recommender module 343 may employ first and second manners of recommendation for times to have an experience in a similar manner to the way the recommender module 178 does so when recommending different experiences to have.

Following is a description of steps that may be performed in a method for ranking times during which to have an experience based on aftereffects computed from measurements of affective response of users who had the experience at the different times. The steps described below may, in one embodiment, be part of the steps performed by an embodiment of the system described above (illustrated in FIG. 53), which is configured to rank times to have an experience based on aftereffects. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for ranking times during which to have an experience based on aftereffects includes at least the following steps:

In Step 1, receiving, by a system comprising a processor and memory, prior and subsequent measurements of affective response of at least ten users. Optionally, each user has the experience at some time during a periodic unit of time, a prior measurement is taken before the user finishes having the experience, and a subsequent measurement taken at least ten minutes after the user finishes having the experience. Optionally, the received measurements comprise prior and subsequent measurements of at least five users who have the experience during a first portion of the periodic unit of time, and prior and subsequent measurements of at least five users who have the experience during a second portion of the periodic unit of time, which is different from the first period. Optionally, the at least five users who have the experience during the first portion do not also have the experience during the second portion. In some embodiments, the measurements received by the system in Step 1 are received by the collection module 120.

And in Step 2, ranking times to have the experience based on aftereffects indicated by the measurements. Optionally, the ranking is such that it indicates that having the experience during the first portion of the periodic unit of time is ranked above having the experience during the second portion of the periodic unit of time. Optionally, the ranking in Step 2 is performed by the aftereffect ranking module 334.

In one embodiment, ranking the times to have the experience in Step 2 involves the following: (i) computing aftereffect scores for the experience corresponding to portions of the periodic unit of time (each aftereffect score corresponding to a certain portion of the periodic unit of time is computed based on prior and subsequent measurements of the at least five users who had the experience during the certain portion of the periodic unit of time); and (ii) ranking the times to have the experience based on their respective aftereffect scores. Optionally, the aftereffect scores are computed utilizing the aftereffect scoring module 302 and/or ranking the times is done utilizing score-based rank determining module 336.

In one embodiment, ranking the times to have the experience in Step 2 involves the following: (i) generating a plurality of preference rankings (each preference ranking is indicative of ranks of at least two portions of the periodic unit of time during which to have the experience, such that one portion, of the at least two portions, is ranked above another portion of the at least two portions, and the preference ranking is determined based on a subset of the measurements comprising a prior and subsequent measurement of a first user who had the experience during the one portion, and a prior and subsequent measurement of a second user who has the experience during the other portion; and (ii) ranking the times to have the experience based on the plurality of the preference rankings utilizing a method that satisfies the Condorcet criterion. Optionally, generating the plurality of preference rankings is done utilizing the preference generator 338 and/or ranking the times to have the experience utilizing the preference rankings is done utilizing the preference-based rank determining module 340. Optionally, for at least some of the preference rankings mentioned above, if not for all of the preference rankings, the first and second users are the same user.

In one embodiment, the method described above may include the following steps involved in generating personalized rankings of times during which to have the experience: (i) receiving a profile of a certain user and profiles of at least some of the users who had the experience (optionally, the profiles of the users are from among the profiles 128); (ii) generating an output indicative of similarities between the profile of the certain user and the profiles of the users; and (iii) ranking the times to have the experience based on the output and the prior and subsequent measurements received in Step 2. In this embodiment, not all users necessarily have the same ranking of times generated for them. That is, for at least a certain first user and a certain second user, who have different profiles, times for having the experience are ranked differently, such that for the certain first user, having the experience during the first portion of the periodic unit of time is ranked above having the experience during the second portion of the periodic unit of time. For the certain second user, having the experience during the second portion of the periodic unit of time is ranked above having the experience during the first portion of the periodic unit of time.

16—Determining Significance of Results

Embodiments described herein may involve a determination of significance (may also be referred to as "statistical significance") of information derived from measurements of affective response of users, such as significance of scores, ranks of experiences, and/or other values derived from the measurements. Additionally or alternatively, the determination may pertain to significance of differences between the ranks, the scores, and/or the other values derived from the measurements. Optionally, in some cases, significance may be expressed utilizing various values derived from statistical tests, such as p-values, q-values, and false discovery rates (FDRs).

Significance may also come into play in some cases, for determining ranges, error-bars, and/or confidence intervals for various values derived from the measurements of affective response. In such cases, the significance may indicate the variability of the data, and help guide decisions based on it. In one example, locations are scored based on a scale from 1 to 10 representing excitement of users at the locations. A first location may be given a score of 6, while a second location may be given a score of 7. In this case, the second location may be preferable to the first. However, if the 95% confidence level for the first location is 5-7 and for the second location, it is 4-8, then a person wanting to be confident of not having a bad experience may select the first location, nonetheless. Making such a choice would minimize the chance of having a bad experience (a score of 4 on the scale of 1 to 10) at the expense of reducing the chance of having a very good experience (score of 8 on the scale of 1 to 10).

After having the blueprint provided herein and familiarizing with the inventive steps, those skilled in the art will recognize that there are various methods in the field of statistics, and also some developed in other disciplines, which may be used to determine significance of results. Below is a non-exhaustive description of some approaches that may be used in conjunction with the inventive concepts discussed herein; other methods may be applied to obtain similar results.

In various embodiments described herein, significance may be expressed in terms of p-values. Herein, a p-value is the probability of obtaining a test statistic result at least as extreme as the one that was actually observed, assuming that the null hypothesis is true. Depending on the embodiments, one skilled in the art may postulate various null hypotheses according to which the p-values are computed. Optionally, when p-values are used to denote significance of a score, the lower the p-value, the more significant the results may be considered. In some embodiments, reaching a certain p-value such as 0.05 or less indicates that a certain significance is reached, and thus, the results should be considered significant.

In some embodiments, determining significance requires performing multiple hypotheses testing, and thus, may involve accounting and/or correcting for multiple comparisons. This can be achieved utilizing statistical approaches such as corrections for familywise error rates, e.g., by using Bonferroni correction and/or other similar approaches. In one example, determining significance of a selection, such as which experience from among a plurality of experiences has the most favorable affective response may require correction for multiple comparisons. In this example, we may want to know whether the top ranked experience is truly exceptional, or maybe its favorable affective response is a statistical artifact. If, for instance, there were more than 20 experiences to select from, one would expect at least one of the experiences to have affective response that is two standard deviations above the mean. In this example, the significance of the results is likely to be more accurate if the number of experiences that are evaluated is a parameter that influences the significance value (as it would be when using Bonferroni correction or some other variant that corrects for familywise error rates).

In some embodiments, determining significance involves employing False Discovery Rate (FDR) control, which is a statistical method used in multiple hypothesis testing to correct for multiple comparisons. In a list of findings (i.e. studies where the null-hypotheses are rejected), FDR procedures are designed to control the expected proportion of incorrectly rejected null hypotheses ("false discoveries"). In some cases, FDR controlling procedures exert a less stringent control over false discovery compared to FamilyWise Error Rate (FWER) procedures (such as the Bonferroni correction), which seek to reduce the probability of even one false discovery, as opposed to the expected proportion of false discoveries.

Determining significance of results may be done, in some embodiments, utilizing one or more of the following resampling approaches: (1) Estimating the precision of sample statistics (medians, variances, percentiles) by using subsets of available data (jackknifing) or drawing randomly with replacement from a set of data points (bootstrapping); (2) Exchanging labels on data points when performing significance tests (permutation tests, also called exact tests, randomization tests, or re-randomization tests); and (3) Validating models by using random subsets (bootstrapping, cross validation).

In some embodiments, permutation tests are utilized to determine significance of results, such as significance of scores, ranking, and/or difference between values. Optionally, a permutation test (also called a randomization test, re-randomization test, or an exact test) may be any type of statistical significance test in which the distribution of the test statistic under the null hypothesis is obtained by calculating multiple values of the test statistic under rearrangements of the labels on the observed data points.

In some embodiments, significance is determined for a value, such as a score for an experience. For example, such significance may be determined by the score significance module 465. There are various ways in which significance of a score may be determined.

In one example, significance of a score for an experience is determined based on parameters of a distribution of scores for the experience. For example, the distribution may be determined based on historical values computed for the score for the experience based on previously collected sets of measurements of affective response. Optionally, the significance is represented as a p-value for observing a score that is greater (or lower) than the score. Additionally or alternatively, the significance may be expressed as a percentile and/or other quantile in which the score is positioned relative to the historic scores and/or the distribution. Optionally, in this example, a score with high significance is a score which is less often observed, e.g., an outlier or a score that is relatively higher or lower than most of the scores previously observed.

In another example, significance of a score for an experience may be determined by comparing it to another score for the experience. Optionally, the significance assigned to the score is based on the significance of the difference between the score and the other score as determined utilizing one or more of the statistical approaches described below. Optionally, the other score to which the score is compared is an average of other scores (e.g., computed for various other experiences) and/or an average of historical scores (e.g., computed for the experience). Optionally, in this example, a score with a high significance is a score for which the difference between the score and the other score to which it is compared is significant (e.g., represents at least a certain p-value or has at least a certain t-test statistic).

In yet another example, significance of a score for an experience may be determined by a resampling approach. For example, a set of measurements used to compute the score may be pooled along with other measurements of affective response (e.g., corresponding to other experiences and/or users), to form a larger pool of measurements. From this pool, various resampling approaches may be employed to determine the significance of the score. For example, resampling may involve repeatedly randomly selecting a subset of measurements from the pool, which has the same size as the set, and computing a score based on the subset. The distribution of scores that is obtained this way may be utilized to determine the significance of the score (e.g., by assigning a p-value to the score).

The significance of a result, such as a score for an experience, a difference between scores, and/or a difference in affective response to experiences, may be determined, in some embodiments, utilizing a statistical test. For example, a result may involve two or more scores of some sort, and the significance of a phenomenon related to the scores needs to be determined. The significance may relate to various factors such as whether the fact that one score is higher than the rest is likely a true phenomenon, or is this likely observed due to there being a limited number of measurements of affective response that are used to generate the results. In the latter case, were there a larger number of measurements, perhaps the results would be different. However, in the former case, increasing the number of measurements upon which results are drawn is not likely to change the results significantly (since they are based on observations of a true phenomenon). Following are some examples that may be utilized in various embodiments in this disclosure in which significance of a result (e.g., a crowd-based result) needs to be determined.

One scenario in which significance of results is tested relates to there being two (or more) sets of values that need to be compared. With this approach, certain statistics that characterize the sets of values are computed. For example, a statistic for a set of values may be the empirical mean of the values. Given the statistics computed for the sets of values, a parametric test may be used to answer certain questions about the sets of values. For example, whether they come from the same distribution, or whether the distributions from which the sets of values come have different parameters. Knowing the answer to such questions and/or how likely the answer to them is true, can be translated into a value indicative of the significance of the results (e.g., a p-value).

Consider a scenario in which first and second locations are scored according to measurements of affective response of users who were at the first and second locations. Based on the measurements it is determined that a first location-score for the first location is higher than a second location-score for the second location. In this example, a location-score may represent an average emotional response, such as an average level of happiness, determined from the measurements. It may be the case that the first location-score is higher than the second location-score, which would imply that the first location is preferable to the second location. However, if these results have low significance, for example, tests indicate that the first and second sets of measurements are similar, such as they likely come from the same distribution, then it may be desirable not to treat the first location as being preferable to the second location.

One parametric test approach often used to answer questions about differences between sets of values is a t-test, which herein refers to any statistical hypothesis test in which the test statistic follows a Student's t distribution if the null hypothesis is supported. A t-test can be used to determine if two sets of data are significantly different from each other, and is often applied when the test statistic would follow a normal distribution if the value of a scaling term in the test statistic were known. When the scaling term is unknown and is replaced by an estimate based on the data, the test statistic (under certain conditions) follows a Student's t distribution. Optionally, the test statistic is converted to a p-value that represents the significance.

The t-tests may be utilized in different ways for various tasks such as: a one-sample test of whether the mean of a population has a value specified in a null hypothesis, a two-sample test of the null hypothesis that the means of two populations are equal, a test of the null hypothesis that the difference between two responses measured on the same statistical unit has a mean value of zero, and a test of whether the slope of a regression line differs significantly from zero. Additionally, repeated t-tests may be conducted multiple times between various pairs of sets of measurements in order to evaluate relationships between multiple sets of measurements.

In one embodiment, a t-test is conducted as an independent samples t-test. This t-test approach is used when two separate sets of, what are assumed to be, independent and identically distributed samples are obtained, one sample from each of the two populations being compared. For example, suppose we are evaluating the effect of being in a first and second locations, and we use measurements of affective response of one hundred users, where 50 users were at the first location and the other 50 users were at the second location. In this case, we have two independent samples and could use the unpaired form of the t-test.

In another embodiment, a t-test is conducted as a paired samples t-test, which involves a sample of matched pairs of similar units, or one group of units that has been tested twice (a "repeated measures" t-test). A typical example of the repeated measures t-test would be where measurements of the same users are taken under different conditions (e.g., when in different locations). This may help remove variability (e.g., due to differences in the users), which does not directly concern the aspect being tested (e.g., there being different reactions to being in the different locations). By comparing the same user's measurements corresponding to different locations, we are effectively using each user as their own control.

In yet another embodiment, a t-test is conducted as an overlapping samples t-test, which is used when there are paired samples with data missing in one or the other samples (e.g., due to selection of "Don't know" options in questionnaires or because respondents are randomly assigned to a subset question).

In some embodiments, significance may be determined using other parametric methods besides t-tests, when certain conditions and/or assumptions are met.

In one example, significance may be determined using Welch's t-test (Welch-Aspin Test) which is a two-sample test, and is used to check the hypothesis that two populations have equal means. Welch's t-test may be considered an adaptation of Student's t-test, and is intended for us when the two samples have possibly unequal variances.

In another example, significance may be determined using a Z-test, which is any statistical test for which the distribution of the test statistic under the null hypothesis can be approximated by a normal distribution.

In still another example, significance may be determined using Analysis of variance (ANOVA), which includes a collection of statistical models used to analyze the differences between group means and their associated procedures (such as "variation" among and between groups). In the ANOVA setting, the observed variance in a particular variable is partitioned into components attributable to different sources of variation. In its simplest form, ANOVA provides a statistical test of whether or not the means of several groups are equal, and therefore may be used to generalize the t-test to more than two groups.

The significance of a result, such as a score for an experience, a difference between scores, and/or a difference in affective response to experiences, may be determined, in some embodiments, utilizing non-parametric alternatives to the aforementioned parametric tests (e.g., t-tests). Optionally, this may be done due to certain assumptions regarding the data not holding (e.g., the normality assumption may not hold). In such cases, a non-parametric alternative to the t-test may be used. For example, for two independent samples when the data distributions are asymmetric (that is, the distributions are skewed) or the distributions have large tails, then the Wilcoxon rank-sum test (also known as the Mann—Whitney U test) can have higher power than the t-test. Another approach that may be used is the nonparametric counterpart to the paired samples t-test, which is the Wilcoxon signed-rank test for paired samples.

One scenario that often arises in embodiments described herein involves determining the significance of a difference between affective responses to experiences. There may be different approaches to this task that may be utilized in embodiments described herein.

In one embodiment, affective response to an experience may be expressed as a score computed for the experience based on measurements of affective response of users who had the experience. In such a case, the significance of a difference between affective responses to two (or more) experiences can be determined by computing the significance of the difference between scores computed for the two or more experiences. Embodiments in which the significance between scores for experiences is determined are illustrated in FIG. 44, which is described in more detail below.

Figure 46:
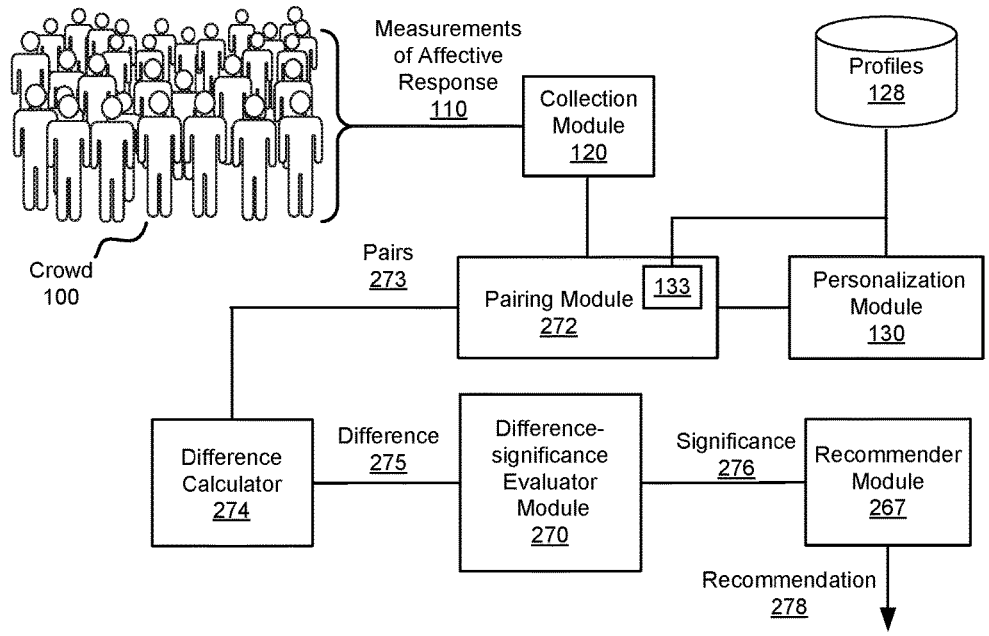
FIG. 46 illustrates a system configured to evaluate significance of a difference between measurements of affective response to experiences.

In another embodiment, affective response to an experience may be expressed via values of measurements of affective response of users who had the experience (and not via a statistic computed based on the measurements such as a score). In such a case, the significance of a difference between affective responses to two (or more) experiences can be determined by computing the significance of the difference between sets of measurements of affective response, each set measurements of users who had a certain experience from among the two or more experiences. Embodiments in which the significance of a difference between measurements to different experiences is determined are illustrated in FIG. 46, which is described in more detail below.

Figure 44:
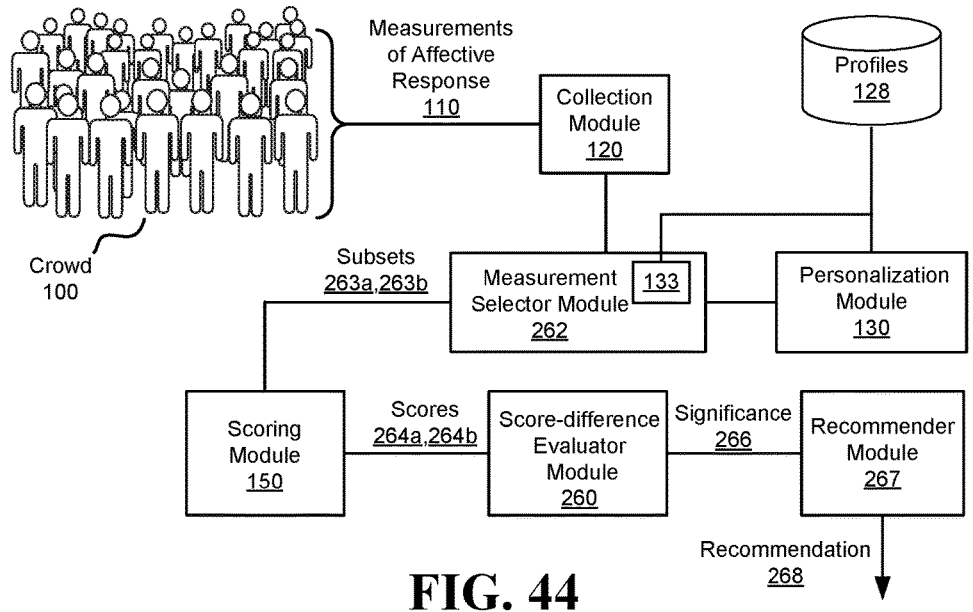
FIG. 44 illustrates a system configured to evaluate significance of a difference between scores for experiences.

FIG. 44 illustrates a system configured to evaluate significance of a difference between scores for experiences. The system includes at least the collection module 120, a measurement selector module 262, the scoring module 150, and the score-difference evaluator module 260.

The collection module 120 is configured, in one embodiment, to receive measurements 110 of affective response of users to experiences that include at least first and second experiences. Optionally, each measurement of affective response of a user to an experience is obtained by measuring the user with a sensor that is coupled to the user. Examples of sensors that may be utilized to take measurements are given at least in section 1—Sensors, in this disclosure. Optionally, each measurement of affective response of a user to an experience is based on at least one of the following values: (i) a value acquired by measuring the user with the sensor while the user has the experience, and (ii) a value acquired by measuring the user with the sensor up to one minute after the user had the experience. Optionally, each measurement of affective response of the user to an experience is based on values acquired by measuring the user with the sensor during at least three different non-overlapping periods while the user has the experience.

The measurement selector module 262 is configured, in one embodiment, to select a first subset 263a of the measurements of users to the first experience, and a second subset 263b of the measurements of the users to the second experience. Optionally, each of the first and second subsets comprises measurements of at least eight users.

The scoring module 150 is configured, in one embodiment, to compute a first score 264a for the first experience, based on the first subset 263a, and a second score 264b for the second experience, based on the second subset 263b. In another embodiment, the dynamic scoring module 180 may be used to compute the scores 264a and 264b based on the subset 263a and 263b, respectively.

The score-difference evaluator module 260 is configured, in one embodiment, to determine significance 266 of a difference between the first and second scores (264a and 264b) using a statistical test involving the first and second subsets. In some cases, the significance of the difference between the first and second scores may depend on the number of users whose measurements are used to compute each score. In one example, the significance 266 of the difference between the first score 264a and the second score 264b reaches a certain level, but on average, a second significance of a difference between a third score computed from a third subset of measurements, and a fourth score computed from a fourth subset of measurements, does not reach the certain level. In this example, the third and fourth subsets may be generated by randomly selecting half of the measurements in the first subset 263a and the second subset 263b, respectively.

Determining the significance 266 may be done in various ways. In one embodiment, the statistical test used by the score-difference evaluator module 260 involves a permutation test. Optionally, the significance 266 is based on a p-value corresponding to observing a difference that is at least as large as the difference between the first and second scores (264a and 264b), if the first and second subsets (263a and 263b) are shuffled such that the measurements collected from the first and second subsets are redistributed to those subsets randomly.

In another embodiment, the statistical test comprises a test that determines significance of a hypothesis that supports at least one of the following assumptions: that the first and second subsets (263a and 263b) are sampled from the same underlying distribution, and that a parameter of a first distribution from which the measurements in the first subset 263a are sampled is the same as a parameter of a second distribution from which the measurements in the second subset 263b are sampled. Various approaches may be utilized to determine the significance of the above hypothesis. For example, the significance of the hypothesis may be determined based on at least one of the following tests: a nonparametric test that compares between the measurements in the first subset 263a and the measurements in the second subset 263b, and a parametric test that compares between the measurements in the first subset 263a and the measurements in the second subset 263b. Optionally, the parametric test that compares between the measurements in the first subset 263a and the measurements in the second subset 263b determines significance of a hypothesis that the mean of measurements in the first subset 263a is the same as the mean of measurements in the second subset 263b. Optionally, the parametric test is a t-test or a form of Welch's test.

In one embodiment, the first and second subsets of the measurements comprise measurements of at least eight users who had both the first and second experiences. Additionally, for each of the at least eight users who had both experiences, the first subset 263a comprises a first measurement of the user to the first experience, and the second subset 263b comprises a second measurement of the user to the second experience.

In one embodiment, the measurement selector module 262 is configured to receive profiles of the users, from among the profiles 128, and to utilize the profile comparator 133 and the profiles to identify at least eight pairs of measurements from among the measurements received by the measurement selector module 262. Each pair of measurements, from among the at least eight pairs of measurements, includes a first measurement of a first user to the first experience and a second measurement of a second user to the second experience. Additionally, the similarity between a profile of first user and a profile of the second user reaches a threshold. In one example, the threshold is set to a value such as the similarity between a randomly selected pair of profiles from among the profiles 128 does not reach the threshold. In another example, the threshold corresponds to a certain p-value for observing a similarity of at least a certain value at random between pairs of profiles from among the profiles 128. In this example, the threshold may correspond to p-values of 0.01, 0.05, 0.1 or some other value greater than 0 but smaller than 0.5. Optionally, the first subset 263a comprises the first measurements from the at least eight pairs of measurements, and the second subset 263b comprises the second measurements from the at least eight pairs of measurements.

In one embodiment, the personalization module 130 may be utilized to compute personalized scores for certain users. Thus, the score-difference evaluator module 260 may determine the significance of a difference between scores for an experience personalized for a certain user. This may lead to scenarios where a difference between scores for two experiences is more significant for a certain first user, than it is for a certain second user.

The significance 266 may be utilized to determine how to treat the scores 264a and 264b. Optionally, if the significance between the two scores is not high enough, the two scores may be treated essentially the same even if one is higher than the other. In one example, a ranking module (e.g., ranking module 220 or dynamic ranking module 250) may rank two experiences with the same rank if the significance of a difference between scores computed for the two experiences does not reach a certain level. In another example, recommendation made for experiences may depend on the significance 266. For example, the recommender module 267, may be configured to recommend an experience to a user in a manner that belongs to a set comprising first and second manners. Optionally, when recommending an experience in the first manner, the recommender module 267 provides a stronger recommendation for the experience, compared to a recommendation for the experience that the recommender module 267 provides when recommending in the second manner.

In one embodiment, the recommender module 267 is configured to recommend the first and second experiences as follows: when the significance 266 is below a predetermined level, the first and second experiences are both recommend in the same manner. When the significance 266 is not below the predetermined level and the first score 264a is greater than the second score 264b, the first experience is recommended in the first manner and the second experience is recommended in the second manner. And when the significance 266 is not below the predetermined level and the first score 264a is lower than the second score 264b, the first experience is recommended in the second manner and the second experience is recommended in the first manner. Additional information regarding what may be involved in providing a recommendation for an experience in the first or second manners is given in the discussion regarding the recommender module 178.

Figure 45:
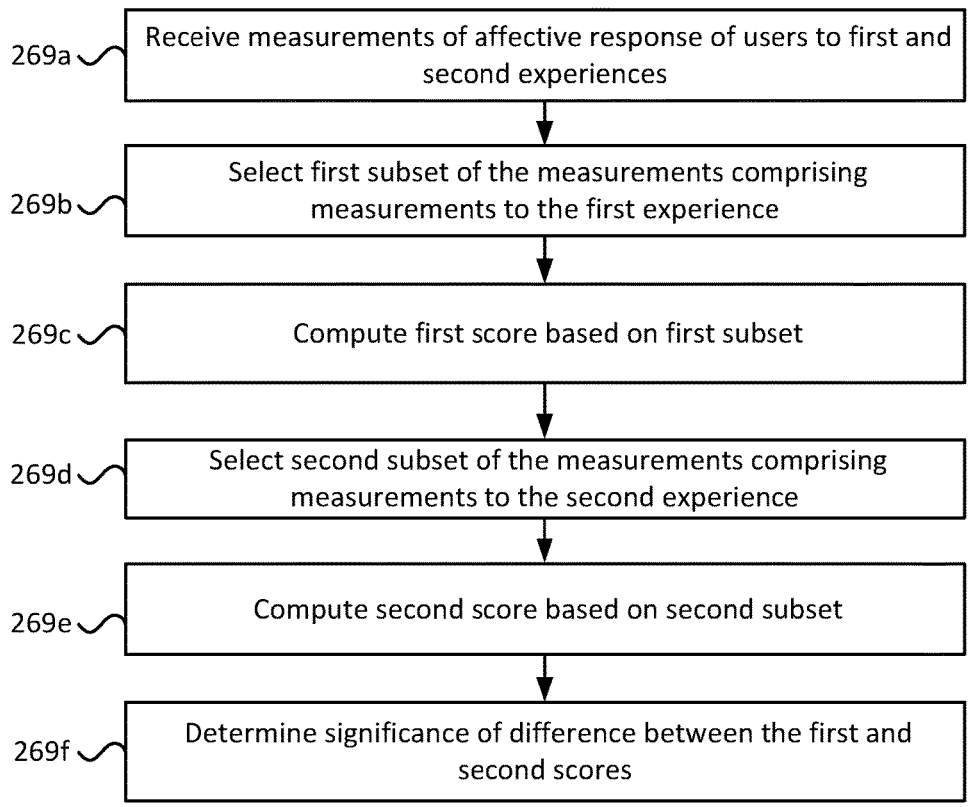
FIG. 45 illustrates steps involved in a method for evaluating significance of a difference between scores computed for experiences.

FIG. 45 illustrates steps involved in one embodiment of a method for evaluating significance of a difference between scores computed for experiences. The steps illustrated in FIG. 45 may be used, in some embodiments, by systems modeled according to FIG. 44. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for evaluating significance of a difference between scores computed for experiences includes at least the following steps:

In Step 269a, receiving, by a system comprising a processor and memory, measurements of affective response of users to experiences. In this embodiment, the experiences include first and second experiences.

In Step 269b, selecting a first subset of the measurements comprising measurements of at least eight users who had the first experience.

In Step 269c, computing a first score based on the first subset. Optionally, the score is computed utilizing the scoring module 150 or the dynamic scoring module 180.

In Step 269d, selecting a second subset of the measurements comprising measurements of at least eight users who had the second experience.

In Step 269e, computing a second score based on the second subset. Optionally, the score is computed utilizing the scoring module 150 or the dynamic scoring module 180.

And in Step 269f, determining significance of a difference between the first and second scores using a statistical test involving the first and second subsets. Optionally, this step involves performing a permutation test as part of the statistical test. Optionally, this step involves performing, as part of the statistical test, a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled.

In one embodiment, each measurement of affective response of a user to an experience (e.g., the first experience or the second experience) is based on at least one of the following values: (i) a value acquired by measuring the user, with a sensor coupled to the user, while the user has the experience, and (ii) a value acquired by measuring the user with the sensor up to one minute after the user had the experience.

In one embodiment, the method described above may optionally include a step of recommending an experience to a user in a manner that belongs to a set comprising first and second manners. Optionally, recommending the experience in the first manner comprises providing a stronger recommendation for the experience, compared to a recommendation for the experience that is provided when recommending it in the second manner. Depending on the significance and the values of the scores, the first and second experiences may be recommend in different manners in this step. In one example, responsive to the significance of the difference between the first and second scores being below a predetermined level, both the first and second experiences are recommended in the same manner. In another example, responsive to the significance not being below the predetermined level and the first score being greater than the second score, the first experience is recommended in the first manner and the second experience is recommended in the second manner. In still another example, responsive to the significance not being below the predetermined level and the first score being lower than the second score, the first experience is recommended in the second manner and the second experience is recommended in the first manner.

FIG. 46 illustrates a system configured to evaluate significance of a difference between measurements of affective response to experiences. The system includes at least the collection module 120, a pairing module 272, a difference calculator 274, and the difference-significance evaluator module 270.

The collection module 120 is configured, in one embodiment, to receive measurements 110 of affective response of users to experiences that include at least a first experience and a second experience. Optionally, each measurement of affective response of a user to an experience is obtained by measuring the user with a sensor that is coupled to the user. Examples of sensors that may be utilized to take measurements are given at least in section 1—Sensors, in this disclosure. Optionally, each measurement of affective response of a user to an experience is based on at least one of the following values: (i) a value acquired by measuring the user with the sensor while the user has the experience, and (ii) a value acquired by measuring the user with the sensor up to one minute after the user had the experience. Optionally, each measurement of affective response of the user to an experience is based on values acquired by measuring the user with the sensor during at least three different non-overlapping periods while the user has the experience.

The pairing module 272 is configured to select pairs 273 of measurements from among the measurements received by the collection module 120. Each pair of measurements includes a first measurement of a first user to the first experience, and a second measurement of a second user to the second experience. Optionally, the first user and the second user are the same user. Alternatively, the first user may be similar to the second user, as explained in more detail below.

The difference calculator 274 is configured to compute a weighted difference 275, which is a function of differences between a first subset comprising the first measurements of the pairs and a second subset comprising the second measurements of the pairs. Optionally, each of the first and second subsets comprises measurements of at least eight users.

The difference-significance evaluator module 270 is configured to determine significance 276 of the weighted difference 275 using a statistical test involving the first and second subsets. In one example, the significance 276 of the weighted difference 275 reaches a certain level, but on average, a second significance of a weighted difference between third and fourth subsets does not reach the certain level. In this example, the third and fourth subsets comprise the first and second measurements of a randomly selected group of half of the pairs 273, respectively.

Determining the significance 276 may be done in various ways. In one embodiment, the statistical test comprises a permutation test. Optionally, the significance 276 is based on a p-value corresponding to observing a weighted difference that is at least as large as the weighted difference if the first and second subsets are shuffled such that the measurements collected from the first and second subsets are redistributed to those subsets randomly.

In another embodiment, the statistical test comprises a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled. Optionally, the significance of the hypothesis is determined based on at least one of: a nonparametric test that compares between the measurements in the first subset and the measurements in the second subset, and a parametric test that compares between the measurements in the first subset and the measurements in the second subset. Optionally, the parametric test, which compares between the measurements in the first subset and the measurements in the second subset, determines the significance of a hypothesis that the mean of measurements in the first subset is the same as the mean of measurements in the second subset.

In one embodiment, the first and second subsets of the measurements comprise measurements of at least eight users who had both the first and second experiences. Additionally, for each of the at least eight users who had both experiences, the first subset comprises a first measurement of the user to the first experience, and the second subset comprises a second measurement of the user to the second experience.

In one embodiment, the pairing module 272 is configured to receive profiles of users, from among the profiles 128, and to utilize the profile comparator 133 and the profiles to identify the at least eight pairs of measurements. Optionally, each of the at least eight pairs of measurements involves a pair of measurements that comprises a first measurement of a first user who had the first experience and a second measurement of a second user who had the second experience. Optionally, for each pair of the at least eight pairs of measurements, the similarity between a profile of a first user of whom the first measurement in the pair is taken and a profile of a second user of whom the second measurement in the pair is taken, reaches a threshold. Additionally, the similarity between a profile of first user and a profile of the second user reaches a threshold. In one example, the threshold is set to a value such as the similarity between a randomly selected pair of profiles from among the profiles 128 does not reach the threshold. In another example, the threshold corresponds to a certain p-value for observing a similarity of at least a certain value at random between pairs of profiles from among the profiles 128. In this example, the threshold may correspond to p-values of 0.01, 0.05, 0.1 or some other value greater than 0 but smaller than 0.5.

It is to be noted that pairing measurements, e.g., in order to compare between two options such as locations, meals, or products may have an advantage of removing noise from the comparison. Thus, this may enable in some embodiments, the comparison to be more accurate. By selecting pairs of measurements that have similarities (but differ on the aspect being tested), it is likely that the difference between the pairs of measurements is due to the aspect being tested, and not due to other aspects not being considered (since the pairs of measurements are assumed to be similar with respect to the other aspects). Creating pairs of measurements for comparison is often a practice utilized in conjunction with significance determination via tests such as a t-test.

In one embodiment, the system illustrated in FIG. 46 may include the profile comparator module 133 and a weighting module. The weighting module is configured to receive a profile of a certain user and profiles of the users and to generate the weights for the measurements of the users. Optionally, a weight for a measurement of a user is proportional to the extent of a similarity computed by the profile comparator module between a pair comprising a profile of the user and a profile of the certain user, such that a weight generated for a measurement of a user whose profile is more similar to the profile of the certain user is higher than a weight generated for a measurement of a user whose profile is less similar to the profile of the certain user. Additionally, the difference calculator 274 is configured, in this embodiment, to utilize the weights to compute the weighted difference 275. In this embodiment, for at least a certain first user and a certain second user, who have different profiles, the difference calculator computes first and second weighted differences, based on first and second sets of weights for the measurements, generated for the certain first and certain second users, respectively. The first weighted difference is different from the second weighted difference and the significance of the first weighted difference is different from the significance of the second weighted difference. Thus, this embodiment may be utilized to determine significance that is personalized for certain users.

The significance 276 may be utilized to determine how to recommend experiences. Optionally, if the significance between measurements to two is not high enough, the two experiences may be treated essentially as being regarded by users as the same even if the measurements of affective response to one of the experiences are slightly more positive than they are to the other. In one example, a ranking module (e.g., ranking module 220 or dynamic ranking module 250) may rank two experiences with the same rank if the significance of a difference between measurements of user who had the two experiences does not reach a certain level. In another example, recommendation made for experiences may depend on the significance 276. For example, the recommender module 267, may be configured to recommend an experience to a user in a manner that belongs to a set comprising first and second manners. Optionally, when recommending an experience in the first manner, the recommender module 267 provides a stronger recommendation for the experience, compared to a recommendation for the experience that the recommender module 267 provides when recommending in the second manner.

In one embodiment, the recommender module 267 is configured to recommend the first and second experiences as follows: when the significance 276 is below a predetermined level, the first and second experiences are both recommend in the same manner. When the significance 276 is not below the predetermined level and the weighted difference 275 is positive (i.e., measurements of users to the first experience are more positive than measurements of users to the second experience), the first experience is recommended in the first manner and the second experience is recommended in the second manner. And when the significance 276 is not below the predetermined level and the weighted difference 275 is negative (i.e., measurements of users to the first experience are more negative than measurements of users to the second experience), the first experience is recommended in the second manner and the second experience is recommended in the first manner Additional information regarding what may be involved in providing a recommendation for an experience in the first or second manners is given in the discussion regarding the recommender module 178.

Figure 47:
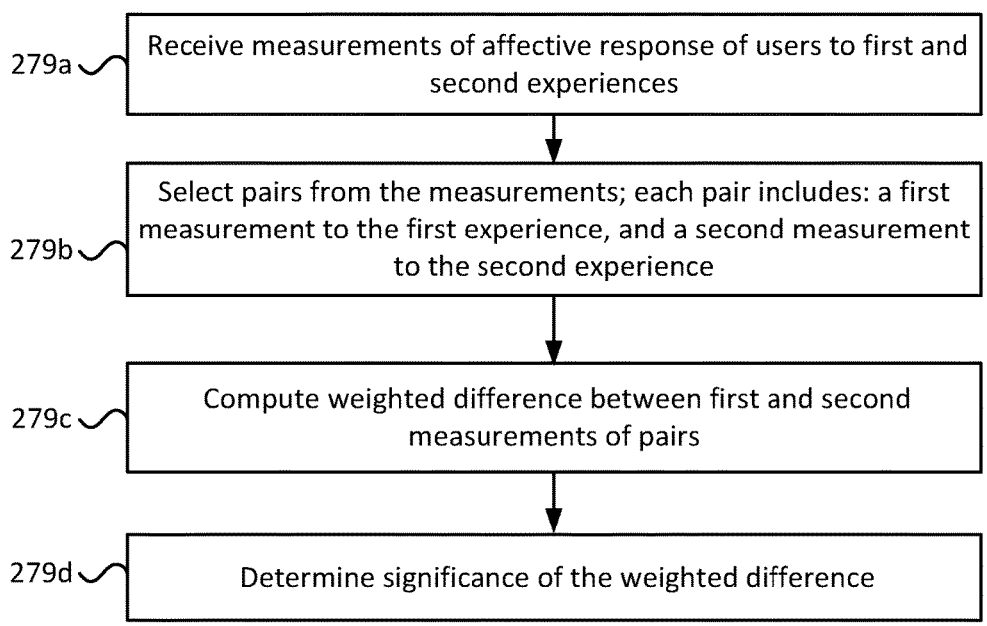
FIG. 47 illustrates steps involved in a method for evaluating significance of a difference between measurements of affective response to experiences.

FIG. 47 illustrates steps involved in one embodiment of a method for evaluating significance of a difference between measurements of affective response to experiences. The steps illustrated in FIG. 47 may be used, in some embodiments, by systems modeled according to FIG. 46. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for evaluating significance of a difference between measurements of affective response to experiences includes at least the following steps:

In Step 279a, receiving, by a system comprising a processor and memory, the measurements of affective response of users to experiences. In this embodiment, the experiences include first and second experiences. Optionally, each measurement of affective response of a user to an experience (e.g., the first experience or the second experience) is based on at least one of the following values: (i) a value acquired by measuring the user, with a sensor coupled to the user, while the user has the experience, and (ii) a value acquired by measuring the user with the sensor up to one minute after the user had the experience.

In Step 279b, selecting pairs from among the measurements; each pair comprises a first measurement of a first user to the first experience, and a second measurement of a second user to the second experience. Optionally, the pairs are selected utilizing the pairing module 272, as explained above.

In Step 279c, computing a weighted difference, which is a function of differences between a first subset comprising the first measurements of the pairs and a second subset comprising the second measurements of the pairs. In this embodiment, each of the first and second subsets comprises measurements of at least eight users.

And in Step 279d, determining significance of the weighted difference using a statistical test involving the first and second subsets. Optionally, this step involves performing a permutation test as part of the statistical test. Optionally, this step involves performing, as part of the statistical test, a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled.

In one embodiment, the method described above may optionally include a step of recommending an experience to a user in a manner that belongs to a set comprising first and second manners. Optionally, recommending the experience in the first manner comprises providing a stronger recommendation for the experience, compared to a recommendation for the experience that is provided when recommending it in the second manner. Depending on the significance and the value of the weighted difference, the first and second experiences may be recommend in different manners in this step. In one example, responsive to the significance of the difference between the first and second scores being below a predetermined level, both the first and second experiences are recommended in the same manner. In another example, responsive to the significance not being below the predetermined level and the weighted difference being positive (i.e., measurements to the first experience are more positive than measurements to the second experience), the first experience is recommended in the first manner and the second experience is recommended in the second manner. In still another example, responsive to the significance not being below the predetermined level and the weighted difference being negative (i.e., measurements to the first experience are more negative than measurements to the second experience), the first experience is recommended in the second manner and the second experience is recommended in the first manner.

17—Learning Function Parameters

Some embodiments in this disclosure involve functions whose targets (codomains) include values representing affective response to an experience. Herein, parameters of such functions are typically learned based on measurements of affective response. These functions typically describe a relationship between affective response related to an experience and a parametric value. In one example, the affective response related to an experience may be the affective response of users to the experience (e.g., as determined by measurements of the users taken with sensors while the users had the experience). In another example, the affective response related to the experience may be an aftereffect of the experience (e.g., as determined by prior and subsequent measurements of the users taken with sensors before and after the users had the experience, respectively).

In embodiments described herein various types of domain values may be utilized for generating a function whose target includes values representing affective response to an experience. In one embodiment, the function may be a temporal function involving a domain value corresponding to a duration. This function may describe a relationship between the duration (how long) one has an experience and the expected affective response of to the experience. Another temporal domain value may be related to a duration that has elapsed since having an experience. For example, a function may describe a relationship between the time that has elapsed since having an experience and the extent of the aftereffect of the experience. In another embodiment, a domain value of a function may correspond to a period during which an experience is experienced (e.g., the time of day, the day of the week, etc.); thus, the function may be used to predict affect response to an experience based on what day a user has the experience. In still another embodiment, a domain value of a function may relate to the extent an experience has been previously experienced. In this example the function may describe the dynamics of repeated experiences (e.g., describing whether users get bored with an experience after having it multiple times). In yet another embodiment, a domain value may describe an environmental parameter (e.g., temperature, humidity, the air quality). For example, a function learned from measurements of affective response may describe the relationship between the temperature outside and how much people enjoy having certain experiences.

Below is a general discussion regarding how functions whose targets include values representing affective response to an experience may be learned from measurements of affective response. The discussion below relates to learning a function of an arbitrary domain value (e.g., one or more of the types of the domain values described above). Additionally, the function may be learned from measurements of affective response of users to experiences that may be any of the experiences described in this disclosure, such as experiences of the various types mentioned in section 3—Experiences.

In embodiments described in this disclosure, a function whose target includes values representing affective response is characterized by one or more values of parameters (referred to as the "function parameters" and/or the "parameters of the function"). These parameters are learned from measurements of affective response of users. Optionally, the parameters of a function may include values of one or more models that are used to implement (i.e., compute) the function. Herein, "learning a function" refers to learning the function parameters that characterize the function.

The function may be considered to be represented by a notation of the form $f(x)=y$, where y is an affective value (e.g., corresponding to a score for an experience), and x is a domain value upon which the affective value may depend (e.g., one of the domain values mentioned above). Herein, domain values that may be given as an input to a function $f(x)$ may be referred to as "input values". In one example, "x" represents a duration of having an experience, and thus, the function $f(x)=y$ may represent affective response to an experience as a function of how long a user has the experience. In the last example, the affective value y may be referred to both as "affective response to the experience" and as "expected affective response to the experience". The addition of the modifier "expected" is meant to indicate the affective response is a predicted value, which was not necessarily measured. However, herein the modifier "expected" may be omitted when relating to a value y of a function, without changing the meaning of the expression. In the above notation, the function $f$ may be considered to describe a relationship between x and y (e.g., a relationship between the duration of an experience and the affective response to the experience). Additionally, herein, when $f(x)=y$ this may be considered to mean that the function $f$ is indicative of the value y when the input has a value x.

It is to be noted that in the following discussion, "x" and "y" are used in their common mathematical notation roles. In descriptions of embodiments elsewhere in this disclosure, other notation may be used for values in those roles. Continuing the example given above, the "x" values may be replaced with "$\Delta t$" (e.g., to represent a duration of time), and the "y" values may be replaced with "v" (e.g., to represent an affective value). Thus, for example, a function describing an extent of an aftereffect to an experience based on how long it has been since a user finished having the experience, may be represented by the notation $f(\Delta t)=v$.

Typically, a function of the form $f(x)=y$ may be utilized to provide values of y for at least two different values of the x in the function. The function may not necessarily describe corresponding y values to all, or even many, domain values; however, in this disclosure it is assumed that a function that is learned from measurements of affective response describes target values for at least two different domain values. For example, with a representation of functions as a (possibly infinite) set of pairs of the form (x,y), functions described in this disclosure are represented by at least two pairs $(x_1,y_1)$ and $(x_2,y_2)$, such that $x_1 \neq x_2$. Optionally, some functions in this disclosure may be assumed to be non-constant; in such a case, an additional assumption may be made in the latter example, which stipulates that $y_1 \neq y_2$. Optionally, when reference is made to a relationship between two or more variables described by a function, the relationship is defined as a certain set of pairs or tuples that represent the function, such as the set of pairs of the form (x,y) described above.

It is to be noted that the functions learned based on measurements of affective response are not limited to functions of a single dimensional input. That is the domain value x in a pair of the form (x,y) mentioned above need not be a single value (e.g., a single number of category). In some embodiments, the functions may involve multidimensional inputs, thus x may be a vector or some other form of a multidimensional value. Those skilled in the art may easily apply teachings in this disclosure that may be construed as relating to functions having a one-dimensional input to functions that have a multidimensional input.

Furthermore, in some embodiments, the representation of a function as having the form $f(x)=y$ is intended to signal that the dependence of the result of the function $f$ on a certain attribute x, but does not exclude the dependence of the result of the function $f$ on other attributes. In particular, the function $f$ may receive as input values additional attributes related to the user (e.g., attributes from a profile of the user, such as age, gender, and/or other attributes of profiles discussed in section 11—Personalization) and/or attributes about the experience (e.g., level of difficulty of a game, weather at a vacation destination, etc.) Thus, in some embodiments, a function of the form $f(x)=y$ may receive additional values besides x, and consequently, may provide different target values y, for the same x, when the additional values are different. In one example, a function that computes expected affective response to an experience based on the duration (how long) a user has an experience, may also receive as input a value representing the age of the user, and thus, may return different target values for different users (of different ages) for the same duration in the input value.

In some embodiments, a certain function may be considered to behave like another function of a certain form, e.g., the form $f(x)=y$. When the certain function is said to behave like the other function of the certain form, it means that, were the inputs of the certain function projected to the domain of the other function, the resulting projection of the certain function would resemble, at least in its qualitative behavior, the behavior of the other function. For example, projecting inputs of the certain function to the plane of x, should result in a function that resembles $f(x)$ in its shape and general behavior. It is to be noted that stating that the certain function may be considered to behave like $f(x)=y$ does not imply that x need be an input of the certain function, rather, that the input of the certain function may be projected (e.g., using some form of transformation) to a value x which may be used as an input for $f$.

Learning a function based on measurements of affective response may be done, in some embodiments described herein, by a function learning module, such as function learning module 280 or a function learning module denoted by another reference numeral (e.g., function learning modules 316, 325, 348, 350, 356, or 360). The various function learning modules described in this disclosure have similar characteristics. For example, function learning modules denoted by different reference numerals may be trained using the same algorithms and/or the function learning modules may comprise the same modules. The use of different reference numerals is typically done in order to indicate that the source data (i.e., the domain values) are of a certain type (e.g., one or more of the types of domain values mentioned above).

The data provided to the function learning module in order to learn parameters of a function typically comprises training samples of the form (x,y), where y is derived from a measurement of affective response and x is the corresponding domain value (e.g., x may be a duration of the experience to which the measurement corresponds). Since the value y in a training sample (x,y) is derived from a measurement of affective response (or may simply be a measurement of affective response that was not further processed), it may be referred to herein as "a measurement". It is to be noted that since data provided to the function learning module in embodiments described herein typically comes from multiple users, the function that is learned may be considered a crowd-based result.

In one example, a sample (x,y) provided to the function learning module represents an event in which a user stayed at a hotel. In this example, x may represent the number of days a user stayed at the hotel (i.e., the duration), and y may be an affective value indicating how much the user enjoyed the stay at the hotel (e.g., y may be based on measurements of the user obtained at multiple times during the stay). In this example, the function learning module may learn parameters of a function that describes the enjoyment level from staying at the hotel as a function of the duration of the stay.

There are various ways in which function learning modules described in this disclosure may be utilized to learn parameters of a function whose target includes values representing affective response to an experience. Following is a description of different exemplary approaches that may be used.

In some embodiments, the function learning module utilizes an algorithm for training a predictor to learn the parameters of a function of the form $f(x)=y$. Learning such parameters is typically performed by machine learning-based trainer 286, which typically utilizes a training algorithm to train a model for a machine learning-based predictor used predicts target values of the function ("y") for different domain values of the function ("x"). Section 6—Predictors and Emotional State Estimators, includes additional information regarding various approaches known in the art that may be utilized to train a machine learning-based predictor to compute a function of the form $f(x)=y$. Some examples of predictors that may be used for this task include regression models, neural networks, nearest neighbor predictors, support vector machines for regression, and/or decision trees.

Figure 54A:
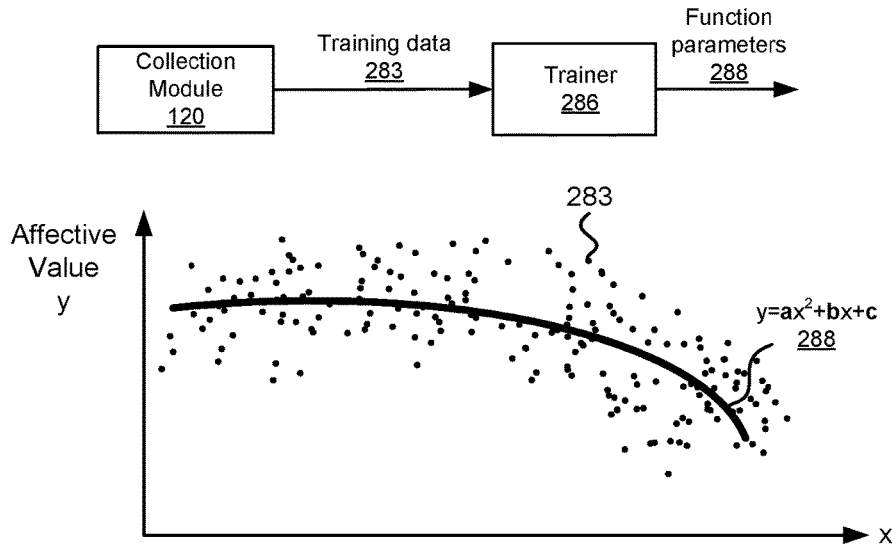
FIG. 54a illustrates one embodiment in which a machine learning-based trainer is utilized to learn a function representing an expected affective response (y) that depends on a numerical value (x)

FIG. 54a illustrates one embodiment in which the machine learning-based trainer 286 is utilized to learn a function representing an expected affective response (y) that depends on a numerical value (x). For example, x may represent how long a user sits in a sauna, and y may represent how well the user is expected to feel one hour after the sauna.

The machine learning-based trainer 286 receives training data 283, which is based on events in which users have a certain experience (following the example above, each dot in between the x/y axes repents a pair of values that includes time spent by a user in the sauna (the x coordinate) and a value indicating how the user felt after an hour (the y coordinate). The training data 283 includes values derived from measurements of affective response (e.g., how a user felt after the sauna is determined by measuring the user with a sensor). The output of the machine learning-based trainer 286 includes function parameters 288 (which are illustrated by the function curve they describe). In the illustrated example, assuming the function learned by the trainer 286 is described as a quadratic function, the parameters 288 may include the values of the coefficients a, b, and c corresponding to a quadratic function used to fit the training data 283. The machine learning-based trainer 286 is utilized in a similar fashion in other embodiments in this disclosure that involve learning other types of functions (with possibly other types of input data).

It is to be noted that when other types of machine-learning training algorithms are used, the parameters 288 may be different. For example, if the trainer 286 utilizes a support vector machine training algorithm, the parameters 288 may include data that describes samples from the training data that are chosen as support vectors. In another example, if the trainer 286 utilizes a neural network training algorithm, the parameters 288 may include parameters of weightings of input values and/or parameters indicating a topology utilized by a neural network.

In some embodiments, some of the measurements of affective response used to derive the training data 283 may be weighted. Thus, the trainer 286 may utilize weighted samples to train the model. For example, a weighting of the measurements may be the result of an output by the personalization module 130, weighting due to the age of the measurements, and/or some other form of weighting. Learning a function when the training data is weighted is commonly known in the art, and the machine learning-based trainer 286 may be easily configured to handle such data if needed.

Another approach for learning functions involves binning. In some embodiments, the function learning module may place measurements (or values derived from the measurements) in bins based on their corresponding domain values. Thus, for example, each training sample of the form (x,y), the value of x is used to determine what bin to place the sample in. After the training data is placed in bins, a representative value is computed for each bin; this value is computed from the y value of the samples in the bin, and typically represents some form of score for an experience (e.g., a score or an aftereffect). This score may be computed by one or more of the various scoring modules mentioned in this disclosure such as the scoring module 150 or the aftereffect scoring module 302.

Placing measurements into bins is typically done by a binning module, which examines a value (x) associated with a measurement (y) and places it, based on the value of x, in one or more bins. Examples of binning modules in this disclosure include binning modules referred to by reference numerals 313, 324, 347, 354, and 359. It is to be noted that the use of different reference numerals is done to indicate that the x values of the data are of a certain type (e.g., one or more of the types of domain values mentioned above).

For example, a binning module may place measurements into one hour bins representing the (rounded) hour during which they were taken. It is to be noted that, in some embodiments, multiple measurements may have the same associated domain value and be placed in a bin together. For example, a set comprising a prior and a subsequent measurement may be placed in a bin based on a single associated value (e.g., when used to compute an aftereffect the single value may be the time that had elapsed since having an experience).

The number of bins in which measurements are placed may vary between embodiments. However, typically the number of bins is at least two. Additionally, bins need not have the same size. In some embodiments, bins may have different sizes (e.g., a first bin may correspond to a period of one hour, while a second bin may correspond to a period of two hours).

In some embodiments, different bins may overlap; thus, some bins may each include measurements with similar or even identical corresponding parameters values ("x" values). In other embodiments, bins do not overlap. Optionally, the different bins in which measurements may be placed may represent a partition of the space of values of the parameters (i.e., a partitioning of possible "x" values).

Figure 54B:
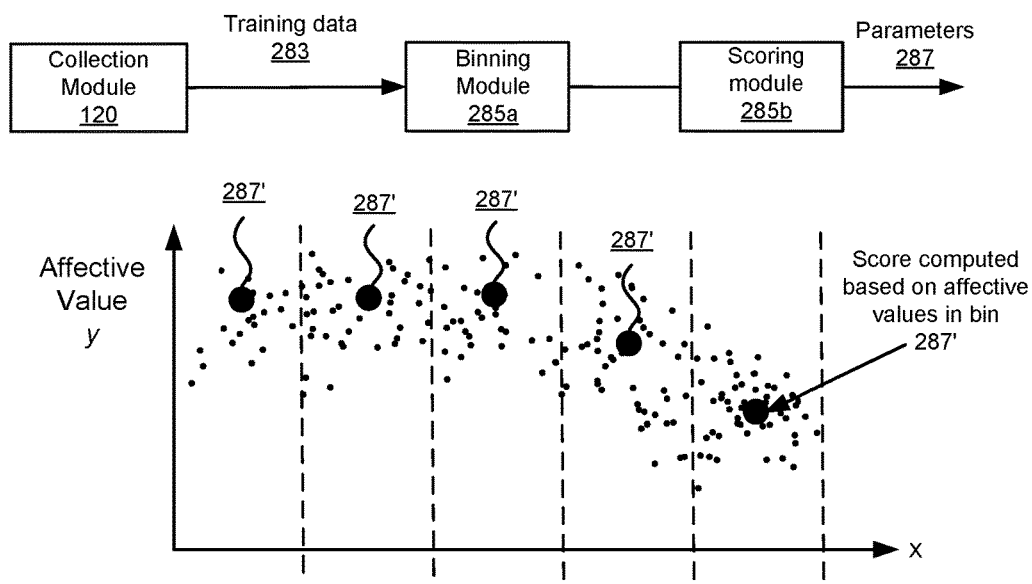
FIG. 54b illustrates one embodiment in which a binning approach is utilized for learning function parameters.

FIG. 54b illustrates one embodiment in which the binning approach is utilized for learning function parameters 287. The training data 283 is provided to binning module 285a, which separates the samples into different bins. In the illustration, each of the different bins falls between two vertical lines. The scoring module 285b then computes a score 287' for each of the bins based on the measurements that were assigned to each of the bins. In this illustration, the binning module 285a may be replaced by any one of the binning modules described in this disclosure; similarly, the scoring module 285b may be replaced by another scoring module described in this disclosure (e.g., the scoring module 150 or the aftereffect scoring module 302). Optionally, the function parameters 287 may include scores computed by the scoring module 285b (or the module that replaces it). Additionally or alternatively, the function parameters 287 may include values indicative of the boundaries of the bins to which the binning module 285a assigns samples, such as what ranges of x values cause samples to be assigned to certain bins.

In some embodiments, some of the measurements of affective response used to compute scores for bins may have associated weights (e.g., due to weighting based on the age of the measurements and/or weights from an output of the personalization module 130). Scoring modules described in this embodiment are capable of utilizing such weights when computing scores for bins.

In some embodiments, a function whose parameters are learned by a function learning module may be displayed on the display 252, which is configured to render a representation of the function and/or its parameters. For example, the function may be rendered as a graph, plot, and/or any other image that represents values given by the function and/or parameters of the function. Optionally, when presenting personalized functions $f_1$ and $f_2$ to different users, a rendered representation of the function $f_1$ that is forwarded to a certain first user is different from a rendered representation of the function $f_2$ that is forwarded to a certain second user.

In some embodiments, function comparator module 284 may receive two or more descriptions of functions and generate a comparison between the two or more functions. In one embodiment, a description of a function may include one or more values of parameters that describe the function, such as parameters of the function that were learned by the machine learning-based trainer 286. For example, the description of the function may include values of regression coefficients used by the function. In another embodiment, a description of a function may include one or more values of the function for certain input values and/or statistics regarding values the function gives to certain input values. In one example, the description of the function may include values such as pairs of the form (x,y) representing the function. In another example, the description may include statistics such as the average value y the function gives for certain ranges of values of x.

The function comparator module 284 may evaluate, and optionally report, various aspects of the functions. In one embodiment, the function comparator may indicate which function has a higher (or lower) value within a certain range and/or which function has a higher (or lower) integral value over the certain range of input values. Optionally, the certain range may include input values up to a certain x value, it may include input values from a certain value x and on, and/or include input values within specified boundaries (e.g., between certain values $x_1$ and $x_2$).

Results obtained from comparing functions may be utilized in various ways. In one example, the results are forwarded to a software agent that makes a decision regarding an experience for a user (e.g., what experience to choose, which experience is better to have for a certain duration etc.) In another example, the results are forwarded and rendered on a display, such as the display 252. In still another example, the results may be forwarded to a provider of experiences, e.g., in order to determine how and/or to whom to provide experiences.

In some embodiments, the function comparator module 284 may receive two or more descriptions of functions that are personalized for different users, and generate a comparison between the two or more functions. In one example, such a comparison may indicate which user is expected to have a more positive affective response under different conditions (corresponding to certain x values of the function).

18—Functions of Affective Response to Experiences

When a user has an experience, the experience may have an immediate impact on the affective response of the user. However, in some cases, having the experience may also have a delayed and/or residual impact on the affective response of the user. For example, going on a vacation can influence how a user feels after returning from the vacation. After having a nice, relaxing vacation a user may feel invigorated and relaxed, even days after returning from the vacation. However, if the vacation was not enjoyable, the user may be tense, tired, and/or edgy in the days after returning. In another example, eating a certain type of meal and/or participating in a certain activity (e.g., a certain type of exercise), might impact how a user feels later on. Having knowledge about the nature of the residual and/or delayed influence associated with an experience may help to determine whether a user should have the experience. Thus, there is a need to be able to evaluate experiences to determine not only their immediate impact on a user's affective response, but also their delayed and/or residual impact.

Some aspects of this disclosure involve learning functions that represent the aftereffect of an experience at different times after having the experience. Herein, an aftereffect of an experience may be considered a residual affective response a user may have due to having the experience. In some embodiments, determining the aftereffect is done based on measurements of affective response of users who had the experience (e.g., these may include measurements of at least five users, or some other minimal number of users such as at least ten users). The measurements of affective response are typically taken with sensors coupled to the users (e.g., sensors in wearable devices and/or sensors implanted in the users). One way in which aftereffects may be determined is by measuring users before and after they finish the experience. Having these measurements may enable assessment of how having the experience changed the users' affective response. Such measurements may be referred to herein as "prior" and "subsequent" measurements. A prior measurement may be taken before finishing an experience (or even before having started it) and a subsequent measurement is taken after finishing the experience. Typically, the difference between a subsequent measurement and a prior measurement, of a user who had an experience, is indicative of an aftereffect of the experience.

In some embodiments, an aftereffect function of an experience may be considered to behave like a function of the form $f(\Delta t)=v$, where $\Delta t$ represents a duration that has elapsed since finishing the experience and v represents the value of the aftereffect corresponding to the time $\Delta t$. In one example, v may be a value indicative of the extent the user is expected to have a certain emotional response, such as being happy, relaxed, and/or excited at a time that is $\Delta t$ after finishing the experience.

Various approaches may be utilized, in embodiments described herein, to learn parameters of the function mentioned above from the measurements of affective response. In some embodiments, the parameters of the aftereffect function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the function (e.g., $\Delta t$ mentioned above). Some examples of algorithmic approaches that may be used involve predictors that use regression models, neural networks, nearest neighbor predictors, support vector machines for regression, and/or decision trees. In other embodiments, the parameters of the aftereffect function may be learned using a binning-based approach. For example, the measurements (or values derived from the measurements) may be placed in bins based on their corresponding domain values. Thus, for example, each training sample of the form ($\Delta t$,v), the value of $\Delta t$ may be used to determine in which bin to place the sample. After the training data is placed in bins, a representative value is computed for each bin; this value is computed from the v values of the samples in the bin, and typically represents some form of aftereffect score for the experience.

Some aspects of this disclosure involve learning personalized aftereffect functions for different users utilizing profiles of the different users. Given a profile of a certain user, similarities between the profile of the certain user and profiles of other users are used to select and/or weight measurements of affective response of other users, from which an aftereffect function is learned. Thus, different users may have different aftereffect functions created for them, which are learned from the same set of measurements of affective response.

Figure 55A:
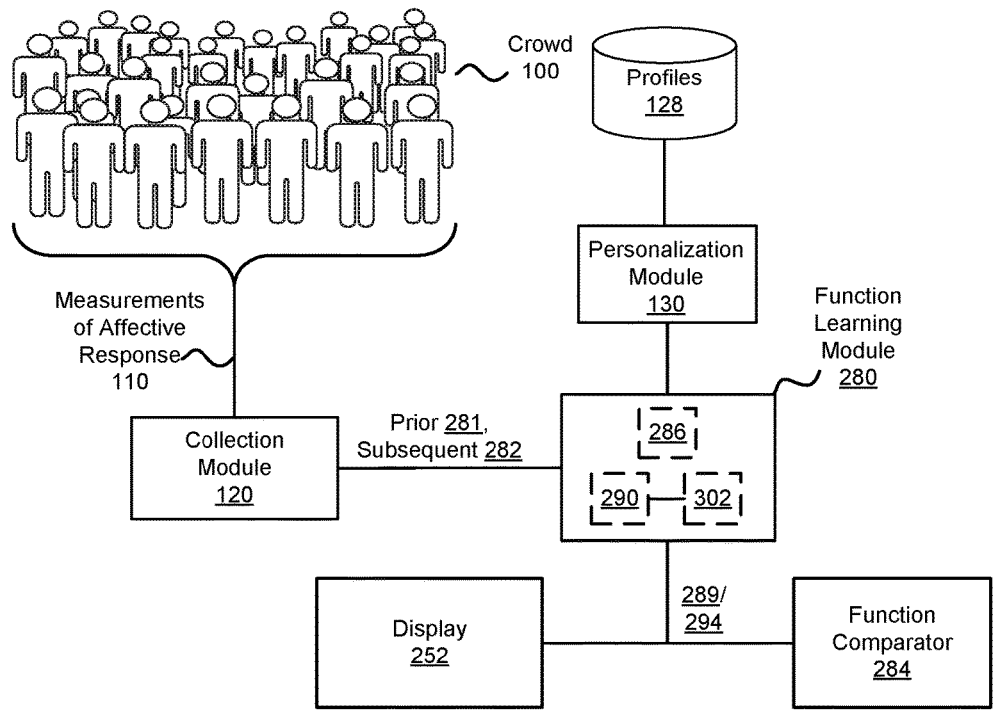
FIG. 55a illustrates a system configured to learn a function of an aftereffect of an experience.

FIG. 55a illustrates a system configured to learn a function of an aftereffect of an experience. The function learned by the system (also referred to as an "aftereffect function"), describes the extent of the aftereffect of the experience at different times since the experience ended. The system includes at least collection module 120 and function learning module 280. The system may optionally include additional modules, such as the personalization module 130, function comparator 284, and/or the display 252.

The collection module 120 is configured, in one embodiment, to receive measurements 110 of affective response of users. The measurements 110 are taken utilizing sensors coupled to the users (as discussed in more detail at least in section 1—Sensors and section 2—Measurements of Affective Response). In this embodiment, the measurements 110 include prior and subsequent measurements of at least ten users who had the experience (denoted with reference numerals 281 and 282, respectively). A prior measurement of a user, from among the prior measurements 281, is taken before the user finishes having the experience. Optionally, the prior measurement of the user is taken before the user starts having the experience. A subsequent measurement of the user, from among the subsequent measurements 282, is taken after the user finishes having the experience (e.g., after the elapsing of a duration of at least ten minutes from the time the user finishes having the experience). Optionally, the subsequent measurements 282 comprise multiple subsequent measurements of a user who had the experience, taken at different times after the user had the experience. Optionally, a difference between a subsequent measurement and a prior measurement of a user who had the experience is indicative of an aftereffect of the experience on the user.

In some embodiments, the prior measurements 281 and/or the subsequent measurements 282 are taken with respect to experiences of a certain length. In one example, each user, of whom a prior measurement and subsequent measurement are taken, has the experience for a duration that falls within a certain window. In one example, the certain window may be five minutes to two hours (e.g., if the experience involves exercising). In another example the certain window may be one day to one week (e.g., in an embodiment in which the experience involves going on a vacation).

In some embodiments, the subsequent measurements 282 include measurements taken after different durations had elapsed since finishing the experience. In one example, the subsequent measurements 282 include a subsequent measurement of a first user, taken after a first duration had elapsed since the first user finished the experience. Additionally, in this example, the subsequent measurements 282 include a subsequent measurement of a second user, taken after a second duration had elapsed since the second user finished the experience. In this example, the second duration is significantly greater than the first duration. Optionally, by "significantly greater" it may mean that the second duration is at least 25% longer than the first duration. In some cases, being "significantly greater" may mean that the second duration is at least double the first duration (or even longer than that).

Figure 55B:
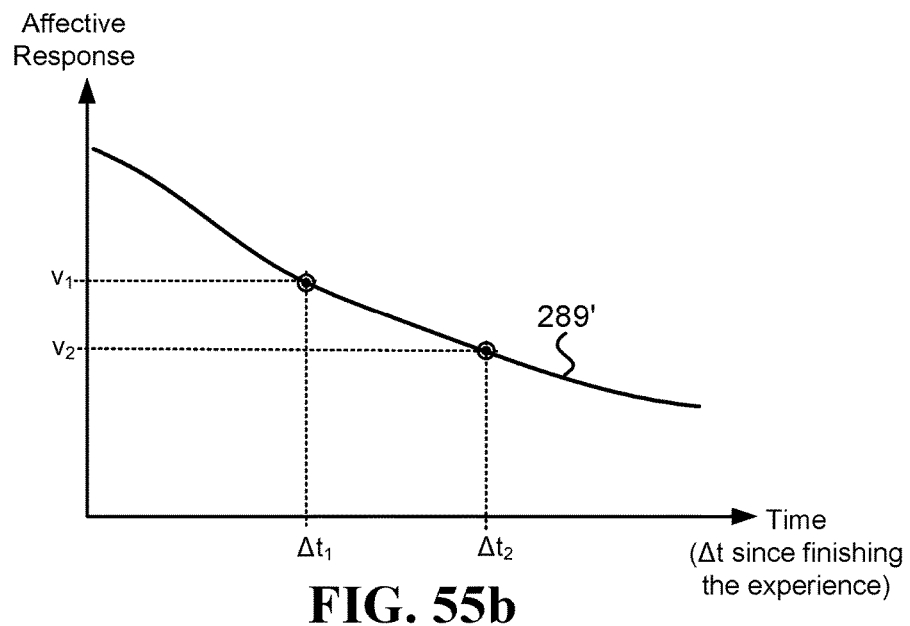
FIG. 55b illustrates an example of an aftereffect function depicted as a graph.

The function learning module 280 is configured, in one embodiment, to receive data comprising the prior and subsequent measurements, and to utilize the data to learn an aftereffect function. Optionally, the aftereffect function describes values of expected affective response after different durations since finishing the experience (the function may be represented by model comprising function parameters 289 and/or aftereffect scores 294, described below). FIG. 55b illustrates an example of an aftereffect function learned by the function learning module 280. The function is depicted as a graph 289' of the function whose parameters 289 are learned by the function learning module 280. The parameters 289 may be utilized to determine the expected value of an aftereffect of the experience after different durations have elapsed since a user finished having the experience. Optionally, the aftereffect function learned by the function learning module 280 (and represented by the parameters 289 or 294) is at least indicative of values $v_1$ and $v_2$ of expected affective response after durations $\Delta t_1$ and $\Delta t_2$ since finishing the experience, respectively. Optionally, $\Delta t_1 \neq \Delta t_2$ and $v_1 \neq v_2$. Optionally, $\Delta t_2$ is at least 25% greater than $\Delta t_1$. In one example, $\Delta t_1$ is at least ten minutes and $\Delta t_1$ is at least twenty minutes. In another example, $\Delta t_2$ is at least twice the duration $\Delta t_1$. FIG. 55b also illustrates a pair of points $(\Delta t_1, v_1)$ and $(\Delta t_2, v_2)$, where $\Delta t_1 \neq \Delta t_2$ and $v_1 \neq v_2$.

The prior measurements 281 may be utilized in various ways by the function learning module 280, which may slightly change what is represented by the aftereffect function. In one embodiment, a prior measurement of a user is utilized to compute a baseline affective response value for the user. In this embodiment, values computed by the aftereffect function may be indicative of differences between the subsequent measurements 282 of the at least ten users and baseline affective response values for the at least ten users. In another embodiment, values computed by the aftereffect function may be indicative of an expected difference between the subsequent measurements 282 and the prior measurements 281.

Following is a description of different configurations of the function learning module 280 that may be used to learn an aftereffect function of an experience. Additional details about the function learning module 280 may be found in this disclosure at least in section 17—Learning Function Parameters.

In one embodiment, the function learning module 280 utilizes machine learning-based trainer 286 to learn the parameters of the aftereffect function. Optionally, the machine learning-based trainer 286 utilizes the prior measurements 281 and the subsequent measurements 282 to train a model comprising parameters 289 for a predictor configured to predict a value of affective response of a user based on an input indicative of a duration that elapsed since the user finished having the experience. In one example, each pair comprising a prior measurement of a user and a subsequent measurement of a user taken at a duration $\Delta t$ after finishing the experience, is converted to a sample $(\Delta t, v)$, which may be used to train the predictor. Optionally, v is a value determined based on a difference between the subsequent measurement and the prior measurement and/or a difference between the subsequent measurement and baseline computed based on the prior measurement, as explained above.

When the trained predictor is provided inputs indicative of the durations $\Delta t_1$ and $\Delta t_2$, the predictor predicts the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters 289 comprise the parameters of the model and/or other data utilized by the predictor.

In an alternative embodiment, the function learning module 280 may utilize the binning module 290, which, in this embodiment, is configured to assign subsequent measurements 282 (along with their corresponding prior measurements) to one or more bins, from among a plurality of bins, based on durations corresponding to subsequent measurements 282. A duration corresponding to a subsequent measurement of a user is the duration that elapsed between when the user finished having the experience and when the subsequent measurement is taken. Additionally, each bin, from among the plurality of bins, corresponds to a range of durations.

For example, if the experience related to the aftereffect function involved going on a vacation, then the plurality of bins may correspond to the duration after the return from the vacation. In this example, the first bin may include subsequent measurements taken within the first 24 hours from the return from the vacation, the second bin may include subsequent measurements taken 24-48 hours after the return, the third bin may include subsequent measurements taken 48-72 hours after the return, etc. Thus, each bin includes subsequent measurements (possibly along with other data such as corresponding prior measurements), which may be used to compute a value indicative of the aftereffect a user may be expected to have after a duration, which corresponds to the bin, has elapsed since the finished having the experience.

Additionally, in this embodiment, the function learning module 280 may utilize the aftereffect scoring module 302, which, in one embodiment, is configured to compute a plurality of aftereffect scores 294 corresponding to the plurality of bins. An aftereffect score corresponding to a bin is computed based on prior and subsequent measurements of at least five users, from among the at least ten users. The measurements of the at least five users used to compute the aftereffect score corresponding to the bin were taken at a time $\Delta t$ after the end of the experience, and the time $\Delta t$ falls within the range of times that corresponds to the bin. Optionally, subsequent measurements used to compute the aftereffect score corresponding to the bin were assigned to the bin by the binning module 290. Optionally, with respect to the values $\Delta t_1$, $\Delta t_2$, $v_1$, and $v_2$ mentioned above, $\Delta t_1$ falls within a range of durations corresponding to a first bin, $\Delta t_2$ falls within a range of durations corresponding to a second bin, which is different from the first bin, and the values $v_1$ and $v_2$ are the aftereffect scores corresponding to the first and second bins, respectively.

In one embodiment, an aftereffect score for an experience is indicative of an extent of feeling at least one of the following emotions after having the experience: pain, anxiety, annoyance, stress, aggression, aggravation, fear, sadness, drowsiness, apathy, anger, happiness, contentment, calmness, attentiveness, affection, and excitement. Optionally, the aftereffect score is indicative of a magnitude of a change in the level of the at least one of the emotions due to having the experience.

Embodiments described herein in may involve various types of experiences for which an aftereffect function may be learned using the system illustrated in FIG. 55a. Following are a few examples of experiences and functions of aftereffects that may be learned. Additional details regarding the various types of experiences for which it may be possible to learn an aftereffect function may be found at least in section 3—Experiences in this disclosure.

Vacation—In one embodiment, the experience for which the aftereffect function is computed involves taking a vacation at a certain destination. For example, the certain destination may be a certain country, a certain city, a certain resort, a certain hotel, and/or a certain park. The aftereffect function in this embodiment may describe to what extent a user feels relaxed and/or happy (e.g., on a scale from 1 to 10) at a certain time after returning from the vacation; the certain time in this embodiment may be 0 to 10 days from the return from the vacation. Optionally, a prior measurement of the user may be taken before the user goes on the vacation (or while the user is on the vacation), and a subsequent measurement is taken at a time $\Delta t$ after the user returns from the vacation. Optionally, in addition to the input value indicative of $\Delta t$, the aftereffect function may receive additional input values. For example, in one embodiment, the aftereffect function receives an additional input value d indicative of how long the vacation was (i.e., how many days a user spent at the vacation destination). Thus, in this example, the aftereffect function may be considered to behave like a function of the form $f(\Delta t, d) = v$, and it may describe the affective response v a user is expected to feel at a time $\Delta t$ after spending a duration of d at the vacation destination.

Exercise—In one embodiment, the experience for which the aftereffect function is computed involves partaking in an exercise activity, such as Yoga, Zumba, jogging, swimming, golf, biking, etc. The aftereffect function in this embodiment may describe how well user feels (e.g., on a scale from 1 to 10) at a certain time after completing the exercise; the certain time in this embodiment may be 0 to 12 hours from when the user finished the exercise. Optionally, a prior measurement of the user may be taken before the user starts exercising (or while the user is exercising), and a subsequent measurement is taken at a time $\Delta t$ after the user finishes exercising. Optionally, in addition to the input value indicative of $\Delta t$, the aftereffect function may receive additional input values. For example, in one embodiment, the aftereffect function receives an additional input value d that is indicative of the duration of the exercise and/or of the difficulty level of the exercise. Thus, in this example, the aftereffect function may be considered to behave like a function of the form $f(\Delta t, d) = v$, and it may describe the affective response v, a user is expected to feel at a time $\Delta t$ after partaking an exercise for a duration d (and/or the exercise has a difficulty level that equals d).

Treatment—In one embodiment, the experience for which the aftereffect function is computed involves receiving a treatment, such as a massage, physical therapy, acupuncture, aroma therapy, biofeedback therapy, etc. The aftereffect function in this embodiment may describe to what extent a user feels relaxed (e.g., on a scale from 1 to 10) at a certain time after receiving the treatment; the certain time in this embodiment may be 0 to 12 hours from when the user finished the treatment. In this embodiment, a prior measurement of the user may be taken before the user starts receiving the treatment (or while the user receives the treatment), and a subsequent measurement is taken at a time $\Delta t$ after the user finishes receiving the treatment. Optionally, in addition to the input value indicative of $\Delta t$, the aftereffect function may receive additional input values. For example, in one embodiment, the aftereffect function receives an additional input value d that is indicative of the duration of the treatment. Thus, in this example, the aftereffect function may be considered to behave like a function of the form $f(\Delta t, d) = v$, and it may describe the affective response v a user is expected to feel at a time $\Delta t$ after receiving a treatment for a duration d.

Environment—In one embodiment, the experience for which the aftereffect function is computed involves spending time in an environment characterized by a certain environmental parameter being in a certain range. Examples of environmental parameters include temperature, humidity, altitude, air quality, and allergen levels. The aftereffect function in this example may describe how well a user feels (e.g., on a scale from 1 to 10) after spending time in an environment characterized by an environmental parameter being in a certain range (e.g., the temperature in the environment is between 10° F. and 30° F., the altitude is above 5000 ft., the air quality is good, etc.) The certain time in this embodiment may be 0 to 12 hours from the time the user left the environment. In this embodiment, a prior measurement of the user may be taken before the user enters the environment (or while the user is in the environment), and a subsequent measurement is taken at a time $\Delta t$ after the user leaves the environment. Optionally, in addition to the input value indicative of $\Delta t$, the aftereffect function may receive additional input values. In one example, the aftereffect function receives an additional input value d that is indicative of a duration spent in the environment. Thus, in this example, the aftereffect function may be considered to behave like a function of the form $f(\Delta t, d) = v$, and it may describe the affective response v a user is expected to feel at a time $\Delta t$ after spending a duration d in the environment. In another example, an input value may represent the environmental parameter. For example, an input value q may represent the air quality index (AQI). Thus, the aftereffect function in this example may be considered to behave like a function of the form $f(\Delta t, d, q) = v$, and it may describe the affective response v a user is expected to feel at a time $\Delta t$ after spending a duration d in the environment that has air quality q.

In some embodiments, aftereffect functions of different experiences are compared. Optionally, such a comparison may help determine which experience is better in terms of its aftereffect on users (and/or on a certain user if the aftereffect functions are personalized for the certain user). Comparison of aftereffect functions may be done utilizing the function comparator module 284, which, in one embodiment, is configured to receive descriptions of at least first and second aftereffect functions that describe values of expected affective response at different durations after finishing respective first and second experiences. The function comparator module 284 is also configured, in this embodiment, to compare the first and second functions and to provide an indication of at least one of the following: (i) the experience, from among the first and second experiences, for which the average aftereffect, from the time of finishing the respective experience until a certain duration $\Delta t$, is greatest; (ii) the experience, from among the first and second experiences, for which the average aftereffect, from a time starting at a certain duration $\Delta t$ after finishing the respective experience and onwards, is greatest; and (iii) the experience, from among the first and second experiences, for which at a time corresponding to elapsing of a certain duration $\Delta t$ since finishing the respective experience, the corresponding aftereffect is greatest. Optionally, comparing aftereffect functions may involve computing integrals of the functions, as described in more detail in section 17—Learning Function Parameters.

In some embodiments, the personalization module 130 may be utilized to learn personalized aftereffect functions for different users by utilizing profiles of the different users. Given a profile of a certain user, the personalization module 130 may generate an output indicative of similarities between the profile of the certain user and the profiles from among the profiles 128 of the at least ten users. Utilizing this output, the function learning module 280 can select and/or weight measurements from among the prior measurements 281 and subsequent measurements 282, in order to learn an aftereffect function personalized for the certain user, which describes values of expected affective response that the certain user may have, at different durations after finishing the experience. Additional information regarding personalization, such as what information the profiles 128 may contain, how to determine similarity between profiles, and/or how the output may be utilized, may be found in section 11—Personalization It is to be noted that personalized aftereffect functions are not necessarily the same for all users; for some input values, aftereffect functions that are personalized for different users may assign different target values. That is, for at least a certain first user and a certain second user, who have different profiles, the function learning module learns different aftereffect functions, denoted $f_1$ and $f_2$, respectively. In one example, $f_1$ is indicative of values $v_1$ and $v_2$ of expected affective responses after durations $\Delta t_1$ and $\Delta t_2$ since finishing the experience, respectively, and $f_2$ is indicative of values $v_3$ and $v_4$ of expected affective responses after the durations $\Delta t_1$ and $\Delta t_2$ since finishing the experience, respectively. Additionally, $\Delta t_1 \neq \Delta t_2$, $v_1 \neq v_2$, $v_3 \neq v_4$, and $v_1 \neq v_3$.

Figure 56:
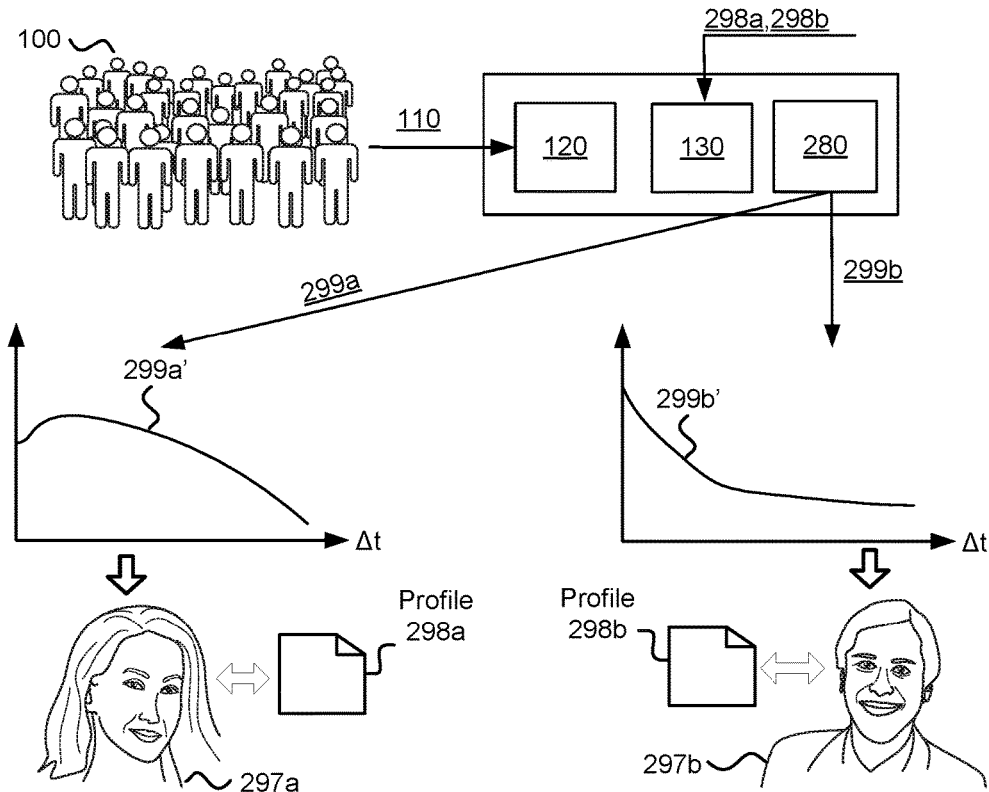
FIG. 56 illustrates different personalized functions of aftereffects that are generated for different users.

FIG. 56 illustrates such a scenario where personalized functions are generated for different users. In this illustration, certain first user 297a and certain second user 297b have different profiles 298a and 298b, respectively. Given these profiles, the personalization module 130 generates different outputs that are utilized by the function learning module 280 to learn functions 299a and 299b for the certain first user 297a and the certain second user 297b, respectively. The different functions are represented in FIG. 56 by different-shaped graphs for the functions 299a and 299b (graphs 299a' and 229b', respectively). The different functions indicate different expected aftereffect trends for the different users; namely, that the aftereffect of the certain second user 297b initially falls much quicker than the aftereffect of the certain first user 297a.

Figure 57:
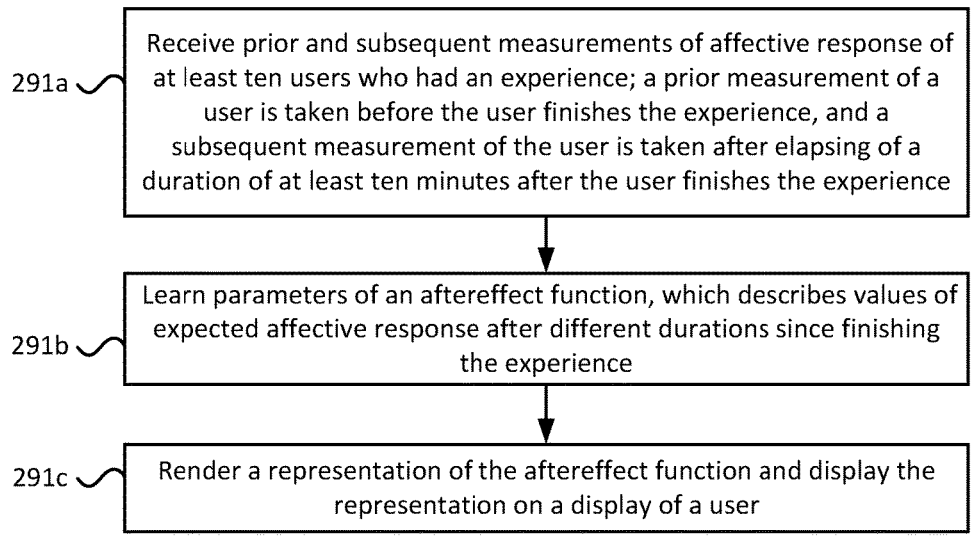
FIG. 57 illustrates steps involved in a method for learning a function describing an aftereffect of an experience.

FIG. 57 illustrates steps involved in one embodiment of a method for learning a function describing an aftereffect of an experience. The steps illustrated in FIG. 57 may be used, in some embodiments, by systems modeled according to FIG. 55a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for learning a function describing an aftereffect of an experience includes at least the following steps:

In Step 291a, receiving, by a system comprising a processor and memory, measurements of affective response of users taken utilizing sensors coupled to the users; the measurements comprising prior and subsequent measurements of at least ten users who had the experience. A prior measurement of a user is taken before the user finishes the experience (or even before the user starts having the experience). A subsequent measurement of the user is taken after the user finishes having the experience (e.g., after elapsing of a duration of at least ten minutes after the user finishes the experience). Optionally, the prior and subsequent measurements are received by the collection module 120.

And in Step 291b, learning parameters of an aftereffect function, which describes values of expected affective response after different durations since finishing the experience. Optionally, the aftereffect function is at least indicative of values $v_1$ and $v_2$ of expected affective response after durations $\Delta t_1$ and $\Delta t_e$ since finishing the experience, respectively; where $\Delta t_1 \neq \Delta t_2$ and $v_1 \neq v_2$. Optionally, the aftereffect function is learned utilizing the function learning module 280.

In one embodiment, Step 291a optionally involves utilizing a sensor coupled to a user who had the experience to obtain a prior measurement of affective response of the user and/or a subsequent measurement of affective response of the user. Optionally, Step 291a may involve taking multiple subsequent measurements of a user at different times after the user had the experience.

In some embodiments, the method may optionally include Step 291c that involves displaying the aftereffect function learned in Step 291b on a display such as the display 252. Optionally, displaying the aftereffect function involves rendering a representation of the aftereffect function and/or its parameters. For example, the aftereffect function may be rendered as a graph, plot, and/or any other image that represents values given by the aftereffect function and/or parameters of the aftereffect function.

As discussed above, parameters of an aftereffect function may be learned from measurements of affective response utilizing various approaches. Therefore, Step 291b may involve performing different operations in different embodiments.

In one embodiment, learning the parameters of the aftereffect function in Step 291b comprises utilizing a machine learning-based trainer that is configured to utilize the prior and subsequent measurements to train a model for a predictor configured to predict a value of affective response of a user based on an input indicative of a duration that elapsed since the user finished having the experience. Optionally, the values in the model are such that responsive to being provided inputs indicative of the durations $\Delta t_1$ and $\Delta t_2$, the predictor predicts the values $v_1$ and $v_2$, respectively.

In another embodiment, learning the parameters of the aftereffect function in Step 291b involves performing the following operations: (i) assigning subsequent measurements to a plurality of bins based on durations corresponding to subsequent measurements (a duration corresponding to a subsequent measurement of a user is the duration that elapsed between when the user finished having the experience and when the subsequent measurement is taken); and (ii) computing a plurality of aftereffect scores corresponding to the plurality of bins. Optionally, an aftereffect score corresponding to a bin is computed based on prior and subsequent measurements of at least five users, from among the at least ten users, selected such that durations corresponding to the subsequent measurements of the at least five users fall within the range corresponding to the bin; thus, each bin corresponds to a range of durations corresponding to subsequent measurements. Optionally, $\Delta t_1$ falls within a range of durations corresponding to a first bin, $\Delta t_2$ falls within a range of durations corresponding to a second bin, which is different from the first bin, and the values $v_1$ and $v_2$ are the aftereffect scores corresponding to the first and second bins, respectively.

In some embodiments, aftereffect functions learned by a method illustrated in FIG. 57 may be compared (e.g., utilizing the function comparator 284). Optionally, performing such a comparison involves the following steps: (i) receiving descriptions of first and second aftereffect functions that describe values of expected affective response at different durations after finishing respective first and second experiences; (ii) comparing the first and second aftereffect functions; and (iii) providing an indication derived from the comparison. Optionally, the indication indicates least one of the following: (i) the experience from among the first and second experiences for which the average aftereffect, from the time of finishing the respective experience until a certain duration $\Delta t$, is greatest; (ii) the experience from among the first and second experiences for which the average aftereffect, from a time starting at a certain duration $\Delta t$ after finishing the respective experience and onwards, is greatest; and (iii) the experience from among the first and second experiences for which at a time corresponding to elapsing of a certain duration $\Delta t$ since finishing the respective experience, the corresponding aftereffect is greatest.

An aftereffect function learned by a method illustrated in FIG. 57 may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn an aftereffect function personalized for the certain user that describes values of expected affective response at different durations after finishing the experience. Optionally, the output is generated utilizing the personalization module 130. Depending on the type of personalization approach used and/or the type of function learning approach used, the output may be utilized in various ways to learn an aftereffect function for the experience, as discussed in further detail above. Optionally, for at least a certain first user and a certain second user, who have different profiles, different aftereffect functions are learned, denoted $f_1$ and $f_2$, respectively. In one example, $f_1$ is indicative of values $v_1$ and $v_2$ of expected affective responses after durations $\Delta t_1$ and $\Delta t_2$ since finishing the experience, respectively, and $f_2$ is indicative of values $v_3$ and $v_4$ of expected affective responses after the durations $\Delta t_1$ and $\Delta t_2$ since finishing the experience, respectively. Additionally, in this example, $\Delta t_1 \neq \Delta t_2$, $v_1 \neq v_2$, $v_3 \neq v_4$, and $v_1 \neq v_3$.

Figure 58:
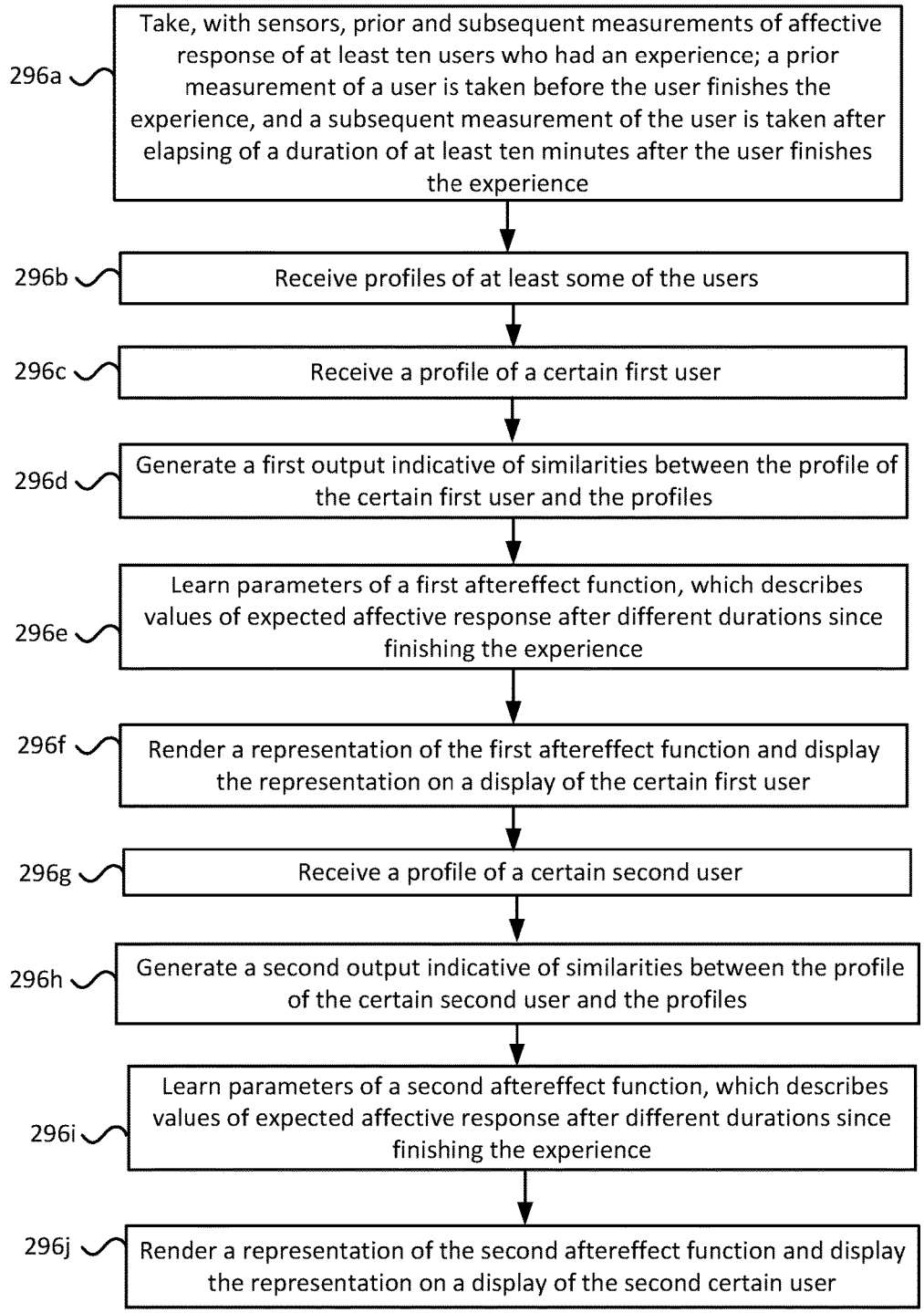
FIG. 58 illustrates steps involved in a method for utilizing profiles of users to learn a personalized function of an aftereffect of an experience.

Personalization of aftereffect functions can lead to the learning of different functions for different users who have different profiles, as illustrated in FIG. 56. Obtaining different aftereffect functions for different users may involve performing the steps illustrated in FIG. 58, which describes how steps carried out for learning a personalized function of an aftereffect of an experience. The steps illustrated in the figure may, in some embodiments, be part of the steps performed by systems modeled according to FIG. 55a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for utilizing profiles of users to learn a personalized function of an aftereffect of an experience includes the following steps:

In Step 296a, receiving, by a system comprising a processor and memory, measurements of affective response of users taken utilizing sensors coupled to the users; the measurements comprising prior and subsequent measurements of at least ten users who had the experience. A prior measurement of a user is taken before the user finishes the experience (or even before the user starts having the experience). A subsequent measurement of the user is taken after the user finishes having the experience (e.g., after elapsing of a duration of at least ten minutes after the user finishes the experience). Optionally, the prior and subsequent measurements are received by the collection module 120.

In Step 296b, receiving profiles of at least some of the users who contributed measurements in Step 296a. Optionally, the received profiles are from among the profiles 128.

In Step 296c, receiving a profile of a certain first user.

In Step 296d, generating a first output indicative of similarities between the profile of the certain first user and the profiles of the at least some of the users. Optionally, the first output is generated by the personalization module 130.

In Step 296e, learning, based on the measurements received in Step 296a and the first output, parameters of a first aftereffect function, which describes values of expected affective response after different durations since finishing the experience. Optionally, the first aftereffect function is at least indicative of values $v_1$ and $v_2$ of expected affective response after durations $\Delta t_1$ and $\Delta t_2$ since finishing the experience, respectively (here $\Delta t_1 \neq \Delta t_2$ and $v_1 \neq v_2$). Optionally, the first aftereffect function is learned utilizing the function learning module 280.

In Step 296g, receiving a profile of a certain second user, which is different from the profile of the certain first user.

In Step 296h, generating a second output, which is different from the first output, and is indicative of similarities between the profile of the certain second user and the profiles of the at least some of the users. Optionally, the first output is generated by the personalization module 130.

And in Step 296i, learning, based on the measurements received in Step 296a and the second output, parameters of a second aftereffect function, which describes values of expected affective response after different durations since finishing the experience. Optionally, the second aftereffect function is at least indicative of values $v_3$ and $v_4$ of expected affective response after the durations $\Delta t_1$ and $\Delta t_2$ since finishing the experience, respectively (here $v_3 \neq v_4$). Optionally, the second aftereffect function is learned utilizing the function learning module 280. In some embodiments, the first aftereffect function is different from the second aftereffect function, thus, in the example above the values $v_1 \neq v_3$ and/or $v_2 \neq v_4$.

In one embodiment, the method may optionally include steps that involve displaying an aftereffect function on a display such as the display 252 and/or rendering the aftereffect function for a display (e.g., by rendering a representation of the aftereffect function and/or its parameters). In one example, the method may include Step 296f, which involves rendering a representation of the first aftereffect function and/or displaying the representation of the first aftereffect function on a display of the certain first user. In another example, the method may include Step 296j, which involves rendering a representation of the second aftereffect function and/or displaying the representation of the second aftereffect function on a display of the certain second user.

In one embodiment, generating the first output and/or the second output may involve computing weights based on profile similarity. For example, generating the first output in Step 296d may involve the performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 296h may involve similar steps, mutatis mutandis, to the ones described above.

In another embodiment, the first output and/or the second output may involve clustering of profiles. For example, generating the first output in Step 296d may involve the performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 296h may involve similar steps, mutatis mutandis, to the ones described above.

Users may have various experiences in their day-to-day lives, which can be of various types. Some examples of experiences include, going on vacations, playing games, participating in activities, receiving a treatment, and more. Having an experience can have an impact on how a user feels by causing the user to have a certain affective response. One factor that may influence how a user feels due to having an experience is the duration of the experience. For example, going to a certain location for a vacation may be nice for a day or two, but spending a whole week at the location may be exasperating. In another example, listening to classical music might help a user to relax, but the influence of the music might take some time to accumulate. Thus, listening briefly only for a few minutes might hardly change how a user feels, but after listening to music for at least twenty minutes, most users will feel quite relaxed.

Having knowledge about the influence of the duration of an experience on the affective response of a user to the experience can help decide which experiences to have and/or how long to have them. Thus, there is a need to be able to evaluate experiences in order to determine the effect of the experiences' durations on the affective response of users who have the experiences.

Some aspects of embodiments described herein involve systems, methods, and/or computer-readable media that may be utilized to learn functions describing expected affective response to an experience based on how long a user has the experience (i.e., the duration of the experience). In some embodiments, determining the expected affective response is done based on measurements of affective response of users who had the experience (e.g., these may include measurements of at least five users, or measurements of some other minimal number of users, such as measurements of at least ten users). The measurements of affective response are typically taken with sensors coupled to the users (e.g., sensors in wearable devices and/or sensors implanted in the users). In some embodiments, these measurements include "prior" and "contemporaneous" measurements of users. A prior measurement of the user is taken before the user starts having the experience, or while the user has the experience, and a contemporaneous measurement of the user is taken after the prior measurement, at some time between a time the user starts having the experience and a time that is at most ten minutes after the user finishes having the experience. Typically, the difference between a contemporaneous measurement and a prior measurement, of a user who had an experience, is indicative of an affective response of the user to the experience.

In some embodiments, a function describing expected affective response to an experience based on how long a user has the experience may be considered to behave like a function of the form $f(d)=v$, where d represents a duration of the experience and v represents the value of the expected affective response after having the experience for the duration d. In one example, v may be a value indicative of the extent the user is expected to have a certain emotional response, such as being happy, relaxed, and/or excited after having the experience for a duration d.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the function (e.g., d mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (d,v), the value of d may be used to determine in which bin to place the sample. After the training data is placed in bins, a representative value is computed for each bin; this value is computed from the v values of the samples in the bin, and typically represents some form of score for the experience.

Some aspects of this disclosure involve learning personalized functions for different users utilizing profiles of the different users. Given a profile of a certain user, similarities between the profile of the certain user and profiles of other users are used to select and/or weight measurements of affective response of other users, from which a function is learned. Thus, different users may have different functions created for them, which are learned from the same set of measurements of affective response.

Figure 59A:
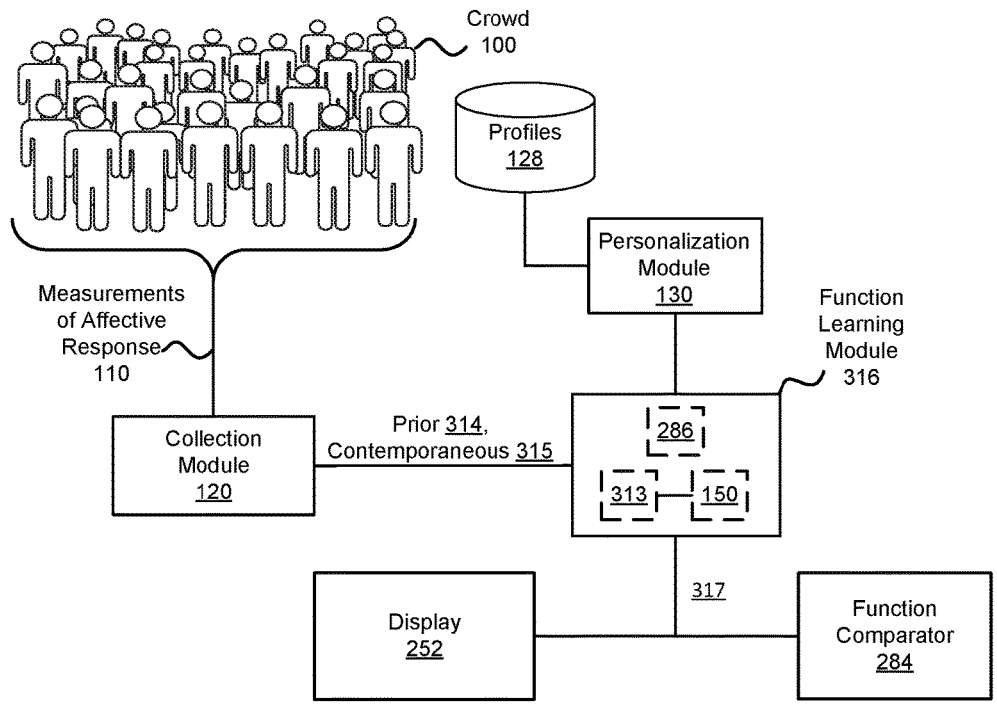
FIG. 59a illustrates a system configured to learn a function that describes a relationship between a duration of an experience and an affective response to the experience.

FIG. 59a illustrates a system configured to learn a function that describes, for different durations, values of expected affective response to an experience after having the experience for a certain duration, from among the different durations. The system includes at least collection module 120 and function learning module 316. The system may optionally include additional modules, such as the personalization module 130, function comparator 284, and/or the display 252.

The collection module 120 is configured, in one embodiment, to receive measurements 110 of affective response of users belonging to the crowd 100. The measurements 110 are taken utilizing sensors coupled to the users (as discussed in more detail at least in section 1—Sensors and section 2—Measurements of Affective Response). In this embodiment, the measurements 110 include prior measurements 314 and contemporaneous measurements 315 of affective response of at least ten users who have the experience. In one embodiment, a prior measurement of a user may be taken before the user starts having the experience. In another embodiment, the prior measurement of a user may be taken within a certain period from when the user started having the experience, such as within ten minutes from the starting the experience. In one embodiment, a contemporaneous measurement of the user is taken after the prior measurement of the user is taken, at a time that is between when the user starts having the experience and a time that is at most ten minutes after the user finishes having the experience. Optionally, the collection module 120 receives, for each pair comprising a prior measurement and contemporaneous measurement of a user an indication of how long the user had had the experience until the contemporaneous measurement was taken.

It is to be noted that the experience to which the measurements of the at least ten users relate may be any of the various experiences described in this disclosure, such as an experience involving being in a certain location, an experience involving engaging in a certain activity, consuming a certain segment of digital content, eating certain food, etc. Additional information regarding the types of experiences to which the measurements may relate may be found at least in section 3—Experiences.

In some embodiments, the contemporaneous measurements 315 comprise multiple contemporaneous measurements of a user who had the experience; where each of the multiple contemporaneous measurements of the user was taken after the user had had the experience for a different duration. Optionally, the multiple contemporaneous measurements of the user were taken at different times during the instantiation of an event in which the user had the experience (i.e., the user did not stop having the experience between when the multiple contemporaneous measurements were taken). Optionally, the multiple measurements correspond to different events in which the user had the experience.

In some embodiments, the measurements 110 include prior measurements and contemporaneous measurements of users who had the experience for durations of various lengths. In one example, the measurements 110 include a prior measurement of a first user and a contemporaneous measurement of the first user, taken after the first user had the experience for a first duration. Additionally, in this example, the measurements 110 include a prior measurement of a second user and a contemporaneous measurement of the second user, taken after the second user had the experience for a second duration. In this example, the second duration is significantly greater than the first duration. Optionally, by "significantly greater" it may mean that the second duration is at least 25% longer than the first duration. In some cases, being "significantly greater" may mean that the second duration is at least double the first duration (or even longer than that).

In one example, both a prior measurement of affective response of a user and a contemporaneous measurement of affective response of the user are taken while the user has the experience, at first and second times after the user started having the experience, respectively. In this example, the contemporaneous measurement is taken significantly later than the prior measurement. Optionally, "significantly later" may mean that the second time represents a duration that is at least twice as long as the duration represented by the first time.

The function learning module 316 is configured, in one embodiment, to receive data comprising the prior measurements 314 and the contemporaneous measurements 315, and to utilize the data to learn function 317. Optionally, the function 317 describes, for different durations, values of expected affective response corresponding to having the experience for a duration from among the different durations. Optionally, the function 317 may be described via its parameters, thus, learning the function 317, may involve learning the parameters that describe the function 317. In embodiments described herein, the function 317 may be learned using one or more of the approaches described further below.

Figure 59B:
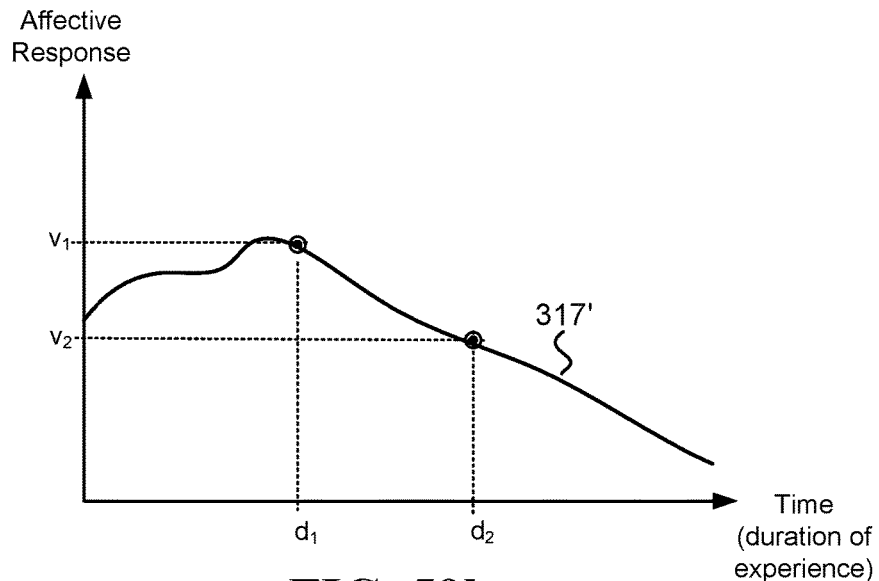
FIG. 59b illustrates an example of a representation of a function that describes a relationship between a duration of an experience and an affective response to the experience.

In some embodiments, the function 317 may be considered to perform a computation of the form $f(d)=v$, where the input d is a duration (i.e., the length of the experience), and the output v is an expected affective response (to having the experience for the duration d). Optionally, the output of the function 317 may be expressed as an affective value. In one example, the output of the function 317 is an affective value indicative of an extent of feeling at least one of the following emotions: pain, anxiety, annoyance, stress, aggression, aggravation, fear, sadness, drowsiness, apathy, anger, happiness, contentment, calmness, attentiveness, affection, and excitement. In some embodiments, the function 317 is not a constant function that assigns the same output value to all input values. Optionally, the function 317 is at least indicative of values $v_1$ and $v_2$ of expected affective response corresponding to having the experience for durations $d_1$ and $d_2$, respectively. That is, the function 317 is such that there are at least two values $d_1$ and $d_2$, for which $f(d_1)=v_1$ and $f(d_2)=v_2$. And additionally, $d_1 \neq d_2$ and $v_1 \neq v_2$. Optionally, $d_2$ is at least 25% greater than $d_1$. In one example, $d_1$ is at least ten minutes and $d_2$ is at least twenty minutes. In another example, $d_2$ is at least double the duration of $d_1$. FIG. 59b illustrates an example of a representation 317' of the function 317 with an example of the values $v_1$ and $v_2$ at the corresponding respective durations $d_1$ and $d_2$.

The prior measurements 314 may be utilized in various ways by the function learning module 316, which may slightly change what is represented by the function. In one embodiment, a prior measurement of a user is utilized to compute a baseline affective response value for the user. In this embodiment, the function 317 is indicative of expected differences between the contemporaneous measurements 315 of the at least ten users and baseline affective response values for the at least ten users. In another embodiment, the function 317 is indicative of expected differences between the contemporaneous measurements 315 of the at least ten users and the prior measurements 314 of the at least ten users.

Following is a description of different configurations of the function learning module 316 that may be used to learn the function 317. Additional details about the function learning module 316 may be found in this disclosure at least in section 17—Learning Function Parameters.

In one embodiment, the function learning module 316 utilizes the machine learning-based trainer 286 to learn parameters of the function 317. Optionally, the machine learning-based trainer 286 utilizes the prior measurements 314 and contemporaneous measurements 315 to train a model for a predictor that is configured to predict a value of affective response of a user based on an input indicative of a duration that elapsed since the user started having the experience. In one example, each pair comprising a prior measurement of a user and a contemporaneous measurement of the user taken after having the experience for a duration d, is converted to a sample (d,v), which may be used to train the predictor; where v is the difference between the values of the contemporaneous measurement and the prior measurement (or a baseline computed based on the prior measurement, as explained above).

When the trained predictor is provided inputs indicative of the durations $d_1$ and $d_2$ (mentioned above), the predictor utilizes the model to predict the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function 317 comprise the parameters of the model and/or other data utilized by the predictor.

In an alternative embodiment, the function learning module 316 may utilize binning module 313, which is configured, in this embodiment, to assign prior and contemporaneous measurements of users to a plurality of bins based on durations corresponding to the contemporaneous measurements. A duration corresponding to a contemporaneous measurement of a user is the duration that elapsed between when the user started having the experience and when the contemporaneous measurement is taken, and each bin corresponds to a range of durations corresponding to contemporaneous measurements. Optionally, when a prior measurement of a user is taken after the user starts having the experience, the duration corresponding to the contemporaneous measurement may be considered the difference between when the contemporaneous and prior measurements were taken.

Additionally, in this embodiment, the function learning module 316 may utilize the scoring module 150, or some other scoring module described in this disclosure, to compute a plurality of scores corresponding to the plurality of bins. A score corresponding to a bin is computed based on contemporaneous measurements assigned to the bin, and the prior measurements corresponding to the contemporaneous measurements in the bin. The contemporaneous measurements used to compute a score corresponding to a bin belong to at least five users, from the at least ten users. Optionally, with respect to the values $d_1$, $d_2$, $v_1$, and $v_2$ mentioned above, $d_1$ falls within a range of durations corresponding to a first bin, $d_2$ falls within a range of durations corresponding to a second bin, which is different from the first bin, and the values $v_1$ and $v_2$ are based on the scores corresponding to the first and second bins, respectively. In one example, a score corresponding to a bin represents the difference between the contemporaneous and prior measurements corresponding to the bin. In another example, a score corresponding to a bin may represent the difference between the contemporaneous measurements corresponding to the bin and baseline values computed based on the prior measurements corresponding to the bin.

In one embodiment, the parameters of the function 317 comprise the scores corresponding to the plurality of bins and/or information related to the bins themselves (e.g., information indicative of the boundaries of the bins).

In one example, the experience related to the function 317 involves going on a vacation to a destination. In this example, the plurality of bins may correspond to the duration the user was at the vacation destination (when a contemporaneous measurement is taken); the first bin may include contemporaneous measurements taken within the first 24 hours of the vacation, the second bin may include subsequent contemporaneous measurements taken 24-48 hours into the vacation, the third bin may include contemporaneous measurements taken 48-72 hours into the vacation, etc. Thus, each bin includes contemporaneous measurements (possibly along with other data such as corresponding prior measurements), which may be used to compute a score indicative of the expected affective response of a user who is at the vacation destination for a time that falls within the range corresponding to the bin.

Embodiments described herein in may involve various types of experiences for which the function 317 may be learned using the system illustrated in FIG. 59a; the following are a few examples of such experiences. Additional details regarding the various types of experiences may be found at least in section 3—Experiences.

Vacation—In one embodiment, the experience for which a function that describes a relationship between a duration of an experience and an affective response to the experience is learned involves taking a vacation at a certain destination. For example, the certain destination may be a certain country, a certain city, a certain resort, a certain hotel, and/or a certain park. The function in this example may describe to what extent a user feels relaxed and/or happy (e.g., on a scale from 1 to 10) after spending a certain time at the certain destination; the certain time in this example may be 0 to 10 days. In this embodiment, a prior measurement of the user may be taken before the user goes on the vacation and a contemporaneous measurement is taken at a time d into the vacation (e.g., at a time d after arriving at the certain destination).

Exercise—In one embodiment, the experience for which a function that describes a relationship between a duration of an experience and an affective response to the experience is learned involves partaking in an exercise activity, such as Yoga, Zumba, jogging, swimming, golf, biking, etc. The function in this example may describe how well user feels (e.g., on a scale from 1 to 10) after a certain duration of exercising (e.g., the certain time may be a value between 0 and 120 minutes). In this embodiment, a prior measurement of the user may be taken before the user starts exercising, and a contemporaneous measurement is taken at a time d into the exercising (e.g., d minutes after starting the exercise).

Virtual World—In one embodiment, the experience for which a function that describes a relationship between a duration of an experience and an affective response to the experience is learned involves spending time in a virtual environment, e.g., by playing a multiplayer online role-playing game (MMORPG). In one example, the function may describe to what extent a user feels excited (or bored), e.g., on a scale from 1 to 10, after being in the virtual environment for a session lasting a certain time. The certain time in this example may be 0 to 24 hours of consecutive time spent in the virtual environment. In another example, the certain time spent in the virtual environment may refer to a cumulative amount of time spent in the virtual environment, over multiple sessions spanning days, months, and even years. In this embodiment, a prior measurement of the user may be taken before the user logs into a server hosting the virtual environment (or within a certain period, e.g., up to 30 minutes from when the user logged in), and a contemporaneous measurement is taken after spending a time d in the virtual environment (e.g., d hours after logging in).

Environment—In one embodiment, the experience for which a function that describes a relationship between a duration of an experience and an affective response to the experience is learned involves spending time in an environment characterized by a certain environmental parameter being in a certain range. Examples of environmental parameters include temperature, humidity, altitude, air quality, and allergen levels. The function in this example may describe how well a user feels (e.g., on a scale from 1 to 10) after spending a certain period of time in an environment characterized by an environmental parameter being in a certain range (e.g., the temperature in the environment is between 10° F. and 30° F., the altitude is above 5000 ft., the air quality is good, etc.) In this embodiment, a prior measurement of the user may be taken before the user enters the environment (or up to a certain period of time such as the first 30 minutes in the environment), and a contemporaneous measurement is taken after spending a time d after in the environment. Optionally, in addition to the input value indicative of d, the function may receive additional input values. In one example, the function receives an additional input value that represents the environmental parameter. For example, an input value q may represent the air quality index (AQI). Thus, the function in this example may be considered to behave like a function of the form $f(d,q)=v$, and it may describe the affective response v a user is expected after spending a duration d in the environment that has air quality q.

Functions computed for different experiences may be compared, in some embodiments. Such a comparison may help determine what experience is better in terms of expected affective response after a certain duration of having the experience. Comparison of functions may be done, in some embodiments, utilizing the function comparator module 284, which is configured, in one embodiment, to receive descriptions of at least first and second functions that involve having respective first and second experiences (with each function describing values of expected affective response after having the respective experience for different durations). The function comparator module 284 is also configured, in this embodiment, to compare the first and second functions and to provide an indication of at least one of the following: (i) the experience, from among the first and second experiences, for which the average affective response to having the respective experience, for a duration that is at most a certain duration d, is greatest; (ii) the experience, from among the first and second experiences, for which the average affective response to having the respective experience, for a duration that is at least a certain duration d, is greatest; and (iii) the experience, from among the first and second experiences, for which the affective response to having the respective experience, for a certain duration d, is greatest. Optionally, comparing the first and second functions may involve computing integrals of the functions, as described in more detail in section 17—Learning Function Parameters.

In some embodiments, the personalization module 130 may be utilized, by the function learning module 316, to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 316 may be configured to utilize the output to learn a personalized function for the certain user (i.e., a personalized version of the function 317), which describes, for different durations, values of expected affective response to an experience after having the experience for a certain duration, from among the different durations.

It is to be noted that personalized functions are not necessarily the same for all users. That is, at least a certain first user and a certain second user, who have different profiles, the function learning module 316 learns different functions, denoted $f_1$ and $f_2$, respectively. In one example, the function $f_1$ is indicative of values $v_1$ and $v_2$ of expected affective response corresponding to having the experience for durations $d_1$ and $d_2$, respectively, and $f_2$ is indicative of values $v_3$ and $v_4$ of expected affective response corresponding to having the experience for the durations $d_1$ and $d_2$, respectively. And additionally, $d_1 \neq d_2$, $v_1 \neq v_2$, $v_3 \neq v_4$, and $v_1 \neq v_3$.

Figure 60:
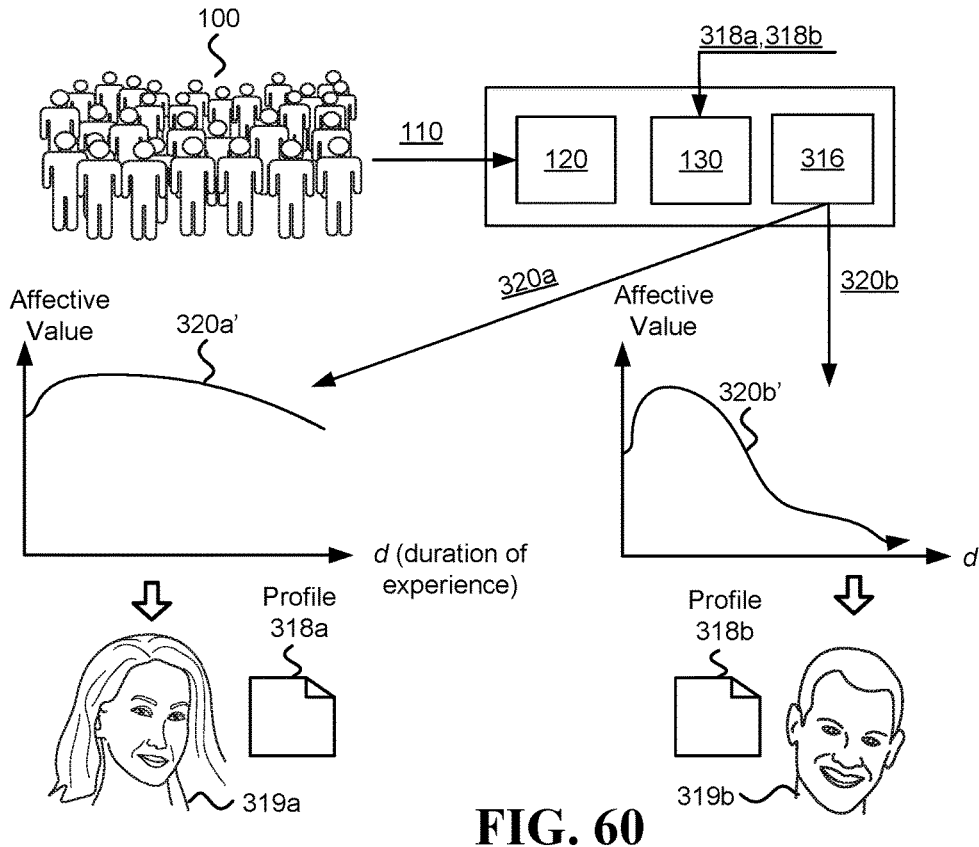
FIG. 60 illustrates different personalized functions, describing a relationship between a duration of an experience and affective response to the experience.

FIG. 60 illustrates such a scenario where personalized functions are generated for different users. In this illustration, certain first user 319a and certain second user 319b have different profiles 318a and 318b, respectively. Given these profiles, the personalization module 130 generates different outputs that are utilized by the function learning module to learn functions 320a and 320b for the certain first user 319a and the certain second user 319b, respectively. The different functions are represented in FIG. 60 by different-shaped graphs for the functions 320a and 320b (graphs 320a' and 320b', respectively). The different functions indicate different expected affective response trends for the different users, indicative of values of expected affective response to having the experience for a duration from among the different durations. For example, the illustration shows that the affective response of the certain second user 319b is expected to taper off more quickly as the certain second user has the experience for longer durations, while the certain first user 319a is expected to have a more positive affective response, which is expected to decrease at a slower rate compared to the certain second user 319b.

Figure 61:
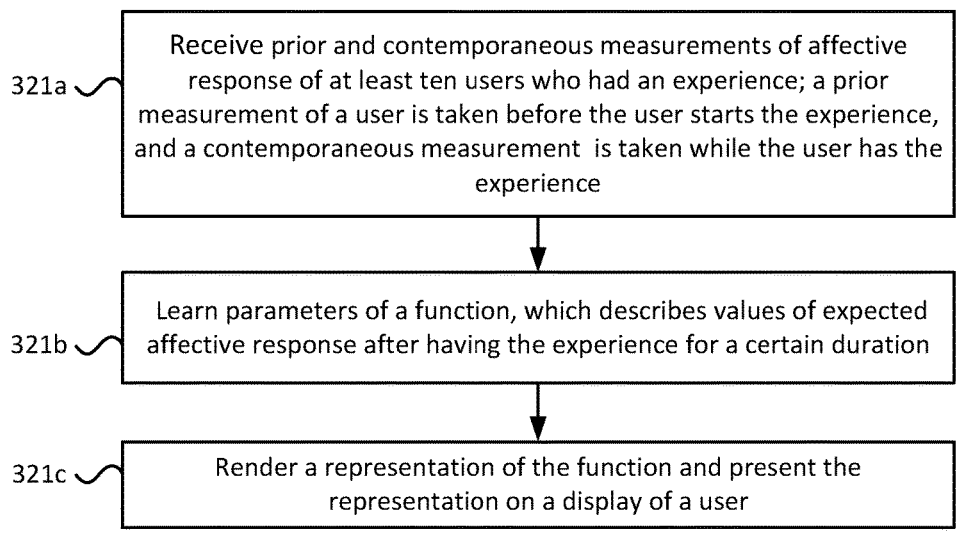
FIG. 61 illustrates steps involved in a method for learning a function that describes a relationship between a duration of an experience and an affective response to the experience.

FIG. 61 illustrates steps involved in one embodiment of a method for learning a function that describes a relationship between a duration of an experience and an affective response to the experience. For example, the function describes, for different durations, expected affective response of a user after the user has the experience for a certain duration from among the different durations. The steps illustrated in FIG. 61 may be used, in some embodiments, by systems modeled according to FIG. 59a. In some embodiments, instructions for implementing the method may be stored on a computer-readable medium, which may optionally be a non-transitory computer-readable medium. In response to execution by a system including a processor and memory, the instructions cause the system to perform operations of the method.

In one embodiment, the method for learning a function that describes the relationship between a duration of an experience and an affective response to the experience includes at least the following steps:

In Step 321a, receiving, by a system comprising a processor and memory, measurements of affective response of users taken utilizing sensors coupled to the users; the measurements comprising prior and contemporaneous measurements of at least ten users who had the experience. Optionally, the prior and contemporaneous measurements are received by the collection module 120. Optionally, the prior and contemporaneous measurements are the prior measurements 314 and contemporaneous measurements 315 of affective response of the at least ten users, described above.

And in Step 321b, learning parameters of a function, which describes, for different durations, values of expected affective response after having the experience for a certain duration. Optionally, the function that is learned is the function 317 mentioned above. Optionally, the function is at least indicative of values $v_1$ and $v_2$ of expected affective response after having the experience for durations $d_1$ and $d_2$, respectively; where $d_1 \neq d_2$ and $v_1 \neq v_2$. Optionally, the function is learned utilizing the function learning module 316. Optionally, $d_2$ is at least 25% greater than $d_1$.

In one embodiment, Step 321a optionally involves utilizing a sensor coupled to a user who had the experience to obtain a prior measurement of affective response of the user and/or a contemporaneous measurement of affective response of the user. Optionally, Step 321a may involve taking multiple contemporaneous measurements of a user at different times while having the experience.

In some embodiments, the method may optionally include Step 321c that involves presenting the function learned in Step 321b on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 321b may involve performing different operations in different embodiments.

In one embodiment, learning the parameters of the function in Step 321b comprises utilizing a machine learning-based trainer that is configured to utilize the prior and contemporaneous measurements to train a model for a predictor configured to predict a value of affective response of a user based on an input indicative of a duration that elapsed since the user started having the experience. Optionally, with respect to the values $d_1$, $d_2$, $v_1$, and $v_2$ mentioned above, the values in the model are such that responsive to being provided inputs indicative of the durations $d_1$ and $d_2$, the predictor predicts the values $v_1$ and $v_2$, respectively.

In another embodiment, learning the parameters of the function in Step 321b involves the following operations: (i) assigning contemporaneous measurements to a plurality of bins based on durations corresponding to contemporaneous measurements (a duration corresponding to a contemporaneous measurement of a user is the duration that elapsed between when the user started having the experience and when the contemporaneous measurement is taken); and (ii) computing a plurality of scores corresponding to the plurality of bins. Optionally, a score corresponding to a bin is computed based on prior and contemporaneous measurements of at least five users, from among the at least ten users, selected such that durations corresponding to the contemporaneous measurements of the at least five users, fall within the range corresponding to the bin; thus, each bin corresponds to a range of durations corresponding to contemporaneous measurements. Optionally, with respect to the values $d_1$, $d_2$, $v_1$, and $v_2$ mentioned above, $d_1$ falls within a range of durations corresponding to a first bin, $d_2$ falls within a range of durations corresponding to a second bin, which is different from the first bin, and the values $v_1$ and $v_2$ are based on the scores corresponding to the first and second bins, respectively.

In some embodiments, functions learned by the method illustrated in FIG. 61 may be compared (e.g., utilizing the function comparator 284). Optionally, performing such a comparison involves the following steps: (i) receiving descriptions of first and second functions that describe, for different durations, values of expected affective response to having respective first and second experiences for a duration from among the different durations; (ii) comparing the first and second functions; and (iii) providing an indication derived from the comparison. Optionally, the indication indicates least one of the following: (i) the experience, from among the first and second experiences, for which the average affective response when having the respective experience for a duration that is at most a certain duration d, is greatest; (ii) the experience, from among the first and second experiences, for which the average affective response when having the respective experience for a duration that is at least a certain duration d, is greatest; and (iii) the experience, from among the first and second experiences, for which when having the respective experience for a certain duration d, the corresponding affective response is greatest.

A function learned by a method illustrated in FIG. 61 may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function personalized for the certain user that describes, for different durations, expected values of affective response to having the experience for a duration from among the different durations. Optionally, the output is generated utilizing the personalization module 130. Depending on the type of personalization approach used and/or the type of function learning approach used, the output may be utilized in various ways to learn the function, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected affective responses after having the experience for durations $d_1$ and $d_2$, respectively, and $f_2$ is indicative of values $v_3$ and $v_4$ of expected affective responses after having the experience for the durations $d_1$ and $d_2$, respectively. Additionally, in this example, $d_1 \neq d_2$, $v_1 \neq v_2$, $v_3 \neq v_4$, and $v_1 \neq v_3$.

Figure 62:
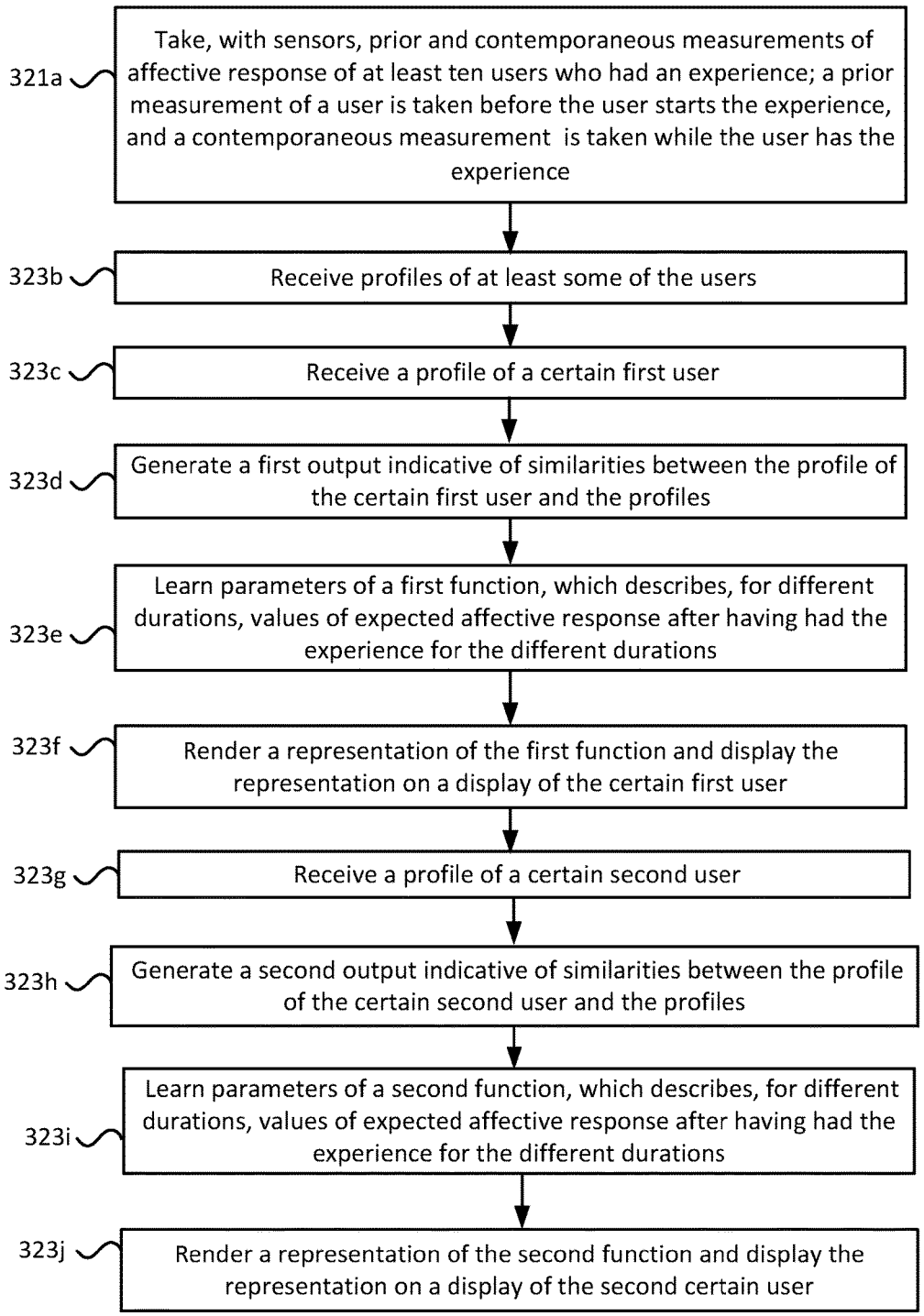
FIG. 62 illustrates steps involved in a method for utilizing profiles of users to learn a personalized function, which describes a relationship between a duration of an experience and an affective response to the experience.

Personalization of functions can lead to the learning of different functions for different users who have different profiles, as illustrated in FIG. 60. Obtaining different functions for different users may involve performing the steps illustrated in FIG. 62, which describes how steps carried out for learning a personalized function that describes, for different durations, expected affective response to having an experience for a duration from among the different durations. The steps illustrated in the figure may, in some embodiments, be part of the steps performed by systems modeled according to FIG. 59a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for utilizing profiles of users to learn a personalized function, which describes a relationship between a duration of an experience and an affective response to the experience, includes the following steps:

In Step 323a, receiving, by a system comprising a processor and memory, measurements of affective response of users taken utilizing sensors coupled to the users; the measurements comprising prior and contemporaneous measurements of at least ten users who had the experience. Optionally, the prior and contemporaneous measurements are received by the collection module 120. Optionally, the prior and contemporaneous measurements are the prior measurements 314 and contemporaneous measurements 315 of affective response of at least ten users, described above.

In Step 323b, receiving profiles of at least some of the users who contributed measurements in Step 323a.

In Step 323c, receiving a profile of a certain first user.

In Step 323d, generating a first output indicative of similarities between the profile of the certain first user and the profiles of the at least some of the users. Optionally, the first output is generated by the personalization module 130.

In Step 323e, learning, based on the measurements received in Step 323a and the first output, parameters of a first function $f_1$, which describes, for different durations, values of expected affective response to the experience after having it for a duration from among the different durations. Optionally, the first function $f_1$ is at least indicative of values $v_1$ and $v_2$ of expected affective response after having the experience for durations $d_1$ and $d_2$, respectively (here $d_1 \neq d_2$ and $v_1 \neq v_2$). Optionally, the first function $f_1$ is learned utilizing the function learning module 316.

In Step 323g, receiving a profile of a certain second user, which is different from the profile of the certain first user.

In Step 323h, generating a second output, which is different from the first output, and is indicative of similarities between the profile of the certain second user and the profiles of the at least some of the users. Optionally, the second output is generated by the personalization module 130.

And in Step 323*i*, learning, based on the measurements received in Step 323*a* and the second output, parameters of a second function $f_2$, which describes, for different durations, values of expected affective response to the experience after having it for a duration from among the different durations. Optionally, the second function $f_2$ is at least indicative of values $v_3$ and $v_4$ of expected affective response after having the experience for the durations $d_1$ and $d_2$, respectively (here $v_3 \neq v_4$). Optionally, the second function $f_2$ is learned utilizing the function learning module 316. In some embodiments, $f_1$ is different from $f_2$, thus, in the example above the values $v_1 \neq v_3$ and/or $v_2 \neq v_4$.

In one embodiment, the method may optionally include steps that involve displaying a function on a display such as the display 252 and/or rendering the function for a display (e.g., by rendering a representation of the function and/or its parameters). In one example, the method may include Step 323*f*, which involves rendering a representation of $f_1$ and/or displaying the representation of $f_1$ on a display of the certain first user. In another example, the method may include Step 323*j*, which involves rendering a representation of $f_2$ and/or displaying the representation of $f_2$ on a display of the certain second user.

In one embodiment, generating the first output and/or the second output may involve computing weights based on profile similarity. For example, generating the first output in Step 323*d* may involve the performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 323*h* may involve similar steps, mutatis mutandis, to the ones described above.

In another embodiment, the first output and/or the second output may involve clustering of profiles. For example, generating the first output in Step 323*d* may involve the performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 323*h* may involve similar steps, mutatis mutandis, to the ones described above.

In some embodiments, the method may optionally include additional steps involved in comparing the functions $f_1$ and $f_2$: (i) receiving descriptions of the functions $f_1$ and $f_2$; (ii) making a comparison between the functions $f_1$ and $f_2$; and (iii) providing, based on the comparison, an indication of at least one of the following: (i) the function, from among $f_1$ and $f_2$, for which the average affective response predicted to having the experience for a duration that is at most a certain duration d, is greatest; (ii) the function, from among $f_1$ and $f_2$, for which the average affective response predicted to having the experience for a duration that is at least a certain duration d, is greatest; and (iii) the function, from among $f_1$ and $f_2$, for which the affective response predicted to having the experience for a certain duration d, is greatest.

Users may have various experiences in their day-to-day lives, which can be of various types. Some examples of experiences include, going on vacations, playing games, participating in activities, receiving a treatment, and more. Having an experience can have an impact on how a user feels by causing the user to have a certain affective response. The impact of an experience on the affective response a user that had the experience may last a certain period of time after the experience. Such a post-experience impact on affective response may be referred to as an "aftereffect" of the experience. One factor that may influence the extent of the aftereffect of an experience is the duration of the experience. For example, going to a certain location for a vacation may be relaxing. However, if a user only goes on the vacation for two days, upon returning from the vacation the user might not be fully relaxed (two days were not sufficient to recuperate). However, if the user goes for five days or more, upon returning, the user is likely to be completely relaxed.

Having knowledge about the influence of the duration of an experience on the aftereffect of the experience can help decide which experiences to have and/or for how long to have them. Thus, there is a need to be able to evaluate experiences in order to determine the effect of the experiences' durations on the aftereffects of the experiences.

Some aspects of this disclosure involve learning functions that represent the extent of an aftereffect of an experience, after having had the experience for different durations. Herein, an aftereffect of an experience may be considered a residual affective response a user may have due to having the experience. In some embodiments, determining the aftereffect is done based on measurements of affective response of users who had the experience (e.g., these may include measurements of at least five users, or some other minimal number of users such as at least ten users). The measurements of affective response are typically taken with sensors coupled to the users (e.g., sensors in wearable devices and/or sensors implanted in the users). One way in which aftereffects may be determined is by measuring users before and after they finish the experience for a certain duration. Having these measurements may enable assessment of how having the experience for the certain duration changed the users' affective response. Such measurements may be referred to herein as "prior" and "subsequent" measurements. A prior measurement may be taken before finishing an experience (or even before having started it) and a subsequent measurement is taken after finishing the experience. Typically, the difference between a subsequent measurement and a prior measurement, of a user who had an experience, is indicative of an aftereffect of the experience.

In some embodiments, a function describing an expected aftereffect of an experience based on the duration of the experience may be considered to behave like a function of the form $f(d)=v$, where d represents a duration of the experience and v represents the value of the aftereffect after having had the experience for the duration d. In one example, v may be a value indicative of the extent the user is expected to have a certain emotional response, such as being happy, relaxed, and/or excited after having the experience for a duration d.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the function (e.g., d mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (d,v), the value of d may be used to determine in which bin to place the sample. After the training data is placed in bins, a representative value is computed for each bin; this value is computed from the v values of the samples in the bin, and typically represents some form of aftereffect score for the experience.

Some aspects of this disclosure involve learning personalized functions for different users utilizing profiles of the different users. Given a profile of a certain user, similarities between the profile of the certain user and profiles of other users are used to select and/or weight measurements of affective response of other users, from which a function is learned. Thus, different users may have different functions created for them, which are learned from the same set of measurements of affective response.

Figure 63A:
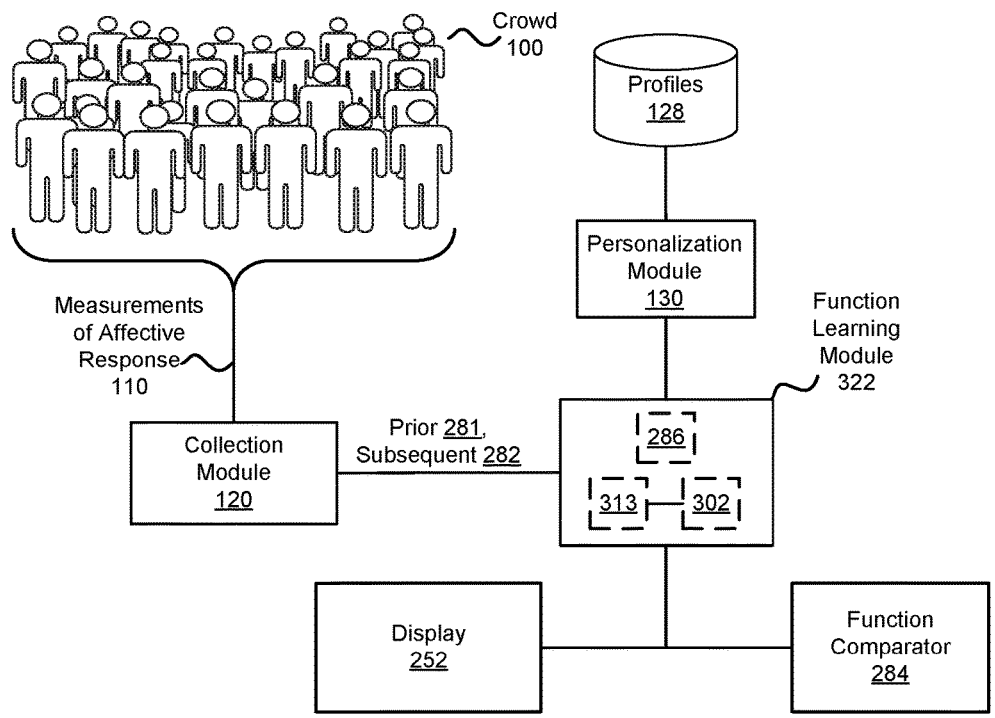
FIG. 63a illustrates a system configured to learn a function describing relationship between a duration of an experience and the extent of the aftereffect of the experience.

FIG. 63a illustrates a system configured to learn a function describing an aftereffect of the experience. Optionally, the function represents a relationship between the duration of the experience (i.e., how long a user had the experience) and the extent of the aftereffect of the experience. The system includes at least collection module 120 and function learning module 322. The system may optionally include additional modules, such as the personalization module 130, function comparator 284, and/or the display 252.

The collection module 120 is configured, in one embodiment, to receive measurements 110 of affective response of users. The measurements 110 are taken utilizing sensors coupled to the users (as discussed in more detail at least in section 1—Sensors and section 2—Measurements of Affective Response). In this embodiment, the measurements 110 include prior and subsequent measurements of at least ten users who had the experience (denoted with reference numerals 281 and 282, respectively). A prior measurement of a user, from among the prior measurements 281, is taken before the user finishes having the experience. Optionally, the prior measurement of the user is taken before the user starts having the experience. A subsequent measurement of the user, from among the subsequent measurements 282, is taken after the user finishes having the experience (e.g., after the elapsing of a duration of at least ten minutes from the time the user finishes having the experience). Optionally, the subsequent measurements 282 comprise multiple subsequent measurements of a user who had the experience, taken at different times after the user had the experience. Optionally, a difference between a subsequent measurement and a prior measurement of a user who had the experience is indicative of an aftereffect of the experience on the user.

In some embodiments, the prior measurements 281 and/or the subsequent measurements 282 are taken within certain windows of time with respect to when the at least ten users have the experience. In one example, a prior measurement of each user is taken within a window that starts a certain time before the user has the experience, such as a window of one hour before the experience. In this example, the window may end when the user starts the experience. In another example, the window may end a certain time into the experience, such as ten minutes after the start of the experience. In another example, a subsequent measurement of a user in taken within one hour from when the user finishes having the experience (e.g. in an embodiment involving an experience that is an exercise). In still another example, a subsequent measurement of a user may be taken sometime within a larger window after the user finishes the experience, such as up to one week after the experience (e.g. in an embodiment involving an experience that is a vacation).

The function learning module 322 is configured to receive data comprising the prior and subsequent measurements and to utilize the data to learn a function. Optionally, the function describes, for different durations, an expected affective response corresponding to an extent of an aftereffect of the experience after having the experience for a duration from among the different durations. Optionally, the function learned by the function learning module 322 is at least indicative of values $v_1$ and $v_2$ corresponding to expected extents of aftereffects to having the experience for durations $d_1$ and $d_2$, respectively. And additionally, $d_1 \neq d_2$ and $v_1 \neq v_2$.

Figure 63B:
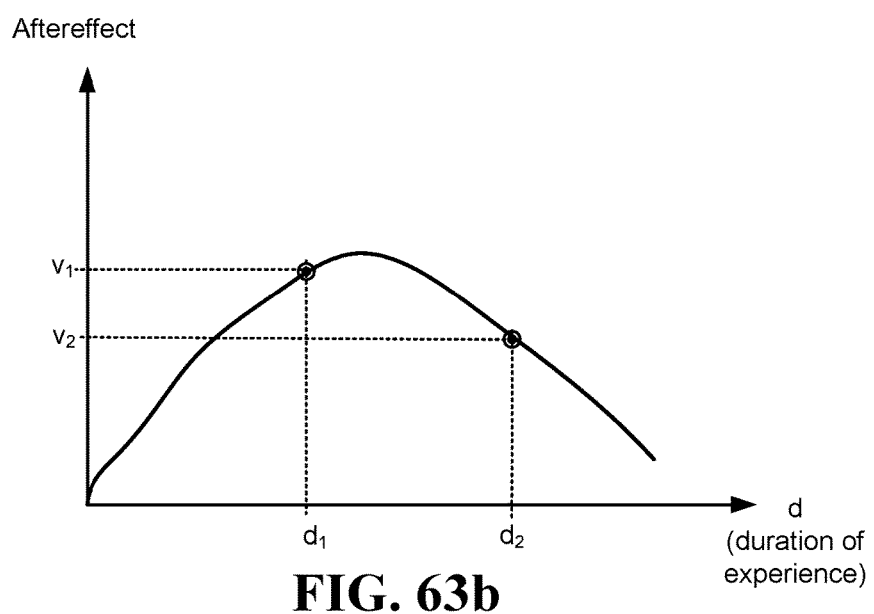
FIG. 63b illustrates an example of a function that describes changes in the of an experience aftereffect based on the duration of the experience.

FIG. 63b illustrates an example of the function learned by the function learning module 322. The figure illustrates changes in the aftereffect based on the duration of the experience. The aftereffect increases as the duration d increases, but only until a certain duration, after the certain duration, the aftereffect gradually decreases.

The prior measurements 281 may be utilized in various ways by the function learning module 322, which may slightly change what is represented by the function. In one embodiment, a prior measurement of a user is utilized to compute a baseline affective response value for the user. In this embodiment, values computed by the function may be indicative of differences between the subsequent measurements 282 of the at least ten users and baseline affective response values for the at least ten users. In another embodiment, values computed by the function may be indicative of an expected difference between the subsequent measurements 282 and the prior measurements 281.

Following is a description of different configurations of the function learning module 322 that may be used to learn a function describing a relationship between a duration of an experience and an aftereffect of the experience. Additional details about the function learning module 322 may be found in this disclosure at least in section 17—Learning Function Parameters.

In one embodiment, the function learning module 322 utilizes machine learning-based trainer 286 to learn the parameters of the function describing a relationship between a duration of an experience and an aftereffect of the experience. Optionally, the machine learning-based trainer 286 utilizes the prior measurements 281 and the subsequent measurements 282 to train a model comprising parameters for a predictor configured to predict a value of an aftereffect of a user based on an input indicative of a duration that the user had the experience. In one example, each pair comprising a prior measurement of a user and a subsequent measurement of the user, taken after the user had the experience for a duration d, is converted to a sample (d,v), which may be used to train the predictor. Optionally, v is a value determined based on a difference between the subsequent measurement and the prior measurement and/or a difference between the subsequent measurement and baseline computed based on the prior measurement, as explained above.

When the trained predictor is provided inputs indicative of the durations $d_1$ and $d_2$, the predictor predicts the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function comprise the parameters of the model and/or other data utilized by the predictor.

In an alternative embodiment, the function learning module 322 may utilize binning module 313, which is configured, in this embodiment, to assign a pair comprising a prior measurement of a user who had the experience and a subsequent measurement of the user, taken after the user had the experience, to one or more of a plurality of bins based on the duration of the experience the user had.

In one example, the experience involves going on a vacation to a destination. In this example, the plurality of bins may correspond to the duration the user spent at the vacation destination before leaving. Thus, for example, the first bin may include subsequent measurements taken within after a vacation lasting at most 24 hours n, the second bin may include subsequent measurements taken after a vacation that lasted 24-48 hours, the third bin may include subsequent measurements taken after a vacation that lasted 48-72 hours, etc.

Additionally, the function learning module 322 may utilize the aftereffect scoring module 302, which, in one embodiment, is configured to compute a plurality of aftereffect scores for the experience, corresponding to the plurality of bins. An aftereffect score corresponding to a bin is computed based on prior and subsequent measurements of at least five users, from among the at least ten users, who had the experience for a duration that falls within the range of durations that corresponds to the bin. Optionally, prior and subsequent measurements used to compute the aftereffect score corresponding to the bin were assigned to the bin by the binning module 313. Optionally, with respect to the values $d_1$, $d_2$, $v_1$, and $v_2$ mentioned above, $d_1$ falls within a range of durations corresponding to a first bin, $d_2$ falls within a range of durations corresponding to a second bin, which is different from the first bin, and the values $v_1$ and $v_2$ are the aftereffect scores corresponding to the first and second bins, respectively.

In one embodiment, the parameters of the function comprise the aftereffect scores corresponding to the plurality of bins and/or information related to the plurality of bins, such as information related to their boundaries.

In one embodiment, an aftereffect score for an experience is indicative of an extent of feeling at least one of the following emotions after having the experience: pain, anxiety, annoyance, stress, aggression, aggravation, fear, sadness, drowsiness, apathy, anger, happiness, contentment, calmness, attentiveness, affection, and excitement. Optionally, the aftereffect score is indicative of a magnitude of a change in the level of the at least one of the emotions due to having the experience.

Embodiments described herein in may involve various types of experiences for which a function may be learned using the system illustrated in FIG. 55a. Following are a few examples of types of experiences and functions of aftereffects that may be learned. Additional details regarding the various types of experiences for which it may be possible to learn a function, which describes a relationship between a duration of an experience and an aftereffect of the experience, may be found at least in section 3—Experiences in this disclosure.

Vacation—In one embodiment, the experience to which the function corresponds involves taking a vacation at a certain destination. For example, the certain destination may be a certain country, a certain city, a certain resort, a certain hotel, and/or a certain park. The function in this embodiment may describe to what extent a user feels relaxed and/or happy (e.g., on a scale from 1 to 10) after a vacation of a certain length; an example of a range in which the certain length may fall, in this embodiment may be, is 0 to 10 days. In this embodiment, a prior measurement of the user may be taken before the user goes on the vacation, which lasts for a duration d, and a subsequent measurement is after the user returns from the vacation. Optionally, in addition to the input value indicative of d, the function may receive additional input values. For example, in one embodiment, the function receives an additional input value $\Delta t$ indicative of how long after the return the subsequent measurement was taken. Thus, in this example, the function may be considered to behave like a function of the form $f(d,\Delta t)=v$, and it may describe the affective response v a user is expected to feel at a time $\Delta t$ after spending a duration of d at the vacation destination.

Exercise—In one embodiment, the experience to which the function corresponds involves partaking in an exercise activity, such as Yoga, Zumba, jogging, swimming, golf, biking, etc. The function in this embodiment may describe how well user feels (e.g., on a scale from 1 to 10) after completing an exercise of a certain length; an example of the range in which the certain length may fall, in this embodiment, is 0 to 120 minutes. Optionally, a prior measurement of the user may be taken before the user starts exercising (or while the user is exercising), and a subsequent measurement is taken after the user finishes exercising. Optionally, in addition to the input value indicative of d, the function may receive additional input values. For example, in one embodiment, the function receives an additional input value $\Delta t$, which is indicative of how long after finishing the exercise the subsequent measurement was taken. Thus, in this example, the function may be considered to behave like a function of the form $f(d,\Delta t)=v$, and it may describe the affective response v, a user is expected to feel at a time $\Delta t$ after partaking an exercise for a duration d.

Treatment—In one embodiment, the experience to which the function corresponds involves receiving a treatment, such as a massage, physical therapy, acupuncture, aroma therapy, biofeedback therapy, etc. The function in this embodiment may describe to what extent a user feels relaxed (e.g., on a scale from 1 to 10) after receiving the treatment that lasted for a certain duration; an example of a range in which the certain duration may be, in this embodiment, is 0 to 120 minutes. Optionally, a prior measurement of the user may be taken before the user starts receiving the treatment (or while the user receives the treatment), and a subsequent measurement is taken after the user finishes receiving the treatment. Optionally, in addition to the input value indicative of d, the function may receive additional input values. For example, in one embodiment, the function receives an additional input value $\Delta t$, which is indicative of how long after finishing the treatment the subsequent measurement was taken. Thus, in this example, the function may be considered to behave like a function of the form $f(d, \Delta t)=v$, and it may describe the affective response v a user is expected to feel at a time Δt after receiving a treatment for a duration d.

Environment—In one embodiment, the experience to which the function corresponds involves spending time in an environment characterized by a certain environmental parameter being in a certain range. Examples of environmental parameters include temperature, humidity, altitude, air quality, and allergen levels. The function in this embodiment may describe how well a user feels (e.g., on a scale from 1 to 10) after spending a certain duration in an environment characterized by an environmental parameter being in a certain range (e.g., the temperature in the environment is between 10° F. and 30° F., the altitude is above 5000 ft., the air quality is good, etc.) In one example, the certain duration may between 0 to 48 hours. In this embodiment, a prior measurement of the user may be taken before the user enters the environment (or while the user is in the environment), and a subsequent measurement is taken after the user leaves the environment. Optionally, in addition to the input value indicative of d, the function may receive additional input values. For example, in one embodiment, the function receives an additional input value Δt, which is indicative of how long after leaving the environment the subsequent measurement was taken. Thus, in this example, the function may be of the form $f(d,\Delta t)=v$, and it may describe the affective response v a user is expected to feel at a time Δt after spending a duration d in the environment. In another example, an input value may represent the environmental parameter. For example, an input value q may represent the air quality index (AQI). Thus, the aftereffect function in this example may be considered to behave like a function of the form $f(d,\Delta t,q)=v$, and it may describe the affective response v a user is expected to feel at a time Δt after spending a duration d in the environment that has air quality q.

In some embodiments, the personalization module 130 may be utilized to learn personalized functions for different users by utilizing profiles of the different users. Given a profile of a certain user, the personalization module 130 may generate an output indicative of similarities between the profile of the certain user and the profiles from among the profiles 128 of the at least ten users. Utilizing this output, the function learning module 322 can select and/or weight measurements from among the prior measurements 281 and subsequent measurements 282, in order to learn a function personalized for the certain user, which describes values of expected aftereffects of an experience, the certain user may feel, after having had the experience for different durations. Additional information regarding personalization, such as what information the profiles 128 may contain, how to determine similarity between profiles, and/or how the output may be utilized, may be found in section 11—Personalization.

It is to be noted that personalized functions are not necessarily the same for all users; for some input values, functions that are personalized for different users may assign different target values. That is, for at least a certain first user and a certain second user, who have different profiles, the function learning module 322 learns different functions, denoted $f_1$ and $f_2$, respectively. In one example, $f_1$ is indicative of values $v_1$ and $v_2$ of expected aftereffects after having the experience for the durations $d_1$ and $d_2$, respectively, and $f_2$ is indicative of values $v_3$ and $v_4$ of expected aftereffects after having the experience for durations $d_1$ and $d_2$, respectively. Additionally, $d_1 \neq d_2$, $v_1 \neq v_2$, $v_3 \neq v_4$, and $v_1 \neq v_3$.

Following is a description of steps that may be performed in a method for learning a function describing an aftereffect of an experience. The steps described below may, in one embodiment, be part of the steps performed by an embodiment of the system described above (illustrated in FIG. 63a). In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a function describing an aftereffect of an experience includes at least the following steps:

In Step 1, receiving, by a system comprising a processor and memory, measurements of affective response of users taken utilizing sensors coupled to the users. In this embodiment, the measurements comprise prior and subsequent measurements of at least ten users who had the experience. A prior measurement of a user is taken before the user finishes the experience (or even before the user starts having the experience). A subsequent measurement of the user is taken after the user finishes having the experience (e.g., after elapsing of a duration of at least ten minutes after the user finishes the experience). Optionally, the prior and subsequent measurements are received by the collection module 120.

And in Step 2, learning, based on the prior and subsequent measurements, parameters of a function that describes, for different durations, an expected affective response corresponding to an extent of an aftereffect of the experience, after having had the experience for a duration from among the different durations. Optionally, the function is at least indicative of values $v_1$ and $v_2$ of an extent of an expected aftereffect after having had the experience for durations $d_1$ and $d_2$, respectively; where $d_1 \neq d_2$ and $v_1 \neq v_2$. Optionally, the function is learned utilizing the function learning module 322.

In one embodiment, Step 1 optionally involves utilizing a sensor coupled to a user who had the experience to obtain a prior measurement of affective response of the user and/or a subsequent measurement of affective response of the user. Optionally, Step 1 may involve taking multiple subsequent measurements of a user at different times after the user had the experience.

In some embodiments, the method may optionally include a step that involves displaying the function learned in Step 2 on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 2 may involve performing different operations in different embodiments.

In one embodiment, learning the parameters of the function comprises utilizing a machine learning-based trainer that is configured to utilize the prior and subsequent measurements to train a model for a predictor configured to predict a value of affective response of a user corresponding to an aftereffect based on an input indicative of the length of the duration the user had the experience. Optionally, responsive to being provided inputs indicative of the durations $d_1$ and $d_2$ mentioned above, the predictor predicts the values $v_1$ and $v_2$, respectively.

In another embodiment, learning the parameters of the function in Step 2 involves computing a plurality of aftereffect scores corresponding to a plurality of bins, with each bin corresponding to a range of durations for having the experience. Optionally, an aftereffect score corresponding to a bin is computed based on prior and subsequent measurements of at least five users, from the at least ten users, for whom lengths of durations during which they have the experience, fall within the range corresponding to the bin. Optionally, the score corresponding to a bin is computed by the aftereffect scoring module 302. Optionally, $d_1$ falls within a range of durations corresponding to a first bin, $d_2$ falls within a range of durations corresponding to a second bin, which is different from the first bin, and the values $v_1$ and $v_2$ are the s aftereffect cores corresponding to the first and second bins, respectively.

A function learned by a method described above may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function personalized for the certain user that describes, for different durations, values of expected affective response corresponding to extents of aftereffects of the experience after having the experience for a duration from among the different durations. Optionally, the output is generated utilizing the personalization module 130. Depending on the type of personalization approach used and/or the type of function learning approach used, the output may be utilized in various ways to learn a function, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected extents of aftereffects to having the experience for durations $d_1$ and $d_2$, respectively, and $f_2$ is indicative of values $v_3$ and $v_4$ of expected extents of aftereffects to having the experience for the durations $d_1$ and $d_2$, respectively. Additionally, in this example, $d_1 \neq d_2$, $v_1 \neq v_2$, $v_3 \neq v_4$, and $v_1 \neq v_3$.

Users may have various experiences in their day-to-day lives, which can be of various types. Some examples of experiences include, going on vacations, playing games, participating in activities, receiving a treatment, and more. Having an experience can have an impact on how a user feels by causing the user to have a certain affective response. One factor that may influence how a user feels due to having an experience is the time the user has the experience. For example, going on a vacation to a certain destination during the summer may be a lot more enjoyable than going to the same place during the winter. In another example, going to a certain restaurant for dinner may be a very different experience than visiting the same establishment during lunchtime. Having knowledge about the influence of the period during which a user has an experience on the affective response of user to the experience can help decide which experiences to have and/or when to have them for. Thus, there is a need to be able to evaluate when to have experiences.

Some aspects of embodiments described herein involve systems, methods, and/or computer-readable media that may be utilized to learn functions of periodic affective response to an experience. A function describing a periodic affective response to an experience is a function that describes expected affective response to an experience based on when, in a periodic unit of time, a user has the experience (i.e., the period during which the user has the experience). A periodic unit of time is a unit of time that repeats itself regularly. An example of periodic unit of time is a day (a period of 24 hours that repeats itself), a week (a periodic of 7 days that repeats itself, and a year (a period of twelve months that repeats itself). Thus for example, the function may be used to determine expected affective response to having an experience during a certain hour of the day (for a periodic unit of time that is a day), a certain day of the week (for a periodic unit of time that is a week), etc.

In some embodiments, determining the expected affective response to an experience is done based on measurements of affective response of users who had the experience (e.g., these may include measurements of at least five users, or some other minimal number of users, such as at least ten users). The measurements of affective response are typically taken with sensors coupled to the users (e.g., sensors in wearable devices and/or sensors implanted in the users). In some embodiments described herein, the measurements are utilized to learn the function describing expected affective response to an experience based on when, in a periodic unit of time, a user has the experience. In some embodiments, the function may be considered to behave like a function of the form $f(t)=v$, where t represents a time (in the periodic unit of time), and v represents the value of the expected affective response when having the experience at the time t. In one example, v may be a value indicative of the extent the user is expected to have a certain emotional response, such as being happy, relaxed, and/or excited after having the experience at the time t in the periodic unit of time.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the (e.g., t mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (t,v), the value of t may be used to determine in which bin to place the sample. After the training data is placed in bins, a representative value is computed for each bin; this value is computed from the v values of the samples in the bin, and typically represents some form of score for the experience.

Some aspects of this disclosure involve learning personalized functions for different users utilizing profiles of the different users. Given a profile of a certain user, similarities between the profile of the certain user and profiles of other users are used to select and/or weight measurements of affective response of other users, from which a function is learned. Thus, different users may have different functions created for them, which are learned from the same set of measurements of affective response.

Figure 64A:
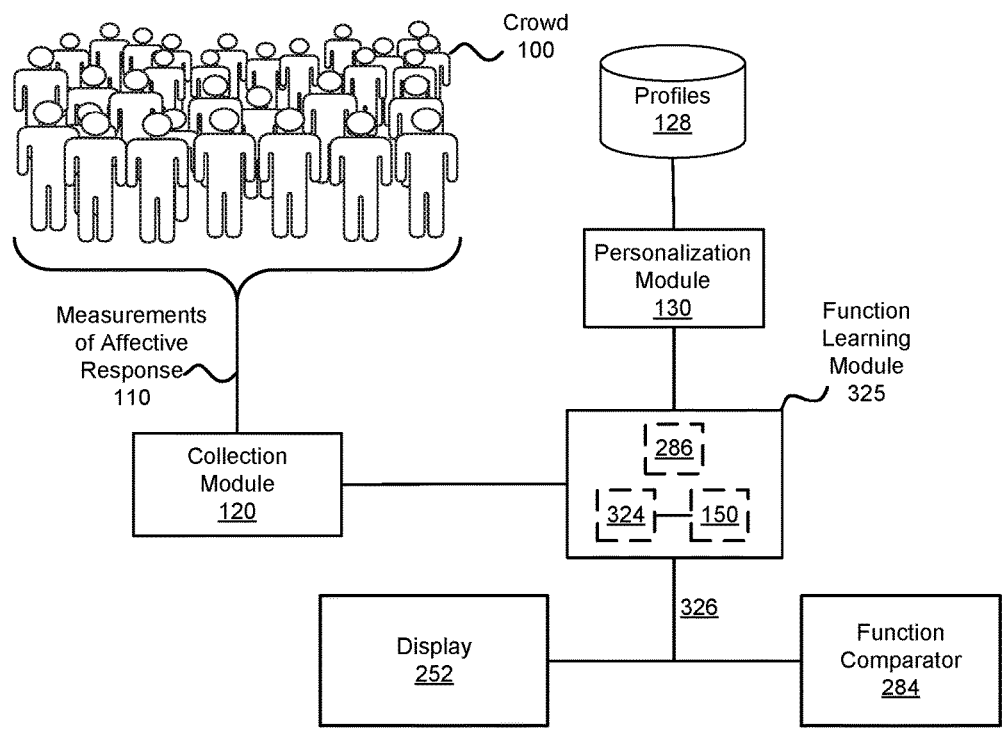
FIG. 64a illustrates a system configured to learn a function of periodic affective response to an experience.

FIG. 64a illustrates a system configured to learn a function of periodic affective response to an experience. The system includes at least collection module 120 and function learning module 325. The system may optionally include additional modules, such as the personalization module 130, function comparator 284, and/or the display 252.

The collection module 120 is configured, in one embodiment, to receive measurements 110 of affective response of users belonging to the crowd 100. The measurements 110 are taken utilizing sensors coupled to the users (as discussed in more detail at least in section 1—Sensors and section 2—Measurements of Affective Response). In this embodiment, the measurements 110 include measurements of affective response of at least ten users. Alternatively, the measurements 110 may include measurements of some other minimal number of users, such as at least five users. Each user, from among the at least ten users, has the experience at some time during a periodic unit of time, and a measurement of the user is taken by a sensor coupled to the user while the user has the experience. Optionally, the measurements comprise multiple measurements of a user who has the experience, taken at different times during the periodic unit of time.

It is to be noted that the experience to which the measurements of the at least ten users relate may be any of the various experiences described in this disclosure, such as an experience involving being in a certain location, an experience involving engaging in a certain activity, consuming a certain segment of digital content, eating certain food, etc. In some embodiments, the experience belongs to a set of experiences that may include and/or exclude various experiences, as discussed in section 3—Experiences.

Herein, a periodic unit of time is a unit of time that repeats itself regularly. In one example, the periodic unit of time is a day, and each of the at least ten users has the experience during a certain hour of the day (but not necessarily the same day). In another example, the periodic unit of time is a week, and each of the at least ten users has the experience during a certain day of the week (but not necessarily the same week). In still another example, the periodic unit of time is a year, and each of the at least ten users has the experience during a time that is at least one of the following: a certain month of the year, and a certain annual holiday. A periodic unit of time may also be referred to herein as a "recurring unit of time".

The measurements received by the collection module 120 may comprise multiple measurements of a user who had the experience. In one example, the multiple measurements may correspond to the same event in which the user had the experience. In another example, each of the multiple measurements corresponds to a different event in which the user had the experience.

In some embodiments, the measurements 110 may include measurements of users who had the experience at various times throughout the periodic unit of time. In one example, the measurements 110 include a measurement of a first user, taken during a first period of the periodic unit of time. Additionally, in this example, the measurements 110 include a measurement of a second user taken during a second period of the periodic unit of time. Optionally, when considering the first and second periods relative to the whole periodic unit of time, the second period is at least 10% greater than the first period. For example, if the periodic unit of time is a day, the first measurement was taken at 10 AM, while the second measurement was taken after 1 PM. In another example, if the periodic unit of time is a week, the first measurement was taken on a Thursday, while the second measurement was taken on a Friday.

In some embodiments, the measurements 110 may include measurements of users who had the experience during different cycles of the periodic unit of time. Optionally, the measurements 110 include a first measurement taken in a first cycle of the periodic unit of time and a second measurement taken in a second cycle of the periodic unit of time, where the second cycle does not start before the first cycle ends. Optionally, the first and second measurements are of the same user. Alternatively, the first measurement may be of a first user and the second measurement may be of a second user, who is not the first user. A cycle of the periodic unit of time is an occurrence of the periodic unit of time that starts at a certain date and time. Thus, for example, if a periodic unit of time is a week, then one cycle of the periodic unit of time may be the first week of May 2016 and another cycle of the periodic unit of time might be the second week of May 2016.

The function learning module 325 is configured, in one embodiment, to receive the measurements of the at least ten users and to utilize those measurements to learn function 326. Optionally, the function 326 is a function of periodic affective response to the experience. Optionally, the function 326 describes expected affective responses to the experience, resulting from having the experience at different times in the periodic unit of time. Optionally, the function 326 may be described via its parameters, thus, learning the function 326, may involve learning the parameters that describe the function 326. In embodiments described herein, the function 326 may be learned using one or more of the approaches described further below.

Figure 64B:
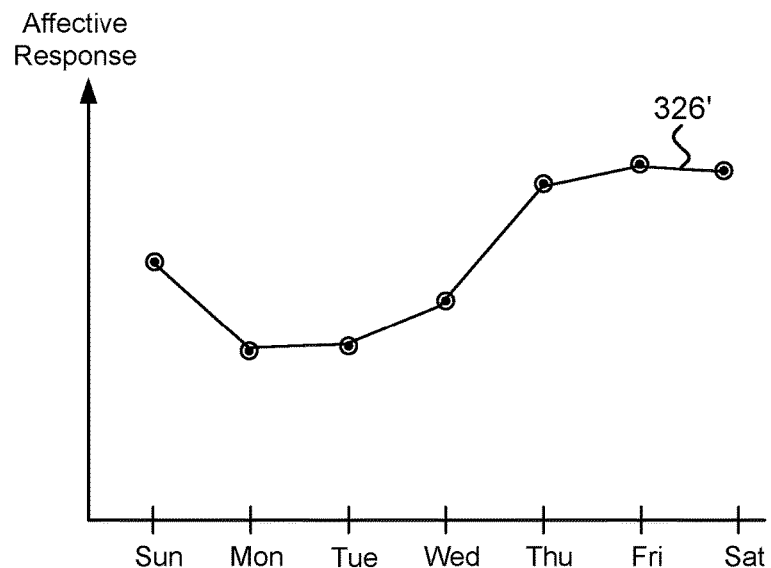
FIG. 64b illustrates an example of a representation of a function that describes how affective response to an experience changes based on the day of the week.

In some embodiments, the function 326 may be considered to perform a computation of the form $f(t)=v$, where the input t is a time in the periodic unit of time, and the output v is an expected affective response. Optionally, the output of the function 326 may be expressed as an affective value. In one example, the output of the function 326 is an affective value indicative of an extent of feeling at least one of the following emotions: pain, anxiety, annoyance, stress, aggression, aggravation, fear, sadness, drowsiness, apathy, anger, happiness, contentment, calmness, attentiveness, affection, and excitement. In some embodiments, the function 326 is not a constant function that assigns the same output value to all input values. Optionally, the function 326 is at least indicative of values $v_1$ and $v_2$ of expected affective response to the experience when having the experience at times $t_1$ and $t_2$ during the periodic unit of time, respectively. That is, the function 326 is such that there are at least two values $t_1$ and $t_2$, for which $f(t_1)=v_1$ and $f(t_2)=v_2$. And additionally, $t_1 \neq t_2$ and $v_1 \neq v_2$. Optionally, $t_2$ is at least 10% greater than $t_1$. In one example, $t_1$ is in the first half of the periodic unit of time and $t_2$ is in the second half of the periodic unit of time. In another example, the periodic unit of time is a day, and $t_1$ corresponds to a time during the morning and $t_2$ corresponds to a time during the evening. In yet another example, the periodic unit of time is a week, and $t_1$ corresponds to some time on Tuesday and $t_2$ corresponds to a time during the weekend. And in still another example, the periodic unit of time is a year, and $t_1$ corresponds to a time during the summer and $t_2$ corresponds to a time during the winter. FIG. 64b illustrates an example of a representation 326' of the function 326 that shows how affective response to an experience (e.g., going out to a certain club) changes based on the day of the week.

Following is a description of different configurations of the function learning module 325 that may be used to learn the function 326. Additional details about the function learning module 325 may be found in this disclosure at least in section 17—Learning Function Parameters.

In one embodiment, the function learning module 325 utilizes the machine learning-based trainer 286 to learn parameters of the function 326. Optionally, the machine learning-based trainer 286 utilizes the measurements of the at least ten users to train a model for a predictor that is configured to predict a value of affective response of a user based on an input indicative of a time, in the periodic unit of time, during which the user had the experience. In one example, each measurement of the user, which is represented by an affective value v, and which was taken at a time t during the periodic unit of time, is converted to a sample (t,v), which may be used to train the predictor. Optionally, when the trained predictor is provided inputs indicative of the times $t_1$ and $t_2$ (mentioned above), the predictor utilizes the model to predict the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function 326 comprise the parameters of the model and/or other data utilized by the predictor.

In an alternative embodiment, the function learning module 325 may utilize binning module 324, which is configured, in this embodiment, to assign measurements of users to a plurality of bins based on when, in the periodic unit of time, the measurements were taken. Optionally, each bin corresponds to a range of times in the periodic unit of time. For example, if the periodic unit of time is a week, each bin may correspond to measurements taken during a certain day of the week. In another example, if the periodic unit of time is a day, then the plurality of bins may contain a bin representing each hour of the day.

Additionally, in this embodiment, the function learning module 325 may utilize the scoring module 150, or some other scoring module described in this disclosure, to compute a plurality of scores corresponding to the plurality of bins. A score corresponding to a bin is computed based on measurements assigned to the bin. The measurements used to compute a score corresponding to a bin belong to at least five users, from the at least ten users. Optionally, with respect to the values $t_1$, $t_2$, $v_1$, and $v_2$ mentioned above, $t_1$ falls within a range of times corresponding to a first bin, $t_2$ falls within a range of times corresponding to a second bin, which is different from the first bin, and the values $v_1$ and $v_2$ are based on the scores corresponding to the first and second bins, respectively.

Embodiments described herein in may involve various types of experiences for which the function 326 may be learned using the system illustrated in FIG. 64*a*. Following are a few examples of such experiences. Additional details regarding the various types of experiences may be found at least in section 3—Experiences.

Vacation—In one embodiment, the experience to which the function 326 corresponds involves taking a vacation at a certain destination. For example, the certain destination may be a certain country, a certain city, a certain resort, a certain hotel, and/or a certain park. Optionally, the periodic unit of time in this embodiment may be a year. The function in this embodiment may describe to what extent a user enjoys the vacation (e.g., on a scale from 1 to 10) when taking it at certain time during the year (e.g., when the vacation during a certain week in the year and/or during a certain season). Optionally, in addition to the input value indicative of t, the function 326 may receive additional input values. For example, in one embodiment, the function 326 receives an additional input value d indicative of how long the vacation was (i.e., how many days a user spent at the vacation destination). Thus, in this example, the function 326 may be considered to behave like a function of the form $f(t,d)=v$, and it may describe the affective response v a user is expected to feel when on a vacation of length d taken at a time t during the year.

Virtual World—In one embodiment, the experience to which the function 326 corresponds involves spending time in a virtual environment, e.g., by playing a multiplayer online role-playing game (MMORPG). Optionally, the periodic unit of time in this embodiment may be a week. In one example, the function may describe to what extent a user feels excited (or bored), e.g., on a scale from 1 to 10, when spending time in the virtual environment at a certain time during the week. Optionally, the certain time may characterize what day of the week it is and/or what hour it is (e.g., the certain time may be 2 AM on Saturday). Optionally, in addition to the input value indicative of t, the function may receive additional input values. For example, in one embodiment, the function 326 receives an additional input value d indicative of how much time the user spends in the virtual environment. Thus, in this example, the function 326 may be considered to behave like a function of the form $f(t,d)=v$, and it may describe the affective response v a user is expected to feel when in the virtual environment for a duration of length d at a time t during the week.

Exercise—In one embodiment, the experience to which the function 326 corresponds involves partaking in an exercise activity, such as Yoga, Zumba, jogging, swimming, golf, biking, etc. Optionally, the periodic unit of time in this embodiment may be a day (i.e., 24 hours). In one example, the function 326 may describe how well user feels (e.g., on a scale from 1 to 10) when exercising during a certain time of the day. Optionally, in addition to the input value indicative of t, the function may receive additional input values. For example, in one embodiment, the function 326 receives an additional input value d indicative of how much time the user spends exercising. Thus, in this example, the function 326 may be considered to behave like a function of the form $f(t,d)=v$, and it may describe the affective response v a user is expected to feel when exercising for a duration d at a time t during the day.

In one embodiment, the function comparator module 284 is configured to receive descriptions of first and second functions of periodic affective response to having first and second experiences, respectively. The function comparator module 284 is also configured to compare the first and second functions and to provide an indication of at least one of the following: (i) the experience, from among the first and second experiences, for which the average affective response to having the respective experience throughout the periodic unit of time is greatest; and (ii) the experience, from among the first and second experiences, for which the affective response to having the respective experience, at a certain time t in the periodic unit of time, is greatest.

In some embodiments, the personalization module 130 may be utilized, by the function learning module 325, to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 325 may be configured to utilize the output to learn a personalized function for the certain user (i.e., a personalized version of the function 326), which describes expected affective responses when having the experience at different times in the periodic unit of time. The personalized functions are not the same for all users. That is, for at least a certain first user and a certain second user, who have different profiles, the function learning module 325 learns different functions, denoted $f_1$ and $f_2$, respectively. The function $f_1$ is indicative of values $v_1$ and $v_2$ of expected affective responses to having the experience at times $t_1$ and $t_2$ during the periodic unit of time, respectively, and the function $f_2$ is indicative of values $v_3$ and $v_4$ of expected affective responses to the having the experience at times $t_1$ and $t_2$, respectively. And additionally, $t_1 \neq t_2$, $v_1 \neq v_2$, $v_3 \neq v_4$, and $v_1 \neq v_3$.

Following is a description of steps that may be performed in a method for learning a function describing a periodic affective response to an experience. The steps described below may, in one embodiment, be part of the steps performed by an embodiment of the system described above (illustrated in FIG. 64a). In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a function describing a periodic affective response to an experience includes at least the following steps:

In Step 1, receiving, by a system comprising a processor and memory, measurements of affective response of at least ten users; each user has the experience at some time during a periodic unit of time, and a measurement of the user is taken by a sensor coupled to the user while the user has the experience. Optionally, the measurements are received by the collection module 120.

And in Step 2, learning, based on the measurements received in Step 1, parameters of a function that describes, for different times in the periodic unit of time, expected affective responses resulting from having the experience at the different times. Optionally, the function that is learned is the function 326 mentioned above. Optionally, the function is at least indicative of values $v_1$ and $v_2$ of expected affective response to the experience when having the experience at times $t_1$ and $t_2$ during the periodic unit of time, respectively; where $t_1 \neq t_2$ and $v_1 \neq v_2$. Optionally, the function is learned utilizing the function learning module 325.

In one embodiment, Step 1 optionally involves utilizing a sensor coupled to a user who had the experience to obtain a measurement of affective response of the user. Optionally, Step 1 may involve taking multiple measurements of a user at different times while having the experience.

In some embodiments, the method may optionally include Step 3 that involves presenting the function learned in Step 2 on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 2 may involve performing different operations in different embodiments.

In one embodiment, learning the parameters of the function in Step 2 comprises utilizing a machine learning-based trainer that is configured to utilize the measurements received in Step 1 to train a model for a predictor configured to predict a value of affective response of a user based on an input indicative of when in the periodic unit of time the user had the experience. Optionally, the values in the model are such that responsive to being provided inputs indicative of the times $t_1$ and $t_2$ mentioned above, the predictor predicts the values $v_1$ and $v_2$, respectively.

In another embodiment, learning the parameters of the function in Step 2 involves the following operations: (i) assigning the measurements received in Step 1 to a plurality of bins based on the time in the periodic unit of time the measurements were taken; and (ii) computing a plurality of scores corresponding to the plurality of bins. Optionally, a score corresponding to a bin is computed based on the measurements of at least five users, which were assigned to the bin. Optionally, $t_1$ is assigned to a first bin, $t_2$ is assigned to a second bin, which is different from the first bin, and the values $v_1$ and $v_2$ are based on the scores corresponding to the first and second bins, respectively.

In some embodiments, functions learned by the method described above may be compared (e.g., utilizing the function comparator 284). Optionally, performing such a comparison involves the following steps: (i) receiving descriptions of first and second functions of periodic affective response to having first and second experiences, respectively; (ii) comparing the first and second functions; and (iii) providing an indication derived from the comparison. Optionally, the indication indicates least one of the following: (i) the experience, from among the first and second experiences, for which the average affective response to having the respective experience throughout the periodic unit of time is greatest; and (ii) the experience, from among the first and second experiences, for which the affective response to having the respective experience, at a certain time tin the periodic unit of time, is greatest.

A function learned by a method described above may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function personalized for the certain user that describes a periodic affective response to the experience. Optionally, the output is generated utilizing the personalization module 130. Depending on the type of personalization approach used and/or the type of function learning approach used, the output may be utilized in various ways to learn the function, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected affective responses to having the experience at times $t_1$ and $t_2$ in the periodic unit of time, respectively, and $f_2$ is indicative of values $v_3$ and $v_4$ of expected affective responses to having the experience at the times $t_1$ and $t_2$ in the periodic unit of time, respectively. Additionally, in this example, $t_1 \neq t_2$, $v_1 \neq v_2$, $v_3 \neq v_4$, and $v_1 \neq v_3$.

Personalization of functions of periodic affective response to an experience can lead to the learning of different functions for different users who have different profiles. Obtaining the different functions for the different users may involve performing the steps described below. These steps may, in some embodiments, be part of the steps performed by systems modeled according to FIG. 64a. In some embodiments, instructions for implementing a method that involves such steps may be stored on a computer-readable medium, which may optionally be a non-transitory computer-readable medium. In response to execution by a system including a processor and memory, the instructions cause the system to perform operations that are part of the method.

In one embodiment, the method for utilizing profiles of users to learn a personalized function of periodic affective response to an experience, includes the following steps:

In Step 1, receiving, by a system comprising a processor and memory, measurements of affective response of at least ten users. Optionally, each user, from among the at least ten users, has the experience at some time during a periodic unit of time, and a measurement of the user is taken by a sensor coupled to the user while the user has the experience. Optionally, the measurements are received by the collection module 120.

In Step 2, receiving profiles of at least some of the users who contributed measurements in Step 1.

In Step 3 receiving a profile of a certain first user.

In Step 4, generating a first output indicative of similarities between the profile of the certain first user and the profiles of the at least some of the users. Optionally, the first output is generated by the personalization module 130.

In Step 5, learning, based on the measurements received in Step 1 and the first output, parameters of a first function $f_1$, which describes, for different times in the periodic unit of times, values of expected affective response to the having the experience at the different times. Optionally, $f_1$ is at least indicative of values $v_1$ and $v_2$ of expected affective response to having the experience at times $t_1$ and $t_2$ in the periodic unit of time, respectively (here $t_1 \neq t_2$ and $v_1 \neq v_2$). Optionally, the first function $f_1$ is learned utilizing the function learning module 325.

In Step 7 receiving a profile of a certain second user, which is different from the profile of the certain first user.

In Step 8, generating a second output, which is different from the first output, and is indicative of similarities between the profile of the certain second user and the profiles of the at least some of the users. Optionally, the first output is generated by the personalization module 130.

And in Step 9, learning, based on the measurements received in Step 1 and the second output, parameters of a second function $f_2$, which describes, for different times in the periodic unit of times, values of expected affective response to the having the experience at the different times. Optionally, $f_2$ is at least indicative of values $v_3$ and $v_4$ of expected affective response to having the experience at the times $t_1$ and $t_2$ in the periodic unit of time, respectively (here $v_3 \neq v_4$). Optionally, the second function $f_2$ is learned utilizing the function learning module 325. In some embodiments, $f_1$ is different from $f_2$, thus, in the example above the values $v_1 \neq v_3$ and/or $v_2 \neq v_4$.

In one embodiment, the method may optionally include steps that involve displaying a function on a display such as the display 252 and/or rendering the function for a display (e.g., by rendering a representation of the function and/or its parameters). In one example, the method may include Step 6, which involves rendering a representation of $f_1$ and/or displaying the representation of $f_1$ on a display of the certain first user. In another example, the method may include Step 10, which involves rendering a representation of $f_2$ and/or displaying the representation of $f_1$ on a display of the certain second user.

In one embodiment, generating the first output and/or the second output may involve computing weights based on profile similarity. For example, generating the first output in Step 4 may involve the performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 8 may involve similar steps, mutatis mutandis, to the ones described above.

In another embodiment, the first output and/or the second output may involve clustering of profiles. For example, generating the first output in Step 4 may involve the performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 8 may involve similar steps, mutatis mutandis, to the ones described above.

In some embodiments, the method may optionally include additional steps involved in comparing the functions $f_1$ and $f_2$: (i) receiving descriptions of the functions $f_1$ and $f_2$; (ii) making a comparison between the functions $f_1$ and $f_2$; and (iii) providing, based on the comparison, an indication of at least one of the following: (i) the function, from among $f_1$ and $f_2$, for which the average affective response predicted to having the experience throughout the periodic unit of time is greatest; (ii) the function, from among $f_1$ and $f_2$, for which the affective response predicted to having the experience at a certain time t in the periodic unit of time, is greatest.

Users may have various experiences in their day-to-day lives, which can be of various types. Some examples of experiences include, going on vacations, playing games, participating in activities, receiving a treatment, and more. Having an experience can have an impact on how a user feels by causing the user to have a certain affective response. The impact of an experience on the affective response a user that had the experience may last a certain period of time after the experience. Such a post-experience impact on affective response may be referred to as an "aftereffect" of the experience. One factor that may influence the extent of the aftereffect of an experience is the time the user has the experience. For example, the season and/or time of day during which a user has an experience may affect how the user feels after having the experience. Having knowledge about the influence of the period during which a user has an experience on the aftereffect of the experience can help decide which experiences to have and/or when to have them.

Some aspects of embodiments described herein involve systems, methods, and/or computer-readable media that may be utilized to learn functions of a periodic aftereffect of an experience. A function describing a periodic aftereffect of an experience is a function that describes expected affective response of a user after having had an experience, based on when, in a periodic unit of time, the user had the experience (i.e., the period during which the user had the experience). A periodic unit of time is a unit of time that repeats itself regularly. An example of periodic unit of time is a day (a period of 24 hours that repeats itself), a week (a periodic of 7 days that repeats itself, and a year (a period of twelve months that repeats itself). Thus, for example, the function may be used to determine an expected aftereffect of having an experience during a certain hour of the day (for a periodic unit of time that is a day), a certain day of the week (for a periodic unit of time that is a week), etc. In some examples, such a function may be indicative of times during the day during which a walk in the park may be more relaxing, or weeks during the year in which a vacation at a certain location is most invigorating.

Herein, an aftereffect of an experience may be considered a residual affective response a user may have due to having the experience. In some embodiments, determining the aftereffect is done based on measurements of affective response of users who had the experience (e.g., these may include measurements of at least five users, or some other minimal number of users such as at least ten users). The measurements of affective response are typically taken with sensors coupled to the users (e.g., sensors in wearable devices and/or sensors implanted in the users). One way in which aftereffects may be determined is by measuring users before and after they finish the experience. Having these measurements may enable assessment of how having the experience at different times influences the aftereffect to the experience. Such measurements may be referred to herein as "prior" and "subsequent" measurements. A prior measurement may be taken before finishing an experience (or even before having started it) and a subsequent measurement is taken after finishing the experience. Typically, the difference between a subsequent measurement and a prior measurement, of a user who had an experience, is indicative of an aftereffect of the experience.

In some embodiments, a function describing an expected aftereffect of an experience based on the time, with respect to a periodic unit of time, in which a user has the experience may be considered to behave like a function of the form $f(t)=v$; here t represents a time (in the periodic unit of time), and v represents the value of the aftereffect after having had the experience at the time t. In one example, v may be a value indicative of the extent there is expected to have a certain emotional response, such as being happy, relaxed, and/or excited, after having had the experience at time t.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor. Optionally, the predictor is used to predict target values of the function (e.g., v mentioned above) for different domain values of the (e.g., t mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (t,v), the value of t may be used to determine in which bin to place the sample. After the training data is placed in bins, a representative value is computed for each bin; this value is computed from the v values of the samples in the bin, and typically represents some form of aftereffect score for the experience.

Some aspects of this disclosure involve learning personalized functions for different users utilizing profiles of the different users. Given a profile of a certain user, similarities between the profile of the certain user and profiles of other users are used to select and/or weight measurements of affective response of other users, from which a function is learned. Thus, different users may have different functions created for them, which are learned from the same set of measurements of affective response.

Figure 65A:
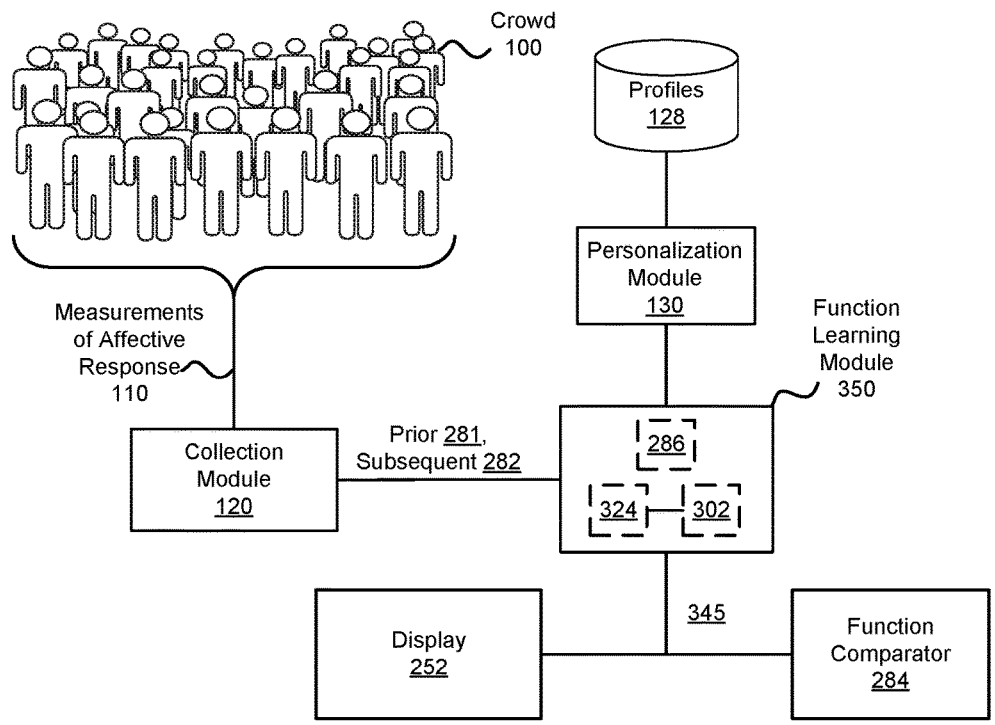
FIG. 65a illustrates a system configured to learn a function describing a periodic aftereffect of an experience.

FIG. 65a illustrates a system configured to learn a function describing a periodic aftereffect of an experience. Optionally, the function describes, for different times in the periodic unit of time, expected aftereffects of the experience due to having the experience at the different times. The system includes at least collection module 120 and function learning module 350. The system may optionally include additional modules, such as the personalization module 130, function comparator 284, and/or the display 252.

The collection module 120 is configured, in one embodiment, to receive measurements 110 of affective response of users. The measurements 110 are taken utilizing sensors coupled to the users (as discussed in more detail at least in section 1—Sensors and section 2—Measurements of Affective Response). In this embodiment, the measurements 110 include prior and subsequent measurements of at least ten users who had the experience (denoted with reference numerals 281 and 282, respectively). A prior measurement of a user, from among the prior measurements 281, is taken before the user finishes having the experience. Optionally, the prior measurement of the user is taken before the user starts having the experience. A subsequent measurement of the user, from among the subsequent measurements 282, is taken after the user finishes having the experience (e.g., after the elapsing of a duration of at least ten minutes from the time the user finishes having the experience). Optionally, the subsequent measurements 282 comprise multiple subsequent measurements of a user who had the experience, taken at different times after the user had the experience. Optionally, a difference between a subsequent measurement and a prior measurement of a user who had the experience is indicative of an aftereffect of the experience on the user.

In some embodiments, the prior measurements 281 and/or the subsequent measurements 282 are taken within certain windows of time with respect to when the at least ten users have the experience. In one example, a prior measurement of each user is taken within a window that starts a certain time before the user has the experience, such as a window of one hour before the experience. In this example, the window may end when the user starts the experience. In another example, the window may end a certain time into the experience, such as ten minutes after the start of the experience. In another example, a subsequent measurement of a user in taken within one hour from when the user finishes having the experience (e.g. in an embodiment involving an experience that is an exercise). In still another example, a subsequent measurement of a user may be taken sometime within a larger window after the user finishes the experience, such as up to one week after the experience (e.g. in an embodiment involving an experience that is a vacation).

In some embodiments, the measurements received by the collection module 120 may comprise multiple prior and/or subsequent measurements of a user who had the experience.

In one example, the multiple measurements may correspond to the same event in which the user had the experience. In another example, at least some of the multiple measurements correspond to different events in which the user had the experience.

In some embodiments, the measurements 110 may include measurements of users who had the experience for various durations. In one example, the measurements 110 include a measurement of a first user who had the experience for a first duration. Additionally, in this example, the measurements 110 include a measurement of a second user who had the experience for a second duration. Optionally, the second duration is at least 50% longer than the first duration.

In some embodiments, the measurements 110 may include prior and subsequent measurements of users who had the experience during different cycles of the periodic unit of time. Optionally, the measurements 110 include a first prior measurement taken in a first cycle of the periodic unit of time and a second prior measurement taken in a second cycle of the periodic unit of time, where the second cycle does not start before the first cycle ends. Optionally, the first and second prior measurements are of the same user. Alternatively, the first prior measurement may be of a first user and the second prior measurement may be of a second user, who is not the first user. A cycle of the periodic unit of time is an occurrence of the periodic unit of time that starts at a certain date and time. Thus, for example, if a periodic unit of time is a week, then one cycle of the periodic unit of time may be the first week of May 2016 and another cycle of the periodic unit of time might be the second week of May 2016.

Figure 65B:
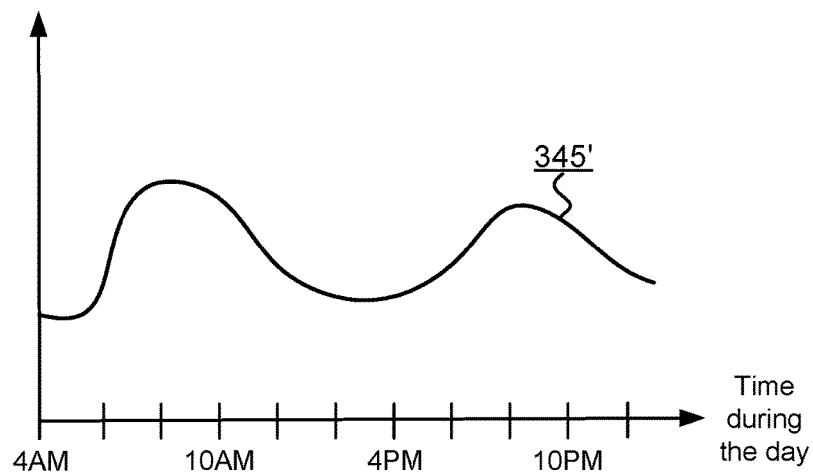
FIG. 65b illustrates an example of a function describing a periodic aftereffect.

The function learning module 350 is configured, in one embodiment, to receive data comprising the prior measurements 281 and subsequent measurements 282, and to utilize the data to learn function 345. Optionally, the function 345 is a function of periodic aftereffect of the experience. Optionally, the function 345 describes, for different times in the periodic unit of time, expected aftereffects of the experience due to having the experience at the different times. FIG. 65b illustrates an example of the function 345 learned by the function learning module 350. The figure presents graph 345', which is an illustration of an example the function 345 that describes the aftereffect (relaxation from walking in the park in the figure), as a function of the time during the day. Optionally, the function 345 may be described via its parameters, thus, learning the function 345, may involve learning the parameters that describe the function 345.

In some embodiments, the function 345 may be considered to perform a computation of the form $f(t)=v$, where the input t is a time in the periodic unit of time, and the output v is an expected affective response. Optionally, the output of the function 345 may be expressed as an affective value. In one example, the output of the function 345 is an affective value indicative of an extent of feeling at least one of the following emotions: pain, anxiety, annoyance, stress, aggression, aggravation, fear, sadness, drowsiness, apathy, anger, happiness, contentment, calmness, attentiveness, affection, and excitement. In some embodiments, the function 345 is not a constant function that assigns the same output value to all input values. Optionally, the function 345 is at least indicative of values $v_1$ and $v_2$ of expected affective response after having had the experience at times $t_1$ and $t_2$ during the periodic unit of time, respectively. That is, the function 345 is such that there are at least two values $t_1$ and $t_2$, for which $f(t_1)=v_1$ and $f(t_2)=v_2$. And additionally, $t_1 \neq t_2$ and $v_1 \neq v_2$. Optionally, $t_2$ is at least 10% greater than $t_1$. In one example, $t_1$ is in the first half of the periodic unit of time and $t_2$ is in the second half of the periodic unit of time. In another example, the periodic unit of time is a day, and $t_1$ corresponds to a time during the morning and $t_2$ corresponds to a time during the evening. In yet another example, the periodic unit of time is a week, and $t_1$ corresponds to some time on Tuesday and $t_2$ corresponds to a time during the weekend. And in still another example, the periodic unit of time is a year, and $t_1$ corresponds to a time during the summer and $t_2$ corresponds to a time during the winter.

The prior measurements 281 may be utilized in various ways by the function learning module 350, which may slightly change what is represented by the function 345. In one embodiment, a prior measurement of a user is utilized to compute a baseline affective response value for the user. In this embodiment, values computed by the function 345 may be indicative of differences between the subsequent measurements 282 of the at least ten users and baseline affective response values for the at least ten users. In another embodiment, values computed by the function 345 may be indicative of an expected difference between the subsequent measurements 282 and the prior measurements 281.

Following is a description of different configurations of the function learning module 350 that may be used to learn a function describing a periodic aftereffect of the experience. Additional details about the function learning module 350 may be found in this disclosure at least in section 17—Learning Function Parameters.

In one embodiment, the function learning module 350 utilizes machine learning-based trainer 286 to learn the parameters of the function describing the periodic aftereffect of the experience. Optionally, the machine learning-based trainer 286 utilizes the prior measurements 281 and the subsequent measurements 282 to train a model comprising parameters for a predictor configured to predict a value of an aftereffect of a user based on an input indicative of a time, in the periodic unit of time, during which the user had the experience. In one example, each pair comprising a prior measurement of a user and a subsequent measurement of the user, related to an event in which the user had the experience at a time t during the periodic unit of time, is converted to a sample (t,v), which may be used to train the predictor. Optionally, v is a value determined based on a difference between the subsequent measurement and the prior measurement and/or a difference between the subsequent measurement and baseline computed based on the prior measurement, as explained above.

The time t above may represent slightly different times in different embodiments. In one embodiment, the time t is the time the user started having the experience. In another embodiment, t is the time the user finished having the experience. In yet another embodiment, t may represent some time in between (e.g., the middle of the experience). And in other embodiments, the time t may correspond to some other time, such as the time the prior measurement was taken or the time the subsequent measurement was taken.

When the trained predictor is provided inputs indicative of the times $t_1$ and $t_2$ mentioned above, the predictor predicts the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function learned by the function learning module 350 comprise the parameters of the model and/or other data utilized by the predictor.

In an alternative embodiment, the function learning module 350 may utilize binning module 324, which is configured, in this embodiment, to assign a pair comprising a prior measurement of a user who had the experience and a subsequent measurement of the user, taken after the user had the experience, to one or more of a plurality of bins based on when, in the periodic unit of time, the pair of measurements were taken (represented by the value t mentioned above). For example, if the periodic unit of time is a week, each bin may correspond to pairs of measurements taken during a certain day of the week. In another example, if the periodic unit of time is a day, then the plurality of bins may contain a bin representing each hour of the day.

Additionally, the function learning module 350 may utilize the aftereffect scoring module 302, which, in one embodiment, is configured to compute a plurality of aftereffect scores for the experience, corresponding to the plurality of bins. An aftereffect score corresponding to a bin is computed based on prior and subsequent measurements of at least five users, from among the at least ten users, who had the experience at a time, in the periodic unit of time, that corresponds to the bin. Optionally, prior and subsequent measurements used to compute the aftereffect score corresponding to the bin were assigned to the bin by the binning module 324. Optionally, with respect to the values $\tau_1$, $t_2$, $v_1$, and $v_2$ mentioned above, $t_1$ falls within a range of times in the periodic unit of time corresponding to a first bin, $t_2$ falls within a range of times in the periodic unit of time corresponding to a second bin, which is different from the first bin, and the values $v_1$ and $v_2$ are the aftereffect scores corresponding to the first and second bins, respectively.

In one embodiments, the parameters of the function learned by the function learning module 350 comprise the parameters derived from aftereffect scores corresponding to the plurality of bins and/or information related to the bins, such as information describing their boundaries.

In one embodiment, an aftereffect score for an experience is indicative of an extent of feeling at least one of the following emotions after having the experience: pain, anxiety, annoyance, stress, aggression, aggravation, fear, sadness, drowsiness, apathy, anger, happiness, contentment, calmness, attentiveness, affection, and excitement. Optionally, the aftereffect score is indicative of a magnitude of a change in the level of the at least one of the emotions due to having the experience.

Embodiments described herein in may involve various types of experiences for which a function may be learned using the system illustrated in FIG. 65a. Following are a few examples of types of experiences and functions of periodic aftereffects that may be learned. Additional details regarding the various types of experiences for which it may be possible to learn a periodic aftereffect function may be found at least in section 3—Experiences in this disclosure.

Vacation—In one embodiment, the experience to which the function 345 corresponds involves taking a vacation at a certain destination. For example, the certain destination may be a certain country, a certain city, a certain resort, a certain hotel, and/or a certain park. Optionally, the periodic unit of time in this embodiment may be a year. The function in this embodiment may describe to what extent a user feels relaxed and/or happy (e.g., on a scale from 1 to 10) after taking a vacation at certain time during the year (e.g., when the vacation during a certain week in the year and/or during a certain season). Optionally, in addition to the input value indicative of t, the function 345 may receive additional input values. For example, in one embodiment, the function 345 receives an additional input value $\Delta t$ indicative of how long after the return from the vacation the subsequent measurement was taken. Thus, in this example, the function 345 may be considered to behave like a function of the form $f(t,\Delta t)=v$, and it may describe the affective response v a user is expected to feel at a time $\Delta t$ after taking the vacation at time t. In another example, the additional parameter may correspond to the duration of the vacation d.

Exercise—In one embodiment, the experience to which the function 345 corresponds involves partaking in an exercise activity, such as Yoga, Zumba, jogging, swimming, golf, biking, etc. Optionally, the periodic unit of time in this embodiment may be a day (i.e., 24 hours). In one example, the function 345 may describe how well user feels (e.g., on a scale from 1 to 10) after completing an exercise during a certain time of the day. Optionally, in addition to the input value indicative of t, the function 345 may receive additional input values. For example, in one embodiment, the function 345 receives an additional input value d indicative of how much time the user spends exercising. Thus, in this example, the function 345 may be considered to behave like a function of the form $f(t,d)=v$, and it may describe the aftereffect v a user is expected to feel after exercising for a duration d at a time t during the day.

In some embodiments, the personalization module 130 may be utilized, by the function learning module 350, to learn personalized functions for different users by utilizing profiles of the different users. Given a profile of a certain user, the personalization module 130 may generate an output indicative of similarities between the profile of the certain user and the profiles from among the profiles 128 of the at least ten users. Utilizing this output, the function learning module 350 can select and/or weight measurements from among the prior measurements 281 and subsequent measurements 282, in order to learn a function personalized for the certain user, which describes, for different times in the periodic unit of time, expected aftereffects of the experience due to having the experience at the different times. Additional information regarding personalization, such as what information the profiles 128 may contain, how to determine similarity between profiles, and/or how the output may be utilized, may be found in section 11—Personalization.

It is to be noted that personalized functions are not necessarily the same for all users; for some input values, functions that are personalized for different users may assign different target values. That is, for at least a certain first user and a certain second user, who have different profiles, the function learning module learns different functions, denoted $f_1$ and $f_2$, respectively. In one example, the function $f_1$ is indicative of values $v_1$ and $v_2$ of expected affective responses after having the experience at times $t_1$ and $t_2$ during the periodic unit of time, respectively, and the function $f_2$ is indicative of values $v_3$ and $v_4$ of expected affective responses after the having the experience at times $t_1$ and $t_2$, respectively. And additionally, $t_1 \neq t_2$, $v_1 \neq v_2$, $v_3 \neq v_4$, and $v_1 \neq v_3$.

Following is a description of steps that may be performed in a method for learning a function describing a periodic aftereffect of an experience. The steps described below may, in one embodiment, be part of the steps performed by an embodiment of the system described above (illustrated in FIG. 65a). In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a periodic aftereffect of an experience at least the following steps:

In Step 1, receiving, by a system comprising a processor and memory, measurements of affective response of users taken utilizing sensors coupled to the users. In this embodiment, the measurements comprise prior and subsequent measurements of at least ten users who had the experience. A prior measurement of a user is taken before the user finishes the experience (or even before the user starts having the experience). A subsequent measurement of the user is taken after the user finishes having the experience (e.g., after elapsing of a duration of at least ten minutes after the user finishes the experience). Optionally, a difference between a subsequent measurement and a prior measurement of a user who had the experience is indicative of an aftereffect of the experience on the user. Optionally, the prior and subsequent measurements are received by the collection module 120.

And in Step 2, learning, based on the prior and subsequent measurements, parameters of a function that describes, for different times in the periodic unit of time, expected aftereffects of the experience due to having the experience at the different times. Optionally, the function is at least indicative of values $v_1$ and $v_2$ of expected aftereffects due to having the experience at times $t_1$ and $t_2$ in the periodic unit of time, respectively; where $t_1 \neq t_2$ and $v_1 \neq v_2$. Optionally, the function is learned utilizing the function learning module 350.

In one embodiment, Step 1 optionally involves utilizing a sensor coupled to a user who had the experience to obtain a prior measurement of affective response of the user and/or a subsequent measurement of affective response of the user. Optionally, Step 1 may involve taking multiple subsequent measurements of a user at different times after the user had the experience.

In some embodiments, the method may optionally include a step that involves displaying the function learned in Step 2 on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 2 may involve performing different operations in different embodiments.

In one embodiment, learning the parameters of the function comprises utilizing a machine learning-based trainer that is configured to utilize the prior and subsequent measurements to train a model for a predictor configured to predict a value of affective response of a user corresponding to an aftereffect based on an input indicative of the time, during a periodic unit of time, in which the user had the experience. Optionally, responsive to being provided inputs indicative of the times $t_1$ and $t_2$, the predictor predicts the values $v_1$ and $v_2$, respectively.

In another embodiment, learning the parameters of the function in Step 2 involves the following operations: (i) assigning the measurements received in Step 1 to a plurality of bins based on the time in the periodic unit of time the measurements were taken; and (ii) computing a plurality of aftereffect scores corresponding to the plurality of bins. Optionally, an aftereffect score corresponding to a bin is computed based on prior and subsequent measurements of at least five users, from the at least ten users, which were assigned to the bin. Optionally, $t_1$ is assigned to a first bin, $t_2$ is assigned to a second bin, which is different from the first bin, and the values $v_1$ and $v_2$ are based on the scores corresponding to the first and second bins, respectively.

In one embodiment, the function comparator module 284 is configured to receive descriptions of first and second functions of the periodic aftereffect of first and second experiences, respectively. The function comparator module 284 is also configured to compare the first and second functions and to provide an indication of at least one of the following: (i) the experience, from among the first and second experiences, for which the aftereffect throughout the periodic unit of time is greatest; and (ii) the experience, from among the first and second experiences, for which the aftereffect, after having had the respective experience at a certain time t in the periodic unit of time, is greatest.

A function learned by a method described above may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function personalized for the certain user that describes a periodic aftereffect of the experience. Optionally, the output is generated utilizing the personalization module 130. Depending on the type of personalization approach used and/or the type of function learning approach used, the output may be utilized in various ways to learn the function, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected aftereffects after having had the experience at times $t_1$ and $t_2$ in the periodic unit of time, respectively, and $f_2$ is indicative of values $v_3$ and $v_4$ of expected aftereffects after having had the experience at the times $t_1$ and $t_2$ in the periodic unit of time, respectively. Additionally, in this example, $t_1 \neq t_2$, $v_1 \neq v_2$, $v_3 \neq v_4$, and $v_1 \neq v_3$.

Users may have various experiences in their day-to-day lives, which can be of various types. Some examples of experiences include, going on vacations, playing games, participating in activities, receiving a treatment, and more. Some of experiences may be experienced by users multiple times (e.g., a game may be played multiple days, a restaurant may be frequented multiple times, and a vacation destination may be returned to more than once). For different experiences, repeating the experience multiple times may have different effects on users. For example, a user may be quickly tire from a first game after playing it a few times, but another game may keep the same user riveted for tens of hours of gameplay. Having such knowledge about how users feel about a repeated experience may help determine what experience a user should have and/or how often to repeat it.

Some aspects of embodiments described herein involve systems, methods, and/or computer-readable media that may be utilized to learn functions describing, for different extents to which an experience had been previously experienced, an expected affective response to experiencing the experience again. In some embodiments, determining the expected affective response is done based on measurements of affective response of users who had the experience (e.g., these may include measurements of at least five users, or some other minimal number of users, such as at least ten users). The measurements of affective response are typically taken with sensors coupled to the users (e.g., sensors in wearable devices and/or sensors implanted in the users).

In some embodiments, a function describing expected affective response to an experience based an extent to which the experience had been previously experienced may be considered to behave like a function of the form $f(e)=v$, where e represents an extent to which the experience had already been experienced and v represents the value of the expected affective response when having the experience again (after it had already been experienced to the extent e). In one example, v may be a value indicative of the extent the user is expected to have a certain emotional response, such as being happy, relaxed, and/or excited when having the experience again.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the function (e.g., e mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (e,v), the value of e may be used to determine in which bin to place the sample. After the training data is placed in bins, a representative value is computed for each bin; this value is computed from the v values of the samples in the bin, and typically represents some form of score for the experience.

Some aspects of this disclosure involve learning personalized functions for different users utilizing profiles of the different users. Given a profile of a certain user, similarities between the profile of the certain user and profiles of other users are used to select and/or weight measurements of affective response of other users, from which a function is learned. Thus, different users may have different functions created for them, which are learned from the same set of measurements of affective response.

Figure 66A:
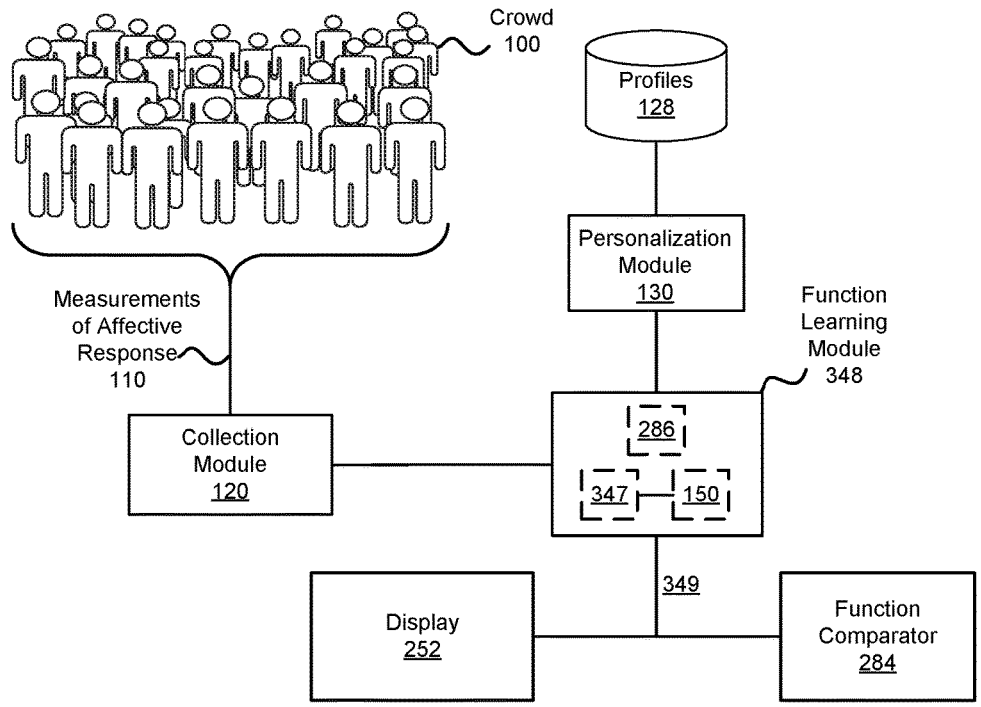
FIG. 66a illustrates a system configured to learn a function that describes, for different extents to which the experience had been previously experienced, an expected affective response to experiencing the experience again.

FIG. 66a illustrates a system configured to learn a function that describes, for different extents to which the experience had been previously experienced, an expected affective response to experiencing the experience again. The system includes at least collection module 120 and function learning module 348. The system may optionally include additional modules, such as the personalization module 130, function comparator 284, and/or the display 252.

The collection module 120 is configured, in one embodiment, to receive measurements 110 of affective response of users belonging to the crowd 100. Optionally, the measurements 110 are taken utilizing sensors coupled to the users. In one embodiment, the measurements 110 include measurements of affective response of at least ten users who have the experience, and a measurement of each user is taken while the user has the experience. Optionally, the measurement of the user may be normalized with respect to a prior measurement of the user, taken before the user started having the experience and/or a baseline value of the user. Optionally, each measurement from among the measurements of the at least ten users may be associated with a value indicative of the extent to which the user had already experienced the experience, before experiencing it again when the measurement was taken. Additional information regarding how the measurements may be taken, collected, and/or processed may be found in section 1—Sensors, section 2—Measurements of Affective Response, and section 9—Collecting Measurements.

Depending on the embodiment, a value indicative of the extent to which a user had already experienced an experience may comprise various types of values. The following are some non-limiting examples of what the "extent" may mean, other types of values may be used in some of the embodiments described herein. In one embodiment, the value of the extent to which a user had previously experienced the experience is indicative of the time that had elapsed since the user first had the experience (or since some other incident that may be used for reference). In another embodiment, the value of the extent to which a user had previously experienced the experience is indicative of a number of times the user had already had the experience. In yet another embodiment, the value of the extent to which a user had previously experienced the experience is indicative of a number of hours spent by the user having the experience, since having it for the first time (or since some other incident that may be used for reference).

It is to be noted that the experience to which the measurements of the at least ten users relate may be any of the various experiences described in this disclosure, such as an experience involving being in a certain location, an experience involving engaging in a certain activity, etc. In some embodiments, the experience belongs to a set of experiences that may include and/or exclude various experiences, as discussed in section 3—Experiences.

In some embodiments, the measurements received by the collection module 120 comprise multiple measurements of a user who had the experience; where each of the multiple measurements of the user corresponds to a different event in which the user had the experience.

In some embodiments, the measurements 110 include measurements of users who had the experience after having previously experienced the experience to different extents. In one example, the measurements 110 include a first measurement of a first user, taken after the first user had already experienced the experience to a first extent, and a second measurement of a second user, taken after the second user had already experienced the experience to a second extent. In this example, the second extent is significantly greater than the first extent. Optionally, by "significantly greater" it may mean that the second extent is at least 25% greater than the first extent (e.g., the second extent represents 15 hours of prior playing of a game and the first extent represents 10 hours of prior playing of the game). In some cases, being "significantly greater" may mean that the second extent is at least double the first extent (or even greater than that).

The function learning module 348 is configured, in one embodiment, to receive data comprising the measurements of the at least ten users and their associated values, and to utilize the data to learn function 349. Optionally, the function 349 describes, for different extents to which the experience had been previously experienced, an expected affective response to experiencing the experience again. Optionally, the function 349 may be described via its parameters, thus, learning the function 349, may involve learning the parameters that describe the function 349. In embodiments described herein, the function 349 may be learned using one or more of the approaches described further below.

Figure 66B:
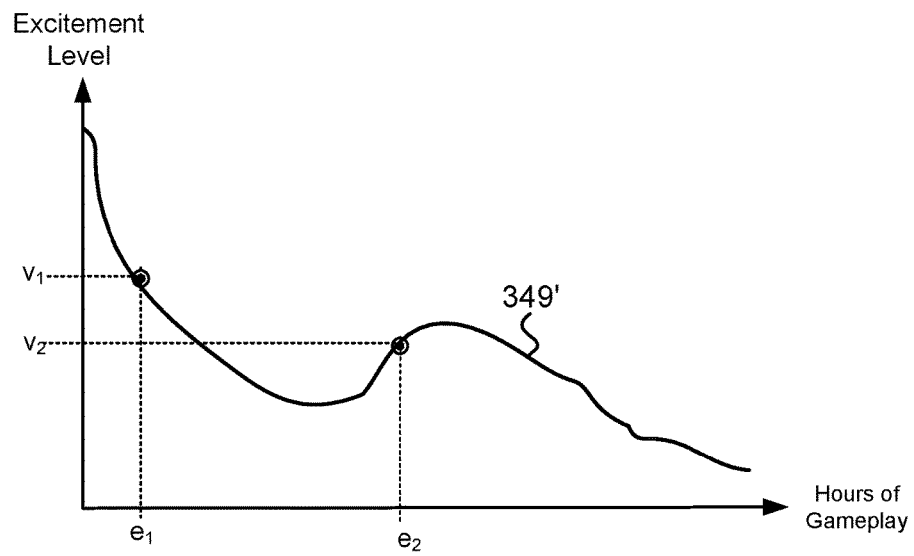
FIG. 66b illustrates an example of a representation of a function that describes changes in the excitement from playing a game over the course of many hours.

In some embodiments, the function 349 may be considered to perform a computation of the form $f(e)=v$, where the input $e$ is an extent to which an experience had already been experienced, and the output $v$ is an expected affective response (to having the experience again after it had already been experienced to the extent $e$). Optionally, the output of the function 349 may be expressed as an affective value. In one example, the output of the function 349 is an affective value indicative of an extent of feeling at least one of the following emotions: pain, anxiety, annoyance, stress, aggression, aggravation, fear, sadness, drowsiness, apathy, anger, happiness, contentment, calmness, attentiveness, affection, and excitement. In some embodiments, the function 349 is not a constant function that assigns the same output value to all input values. Optionally, the function 349 is at least indicative of values $v_1$ and $v_2$ of expected affective response corresponding to having the experience again after it had been experienced before to the extents $e_1$ and $e_2$, respectively. That is, the function 349 is such that there are at least two values $e_1$ and $e_2$, for which $f(e_1)=v_1$ and $f(e_2)=v_2$. And additionally, $e_1 \neq e_2$ and $v_1 \neq v_2$. Optionally, $e_2$ is at least 25% greater than $e_1$. FIG. 66b illustrates an example of a representation 349' of the function 349 with an example of the values $v_1$ and $v_2$ at the corresponding respective extents $e_1$ and $e_2$. The figure illustrates changes in the excitement from playing a game over the course of many hours. The plot 349' shows how initial excitement in the game withers, until some event like discovery of new levels increases interest for a while, but following that, the excitement continues to decline.

Following is a description of different configurations of the function learning module 348 that may be used to learn the function 349. Additional details about the function learning module 348 may be found in this disclosure at least in section 17—Learning Function Parameters.

In one embodiment, the function learning module 348 utilizes the machine learning-based trainer 286 to learn parameters of the function 349. Optionally, the machine learning-based trainer 286 utilizes the measurements of the at least ten users to train a model for a predictor that is configured to predict a value of affective response of a user based on an input indicative of an extent to which the user had already experienced the experience. In one example, each measurement of the user taken while having the experience again, after having experienced it before to an extent $e$, is converted to a sample $(e,v)$, which may be used to train the predictor; where $v$ is an affective value determined based on the measurement. Optionally, when the trained predictor is provided inputs indicative of the extents $e_1$ and $e_2$ (mentioned above), the predictor utilizes the model to predict the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function 349 comprise the parameters of the model and/or other data utilized by the predictor.

In an alternative embodiment, the function learning module 348 may utilize binning module 347, which is configured, in this embodiment, to assign a measurement of users to a plurality of bins based on the extent to which the user had experienced the experience before the measurement was taken (when the user experienced it again).

Additionally, in this embodiment, the function learning module 348 may utilize the scoring module 150, or some other scoring module described in this disclosure, to compute a plurality of scores corresponding to the plurality of bins. A score corresponding to a bin is computed based on the measurements assigned to the bin which comprise measurements of at least five users, from the at least ten users. Optionally, with respect to the values $e_1$, $e_2$, $v_1$, and $v_2$ mentioned above, $e_1$ falls within a range of extents corresponding to a first bin, $e_2$ falls within a range of extents corresponding to a second bin, which is different from the first bin, and the values $v_1$ and $v_2$ are based on the scores corresponding to the first and second bins, respectively.

In one example, the experience related to the function 349 involves playing a game. In this example, the plurality of bins may correspond to various extents of previous game play which are measured in hours that the game has already been played. For example, the first bin may contain measurements taken when a user only played the game for 0-5 hours, the second bin may contain measurements taken when the user already played 5-10 hours, etc. In another example, the experience related to the function 349 involves taking a yoga class. In this example, the plurality of bins may correspond to various extents of previous yoga classes that a user had. For example, the first bin may contain measurements taken during the first week of yoga class, the second bin may contain measurements taken during the second week of yoga class, etc.

Embodiments described herein in may involve various types of experiences for which the function 349 may be learned using the system illustrated in FIG. 66a; the following are a few examples of such experiences. Additional details regarding the various types of experiences may be found at least in section 3—Experiences.

Location—In one embodiment, the experience related to the function 349 involves visiting a location such as a bar, night club, vacation destination, and/or a park. In this embodiment, the function 349 describes a relationship between the number of times a user previously visited a location, and the affective response corresponding to visiting the location again. In one example, the function 349 may describe to what extent a user feels relaxed and/or happy (e.g., on a scale from 1 to 10) when returning to the location again.

Exercise—In one embodiment, the experience to which the function 349 relates involves partaking in an exercise activity, such as Yoga, Zumba, jogging, swimming, golf, biking, etc. The function 349 in this embodiment may describe how much a user is engaged (e.g., on a scale from 1 to 10) when exercising again, after having previously exercised to a certain extent. Optionally, the certain extent may represent a value such as the number of pervious exercises and/or the number of hours of previous exercises.

Functions computed by the function learning module 348 for different experiences may be compared, in some embodiments. For example, such a comparison may help determine what experience is better in terms of expected affective response after having had it already to a certain extent. Comparison of functions may be done, in some embodiments, utilizing the function comparator module 284, which is configured, in one embodiment, to receive descriptions of at least first and second functions that involve having respective first and second experiences, after having had the respective experiences previously to a certain extent. The function comparator module 284 is also configured, in this embodiment, to compare the first and second functions and to provide an indication of at least one of the following: (i)

the experience, from among the first and second experiences, for which the average affective response to having the respective experience again, after having had it previously at most to the certain extent e, is greatest; (ii) the experience, from among the first and second experiences, for which the average affective response to having the respective experience again, after having had it previously at least to the certain extent e, is greatest; and (iii) the experience, from among the first and second experiences, for which the affective response to having the respective experience again, after having had it previously to the certain extent e, is greatest. Optionally, comparing the first and second functions may involve computing integrals of the functions, as described in more detail in section 17—Learning Function Parameters.

In some embodiments, the personalization module 130 may be utilized, by the function learning module 348, to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 348 may be configured to utilize the output to learn a personalized function for the certain user (i.e., a personalized version of the function 349), which describes, for different extents to which the experience had been previously experienced, an expected affective response to experiencing the experience again.

It is to be noted that personalized functions are not necessarily the same for all users. That is, at least a certain first user and a certain second user, who have different profiles, the function learning module 348 learns different functions, denoted $f_1$ and $f_2$, respectively. In one example, the function $f_1$ is indicative of values $v_1$ and $v_2$ of expected affective response corresponding to having the experience again after it had been previously experienced to extents $e_1$ and $e_2$, respectively, and $f_2$ is indicative of values $v_3$ and $v_4$ of expected affective response corresponding to having the experience again after it had been previously experienced to extents the $e_1$ and $e_2$, respectively. And additionally, $e_1 \neq e_2$, $v_1 \neq v_2$, $v_3 \neq v_4$, and $v_1 \neq v_3$.

Figure 67:
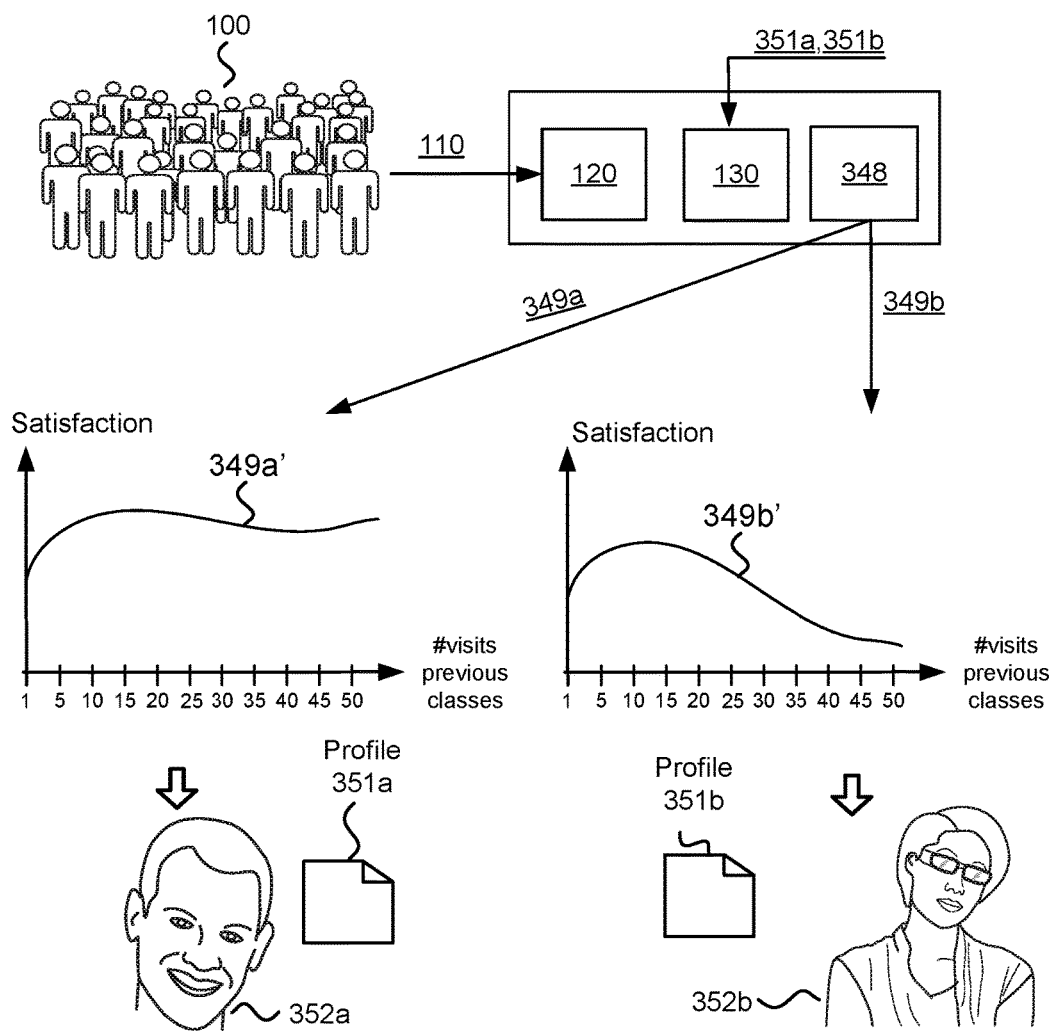
FIG. 67 different personalized functions describing a relationship between an extent to which an experience had been previously experienced, and affective response to experiencing it again.

FIG. 67 illustrates such a scenario where personalized functions are generated for different users. In this illustration, certain first user 352a and certain second user 352b have different profiles 318a and 351b, respectively. Given these profiles, the personalization module 130 generates different outputs that are utilized by the function learning module to learn functions 349a and 349b for the certain first user 352a and the certain second user 352b, respectively. The different functions are represented in FIG. 67 by different-shaped graphs for the functions 349a and 349b (graphs 349a' and 349b', respectively). The different functions indicate different expected affective response trends for the different users, indicative of values of expected affective response after having previously experienced the experience to different extents. In the figure, the graphs show different trends of expected satisfaction from taking a class (e.g., yoga). In the figure, the affective response of the certain second user 352b is expected to taper off more quickly as the certain second user has the experience more and more times, while the certain first user 352a is expected to have a more positive affective response, which is expected to decrease at a slower rate compared to the certain second user 352b.

Following is a description of steps that may be performed in a method for learning a function such as the function 349 that describes, for different extents to which the experience had been previously experienced, an expected affective response to experiencing the experience again. The steps described below may, in one embodiment, be part of the steps performed by an embodiment of the system described above (illustrated in FIG. 66a). In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a function describing a relationship between repetitions of an experience and affective response to the experience includes at least the following steps:

In Step 1, receiving, by a system comprising a processor and memory, measurements of affective response of at least ten users; each measurement of a user is taken while the user experiences the experience, and is associated with a value indicative of an extent to which the user had previously experienced the experience. Optionally, the measurements are received by the collection module 120.

And in Step 2, learning a function based on the measurements and their associated values, which were received in Step 1. Optionally, the function describes, for different extents to which the experience had been previously experienced, an expected affective response to experiencing the experience again. Optionally, the function is at least indicative of values is values $v_1$ and $v_2$ of expected affective response corresponding to extents $e_1$ and $e_2$, respectively; $v_1$ describes an expected affective response to experiencing the experience again, after having previously experienced the experience to the extent $e_1$; and $v_2$ describes an expected affective response to experiencing the experience again, after having previously experienced the experience to the extent $e_2$. Additionally, $e_1 \neq e_2$ and $v_1 \neq v_2$. Optionally, $e_2$ is at least 25% greater than $e_1$.

In one embodiment, Step 1 optionally involves utilizing a sensor coupled to a user who had the experience to obtain a measurement of affective response of the user. Optionally, Step 1 may involve taking multiple measurements of a user that had the experience, corresponding to different events in which the user had the experience.

In some embodiments, the method may optionally include a step that involves presenting the function learned in Step 2 on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 2 may involve performing different operations in different embodiments.

In one embodiment, learning the parameters of the function in Step 2 comprises utilizing a machine learning-based trainer that is configured to utilize the measurements and their associated values to train a model for a predictor configured to predict a value of affective response of a user based on an input indicative of a certain extent to which a user had previously experienced the experience. Optionally, the values in the model are such that responsive to being provided inputs indicative of the extents $e_1$ and $e_2$, the predictor predicts the affective response values $v_1$ and $v_2$, respectively.

In another embodiment, learning the parameters of the function in Step 2 involves the following operations: (i) assigning measurements of affective response to a plurality of bins based on their associated values; and (ii) computing a plurality of scores corresponding to the plurality of bins. Optionally, a score corresponding to a bin is computed based on measurements of at least five users, from the at least ten users, for which the associated values fall within the range corresponding to the bin. Optionally, $e_1$ falls within a range of extents corresponding to a first bin, and $e_2$ falls within a range of extents corresponding to a second bin, which is different from the first bin. Optionally, the values $v_1$ and $v_2$ are the scores corresponding to the first and second bins, respectively.

In some embodiments, functions learned by the method described above may be compared (e.g., utilizing the function comparator 284). Optionally, performing such a comparison involves the following steps: (i) receiving descriptions of first and second functions that describe, for different extents to which an experience had been previously experienced, an expected affective response to experiencing respective first and second experiences again; (ii) comparing the first and second functions; and (iii) providing an indication derived from the comparison. Optionally, the indication indicates least one of the following: (i) the experience, from among the first and second experiences, for which the average affective response to having the respective experience again, after having previously experienced it at most to a certain extent e, is greatest; (ii) the experience, from among the first and second experiences, for which the average affective response to having the respective experience again, after having previously experienced it at least to a certain extent e, is greatest; and (iii) the experience, from among the first and second experiences, for which the affective response to having the respective experience again, after having previously experienced it to a certain extent e, is greatest.

In some embodiments, a function learned by a method described above may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function, personalized for the certain user, that describes for different extents to which the experience had been previously experienced, an expected affective response to experiencing the experience again. Optionally, the output is generated utilizing the personalization module 130. Depending on the type of personalization approach used and/or the type of function learning approach used, the output may be utilized in various ways to learn the function, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected affective response corresponding to having the experience again after having previously experienced the experience to extents $e_1$ and $e_2$, respectively, and $f_2$ is indicative of values $v_3$ and $v_4$ of expected affective response corresponding to having the experience again after having previously experienced the experience to the extents $e_1$ and $e_2$, respectively. Additionally, in this example, $e_1 \neq e_2$, $v_1 \neq v_2$, $v_3 \neq v_4$, and $v_1 \neq v_3$.

Personalization of functions can lead to the learning of different functions for different users who have different profiles, as illustrated in FIG. 67. Obtaining the different functions for the different users may involve performing the steps described below, which include steps that may be carried out in order to learn a personalized function such as the functions 349a and 349b described above. In some embodiments, the steps described below may be part of the steps performed by systems modeled according to FIG. 66a. In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a personalized function describing a relationship between repetitions of an experience and affective response to the experience includes the following steps:

In Step 1, receiving, by a system comprising a processor and memory, measurements of affective response of at least ten users; each measurement of a user is taken while the user has the experience, and is associated with a value indicative of an extent to which the user had previously experienced the experience. Optionally, the measurements are received by the collection module 120.

In Step 2, receiving profiles of at least some of the users who contributed measurements in Step 1.

In Step 3, receiving a profile of a certain first user.

In Step 4, generating a first output indicative of similarities between the profile of the certain first user and the profiles of the at least some of the users. Optionally, the first output is generated by the personalization module 130.

In Step 5, learning parameters of a first function $f_1$, based on the measurements received in Step 1, the values associated with those measurements, and the first output. Optionally, $f_1$ describes, for different extents to which the experience had been previously experienced, an expected affective response to experiencing the experience again. Optionally, $f_1$ is at least indicative of values $v_1$ and $v_2$ expected affective response to experiencing the experience again, after having previously experienced the experience to extents $e_1$ and $e_2$, respectively (here $e_1 \neq e_2$ and $v_1 \neq v_2$). Optionally, the first function $f_1$ is learned utilizing the function learning module 348.

In Step 7 receiving a profile of a certain second user, which is different from the profile of the certain first user.

In Step 8, generating a second output, which is different from the first output, and is indicative of similarities between the profile of the certain second user and the profiles of the at least some of the users. Optionally, the second output is generated by the personalization module 130.

And in Step 9, learning parameters of a second function $f_2$ based on the measurements received in Step 1, the values associated with those measurements, and the second output. Optionally, $f_2$ describes, for different extents to which the experience had been previously experienced, an expected affective response to experiencing the experience again. Optionally, $f_2$ is at least indicative of values $v_3$ and $v_4$ of expected affective response to experiencing the experience again, after having previously experienced the experience to the extents $e_1$ and $e_2$, respectively, (here $v_3 \neq v_4$). Optionally, the second function $f_2$ is learned utilizing the function learning module 348. In some embodiments, $f_1$ is different from $f_2$, thus, in the example above the values $v_1 \neq v_3$ and/or $v_2 \neq v_4$.

In one embodiment, the method may optionally include steps that involve displaying a function on a display such as the display 252 and/or rendering the function for a display (e.g., by rendering a representation of the function and/or its parameters). In one example, the method may include Step 6, which involves rendering a representation of $f_1$ and/or displaying the representation of $f_1$ on a display of the certain first user. In another example, the method may include Step 10, which involves rendering a representation of $f_2$ and/or displaying the representation of $f_2$ on a display of the certain second user.

In one embodiment, generating the first output and/or the second output may involve computing weights based on profile similarity. For example, generating the first output in Step 4 may involve the performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 8 may involve similar steps, mutatis mutandis, to the ones described above.

In another embodiment, the first output and/or the second output may involve clustering of profiles. For example, generating the first output in Step 4 may involve the performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 8 may involve similar steps, mutatis mutandis, to the ones described above.

In some embodiments, the method may optionally include additional steps involved in comparing the functions $f_1$ and $f_2$: (i) receiving descriptions of the functions $f_1$ and $f_2$; (ii) making a comparison between the functions $f_1$ and $f_2$; and (iii) providing, based on the comparison, an indication of at least one of the following: (i) the function, from among $f_1$ and $f_2$, for which the average affective response predicted for having the experience again, after having previously experienced the experience at least to an extent e, is greatest; (ii) the function, from among $f_1$ and $f_2$, for which the average affective response predicted for having the experience again, after having previously experienced the experience at most to the extent e, is greatest; and (iii) the function, from among $f_1$ and $f_2$, for which the affective response predicted for having the experience again, after having previously experienced the experience to the extent e, is greatest.

Users may have various experiences in their day-to-day lives, which can be of various types. Some examples of experiences include, going on vacations, playing games, participating in activities, receiving a treatment, and more. Having an experience can have an impact on how a user feels by causing the user to have a certain affective response. The impact of an experience on the affective response a user that had the experience may last a certain period of time after the experience. Such a post-experience impact on affective response may be referred to as an "aftereffect" of the experience. One factor that may influence the extent of the aftereffect of an experience is the extent to which a user had previously had the experience. For example, the experience may involve receiving some form of treatment that is intended to make the user feel better afterwards. Some examples of treatments may include massages, exercises, virtual reality experiences, biofeedback treatments, various drugs and/or medicines, etc. In some cases, treatments work well for users over long duration and multiple sessions. In other cases, users get used to the treatment and/or the treatment becomes ineffective after a while. Having knowledge about the influence of the extent to which user previously had an experience of an on the aftereffect of the experience can help decide which experiences to have and/or how many times to have them.

Some aspects of this disclosure involve learning functions that represent the extent of an aftereffect of an experience, after having the experience again, after the experience had been previously experienced to a certain extent. Herein, an aftereffect of an experience may be considered a residual affective response a user may have due to having the experience. In some embodiments, determining the aftereffect is done based on measurements of affective response of users who had the experience (e.g., these may include measurements of at least five users, or some other minimal number of users such as at least ten users). The measurements of affective response are typically taken with sensors coupled to the users (e.g., sensors in wearable devices and/or sensors implanted in the users). One way in which aftereffects may be determined is by measuring users before and after they finish the experience. Having these measurements may enable assessment of how having the changed the users' affective response. Such measurements may be referred to herein as "prior" and "subsequent" measurements. A prior measurement may be taken before finishing an experience (or even before having started it) and a subsequent measurement is taken after having finishing the experience. Typically, the difference between a subsequent measurement and a prior measurement, of a user who had an experience, is indicative of an aftereffect of the experience.

In some embodiments, a function that describes, for different extents to which a user had experienced the experience, an expected aftereffect due to experiencing the experience again may be considered to behave like a function of the form $f(e)=v$, where e represents an extent to which the experience has been previously experienced, and v represents the value of the aftereffect after having the experience again (after having previously experienced it to the extent e). In one example, v may be a value indicative of the extent the user is expected to have a certain emotional response, such as being happy, relaxed, and/or excited after having the experience again, after having experienced in previously to the extent e.

Figure 68A:
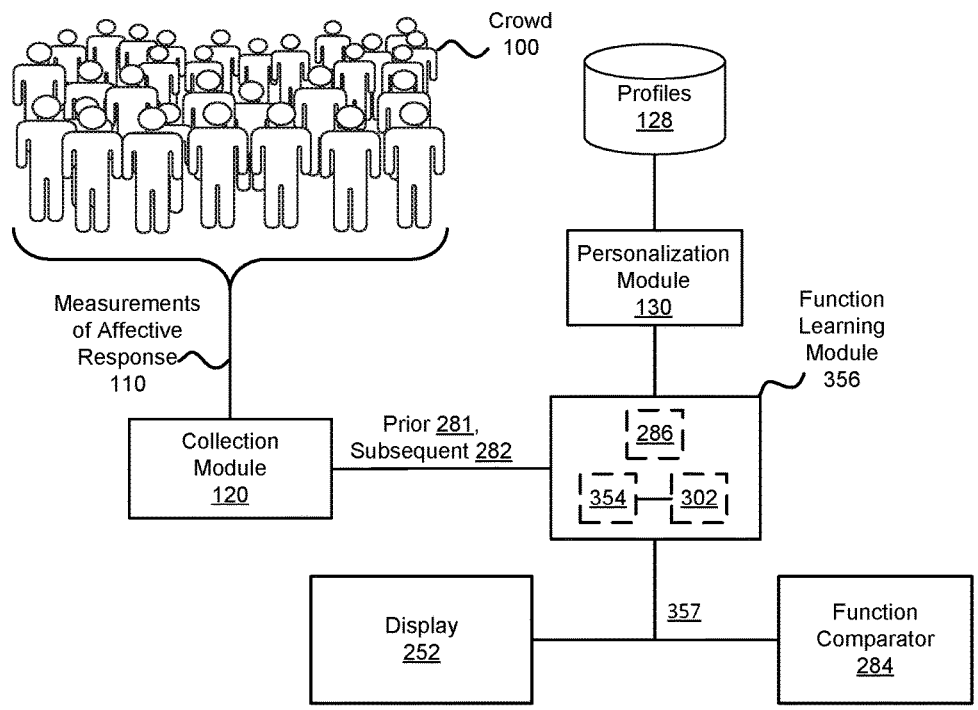
FIG. 68a illustrates a system configured to learn a function describing a relationship between repetitions of an experience and an aftereffect of the experience.

FIG. 68a illustrates a system configured to learn a function describing a relationship between repetitions of an experience and an aftereffect of the experience. Optionally, the function describes, for different extents to which a user had experienced the experience, an expected aftereffect due to experiencing the experience again (after having previously experience it to a certain extent). The system includes at least collection module 120 and function learning module 356. The system may optionally include additional modules, such as the personalization module 130, function comparator 284, and/or the display 252.

The collection module 120 is configured, in one embodiment, to receive measurements 110 of affective response of users. The measurements 110 are taken utilizing sensors coupled to the users (as discussed in more detail at least in section 1—Sensors and section 2—Measurements of Affective Response). In this embodiment, the measurements 110 include prior and subsequent measurements of at least ten users who had the experience (denoted with reference numerals 281 and 282, respectively). A prior measurement of a user, from among the prior measurements 281, is taken before the user finishes having the experience. Optionally, the prior measurement of the user is taken before the user starts having the experience. A subsequent measurement of the user, from among the subsequent measurements 282, is taken after the user finishes having the experience (e.g., after the elapsing of a duration of at least ten minutes from the time the user finishes having the experience). Optionally, a difference between a subsequent measurement and a prior measurement of a user who had the experience is indicative of an aftereffect of the experience on the user. Optionally, each measurement of a user (e.g., a prior or subsequent measurement), from among the measurements received by the collection module 120, may be associated with a value indicative of the extent to which the user had already experienced the experience, before experiencing it again when the measurement was taken.

In some embodiments, the prior measurements 281 and/or the subsequent measurements 282 are taken within certain windows of time with respect to when the at least ten users have the experience. In one example, a prior measurement of each user is taken within a window that starts a certain time before the user has the experience, such as a window of one hour before the experience. In this example, the window may end when the user starts the experience. In another example, the window may end a certain time into the experience, such as ten minutes after the start of the experience. In another example, a subsequent measurement of a user in taken within one hour from when the user finishes having the experience (e.g. in an embodiment involving an experience that is an exercise). In still another example, a subsequent measurement of a user may be taken sometime within a larger window after the user finishes the experience, such as up to one week after the experience (e.g. in an embodiment involving an experience that is a vacation).

In some embodiments, the measurements 110 include measurements of users who had the experience after having experienced the experience previously to different extents. In one example, the measurements 110 include a first prior measurement of a first user, taken after the first user had already experienced the experience to a first extent, and a second prior measurement of a second user, taken after the second user had already experienced the experience to a second extent. In this example, the second extent is significantly greater than the first extent. Optionally, by "significantly greater" it may mean that the second extent is at least 25% greater than the first extent (e.g., the second extent represents 15 hours of prior playing of a game and the first extent represents 10 hours of prior playing of the game). In some cases, being "significantly greater" may mean that the second extent is at least double the first extent (or even longer than that).

The function learning module 356 is configured, in one embodiment, to receive data comprising the prior measurements 281, the subsequent measurements 282 and the values associated with those measurements. The function learning module 356 is also configured to utilize the data to learn function 357. Optionally, the function 357 describes, for different extents to which a user had experienced the experience, an expected aftereffect due to experiencing the experience again. Optionally, the function learned by the function learning module is at least indicative of values $v_1$ and $v_2$ corresponding to expected extents of aftereffects to having the experience again, after having already experienced it to extents $e_1$ and $e_2$, respectively. And additionally, $e_1 \neq e_2$ and $v_1 \neq v_2$.

Figure 68B:
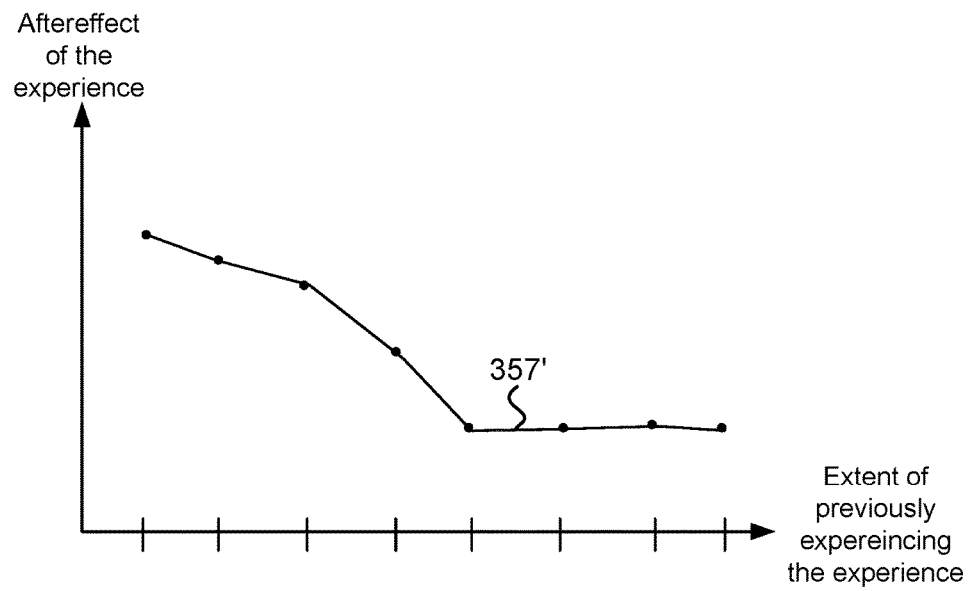
FIG. 68b illustrates an example of a function that describes how an aftereffect of how an experience changes based on an extent to which an experience had been previously experienced.

FIG. 68b illustrates an example of the function 357 learned by the function learning module 356. The figure includes a graph 357' of the function 357, which shows how an aftereffect (e.g., how a user feels after a treatment) changes based on an extent to which an experience had been previously experienced. The graph shows how the aftereffect tapers off after having previously experiencing the experience to a certain extent.

The prior measurements 281 may be utilized in various ways by the function learning module 356, which may slightly change what is represented by the function. In one embodiment, a prior measurement of a user is utilized to compute a baseline affective response value for the user. In this embodiment, values computed by the function may be indicative of differences between the subsequent measurements 282 of the at least ten users and baseline affective response values for the at least ten users. In another embodiment, values computed by the function may be indicative of an expected difference between the subsequent measurements 282 and the prior measurements 281.

Following is a description of different configurations of the function learning module 356 that may be used to learn a function describing a relationship between a duration of an experience and an aftereffect of the experience. Additional details about the function learning module 356 may be found in this disclosure at least in section 17—Learning Function Parameters.

In one embodiment, the function learning module 356 utilizes machine learning-based trainer 286 to learn the parameters of the function 357. Optionally, the machine learning-based trainer 286 utilizes the prior measurements 281 and the subsequent measurements 282 to train a model comprising parameters for a predictor configured to predict a value of an aftereffect of a user based on an input indicative of an extent to which the user had previously experienced the experience. In one example, each pair comprising a prior measurement of a user and a subsequent measurement of the user, taken after the user had previously experienced the experience to an extent e, is converted to a sample (e,v), which may be used to train the predictor. Optionally, v is a value determined based on a difference between the subsequent measurement and the prior measurement and/or a difference between the subsequent measurement and baseline computed based on the prior measurement, as explained above. When the trained predictor is provided inputs indicative of the extents $e_1$ and $e_2$, the predictor predicts the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function 357 comprise the parameters of the model and/or other data utilized by the predictor.

In an alternative embodiment, the function learning module 356 may utilize binning module 354, which is configured, in this embodiment, to assign a pair comprising a prior measurement of a user who had the experience and a subsequent measurement of the user, taken after the user had the experience, to one or more of a plurality of bins based on the extent to which the user had previously experienced the experience when the measurements were taken.

In one example, the experience related to the function 349 involves playing a game. In this example, the plurality of bins may correspond to various extents of previous game play which are measured in hours that the game has already been played. For example, the first bin may contain measurements taken when a user only played the game for 0-5 hours, the second bin may contain measurements taken when the user already played 5-10 hours, etc. In another example, the experience related to the function 349 involves taking a yoga class. In this example, the plurality of bins may correspond to various extents of previous yoga classes that a user had. For example, the first bin may contain measurements taken during the first week of yoga class, the second bin may contain measurements taken during the second week of yoga class, etc.

Additionally, the function learning module 356 may utilize the aftereffect scoring module 302, which, in one embodiment, is configured to compute a plurality of aftereffect scores for the experience, corresponding to the plurality of bins. An aftereffect score corresponding to a bin is computed based on prior and subsequent measurements of at least five users, from among the at least ten users, which were assigned to the bin. Optionally, with respect to the values $e_1$, $e_2$, $v_1$, and $v_2$ mentioned above, $e_1$ falls within a range of extents corresponding to a first bin, $e_2$ falls within a range of extents corresponding to a second bin, which is different from the first bin, and the values $v_1$ and $v_2$ are the aftereffect scores corresponding to the first and second bins, respectively.

In one embodiments, the parameters of the function 357 comprise the parameters derived from aftereffect scores corresponding to the plurality of bins and/or information related to the bins, such as information describing their boundaries.

In one embodiment, an aftereffect score for an experience is indicative of an extent of feeling at least one of the following emotions after having the experience: pain, anxiety, annoyance, stress, aggression, aggravation, fear, sadness, drowsiness, apathy, anger, happiness, contentment, calmness, attentiveness, affection, and excitement. Optionally, the aftereffect score is indicative of a magnitude of a change in the level of the at least one of the emotions due to having the experience.

Embodiments described herein in may involve various types of experiences for which a function may be learned using the system illustrated in FIG. 55a. Following are a few examples of types of experiences and functions of aftereffects that may be learned. Additional details regarding the various types of experiences for which it may be possible to learn a function, which describes a relationship between a duration of an experience and an aftereffect of the experience, may be found at least in section 3—Experiences in this disclosure.

Exercise—In one embodiment, the experience to which the function 357 corresponds involves partaking in an exercise activity, such as Yoga, Zumba, jogging, swimming, golf, biking, etc. The function 357 in this embodiment may describe how well user feels (e.g., on a scale from 1 to 10) after completing an exercise, when the user had already done the exercise a certain number of times before. Optionally, a prior measurement of the user may be taken before the user starts exercising (or while the user is exercising), and a subsequent measurement is taken after the user finishes exercising. Optionally, in addition to the input value indicative of e, the function 357 may receive additional input values. For example, in one embodiment, the function receives an additional input value $\Delta t$, which is indicative of how long after finishing the exercise the subsequent measurement was taken. Thus, in this example, the function 357 may be considered to behave like a function of the form $f(e,\Delta t)=v$, and it may describe the affective response v, a user is expected to feel at a time $\Delta t$ after partaking an exercise, when the user had previously done this exercise to the extent e (e.g., the user has been doing it already for e weeks).

Treatment—In one embodiment, the experience to which the function 357 corresponds involves receiving a treatment, such as a massage, physical therapy, acupuncture, aroma therapy, biofeedback therapy, etc. The function 357 in this embodiment may describe to what extent a user feels relaxed (e.g., on a scale from 1 to 10) after receiving the treatment, when the user already had received the treatment in the past to a certain extent (e.g., the user had already had a certain number of sessions of treatment). Optionally, a prior measurement of the user may be taken before the user starts receiving the treatment (or while the user receives the treatment), and a subsequent measurement is taken after the user finishes receiving the treatment. Optionally, in addition to the input value indicative of e, the function may receive additional input values. For example, in one embodiment, the function receives an additional input value $\Delta t$, which is indicative of how long after finishing the treatment the subsequent measurement was taken. Thus, in this example, the function may be considered to behave like a function of the form $f(e,\Delta t)=v$, and it may describe the affective response v a user is expected to feel at a time $\Delta t$ after receiving a treatment, when the user had previously received this treatment to the extent e (e.g., the user had received the treatment already e times).

Environment—In one embodiment, the experience to which the function 357 corresponds involves spending time in an environment characterized by a certain environmental parameter being in a certain range. Examples of environmental parameters include temperature, humidity, altitude, air quality, and allergen levels. The function 357 in this embodiment may describe how well a user feels (e.g., on a scale from 1 to 10) after spending time in an environment characterized by an environmental parameter being in the certain range, when the user had already been in a similar environment to a certain extent (e.g., a certain number of times). Optionally, in addition to the input value indicative of e, the function 357 may receive additional input values. For example, in one embodiment, the function 357 receives an additional input value $\Delta t$, which is indicative of how long after leaving the environment the subsequent measurement was taken. Thus, in this example, the function may be considered to behave like a function of the form $f(e,\Delta t)=v$, and it may describe the affective response v a user is expected to feel at a time $\Delta t$ after spending time in the environment, when the user had previously been in the environment e times before. In another example, an input value may represent the environmental parameter. For example, an input value q may represent the air quality index (AQI). Thus, the function in this example may be considered to behave like a function of the form $f(e,\Delta t, q)=v$, and it may describe the affective response v a user is expected to feel at a time $\Delta t$ after spending time in the environment that has air quality q (after having been there e times before).

Following is a description of steps that may be performed in a method for learning a function describing a relationship between repetitions of an experience and an aftereffect of the experience. The steps described below may, in one embodiment, be part of the steps performed by an embodiment of the system described above (illustrated in FIG. 68a). In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a function describing a relationship between repetitions of an experience and an aftereffect of the experience includes at least the following steps:

In Step 1, receiving, by a system comprising a processor and memory, measurements of affective response of users taken utilizing sensors coupled to the users; the measurements comprising prior and subsequent measurements of at least ten users who had the experience. A prior measurement of a user is taken before the user finishes the experience (or even before the user starts having the experience). A subsequent measurement of the user is taken after the user finishes having the experience (e.g., after elapsing of a duration of at least ten minutes after the user finishes the experience). Optionally, the prior and subsequent measurements are received by the collection module 120. Optionally, a difference between a subsequent measurement and a prior measurement of a user who had the experience is indicative of an aftereffect of the experience on the user. Optionally, each measurement of a user (e.g., a prior or subsequent measurement), from among the measurements received in Step 1, may be associated with a value indicative of the extent to which the user had already experienced the experience, before experiencing it again when the measurement was taken.

And in Step 2, learning parameters of a function based on the prior and subsequent measurements and their associated values. Optionally, the function describes, for different extents to which a user had experienced the experience, an expected aftereffect due to experiencing the experience again. Optionally, the function is at least indicative of values $v_1$ and $v_2$ of expected affective response of a user, after the user had previously experienced the experience to extents $e_1$ and $e_2$, respectively; where $e_1 \neq e_2$ and $v_1 \neq v_2$. Optionally, the function is learned utilizing the function learning module 356. Optionally, the function learned in step 2 is the function 357.

In one embodiment, Step 1 optionally involves utilizing a sensor coupled to a user who had the experience to obtain a prior measurement of affective response of the user who had the experience and/or a subsequent measurement of affective response of the user who had the experience. Optionally, Step 1 may involve taking multiple subsequent measurements of a user at different times after the user had the experience.

In some embodiments, the measurements received in Step 1 include measurements of users who had the experience after having experienced the experience previously to different extents. In one example, the measurements include a first prior measurement of a first user, taken after the first user had already experienced the experience to a first extent, and a second prior measurement of a second user, taken after the second user had already experienced the experience to a second extent. In this example, the second extent is significantly greater than the first extent. Optionally, by "significantly greater" it may mean that the second extent is at least 25% greater than the first extent (e.g., the second extent represents 15 hours of prior playing of a game and the first extent represents 10 hours of prior playing of the game). In some cases, being "significantly greater" may mean that the second extent is at least double the first extent (or even longer than that).

In some embodiments, the method may optionally include Step 3 that involves displaying the function learned in Step 2 on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 2 may involve performing different operations in different embodiments.

In one embodiment, learning the parameters of the function in Step 2 comprises utilizing a machine learning-based trainer that is configured to utilize the prior and subsequent measurements to train a model for a predictor configured to predict a value of affective response of a user based on an input indicative of a duration that elapsed since the user finished having the experience. Optionally, the values in the model are such that responsive to being provided inputs indicative of the extents $e_1$ and $e_2$, the predictor predicts the values $v_1$ and $v_2$, respectively.

In another embodiment, learning the parameters of the function in Step 2 involves performing the following operations: (i) assigning subsequent measurements to a plurality of bins based on durations corresponding to subsequent measurements (a duration corresponding to a subsequent measurement of a user is the duration that elapsed between when the user finished having the experience and when the subsequent measurement is taken); and (ii) computing a plurality of aftereffect scores corresponding to the plurality of bins. Optionally, an aftereffect score corresponding to a bin is computed based on prior and subsequent measurements of at least five users, from among the at least ten users, selected such that durations corresponding to the subsequent measurements of the at least five users fall within the range corresponding to the bin; thus, each bin corresponds to a range of durations corresponding to subsequent measurements. Optionally, $e_1$ falls within a range of extents corresponding to a first bin, $e_2$ falls within a range of extents corresponding to a second bin, which is different from the first bin, and the values $v_1$ and $v_2$ are the aftereffect scores corresponding to the first and second bins, respectively.

In some embodiments, functions learned by the method described above may be compared (e.g., utilizing the function comparator 284). Optionally, performing such a comparison involves the following steps: (i) receiving descriptions of first and second functions of aftereffects to having respective first and second experiences after having experienced them before to different extents; (ii) comparing the first and second functions; and (iii) providing an indication derived from the comparison. Optionally, the indication indicates least one of the following: (i) the experience from among, the first and second experiences, for which the average expected aftereffect to having the respective experience again, after having experienced the experience before at most to a certain extent e, is greatest; (ii) the experience, from among the first and second experiences, for which the average expected aftereffect to having the respective experience again, after having experienced the experience before at least to the certain extent e, is greatest; and (iii) the experience from among, the first and second experiences, for which the expected aftereffect to having the respective experience again, after having experienced the experience before to a certain extent e, is greatest.

A function learned by the method described above may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function personalized for the certain user that describes values of expected affective response at different durations after finishing the experience. Optionally, the output is generated utilizing the personalization module 130. Depending on the type of personalization approach used and/or the type of function learning approach used, the output may be utilized in various ways to learn a function for the experience, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected aftereffects to experiencing the experience again, after the experience had been experienced to extents $e_1$ and $e_2$, respectively, and $f_2$ is indicative of values $v_3$ and $v_4$ expected aftereffects to experiencing the experience again, after the experience had been experienced to the extents $e_1$ and $e_2$, respectively. Additionally, in this example, $e_1 \neq e_2$, $v_1 \neq v_2$, $v_3 \neq v_4$, and $v_1 \neq v_3$.

Users may have various experiences in their day-to-day lives, which can be of various types. Some examples of experiences include, going on vacations, playing games, participating in activities, receiving a treatment, and more. Having an experience can have an impact on how a user feels by causing the user to have a certain affective response. One factor that may influence how a user feels due to having an experience is the environment in which the user has the experience. For example, having a certain experience when the weather is overcast may elicit significantly different affective response compared to the affective response observed when having the certain experience on a sunny day. In another example, some experiences, like outdoor exercising, may be significantly less enjoyable when the air quality is bad, compared to other experiences, such as visiting an indoor mall, which might be less influenced by the air quality outside. Having knowledge about the environment may influence the affective response of user to the experience can help decide which experiences to have and/or when to have the experiences. Thus, there is a need to be able to evaluate the influence of the environment on affective response to experiences.

Some aspects of embodiments described herein involve systems, methods, and/or computer-readable media that may be utilized to learn a function that describes a relationship between a condition of an environment and affective response. In some embodiments, such a function describes, for different conditions, an expected affective response to having an experience in an environment in which a condition, from among the different conditions, persists. Typically, the different conditions are characterized by different values of an environmental parameter. For example, the environmental parameter may describe at least one of the following aspects of an environment: a temperature in the environment, a level of precipitation in the environment, a level of illumination in the environment (e.g., as measured in lux), a degree of air pollution in the environment, wind speed in the environment, an extent to which the environment is overcast, a degree to which the environment is crowded with people, and a noise level at the environment.

In some embodiments, determining the expected affective response to an experience is done based on measurements of affective response of users who had the experience. For example, these may include measurements of at least five users, or measurements of some other minimal number of users, such as measurements of at least ten users. The measurements of affective response are typically taken with sensors coupled to the users (e.g., sensors in wearable devices and/or sensors implanted in the users). In some embodiments described herein, the measurements are utilized to learn a function that describes a relationship between a condition of an environment and affective response. In some embodiments, the function may be considered to behave like a function of the form $f(p)=v$, where p represents a value of an environmental parameter corresponding to a condition of an environment, and v represents a value of the expected affective response when having the experience in an environment in which the condition persists. In one example, v may be a value indicative of the extent the user is expected to have a certain emotional response, such as being happy, relaxed, and/or excited while having the experience in the environment in which the condition persists.

Various approaches may be utilized, in embodiments described herein, to learn parameters of the function mentioned above from the measurements of affective response. In some embodiments, the parameters of the function may be learned utilizing an algorithm for training a predictor. For example, the algorithm may be one of various known machine learning-based training algorithms that may be used to create a model for a machine learning-based predictor that may be used to predict target values of the function (e.g., v mentioned above) for different domain values of the function (e.g., p mentioned above). Some examples of algorithmic approaches that may be used involve predictors that use regression models, neural networks, nearest neighbor predictors, support vector machines for regression, and/or decision trees. In other embodiments, the parameters of the function may be learned using a binning-based approach. For example, the measurements (or values derived from the measurements) may be placed in bins based on their corresponding domain values. Thus, for example, each training sample of the form (p,v), the value of p may be used to determine in which bin to place the sample. After the training data is placed in bins, a representative value is computed for each bin; this value is computed from the v values of the samples in the bin, and typically represents some form of score for the experience.

Some aspects of this disclosure involve learning personalized functions for different users utilizing profiles of the different users. Given a profile of a certain user, similarities between the profile of the certain user and profiles of other users are used to select and/or weight measurements of affective response of other users, from which a function is learned. Thus, different users may have different functions created for them, which are learned from the same set of measurements of affective response.

Figure 69:
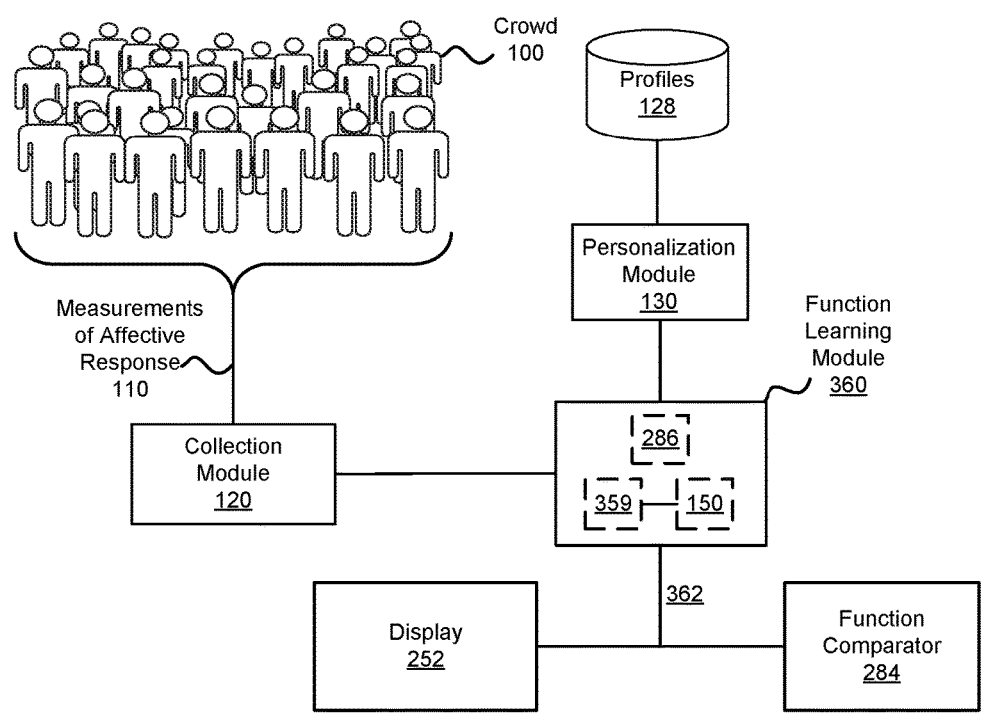
FIG. 69 illustrates a system configured to learn a function describing a relationship between a condition of an environment and affective response to an experience.

FIG. 69 illustrates a system configured to learn a function describing a relationship between a condition of an environment and affective response. The system includes at least collection module 120 and function learning module 360. The system may optionally include additional modules, such as the personalization module 130, function comparator 284, and/or the display 252.

The collection module 120 is configured, in one embodiment, to receive measurements 110 of affective response of users belonging to the crowd 100. The measurements 110 are taken utilizing sensors coupled to the users (as discussed in more detail at least in section 1—Sensors and section 2—Measurements of Affective Response). In this embodiment, the measurements 110 include measurements of affective response of at least ten users. Alternatively, the measurements 110 may include measurements of some other minimal number of users, such as at least five users. Optionally, each measurement of a user, from among the at least ten users, is taken by a sensor coupled to the user while the user has the experience.

In some embodiments, each measurement of a user, from among the at least ten users, is associated with a value of an environmental parameter that characterizes a condition of an environment in which the user has the experience. In one example, the environmental parameter may describe at least one of the following aspects of an environment: a temperature in the environment, a level of precipitation in the environment, a level of illumination in the environment (e.g., as measured in lux), a degree of air pollution in the environment, wind speed in the environment, an extent to which the environment is overcast, a degree to which the environment is crowded with people, and a noise level at the environment.

The value of the environmental parameter associated with a measurement of affective response of a user may be obtained from various sources. In one embodiment, the value is measured by a sensor in a device of the user (e.g., a sensor in a wearable device such as a smartwatch or wearable clothing). Optionally, the value is provided to the collection module 120 by a software agent operating on behalf of the user. In another embodiment, the value is received from an external source, such as a website and/or service that reports weather conditions at various locations in the United States and/or other locations in the world.

It is to be noted that the experience to which the measurements of the at least ten users relate may be any of the various experiences described in this disclosure, such as an experience involving being in a certain location, an experience involving engaging in a certain activity, consuming a certain segment of digital content, eating certain food, etc. In some embodiments, the experience belongs to a set of experiences that may include and/or exclude various experiences, as discussed in section 3—Experiences.

In some embodiments, an environment in which users have the experience is a certain location. Such as a certain vacation destination, a certain park, a certain region of a city. In other embodiments, environments in which users have the experience may correspond to different locations in the physical world. For example, the measurements 110 may include a first measurement taken at a first location and a second measurement taken at a second location which is at least one mile away from the first location.

The measurements received by the collection module 120 may comprise multiple measurements of a user who had the experience. In one example, the multiple measurements may correspond to the same event in which the user had the experience. In another example, each of the multiple measurements corresponds to a different event in which the user had the experience.

In some embodiments, the measurements 110 may include measurements of users who had the experience in different environments, which are characterized by different conditions persisting while the users had the experience. Optionally, first and second environments are considered different if different conditions persist in the first and second environments. Optionally, the first and second environments may involve the same physical location. For example, a room in which the temperature is 65° F. may be considered a different environment than the same room when the temperature in the room is 85° F.

In one embodiment, the measurements 110 include a measurement of a first user, taken in an environment in which a first condition persists, and a measurement of a second user, taken in an environment in which a second condition persists. In one example, the first condition is characterized by the temperature in the environment being a certain value, and the second condition is characterized by the temperature in the environment being at least 10° F. higher. In another example, the first condition is characterized by the humidity in the environment being a certain value, and the second condition is characterized by the humidity in the environment being at least 10% higher. In still another example, the first condition is characterized by the air quality in the environment being a certain value, and the second condition is characterized by air quality in the environment being worse, e.g., the second condition involves at least double the extent of air pollution as the extent of air pollution in the first condition.

The function learning module 360 is configured, in one embodiment, to receive the measurements of the at least ten users and to utilize those measurements and their associated values to learn function 362. Optionally, the function 362 describes, for different conditions, an expected affective response to having the experience in an environment in which a condition, from among the different conditions, persists. Optionally, the different conditions are characterized by different values of an environmental parameter. In some embodiments, the function 362 may be described via its parameters, thus, learning the function 362, may involve learning the parameters that describe the function 362. In embodiments described herein, the function 362 may be learned using one or more of the approaches described further below.

In some embodiments, the function 362 may be considered to perform a computation of the form $f(p)=v$, where p represents a value of an environmental parameter representing a condition of an environment, and v represents a value of the expected affective response when having the experience in an environment in which the condition persists. Optionally, the output of the function 362 may be expressed as an affective value. In one example, the output of the function 362 is an affective value indicative of an extent of feeling at least one of the following emotions: pain, anxiety, annoyance, stress, aggression, aggravation, fear, sadness, drowsiness, apathy, anger, happiness, contentment, calmness, attentiveness, affection, and excitement. In some embodiments, the function 362 is not a constant function that assigns the same output value to all input values. Optionally, the function 362 is at least indicative of values $v_1$ and $v_2$ of expected affective response corresponding to having the experience in environments in which respective first and second conditions persist. Optionally, the first and second conditions are characterized by the environmental parameter having values $p_1$ and $p_2$, respectively. Additionally, $p_1 \neq p_2$ and $v_1 \neq v_2$. Optionally, $p_2$ is at least 10% greater than $p_1$. In one example, $p_1$ represents a temperature in the environment and $p_2$ is a temperature that is at least 10° F. higher. In another example, $p_1$ represents humidity in the environment that is below 40% and $p_2$ represents humidity in the environment that is above 50%. In still another example, $p_1$ and $p_2$ represent values of the concentration of pollutants in the air in and environment, such as values of the Air Quality Index (AQI). In this example, $p_1$ may represent air quality that poses a low health risk, while $p_2$ may represent air quality that poses a high health risk.

Following is a description of different configurations of the function learning module 360 that may be used to learn the function 362. Additional details about the function learning module 360 may be found in this disclosure at least in section 17—Learning Function Parameters.

In one embodiment, the function learning module 360 utilizes the machine learning-based trainer 286 to learn parameters of the function 362. Optionally, the machine learning-based trainer 286 utilizes the measurements of the at least ten users to train a model for a predictor that is configured to predict a value of affective response of a user based on an input indicative of a value of an environmental parameter that characterizes a condition persisting in the environment in which the user has the experience. In one example, each measurement of the user, which is represented by the affective value v, and which was taken in an environment in which a condition persisted, which is characterized by an environmental parameter with value p, is converted to a sample (p,v), which may be used to train the predictor. Optionally, when the trained predictor is provided inputs indicative of the values $p_1$ and $p_2$ (mentioned above), the predictor utilizes the model to predict the values $v_1$ and $v_2$, respectively. Optionally, the model comprises at least one of the following: a regression model, a model utilized by a neural network, a nearest neighbor model, a model for a support vector machine for regression, and a model utilized by a decision tree. Optionally, the parameters of the function 362 comprise the parameters of the model and/or other data utilized by the predictor.

In an alternative embodiment, the function learning module 360 may utilize binning module 359, which is configured, in this embodiment, to assign measurements of users to a plurality of bins based on the values associated with the measurements, where a value associated with a measurement of a user is a value of an environmental parameter that characterizes a condition of an environment in which the user has the experience (as described in further detail above). Optionally, each bin corresponds to a range of values of the environmental parameter. In one example, if the environmental parameter corresponds to the temperature in the environment, each bin may correspond to a range of temperatures spanning 10° F. For example, the first bin may include measurements taken in an environment in which the temperature was −10° F. to 0° F., the second being may include measurements taken in an environment in which the temperature was 0° F. to 10° F., etc.

Additionally, in this embodiment, the function learning module 360 may utilize the scoring module 150, or some other scoring module described in this disclosure, to compute a plurality of scores corresponding to the plurality of bins. A score corresponding to a bin is computed based on measurements assigned to the bin. The measurements used to compute a score corresponding to a bin belong to at least five users, from the at least ten users. Optionally, with respect to the values $p_1$, $p_2$, $v_1$, and $v_2$ mentioned above, $p_1$ falls within a first range of values of the environmental parameter corresponding to a first bin, $p_2$ falls within a second range of values of the environmental parameter corresponding to a second bin, which is different from the first bin, and the values $v_1$ and $v_2$ are based on the scores corresponding to the first and second bins, respectively.

Embodiments described herein in may involve various types of experiences related to the function 362; the following are a few examples of such experiences. Additional details regarding the various types of experiences may be found at least in section 3—Experiences.

Vacation—In one embodiment, the experience to which the function 362 corresponds involves taking a vacation. For example, the vacation may involve going to a certain country, a certain city, a certain resort, a certain hotel, and/or a certain park. Optionally, in addition to the input value indicative of p, where p represents a value of an environmental parameter corresponding to a condition of an environment, the function 362 may receive additional input values. For example, in one embodiment, the function 362 receives an additional input value d indicative of how long the vacation was (e.g., how many days a user spent at the vacation destination). Thus, in this example, the function 362 may be considered to behave like a function of the form $f(p,d)=v$, and it may describe the affective response v a user is expected to feel when on a vacation of length d in an environment characterized by a condition represented by environmental parameter p.

Exercise—In one embodiment, the experience to which the function 362 corresponds involves partaking in an exercise activity, such as Yoga, Zumba, jogging, swimming, golf, biking, etc. Optionally, in addition to the input value indicative of p, where p represents a value of an environmental parameter corresponding to a condition of an environment, the function 362 may receive additional input values. For example, in one embodiment, the function 362 receives an additional input value d indicative of how long the exercise was (e.g., how many minutes the user spent exercising). Thus, in this example, the function 362 may be considered to behave like a function of the form $f(p,d)=v$, and it may describe the affective response v a user is expected to feel when exercising for a duration d in an environment characterized by a condition represented by environmental parameter p.

In one embodiment, the function comparator module 284 is configured to receive descriptions of first and second functions that describe, for different conditions, expected affective responses to having respective first and second experiences in environments in which a condition, from among the different conditions, persists. The function comparator module 284 is also configured to compare the first and second functions and to provide an indication of at least one of the following: (i) the experience, from among the first and second experiences, for which the average expected affective response to having the respective experience in an environment in which a first condition persists, is greatest (where the first condition is characterized by the environmental parameter having a value that is at most a certain value p); (ii) the experience, from among the first and second experiences, for which the average expected affective response to having the respective experience in an environment in which a second condition persists, is greatest (where the second condition is characterized by the environmental parameter having a value that is at least the certain value p); and (iii) the experience, from among the first and second experiences, for which the expected affective response to having the respective experience in an environment in which a third condition persists, is greatest (where the third condition is characterized by the environmental parameter having the certain value p).

In some embodiments, the personalization module 130 may be utilized, by the function learning module 360, to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 360 may be configured to utilize the output to learn a personalized function for the certain user (i.e., a personalized version of the function 362), which describes, for different conditions, an expected affective response to having the experience in an environment in which a condition, from among the different conditions, persists. The personalized functions are not the same for all users. That is, for at least a certain first user and a certain second user, who have different profiles, the function learning module 360 learns different functions, denoted $f_1$ and $f_2$, respectively. In one example, the function $f_1$ is indicative of values $v_1$ and $v_2$ of expected affective response corresponding to having the experience in environments characterized by conditions in which an environmental parameter has values $p_1$ and $p_2$, respectively, and the function $f_2$ is indicative of values $v_3$ and $v_4$ of expected affective response corresponding to having the experience in environments characterized by conditions in which the environmental parameter has the values $p_1$ and $p_2$, respectively. And additionally, $p_1 \neq p_2$, $v_1 \neq v_2$, $v_3 \neq v_4$, and $v_1 \neq v_3$.

Following is a description of steps that may be performed in a method for learning a function describing a relationship between a condition of an environment and affective response. The steps described below may, in one embodiment, be part of the steps performed by an embodiment of the system described above (illustrated in FIG. 69). In some embodiments, instructions for implementing the method may be stored on a computer-readable medium, which may optionally be a non-transitory computer-readable medium. In response to execution by a system including a processor and memory, the instructions cause the system to perform operations that are part of the method.

In one embodiment, the method for learning a function describing a relationship between a condition of an environment and affective response includes at least the following steps:

In Step 1, receiving, by a system comprising a processor and memory, measurements of affective response of at least ten users who have an experience; each measurement of a user is taken with a sensor coupled to the user, while the user has the experience, and is associated with a value of an environmental parameter that characterizes a condition of an environment in which the user has the experience. Optionally, the measurements are received by the collection module 120.

And in Step 2, learning a function based on the measurements received in Step 1 and their associated values. Optionally, the function describes, for different conditions, an expected affective response to having the experience in an environment in which a condition, from among the different conditions, persists. Optionally, the different conditions are characterized by different values of the environmental parameter. Optionally, the function is learned utilizing the function learning module 360. Optionally, the function that is learned is the function 362 mentioned above. Optionally, the function is indicative of values $v_1$ and $v_2$ of expected affective response corresponding to having the experience in environments in which respective first and second conditions persist (where the first and second conditions are characterized by the environmental parameter having values $p_1$ and $p_2$, respectively). Additionally, the values mentioned above are such that $p_1 \neq p_2$ and $v_1 \neq v_2$.

In one embodiment, Step 1 optionally involves utilizing a sensor coupled to a user who had the experience to obtain a measurement of affective response of the user. Optionally, Step 1 may involve taking multiple measurements of a user at different times while having the experience.

In some embodiments, the method may optionally include Step 3 that involves presenting the function learned in Step 2 on a display such as the display 252. Optionally, presenting the function involves rendering a representation of the function and/or its parameters. For example, the function may be rendered as a graph, plot, and/or any other image that represents values given by the function and/or parameters of the function.

As discussed above, parameters of a function may be learned from measurements of affective response utilizing various approaches. Therefore, Step 2 may involve performing different operations in different embodiments.

In one embodiment, learning the parameters of the function in Step 2 comprises utilizing a machine learning-based trainer that is configured to utilize the measurements received in Step 1 to train a model for a predictor configured to predict a value of affective response of a user based on an input indicative of a value of an environmental parameter that characterizes a condition persisting in the environment in which the user has the experience. Optionally, the values in the model are such that responsive to being provided inputs indicative of the values $p_1$ and $p_2$ mentioned above, the predictor predicts the values $v_1$ and $v_2$, respectively.

In another embodiment, learning the parameters of the function in Step 2 involves the following operations: (i) assigning the measurements received in Step 1 to a plurality of bins based on their associated values; and (ii) computing a plurality of scores corresponding to the plurality of bins. Optionally, a score corresponding to a bin is computed based on the measurements of at least five users, which were assigned to the bin. Optionally, measurements associated with $p_1$ are assigned to a first bin, measurements associated with $p_2$ are assigned to a second bin, which is different from the first bin, and the values $v_1$ and $v_2$ are based on the scores corresponding to the first and second bins, respectively.

In some embodiments, functions learned by the method described above may be compared (e.g., utilizing the function comparator 284). Optionally, performing such a comparison involves the following steps: (i) receiving descriptions of first and second functions that describe values of expected affective response to having respective first and second experiences in to having respective first and second experiences in an environment in which a condition, from among the different conditions, persists; (ii) comparing the first and second functions; and (iii) providing an indication derived from the comparison. Optionally, the indication indicates least one of the following: (i) the experience, from among the first and second experiences, for which the average expected affective response to having the respective experience in an environment in which a first condition persists, is greatest (where the first condition is characterized by the environmental parameter having a value that is at most a certain value p); (ii) the experience, from among the first and second experiences, for which the average expected affective response to having the respective experience in an environment in which a second condition persists, is greatest (where the second condition is characterized by the environmental parameter having a value that is at least the certain value p); and (iii) the experience, from among the first and second experiences, for which the expected affective response to having the respective experience in an environment in which a third condition persists, is greatest (where the third condition is characterized by the environmental parameter having the certain value p).

A function learned by a method described above may be personalized for a certain user. In such a case, the method may include the following steps: (i) receiving a profile of a certain user and profiles of at least some of the users (who contributed measurements used for learning the personalized functions); (ii) generating an output indicative of similarities between the profile of the certain user and the profiles; and (iii) utilizing the output to learn a function, personalized for the certain user, which describes, for different conditions, an expected affective response to having the experience in an environment in which a condition, from among the different conditions, persists. Optionally, the output is generated utilizing the personalization module 130. Depending on the type of personalization approach used and/or the type of function learning approach used, the output may be utilized in various ways to learn the function, as discussed in further detail above. Optionally, for at least a certain first user and a certain second user, who have different profiles, different functions are learned, denoted $f_1$ and $f_2$, respectively. In one example, $f_1$ is indicative of values $v_1$ and $v_2$ of expected affective response corresponding to having the experience in environments characterized by conditions in which an environmental parameter has values $p_1$ and $p_2$, respectively. Additionally, in this example, $f_2$ is indicative of values $v_3$ and $v_4$ of expected affective response corresponding to having the experience in environments characterized by conditions in which the environmental parameter has the values $p_1$ and $p_2$, respectively. Additionally, in this example, $p_1 \neq p_2$, $v_1 \neq v_2$, $v_3 \neq v_4$, and $v_1 \neq v_3$.

Personalization of functions describing a relationship between a condition of an environment and affective response can lead to the learning of different functions for different users who have different profiles. Obtaining the different functions for the different users may involve performing the steps described below. These steps may, in some embodiments, be part of the steps performed by systems modeled according to FIG. 69. In some embodiments, instructions for implementing a method that involves such steps may be stored on a computer-readable medium, which may optionally be a non-transitory computer-readable medium. In response to execution by a system including a processor and memory, the instructions cause the system to perform operations that are part of the method.

In one embodiment, the method for learning a personalized function describing a relationship between a condition of an environment and affective response includes the following steps:

In Step 1, receiving, by a system comprising a processor and memory, measurements of affective response of at least ten users who have an experience. Optionally, each measurement of a user is taken with a sensor coupled to the user, while the user has the experience, and is associated with a value of an environmental parameter that characterizes a condition of an environment in which the user has the experience. Optionally, the measurements are received by the collection module 120.

In Step 2, receiving profiles of at least some of the users who contributed measurements in Step 1.

In Step 3 receiving a profile of a certain first user.

In Step 4, generating a first output indicative of similarities between the profile of the certain first user and the profiles of the at least some of the users. Optionally, the first output is generated by the personalization module 130.

In Step 5, learning, based on the first output and at least some of the measurements received in Step 1 and their associated values, parameters of a first function $f_1$, which describes, for different conditions, an expected affective response to having the experience in an environment in which a condition, from among the different conditions, persists. Optionally, $f_1$ is at least indicative of values $v_1$ and $v_2$ of expected affective response corresponding to having the experience in environments in which respective first and second conditions persist (the first and second conditions are characterized by the environmental parameter having values $p_1$ and $p_2$, respectively). Additionally, $p_1 \neq p_2$ and $v_1 \neq v_2$. Optionally, the first function $f_1$ is learned utilizing the function learning module 360.

In Step 7 receiving a profile of a certain second user, which is different from the profile of the certain first user.

In Step 8, generating a second output, which is different from the first output, and is indicative of similarities between the profile of the certain second user and the profiles of the at least some of the users. Optionally, the first output is generated by the personalization module 130.

And in Step 9, learning, based on the first output and at least some of the measurements received in Step 1 and their associated values, parameters of a second function $f_2$, which describes, for different conditions, an expected affective response to having the experience in an environment in which a condition, from among the different conditions, persists. Optionally, $f_2$ is at least indicative of values $v_3$ and $v_4$ of expected affective response corresponding to having the experience in environments in which the respective first and second conditions persist (here $v_3 \neq v_4$). Optionally, the second function $f_2$ is learned utilizing the function learning module 360. In some embodiments, $f_1$ is different from $f_2$, thus, in the example above the values $v_1 \neq v_3$ and/or $v_2 \neq v_4$.

In one embodiment, the method may optionally include steps that involve displaying a function on a display such as the display 252 and/or rendering the function for a display (e.g., by rendering a representation of the function and/or its parameters). In one example, the method may include Step 6, which involves rendering a representation of $f_1$ and/or displaying the representation of $f_1$ on a display of the certain first user. In another example, the method may include Step 10, which involves rendering a representation of $f_2$ and/or displaying the representation of $f_2$ on a display of the certain second user.

In one embodiment, generating the first output and/or the second output may involve computing weights based on profile similarity. For example, generating the first output in Step 4 may involve the performing the following steps: (i) computing a first set of similarities between the profile of the certain first user and the profiles of the at least ten users; and (ii) computing, based on the first set of similarities, a first set of weights for the measurements of the at least ten users. Optionally, each weight for a measurement of a user is proportional to the extent of a similarity between the profile of the certain first user and the profile of the user (e.g., as determined by the profile comparator 133), such that a weight generated for a measurement of a user whose profile is more similar to the profile of the certain first user is higher than a weight generated for a measurement of a user whose profile is less similar to the profile of the certain first user. Generating the second output in Step 8 may involve similar steps, mutatis mutandis, to the ones described above.

In another embodiment, the first output and/or the second output may involve clustering of profiles. For example, generating the first output in Step 4 may involve the performing the following steps: (i) clustering the at least some of the users into clusters based on similarities between the profiles of the at least some of users, with each cluster comprising a single user or multiple users with similar profiles; (ii) selecting, based on the profile of the certain first user, a subset of clusters comprising at least one cluster and at most half of the clusters, on average, the profile of the certain first user is more similar to a profile of a user who is a member of a cluster in the subset, than it is to a profile of a user, from among the at least ten users, who is not a member of any of the clusters in the subset; and (iii) selecting at least eight users from among the users belonging to clusters in the subset. Here, the first output is indicative of the identities of the at least eight users. Generating the second output in Step 8 may involve similar steps, mutatis mutandis, to the ones described above.

19—Additional Considerations

Figure 70:
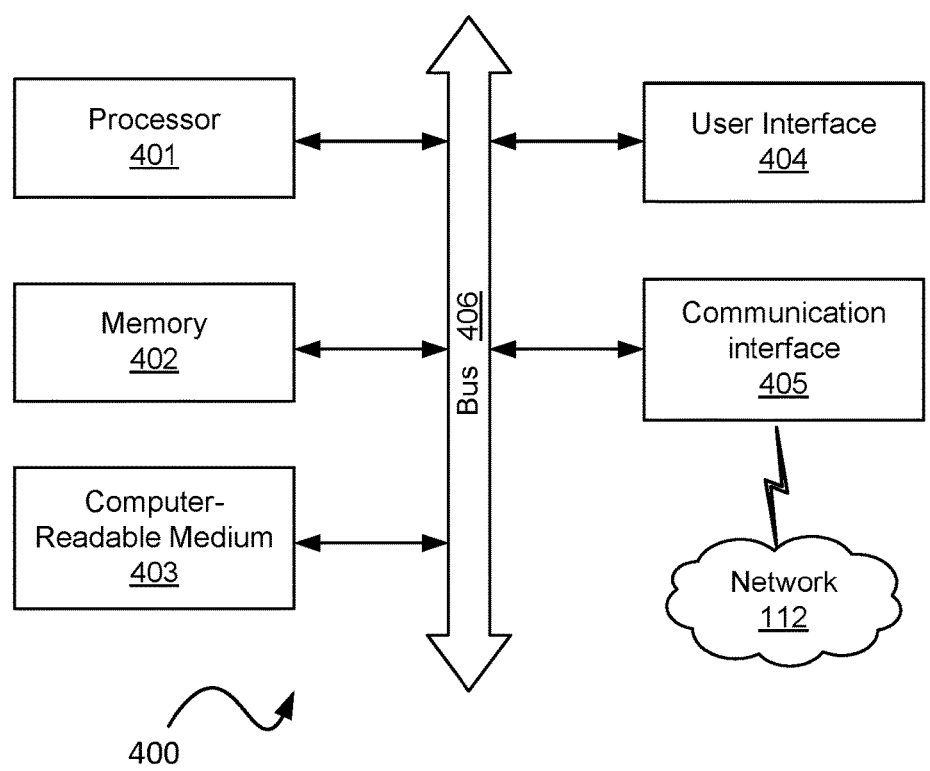
FIG. 70 illustrates a computer system architecture that may be utilized in various embodiments in this disclosure.

FIG. 70 is a schematic illustration of a computer 400 that is able to realize any one or more of the embodiments discussed herein. The computer 400 may be implemented in various ways, such as, but not limited to, a server, a client, a personal computer, a set-top box (STB), a network device, a handheld device (e.g., a smartphone), computing devices embedded in wearable devices (e.g., a smartwatch or a computer embedded in clothing), computing devices implanted in the human body, and/or any other computer form capable of executing a set of computer instructions. Further, references to a computer include any collection of one or more computers that individually or jointly execute one or more sets of computer instructions to perform any one or more of the disclosed embodiments.

The computer 400 includes one or more of the following components: processor 401, memory 402, computer readable medium 403, user interface 404, communication interface 405, and bus 406. In one example, the processor 401 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 402 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 401 and the one or more memory components may communicate with each other via a bus, such as bus 406.

Still continuing the example, the communication interface 405 may include one or more components for connecting to one or more of the following: LAN, Ethernet, intranet, the Internet, a fiber communication network, a wired communication network, and/or a wireless communication network. Optionally, the communication interface 405 is used to connect with the network 112. Additionally or alternatively, the communication interface 405 may be used to connect to other networks and/or other communication interfaces. Still continuing the example, the user interface 404 may include one or more of the following components: (i) an image generation device, such as a video display, an augmented reality system, a virtual reality system, and/or a mixed reality system, (ii) an audio generation device, such as one or more speakers, (iii) an input device, such as a keyboard, a mouse, a gesture based input device that may be active or passive, and/or a brain-computer interface.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media, or communication media including any medium that facilitates transfer of a computer program from one place to another. Computer-readable medium may be any media that can be accessed by one or more computers to retrieve instructions, code and/or data structures for implementation of the described embodiments. A computer program product may include a computer-readable medium.

In one example, the computer-readable medium 403 may include one or more of the following: RAM, ROM, EEPROM, optical storage, magnetic storage, biologic storage, flash memory, or any other medium that can store computer readable data. Additionally, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. It should be understood, however, that computer-readable medium does not include connections, carrier waves, signals, or other transient media, but are instead directed to non-transient, tangible storage media.

A computer program (also known as a program, software, software application, script, program code, or code) can be written in any form of programming language, including compiled or interpreted languages, declarative or procedural languages. The program can be deployed in any form, including as a standalone program or as a module, component, subroutine, object, or another unit suitable for use in a computing environment. A computer program may correspond to a file in a file system, may be stored in a portion of a file that holds other programs or data, and/or may be stored in one or more files that may be dedicated to the program. A computer program may be deployed to be executed on one or more computers that are located at one or more sites that may be interconnected by a communication network.

Computer-readable medium may include a single medium and/or multiple media (e.g., a centralized or distributed database, and/or associated caches and servers) that store the one or more sets of instructions. In various embodiments, a computer program, and/or portions of a computer program, may be stored on a non-transitory computer-readable medium. The non-transitory computer-readable medium may be implemented, for example, via one or more of a volatile computer memory, a non-volatile memory, a hard drive, a flash drive, a magnetic data storage, an optical data storage, and/or any other type of tangible computer memory to be invented that is not transitory signals per se. The computer program may be updated on the non-transitory computer-readable medium and/or downloaded to the non-transitory computer-readable medium via a communication network such as the Internet. Optionally, the computer program may be downloaded from a central repository such as Apple App Store and/or Google Play. Optionally, the computer program may be downloaded from a repository such as an open source and/or community run repository (e.g., GitHub).

At least some of the methods described in this disclosure, which may also be referred to as "computer-implemented methods", are implemented on a computer, such as the computer 400. When implementing a method from among the at least some of the methods, at least some of the steps belonging to the method are performed by the processor 401 by executing instructions. Additionally, at least some of the instructions for running methods described in this disclosure and/or for implementing systems described in this disclosure may be stored on a non-transitory computer-readable medium.

Some of the embodiments described herein include a number of modules. Modules may also be referred to herein as "components" or "functional units". Additionally, modules and/or components may be referred to as being "computer executed" and/or "computer implemented"; this is indicative of the modules being implemented within the context of a computer system that typically includes a processor and memory. Generally, a module is a component of a system that performs certain operations towards the implementation of a certain functionality. Examples of functionalities include receiving measurements (e.g., by a collector module), computing a score for an experience (e.g., by a scoring module), and various other functionalities described in embodiments in this disclosure. Though the name of many of the modules described herein includes the word "module" in the name (e.g., the scoring module 150), this is not the case with all modules; some names of modules described herein do not include the word "module" in their name (e.g., the profile comparator 133).

The following is a general comment about the use of reference numerals in this disclosure. It is to be noted that in this disclosure, as a general practice, the same reference numeral is used in different embodiments for a module when the module performs the same functionality (e.g., when given essentially the same type/format of data. Thus, as typically used herein, the same reference numeral may be used for a module that processes data even though the data may be collected in different ways and/or represent different things in different embodiments. For example, the reference numeral 150 is used to denote the scoring module in various embodiments described herein. The functionality may be the essentially the same in each of the different embodiments—the scoring module 150 computes a score from measurements of multiple users; however, in each embodiment, the measurements used to compute the score may be different. For example, in one embodiment, the measurements may be of users who had an experience (in general), and in another embodiment, the measurements may be of users who had a more specific experience (e.g., users who were at a hotel, users who had an experience during a certain period of time, or users who at a certain type of food). In all the examples above, the different types of measurements may be provided to the same module (possibly referred to by the same reference numeral) in order to produce a similar type of value (i.e., a score, a ranking, function parameters, a recommendation, etc.).

It is to be further noted that though the use of the convention described above that involves using the same reference numeral for modules is a general practice in this disclosure, it is not necessarily implemented with respect to all embodiments described herein. Modules referred to by a different reference numeral may perform the same (or similar) functionality, and the fact they are referred to in this disclosure by a different reference numeral does not mean that they might not have the same functionality.

Executing modules included in embodiments described in this disclosure typically involves hardware. For example, a module may comprise dedicated circuitry or logic that is permanently configured (e.g., as a special-purpose processor, such as a field programmable gate array (FPGA) or an application-specific integrated circuit (ASIC) to perform certain operations. Additionally or alternatively, a module may comprise programmable logic or circuitry (e.g., as encompassed within a general-purpose processor or another programmable processor) that is temporarily configured by software to perform certain operations. For example, a computer system such as the computer system illustrated in FIG. 70 may be used to implement one or more modules. In some instances, a module may be implemented using both dedicated circuitry and programmable circuitry. For example, a collection module may be implemented using dedicated circuitry that preprocesses signals obtained with a sensor (e.g., circuitry belonging to a device of the user) and in addition the collection module may be implemented with a general purpose processor that organizes and coalesces data received from multiple users.

It will be appreciated that the decision to implement a module in dedicated permanently configured circuitry and/or in temporarily configured circuitry (e.g., configured by software) may be driven by various considerations such as considerations of cost, time, and ease of manufacturing and/or distribution. In any case, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), not every module has to be configured or instantiated at every point in time. For example, a general-purpose processor may be configured to run different modules at different times.

In some embodiments, a processor implements a module by executing instructions that implement at least some of the functionality of the module. Optionally, a memory may store the instructions (e.g., as computer code), which are read and processed by the processor, causing the processor to perform at least some operations involved in implementing the functionality of the module. Additionally or alternatively, the memory may store data (e.g., measurements of affective response), which is read and processed by the processor in order to implement at least some of the functionality of the module. The memory may include one or more hardware elements that can store information that is accessible to a processor. In some cases, at least some of the memory may be considered part of the processor or on the same chip as the processor, while in other cases, the memory may be considered a separate physical element than the processor. Referring to FIG. 70 for example, one or more processors 401, may execute instructions stored in memory 402 (that may include one or more memory devices), which perform operations involved in implementing the functionality of a certain module.

The one or more processors may also operate to support performance of the relevant operations in a "cloud computing" environment or as a "software as a service" (SaaS). For example, at least some of the operations involved in implementing a module, may be performed by a group of computers accessible via a network (e.g., the Internet) and/or via one or more appropriate interfaces (e.g., application program interfaces (APIs)). Optionally, some of the modules may be executed in a distributed manner among multiple processors. The one or more processors may be located in a single geographic location (e.g., within a home environment, an office environment, or a server farm), and/or distributed across a number of geographic locations. Optionally, some modules may involve execution of instructions on devices that belong to the users and/or are adjacent to the users. For example, procedures that involve data preprocessing and/or presentation of results may run, in part or in full, on processors belonging to devices of the users (e.g., smartphones and/or wearable computers). In this example, preprocessed data may further be uploaded to cloud-based servers for additional processing. Additionally, preprocessing and/or presentation of results for a user may be performed by a software agent that operates on behalf of the user.

In some embodiments, modules may provide information to other modules, and/or receive information from other modules. Accordingly, such modules may be regarded as being communicatively coupled. Where multiple of such modules exist contemporaneously, communications may be achieved through signal transmission (e.g., over appropriate circuits and buses). In embodiments in which modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A different module may then, at a later time, access the memory device to retrieve and process the stored output.

It is to be noted that in the claims, when a dependent system claim is formulated according to a structure similar to the following: "further comprising module X configured to do Y", it is to be interpreted as: "the memory is also configured to store module X, the processor is also configured to execute module X, and module X is configured to do Y".

Modules and other system elements (e.g., databases or models) are typically illustrated in figures in this disclosure as geometric shapes (e.g., rectangles) that may be connected via lines. A line between two shapes typically indicates a relationship between the two elements the shapes represent, such as a communication that involves an exchange of information and/or control signals between the two elements. This does not imply that in every embodiment there is such a relationship between the two elements, rather, it serves to illustrate that in some embodiments such a relationship may exist. Similarly, a directional connection (e.g., an arrow) between two shapes may indicate that, in some embodiments, the relationship between the two elements represented by the shapes is directional, according the direction of the arrow (e.g., one element provides the other with information). However, the use of an arrow does not indicate that the exchange of information between the elements cannot be in the reverse direction too.

The illustrations in this disclosure depict some, but not necessarily all, the connections between modules and/or other system element. Thus, for example, a lack of a line connecting between two elements does not necessarily imply that there is no relationship between the two elements, e.g., involving some form of communication between the two. Additionally, the depiction in an illustration of modules as separate entities is done to emphasize different functionalities of the modules. In some embodiments, modules that are illustrated and/or described as separate entities may in fact be implemented via the same software program, and in other embodiments, a module that is illustrates and/or described as being a single element may in fact be implemented via multiple programs and/or involve multiple hardware elements possibly in different locations.

As used herein, any reference to "one embodiment" or "an embodiment" means that a particular element, feature, structure, or characteristic described in connection with the embodiment is included in at least one embodiment. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment. Similarly, references to "some embodiments" and "other embodiments" may refer, at times, to the same embodiments.

Herein, a predetermined value, such as a threshold, a predetermined rank, or a predetermined level, is a fixed value and/or a value determined any time before performing a calculation that compares a certain value with the predetermined value. Optionally, a first value may be considered a predetermined value when the logic (e.g., circuitry, computer code, and/or algorithm), used to compare a second value to the first value, is known before the computations used to perform the comparison are started.

Some embodiments may be described using the expression "coupled" and/or "connected", along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

Some embodiments may be described using the verb "indicating", the adjective "indicative", and/or using variations thereof. For example, a value may be described as being "indicative" of something. When a value is indicative of something, this means that the value directly describes the something and/or is likely to be interpreted as meaning that something (e.g., by a person and/or software that processes the value). Verbs of the form "indicating" or "indicate" may have an active and/or passive meaning, depending on the context. For example, when a module indicates something, that meaning may correspond to providing information by directly stating the something and/or providing information that is likely to be interpreted (e.g., by a human or software) to mean the something. In another example, a value may be referred to as indicating something (e.g., a determination indicates that a risk reaches a threshold), in this case, the verb "indicate" has a passive meaning; examination of the value would lead to the conclusion to which it indicates (e.g., analyzing the determination would lead one to the conclusion that the risk reaches the threshold).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" is employed to describe one or more elements/components/steps/modules/things of the embodiments herein. This description should be read to include one or at least one, and the singular also includes the plural unless it is obvious that it is meant otherwise. Additionally, the phrase "based on" is intended to mean "based, at least in part, on". For example, stating that a score is computed "based on measurements" means that the computation may use, in addition to the measurements, additional data that are not measurements, such as models, billing statements, and/or demographic information of users.

Though this disclosure in divided into sections having various titles, this partitioning is done just for the purpose of assisting the reader and is not meant to be limiting in any way. In particular, embodiments described in this disclosure may include elements, features, components, steps, and/or modules that may appear in various sections of this disclosure that have different titles. Furthermore, section numbering and/or location in the disclosure of subject matter are not to be interpreted as indicating order and/or importance. For example, a method may include steps described in sections having various numbers. These numbers and/or the relative location of the section in the disclosure are not to be interpreted in any way as indicating an order according to which the steps are to be performed when executing the method.

With respect to computer systems described herein, various possibilities may exist regarding how to describe systems implementing a similar functionality as a collection of modules. For example, what is described as a single module in one embodiment may be described in another embodiment utilizing more than one module. Such a decision on separation of a system into modules and/or on the nature of an interaction between modules may be guided by various considerations. One consideration, which may be relevant to some embodiments, involves how to clearly and logically partition a system into several components, each performing a certain functionality. Thus, for example, hardware and/or software elements that are related to a certain functionality may belong to a single module. Another consideration that may be relevant for some embodiments, involves grouping hardware elements and/or software elements that are utilized in a certain location together. For example, elements that operate at the user end may belong to a single module, while other elements that operate on a server side may belong to a different module. Still another consideration, which may be relevant to some embodiments, involves grouping together hardware and/or software elements that operate together at a certain time and/or stage in the lifecycle of data. For example, elements that operate on measurements of affective response may belong to a first module, elements that operate on a product of the measurements may belong to a second module, while elements that are involved in presenting a result based on the product, may belong to a third module.

It is to be noted that essentially the same embodiments may be described in different ways. In one example, a first description of a computer system may include descriptions of modules used to implement it. A second description of essentially the same computer system may include a description of operations that a processor is configured to execute (which implement the functionality of the modules belonging to the first description). The operations recited in the second description may be viewed, in some cases, as corresponding to steps of a method that performs the functionality of the computer system. In another example, a first description of a computer-readable medium may include a description of computer code, which when executed on a processor performs operations corresponding to certain steps of a method. A second description of essentially the same computer-readable medium may include a description of modules that are to be implemented by a computer system having a processor that executes code stored on the computer-implemented medium. The modules described in the second description may be viewed, in some cases, as producing the same functionality as executing the operations corresponding to the certain steps of the method.

While the methods disclosed herein may be described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

Some embodiments described herein may be practiced with various computer system configurations, such as cloud computing, a client-server model, grid computing, peer-to-peer, hand-held devices, multiprocessor systems, microprocessor-based systems, programmable consumer electronics, minicomputers, and/or mainframe computers. Additionally or alternatively, some of the embodiments may be practiced in a distributed computing environment where tasks are performed by remote processing devices that are linked through a communication network. In a distributed computing environment, program components may be located in both local and remote computing and/or storage devices. Additionally or alternatively, some of the embodiments may be practiced in the form of a service, such as infrastructure as a service (IaaS), platform as a service (PaaS), software as a service (SaaS), and/or network as a service (NaaS).

Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the appended claims and their equivalents.

What is claimed is:

1. A system configured to make personalized recommendations of types of food, comprising:
sensors configured to take measurements of affective response of users; and
a computer configured to:
receive indications of times at which the users consumed the types of food;
select for each type of food, based on the indications, measurements of at least five of the users taken up to four hours after consuming the type of food;
receive profiles of the users and first and second profiles of first and second users, respectively;
generate a first output indicative of similarities between the first profile and the profiles of the users;

calculate a first ranking of the types of food based on the measurements and the first output;

recommend to the first user, based on the first ranking, a first type of food over a second type of food;

generate a second output indicative of similarities between the second profile and the profiles of the users;

calculate a second ranking of the types of food based on the measurements and the second output; and recommend to the second user, based on the second ranking, the second type of food over the first type of food.

2. The system of claim 1, wherein on average, the at least five of the users who consumed the first type of food had a more positive affective response than the at least five of the users who consumed the second type of food.

3. The system of claim 1, wherein each of the types of food is a different item on a menu comprising food items.

4. The system of claim 1, wherein the computer is further configured to: (i) receive information, obtained from a financial account of a user from among the users, indicating that the user purchased the type of food from among the types of food; and (ii) select, based on the information, which measurements of affective response of the user to utilize for ranking the types of food.

5. The system of claim 1, wherein the computer is further configured to: (i) receive information, obtained from a social media account of a user from among the at least five of the users who consumed a certain type of food, indicating when the user consumed the certain type of food; and (ii) select, based on the information, which measurements of affective response of the user to utilize for ranking the types of food.

6. The system of claim 1, wherein a profile of a user comprises indications of one or more of the following: (i) an indication of a preferred dietary choice comprising one or more of the following: vegetarian food, vegan food, and low-carb food; (ii) an indication of a sensitivity to a certain food ingredient; (iii) a food allergy; (iv) a preference regarding a certain brand; (v) a preference towards a certain restaurant; (vi) and an extent of previous consumption of one or more types of food.

7. The system of claim 1, wherein the computer is configured to generate the first output by calculating values indicative of a similarity between each of the profiles of the users and the first profile, and utilizing the values to calculate weights for the measurements of the users; wherein a weight for a measurement of a user is proportional to an extent of a similarity between the profile of the user and the profile of the first user, such that a weight calculated for a measurement of a user whose profile is more similar to the profile of the first user is higher than a weight calculated for a measurement of a user whose profile is less similar to the profile of the first user; wherein the first output is indicative of the weights for the measurements of the users; and wherein the computer is configured to: calculate for each type of food a score based on the measurements of the at least five of the users who consumed the type of food and the weights calculated for said measurements, and to calculate the first ranking of the types of food based on magnitudes of the scores for the types of food;

wherein the score calculated for the first type of food is higher than the score calculated for the second type of food.

8. The system of claim 1, wherein the computer is configured to generate the first output by calculating values indicative of a similarity between each of the profiles and the first profile, and utilizing the values to calculate weights for the measurements of the users; wherein the weight for a measurement of a user is proportional to an extent of a similarity between the profile of the user and the profile of the first user, such that a weight calculated for a measurement of a user whose profile is more similar to the profile of the first user is higher than a weight calculated for a measurement of a user whose profile is less similar to the profile of the first user; the first output is indicative of the weights for the measurements of the users; the computer is further configured to generate a plurality of preference rankings for the types of food; each preference ranking is determined based on a subset of the measurements, has a corresponding weight determined based on the weights of the measurements comprised in the subset, and comprises a ranking of at least two of the types of food, such that one of the at least two types of food is ranked ahead of another type of food from among the at least two types of food; and wherein the computer is further configured to calculate the first ranking of the types of food based on the plurality of the preference rankings utilizing a method that satisfies the Condorcet criterion.

9. The system of claim 1, wherein the computer is configured to generate the first output by clustering users into clusters based on similarities between the profiles of the users, with each cluster comprising a single user or multiple users with similar profiles, and selecting, based on the first profile, a subset comprising at most half of the clusters; wherein, on average, the first profile is more similar to a profile of a user who is a member of a cluster in the subset, than it is to a profile of a user, from among the users, who is not a member of any of the clusters in the subset; the computer is further configured to select at least eight users from among the users belonging to clusters in the subset; wherein the first output is indicative of the at least eight users; and wherein the computer is configured to calculate the first ranking of the types of food based on the measurements of the at least eight users.

10. A method for making personalized recommendations of types of food, comprising:

taking measurements of affective response of users with sensors;

receiving indications of times at which the users consumed the types of food;

selecting for each type of food, based on the indications, measurements of at least five of the users taken up to four hours after consuming the type of food;

receiving profiles of the users and first and second profiles of first and second users, respectively;

generating a first output indicative of similarities between the first profile and the profiles of the users;

calculating a first ranking of the types of food based on the measurements and the first output;

recommending to the first user, based on the first ranking, a first type of food over a second type of food;

generating a second output indicative of similarities between the second profile and the profiles of the users;

calculating a second ranking of the types of food based on the measurements and the second output; and recommending to the second user, based on the second ranking, the second type of food over the first type of food.

11. The method of claim 10, further comprising: (i) receiving information, obtained from a financial account of a user from among the users, indicating that the user purchased the type of food from among the types of food; and (ii) selecting, based on the information, which measurements of affective response of the user to utilize for ranking the types of food.

12. The method of claim 10, further comprising: (i) receiving information, obtained from a social media account of a user from among the at least five of the users who consumed a certain type of food, indicating when the user consumed the certain type of food; and (ii) selecting, based on the information, which measurements of affective response of the user to utilize for ranking the types of food.

13. The method of claim 10, wherein a profile of a user comprises indications of one or more of the following: (i) an indication of a preferred dietary choice comprising one or more of the following: vegetarian food, vegan food, and low-carb food; (ii) an indication of a sensitivity to a certain food ingredient; (iii) a food allergy; (iv) a preference regarding a certain brand; (v) a preference towards a certain restaurant; (vi) and an extent of previous consumption of one or more types of food.

14. The method of claim 10, further comprising:
generating the first output by calculating values indicative of a similarity between each of the profiles of the users and the first profile;
utilizing the values to calculate weights for the measurements of the users;
wherein a weight for a measurement of a user is proportional to an extent of a similarity between the profile of the user and the profile of the first user, such that a weight calculated for a measurement of a user whose profile is more similar to the profile of the first user is higher than a weight calculated for a measurement of a user whose profile is less similar to the profile of the first user; wherein the first output is indicative of the weights for the measurements of the users;
calculating for each type of food a score based on the measurements of the at least five of the users who consumed the type of food and the weights calculated for said measurements; and
generating the first ranking of the types of food based on magnitudes of the scores for the types of food; wherein the score calculated for the first type of food is higher than the score calculated for the second type of food.

15. The method of claim 10, further comprising:
generating the first output by calculating values indicative of a similarity between each of the profiles and the first profile;
utilizing the values to calculate weights for the measurements of the users;
wherein the weight for a measurement of a user is proportional to an extent of a similarity between the profile of the user and the profile of the first user, such that a weight calculated for a measurement of a user whose profile is more similar to the profile of the first user is higher than a weight calculated for a measurement of a user whose profile is less similar to the profile of the first user; the first output is indicative of the weights for the measurements of the users;
generating a plurality of preference rankings for the types of food; each preference ranking is determined based on a subset of the measurements, has a corresponding weight determined based on the weights of the measurements comprised in the subset, and comprises a ranking of at least two of the types of food, such that one of the at least two types of food is ranked ahead of another type of food from among the at least two types of food; and
calculating the first ranking of the types of food based on the plurality of the preference rankings utilizing a method that satisfies the Condorcet criterion.

16. A non-transitory computer-readable medium having instructions stored thereon that, in response to execution by a system including a processor and memory, causes the system to perform operations comprising:
receiving measurements of affective response of users taken with sensors;
receiving indications of times at which the users consumed types of food;
selecting for each type of food, based on the indications, measurements of at least five of the users taken up to four hours after consuming the type of food;
receiving profiles of the users and first and second profiles of first and second users, respectively;
generating a first output indicative of similarities between the first profile and the profiles of the users;
calculating a first ranking of the types of food based on the measurements and the first output;
recommending to the first user, based on the first ranking, a first type of food over a second type of food;
generating a second output indicative of similarities between the second profile and the profiles of the users;
calculating a second ranking of the types of food based on the measurements and the second output; and
recommending to the second user, based on the second ranking, the second type of food over the first type of food.

17. The non-transitory computer-readable medium of claim 16, further comprising additional instructions that, in response to execution, cause the system to perform operations comprising:
generating the first output by clustering users into clusters based on similarities between the profiles of the users, with each cluster comprising a single user or multiple users with similar profiles, and selecting, based on the first profile, a subset comprising at most half of the clusters; wherein, on average, the first profile is more similar to a profile of a user who is a member of a cluster in the subset, than it is to a profile of a user, from among the users, who is not a member of any of the clusters in the subset;
selecting at least eight users from among the users belonging to clusters in the subset; wherein the first output is indicative of the at least eight users; and
calculating the first ranking of the types of food based on the measurements of the at least eight users.

18. The non-transitory computer-readable medium of claim 16, further comprising additional instructions that, in response to execution, cause the system to perform operations comprising:
generating the first output by calculating values indicative of a similarity between each of the profiles of the users and the first profile;
utilizing the values to calculate weights for the measurements of the users;
wherein a weight for a measurement of a user is proportional to an extent of a similarity between the profile of the user and the profile of the first user, such that a weight calculated for a measurement of a user whose profile is more similar to the profile of the first user is higher than a weight calculated for a measurement of a user whose profile is less similar to the profile of the first user; wherein the first output is indicative of the weights for the measurements of the users;
calculating for each type of food a score based on the measurements of the at least five of the users who consumed the type of food and the weights calculated for said measurements; and generating the first ranking of the types of food based on magnitudes of the scores for the types of food; wherein the score calculated for the first type of food is higher than the score calculated for the second type of food.

19. The non-transitory computer-readable medium of claim 16, further comprising additional instructions that, in response to execution, cause the system to perform operations comprising:

generating the first output by calculating values indicative of a similarity between each of the profiles and the first profile;

utilizing the values to calculate weights for the measurements of the users;

wherein the weight for a measurement of a user is proportional to an extent of a similarity between the profile of the user and the profile of the first user, such that a weight calculated for a measurement of a user whose profile is more similar to the profile of the first user is higher than a weight calculated for a measurement of a user whose profile is less similar to the profile of the first user; the first output is indicative of the weights for the measurements of the users;

generating a plurality of preference rankings for the types of food; each preference ranking is determined based on a subset of the measurements, has a corresponding weight determined based on the weights of the measurements comprised in the subset, and comprises a ranking of at least two of the types of food, such that one of the at least two types of food is ranked ahead of another type of food from among the at least two types of food; and calculating the first ranking of the types of food based on the plurality of the preference rankings utilizing a method that satisfies the Condorcet criterion.

20. The non-transitory computer-readable medium of claim 16, further comprising additional instructions that, in response to execution, cause the system to perform operations comprising: (i) receiving information, obtained from a financial account of a user from among the users, indicating that the user purchased the type of food from among the types of food; and (ii) selecting, based on the information, which measurements of affective response of the user to utilize for ranking the types of food.

* * * * *